(12) United States Patent
Kondo et al.

(10) Patent No.: US 7,593,601 B2
(45) Date of Patent: Sep. 22, 2009

(54) IMAGE PROCESSING DEVICE, METHOD, AND PROGRAM

(75) Inventors: Tetsujiro Kondo, Tokyo (JP); Takashi Sawao, Tokyo (JP); Junichi Ishibashi, Saitama (JP); Takahiro Nagano, Kanagawa (JP); Naoki Fujiwara, Tokyo (JP); Toru Miyake, Tokyo (JP); Seiji Wada, Kanagawa (JP)

(73) Assignee: Sony Corporation, Tokyo (JP)

(*) Notice: Subject to any disclaimer, the term of this patent is extended or adjusted under 35 U.S.C. 154(b) by 695 days.

(21) Appl. No.: 10/544,873

(22) PCT Filed: Feb. 13, 2004

(86) PCT No.: PCT/JP2004/001585

§ 371 (c)(1),
(2), (4) Date: Aug. 9, 2005

(87) PCT Pub. No.: WO2004/077354

PCT Pub. Date: Sep. 10, 2004

(65) Prior Publication Data

US 2006/0159368 A1    Jul. 20, 2006

(30) Foreign Application Priority Data

Feb. 25, 2003   (JP) .................... 2003-046861

(51) Int. Cl.
*G06K 9/32* (2006.01)
(52) U.S. Cl. ..................... 382/299; 382/268
(58) Field of Classification Search ............ 382/266, 382/268, 299, 274, 275; 348/208.4
See application file for complete search history.

(56) References Cited

U.S. PATENT DOCUMENTS 4,648,120 A * 3/1987 Chittineni ............. 382/266

(Continued)

FOREIGN PATENT DOCUMENTS

JP    2-285475    11/1990

(Continued)

OTHER PUBLICATIONS

U.S. Appl. No. 10/546,724, filed Aug. 23, 2005, Kondo et al.

(Continued)

*Primary Examiner*—Charles Kim
*Assistant Examiner*—Stephen R Koziol
(74) *Attorney, Agent, or Firm*—Oblon, Spivak, McClelland, Maier & Neustadt, P.C.

(57) ABSTRACT

The present invention enables processing results which are more accurate and which have higher precision as to events of the real world to be obtained. A non-continuity component extracting unit 201 detects discontinuity portions of pixel values of multiple pixels in an input image. A peak detecting unit 202 detects a peak of change of pixel values from a discontinuity portion. A monotonous increase/decrease detecting unit 203 detects monotonous increase/decrease regions wherein pixel values increase or decrease monotonously from the peak. A continuousness detecting unit 204 detects a monotonous increase/decrease region where another monotonous increase/decrease region of the monotonous increase/decrease regions exists at an adjacent position on the screen, as a continuity region having data continuity. A data continuity direction detecting unit 301 detects the direction of continuousness of the continuity region. An actual world estimating unit estimates real world lights signals by estimating the continuity of the real world light signals, based on the continuity region and the direction of the continuousness of the continuity region. The present invention can be applied to an image processing device for generating images with high resolution.

6 Claims, 214 Drawing Sheets

U.S. PATENT DOCUMENTS

| | | | | |
|---|---|---|---|---|
| 5,052,045 | A | * | 9/1991 | Peregrim et al. ............. 382/199 |
| 5,134,495 | A | * | 7/1992 | Frazier et al. ................ 382/299 |
| 5,398,292 | A | * | 3/1995 | Aoyama ...................... 382/199 |
| 6,621,924 | B1 | * | 9/2003 | Ogino et al. .................. 382/165 |
| 6,665,439 | B1 | * | 12/2003 | Takahashi .................... 382/199 |

FOREIGN PATENT DOCUMENTS

| | | |
|---|---|---|
| JP | 5-342352 | 12/1993 |
| JP | 8-96145 | 4/1996 |
| JP | 11-239363 | 8/1999 |
| JP | 2000-201283 | 7/2000 |
| JP | 2001-84368 | 3/2001 |
| WO | 01/97510 | 12/2001 |

OTHER PUBLICATIONS

U.S. Appl. No. 10/543,839, filed Jul. 29, 2005, Kondo et al.
U.S. Appl. No. 10/546,510, filed Aug. 22, 2005, Kondo et al.
U.S. Appl. No. 10/545,074, filed Aug. 9, 2005, Kondo et al.
U.S. Appl. No. 10/545,081, filed Aug. 9, 2005, Kondo et al.
U.S. Appl. No. 11/670,478, filed Feb. 2, 2007, Kondo et al.
U.S. Appl. No. 11/670,486, filed Feb. 2, 2007, Kondo et al.
U.S. Appl. No. 11/670,734, filed Feb. 2, 2007, Kondo et al.
U.S. Appl. No. 11/626,662, filed Jan. 24, 2007, Kondo et al.
U.S. Appl. No. 11/627,155, filed Jan. 25, 2007, Kondo et al.
U.S. Appl. No. 11/627,195, filed Jan. 25, 2007, Kondo et al.
U.S. Appl. No. 11/627,230, filed Jan. 25, 2007, Kondo et al.
U.S. Appl. No. 11/627,243, filed Jan. 25, 2007, Kondo et al.
U.S. Appl. No. 11/670,754, filed Feb. 20, 2007, Kondo et al.
U.S. Appl. No. 11/670,732, filed Feb. 2, 2007, Kondo et al.
U.S. Appl. No. 11/670,785, filed Feb. 2, 2007, Kondo et al.
U.S. Appl. No. 11/670,763, filed Feb. 2, 2007, Kondo et al.
U.S. Appl. No. 11/670,776, filed Feb. 2, 2007, Kondo et al.
U.S. Appl. No. 11/670,795, filed Feb. 2, 2007, Kondo et al.

* cited by examiner

FIG. 95

| | 2141-2 | |
|---|---|---|
| 2 | 58 | 60 |
| 1 | 65 | 66 |
| −9 | 66 | 57 |
| 2 | 68 | 70 |
| 3 | 63 | 66 |
| 9 | 52 | 61 |
| 19 | 44 | 63 |
| 20 | 24 | 44 |
| 32 | 22 | 54 |
| 47 | 13 | 60 |
| 61 | −3 | 58 |
| 75 | 3 | 78 |
| 79 | −1 | 78 |
| 81 | −1 | 80 |
| 77 | −8 | 69 |

|  |  |
|---|---|
| 3.5 | 96.5 |
| 1.5 | 98.5 |
| 0.0 | 100.0 |
| 3.0 | 97.0 |
| 4.5 | 95.5 |
| 15.0 | 85.0 |
| 30.0 | 70.0 |
| 45.5 | 54.5 |
| 59.5 | 40.5 |
| 78.5 | 21.5 |
| 100.0 | 0.0 |
| 96.0 | 4.0 |
| 100.0 | 0.0 |
| 100.0 | 0.0 |
| 91.5 | 0.0 |

2151-1 (left column), 2151-2 (right column)

IMAGE PROCESSING DEVICE, METHOD, AND PROGRAM

TECHNICAL FIELD

The present invention relates to an image processing device and method, and a program, and particularly relates to an image processing device and method, and program, taking into consideration the real world where data has been acquired.

BACKGROUND ART

Technology for detecting phenomena in the actual world (real world) with sensor and processing sampling data output from the sensors is widely used. For example, image processing technology wherein the actual world is imaged with an imaging sensor and sampling data which is the image data is processed, is widely employed.

Also, Japanese Unexamined Patent Application Publication No. 2001-250119 discloses having second dimensions with fewer dimensions than first dimensions obtained by detecting with sensors first signals, which are signals of the real world having first dimensions, obtaining second signals including distortion as to the first signals, and performing signal processing based on the second signals, thereby generating third signals with alleviated distortion as compared to the second signals.

However, signal processing for estimating the first signals from the second signals had not been thought of to take into consideration the fact that the second signals for the second dimensions with fewer dimensions than first dimensions wherein a part of the continuity of the real world signals is lost, obtained by first signals which are signals of the real world which has the first dimensions, have the continuity of the data corresponding to the stability of the signals of the real world which has been lost.

DISCLOSURE OF INVENTION

The present invention has been made in light of such a situation, and it is an object thereof to take into consideration the real world where data was acquired, and to obtain processing results which are more accurate and more precise as to phenomena in the real world.

The image processing device according to the present invention includes: discontinuous portion detecting means for detecting discontinuous portions in pixel values of a plurality of pixels in image data acquired by light signals of the real world being cast upon a plurality of detecting elements each having spatio-temporal integration effects, of which a part of continuity of the light signals of the real world have been lost; peak detecting means for detecting the peak of change of the pixel values from the discontinuous portions; monotonous increase/decrease region detecting means for detecting monotonous increase/decrease regions wherein the pixel value is increasing or decreasing monotonously from the peak; continuousness detecting means for detecting, from the monotonous increase/decrease regions detected by the monotonous increase/decrease region detecting means, a monotonous increase/decrease region regarding which another monotonous increase/decrease region in the image data exists adjacently, as a continuity region having continuity of the image data; direction detecting means for detecting the direction of continuity of the continuity region; and actual world estimating means for estimating light signals of the real world by estimating the continuity of the light signals of the real world, based on the continuity region detected by the continuousness detecting means and the direction of the continuousness of the continuity region detected by the continuousness detecting means.

The direction detecting means may detect the direction of the continuousness in the continuity region, based on the change in pixels values of a plurality of first pixels disposed within a first monotonous increase/decrease region of the monotonous increase/decrease regions detected by the continuousness detecting means, and change in the pixel values of a plurality of second pixels adjacent to the plurality of first pixels, disposed within a second monotonous increase/decrease region adjacent to the first monotonous increase/decrease region.

The direction detecting means may detect a direction determined by the first monotonous increase/decrease region and the second monotonous increase/decrease region as the direction of the continuousness of the continuity region, in the event that the increase in pixel values of the plurality of first pixels disposed within the first monotonous increase/decrease region and the decrease in pixel values of the plurality of second pixels disposed within the second monotonous increase/decrease region match.

The discontinuous portion detecting means may obtain a regression plane corresponding to the pixel value of the plurality of pixels of the image data, detect as the discontinuous portion a region made up of the pixels having the pixel values wherein the distance from the regression plane is equal to or greater than a threshold value, and compute difference values wherein values approximated by the regression plane are subtracted from the pixel values of the pixels in the discontinuous portion; with the peak detecting means detecting the peak based on the difference value; and with the monotonous increase/decrease detecting means detecting the monotonous increase/decrease region based on the difference value; and with the direction detecting means detecting the detecting the direction of the continuousness in the continuity region based on the difference value.

An image processing method according to the present invention includes: a discontinuous portion detecting step for detecting discontinuous portions in pixel values of a plurality of pixels in image data acquired by light signals of the real world being cast upon a plurality of detecting elements each having spatio-temporal integration effects, of which a part of continuity of the light signals of the real world have been lost; a peak detecting step for detecting the peak of change of the pixel values from the discontinuous portions; a monotonous increase/decrease region detecting step for detecting monotonous increase/decrease regions wherein the pixel value is increasing or decreasing monotonously from the peak; a continuousness detecting step for detecting, from the monotonous increase/decrease regions detected in the monotonous increase/decrease region detecting step, a monotonous increase/decrease region regarding which another monotonous increase/decrease region in the image data exists adjacently, as a continuity region having continuity of the image data; a direction detecting step for detecting the direction of continuity of the continuity region; and an actual world estimating step for estimating light signals of the real world by estimating the continuity of the light signals of the real world, based on the continuity region detected in the continuousness detecting step and the direction of the continuousness of the continuity region detected by the continuousness detecting step.

A computer-readable program according to the present invention includes: a discontinuous portion detecting step for detecting discontinuous portions in pixel values of a plurality of pixels in image data acquired by light signals of the real world being cast upon a plurality of detecting elements each having spatio-temporal integration effects, of which a part of continuity of the light signals of the real world have been lost; a peak detecting step for detecting the peak of change of the pixel values from the discontinuous portions; a monotonous increase/decrease region detecting step for detecting monotonous increase/decrease regions wherein the pixel value is increasing or decreasing monotonously from the peak; a continuousness detecting step for detecting, from the monotonous increase/decrease regions detected in the monotonous increase/decrease region detecting step, a monotonous increase/decrease region regarding which another monotonous increase/decrease region in the image data exists adjacently, as a continuity region having continuity of the image data; a direction detecting step for detecting the direction of continuity of the continuity region; and an actual world estimating step for estimating light signals of the real world by estimating the continuity of the light signals of the real world, based on the continuity region detected in the continuousness detecting step and the direction of the continuousness of the continuity region detected by the continuousness detecting step.

With the image processing device and method, and program, according to the present invention, discontinuous portions are detected in pixel values of a plurality of pixels in image data acquired by light signals of the real world being cast upon a plurality of detecting elements each having spatio-temporal integration effects, of which a part of continuity of the light signals of the real world have been lost; the peak of change of the pixel values is detected from the discontinuous portions; monotonous increase/decrease regions wherein the pixel value increases or decreases monotonously from the peak are detected; a monotonous increase/decrease region is detected from the monotonous increase/decrease regions detected, regarding which another monotonous increase/decrease region in the image data exists adjacently, as a continuity region having continuity of the image data; the direction of continuity of the continuity region is detected; and light signals of the real world are estimated by estimating the continuity of the light signals of the real world, based on the detected continuity region and direction of the continuousness of the detected continuity region.

The image-processing device may be a stand-alone device, or may be a block which performs image processing.

BRIEF DESCRIPTION OF THE DRAWINGS

FIG. 95 is a diagram for describing the processing for calculating allocation ratio.

FIG. 96 is a diagram for describing the processing for calculating allocation ratio.

FIG. 120 is a diagram for describing the principle of function approximation, which is an example of an embodiment of the actual world estimating unit shown in FIG. 3.

FIG. 121 is a diagram for describing integration effects in the event that the sensor is a CCD.

FIG. 122 is a diagram for describing a specific example of the integration effects of the sensor shown in FIG. 121.

FIG. 123 is a diagram for describing a specific example of the integration effects of the sensor shown in FIG. 121.

FIG. 124 is a diagram representing a fine-line-inclusive actual world region shown in FIG. 122.

FIG. 125 is a diagram for describing the principle of an example of an embodiment of the actual world estimating unit shown in FIG. 3, in comparison with the example shown in FIG. 120.

FIG. 126 is a diagram representing the fine-line-inclusive data region shown in FIG. 122.

FIG. 127 is a diagram wherein each of the pixel values contained in the fine-line-inclusive data region shown in FIG. 126 are plotted on a graph.

FIG. 128 is a diagram wherein an approximation function, approximating the pixel values contained in the fine-line-inclusive data region shown in FIG. 127, is plotted on a graph.

FIG. 129 is a diagram for describing the continuity in the spatial direction which the fine-line-inclusive actual world region shown in FIG. 122 has.

FIG. 130 is a diagram wherein each of the pixel values contained in the fine-line-inclusive data region shown in FIG. 126 are plotted on a graph.

FIG. 131 is a diagram for describing a state wherein each of the input pixel values indicated in FIG. 130 are shifted by a predetermined shift amount.

Figure 127:
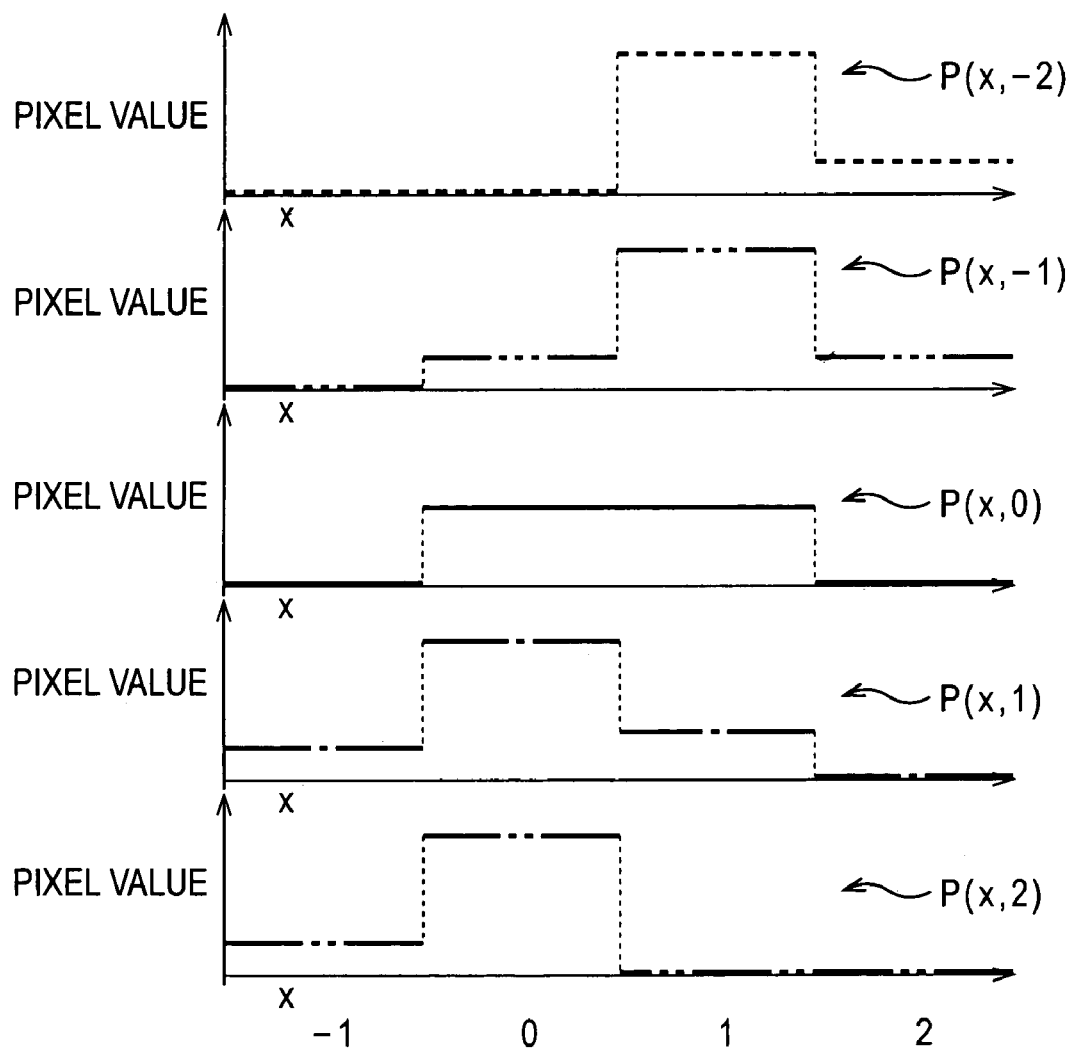
Figure 132:
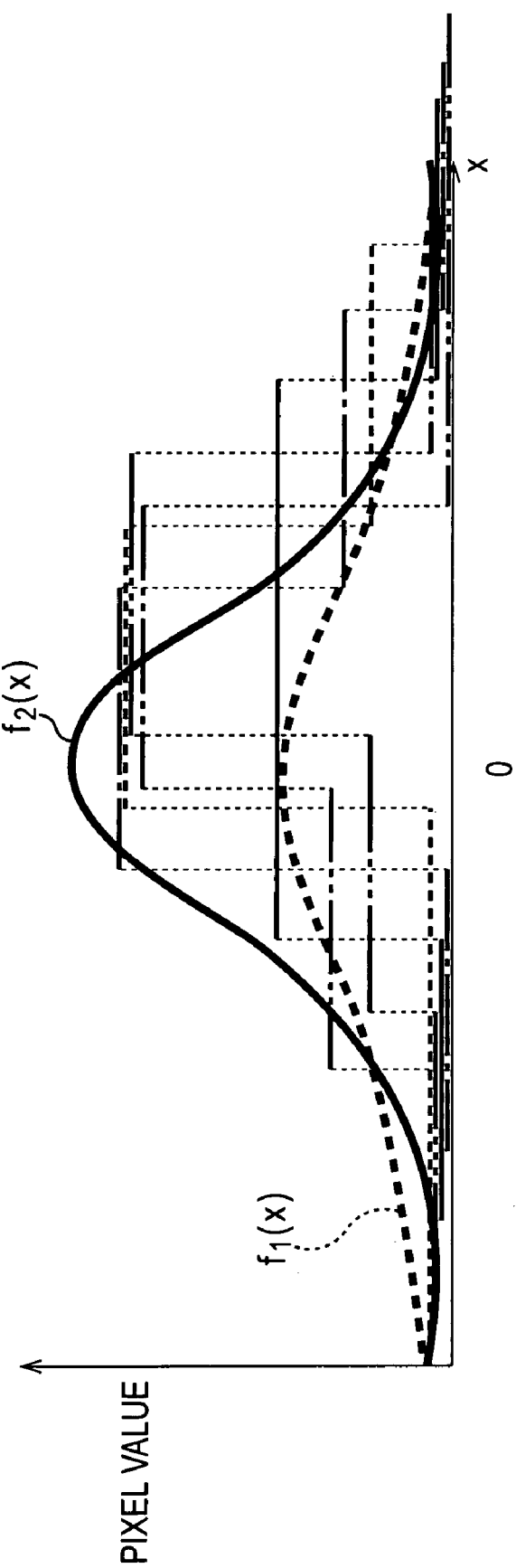

FIG. 132 is a diagram wherein an approximation function, approximating the pixel values contained in the fine-line-inclusive data region shown in FIG. 127, is plotted on a graph, taking into consideration the spatial-direction continuity.

Figure 133:
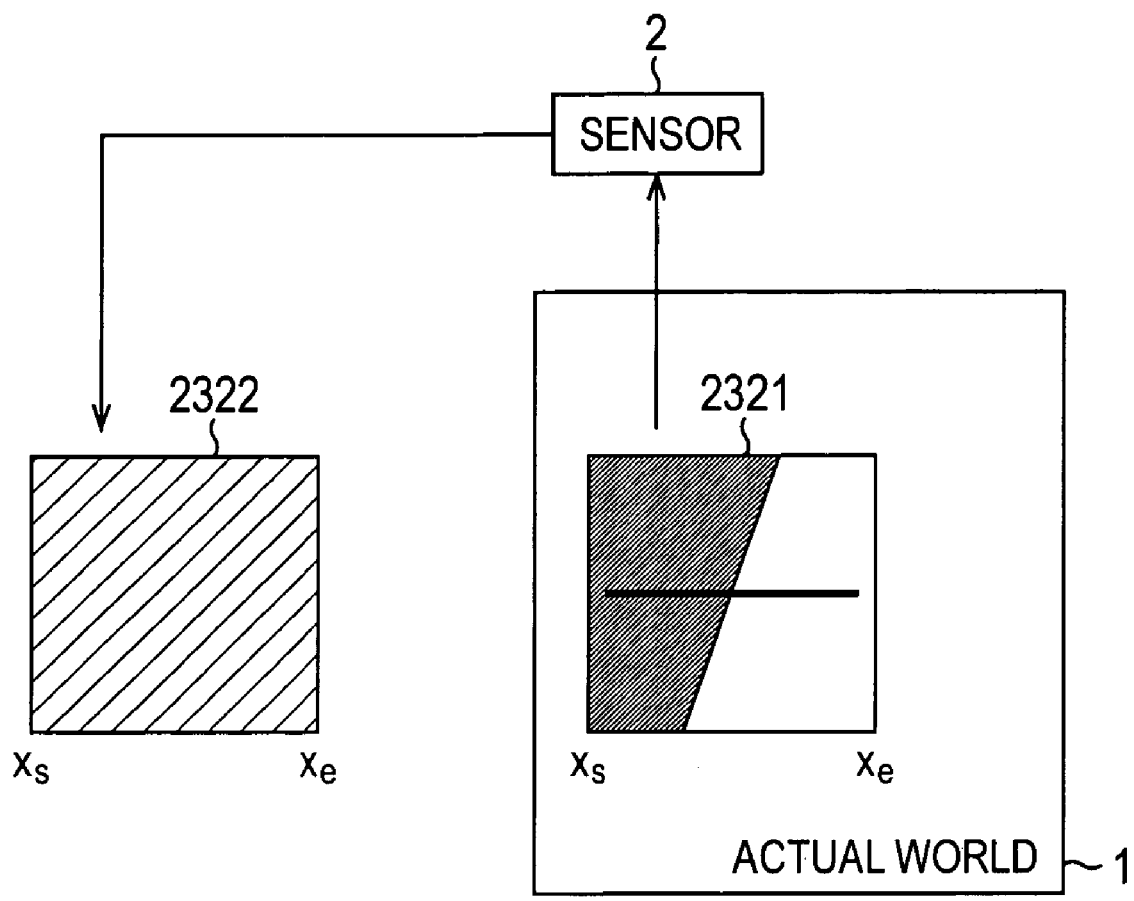

FIG. 133 is a diagram for describing space-mixed region.

Figure 134:
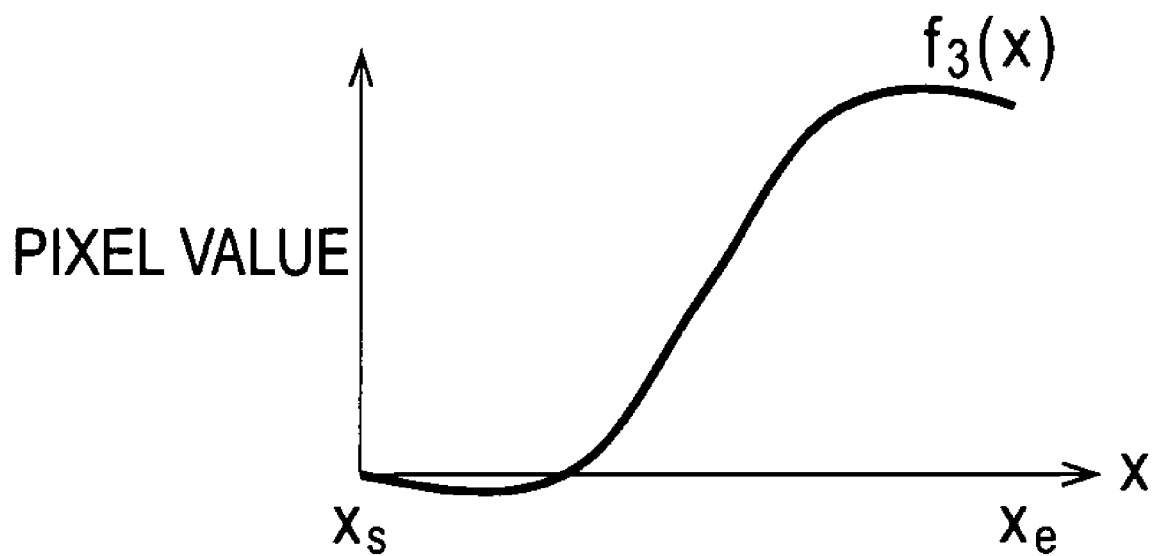

FIG. 134 is a diagram for describing an approximation function approximating actual-world signals in a space-mixed region.

Figure 135:
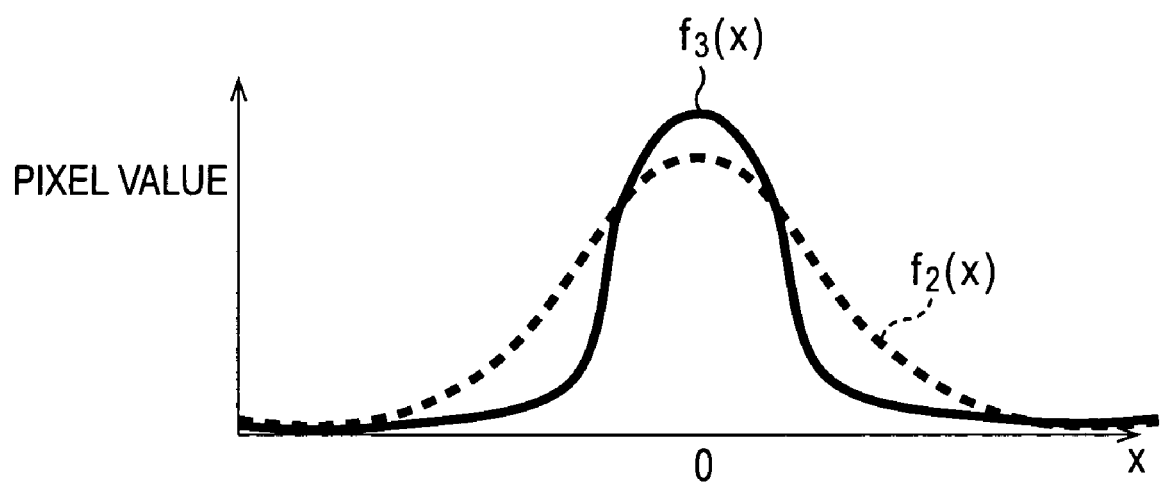

FIG. 135 is a diagram wherein an approximation function, approximating the actual world signals corresponding to the fine-line-inclusive data region shown in FIG. 127, is plotted on a graph, taking into consideration both the sensor integration properties and the spatial-direction continuity.

Figure 120:
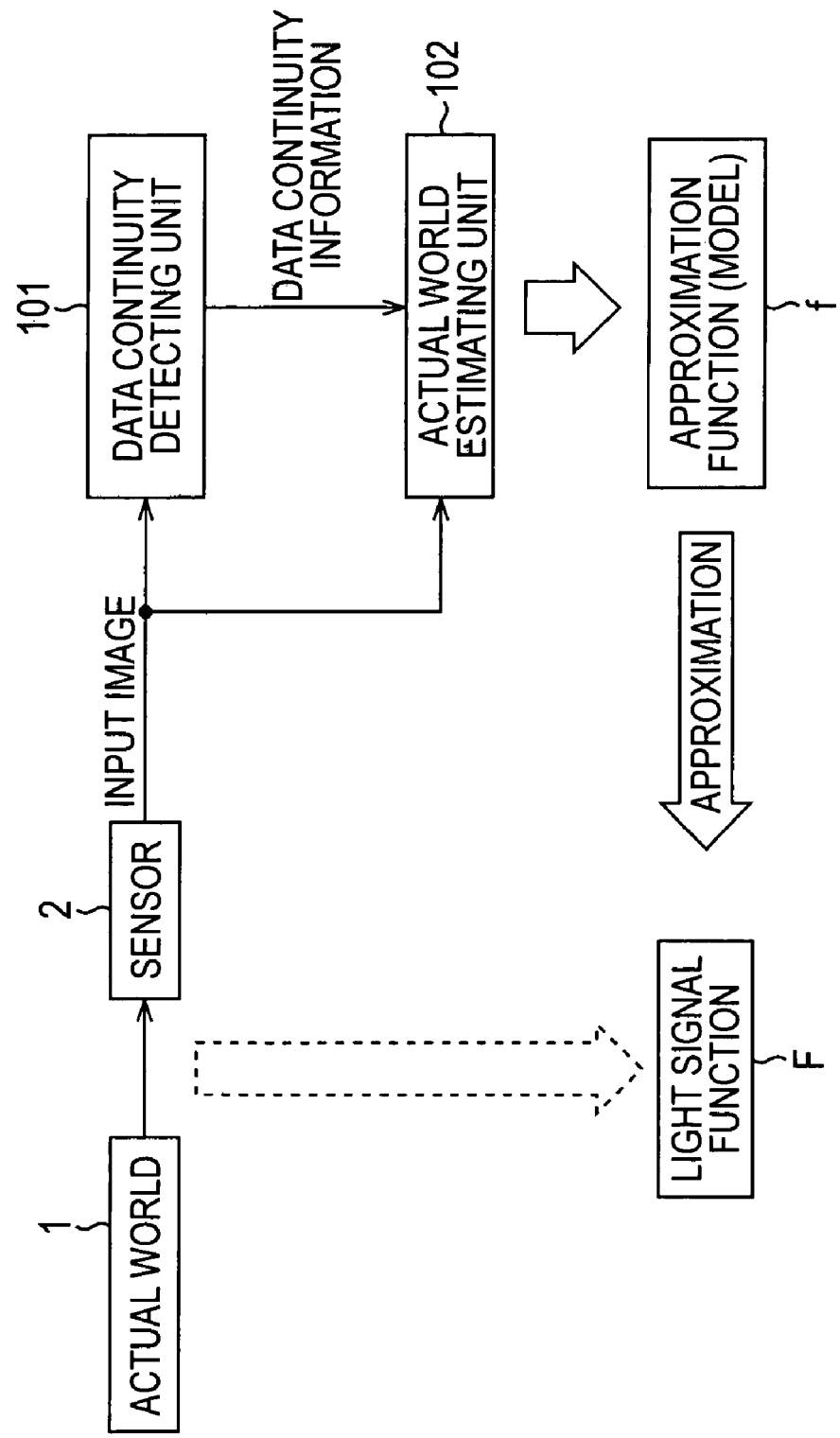
Figure 136:
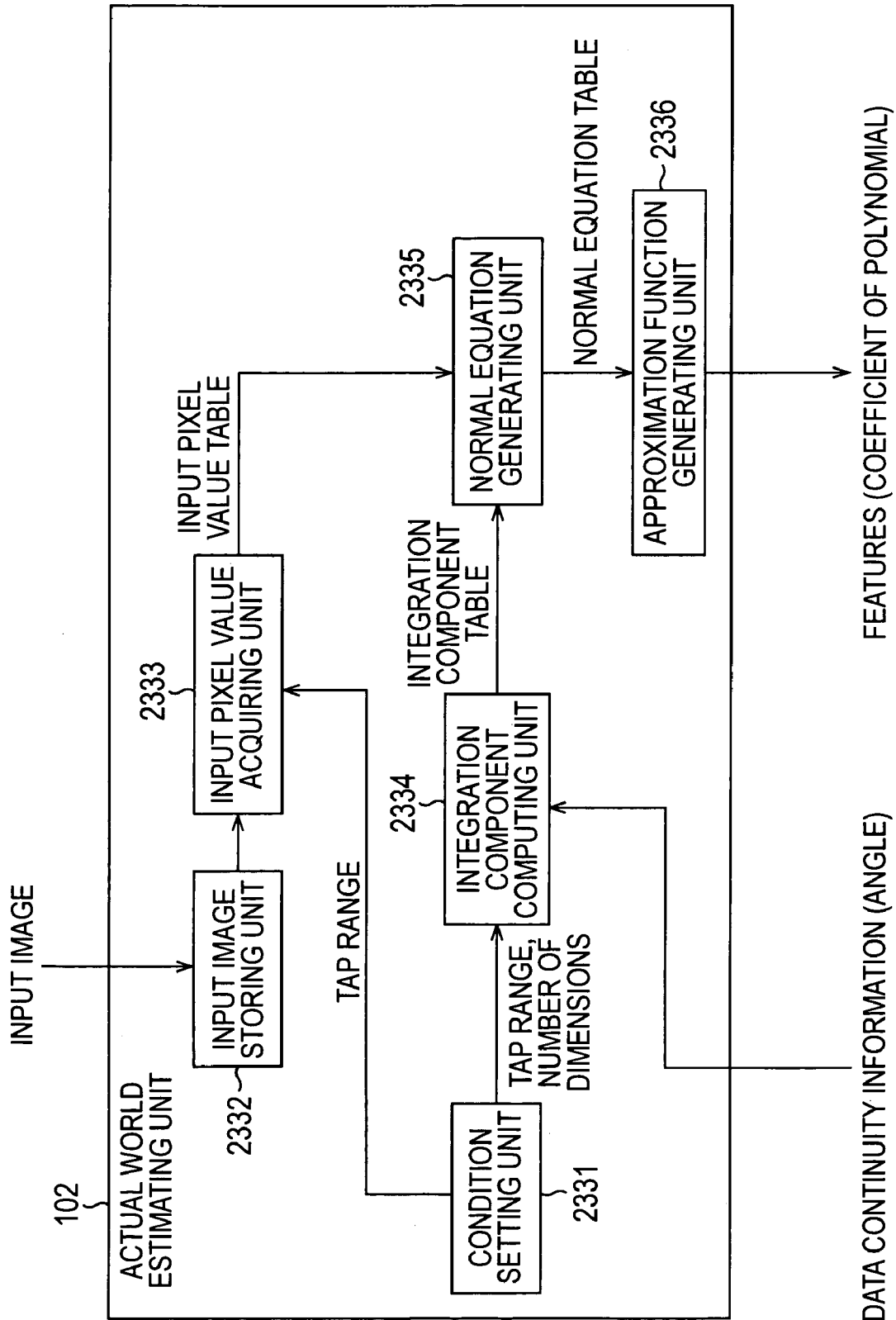

FIG. 136 is a block diagram for describing a configuration example of the actual world estimating unit using, of function approximation techniques having the principle shown in FIG. 120, primary polynomial approximation.

Figure 137:
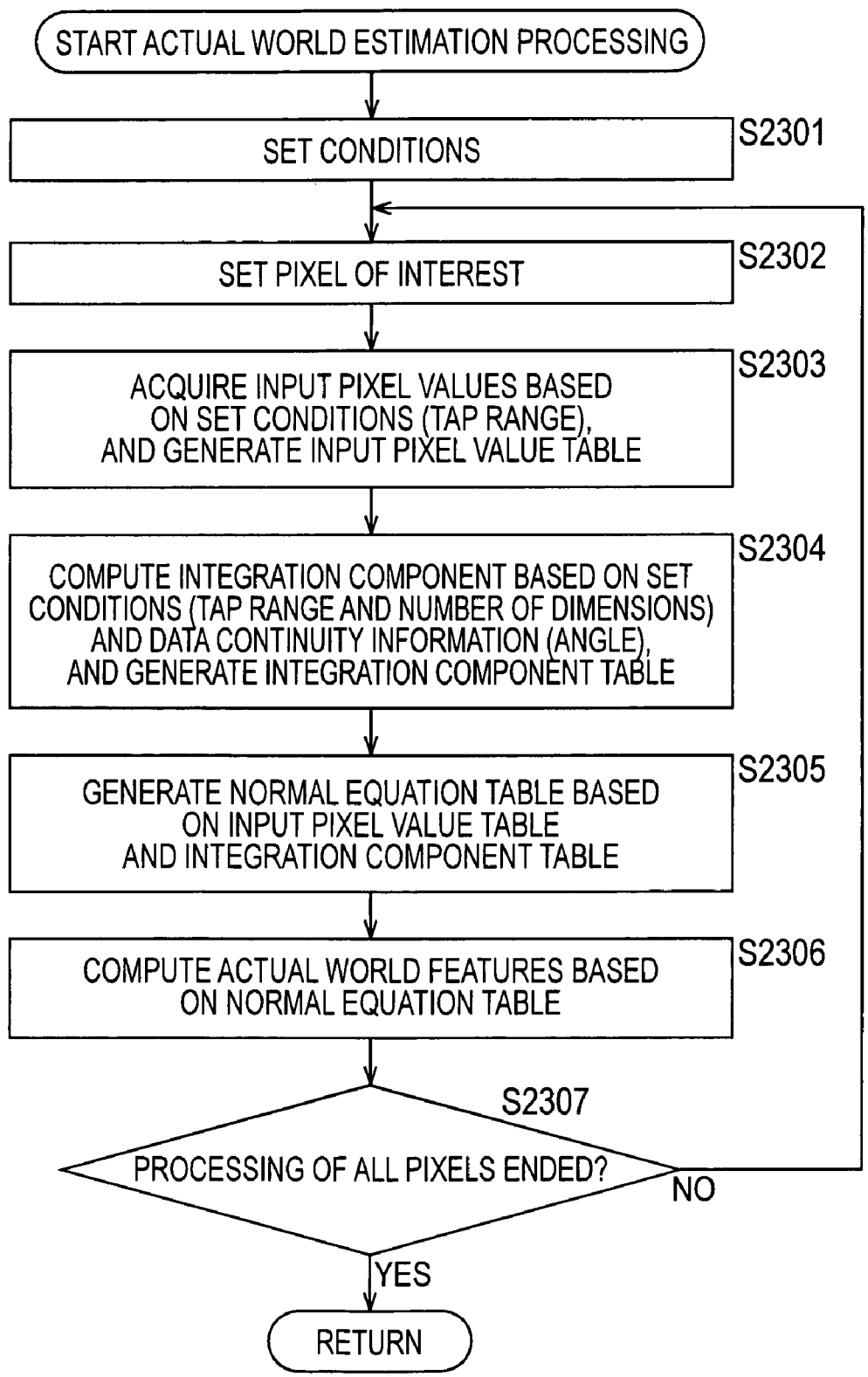

FIG. 137 is a flowchart for describing actual world estimation processing which the actual world estimating unit of the configuration shown in FIG. 136 executes.

Figure 138:
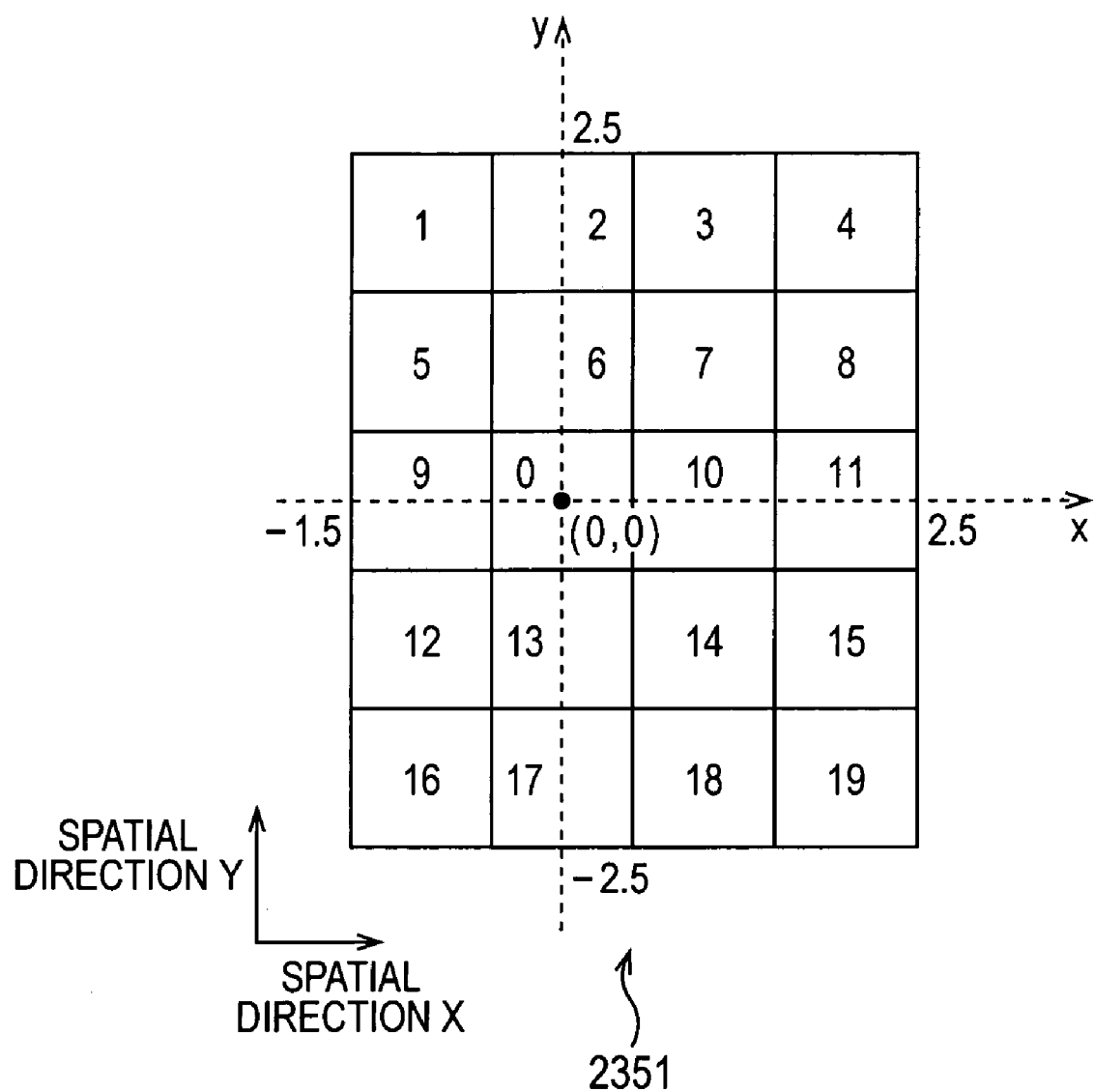

FIG. 138 is a diagram for describing a tap range.

Figure 139:
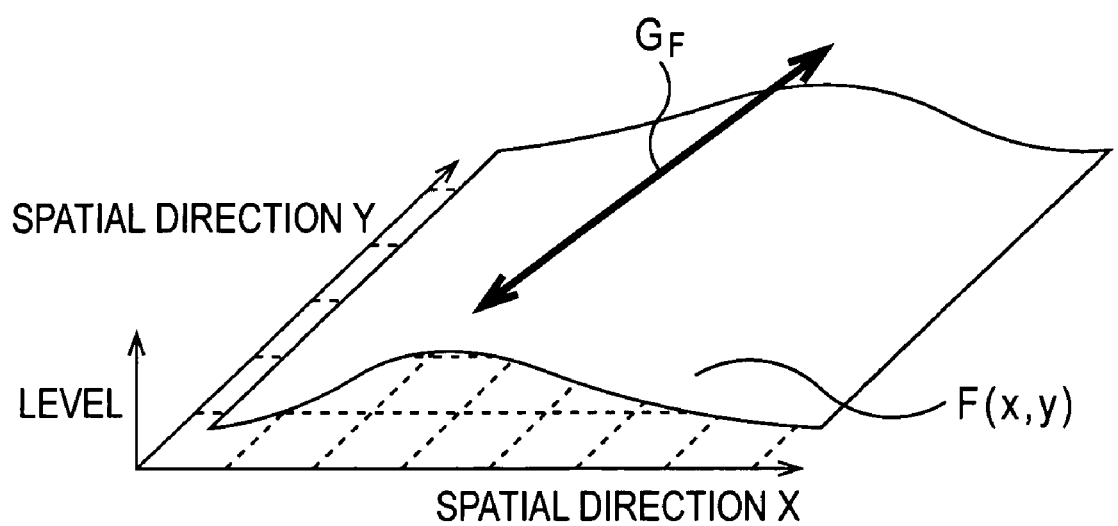

FIG. 139 is a diagram for describing actual world signals having continuity in the spatial direction.

Figure 140:
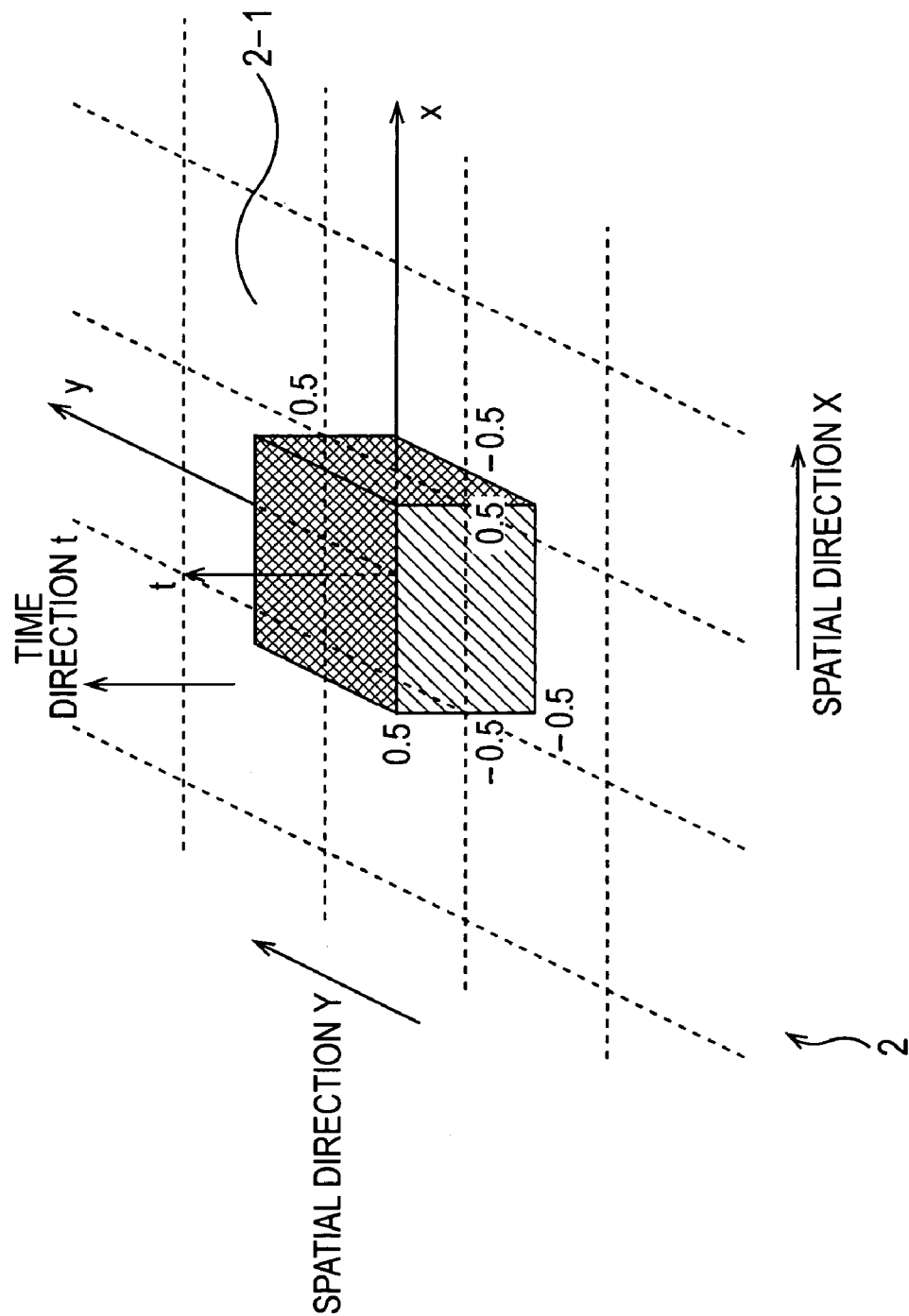

FIG. 140 is a diagram for describing integration effects in the event that the sensor is a CCD.

Figure 141:
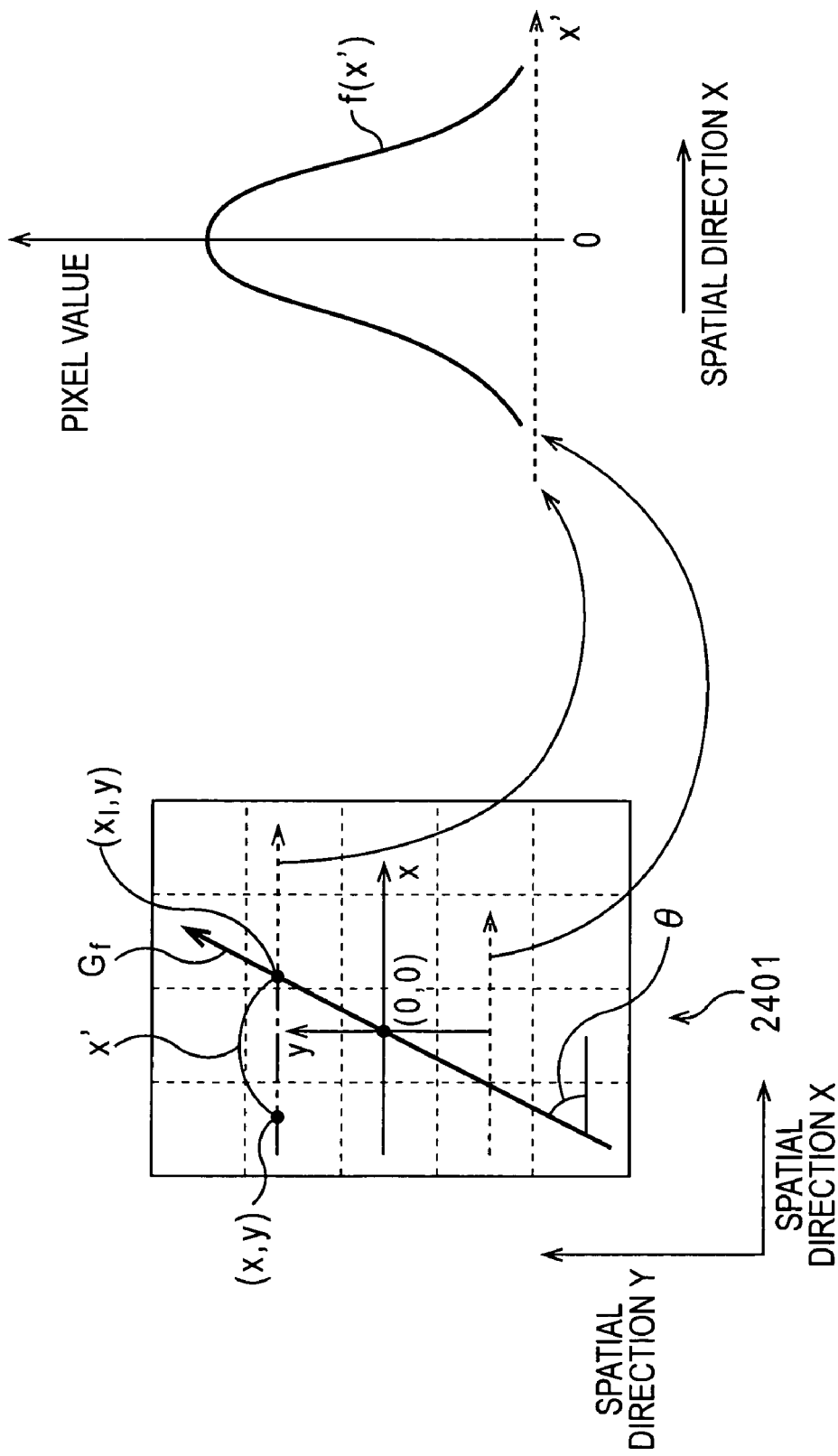

FIG. 141 is a diagram for describing distance in the cross-sectional direction.

Figure 142:
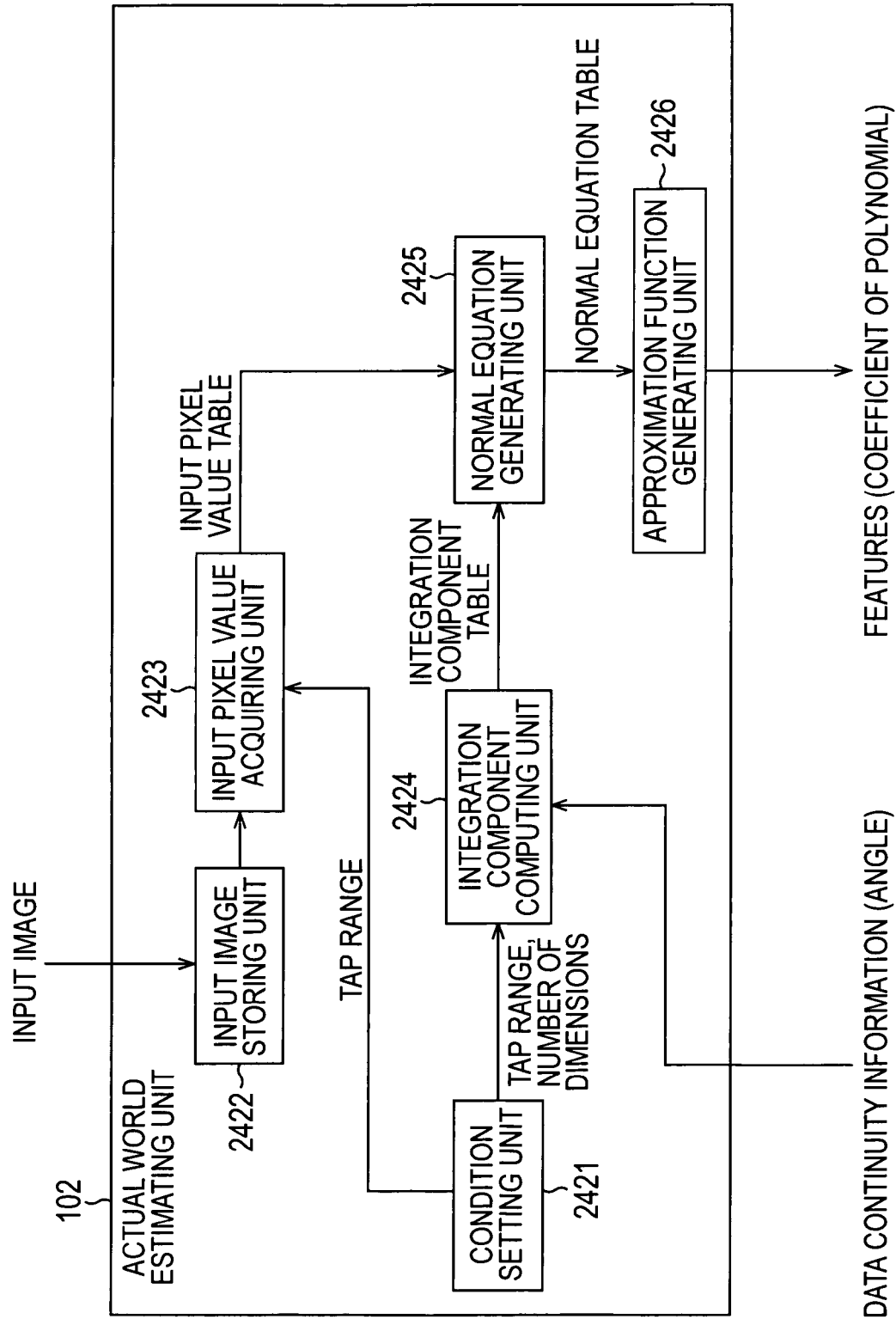

FIG. 142 is a block diagram for describing a configuration example of the actual world estimating unit using, of function approximation techniques having the principle shown in FIG. 120, quadratic polynomial approximation.

Figure 143:
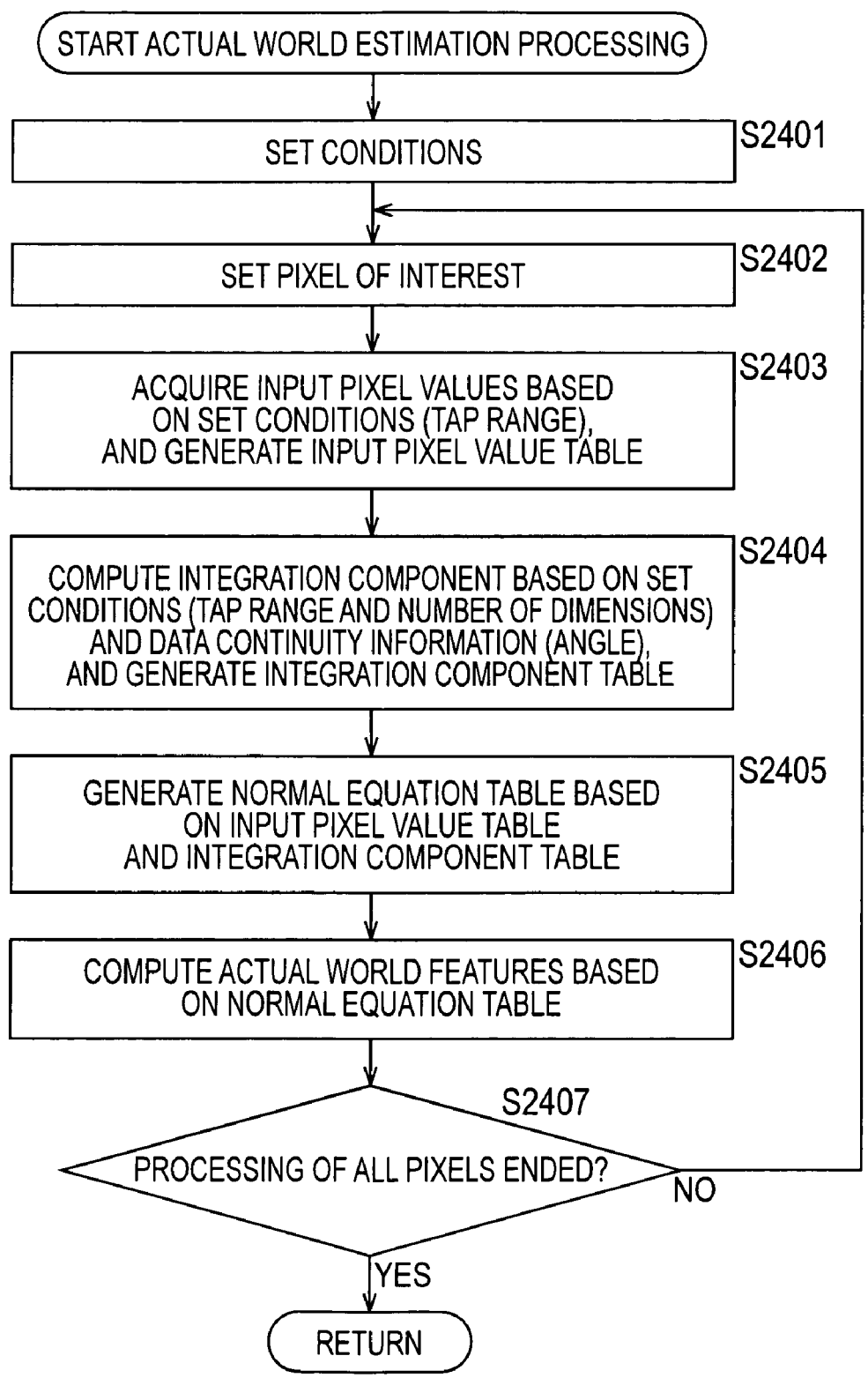

FIG. 143 is a flowchart for describing actual world estimation processing which the actual world estimating unit of the configuration shown in FIG. 142 executes.

Figure 144:
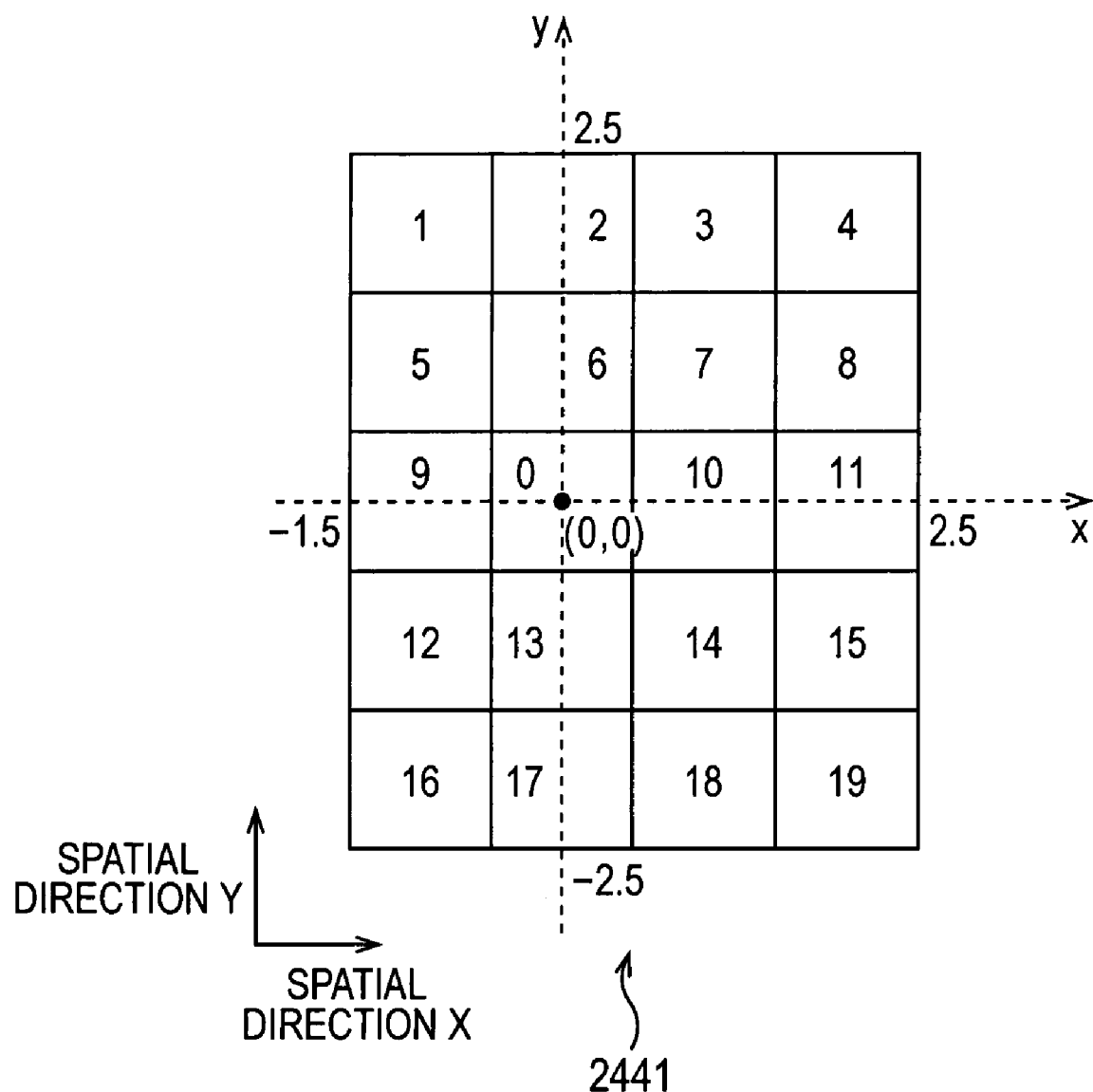

FIG. 144 is a diagram for describing a tap range.

Figure 145:
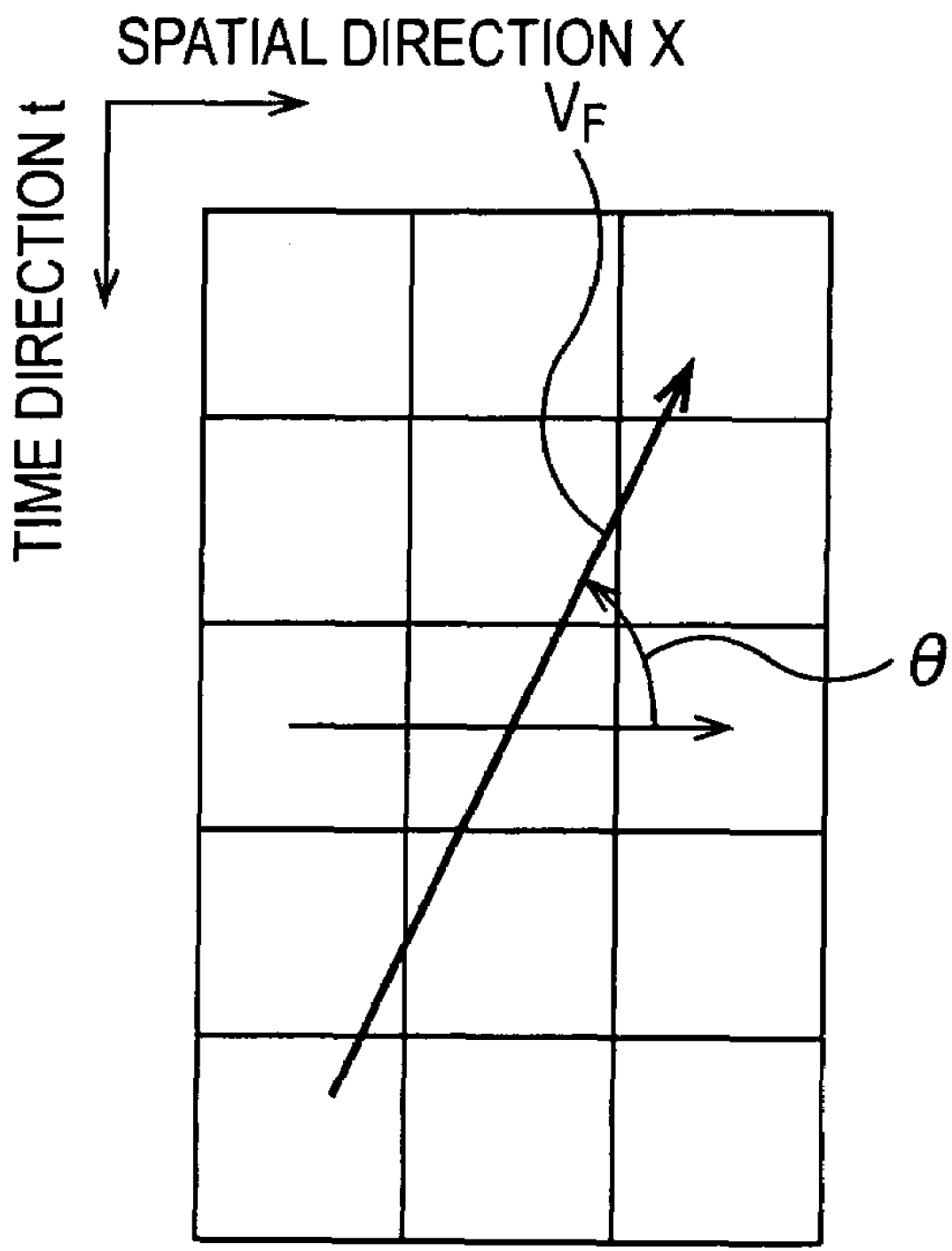

FIG. 145 is a diagram for describing direction of continuity in the time-spatial direction.

Figure 146:
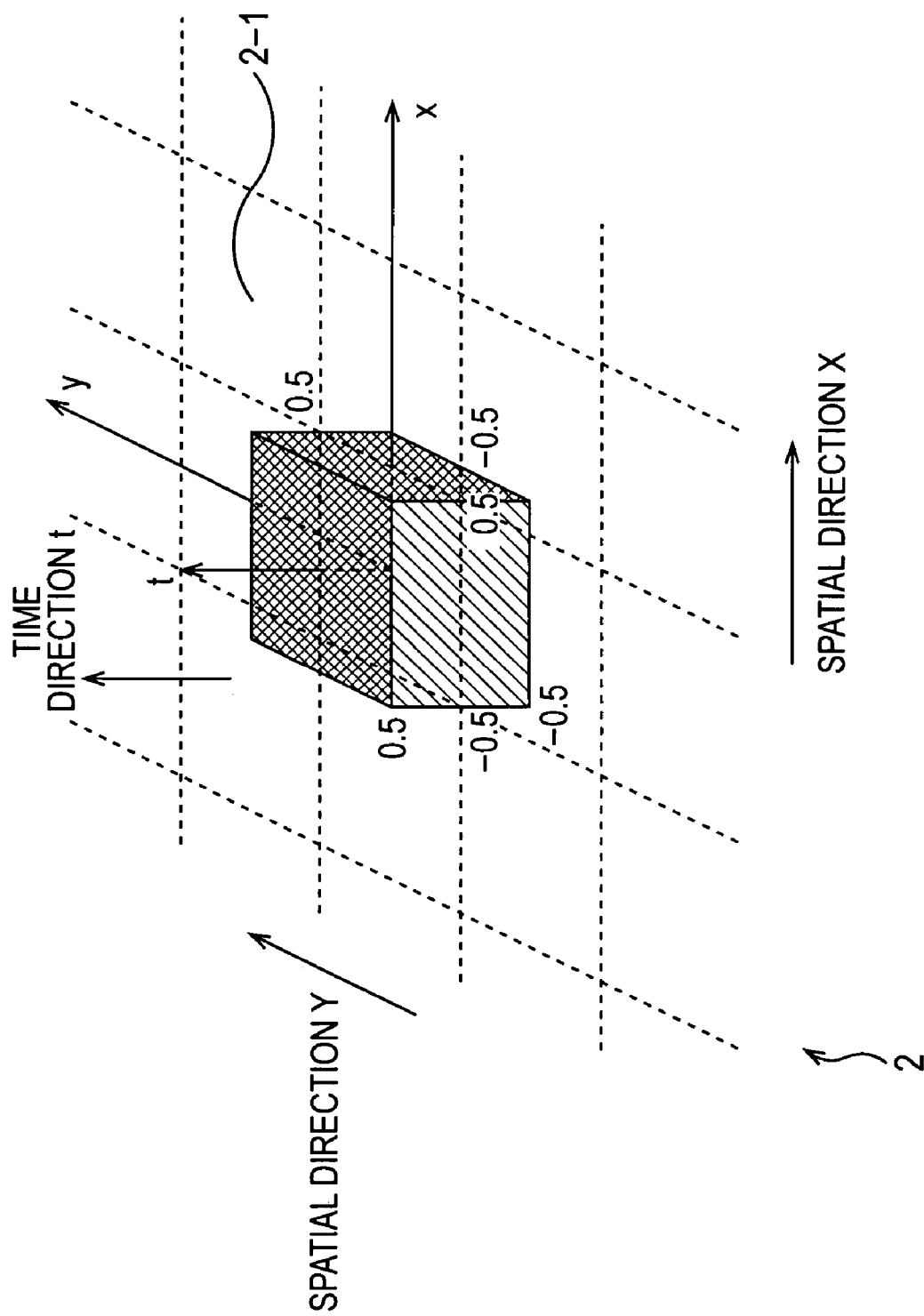

FIG. 146 is a diagram for describing integration effects in the event that the sensor is a CCD.

Figure 147:
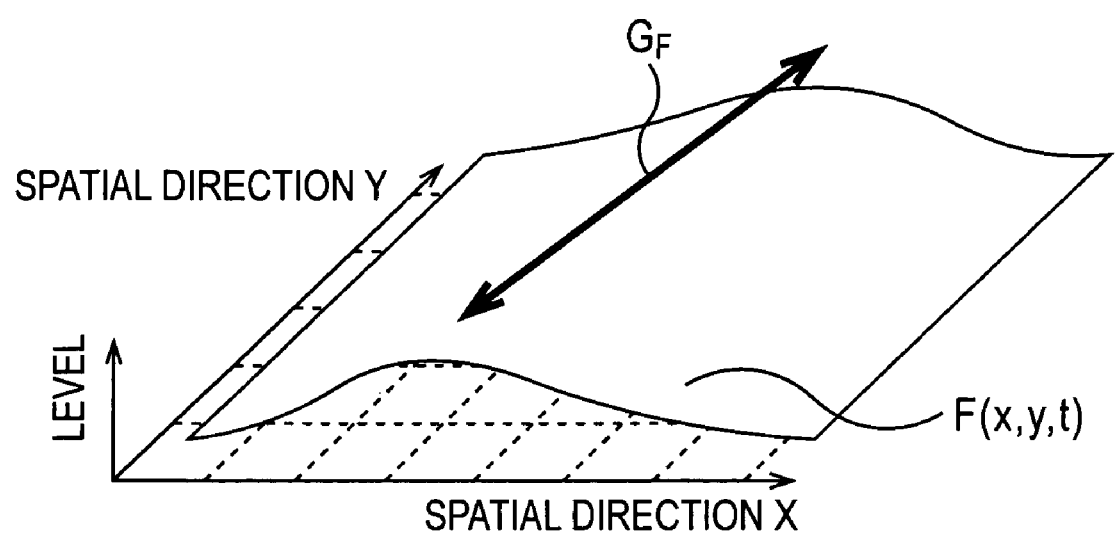

FIG. 147 is a diagram for describing actual world signals having continuity in the spatial direction.

Figure 148:
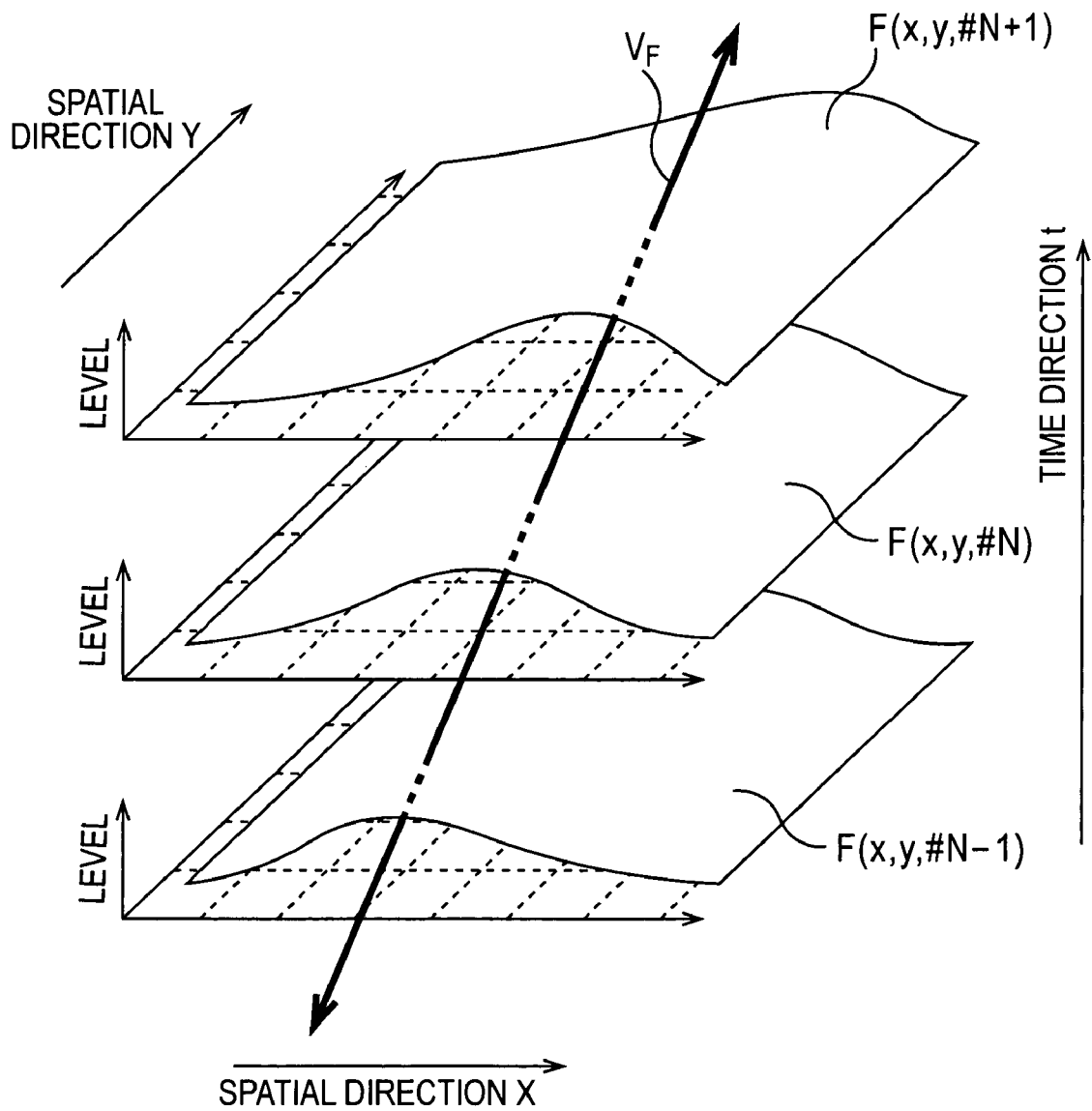

FIG. 148 is a diagram for describing actual world signals having continuity in the space-time directions.

Figure 149:
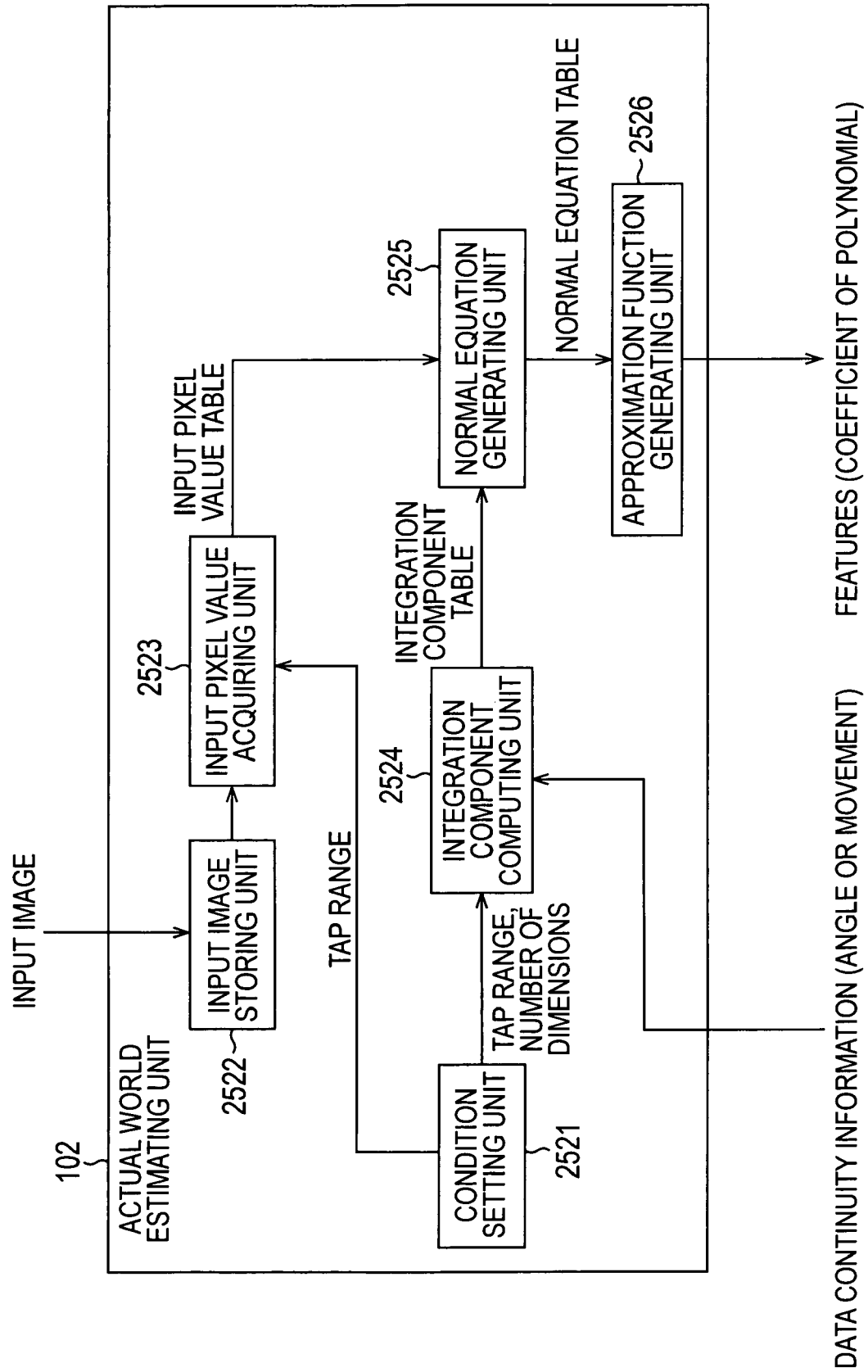

FIG. 149 is a block diagram for describing a configuration example of the actual world estimating unit using, of function approximation techniques having the principle shown in FIG. 120, cubic polynomial approximation.

Figure 150:
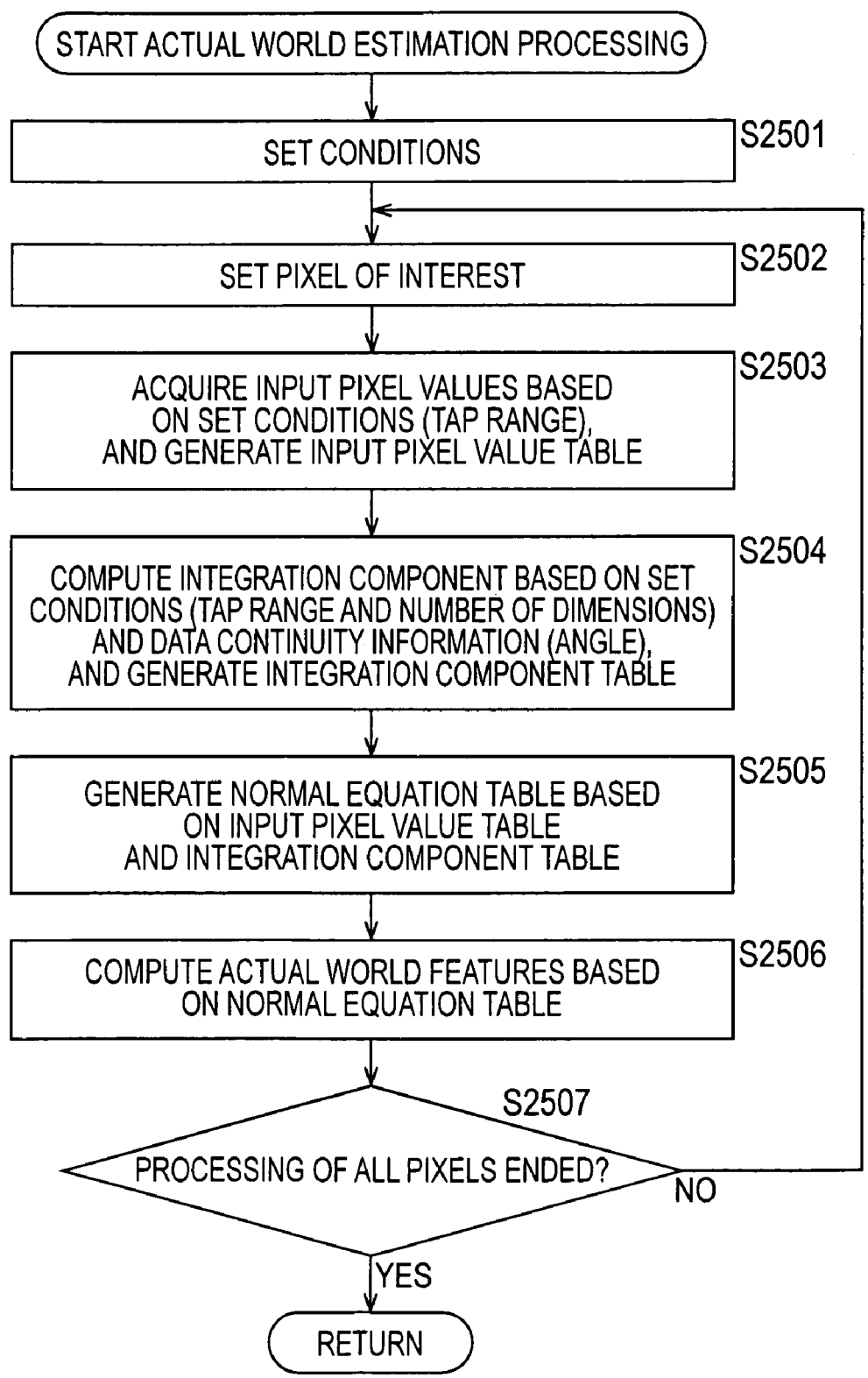

FIG. 150 is a flowchart for describing actual world estimation processing which the actual world estimating unit of the configuration shown in FIG. 149 executes.

Figure 3:
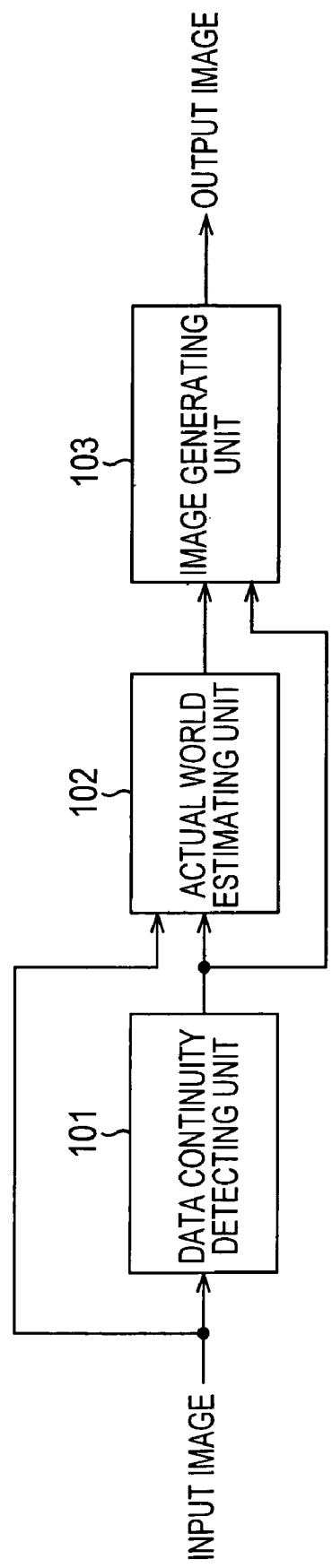
FIG. 3 is a block diagram illustrating a signal processing device.
Figure 151:
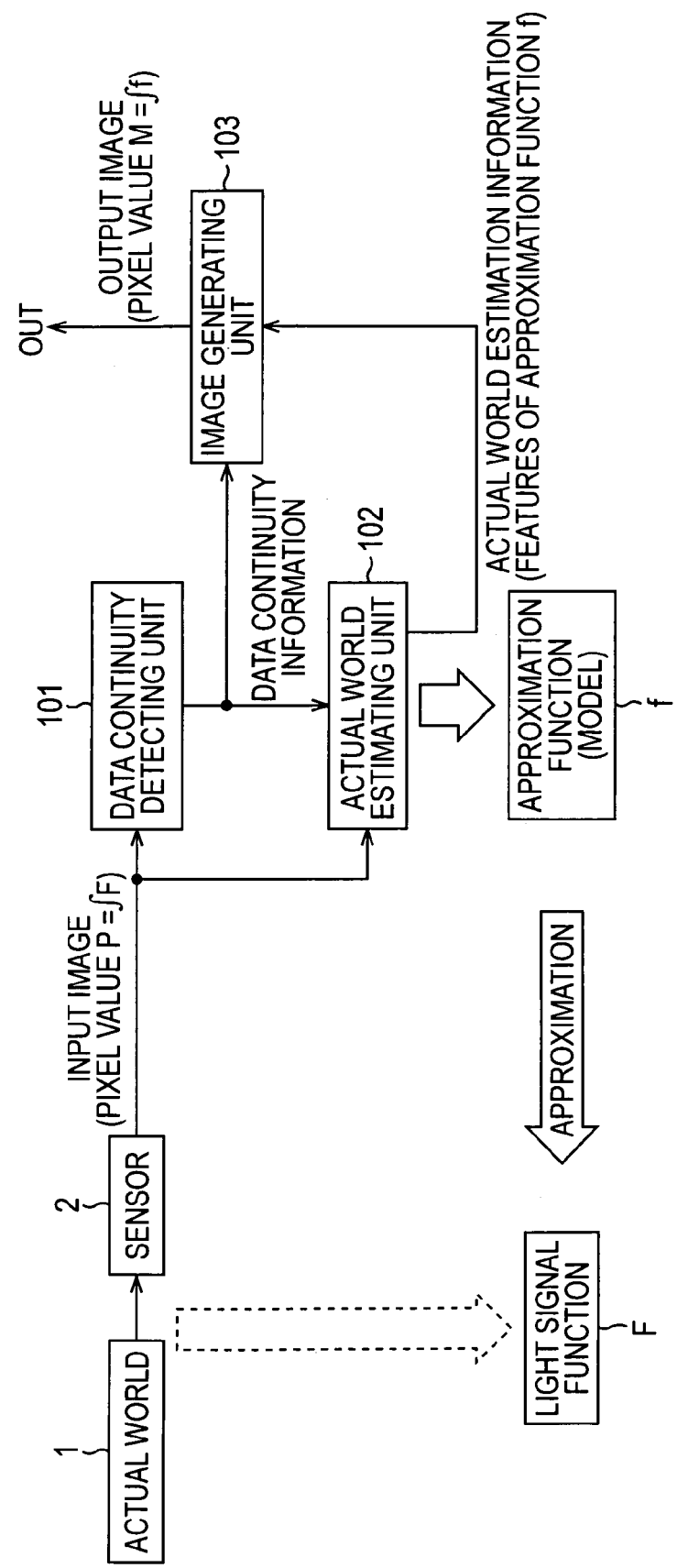

FIG. 151 is a diagram for describing the principle of re-integration, which is an example of an embodiment of the image generating unit shown in FIG. 3.

Figure 152:
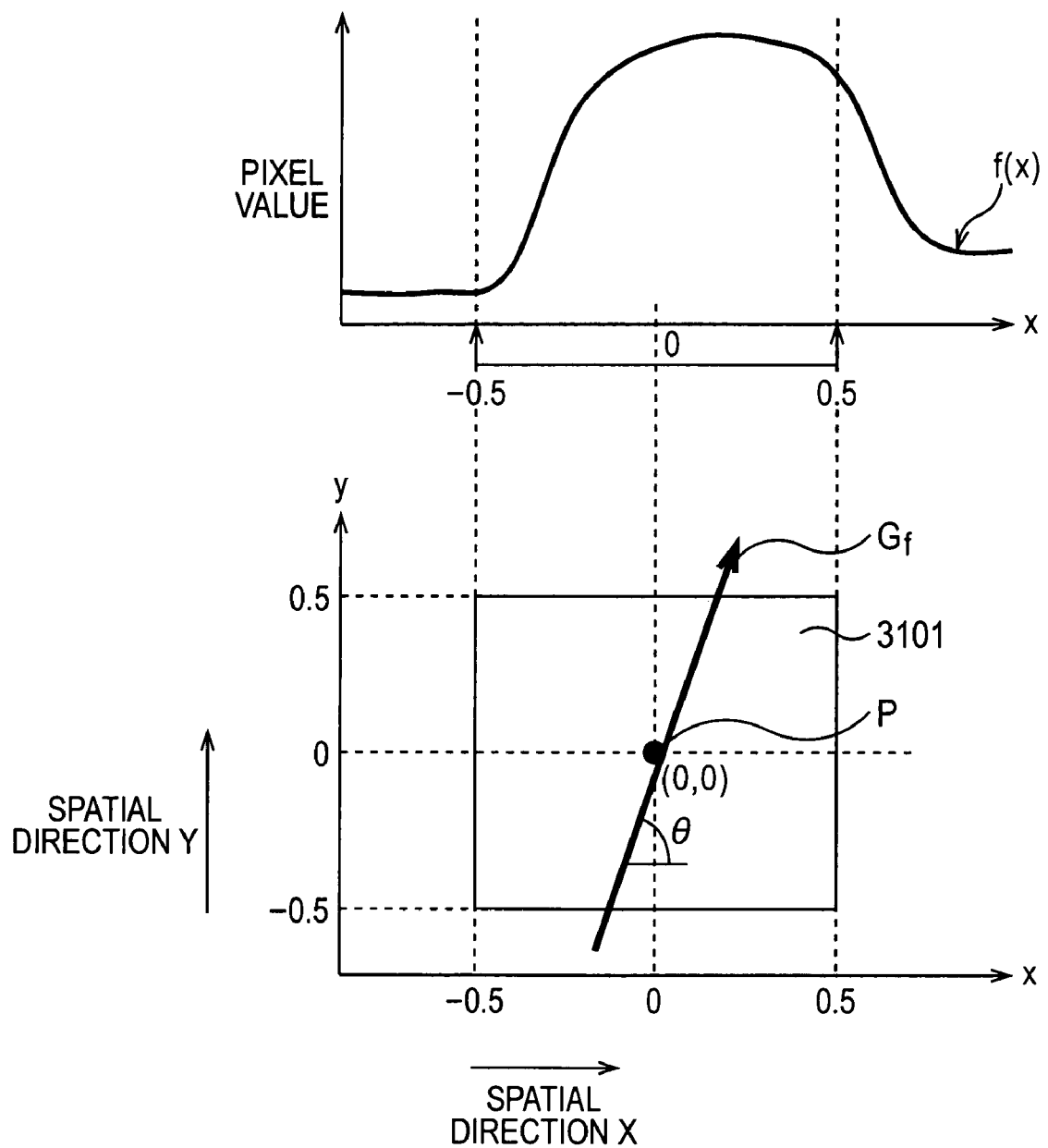

FIG. 152 is a diagram for describing an example of input pixel and an approximation function for approximation of an actual world signal corresponding to the input pixel.

Figure 153:
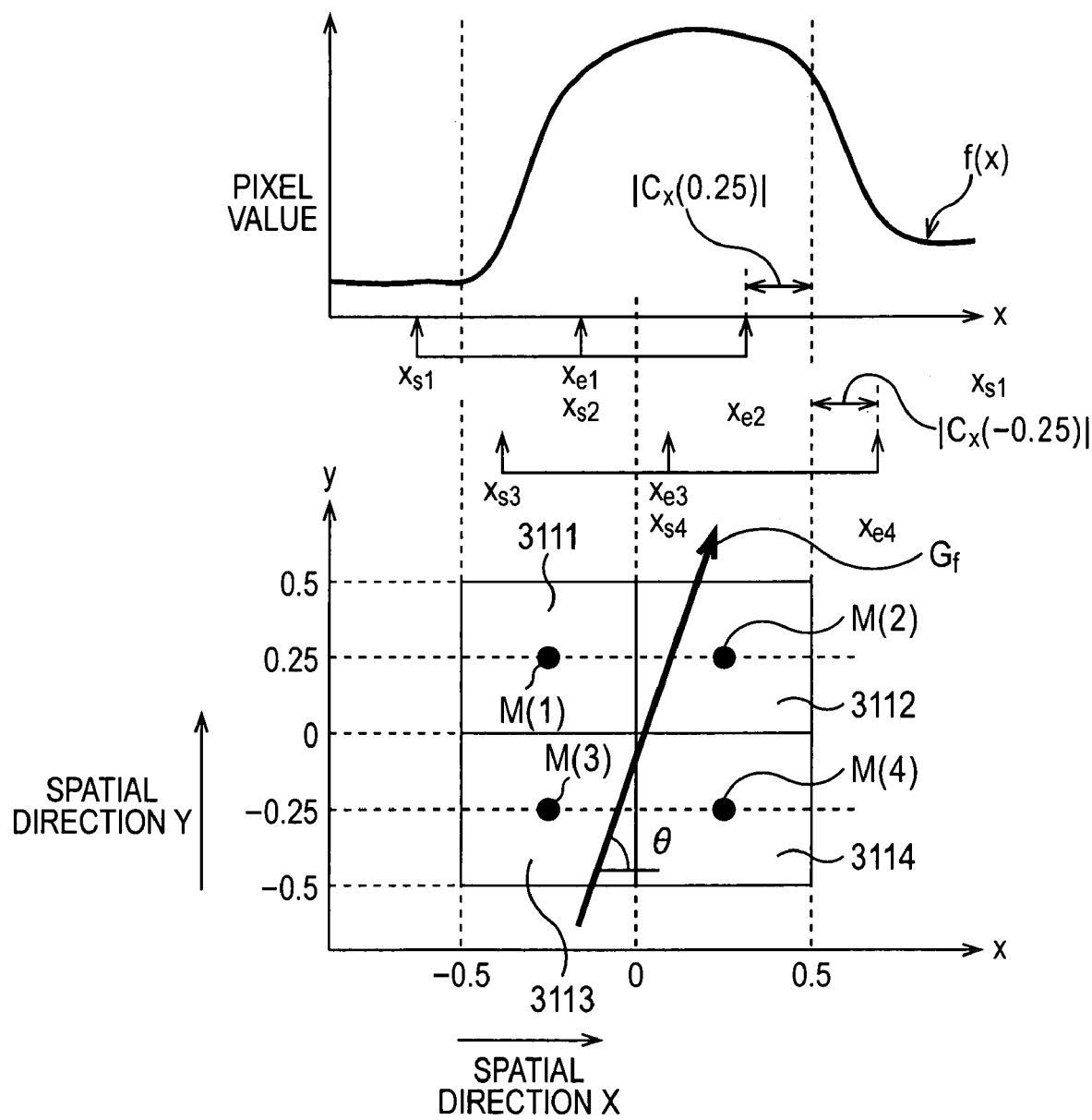

FIG. 153 is a diagram for describing an example of creating four high-resolution pixels in the one input pixel shown in FIG. 152, from the approximation function shown in FIG. 152.

Figure 154:
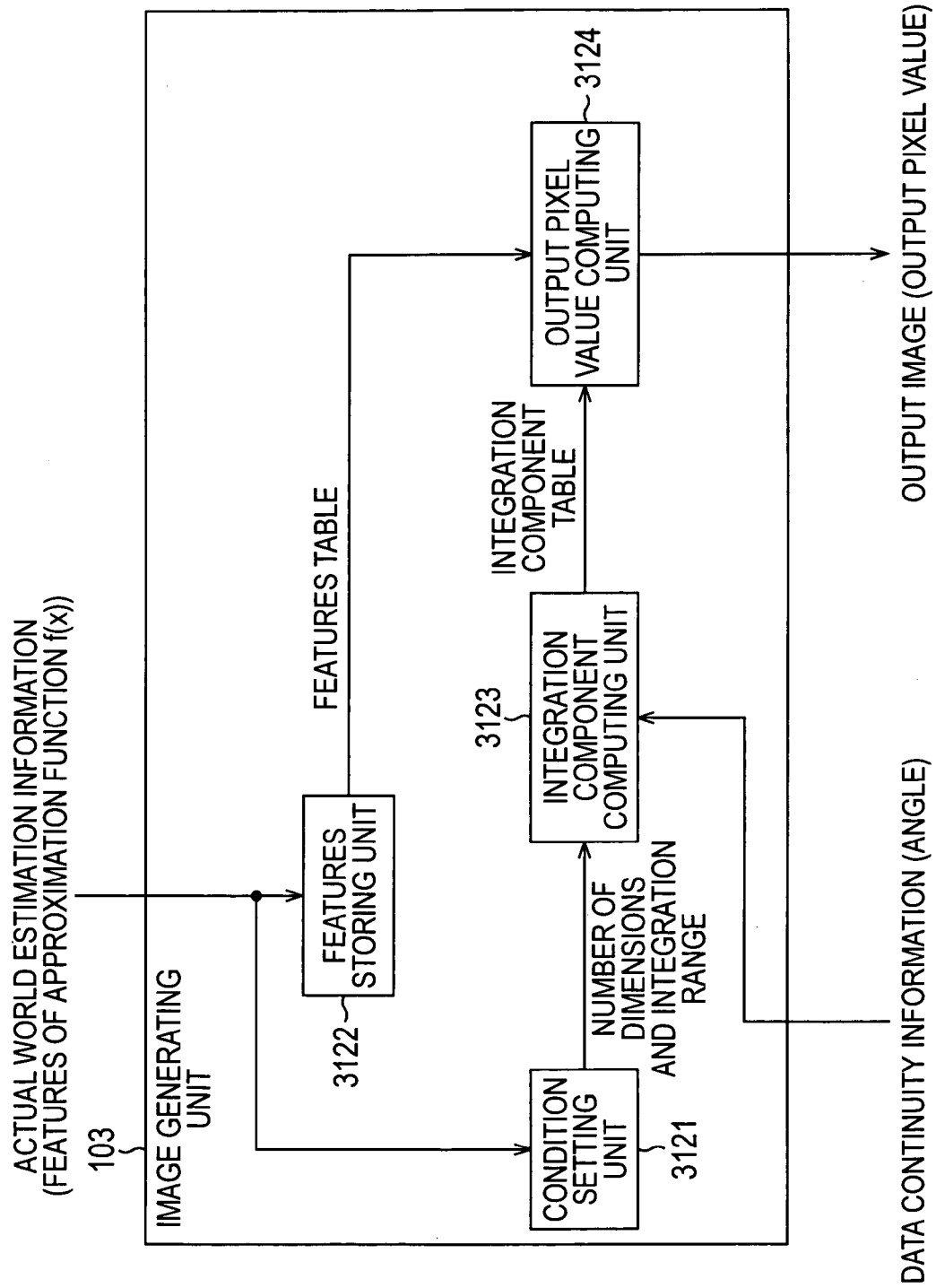

FIG. 154 is a block diagram for describing a configuration example of an image generating unit using, of re-integration techniques having the principle shown in FIG. 151, one-dimensional re-integration.

Figure 155:
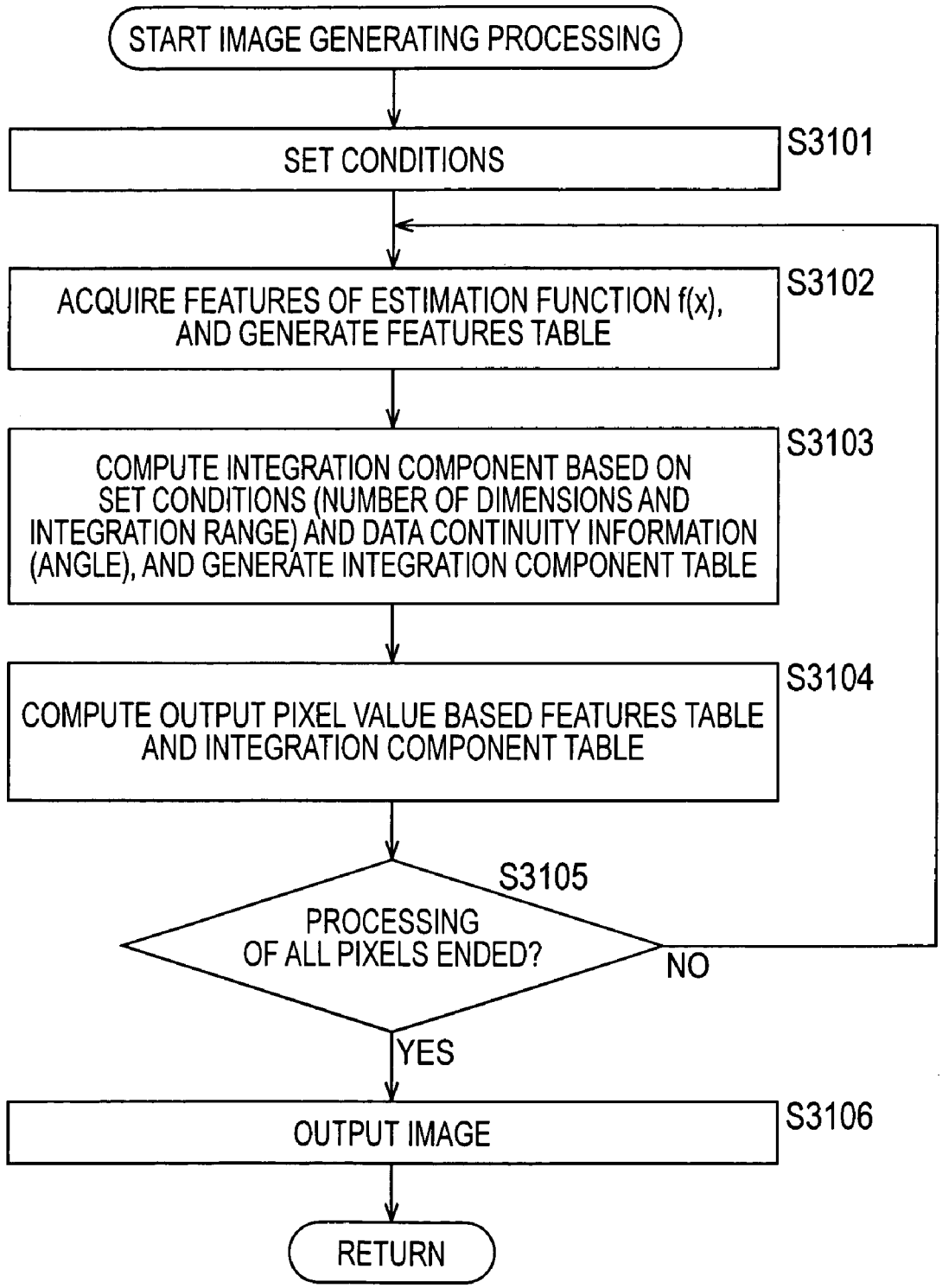

FIG. 155 is a flowchart for describing the image generating processing which the image generating unit of the configuration shown in FIG. 154 executes.

Figure 156:

FIG. 156 is a diagram illustrating an example of the original image of the input image.

Figure 157:
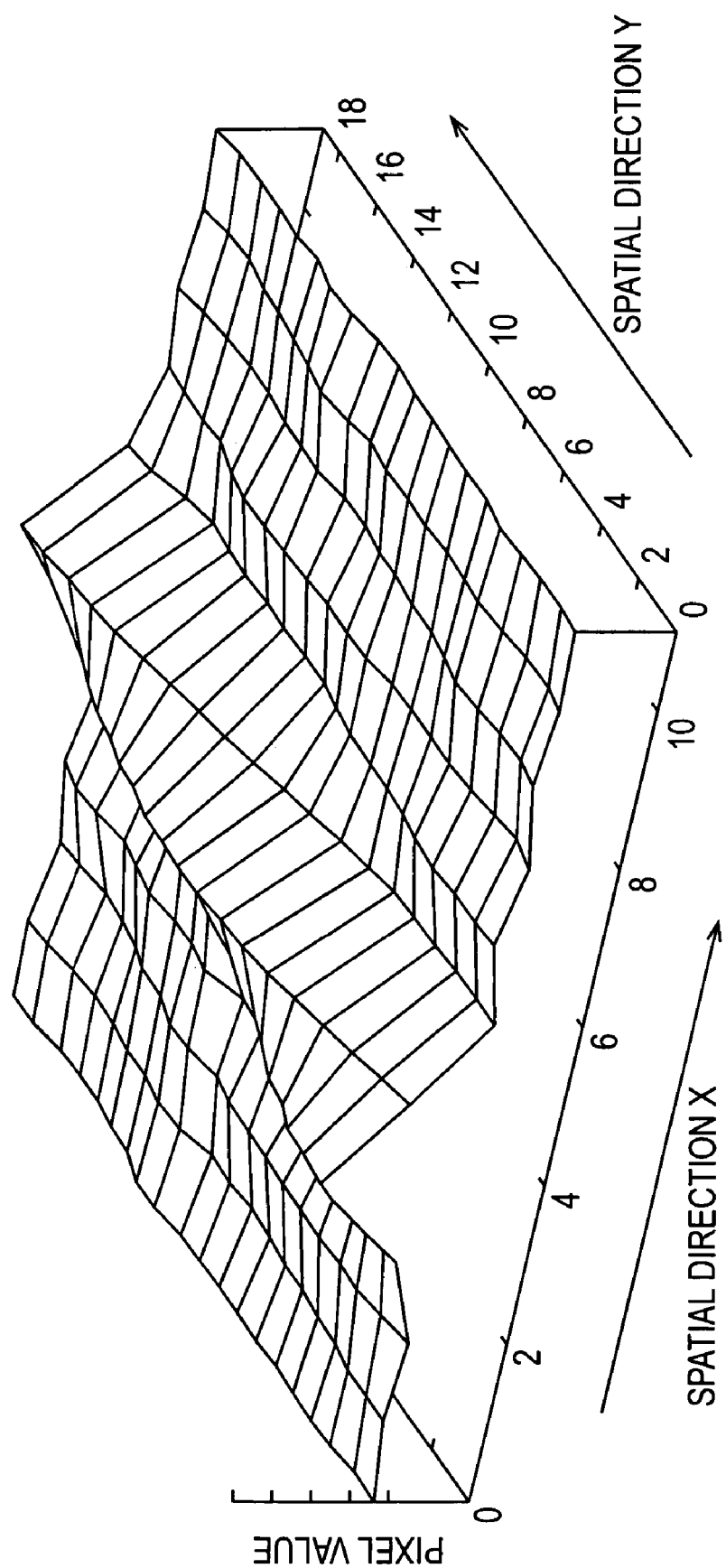

FIG. 157 is a diagram illustrating an example of image data corresponding to the image shown in FIG. 156.

Figure 158:
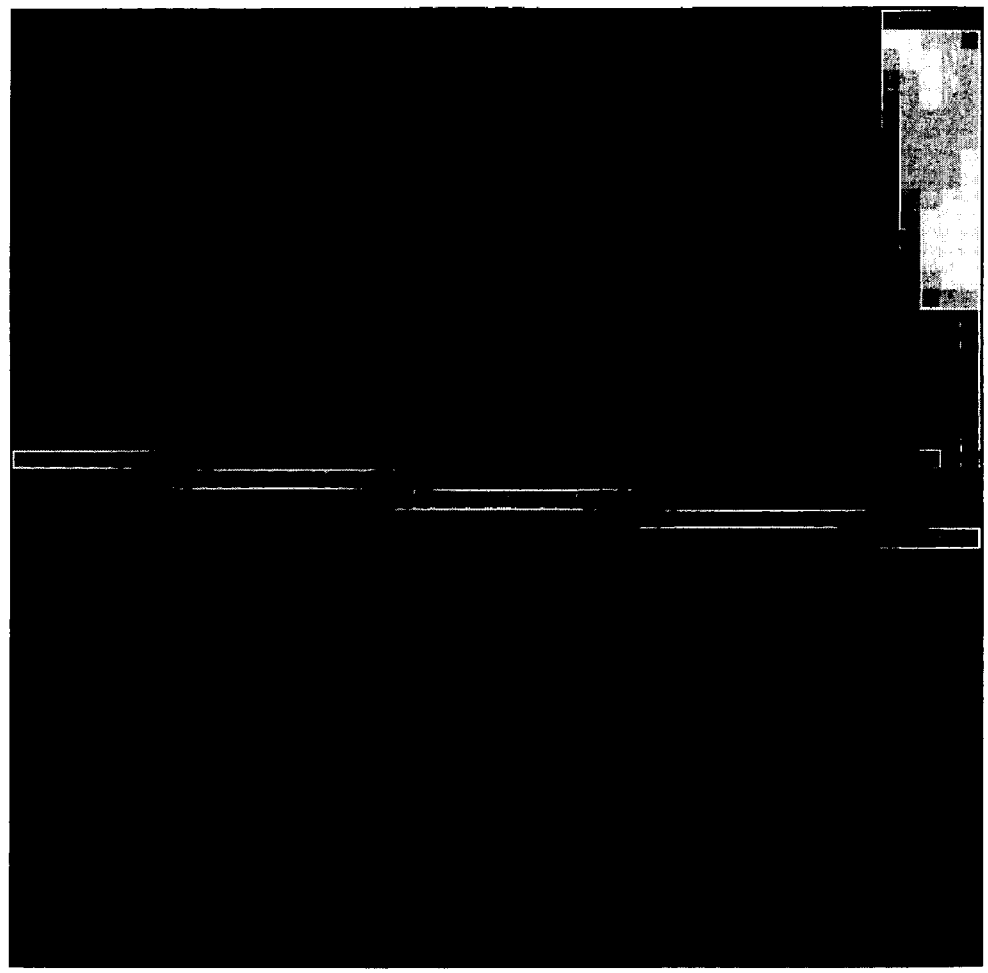

FIG. 158 is a diagram illustrating an example of an input image.

Figure 159:
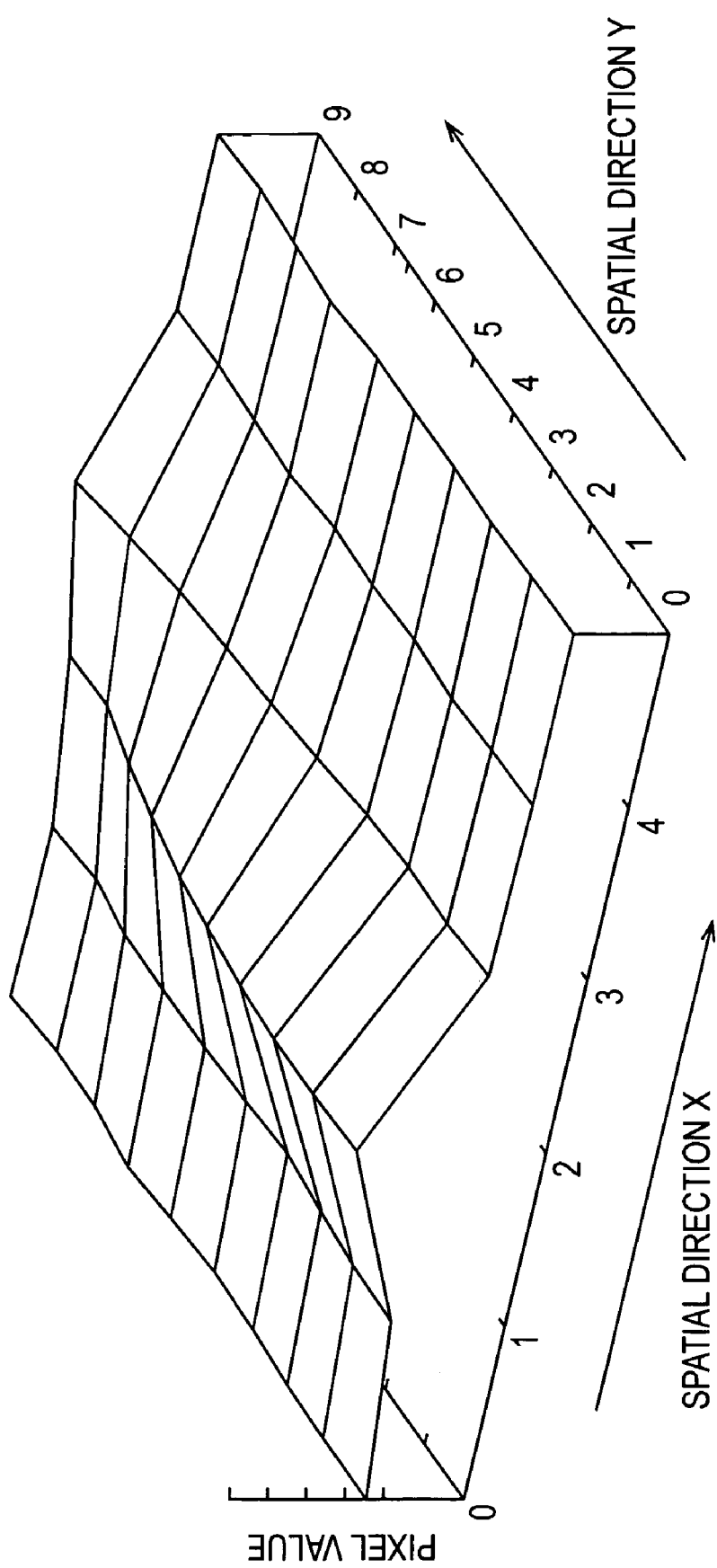

FIG. 159 is a diagram represent an example of image data corresponding to the image shown in FIG. 158.

Figure 160:
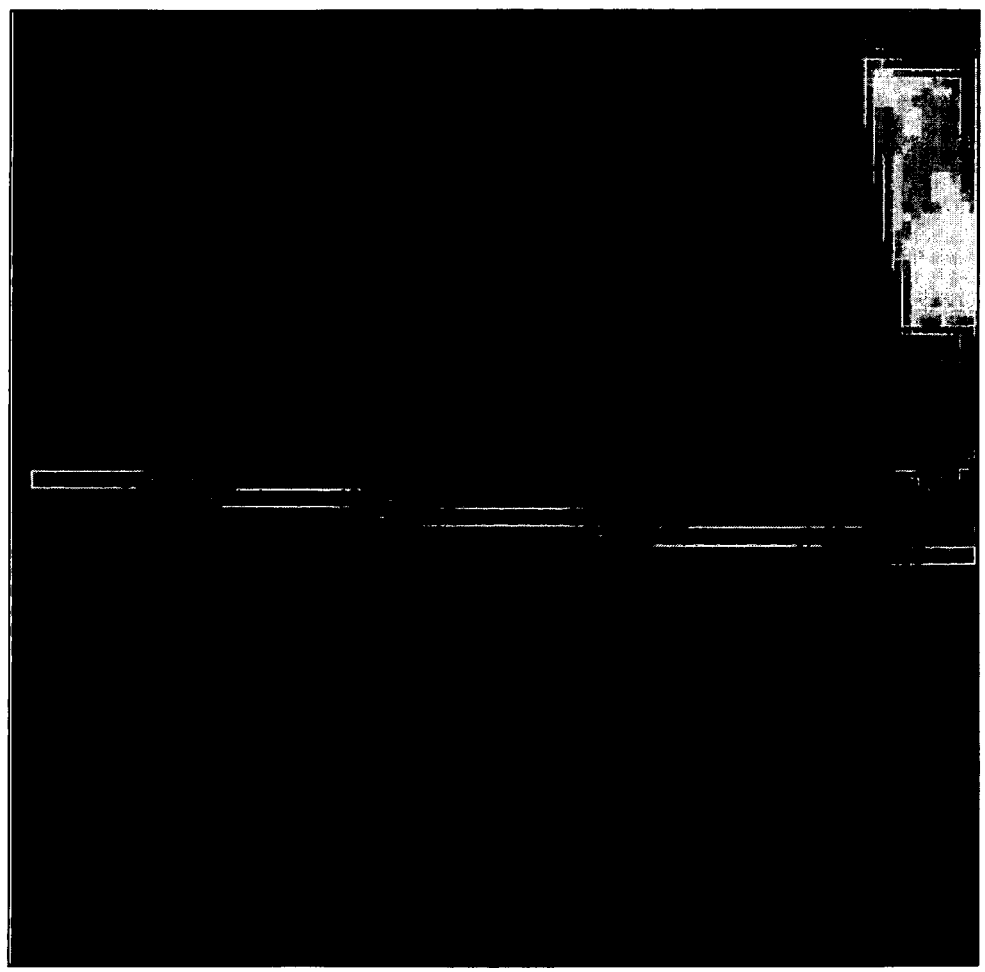

FIG. 160 is a diagram illustrating an example of an image obtained by subjecting an input image to conventional class classification adaptation processing.

Figure 161:
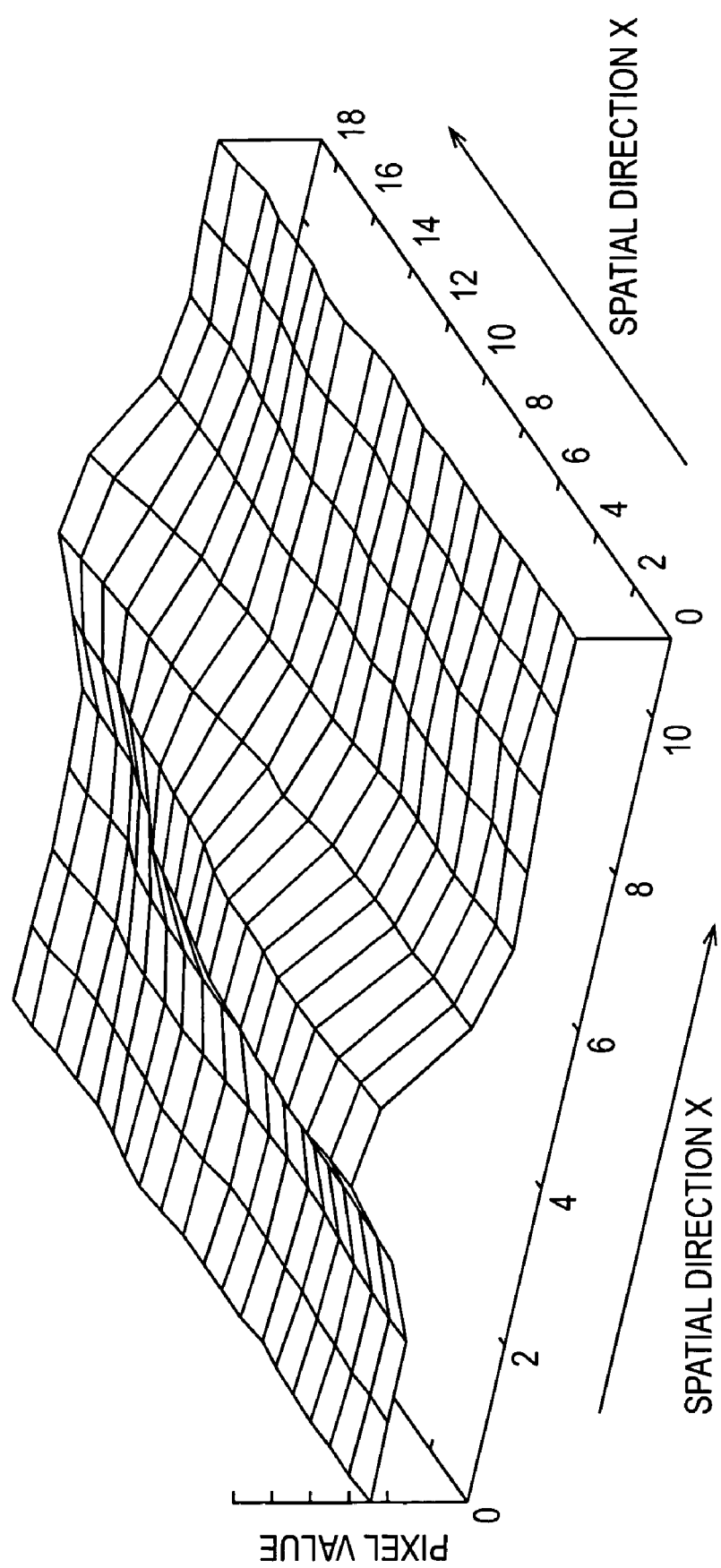

FIG. 161 is a diagram representing an example of image data corresponding to the image shown in FIG. 160.

Figure 162:
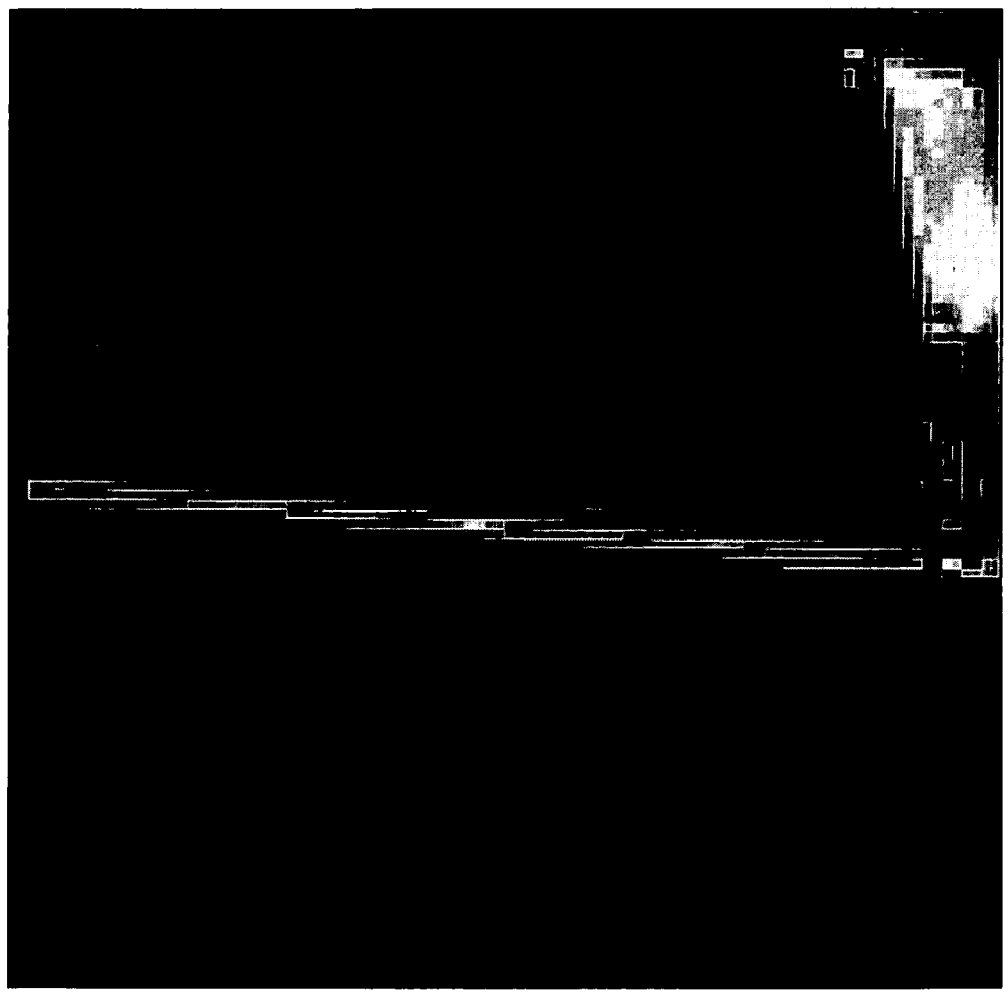

FIG. 162 is a diagram illustrating an example of an image obtained by subjecting an input image to the one-dimensional re-integration technique according to the present invention.

Figure 163:
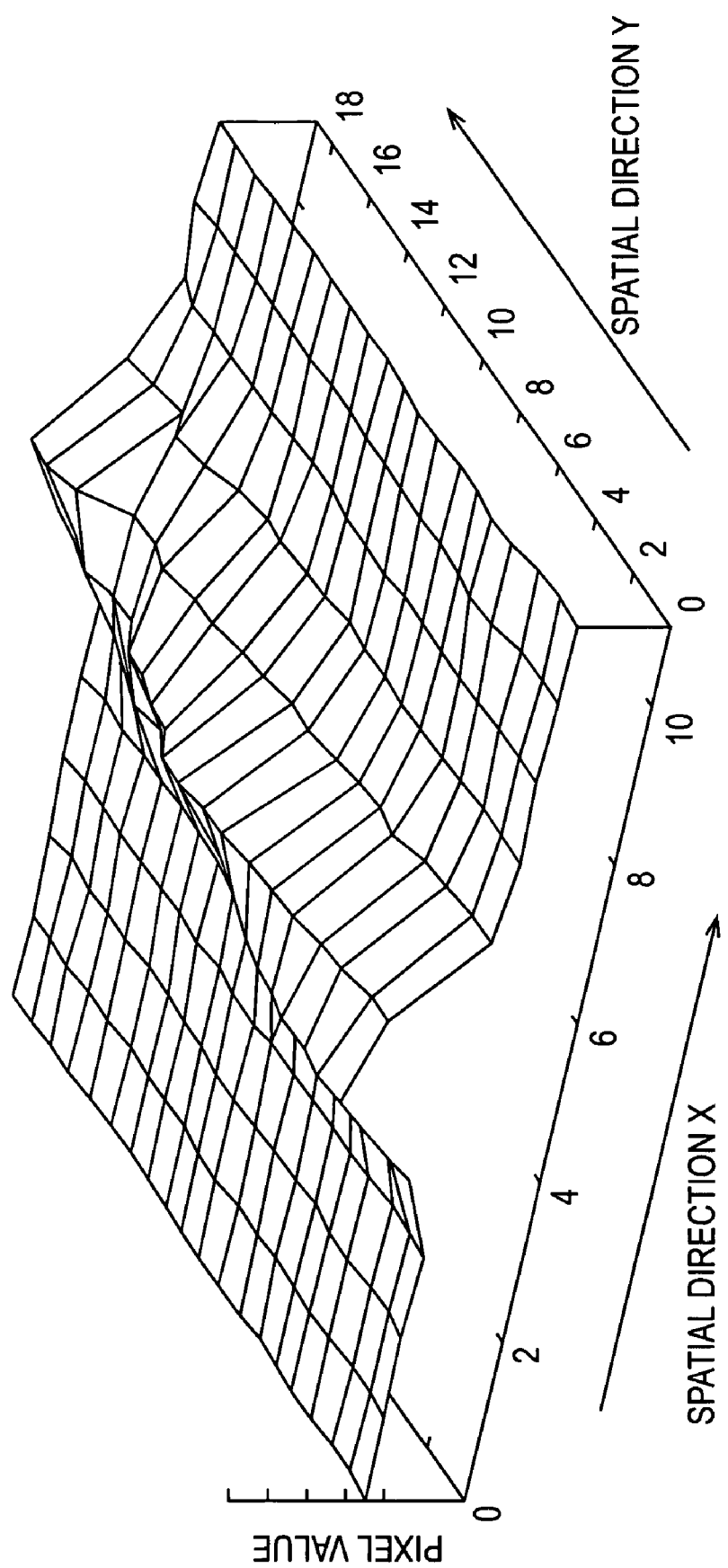

FIG. 163 is a diagram illustrating an example of image data corresponding to the image shown in FIG. 162.

Figure 164:
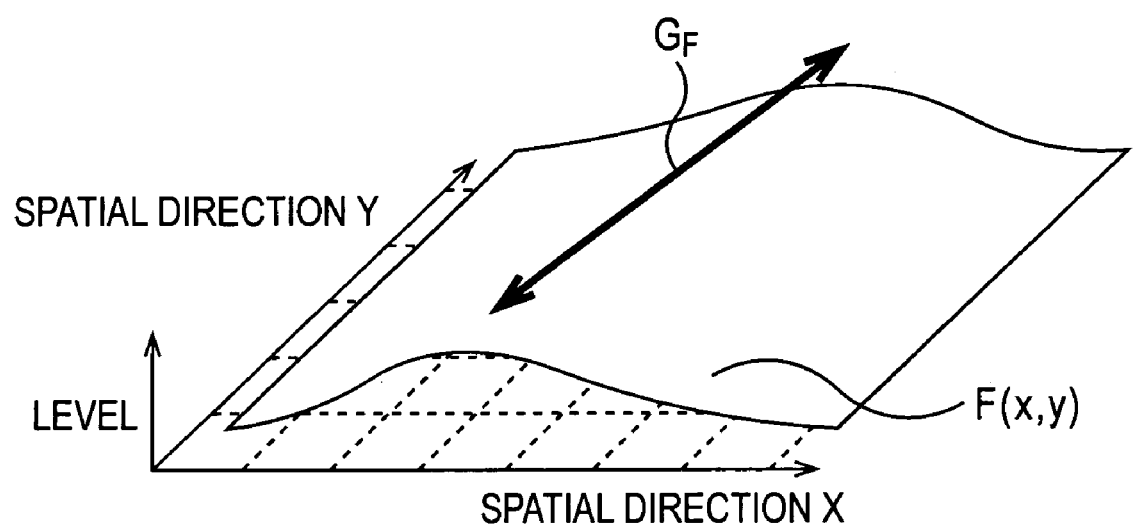

FIG. 164 is a diagram for describing actual-world signals having continuity in the spatial direction.

Figure 165:
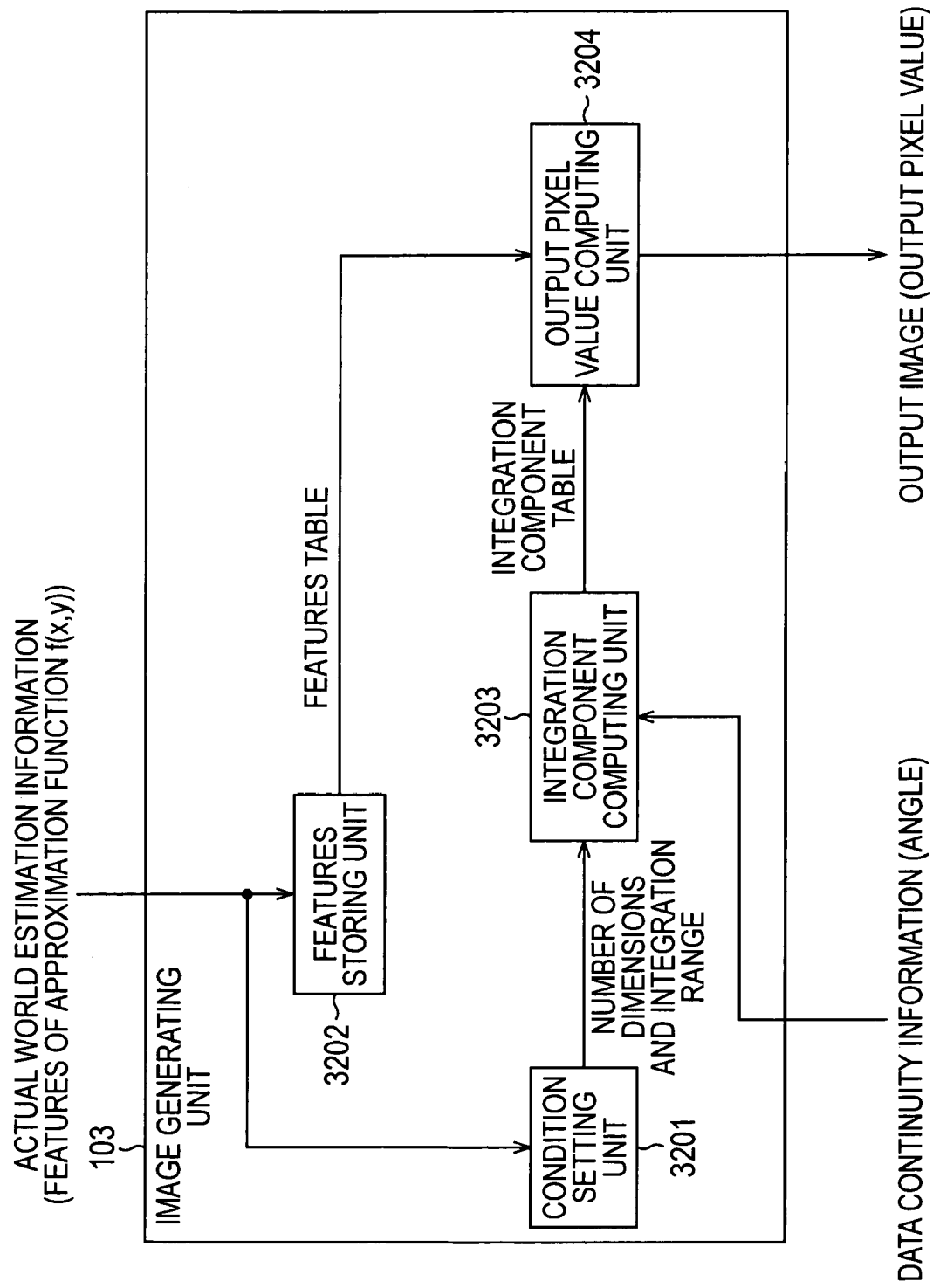

FIG. 165 is a block diagram for describing a configuration example of an image generating unit which uses, of the re-integration techniques having the principle shown in FIG. 151, a two-dimensional re-integration technique.

Figure 166:
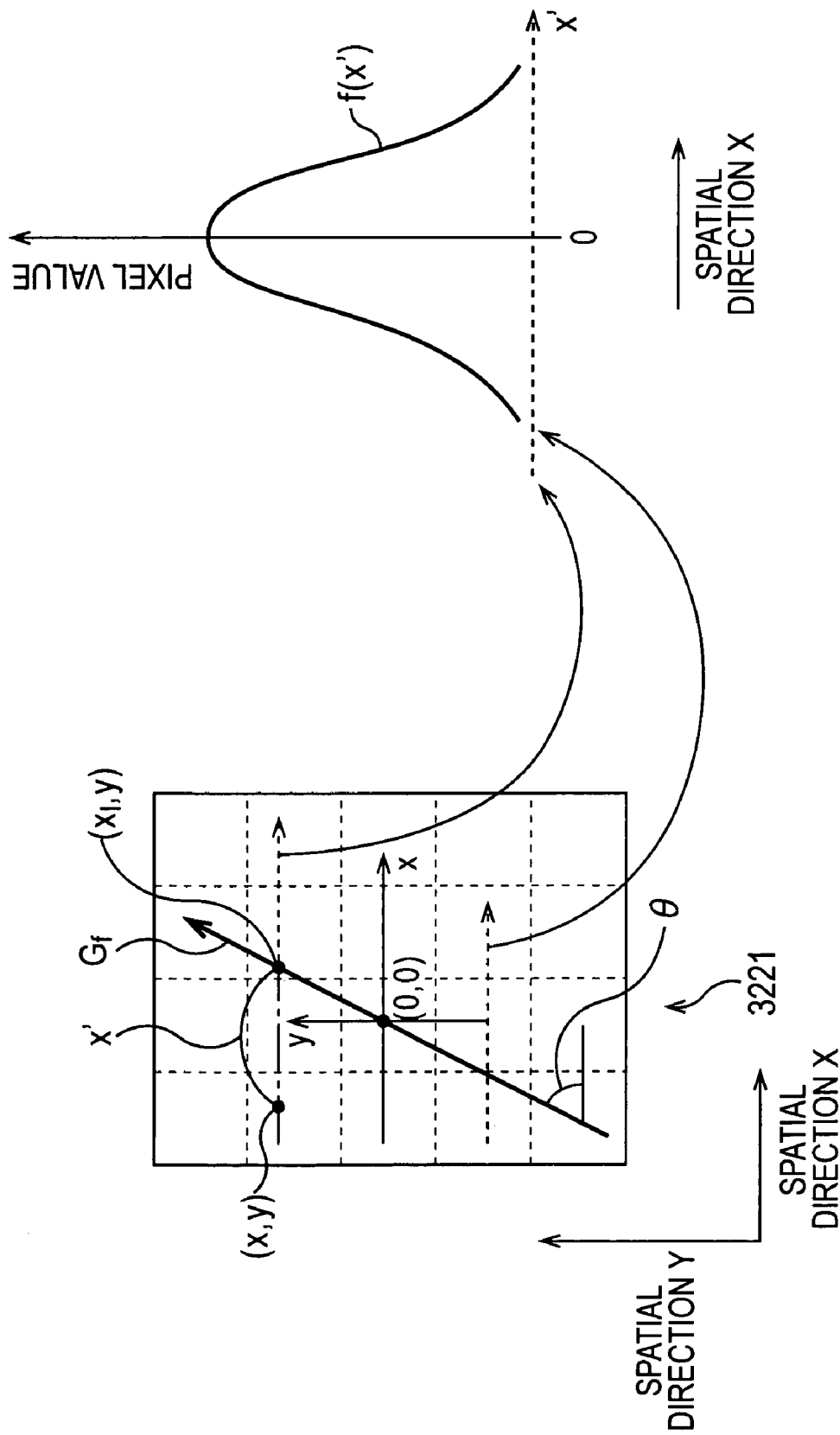

FIG. 166 is a diagram for describing distance in the cross-sectional direction.

Figure 167:
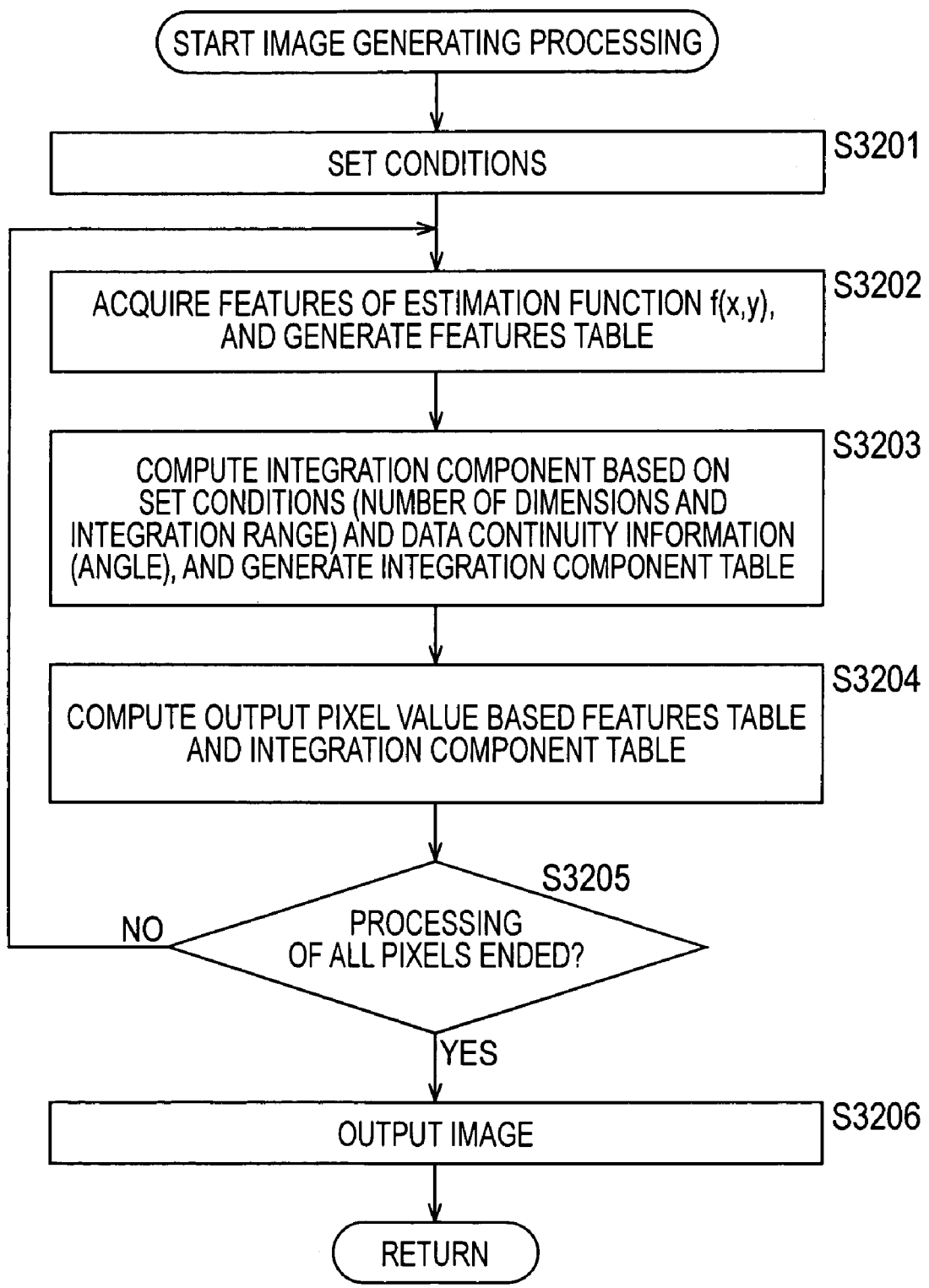

FIG. 167 is a flowchart for describing the image generating processing which the image generating unit of the configuration shown in FIG. 165 executes.

Figure 168:
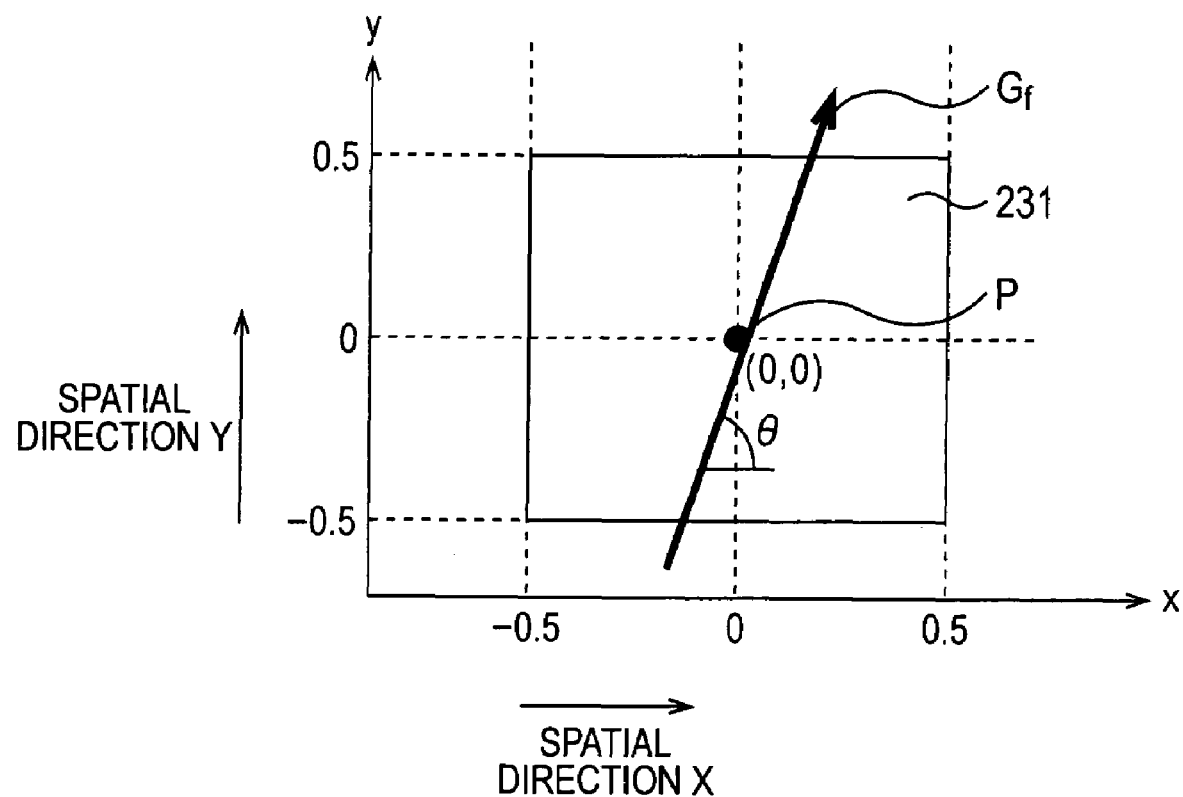

FIG. 168 is a diagram for describing an example of an input pixel.

Figure 169:
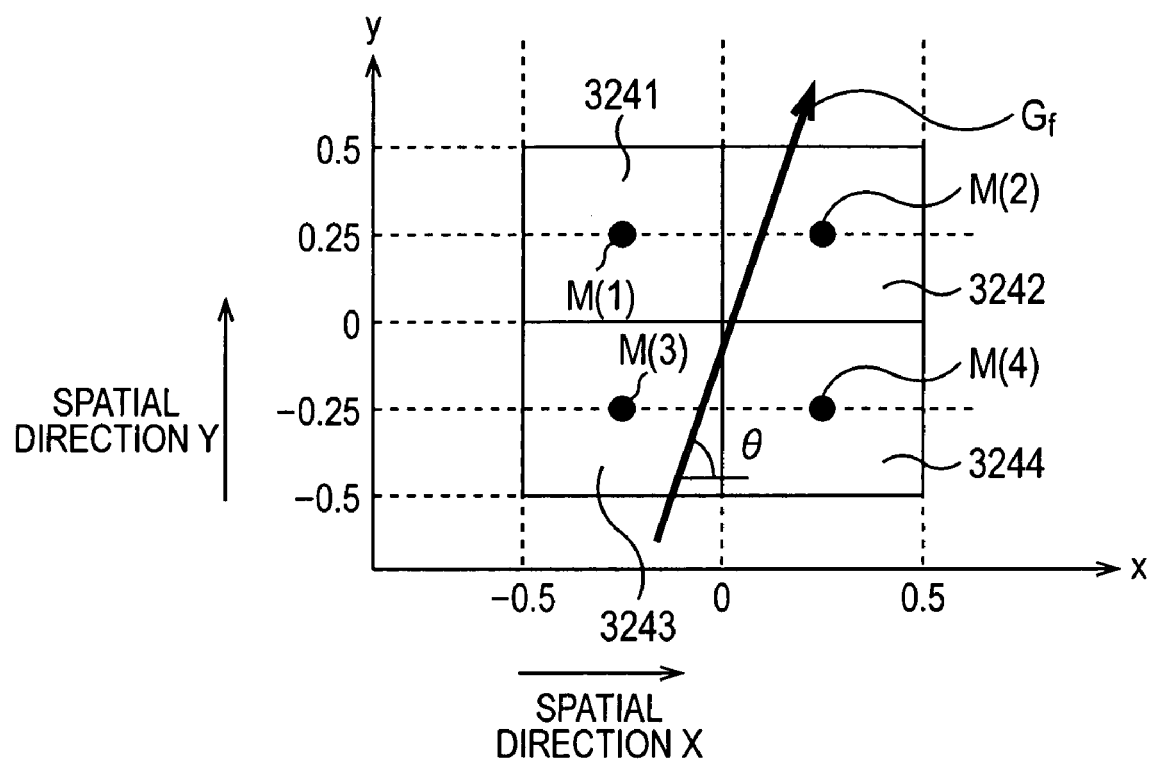

FIG. 169 is a diagram for describing an example of creating four high-resolution pixels in the one input pixel shown in FIG. 168, with the two-dimensional re-integration technique.

Figure 170:
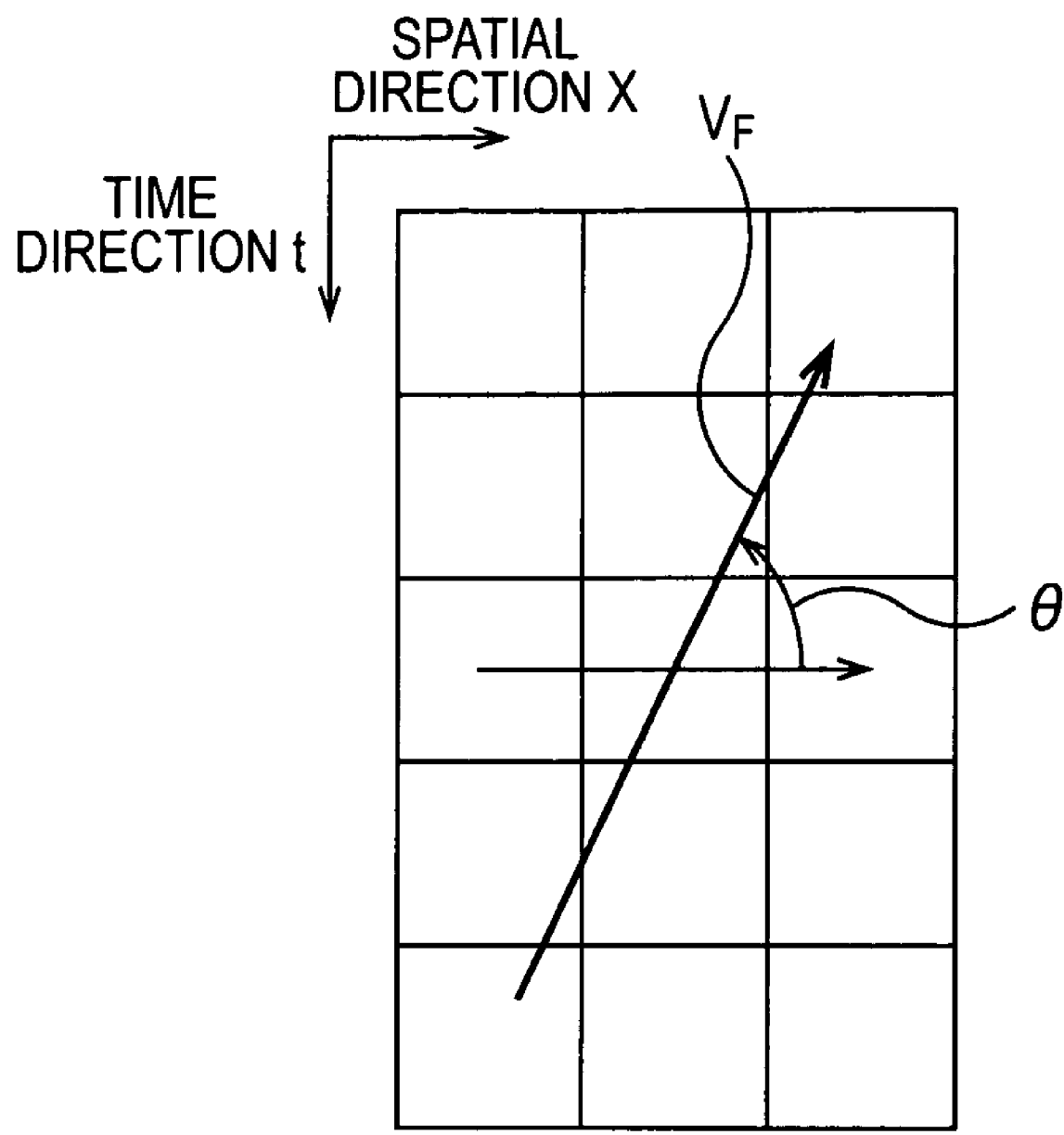

FIG. 170 is a diagram for describing the direction of continuity in the space-time directions.

Figure 171:
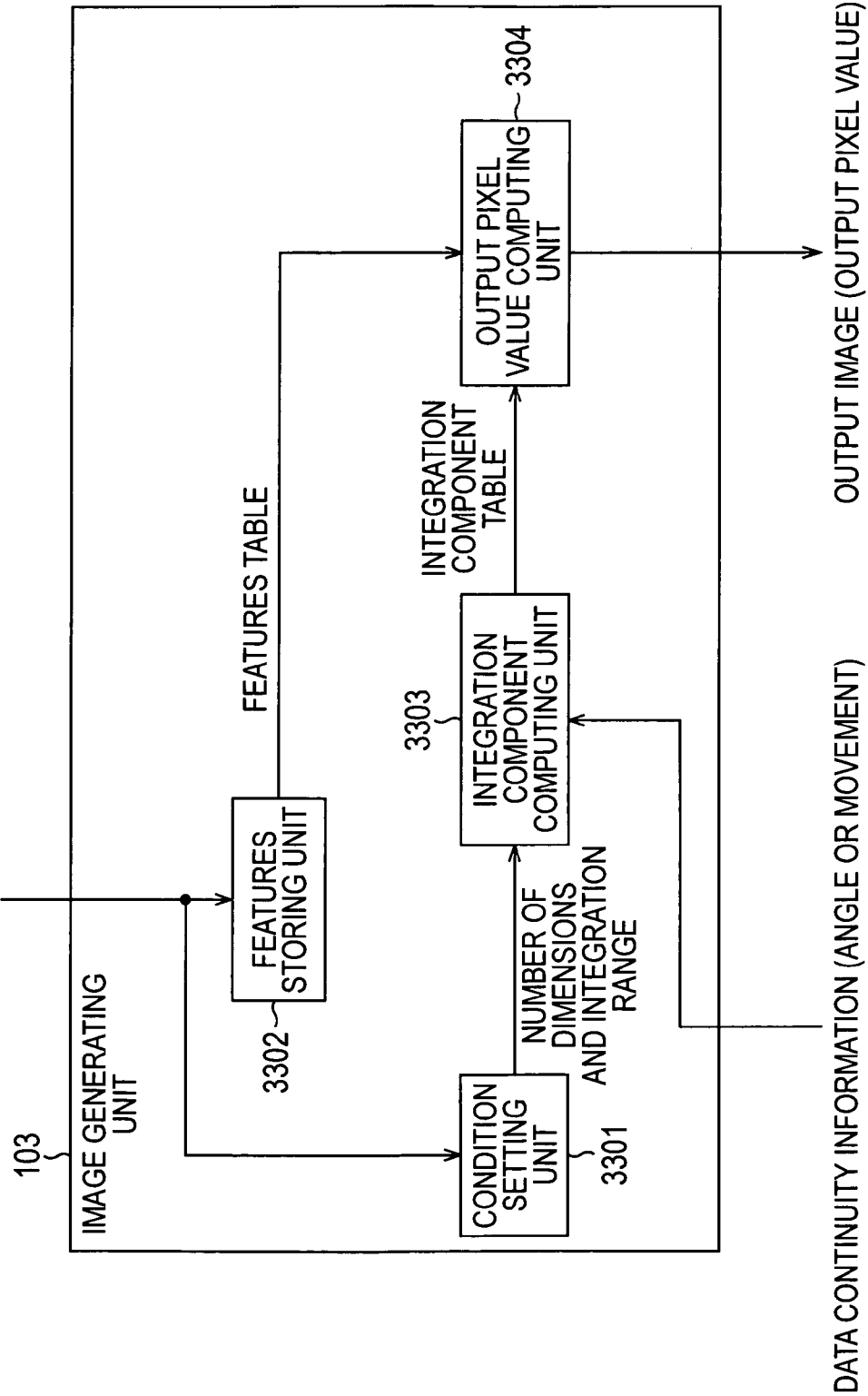

FIG. 171 is a block diagram for describing a configuration example of the image generating unit which uses, of the re-integration techniques having the principle shown in FIG. 151, a three-dimensional re-integration technique.

Figure 172:
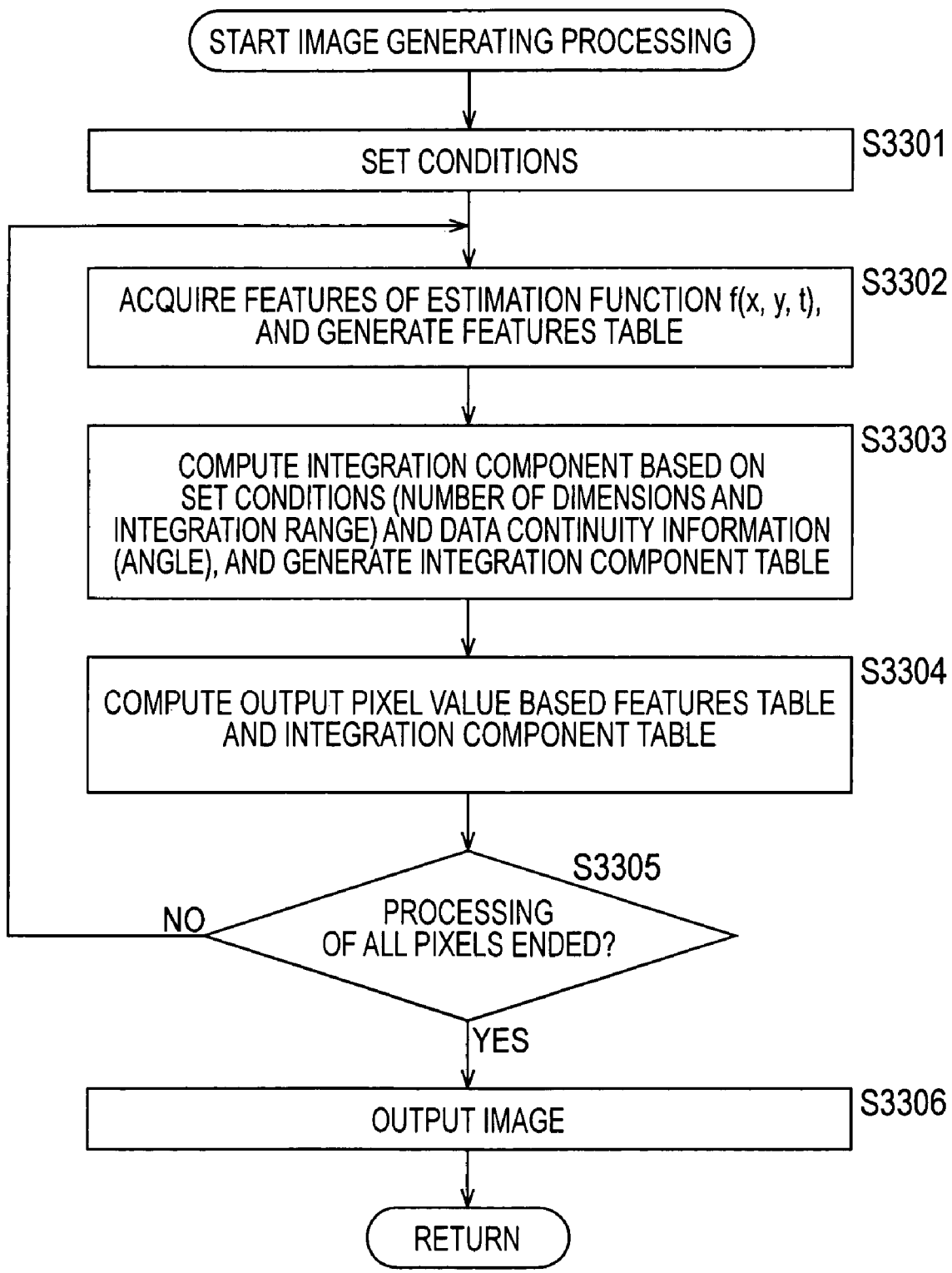

FIG. 172 is a flowchart for describing the image generating processing which the image generating unit of the configuration shown in FIG. 171 executes.

Figure 173:
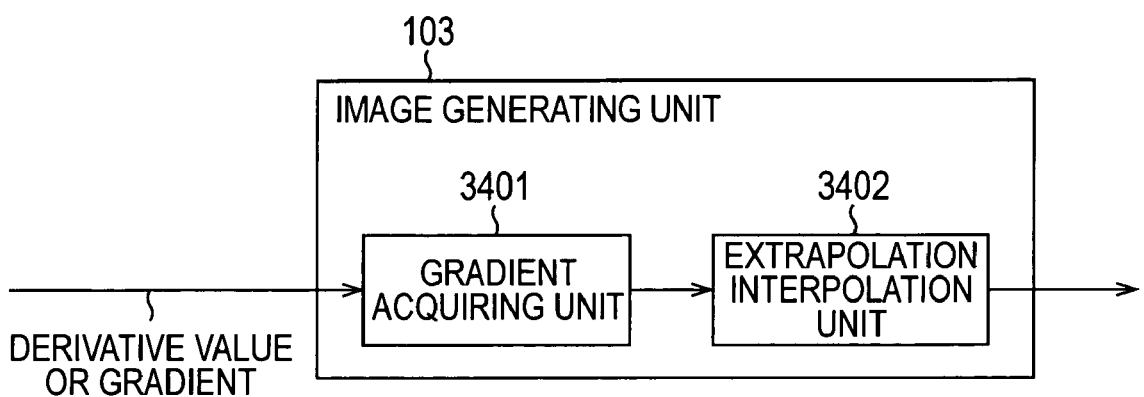

FIG. 173 is a block diagram illustrating another configuration of the image generating unit to which the present invention is applied.

Figure 174:
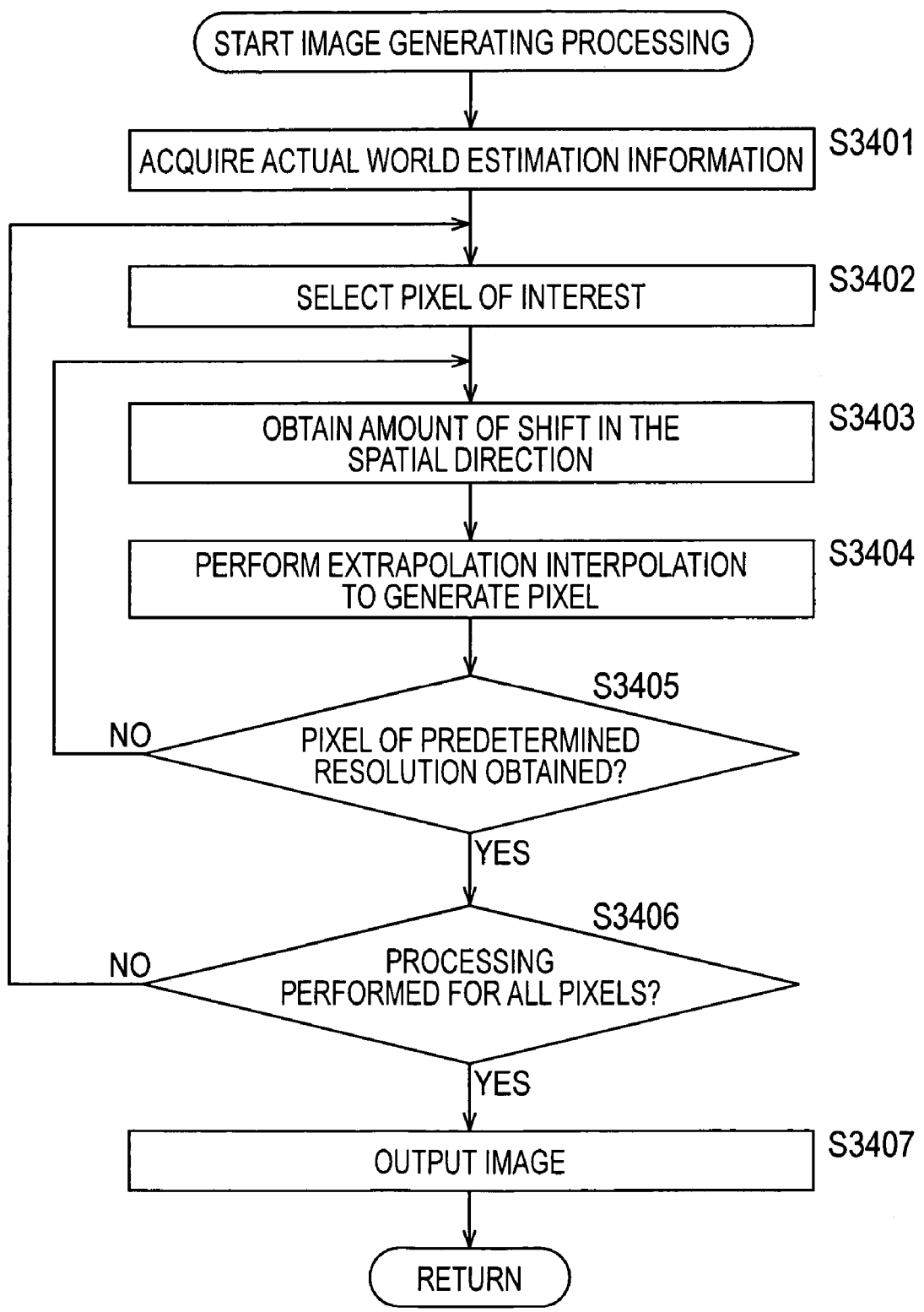

FIG. 174 is a flowchart for describing the processing for image generating with the image generating unit shown in FIG. 173.

Figure 175:
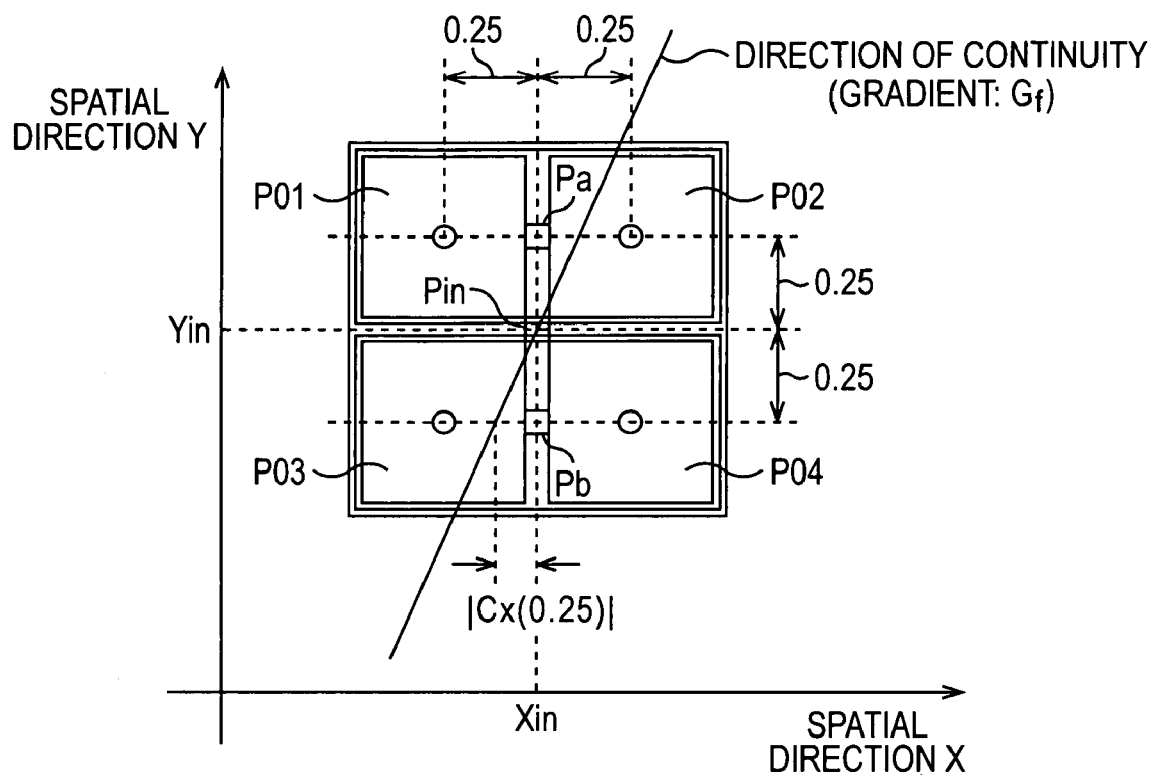

FIG. 175 is a diagram for describing processing of creating a quadruple density pixel from an input pixel.

Figure 176:
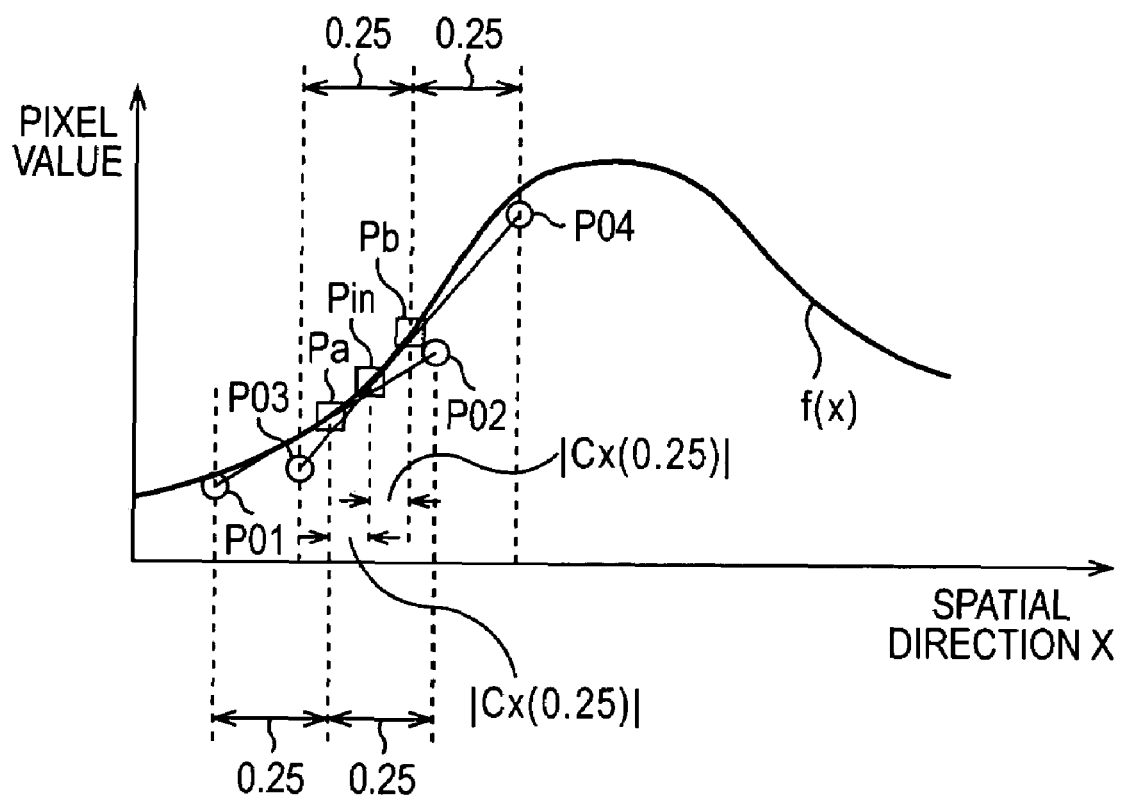

FIG. 176 is a diagram for describing the relationship between an approximation function indicating the pixel value and the amount of shift.

Figure 177:
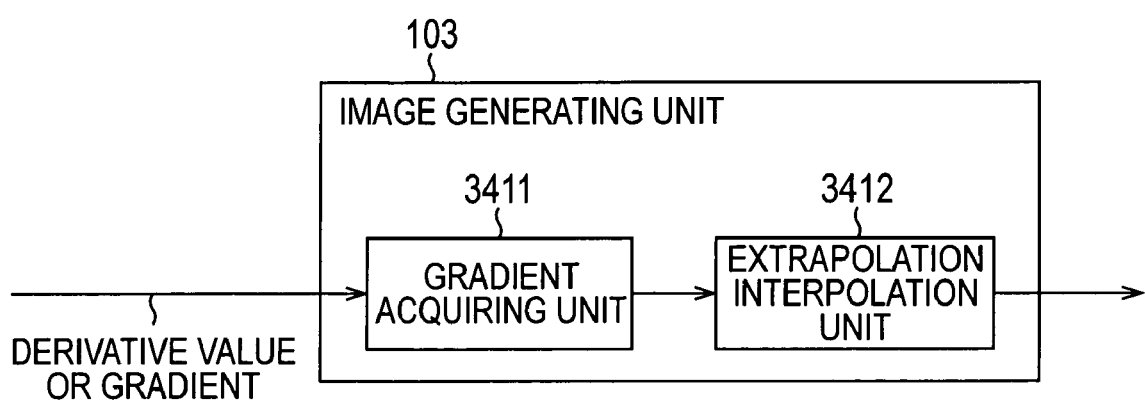

FIG. 177 is a block diagram illustrating another configuration of the image generating unit to which the present invention has been applied.

Figure 178:
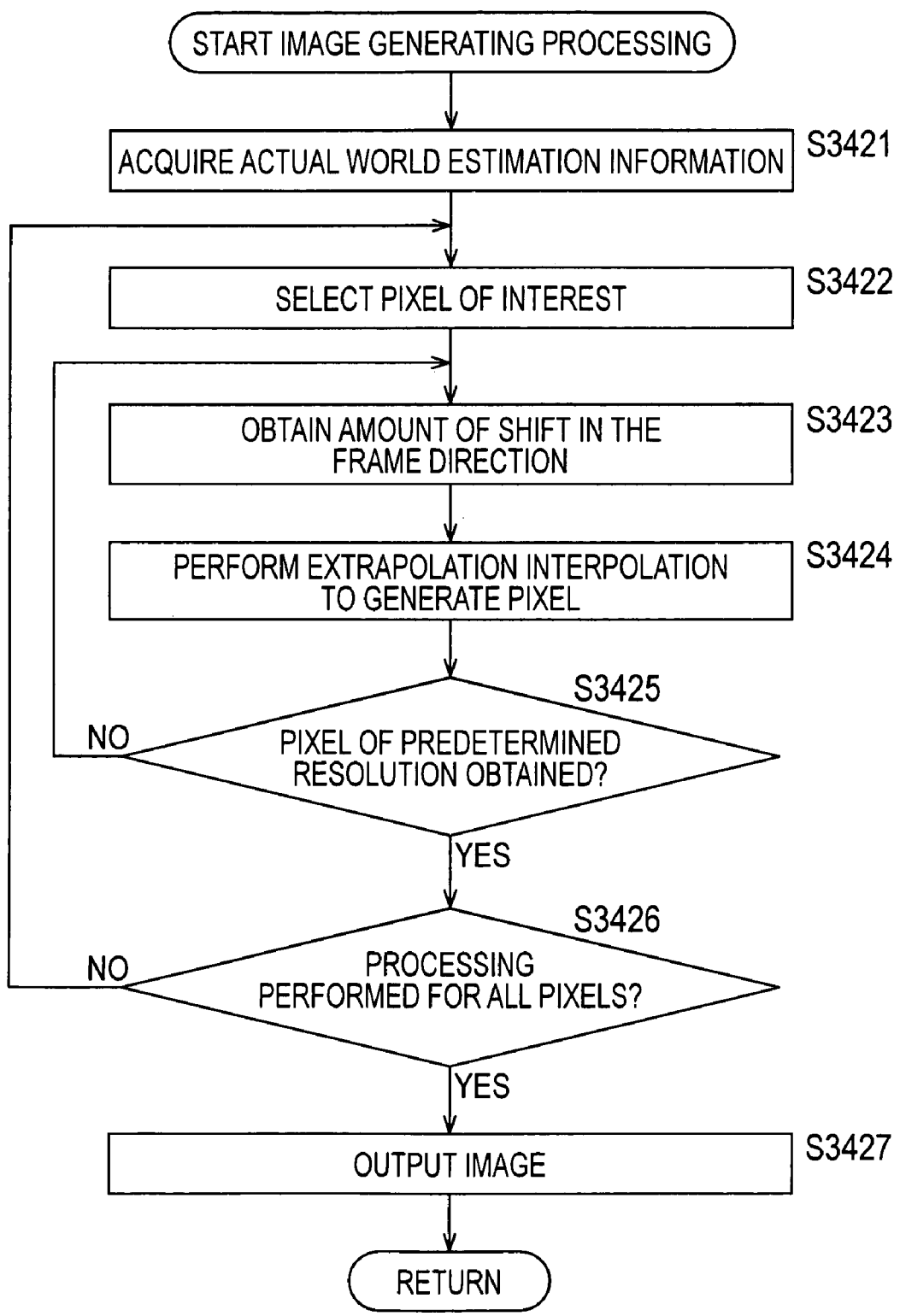

FIG. 178 is a flowchart for describing the processing for image generating with the image generating unit shown in FIG. 177.

Figure 179:
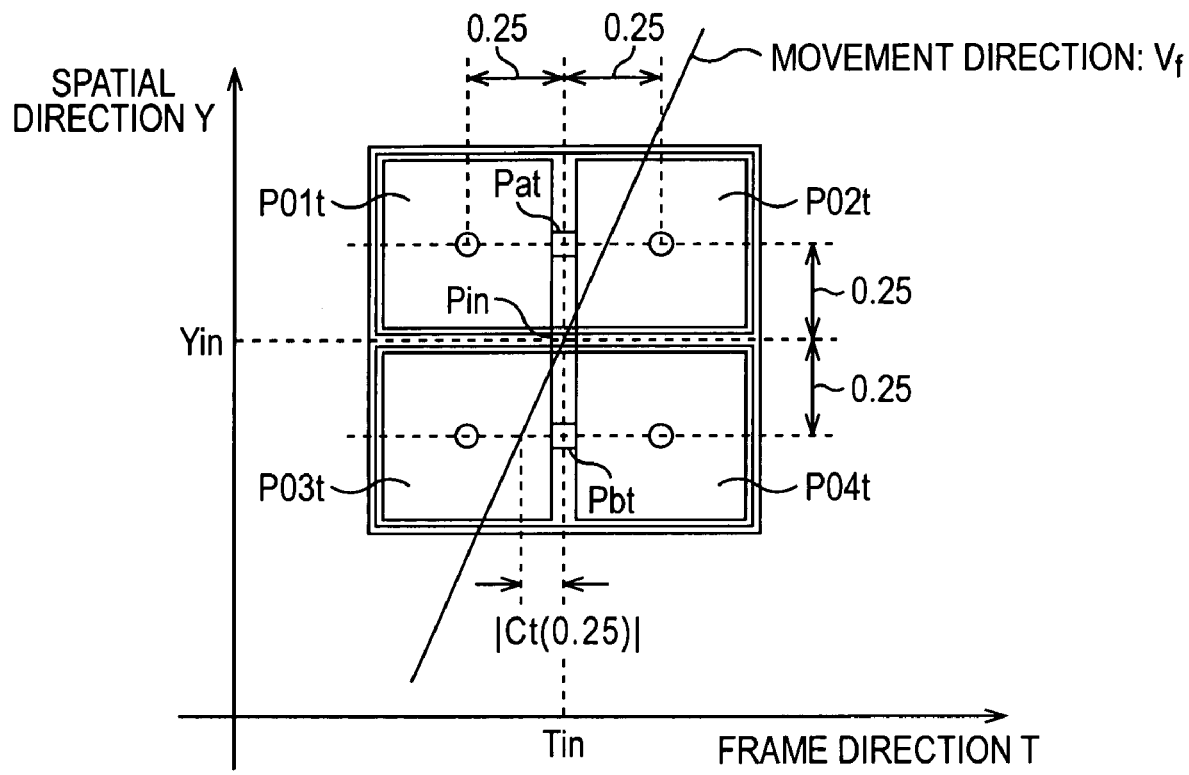

FIG. 179 is a diagram for describing processing of creating a quadruple density pixel from an input pixel.

Figure 180:
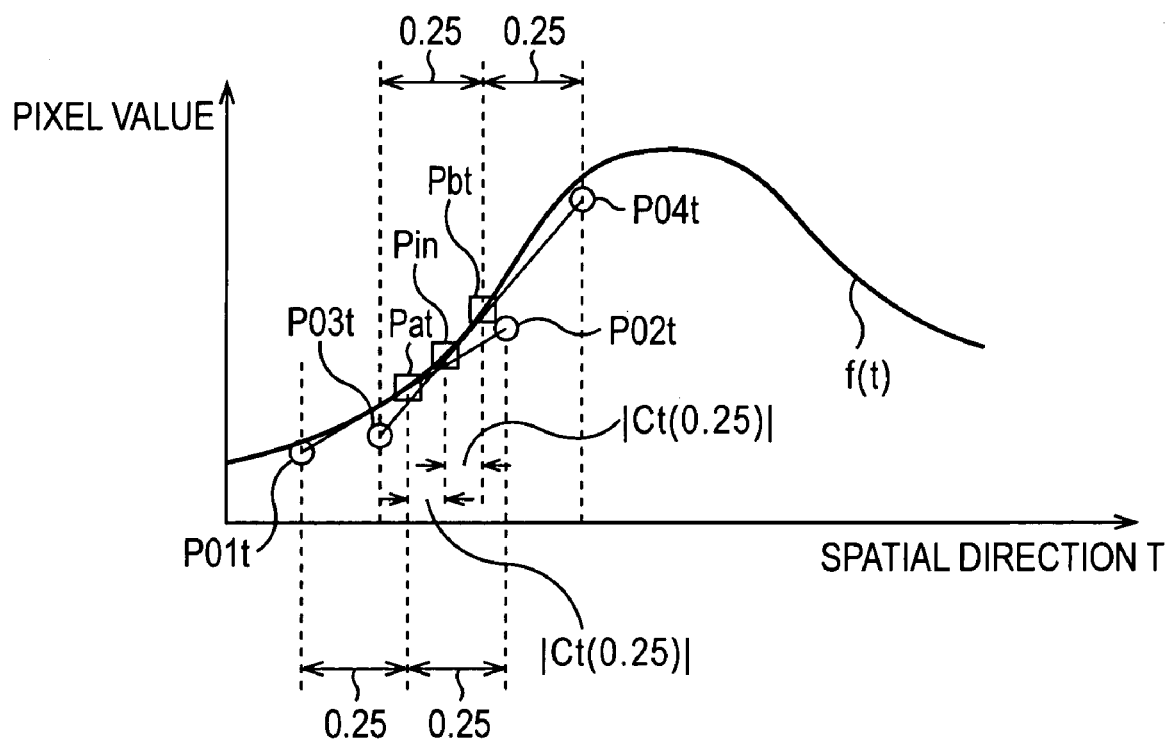

FIG. 180 is a diagram for describing the relationship between an approximation function indicating the pixel value and the amount of shift.

Figure 181:
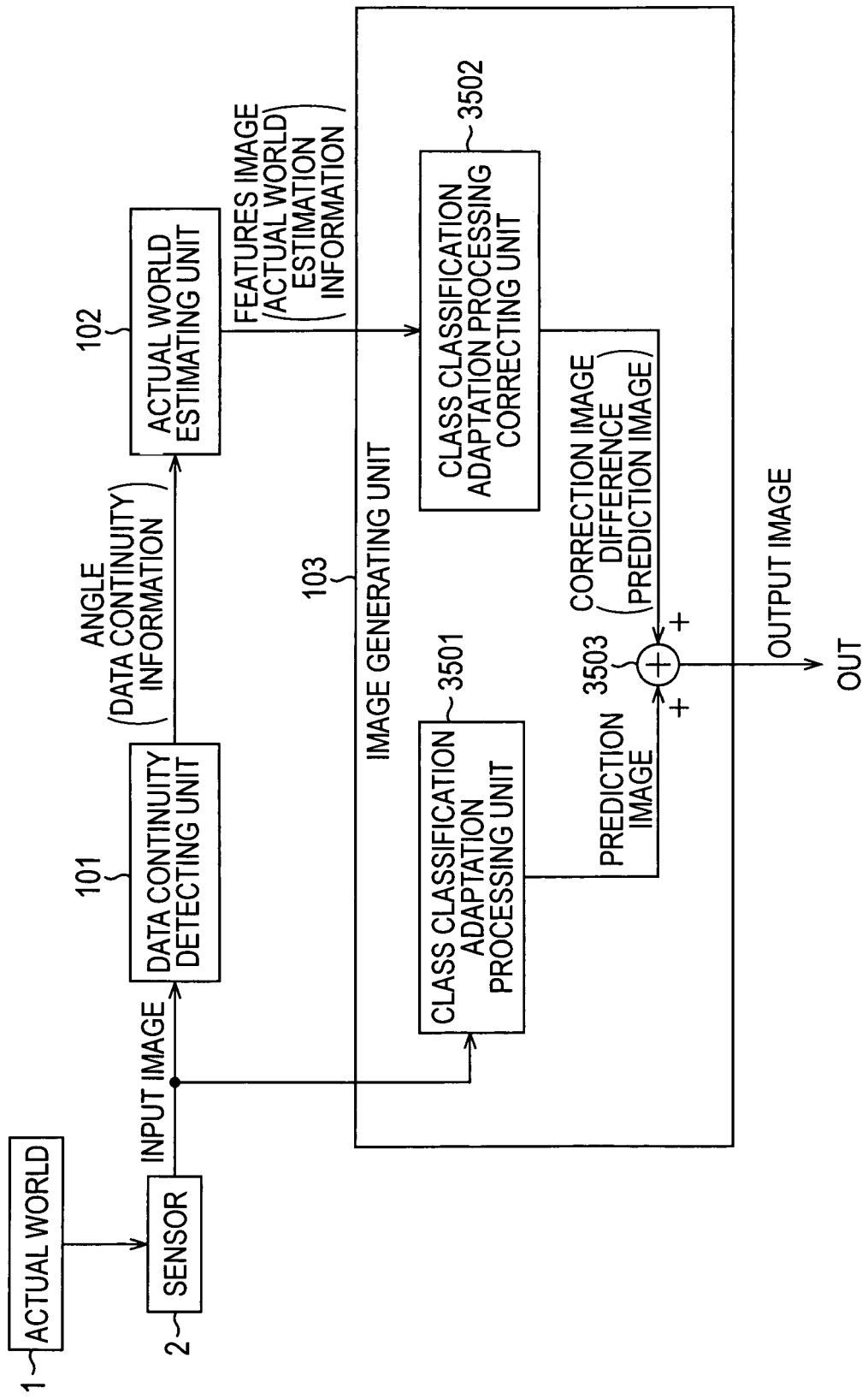

FIG. 181 is a block diagram for describing a configuration example of the image generating unit which uses the one-dimensional re-integration technique in the class classification adaptation process correction technique, which is an example of an embodiment of the image generating unit shown in FIG. 3.

Figure 182:
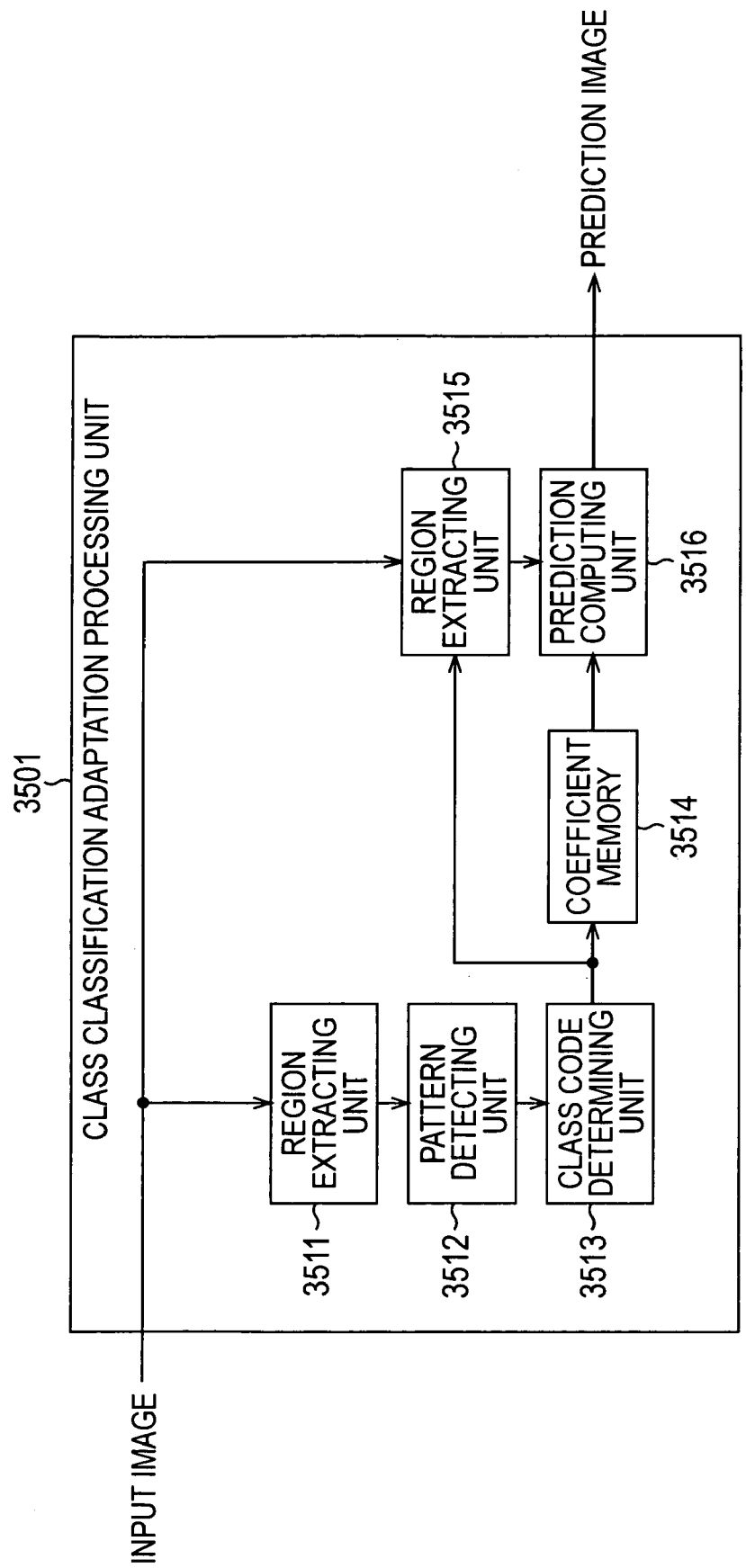

FIG. 182 is a block diagram describing a configuration example of the class classification adaptation processing unit of the image generating unit shown in FIG. 181.

Figure 183:
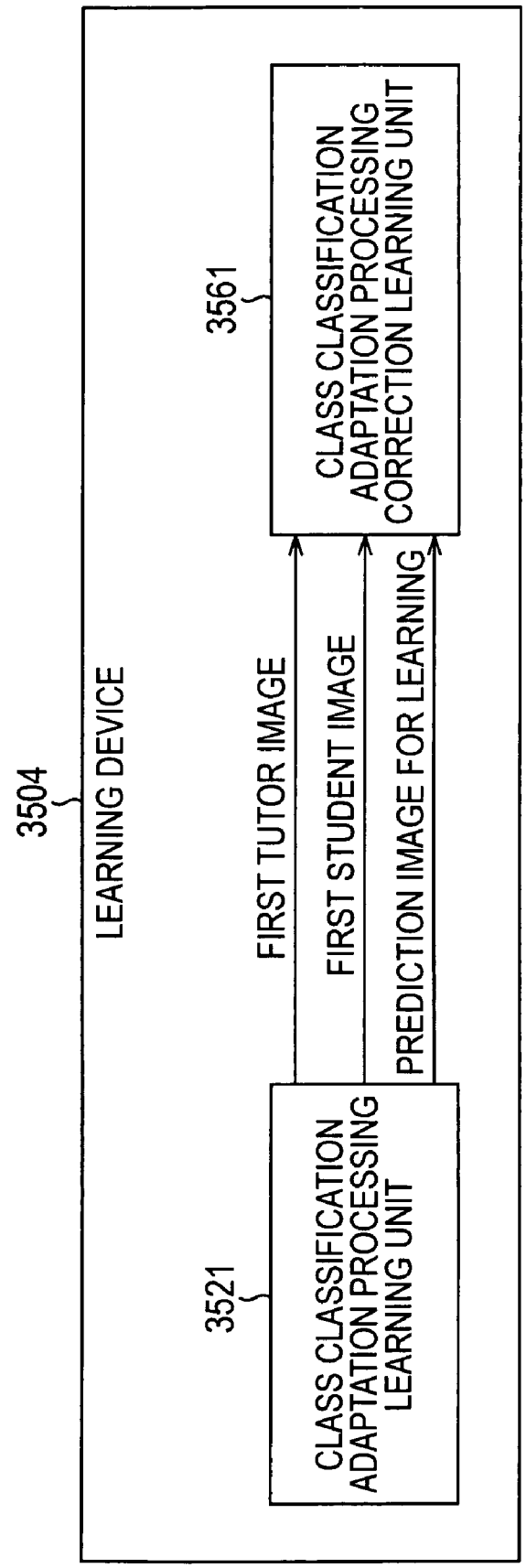

FIG. 183 is a block diagram illustrating the configuration example of class classification adaptation processing unit shown in FIG. 181, and a learning device for determining a coefficient for the class classification adaptation processing correction unit to use by way of learning.

Figure 184:
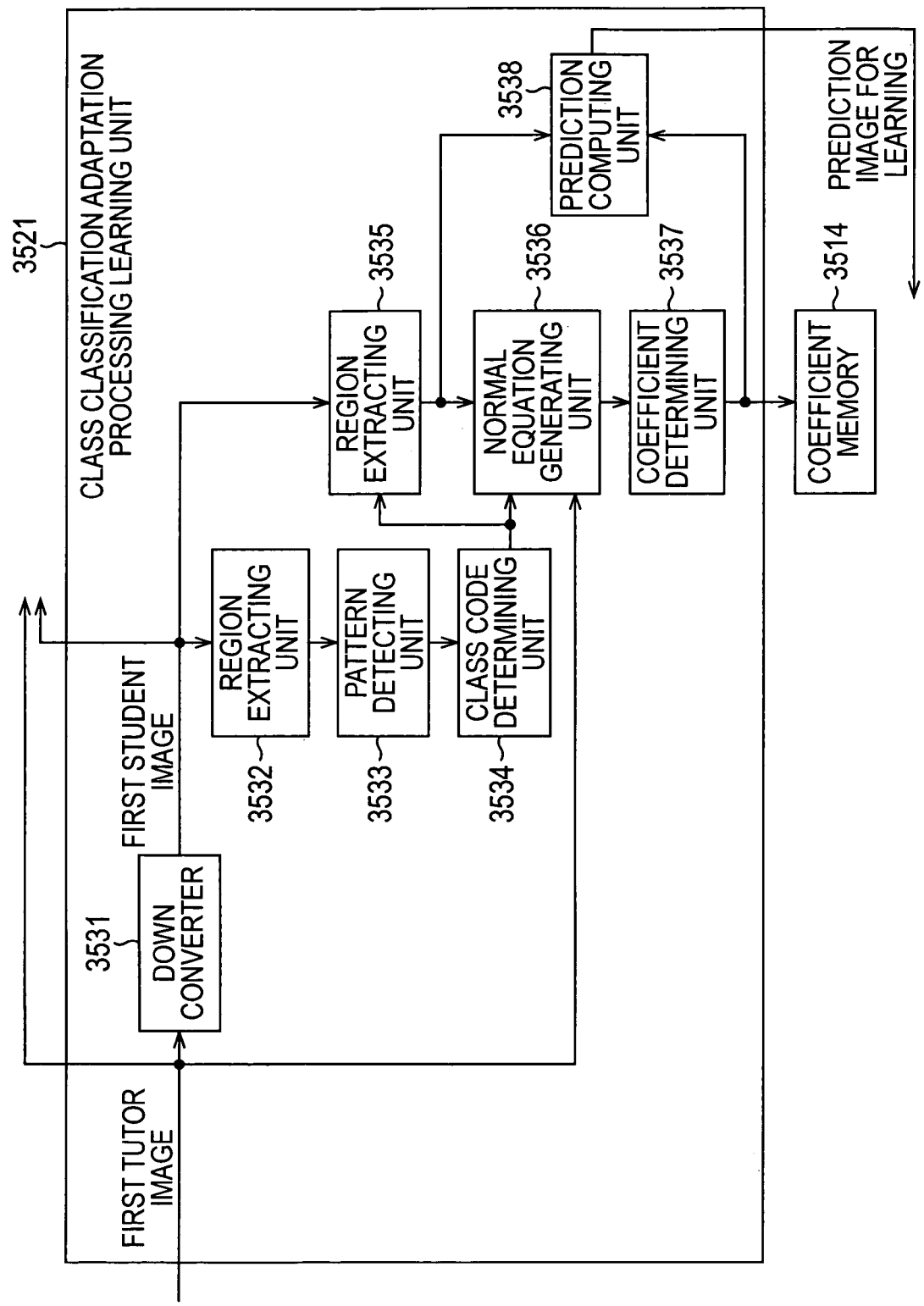

FIG. 184 is a block diagram for describing a detailed configuration example of the learning unit for the class classification adaptation processing unit, shown in FIG. 183.

Figure 185:
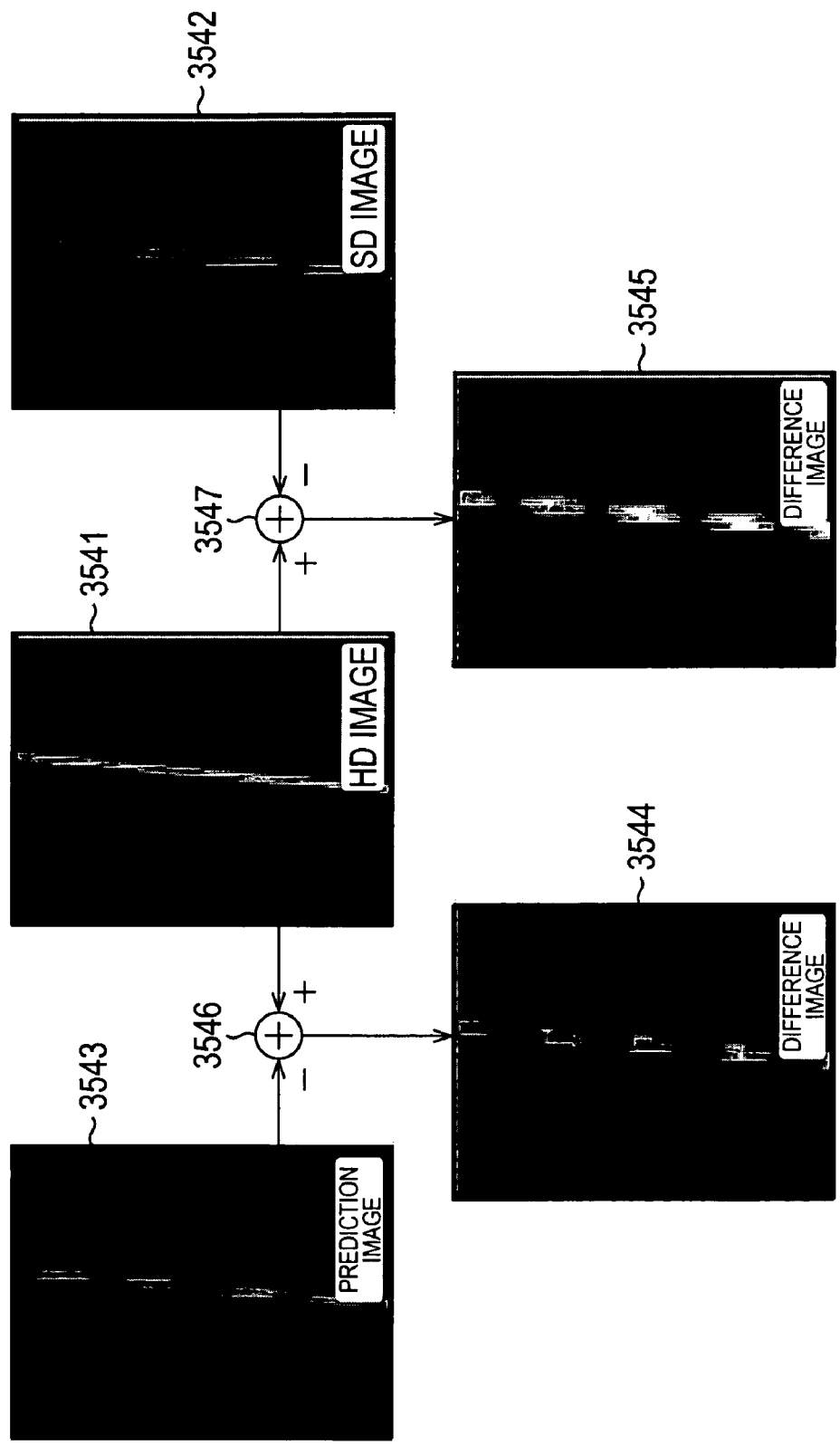

FIG. 185 is a diagram illustrating an example of processing results of the class classification adaptation processing unit shown in FIG. 182.

Figure 186:
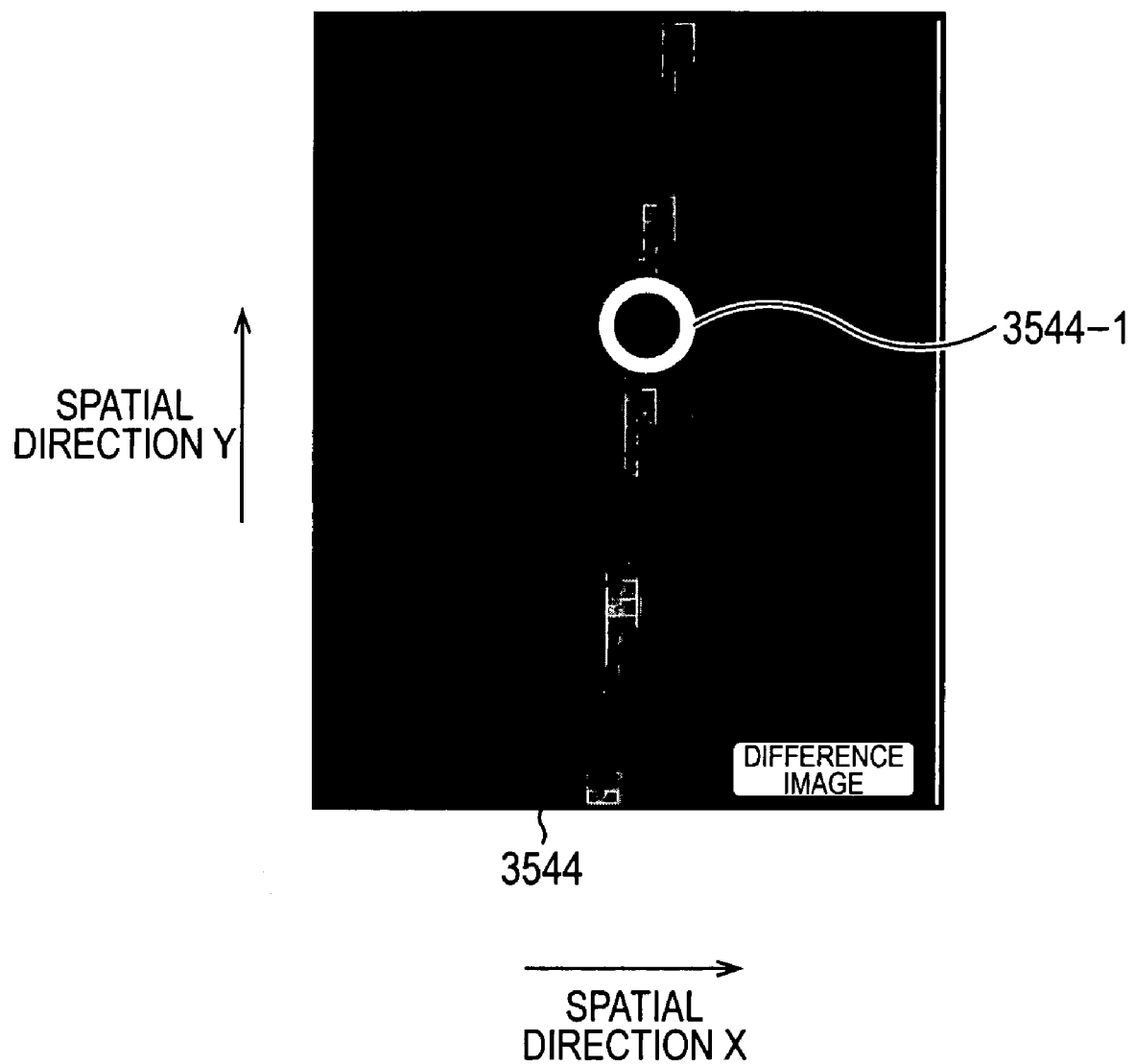

FIG. 186 is a diagram illustrating a difference image between the prediction image shown in FIG. 185 and an HD image.

Figure 187:
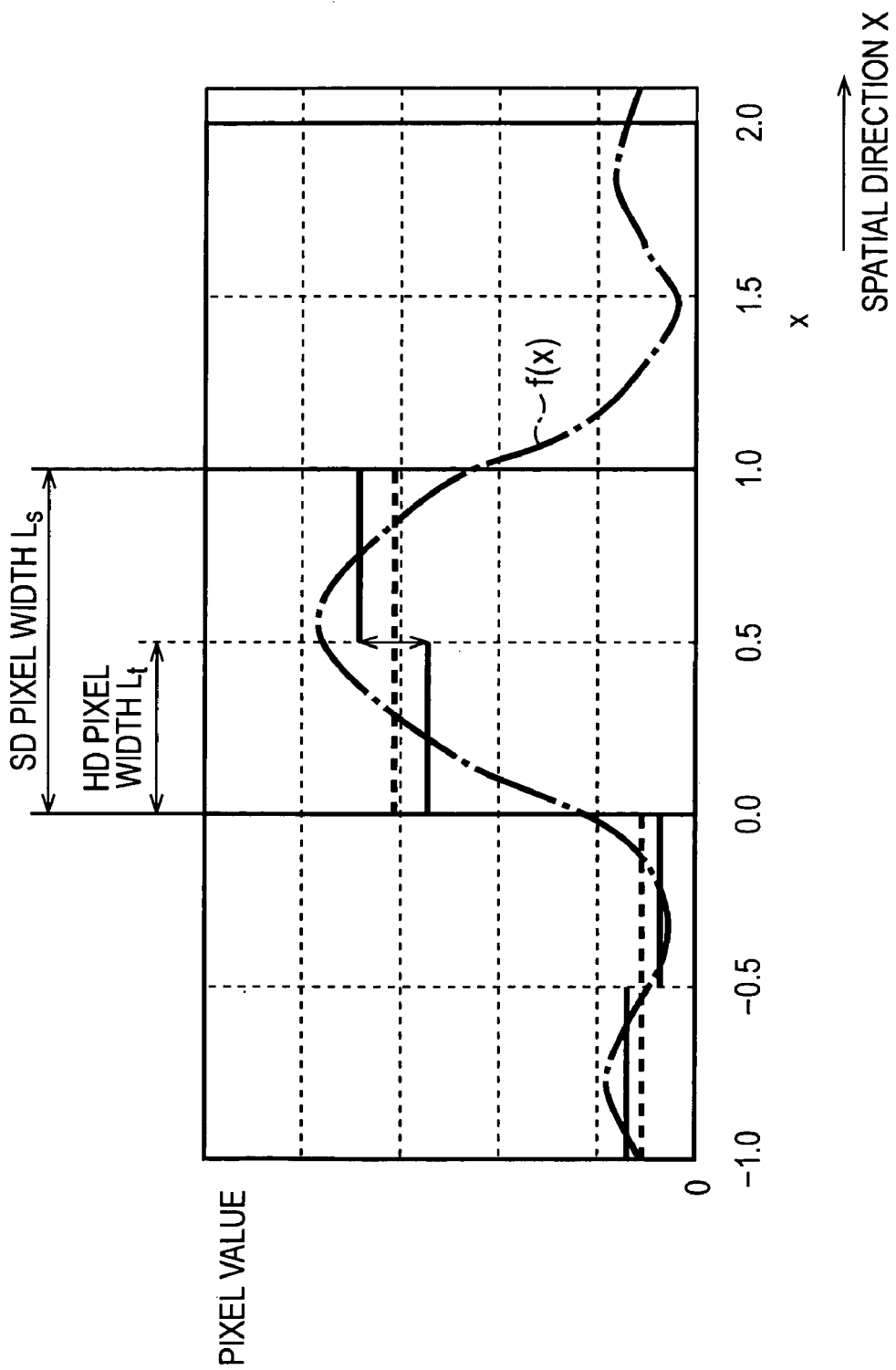

FIG. 187 is a diagram plotting each of specific pixel values of the HD image in FIG. 185, specific pixel values of the SD image, and actual waveform (actual world signals), corresponding to the four HD pixels from the left of the six continuous HD pixels in the X direction contained in the region shown in FIG. 186.

Figure 188:
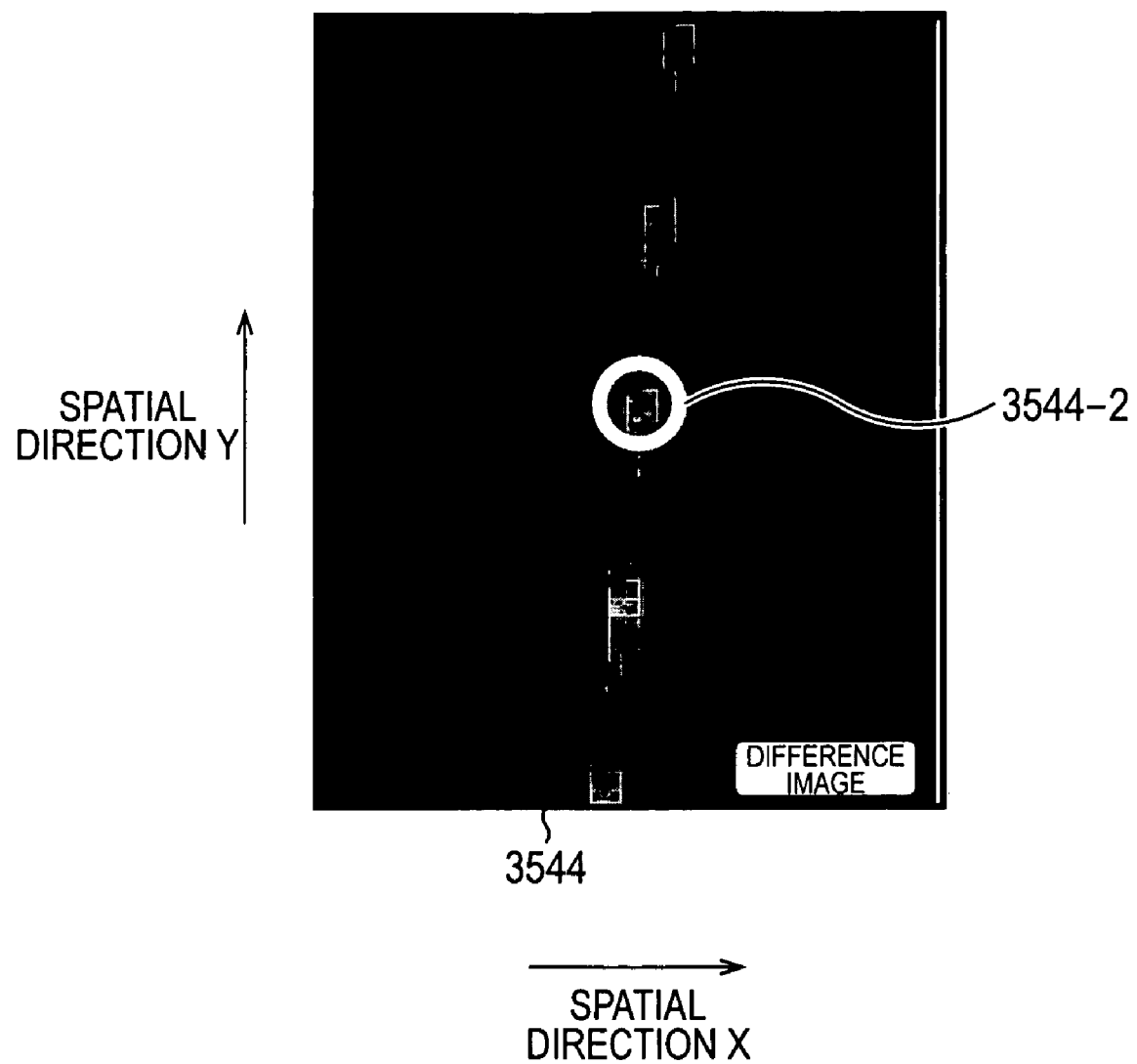

FIG. 188 is a diagram illustrating a difference image of the prediction image in FIG. 185 and an HD image.

Figure 189:
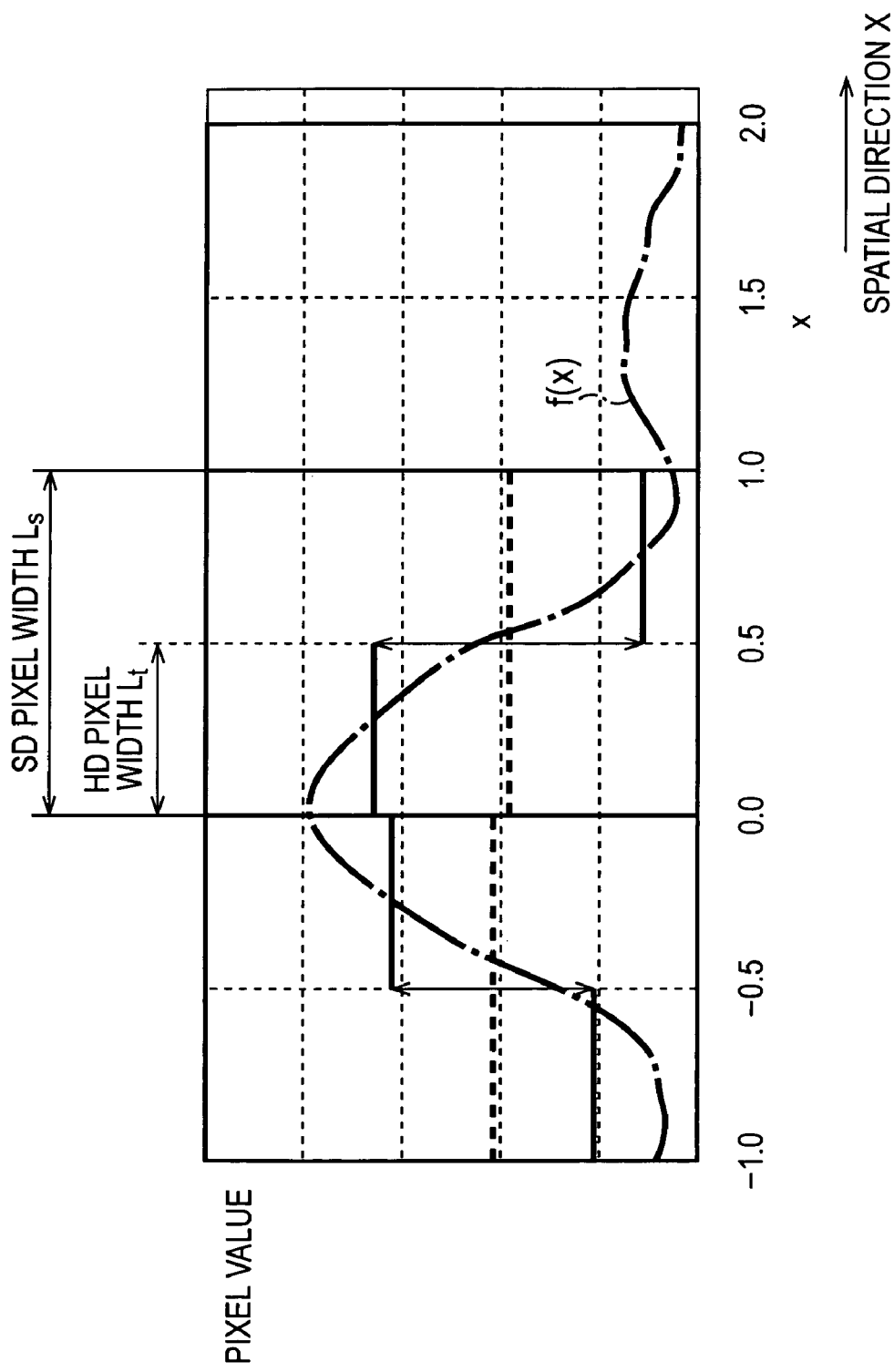

FIG. 189 is a diagram plotting each of specific pixel values of the HD image in FIG. 185, specific pixel values of the SD image, and actual waveform (actual world signals), corresponding to the four HD pixels from the left of the six continuous HD pixels in the X direction contained in the region shown in FIG. 188.

Figure 190:
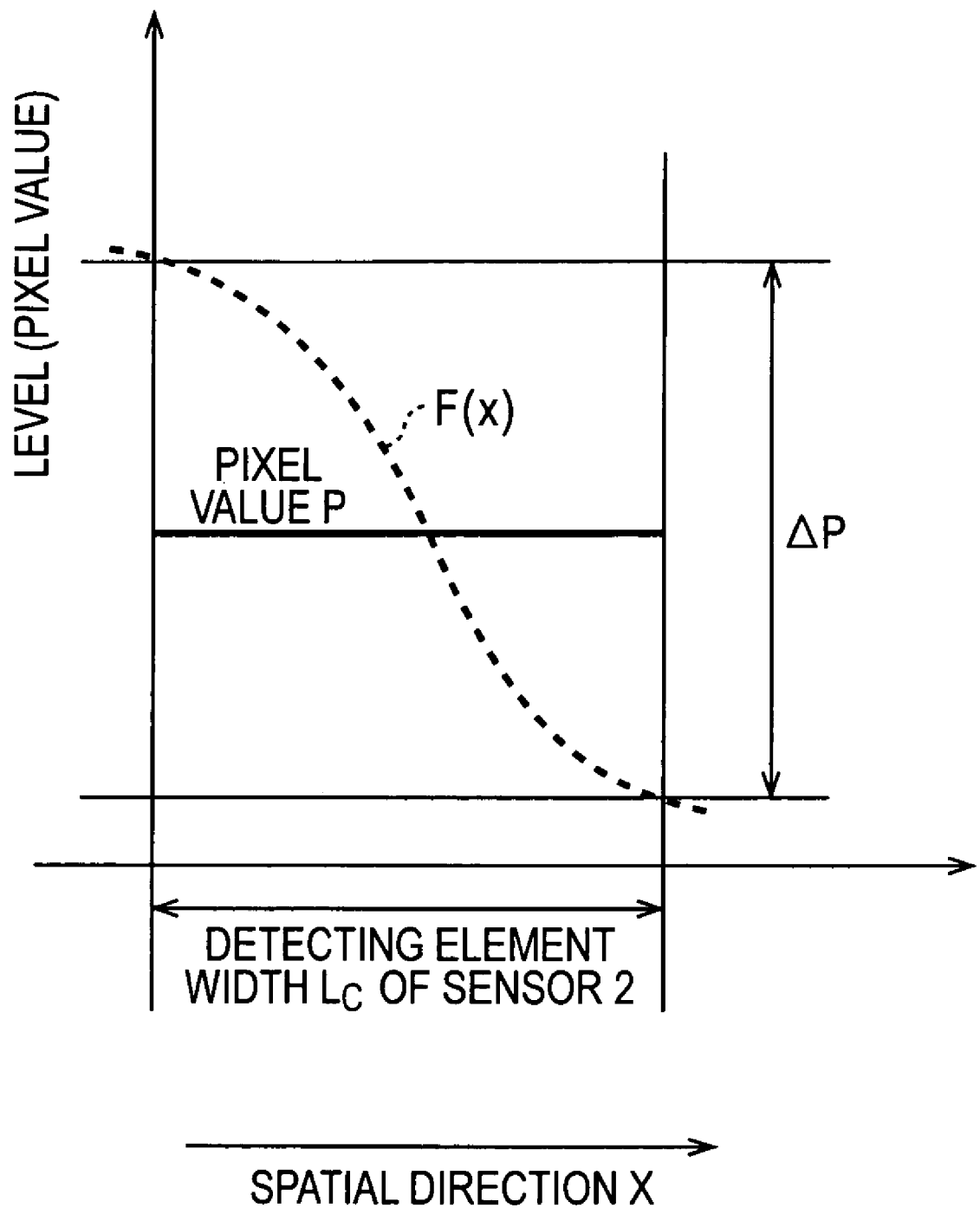

FIG. 190 is a diagram for describing understanding obtained based on the contents shown in FIG. 187 through FIG. 189.

Figure 191:
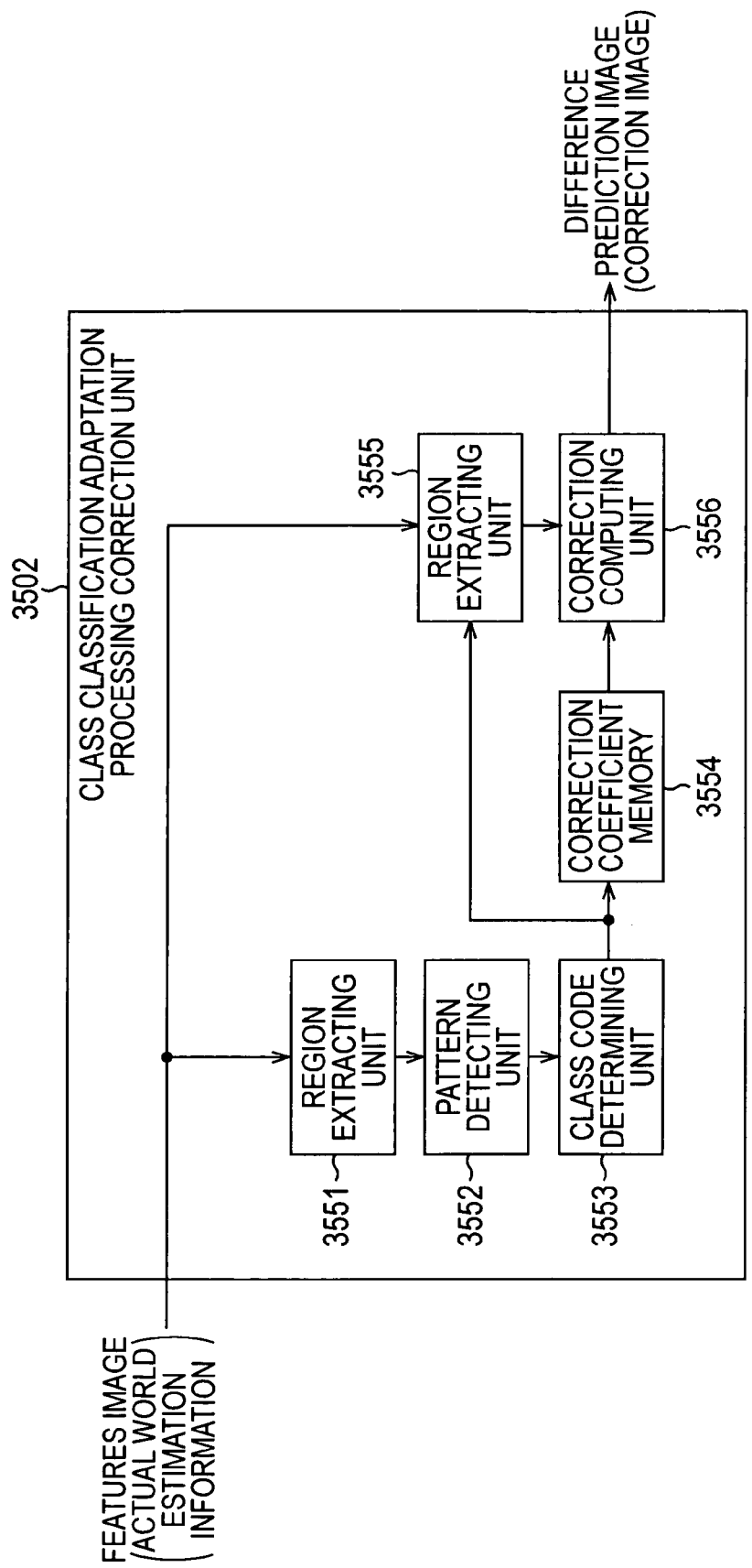

FIG. 191 is a block diagram for describing a configuration example of the class classification adaptation processing correction unit of the image generating unit shown in FIG. 181.

Figure 192:
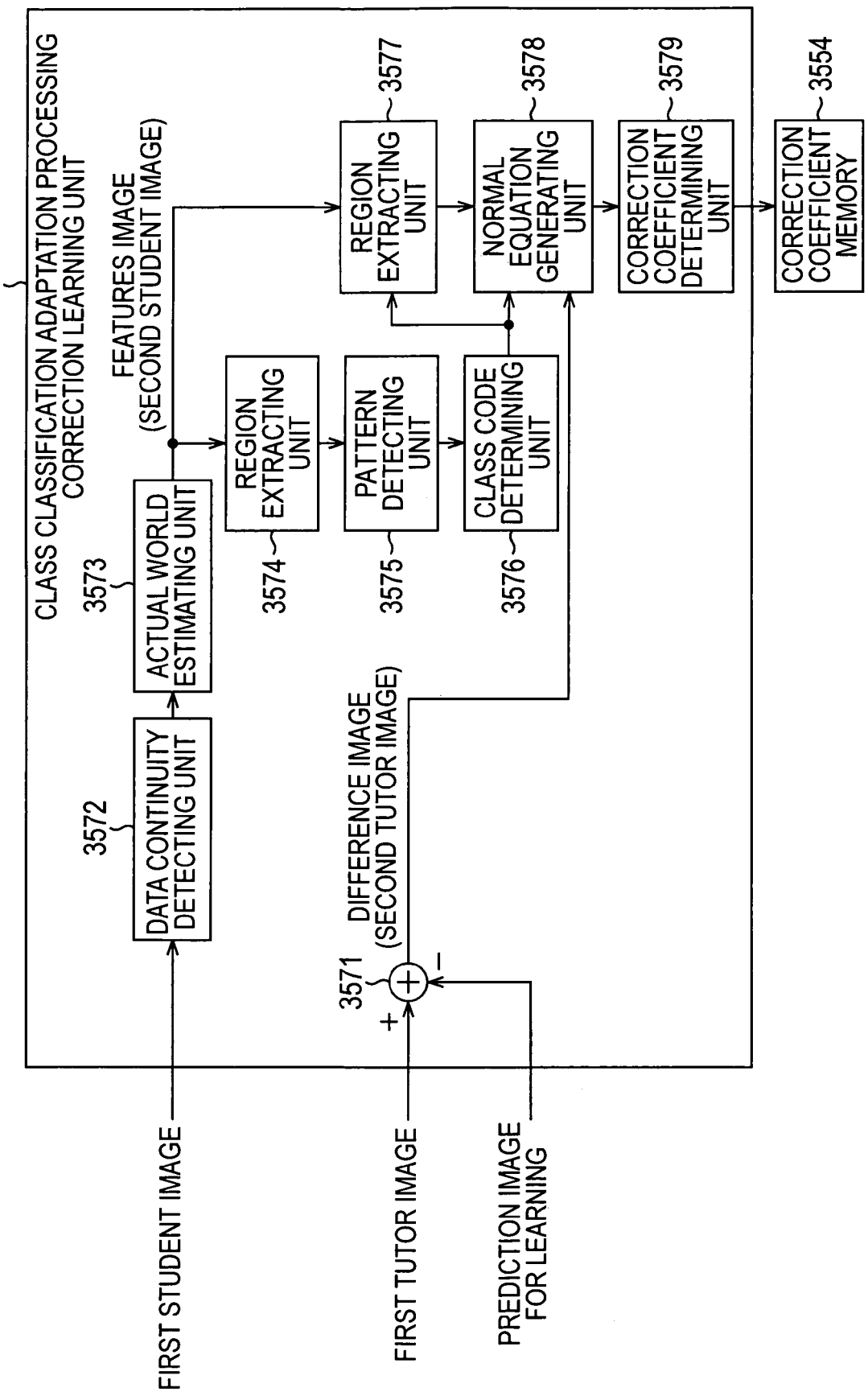

FIG. 192 is a block diagram for describing a detailed configuration example of the learning unit for the class classification adaptation processing correction unit shown in FIG. 183.

Figure 193:
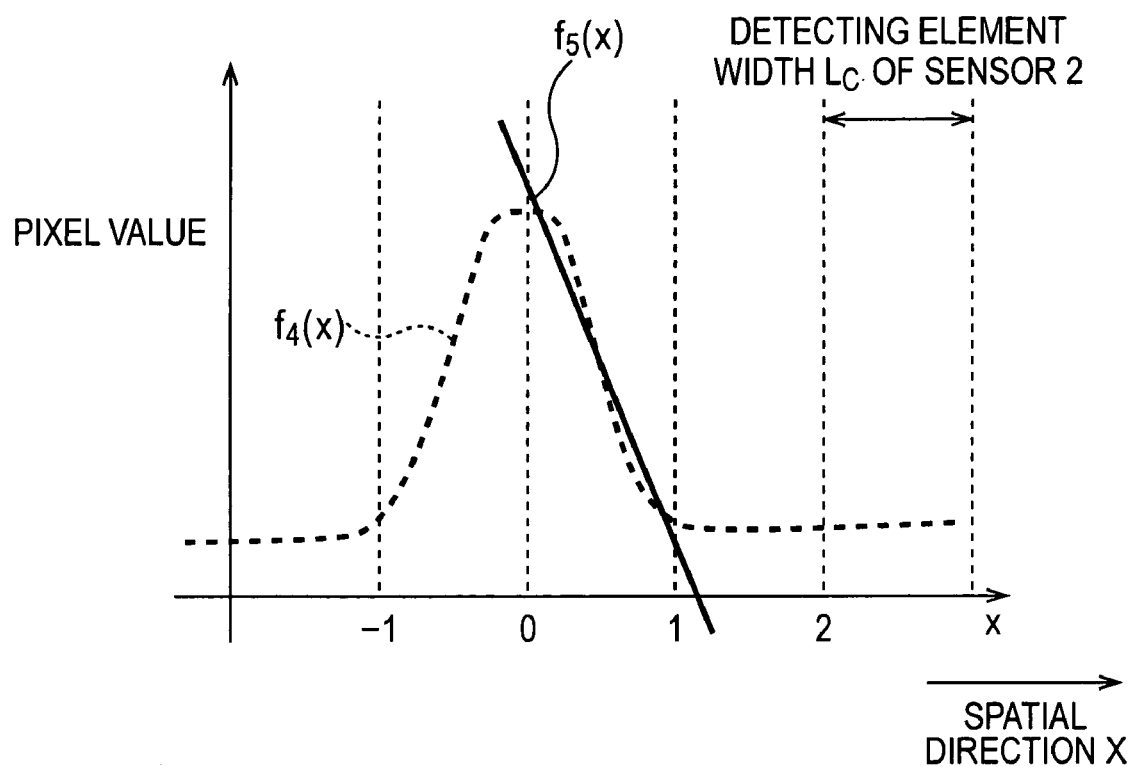

FIG. 193 is a diagram for describing in-pixel gradient.

Figure 194:
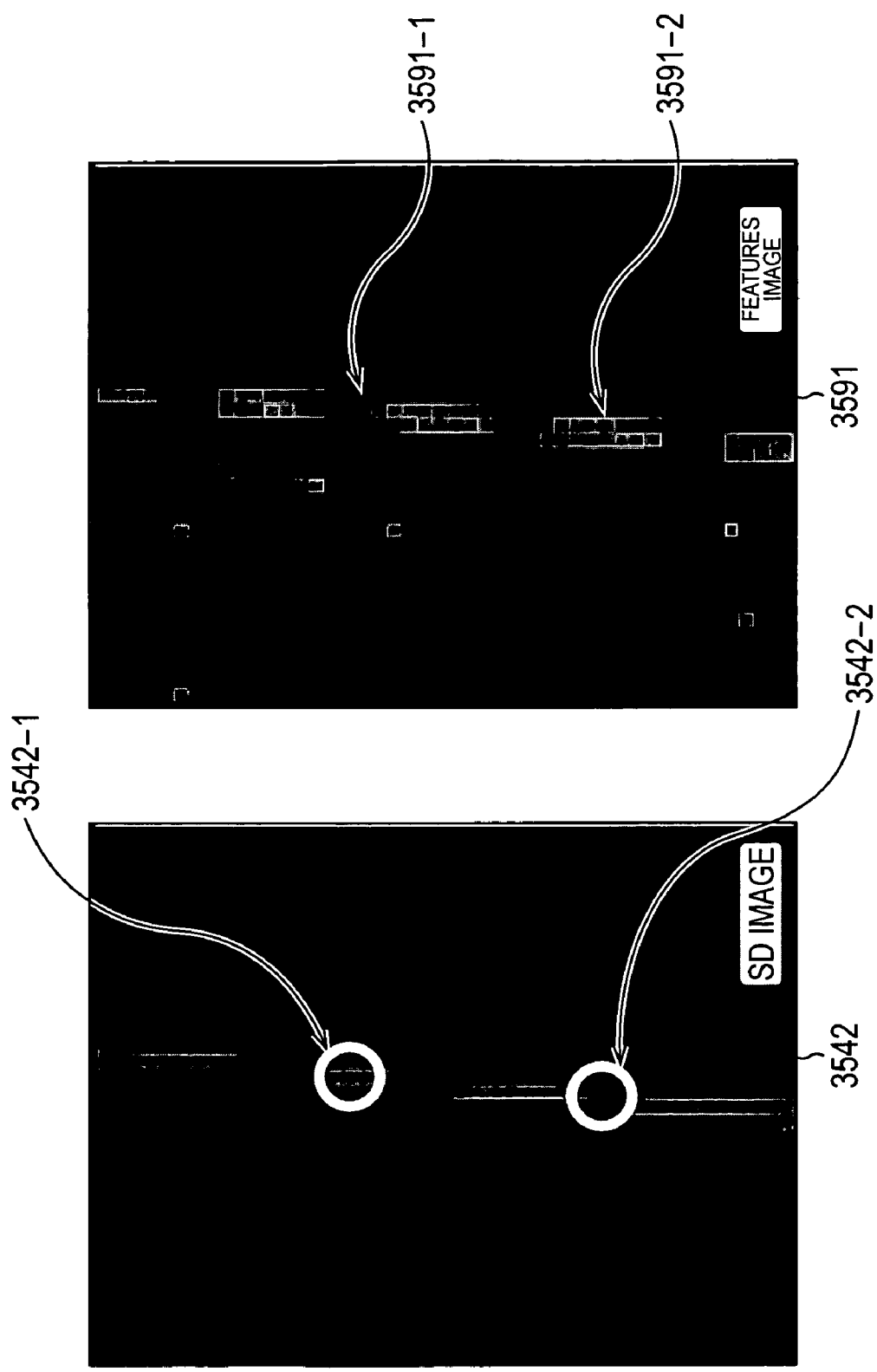

FIG. 194 is a diagram illustrating the SD image shown in FIG. 185, and a features image having as the pixel value thereof the in-pixel gradient of each of the pixels of the SD image.

Figure 195:
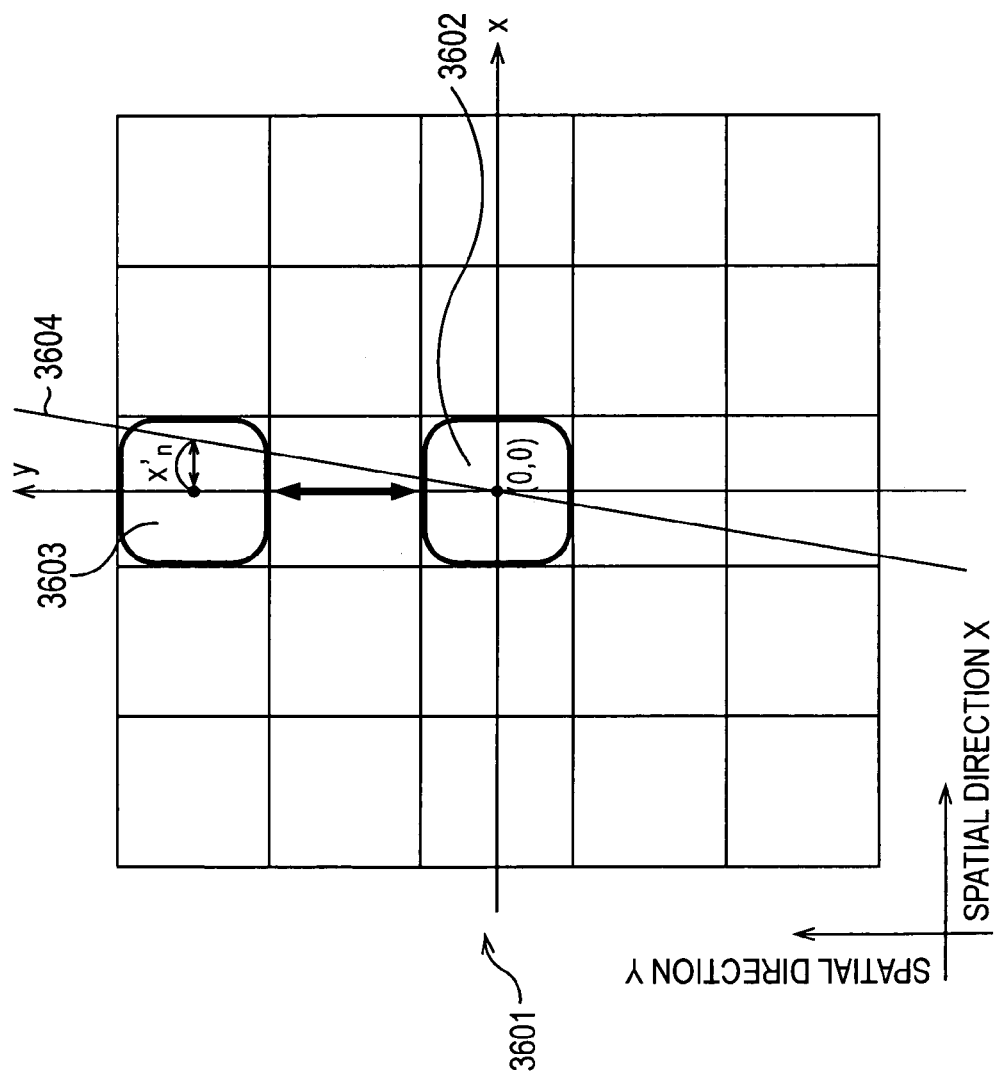

FIG. 195 is a diagram for describing an in-pixel gradient calculation method.

Figure 196:
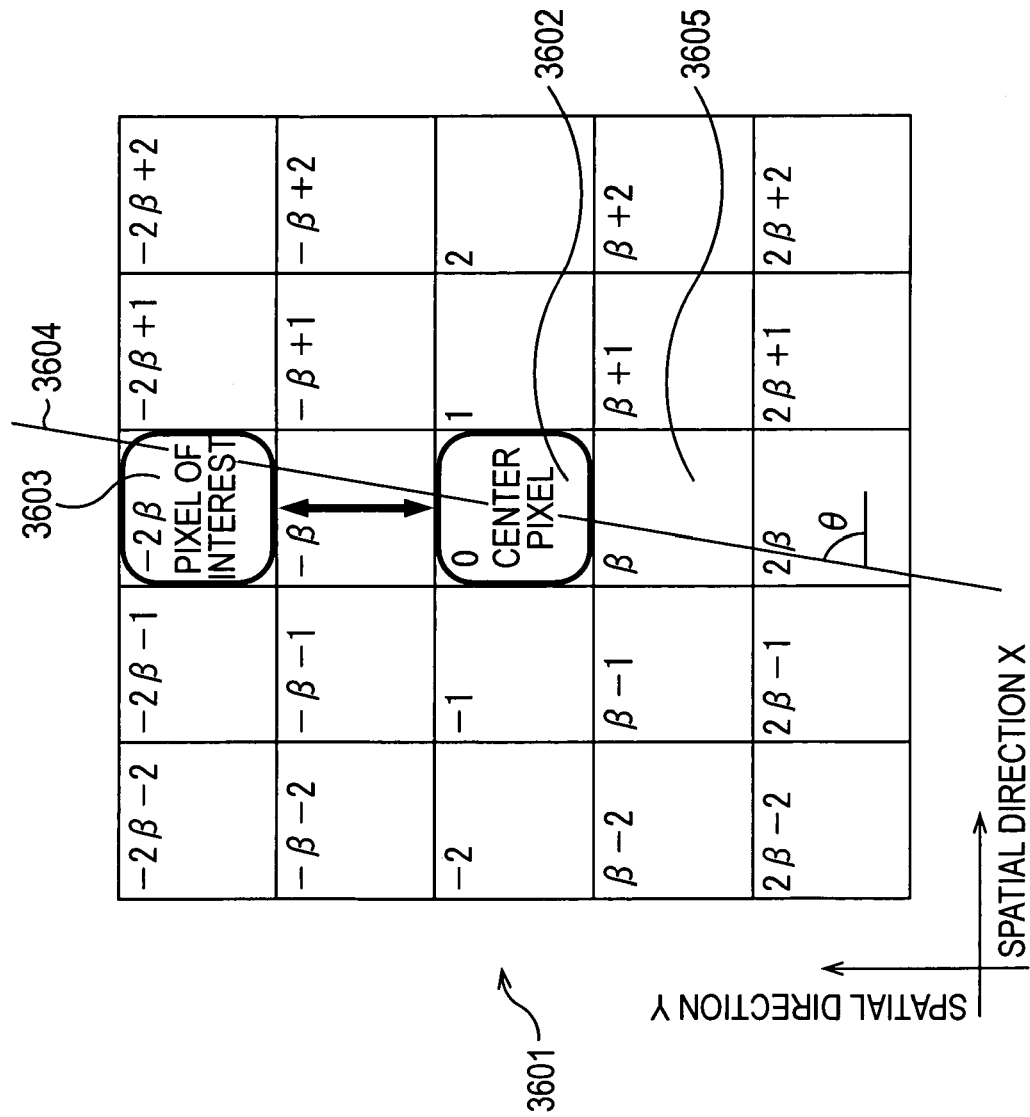

FIG. 196 is a diagram for describing an in-pixel gradient calculation method.

Figure 197:
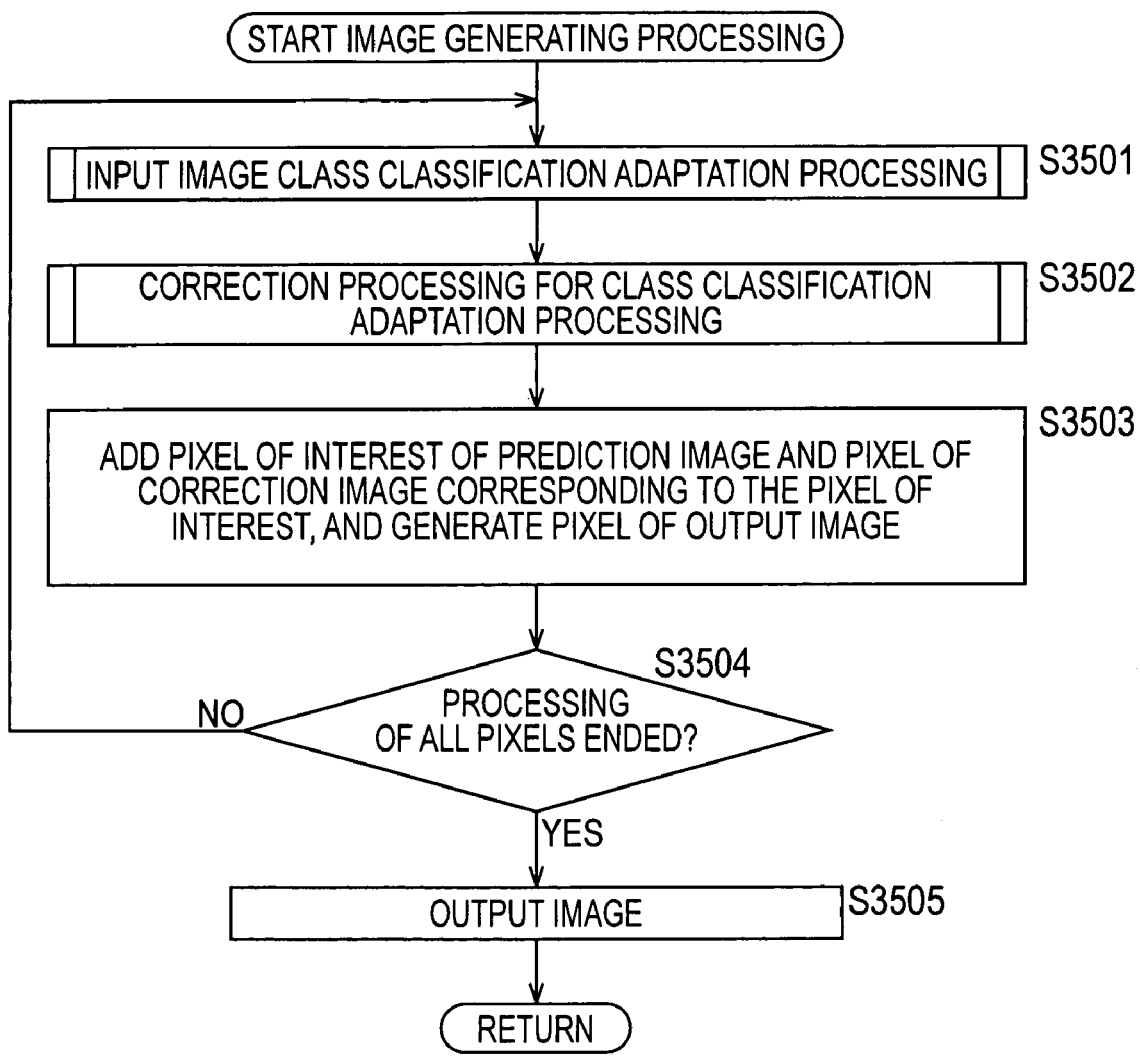

FIG. 197 is a flowchart for describing the image generating processing which the image generating unit of the configuration shown in FIG. 181 executes.

Figure 198:
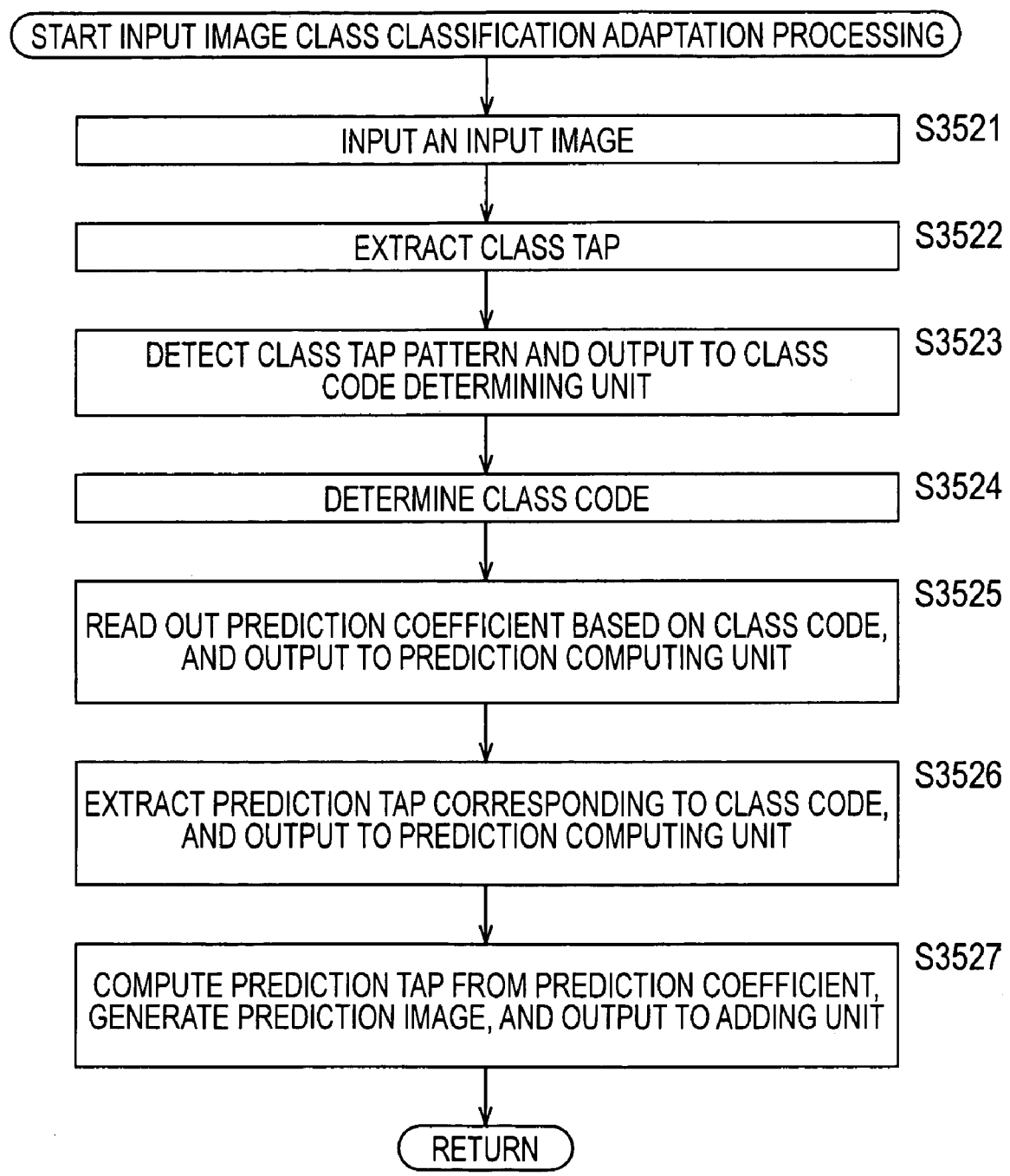

FIG. 198 is a flowchart describing detailed input image class classification adaptation processing in the image generating processing in FIG. 197.

Figure 199:
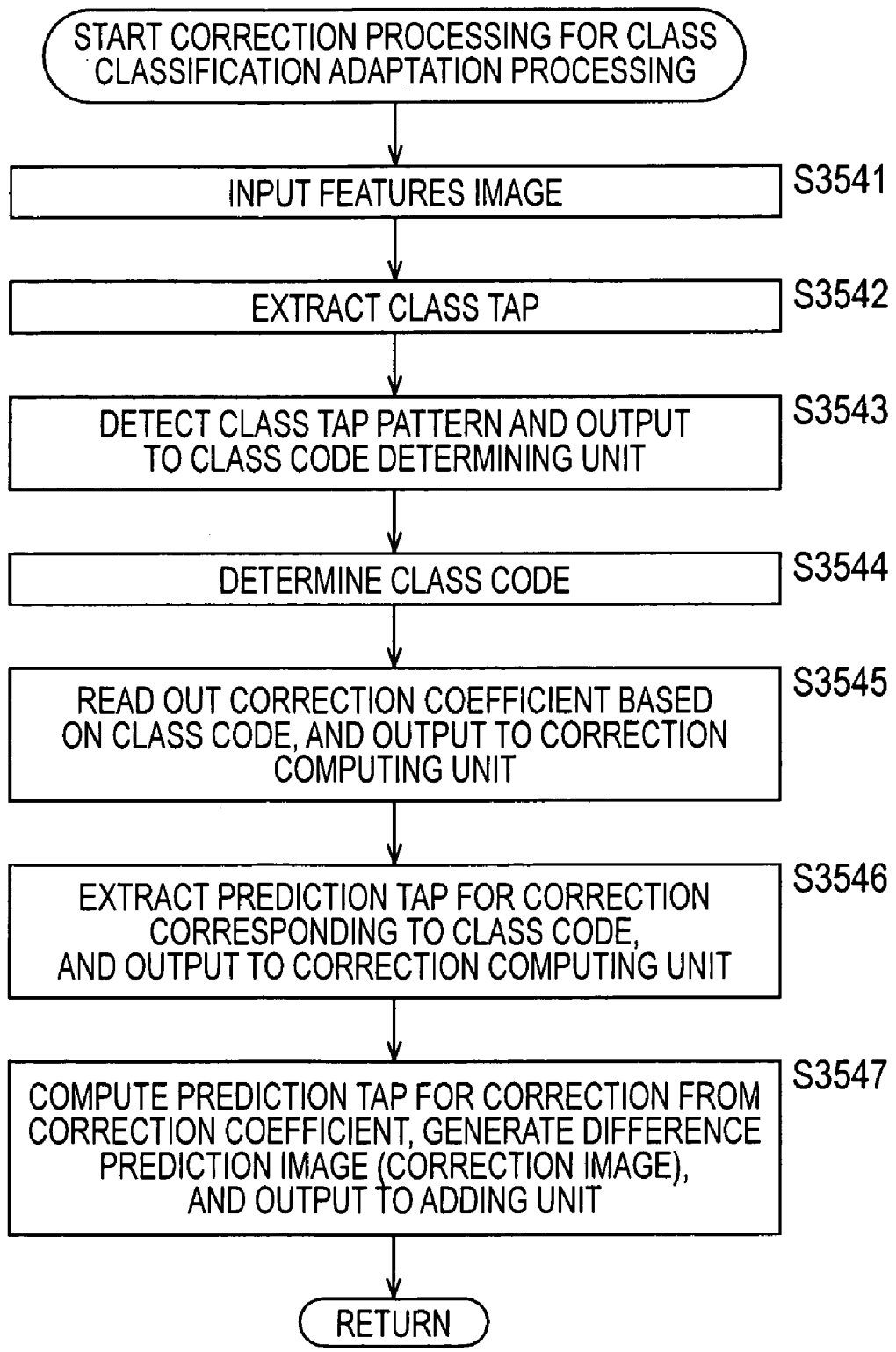

FIG. 199 is a flowchart for describing detailed correction processing of the class classification adaptation processing in the image generating processing in FIG. 197.

Figure 200:
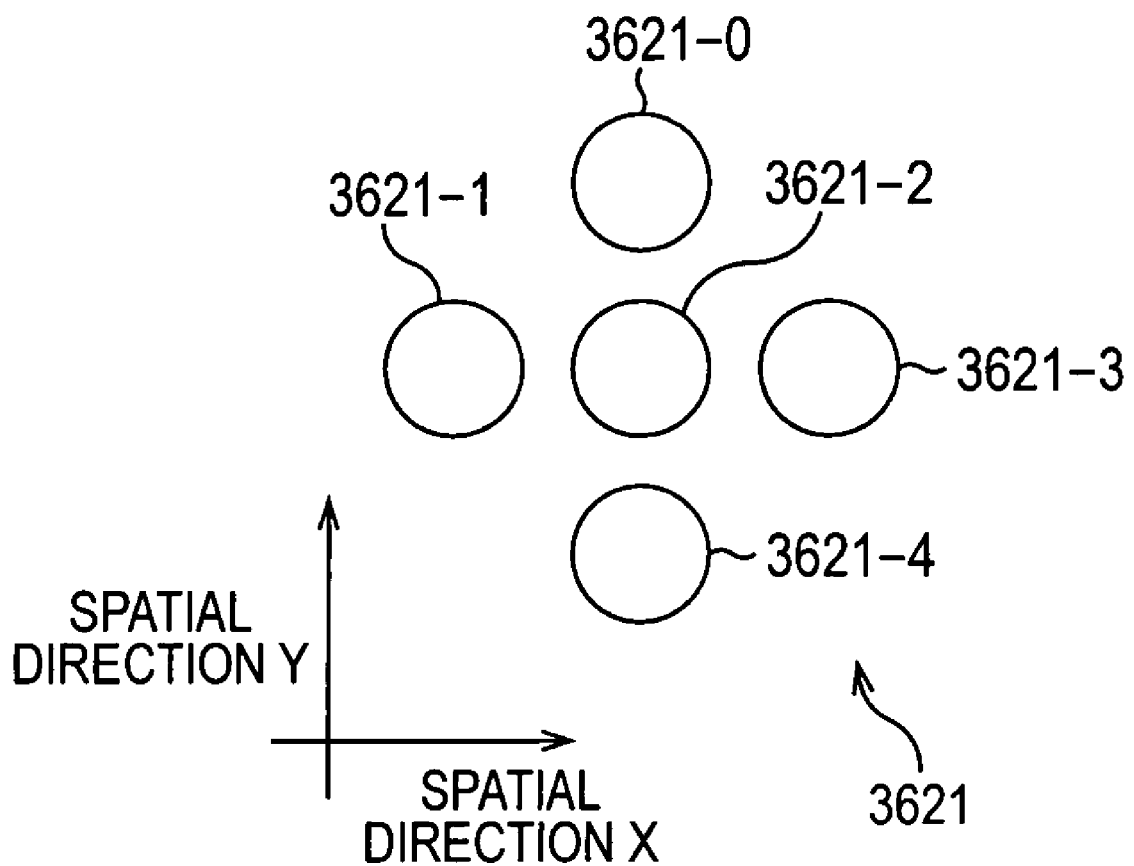

FIG. 200 is a diagram for describing an example of a class tap array.

Figure 201:
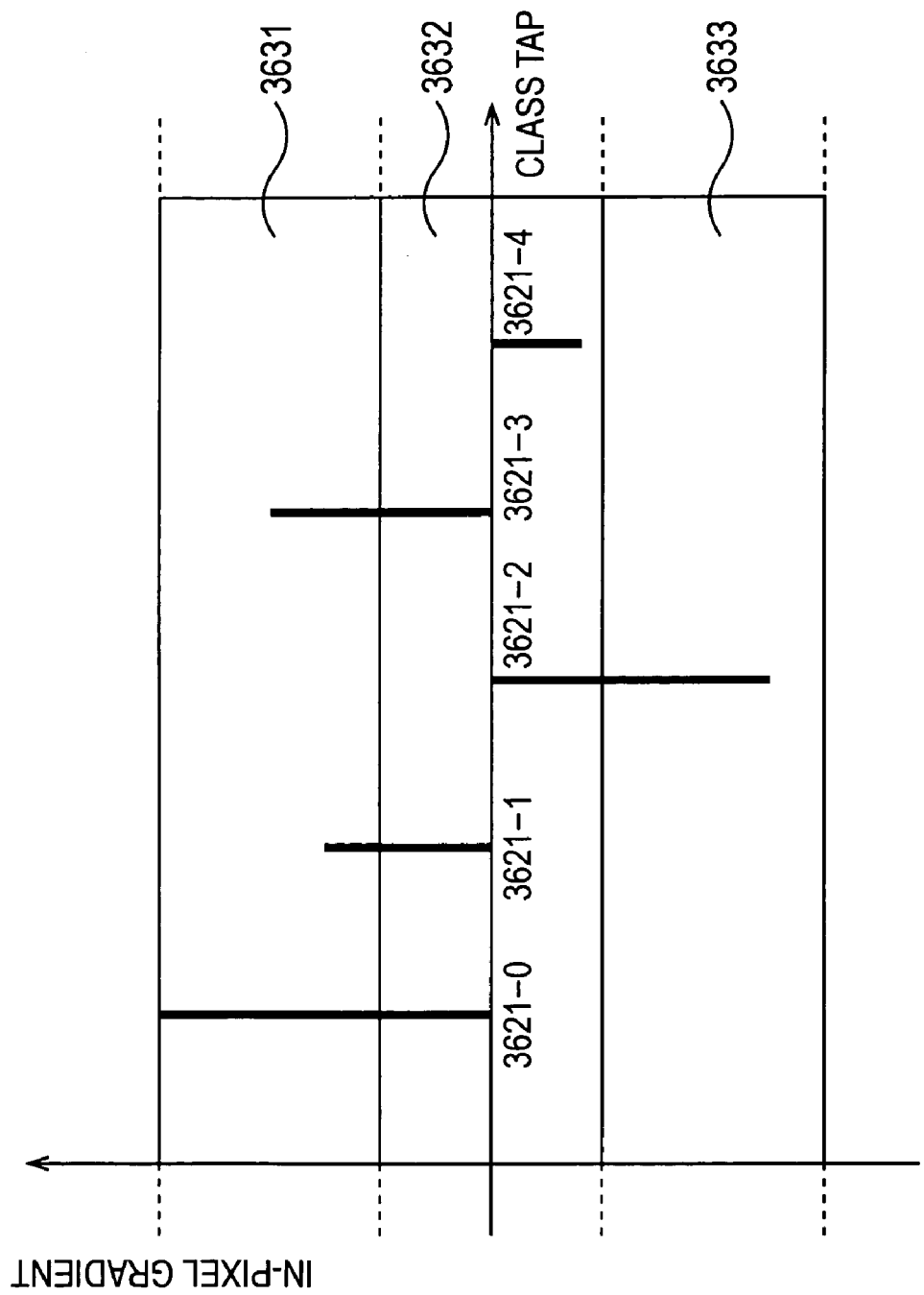

FIG. 201 is a diagram for describing an example of class classification.

Figure 202:
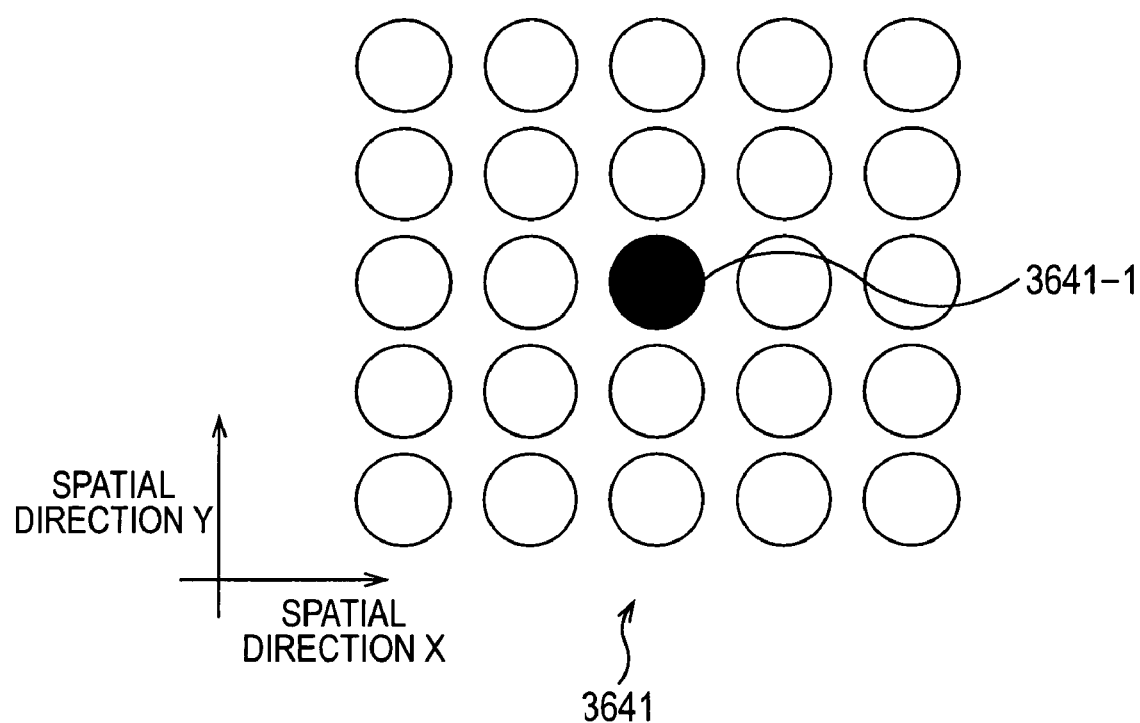

FIG. 202 is a diagram for describing an example of a prediction tap array.

Figure 203:
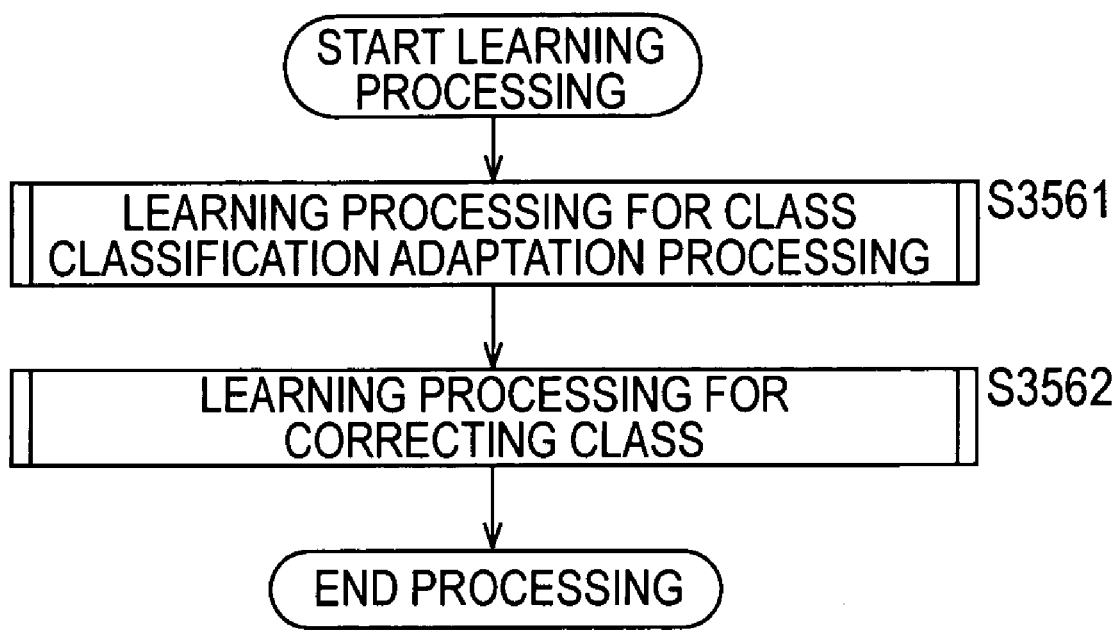

FIG. 203 is a flowchart for describing learning processing of the learning device shown in FIG. 183.

Figure 204:
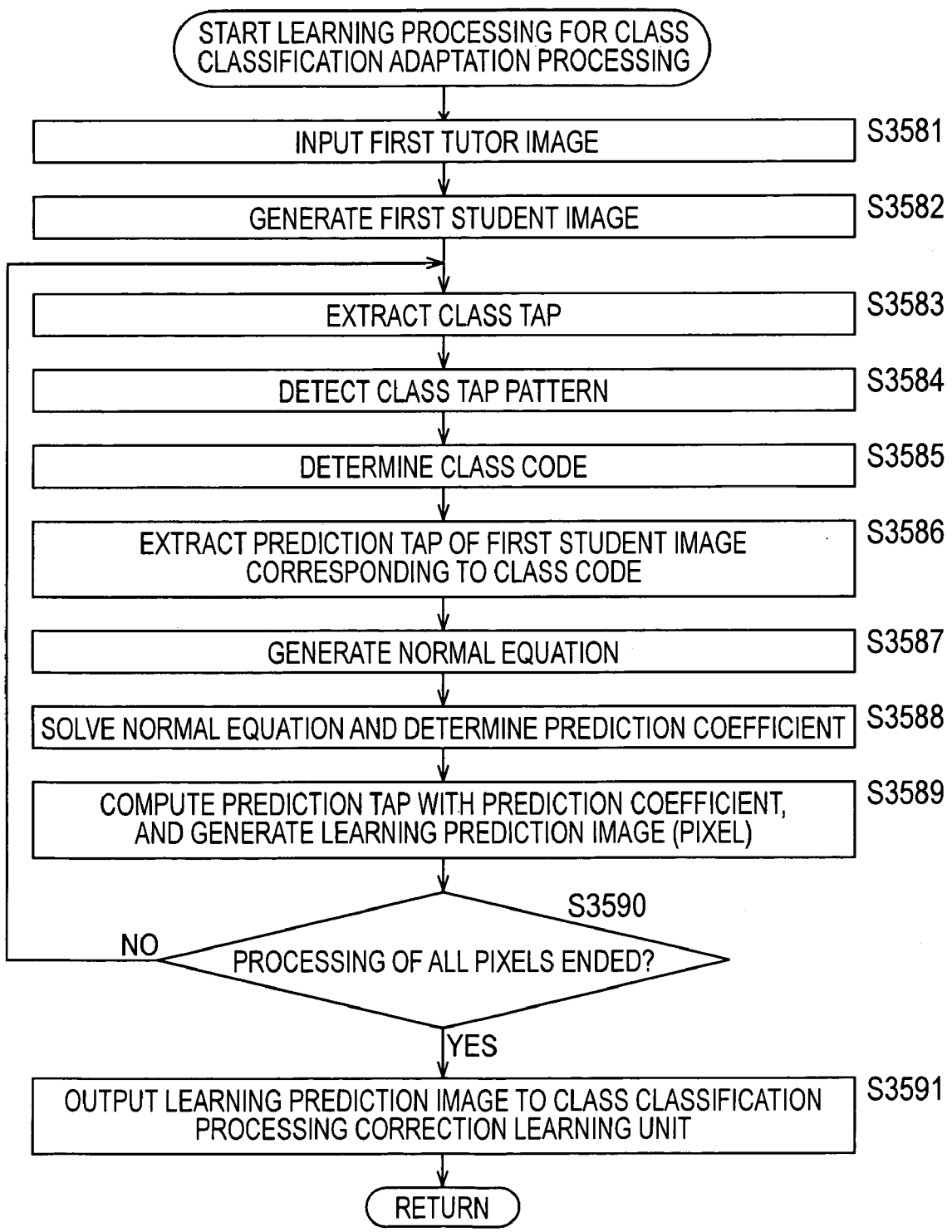

FIG. 204 is a flowchart for describing detailed learning processing for the class classification adaptation processing in the learning processing shown in FIG. 203.

Figure 205:
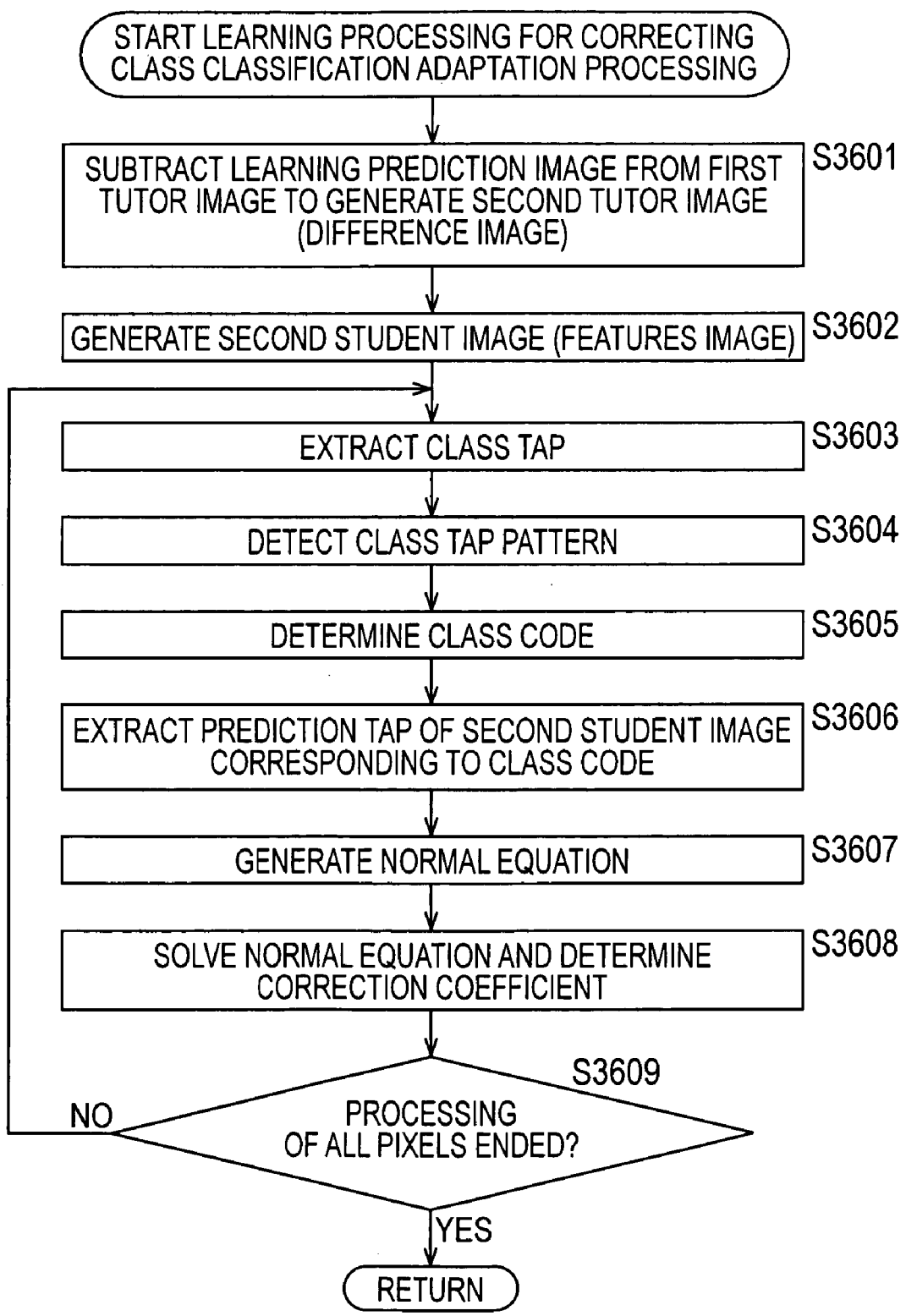

FIG. 205 is a flowchart for describing detailed learning processing for the class classification adaptation processing correction in the learning processing shown in FIG. 203.

Figure 206:

FIG. 206 is a diagram illustrating the prediction image shown in FIG. 185, and an image wherein a correction image is added to the prediction image (the image generated by the image generating unit shown in FIG. 181).

Figure 1:
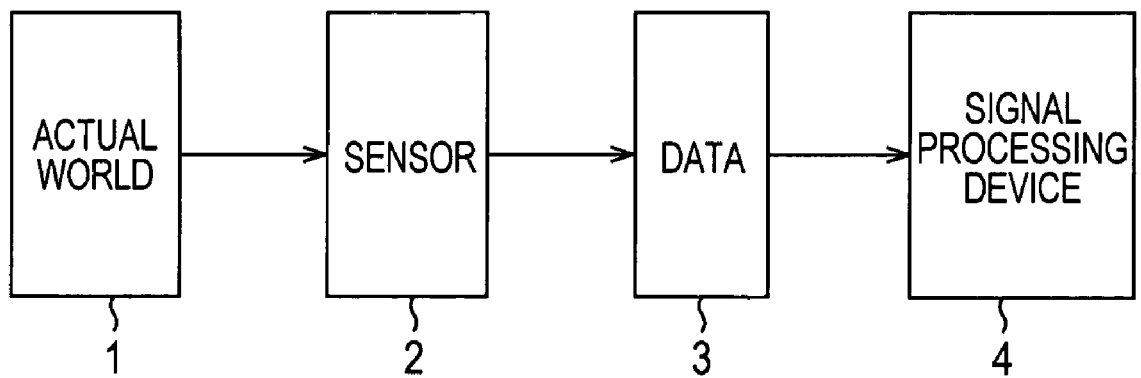
FIG. 1 is a diagram illustrating the principle of the present invention.
Figure 207:
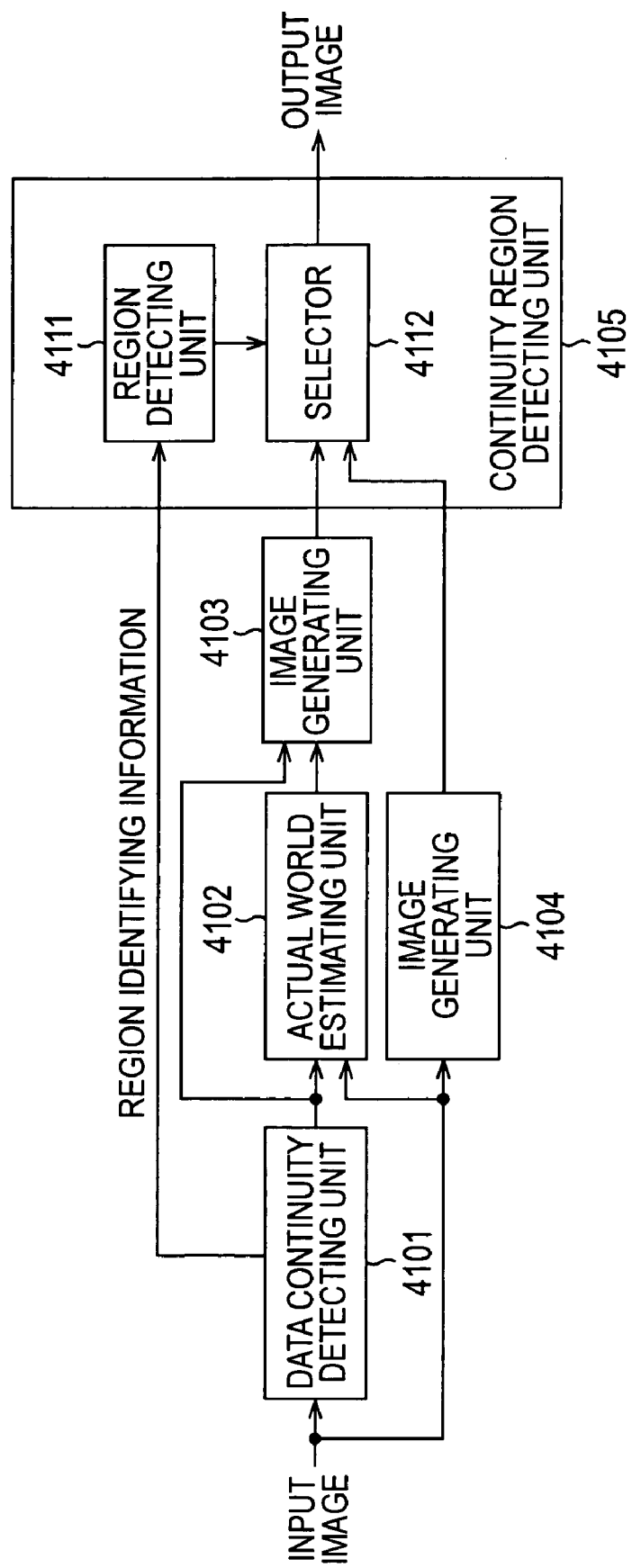

FIG. 207 is a block diagram describing a first configuration example of a signal processing device using a hybrid technique, which is another example of an embodiment of the signal processing device shown in FIG. 1.

Figure 208:
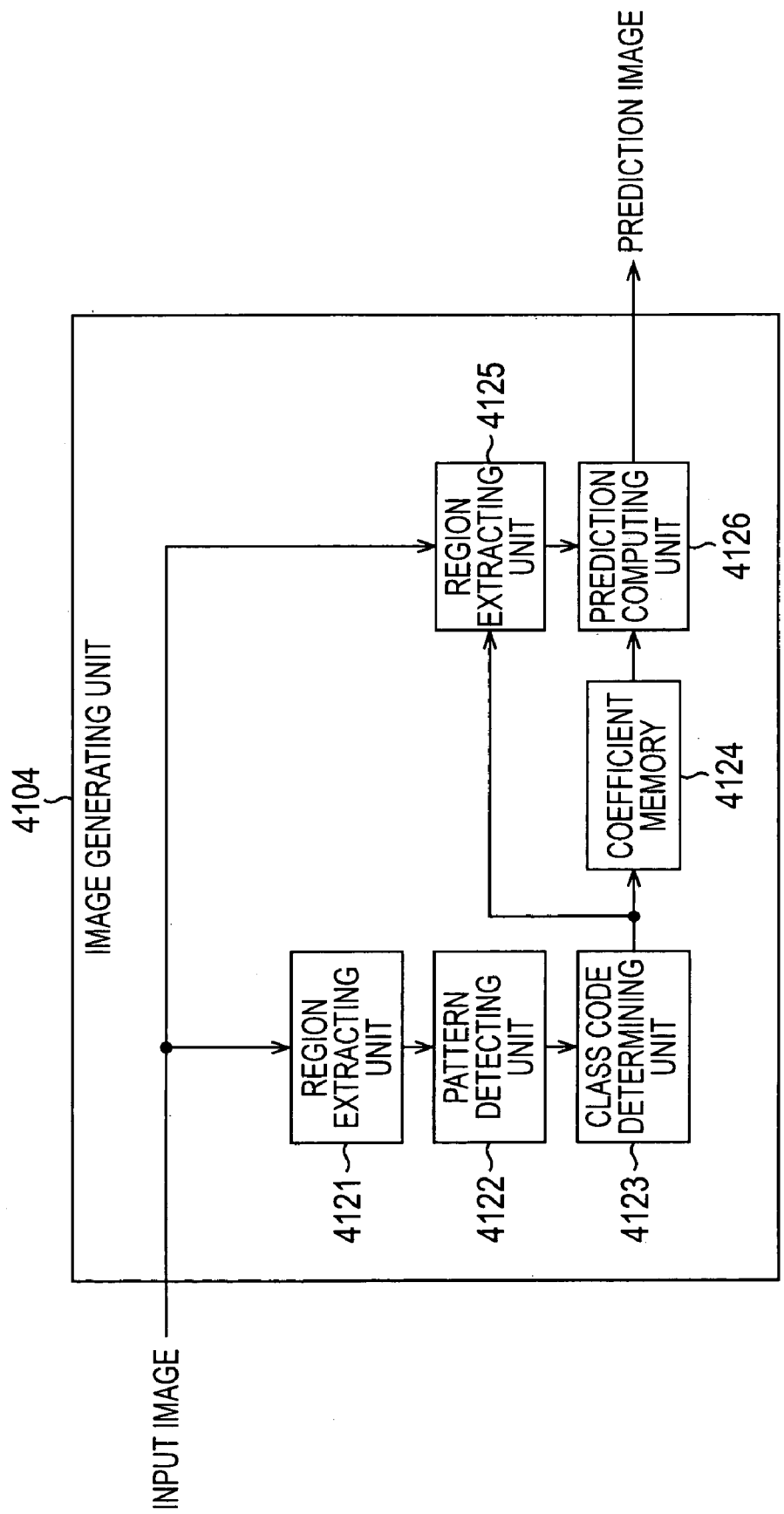

FIG. 208 is a block diagram for describing a configuration example of an image generating unit for executing the class classification adaptation processing of the signal processing device shown in FIG. 207.

Figure 209:
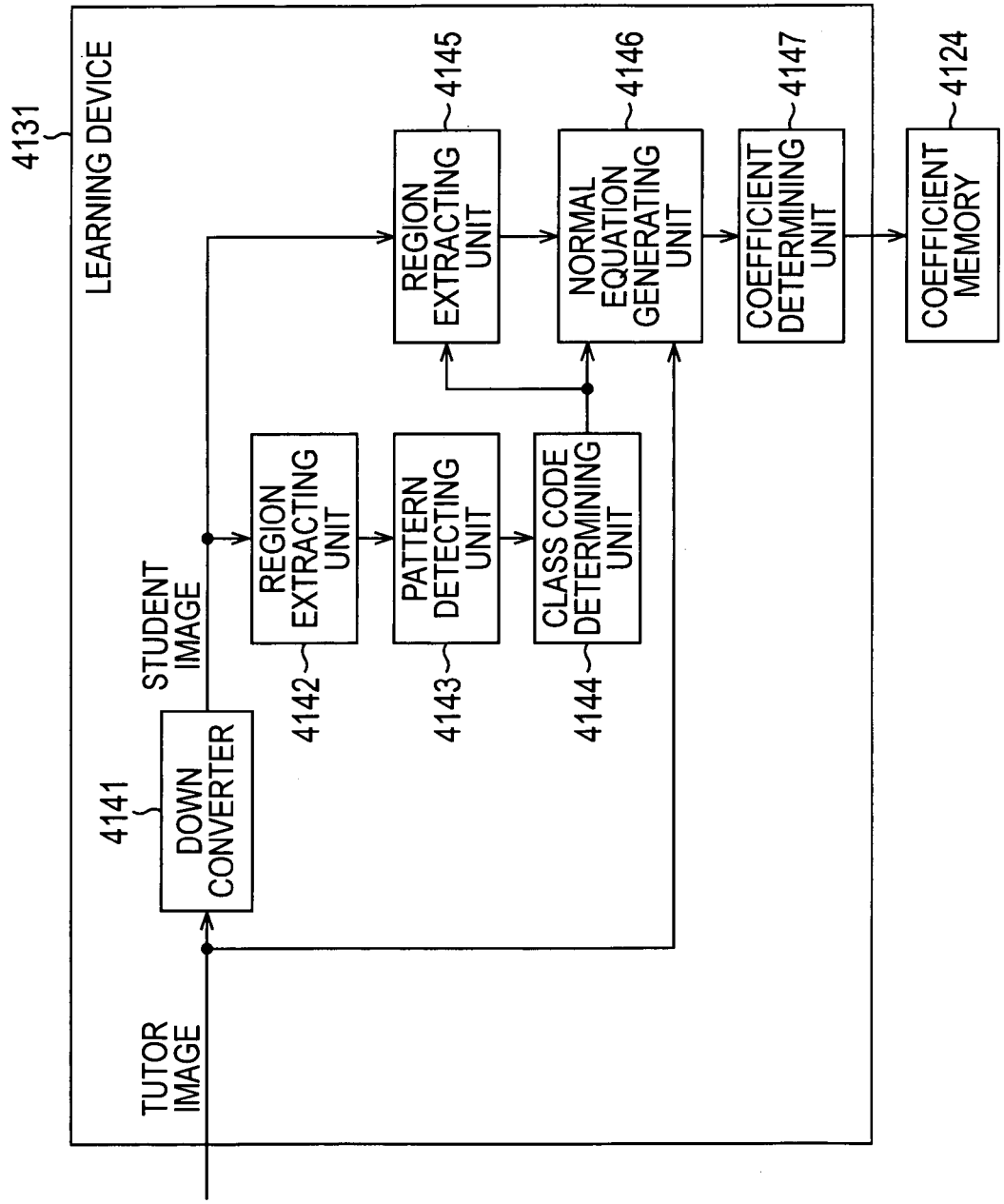

FIG. 209 is a block diagram for describing a configuration example of the learning device as to the image generating unit shown in FIG. 208.

Figure 210:
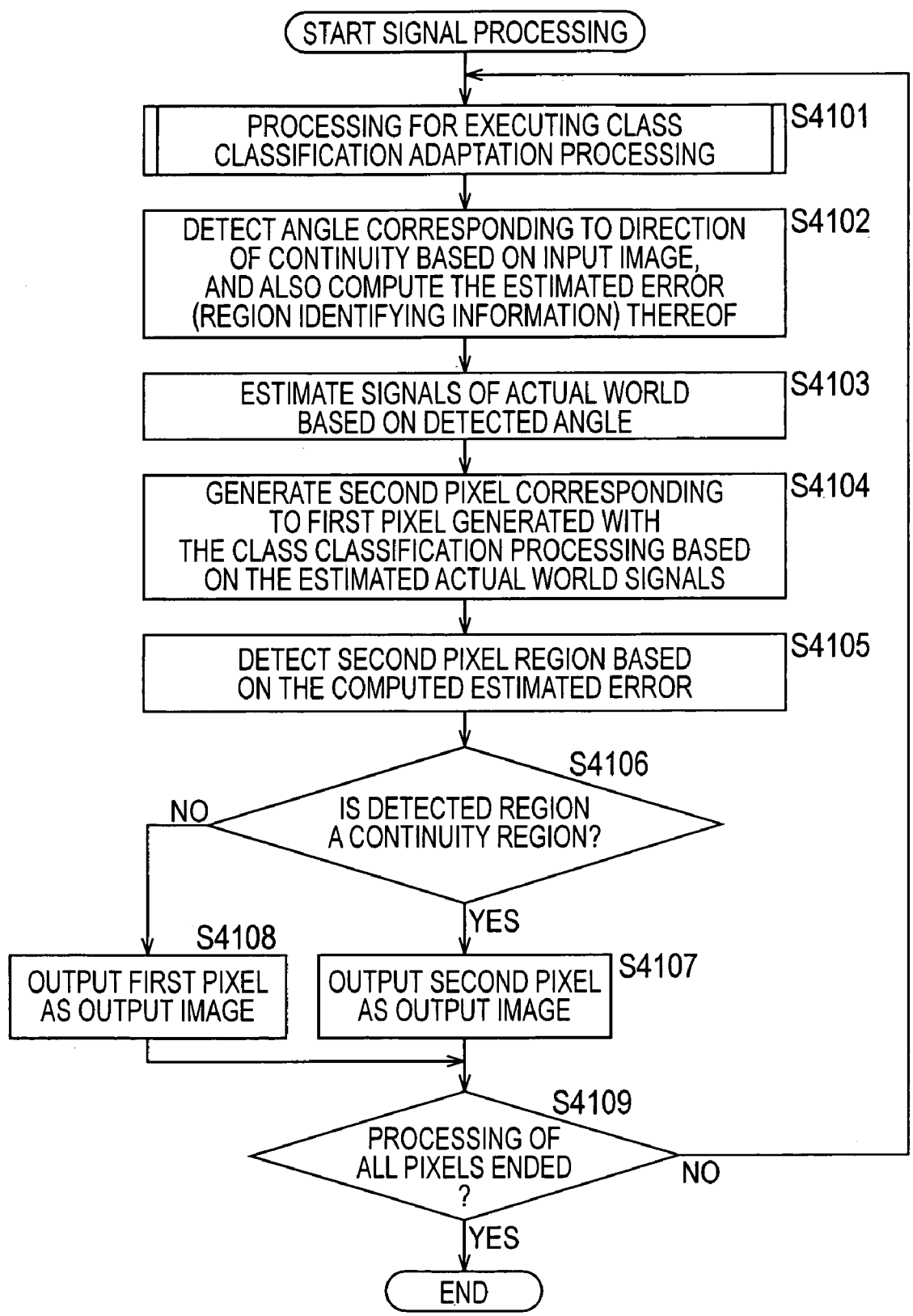

FIG. 210 is a flowchart for describing the processing of signals executed by the signal processing device of the configuration shown in FIG. 207.

Figure 211:
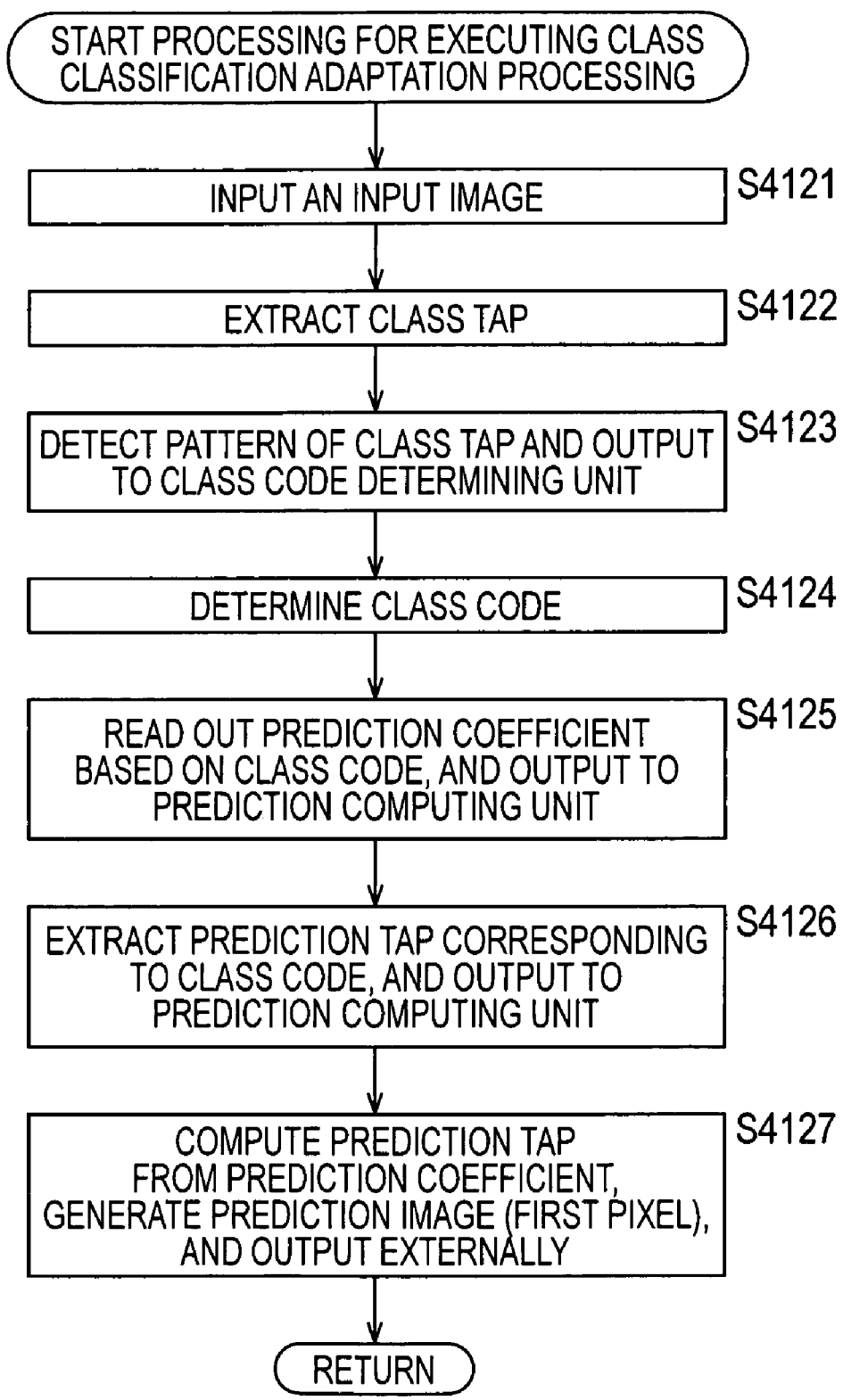

FIG. 211 is a flowchart for describing the details of executing processing of the class classification adaptation processing of the signal processing in FIG. 210.

Figure 212:
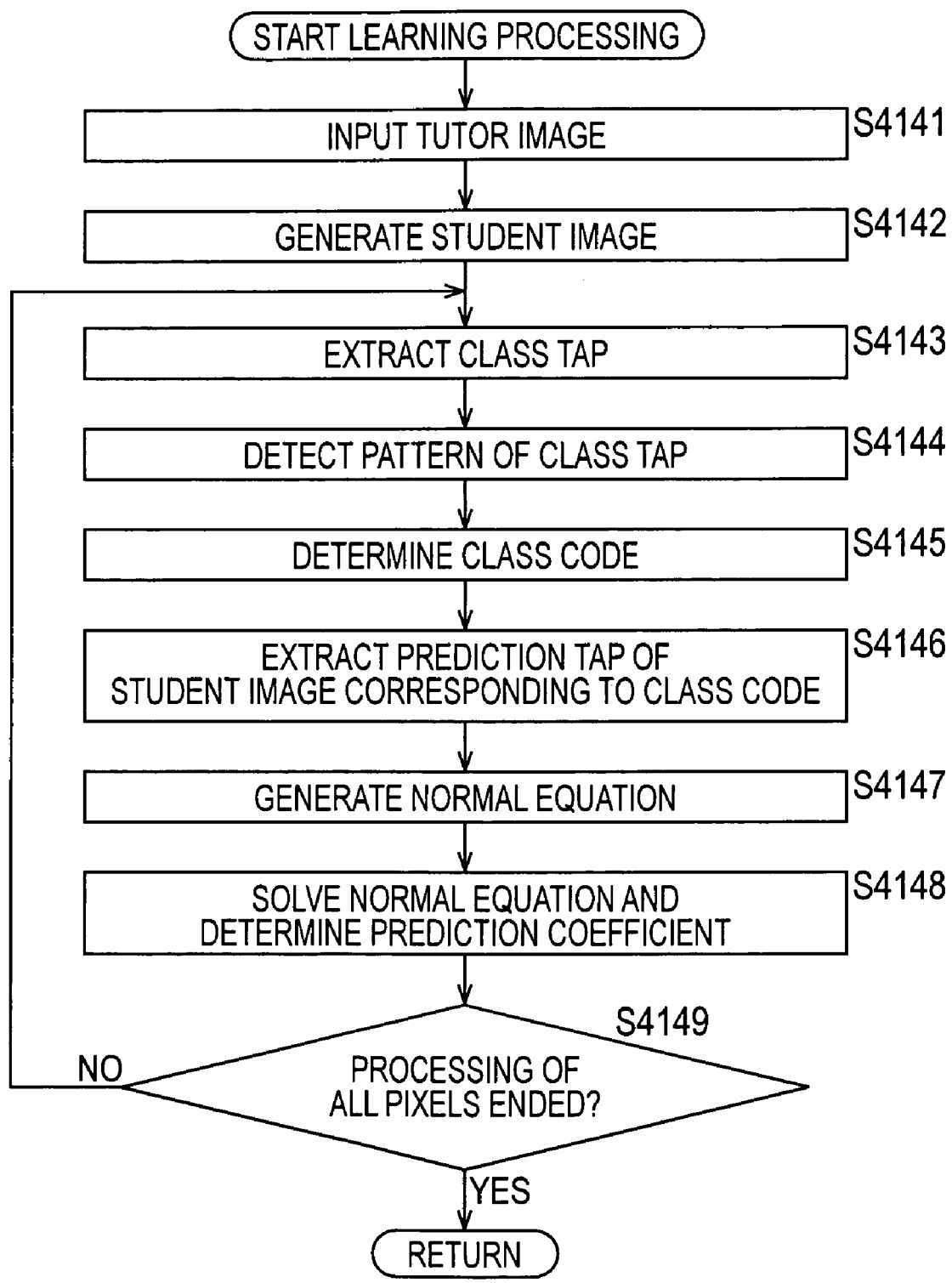

FIG. 212 is a flowchart for describing the learning processing of the learning device shown in FIG. 209.

Figure 213:
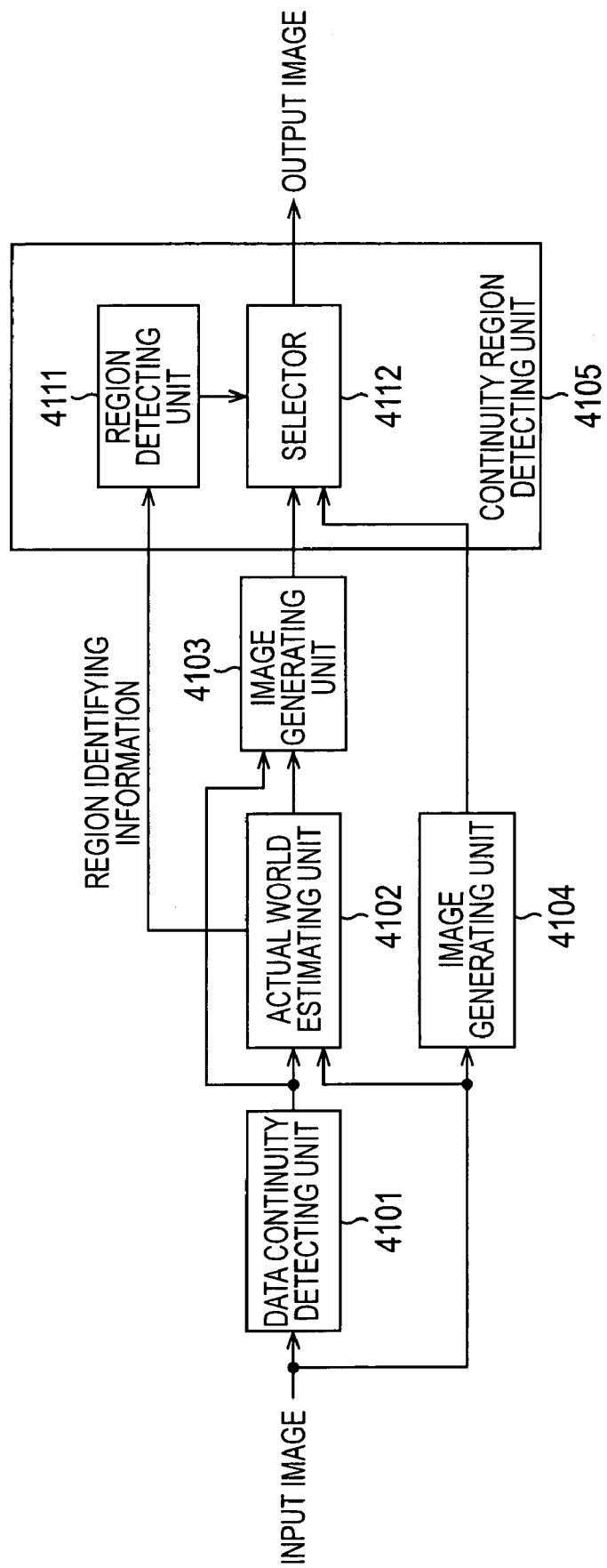

FIG. 213 is a block diagram describing a second configuration example of a signal processing device using a hybrid technique, which is another example of an embodiment of the signal processing device shown in FIG. 1.

Figure 214:
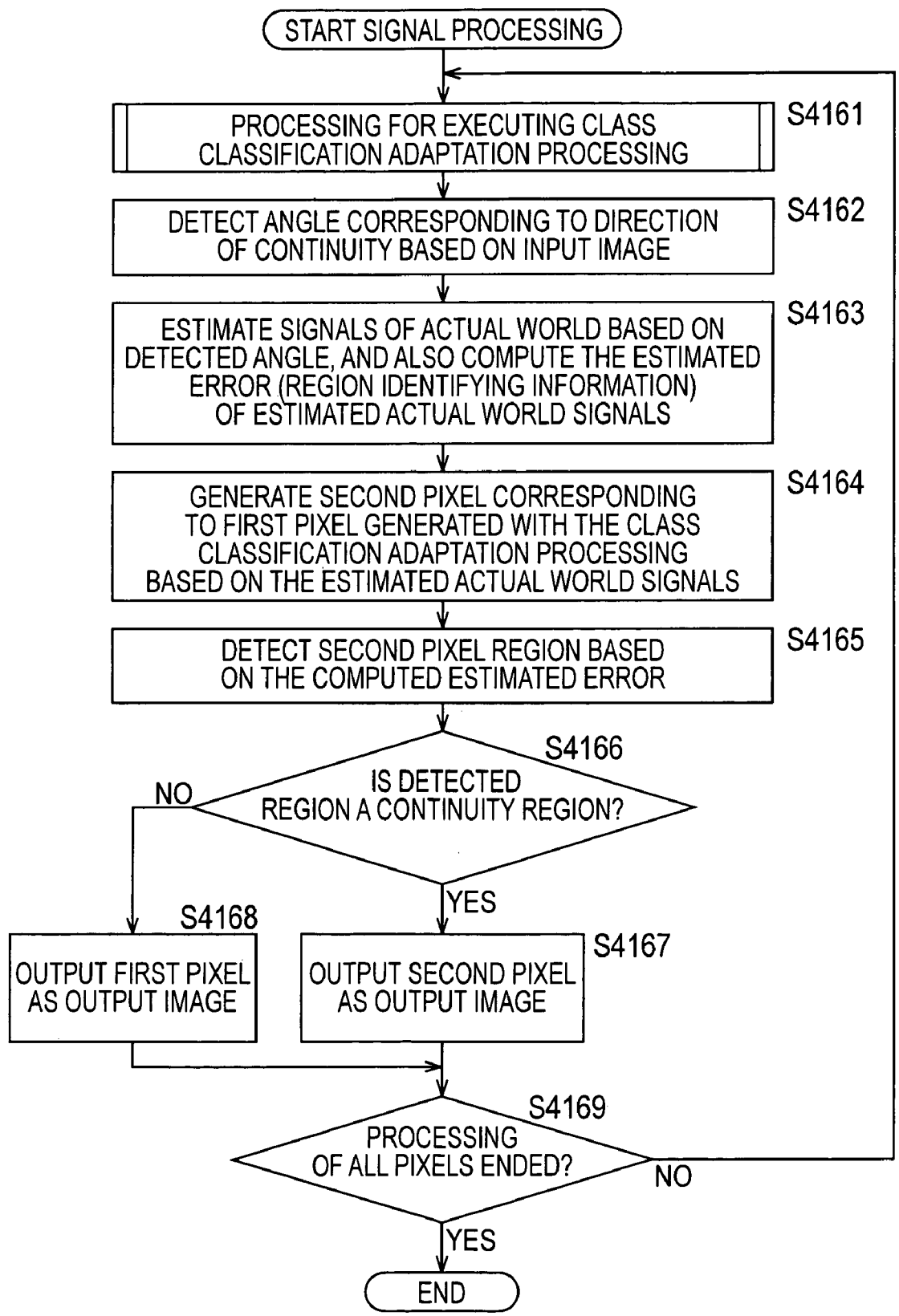

FIG. 214 is a flowchart for describing signal processing which the signal processing device of the configuration shown in FIG. 211 executes.

Figure 215:
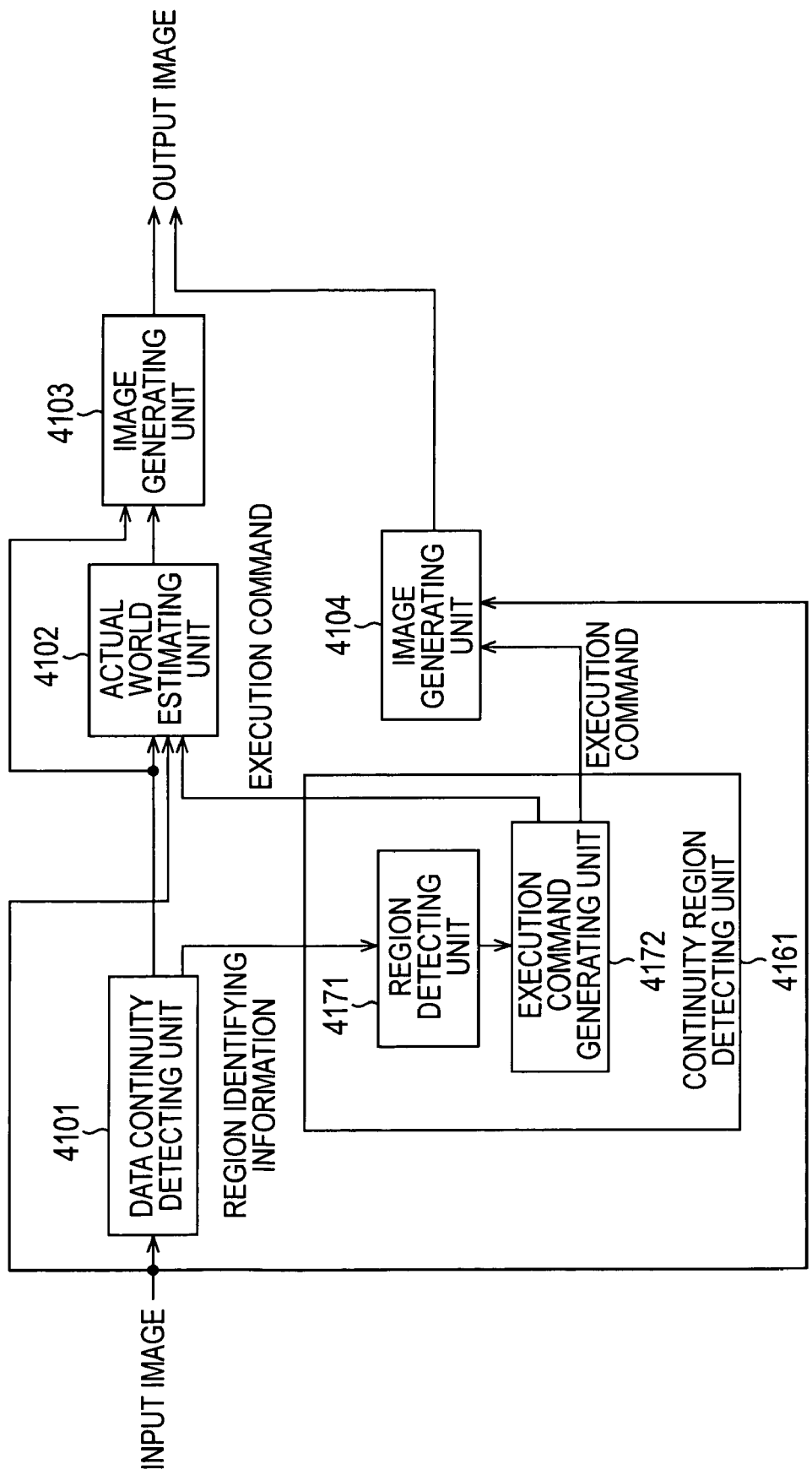

FIG. 215 is a block diagram describing a third configuration example of a signal processing device using a hybrid technique, which is another example of an embodiment of the signal processing device shown in FIG. 1.

Figure 216:
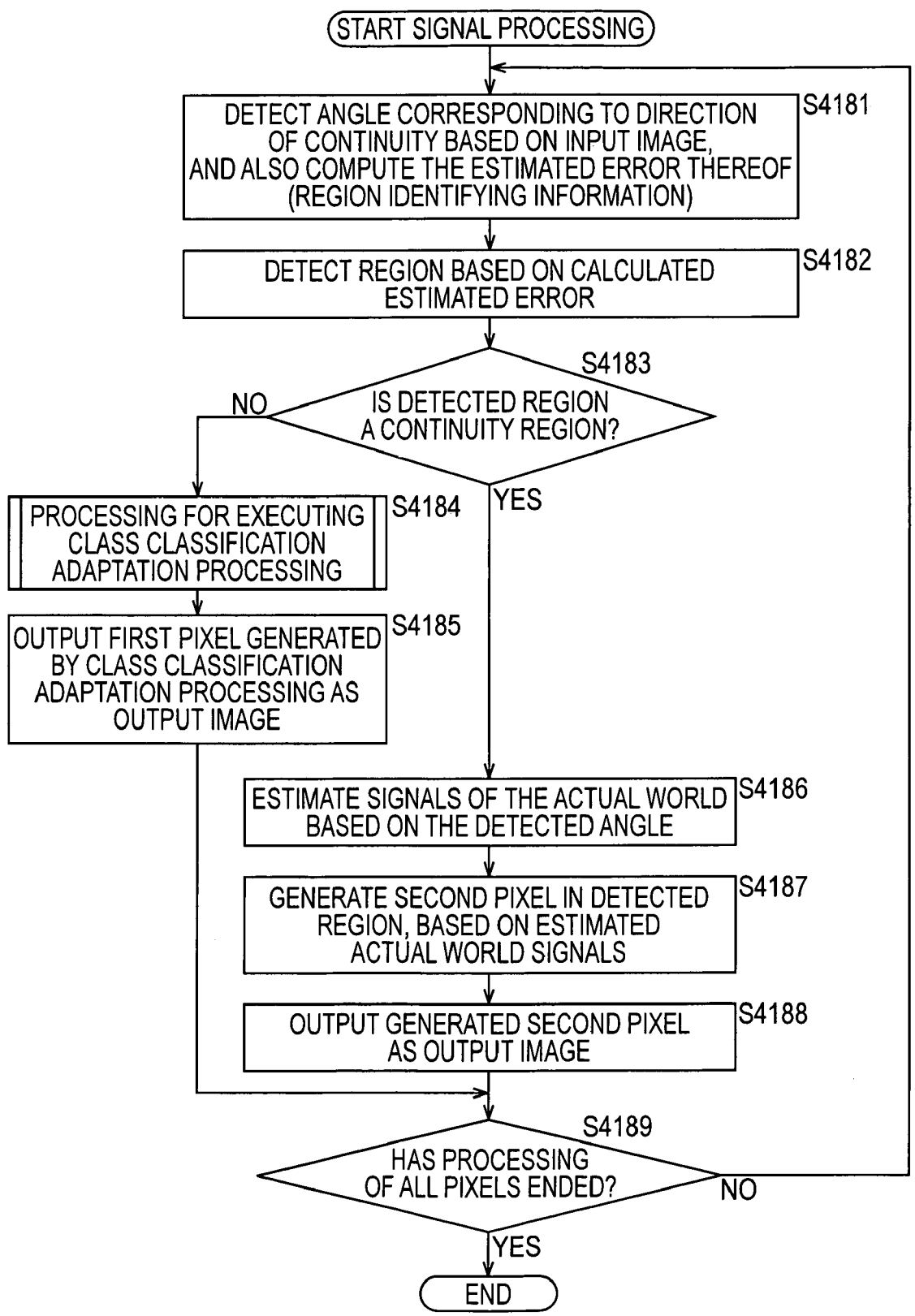

FIG. 216 is a flowchart for describing signal processing which the signal processing device of the configuration shown in FIG. 213 executes.

Figure 217:
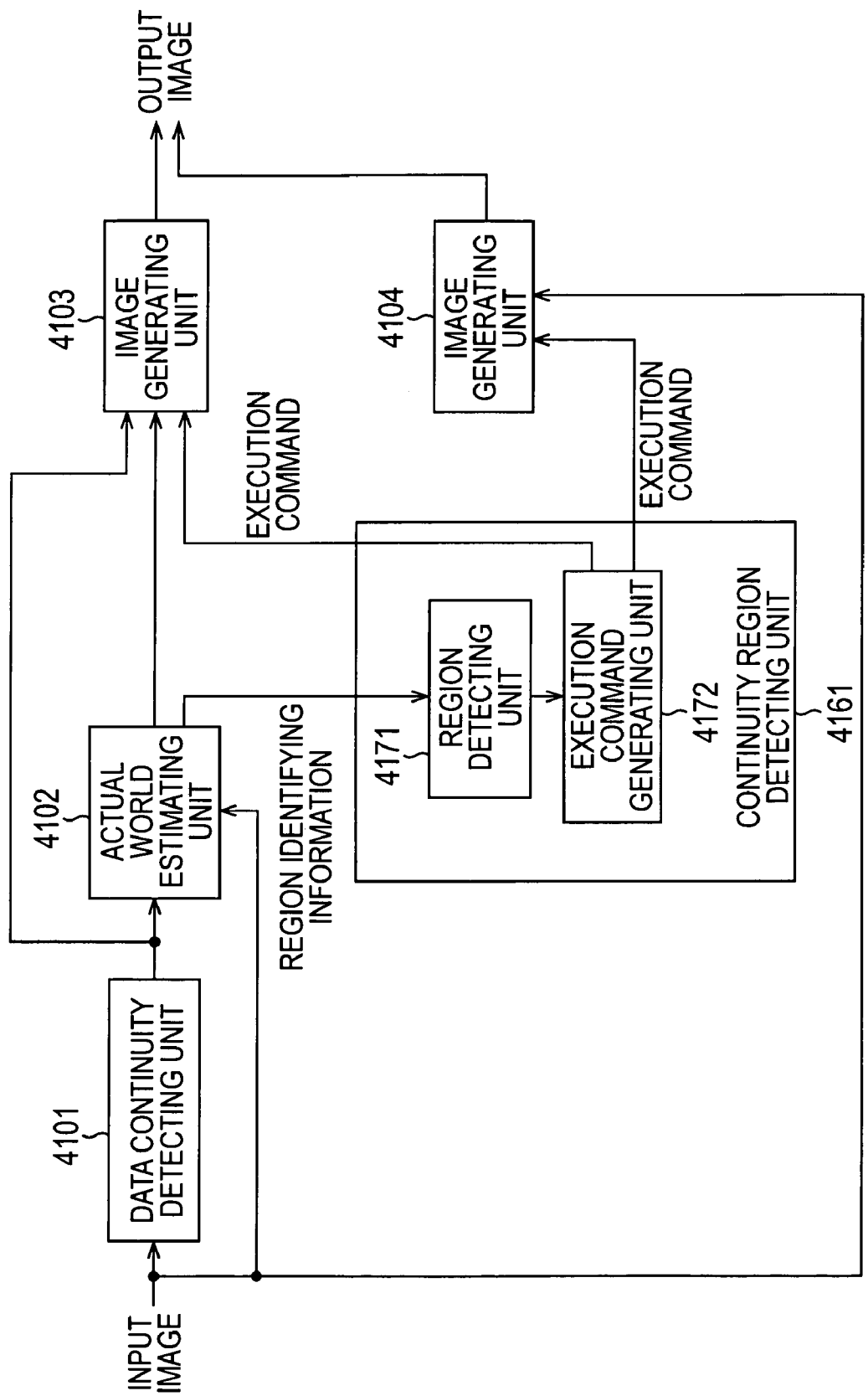

FIG. 217 is a block diagram describing a fourth configuration example of a signal processing device using a hybrid technique, which is another example of an embodiment of the signal processing device shown in FIG. 1.

Figure 218:
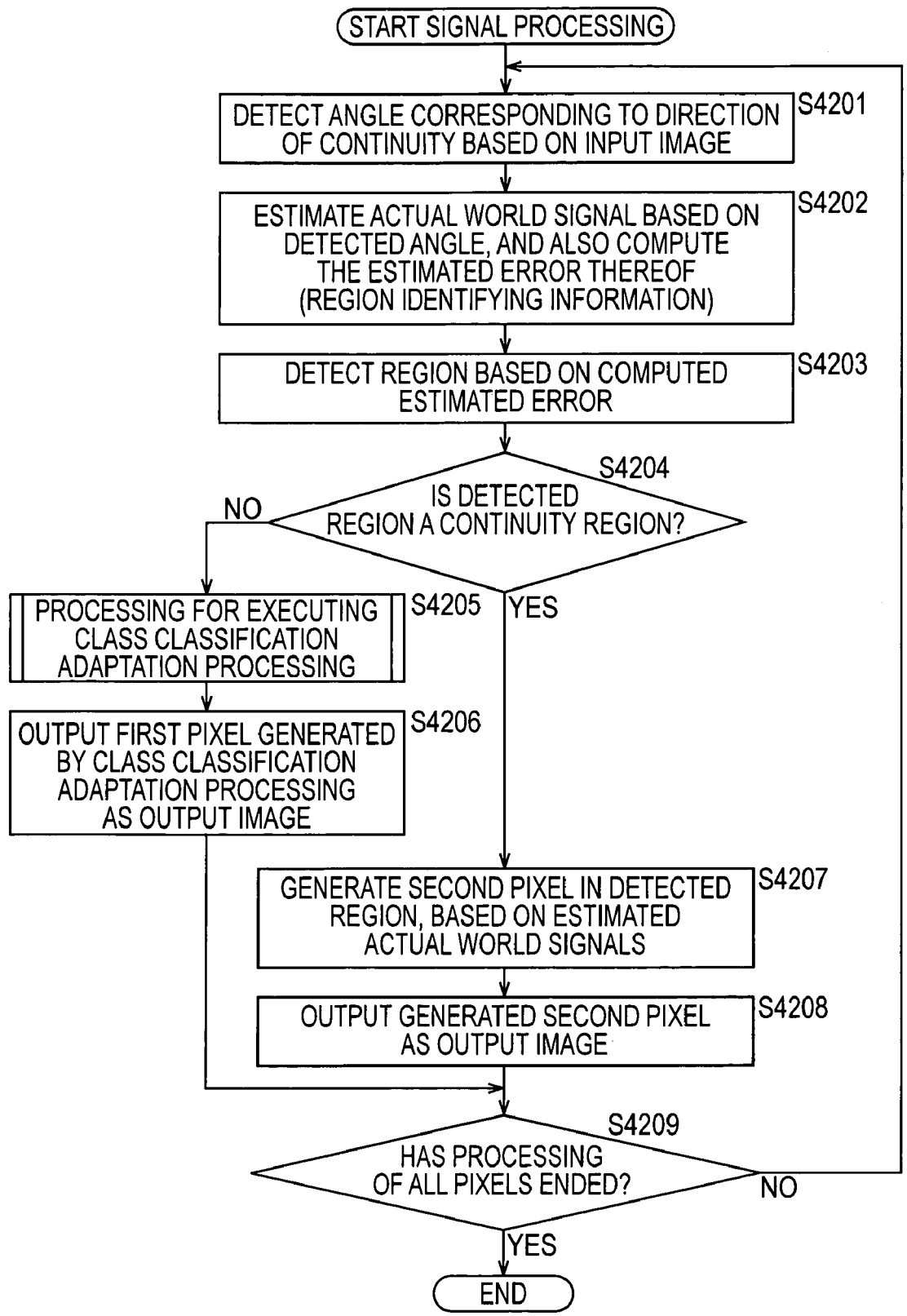

FIG. 218 is a flowchart for describing signal processing which the signal processing device of the configuration shown in FIG. 215 executes.

Figure 219:
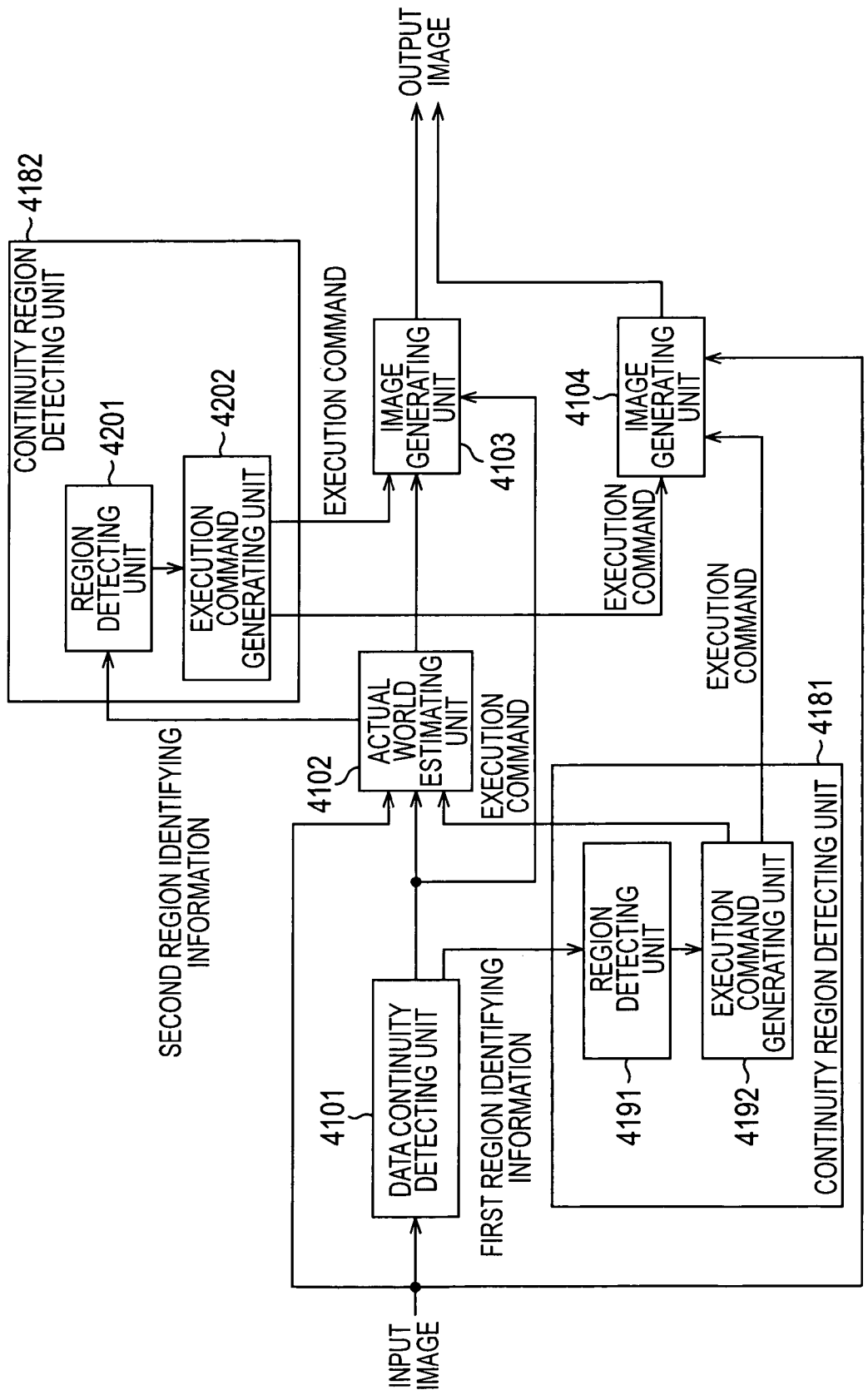

FIG. 219 is a block diagram describing a fifth configuration example of a signal processing device using a hybrid technique, which is another example of an embodiment of the signal processing device shown in FIG. 1.

Figure 220:
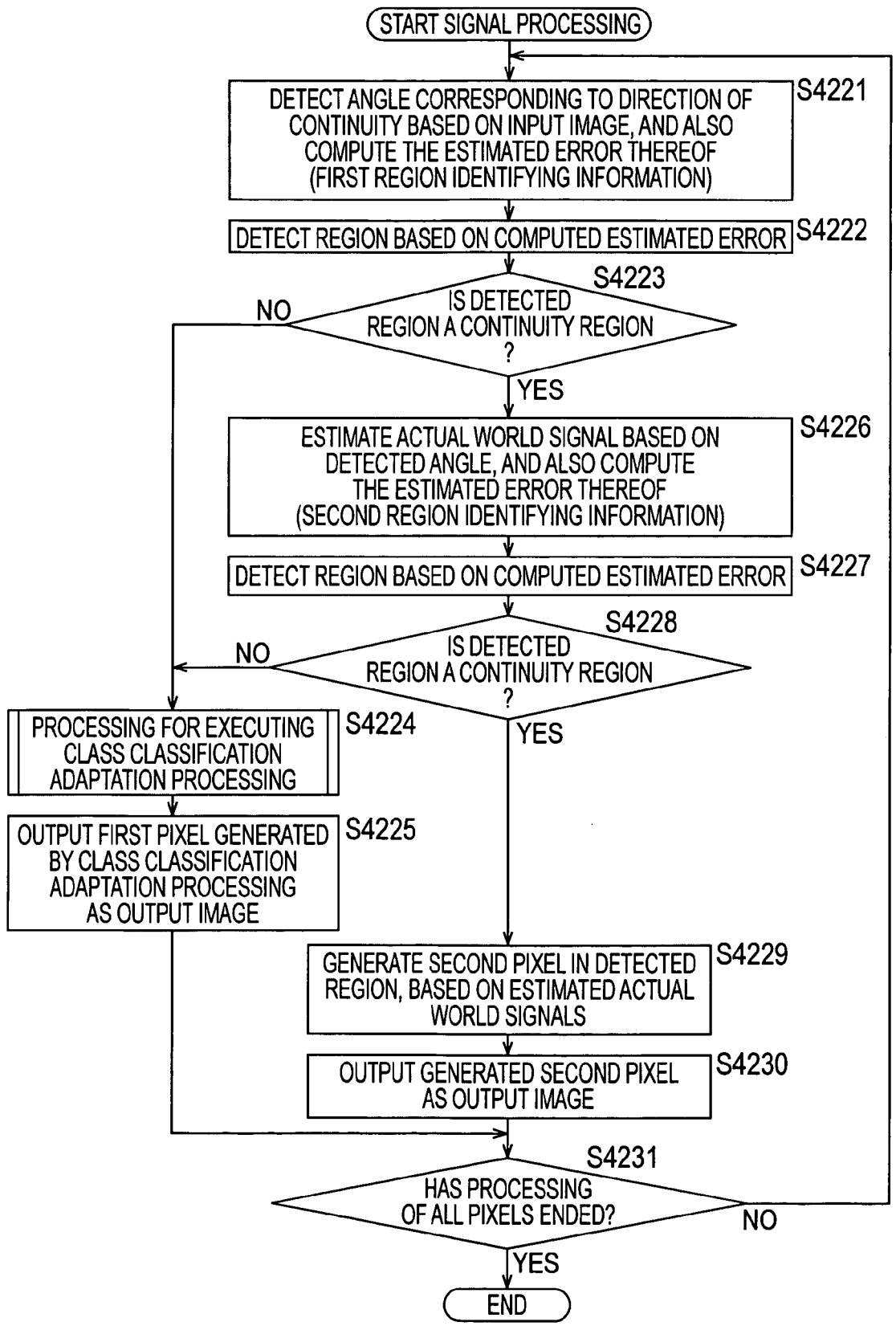

FIG. 220 is a flowchart for describing signal processing which the signal processing device of the configuration shown in FIG. 217 executes.

Figure 221:
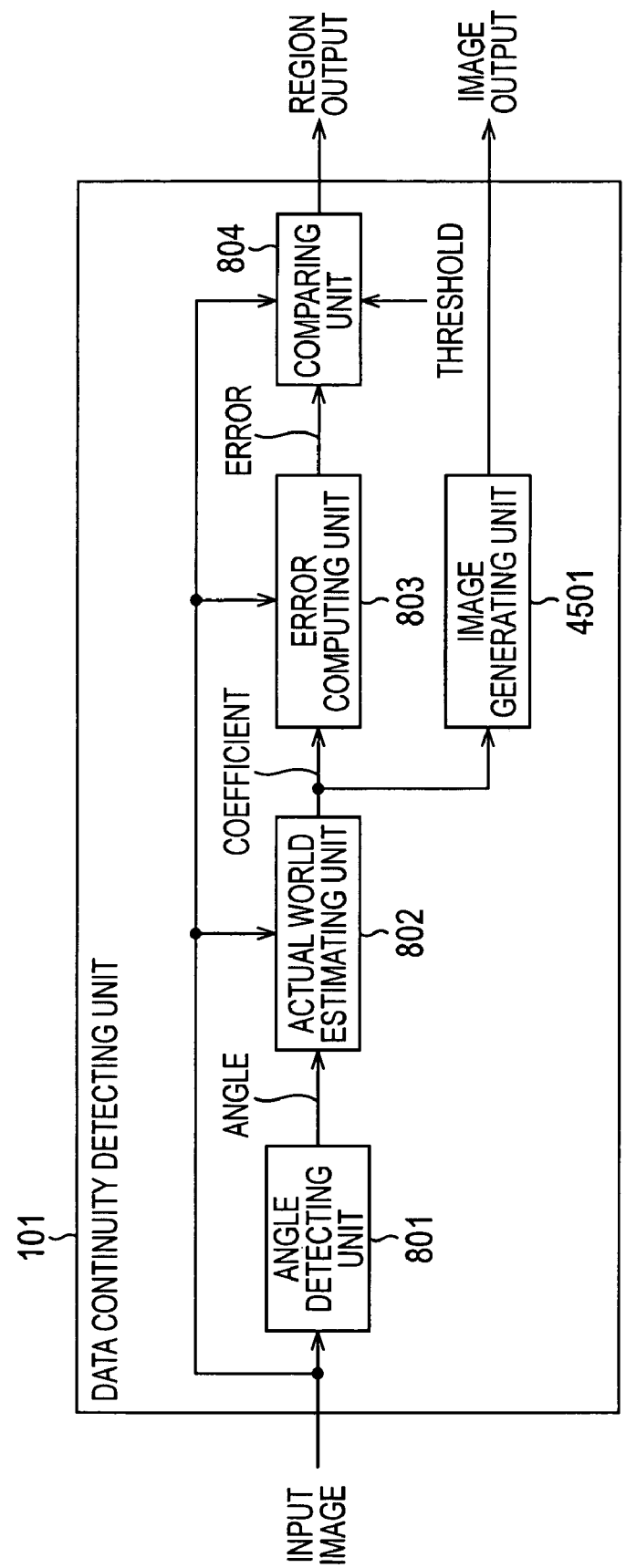

FIG. 221 is a block diagram illustrating the configuration of another embodiment of the data continuity detecting unit.

Figure 222:
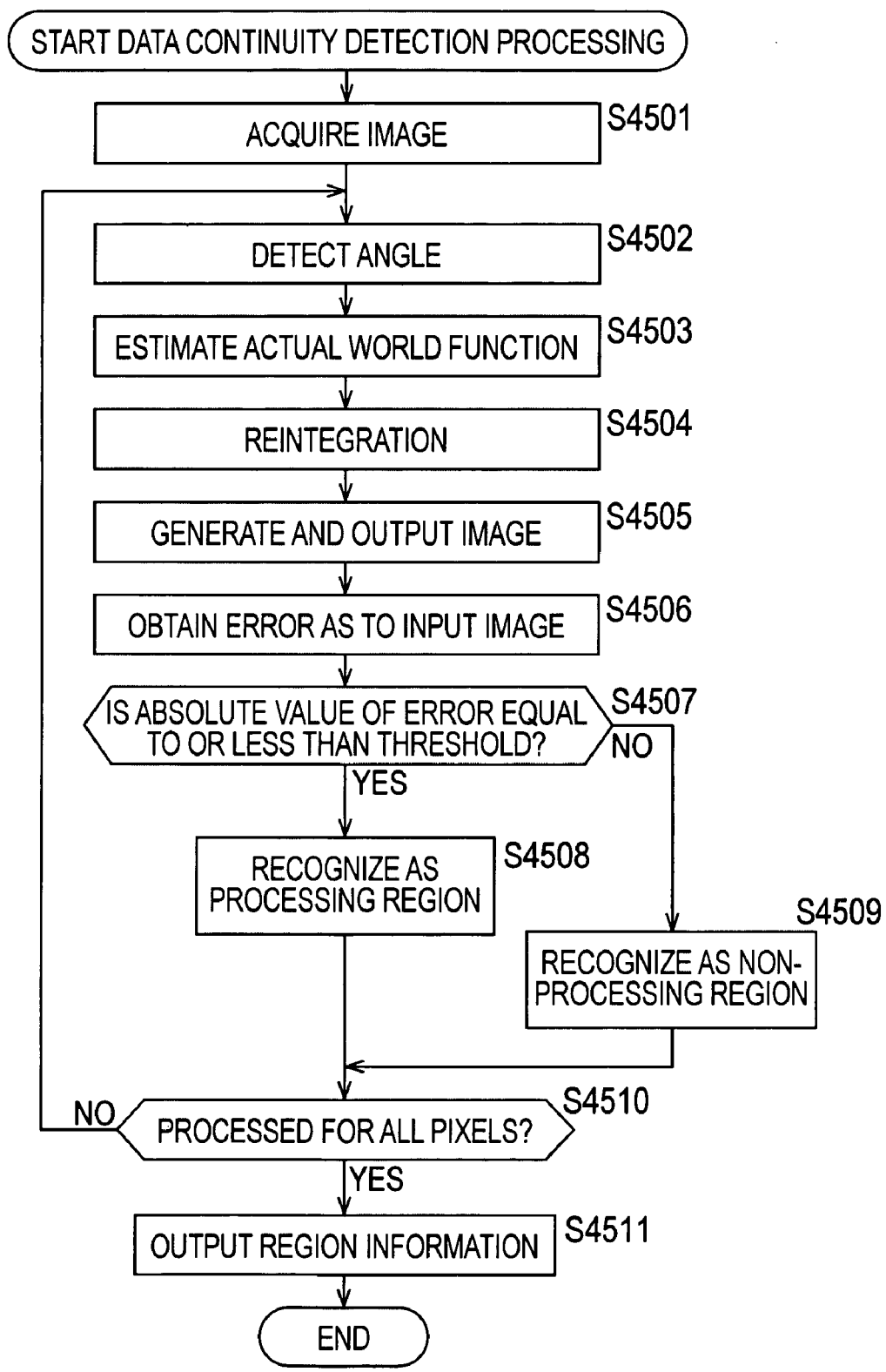

FIG. 222 is a flowchart for describing data continuity detecting processing with the data continuity detecting unit shown in FIG. 221.

BEST MODE FOR CARRYING OUT THE INVENTION

FIG. 1 illustrates the principle of the present invention. As shown in the drawing, events (phenomena) in an actual world 1 having dimensions such as space, time, mass, and so forth, are acquired by a sensor 2, and formed into data. Events in the actual world 1 refer to light (images), sound, pressure, temperature, mass, humidity, brightness/darkness, or acts, and so forth. The events in the actual world 1 are distributed in the space-time directions. For example, an image of the actual world 1 is a distribution of the intensity of light of the actual world 1 in the space-time directions.

Taking note of the sensor 2, of the events in the actual world 1 having the dimensions of space, time, and mass, the events in the actual world 1 which the sensor 2 can acquire, are converted into data 3 by the sensor 2. It can be said that information indicating events in the actual world 1 are acquired by the sensor 2.

That is to say, the sensor 2 converts information indicating events in the actual world 1, into data 3. It can be said that signals which are information indicating the events (phenomena) in the actual world 1 having dimensions such as space, time, and mass, are acquired by the sensor 2 and formed into data.

Hereafter, the distribution of events such as light (images), sound, pressure, temperature, mass, humidity, rightness/darkness, or smells, and so forth, in the actual world 1, will be referred to as signals of the actual world 1, which are information indicating events. Also, signals which are information indicating events of the actual world 1 will also be referred to simply as signals of the actual world 1. In the present Specification, signals are to be understood to include phenomena and events, and also include those wherein there is no intent on the transmitting side.

The data 3 (detected signals) output from the sensor 2 is information obtained by projecting the information indicating the events of the actual world 1 on a space-time having a lower dimension than the actual world 1. For example, the data 3 which is image data of a moving image, is information obtained by projecting an image of the three-dimensional space direction and time direction of the actual world 1 on the time-space having the two-dimensional space direction and time direction. Also, in the event that the data 3 is digital data for example, the data 3 is rounded off according to the sampling increments. In the event that the data 3 is analog data, information of the data 3 is either compressed according to the dynamic range, or a part of the information has been deleted by a limiter or the like.

Thus, by projecting the signals shown are information indicating events in the actual world 1 having a predetermined number of dimensions onto data 3 (detection signals), a part of the information indicating events in the actual world 1 is dropped. That is to say, a part of the information indicating events in the actual world 1 is dropped from the data 3 which the sensor 2 outputs.

However, even though a part of the information indicating events in the actual world 1 is dropped due to projection, the data 3 includes useful information for estimating the signals which are information indicating events (phenomena) in the actual world 1.

With the present invention, information having continuity contained in the data 3 is used as useful information for estimating the signals which is information of the actual world 1. Continuity is a concept which is newly defined.

Taking note of the actual world 1, events in the actual world 1 include characteristics which are constant in predetermined dimensional directions. For example, an object (corporeal object) in the actual world 1 either has shape, pattern, or color that is continuous in the space direction or time direction, or has repeated patterns of shape, pattern, or color.

Accordingly, the information indicating the events in actual world 1 includes characteristics constant in a predetermined dimensional direction.

With a more specific example, a linear object such as a string, cord, or rope, has a characteristic which is constant in the length-wise direction, i.e., the spatial direction, that the cross-sectional shape is the same at arbitrary positions in the length-wise direction. The constant characteristic in the spatial direction that the cross-sectional shape is the same at arbitrary positions in the length-wise direction comes from the characteristic that the linear object is long.

Accordingly, an image of the linear object has a characteristic which is constant in the length-wise direction, i.e., the spatial direction, that the cross-sectional shape is the same, at arbitrary positions in the length-wise direction.

Also, a monotone object, which is a corporeal object, having an expanse in the spatial direction, can be said to have a constant characteristic of having the same color in the spatial direction regardless of the part thereof.

In the same way, an image of a monotone object, which is a corporeal object, having an expanse in the spatial direction, can be said to have a constant characteristic of having the same color in the spatial direction regardless of the part thereof.

In this way, events in the actual world 1 (real world) have characteristics which are constant in predetermined dimensional directions, so signals of the actual world 1 have characteristics which are constant in predetermined dimensional directions.

In the present Specification, such characteristics which are constant in predetermined dimensional directions will be called continuity. Continuity of the signals of the actual world 1 (real world) means the characteristics which are constant in predetermined dimensional directions which the signals indicating the events of the actual world 1 (real world) have.

Countless such continuities exist in the actual world 1 (real world).

Next, taking note of the data 3, the data 3 is obtained by signals which is information indicating events of the actual world 1 having predetermined dimensions being projected by the sensor 2, and includes continuity corresponding to the continuity of signals in the real world. It can be said that the data 3 includes continuity wherein the continuity of actual world signals has been projected.

However, as described above, in the data 3 output from the sensor 2, a part of the information of the actual world 1 has been lost, so a part of the continuity contained in the signals of the actual world 1 (real world) is lost.

In other words, the data 3 contains a part of the continuity within the continuity of the signals of the actual world 1 (real world) as data continuity. Data continuity means characteristics which are constant in predetermined dimensional directions, which the data 3 has.

With the present invention, the data continuity which the data 3 has is used as significant data for estimating signals which are information indicating events of the actual world 1.

For example, with the present invention, information indicating an event in the actual world 1 which has been lost is generated by signals processing of the data 3, using data continuity.

Now, with the present invention, of the length (space), time, and mass, which are dimensions of signals serving as information indicating events in the actual world 1, continuity in the spatial direction or time direction, are used.

Returning to FIG. 1, the sensor 2 is formed of, for example, a digital still camera, a video camera, or the like, and takes images of the actual world 1, and outputs the image data which is the obtained data 3, to a signal processing device 4. The sensor 2 may also be a thermography device, a pressure sensor using photo-elasticity, or the like.

The signal processing device 4 is configured of, for example, a personal computer or the like.

Figure 2:
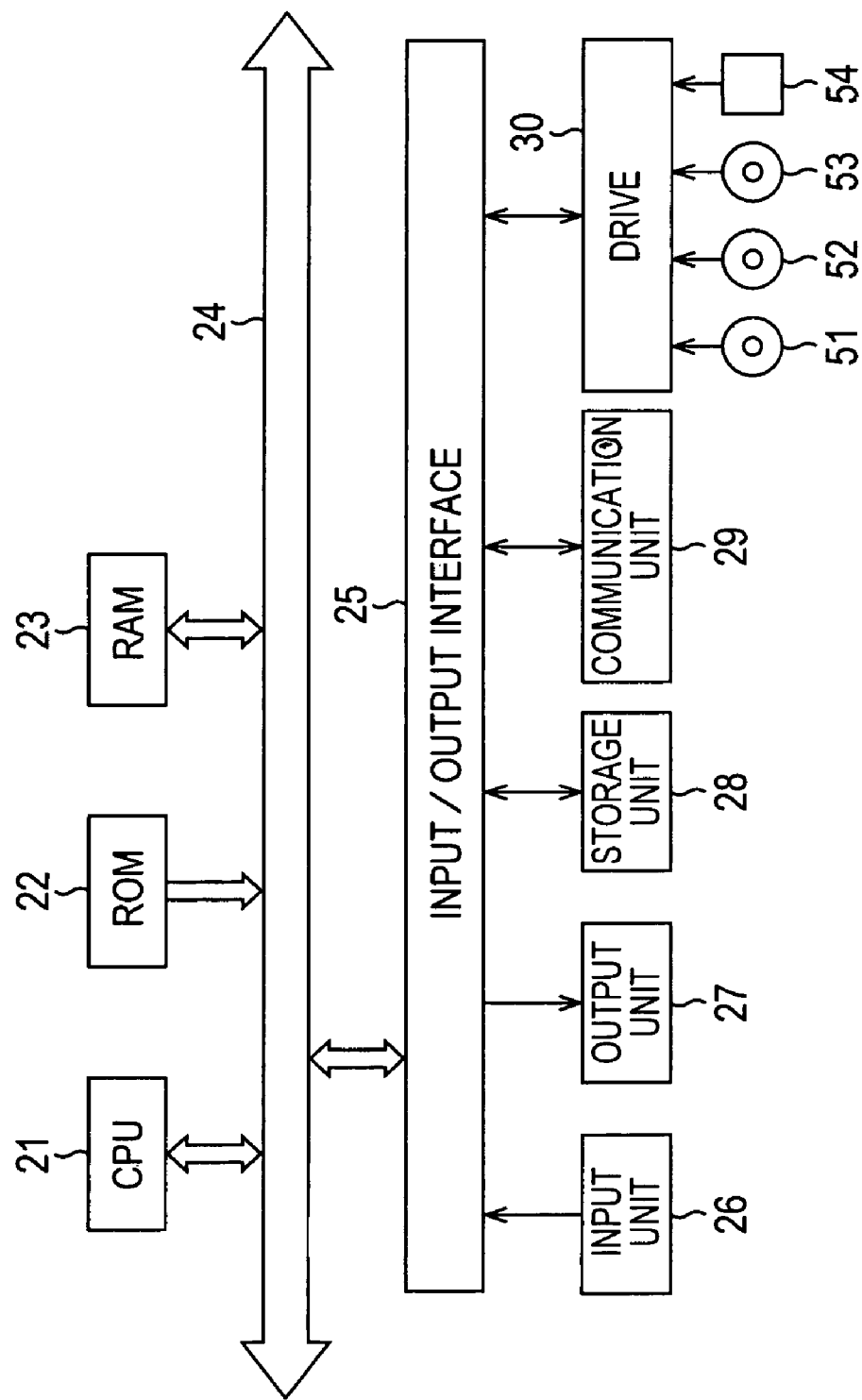
FIG. 2 is a block diagram illustrating an example of a configuration of a signal processing device.

The signal processing device 4 is configured as shown in FIG. 2, for example. A CPU (Central Processing Unit) 21 executes various types of processing following programs stored in ROM (Read Only Memory) 22 or the storage unit 28. RAM (Random Access Memory) 23 stores programs to be executed by the CPU 21, data, and so forth, as suitable. The CPU 21, ROM 22, and RAM 23, are mutually connected by a bus 24.

Also connected to the CPU 21 is an input/output interface 25 via the bus 24. An input device 26 made up of a keyboard, mouse, microphone, and so forth, and an output unit 27 made up of a display, speaker, and so forth, are connected to the input/output interface 25. The CPU 21 executes various types of processing corresponding to commands input from the input unit 26. The CPU 21 then outputs images and audio and the like obtained as a result of processing to the output unit 27.

A storage unit 28 connected to the input/output interface 25 is configured of a hard disk for example, and stores the programs and various types of data which the CPU 21 executes. A communication unit 29 communicates with external devices via the Internet and other networks. In the case of this example, the communication unit 29 acts as an acquiring unit for capturing data 3 output from the sensor 2.

Also, an arrangement may be made wherein programs are obtained via the communication unit 29 and stored in the storage unit 28.

A drive 30 connected to the input/output interface 25 drives a magnetic disk 51, optical disk 52, magneto-optical disk 53, or semiconductor memory 54 or the like mounted thereto, and obtains programs and data recorded therein. The obtained programs and data are transferred to the storage unit 28 as necessary and stored.

FIG. 3 is a block diagram illustrating a signal processing device 4.

Note that whether the functions of the signal processing device 4 are realized by hardware or realized by software is irrelevant. That is to say, the block diagrams in the present Specification may be taken to be hardware block diagrams or may be taken to be software function block diagrams.

With the signal processing device 4 shown in FIG. 3, image data which is an example of the data 3 is input, and the continuity of the data is detected from the input image data (input image). Next, the signals of the actual world 1 acquired by the sensor 2 are estimated from the continuity of the data detected. Then, based on the estimated signals of the actual world 1, an image is generated, and the generated image (output image) is output. That is to say, FIG. 3 is a diagram illustrating the configuration of the signal processing device 4 which is an image processing device.

The input image (image data which is an example of the data 3) input to the signal processing device 4 is supplied to a data continuity detecting unit 101 and actual world estimating unit 102.

The data continuity detecting unit 101 detects the continuity of the data from the input image, and supplies data continuity information indicating the detected continuity to the actual world estimating unit 102 and an image generating unit 103. The data continuity information includes, for example, the position of a region of pixels having continuity of data, the direction of a region of pixels having continuity of data (the angle or gradient of the time direction and space direction), or the length of a region of pixels having continuity of data, or the like in the input image. Detailed configuration of the data continuity detecting unit 101 will be described later.

The actual world estimating unit 102 estimates the signals of the actual world 1, based on the input image and the data continuity information supplied from the data continuity detecting unit 101. That is to say, the actual world estimating unit 102 estimates an image which is the signals of the actual world cast into the sensor 2 at the time that the input image was acquired. The actual world estimating unit 102 supplies the actual world estimation information indicating the results of the estimation of the signals of the actual world 1, to the image generating unit 103. The detailed configuration of the actual world estimating unit 102 will be described later.

The image generating unit 103 generates signals further approximating the signals of the actual world 1, based on the actual world estimation information indicating the estimated signals of the actual world 1, supplied from the actual world estimating unit 102, and outputs the generated signals. Or, the image generating unit 103 generates signals further approximating the signals of the actual world 1, based on the data continuity information supplied from the data continuity detecting unit 101, and the actual world estimation information indicating the estimated signals of the actual world 1, supplied from the actual world estimating unit 102, and outputs the generated signals.

That is to say, the image generating unit 103 generates an image further approximating the image of the actual world 1 based on the actual world estimation information, and outputs the generated image as an output image. Or, the image generating unit 103 generates an image further approximating the image of the actual world 1 based on the data continuity information and actual world estimation information, and outputs the generated image as an output image.

For example, the image generating unit 103 generates an image with higher resolution in the spatial direction or time direction in comparison with the input image, by integrating the estimated image of the actual world 1 within a desired range of the spatial direction or time direction, based on the actual world estimation information, and outputs the generated image as an output image. For example, the image generating unit 103 generates an image by extrapolation/interpolation, and outputs the generated image as an output image.

Detailed configuration of the image generating unit 103 will be described later.

Next, the principle of the present invention will be described with reference to FIG. 4 through FIG. 7.

Figure 4:
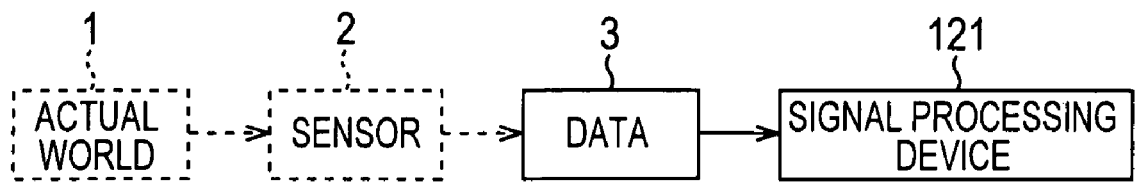
FIG. 4 is a diagram illustrating the principle of processing of a conventional image processing device.

FIG. 4 is a diagram describing the principle of processing with a conventional signal processing device 121. The conventional signal processing device 121 takes the data 3 as the reference for processing, and executes processing such as increasing resolution and the like with the data 3 as the object of processing. With the conventional signal processing device 121, the actual world 1 is never taken into consideration, and the data 3 is the ultimate reference, so information exceeding the information contained in the data 3 can not be obtained as output.

Also, with the conventional signal processing device 121, distortion in the data 3 due to the sensor 2 (difference between the signals which are information of the actual world 1, and the data 3) is not taken into consideration whatsoever, so the conventional signal processing device 121 outputs signals still containing the distortion. Further, depending on the processing performed by the signal processing device 121, the distortion due to the sensor 2 present within the data 3 is further amplified, and data containing the amplified distortion is output.

Thus, with conventional signals processing, (the signals of) the actual world 1, from which the data 3 has been obtained, was never taken into consideration. In other words, with the conventional signal processing, the actual world 1 was understood within the framework of the information contained in the data 3, so the limits of the signal processing are determined by the information and distortion contained in the data 3. The present Applicant has separately proposed signal processing taking into consideration the actual world 1, but this did not take into consideration the later-described continuity.

In contrast with this, with the signal processing according to the present invention, processing is executed taking (the signals of) the actual world 1 into consideration in an explicit manner.

Figure 5:
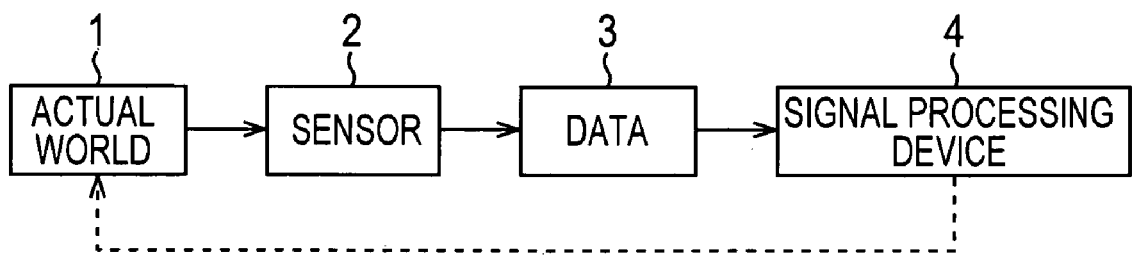
FIG. 5 is a diagram for describing the principle of processing of the image processing device.

FIG. 5 is a diagram for describing the principle of the processing at the signal processing device 4 according to the present invention.

This is the same as the conventional arrangement wherein signals, which are information indicating events of the actual world 1, are obtained by the sensor 2, and the sensor 2 outputs data 3 wherein the signals which are information of the actual world 1 are projected.

However, with the present invention, signals, which are information indicating events of the actual world 1, obtained by the sensor 2, are explicitly taken into consideration. That is to say, signal processing is performed conscious of the fact that the data 3 contains distortion due to the sensor 2 (difference between the signals which are information of the actual world 1, and the data 3).

Thus, with the signal processing according to the present invention, the processing results are not restricted due to the information contained in the data 3 and the distortion, and for example, processing results which are more accurate and which have higher precision than conventionally can be obtained with regard to events in the actual world 1. That is to say, with the present invention, processing results which are more accurate and which have higher precision can be obtained with regard to signals, which are information indicating events of the actual world 1, input to the sensor 2.

Figure 6:
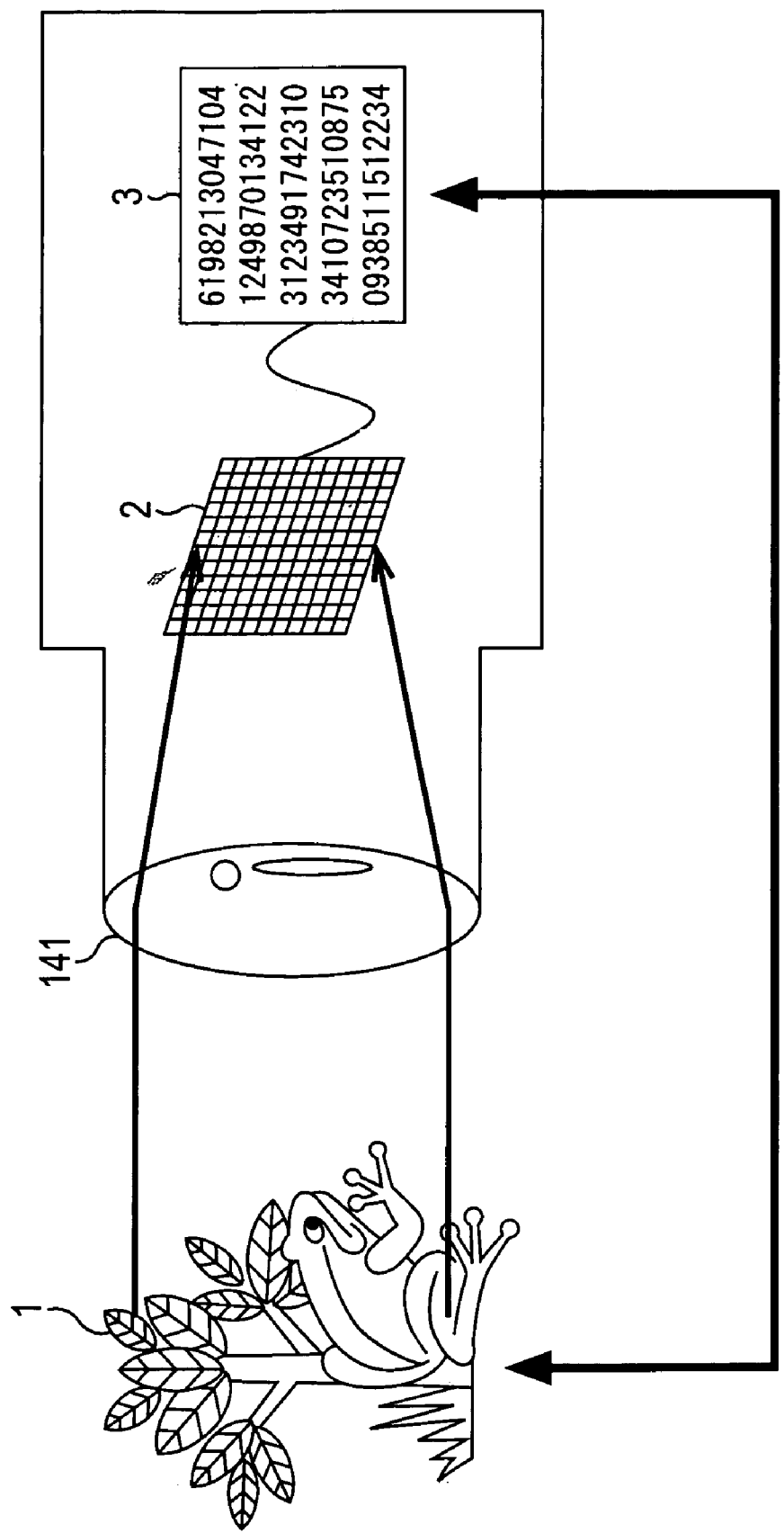
FIG. 6 is a diagram for describing the principle of the present invention in greater detail.
Figure 7:
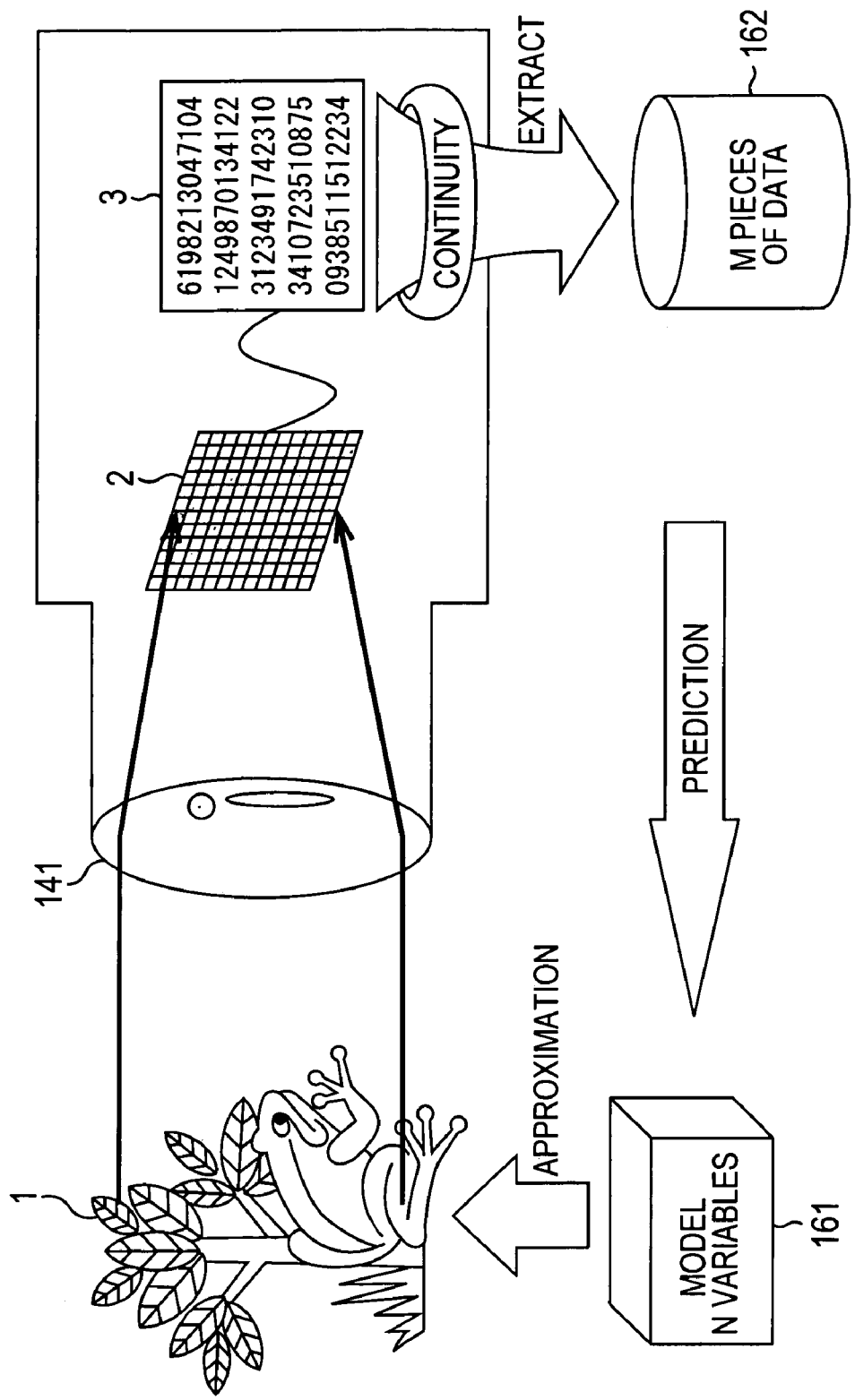
FIG. 7 is a diagram for describing the principle of the present invention in greater detail.

FIG. 6 and FIG. 7 are diagrams for describing the principle of the present invention in greater detail.

As shown in FIG. 6, signals of the actual world, which are an image for example, are image on the photoreception face of a CCD (Charge Coupled Device) which is an example of the sensor 2, by an optical system 141 made up of lenses, an optical LPF (Low Pass Filter), and the like. The CCD, which is an example of the sensor 2, has integration properties, so difference is generated in the data 3 output from the CCD as to the image of the actual world 1. Details of the integration properties of the sensor 2 will be described later.

With the signal processing according to the present invention, the relationship between the image of the actual world 1 obtained by the CCD, and the data 3 taken by the CCD and output, is explicitly taken into consideration. That is to say, the relationship between the data 3 and the signals which is information of the actual world obtained by the sensor 2, is explicitly taken into consideration.

More specifically, as shown in FIG. 7, the signal processing device 4 uses a model 161 to approximate (describe) the actual world 1. The model 161 is represented by, for example, N variables. More accurately, the model 161 approximates (describes) signals of the actual world 1.

In order to predict the model 161, the signal processing device 4 extracts M pieces of data 162 from the data 3. At the time of extracting the M pieces of data 162 from the data 3, the signal processing device 4 uses the continuity of the data contained in the data 3. In other words, the signal processing device 4 extracts data 162 for predicting the model 161, based o the continuity of the data contained in the data 3. Consequently, the model 161 is constrained by the continuity of the data.

That is to say, the model 161 approximates (information (signals) indicating) events of the actual world having continuity (constant characteristics in a predetermined dimensional direction), which generates the data continuity in the data 3.

Now, in the event that the number M of the data 162 is N or more, which is the number of variables of the model, the model 161 represented by the N variables can be predicted, from the M pieces of the data 162.

In this way, the signal processing device 4 can take into consideration the signals which are information of the actual world 1, by predicting the model 161 approximating (describing) the (signals of the) actual world 1.

Next, the integration effects of the sensor 2 will be described.

An image sensor such as a CCD or CMOS (Complementary Metal-Oxide Semiconductor), which is the sensor 2 for taking images, projects signals, which are information of the real world, onto two-dimensional data, at the time of imaging the real world. The pixels of the image sensor each have a predetermined area, as a so-called photoreception face (photoreception region). Incident light to the photoreception face having a predetermined area is integrated in the space direction and time direction for each pixel, and is converted into a single pixel value for each pixel.

The space-time integration of images will be described with reference to FIG. 8 through FIG. 11.

An image sensor images a subject (object) in the real world, and outputs the obtained image data as a result of imagining in increments of single frames. That is to say, the image sensor acquires signals of the actual world 1 which is light reflected off of the subject of the actual world 1, and outputs the data 3.

For example, the image sensor outputs image data of 30 frames per second. In this case, the exposure time of the image sensor can be made to be 1/30 seconds. The exposure time is the time from the image sensor starting conversion of incident light into electric charge, to ending of the conversion of incident light into electric charge. Hereafter, the exposure time will also be called shutter time.

Figure 8:
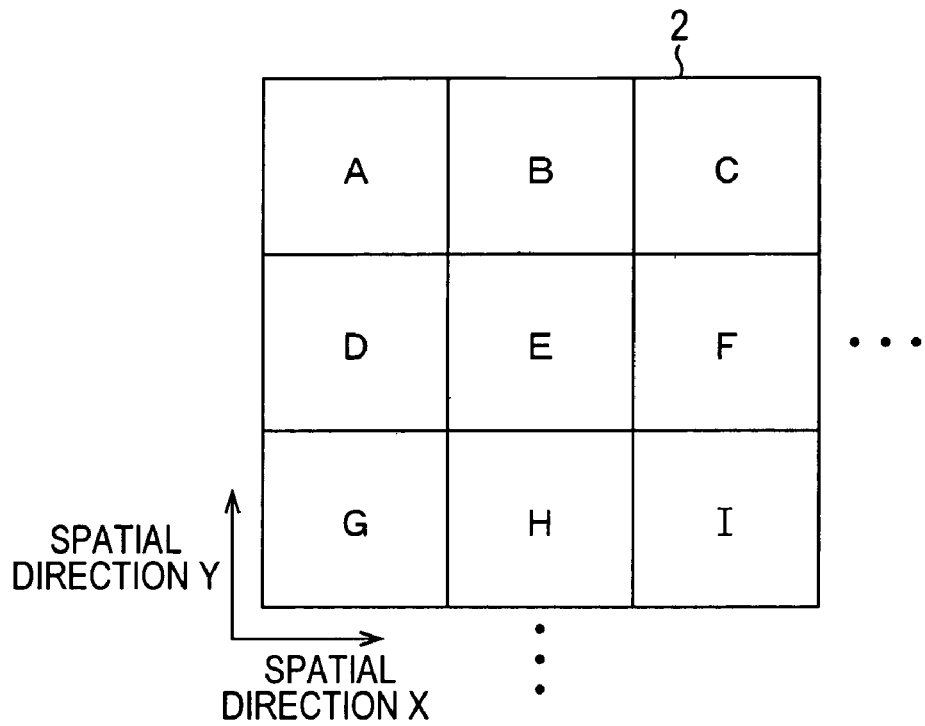
FIG. 8 is a diagram describing an example of the placement of pixels on an image sensor.

FIG. 8 is a diagram describing an example of a pixel array on the image sensor. In FIG. 8, A through I denote individual pixels. The pixels are placed on a plane corresponding to the image displayed by the image data. A single detecting element corresponding to a single pixel is placed on the image sensor. At the time of the image sensor taking images of the actual world 1, the one detecting element outputs one pixel value corresponding to the one pixel making up the image data. For example, the position in the spatial direction X (X coordinate) of the detecting element corresponds to the horizontal position on the image displayed by the image data, and the position in the spatial direction Y (Y coordinate) of the detecting element corresponds to the vertical position on the image displayed by the image data.

Distribution of intensity of light of the actual world 1 has expanse in the three-dimensional spatial directions and the time direction, but the image sensor acquires light of the actual world 1 in two-dimensional spatial directions and the time direction, and generates data 3 representing the distribution of intensity of light in the two-dimensional spatial directions and the time direction.

Figure 9:
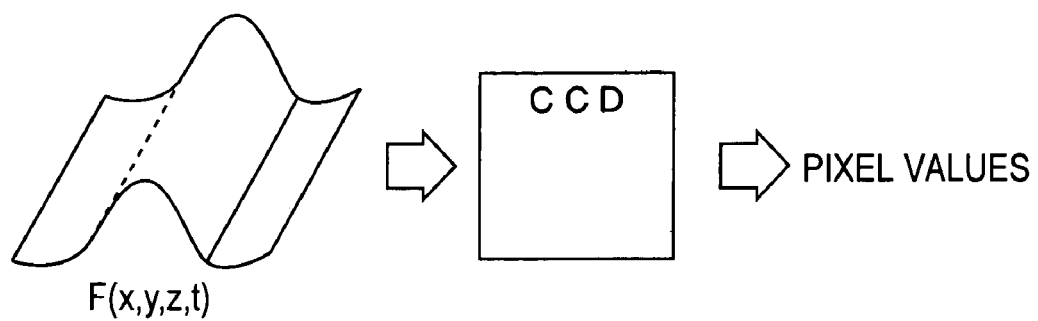
FIG. 9 is a diagram for describing the operations of a detecting device which is a CCD.

As shown in FIG. 9, the detecting device which is a CCD for example, converts light cast onto the photoreception face (photoreception region) (detecting region) into electric charge during a period corresponding to the shutter time, and accumulates the converted charge. The light is information (signals) of the actual world 1 regarding which the intensity is determined by the three-dimensional spatial position and point-in-time. The distribution of intensity of light of the actual world 1 can be represented by a function $F(x, y, z, t)$, wherein position x, y, z, in three-dimensional space, and point-in-time t, are variables.

The amount of charge accumulated in the detecting device which is a CCD is approximately proportionate to the intensity of the light cast onto the entire photoreception face having two-dimensional spatial expanse, and the amount of time that light is cast thereupon. The detecting device adds the charge converted from the light cast onto the entire photoreception face, to the charge already accumulated during a period corresponding to the shutter time. That is to say, the detecting device integrates the light cast onto the entire photoreception face having a two-dimensional spatial expanse, and accumulates a change of an amount corresponding to the integrated light during a period corresponding to the shutter time. The detecting device can also be said to have an integration effect regarding space (photoreception face) and time (shutter time).

The charge accumulated in the detecting device is converted into a voltage value by an unshown circuit, the voltage value is further converted into a pixel value such as digital data or the like, and is output as data 3. Accordingly, the individual pixel values output from the image sensor have a value projected on one-dimensional space, which is the result of integrating the portion of the information (signals) of the actual world 1 having time-space expanse with regard to the time direction of the shutter time and the spatial direction of the photoreception face of the detecting device.

$$P=\int_{t_1}^{t_2}\int_{y_1}^{y_2}\int_{x_1}^{x_2}F(x,y,t)dxdydt \quad (1)$$

That is to say, the pixel value of one pixel is represented as the integration of F(x, y, t). F(x, y, t) is a function representing the distribution of light intensity on the photoreception face of the detecting device. For example, the pixel value P is represented by Expression (1).

In Expression (1), $x_1$ represents the spatial coordinate at the left-side boundary of the photoreception face of the detecting device (X coordinate). $x_2$ represents the spatial coordinate at the right-side boundary of the photoreception face of the detecting device (X coordinate). In Expression (1), $y_1$ represents the spatial coordinate at the top-side boundary of the photoreception face of the detecting device (Y coordinate). $y_2$ represents the spatial coordinate at the bottom-side boundary of the photoreception face of the detecting device (Y coordinate). Also, $t_1$ represents the point-in-time at which conversion of incident light into an electric charge was started. $t_2$ represents the point-in-time at which conversion of incident light into an electric charge was ended.

Note that actually, the gain of the pixel values of the image data output from the image sensor is corrected for the overall frame.

Each of the pixel values of the image data are integration values of the light cast on the photoreception face of each of the detecting elements of the image sensor, and of the light cast onto the image sensor, waveforms of light of the actual world 1 finer than the photoreception face of the detecting element are hidden in the pixel value as integrated values.

Hereafter, in the present Specification, the waveform of signals represented with a predetermined dimension as a reference may be referred to simply as waveforms.

Thus, the image of the actual world 1 is integrated in the spatial direction and time direction in increments of pixels, so a part of the continuity of the image of the actual world 1 drops out from the image data, so only another part of the continuity of the image of the actual world 1 is left in the image data. Or, there may be cases wherein continuity which has changed from the continuity of the image of the actual world 1 is included in the image data.

Further description will be made regarding the integration effect in the spatial direction for an image taken by an image sensor having integration effects.

Figure 10:
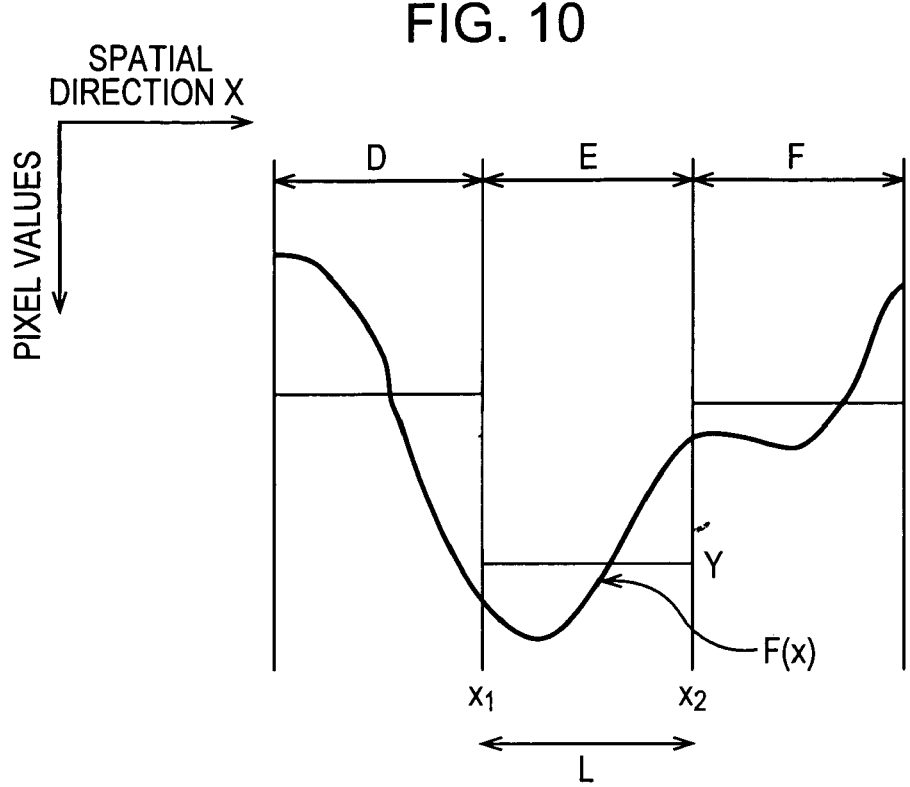
FIG. 10 is a diagram for describing the relationship between light cast into detecting elements corresponding to pixel D through pixel F, and pixel values.

FIG. 10 is a diagram describing the relationship between incident light to the detecting elements corresponding to the pixel D through pixel F, and the pixel values. F(x) in FIG. 10 is an example of a function representing the distribution of light intensity of the actual world 1, having the coordinate x in the spatial direction X in space (on the detecting device) as a variable. In other words, F(x) is an example of a function representing the distribution of light intensity of the actual world 1, with the spatial direction Y and time direction constant. In FIG. 10, L indicates the length in the spatial direction X of the photoreception face of the detecting device corresponding to the pixel D through pixel F.

$$P=\int_{x_1}^{x_2}F(x)dx \quad (2)$$

The pixel value of a single pixel is represented as the integral of F(x). For example, the pixel value P of the pixel E is represented by Expression (2).

In the Expression (2), $x_1$ represents the spatial coordinate in the spatial direction X at the left-side boundary of the photoreception face of the detecting device corresponding to the pixel E. $x_2$ represents the spatial coordinate in the spatial direction X at the right-side boundary of the photoreception face of the detecting device corresponding to the pixel E.

In the same way, further description will be made regarding the integration effect in the time direction for an image taken by an image sensor having integration effects.

Figure 11:
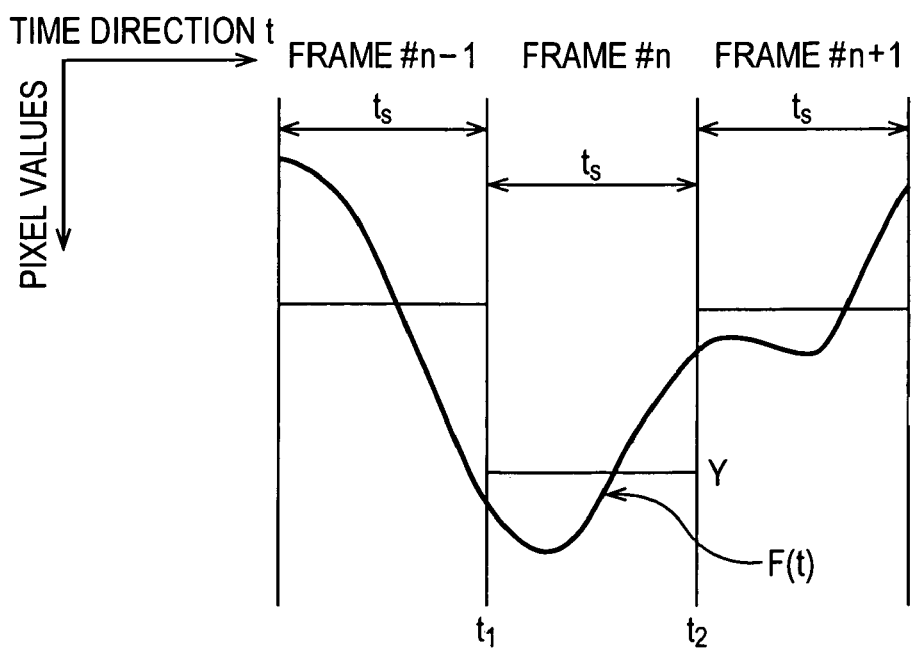
FIG. 11 is a diagram for describing the relationship between the passage of time, light cast into a detecting element corresponding to one pixel, and pixel values.

FIG. 11 is a diagram for describing the relationship between time elapsed, the incident light to a detecting element corresponding to a single pixel, and the pixel value. F(t) in FIG. 11 is a function representing the distribution of light intensity of the actual world 1, having the point-in-time t as a variable. In other words, F(t) is an example of a function representing the distribution of light intensity of the actual world 1, with the spatial direction Y and the spatial direction X constant. $T_s$ represents the shutter time.

The frame #n−1 is a frame which is previous to the frame #n time-wise, and the frame #n+1 is a frame following the frame #n time-wise. That is to say, the frame #n−1, frame #n, and frame #n+1, are displayed in the order of frame #n−1, frame #n, and frame #n+1.

Note that in the example shown in FIG. 11, the shutter time $t_s$ and the frame intervals are the same.

The pixel value of a single pixel is represented as the integral of F(x). For example, the pixel value P of the pixel of frame #n for example, is represented by Expression (3).

$$P=\int_{t_1}^{t_2}F(t)dx \quad (3)$$

In the Expression (3), $t_1$ represents the time at which conversion of incident light into an electric charge was started. $t_2$ represents the time at which conversion of incident light into an electric charge was ended.

Hereafter, the integration effect in the spatial direction by the sensor 2 will be referred to simply as spatial integration effect, and the integration effect in the time direction by the sensor 2 also will be referred to simply as time integration effect. Also, space integration effects or time integration effects will be simply called integration effects.

Next, description will be made regarding an example of continuity of data included in the data 3 acquired by the image sensor having integration effects.

Figure 12:
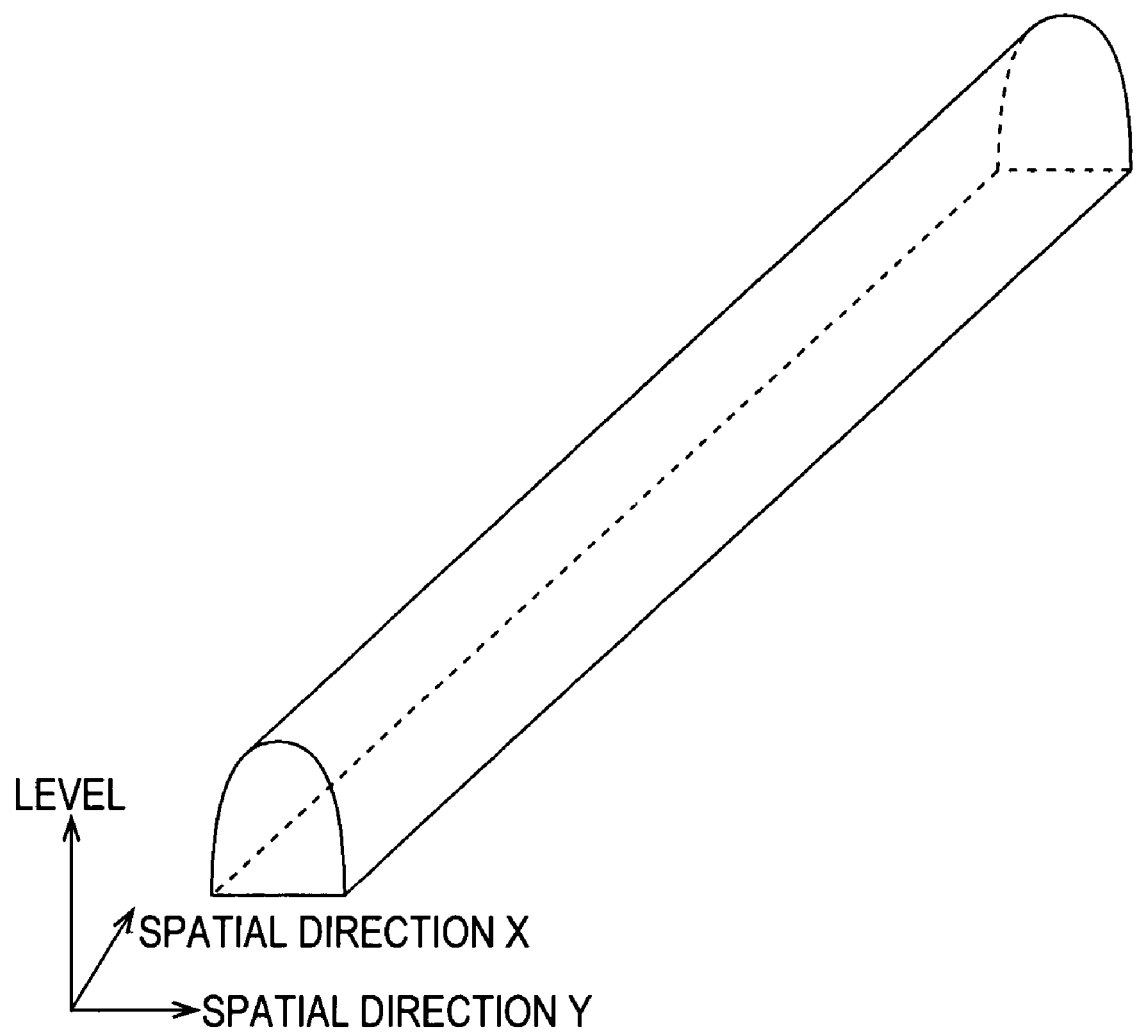
FIG. 12 is a diagram illustrating an example of an image of a linear-shaped object in the actual world.

FIG. 12 is a diagram illustrating a linear object of the actual world 1 (e.g., a fine line), i.e., an example of distribution of light intensity. In FIG. 12, the position to the upper side of the drawing indicates the intensity (level) of light, the position to the upper right side of the drawing indicates the position in the spatial direction X which is one direction of the spatial directions of the image, and the position to the right side of the drawing indicates the position in the spatial direction Y which is the other direction of the spatial directions of the image.

The image of the linear object of the actual world 1 includes predetermined continuity. That is to say, the image shown in FIG. 12 has continuity in that the cross-sectional shape (the change in level as to the change in position in the direction orthogonal to the length direction), at any arbitrary position in the length direction.

Figure 13:
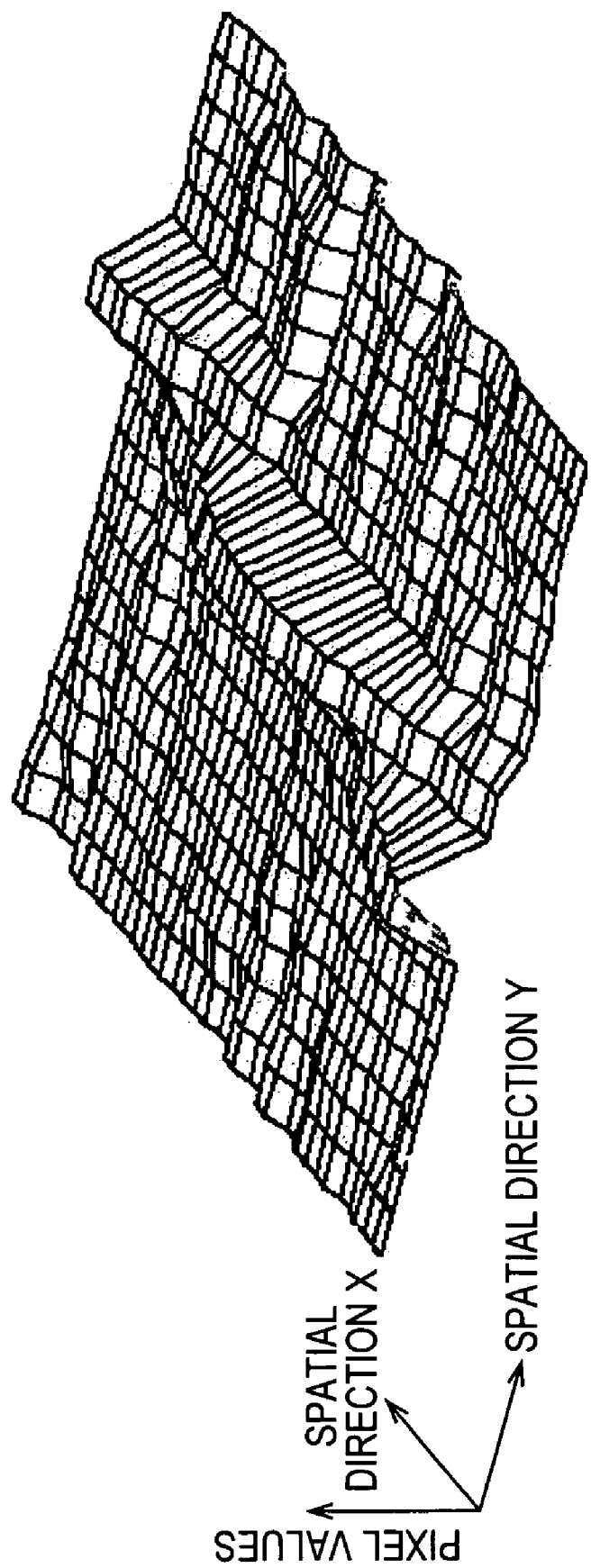
FIG. 13 is a diagram illustrating an example of pixel values of image data obtained by actual image-taking.

FIG. 13 is a diagram illustrating an example of pixel values of image data obtained by actual image-taking, corresponding to the image shown in FIG. 12.

Figure 14:
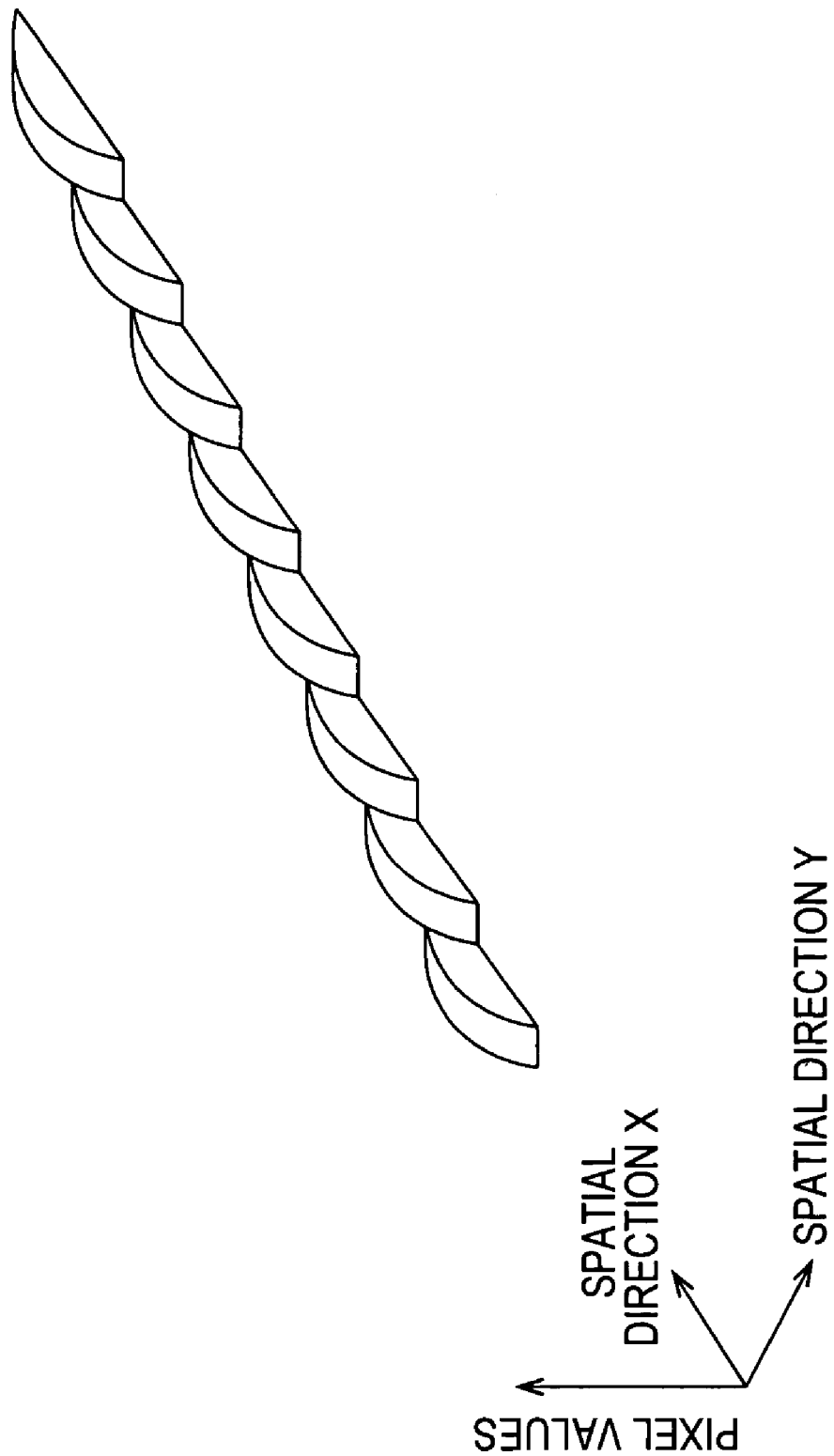
FIG. 14 is a schematic diagram of image data.

FIG. 14 is a model diagram of the image data shown in FIG. 13.

The model diagram shown in FIG. 14 is a model diagram of image data obtained by imaging, with the image sensor, an image of a linear object having a diameter shorter than the length L of the photoreception face of each pixel, and extending in a direction offset from the array of the pixels of the image sensor (the vertical or horizontal array of the pixels). The image cast into the image sensor at the time that the image data shown in FIG. 14 was acquired is an image of the linear object of the actual world 1 shown in FIG. 12.

In FIG. 14, the position to the upper side of the drawing indicates the pixel value, the position to the upper right side of the drawing indicates the position in the spatial direction X which is one direction of the spatial directions of the image, and the position to the right side of the drawing indicates the position in the spatial direction Y which is the other direction of the spatial directions of the image. The direction indicating the pixel value in FIG. 14 corresponds to the direction of level in FIG. 12, and the spatial direction X and spatial direction Y in FIG. 14 also are the same as the directions in FIG. 12.

In the event of taking an image of a linear object having a diameter narrower than the length L of the photoreception face of each pixel with the image sensor, the linear object is represented in the image data obtained as a result of the image-taking as multiple arc shapes (half-discs) having a predetermined length which are arrayed in a diagonally-offset fashion, in a model representation, for example. The arc shapes are of approximately the same shape. One arc shape is formed on one row of pixels vertically, or is formed on one row of pixels horizontally. For example, one arc shape shown in FIG. 14 is formed on one row of pixels vertically.

Thus, with the image data taken and obtained by the image sensor for example, the continuity in that the cross-sectional shape in the spatial direction Y at any arbitrary position in the length direction which the linear object image of the actual world 1 had, is lost. Also, it can be said that the continuity, which the linear object image of the actual world 1 had, has changed into continuity in that arc shapes of the same shape formed on one row of pixels vertically or formed on one row of pixels horizontally are arrayed at predetermined intervals.

Figure 15:
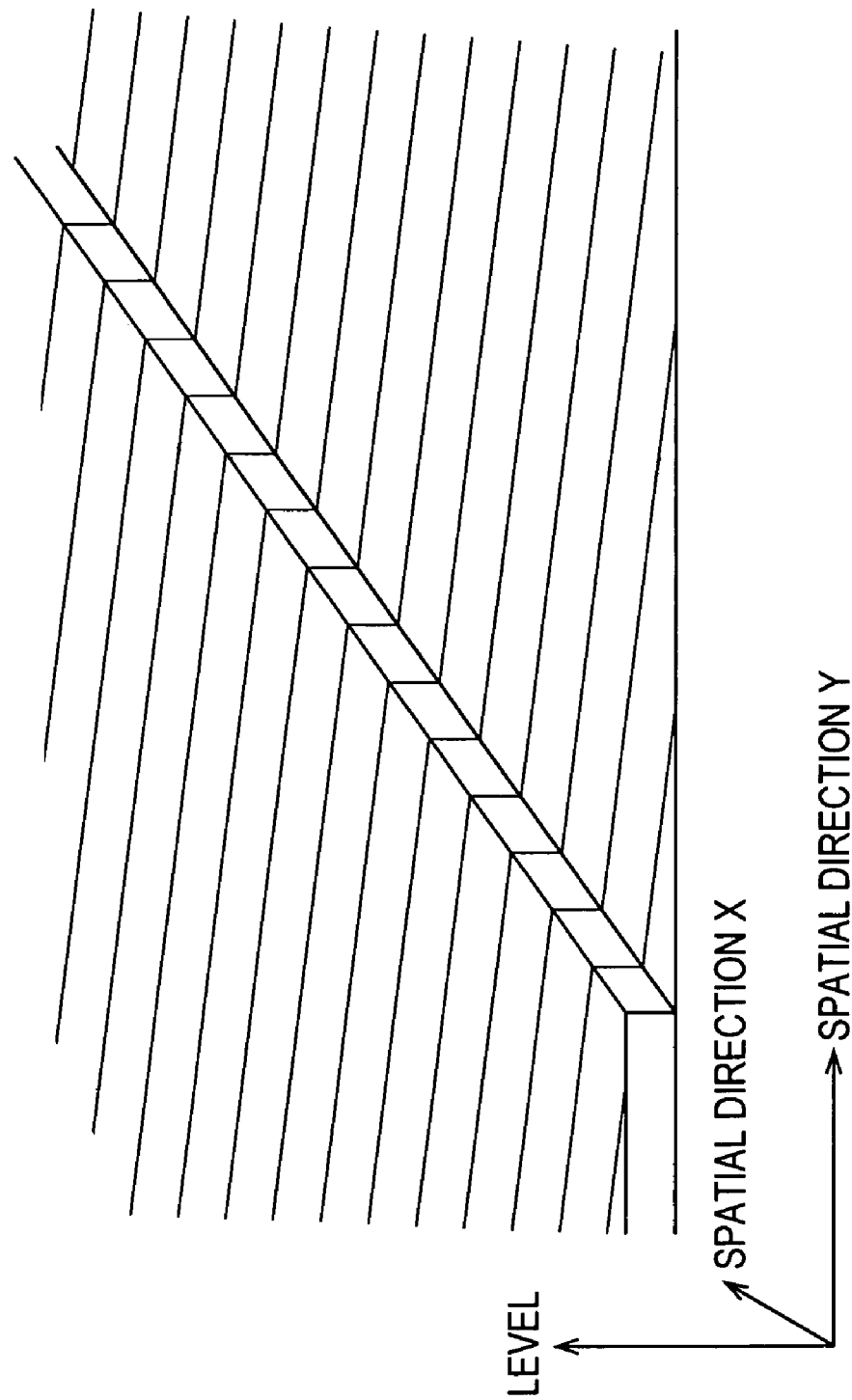
FIG. 15 is a diagram illustrating an example of an image of an actual world 1 having a linear shape of a single color which is a different color from the background.

FIG. 15 is a diagram illustrating an image in the actual world 1 of an object having a straight edge, and is of a monotone color different from that of the background, i.e., an example of distribution of light intensity. In FIG. 15, the position to the upper side of the drawing indicates the intensity (level) of light, the position to the upper right side of the drawing indicates the position in the spatial direction X which is one direction of the spatial directions of the image, and the position to the right side of the drawing indicates the position in the spatial direction Y which is the other direction of the spatial directions of the image.

The image of the object of the actual world 1 which has a straight edge and is of a monotone color different from that of the background, includes predetermined continuity. That is to say, the image shown in FIG. 15 has continuity in that the cross-sectional shape (the change in level as to the change in position in the direction orthogonal to the length direction) is the same at any arbitrary position in the length direction.

Figure 16:
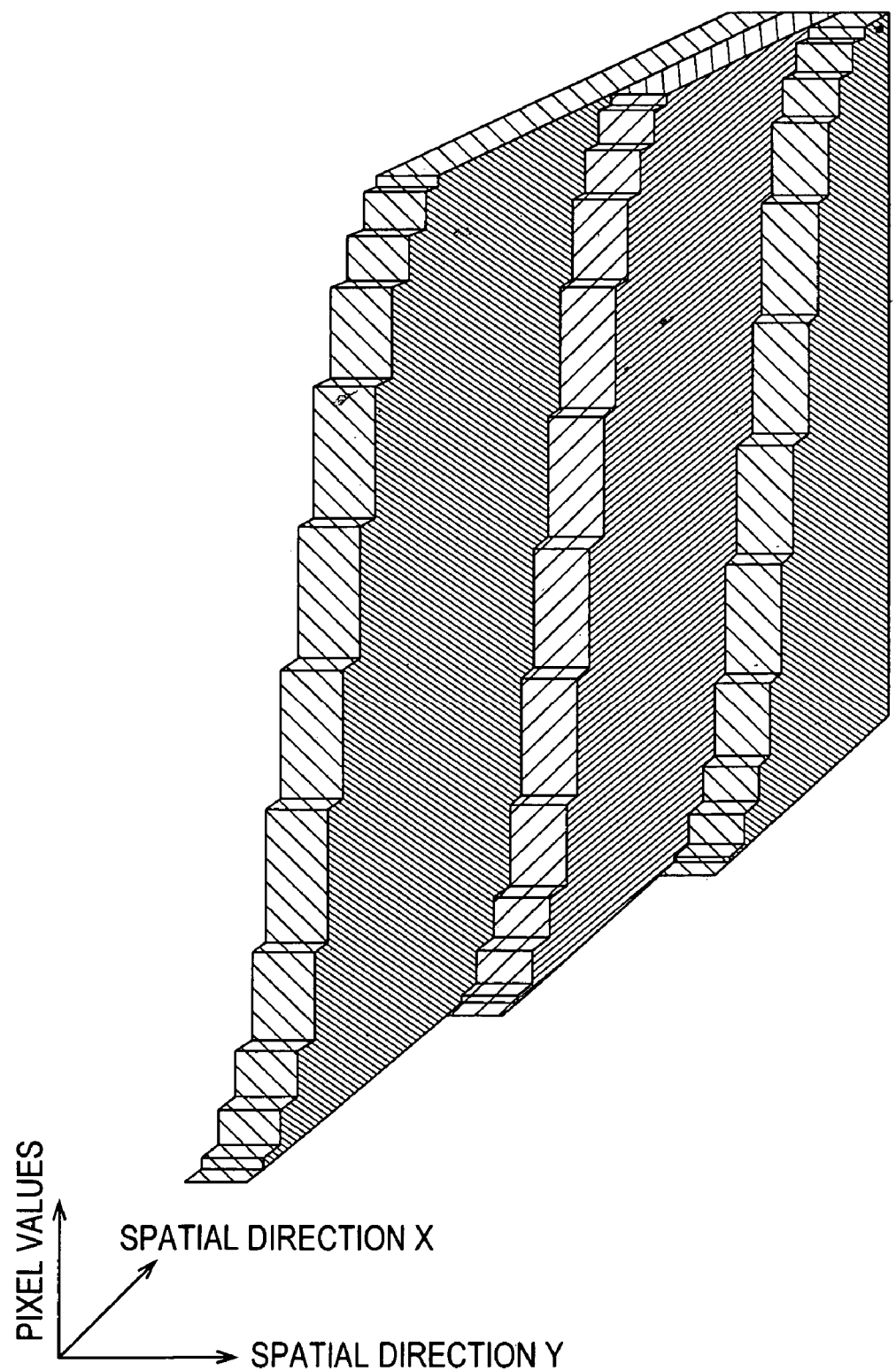
FIG. 16 is a diagram illustrating an example of pixel values of image data obtained by actual image-taking.

FIG. 16 is a diagram illustrating an example of pixel values of the image data obtained by actual image-taking, corresponding to the image shown in FIG. 15. As shown in FIG. 16, the image data is in a stepped shape, since the image data is made up of pixel values in increments of pixels.

Figure 17:
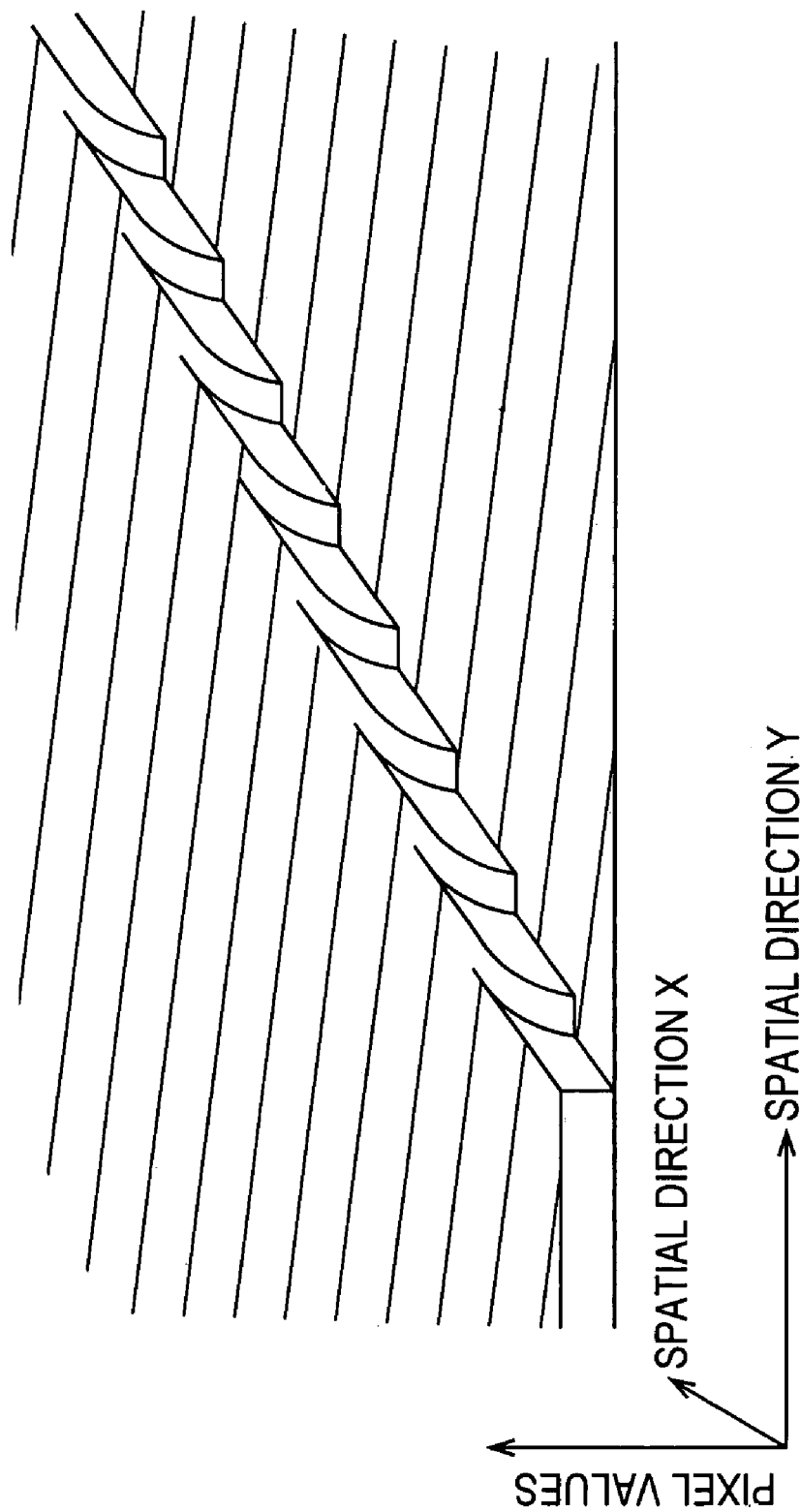
FIG. 17 is a schematic diagram of image data.

FIG. 17 is a model diagram illustrating the image data shown in FIG. 16.

The model diagram shown in FIG. 17 is a model diagram of image data obtained by taking, with the image sensor, an image of the object of the actual world 1 which has a straight edge and is of a monotone color different from that of the background, and extending in a direction offset from the array of the pixels of the image sensor (the vertical or horizontal array of the pixels). The image cast into the image sensor at the time that the image data shown in FIG. 17 was acquired is an image of the object of the actual world 1 which has a straight edge and is of a monotone color different from that of the background, shown in FIG. 15.

In FIG. 17, the position to the upper side of the drawing indicates the pixel value, the position to the upper right side of the drawing indicates the position in the spatial direction X which is one direction of the spatial directions of the image, and the position to the right side of the drawing indicates the position in the spatial direction Y which is the other direction of the spatial directions of the image. The direction indicating the pixel value in FIG. 17 corresponds to the direction of level in FIG. 15, and the spatial direction X and spatial direction Y in FIG. 17 also are the same as the directions in FIG. 15.

In the event of taking an image of an object of the actual world 1 which has a straight edge and is of a monotone color different from that of the background with an image sensor, the straight edge is represented in the image data obtained as a result of the image-taking as multiple pawl shapes having a predetermined length which are arrayed in a diagonally-offset fashion, in a model representation, for example. The pawl shapes are of approximately the same shape. One pawl shape is formed on one row of pixels vertically, or is formed on one row of pixels horizontally. For example, one pawl shape shown in FIG. 17 is formed on one row of pixels vertically.

Thus, the continuity of image of the object of the actual world 1 which has a straight edge and is of a monotone color different from that of the background, in that the cross-sectional shape is the same at any arbitrary position in the length direction of the edge, for example, is lost in the image data obtained by imaging with an image sensor. Also, it can be said that the continuity, which the image of the object of the actual world 1 which has a straight edge and is of a monotone color different from that of the background had, has changed into continuity in that pawl shapes of the same shape formed on one row of pixels vertically or formed on one row of pixels horizontally are arrayed at predetermined intervals.

The data continuity detecting unit 101 detects such data continuity of the data 3 which is an input image, for example. For example, the data continuity detecting unit 101 detects data continuity by detecting regions having a constant characteristic in a predetermined dimensional direction. For example, the data continuity detecting unit 101 detects a region wherein the same arc shapes are arrayed at constant intervals, such as shown in FIG. 14. Also, the data continuity detecting unit 101 detects a region wherein the same pawl shapes are arrayed at constant intervals, such as shown in FIG. 17.

Also, the data continuity detecting unit 101 detects continuity of the data by detecting angle (gradient) in the spatial direction, indicating an array of the same shapes.

Also, for example, the data continuity detecting unit 101 detects continuity of data by detecting angle (movement) in the space direction and time direction, indicating the array of the same shapes in the space direction and the time direction.

Further, for example, the data continuity detecting unit 101 detects continuity in the data by detecting the length of the region having constant characteristics in a predetermined dimensional direction.

Hereafter, the portion of data 3 where the sensor 2 has projected the image of the object of the actual world 1 which has a straight edge and is of a monotone color different from that of the background, will also be called a two-valued edge.

Next, the principle of the present invention will be described in further detail.

Figure 18:
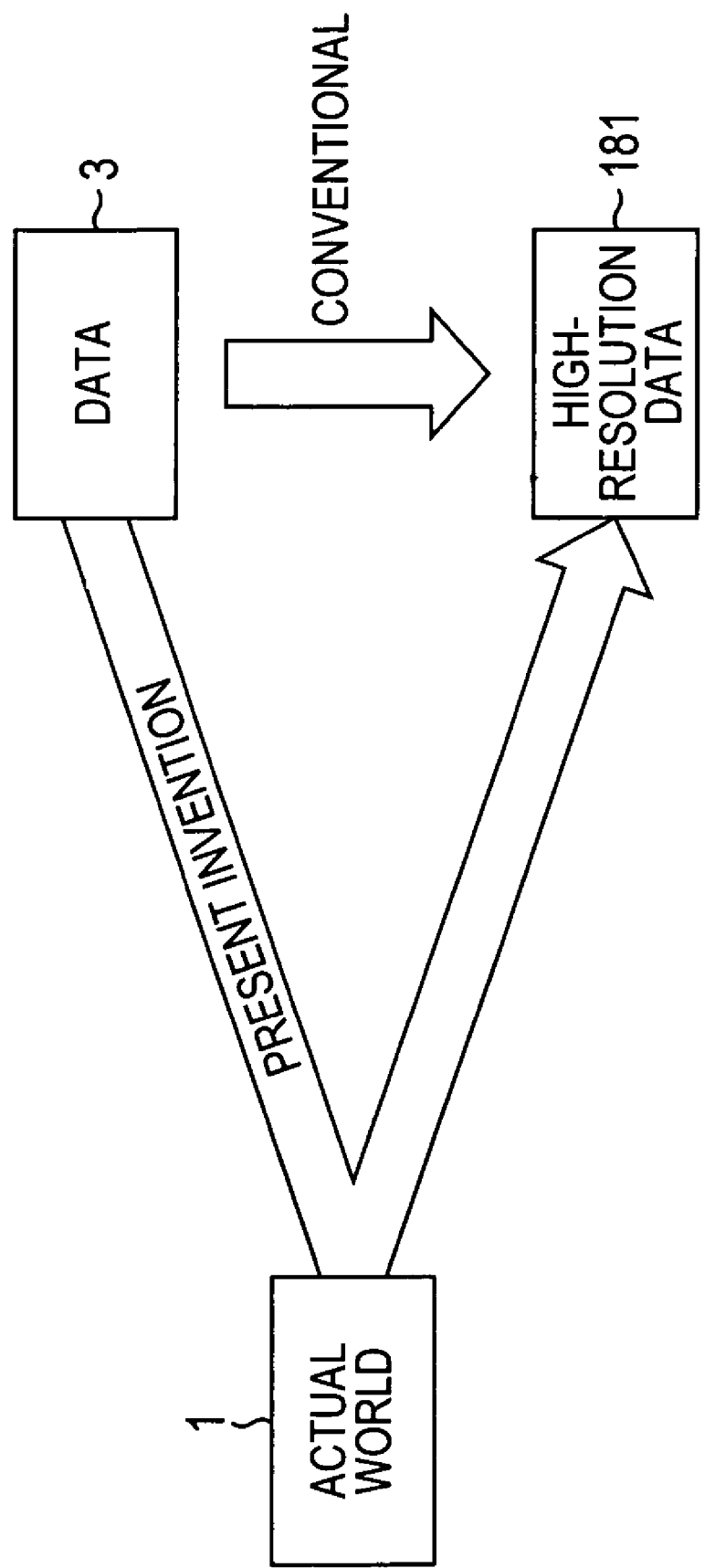
FIG. 18 is a diagram for describing the principle of the present invention.

As shown in FIG. 18, with conventional signal processing, desired high-resolution data 181, for example, is generated from the data 3.

Figure 19:
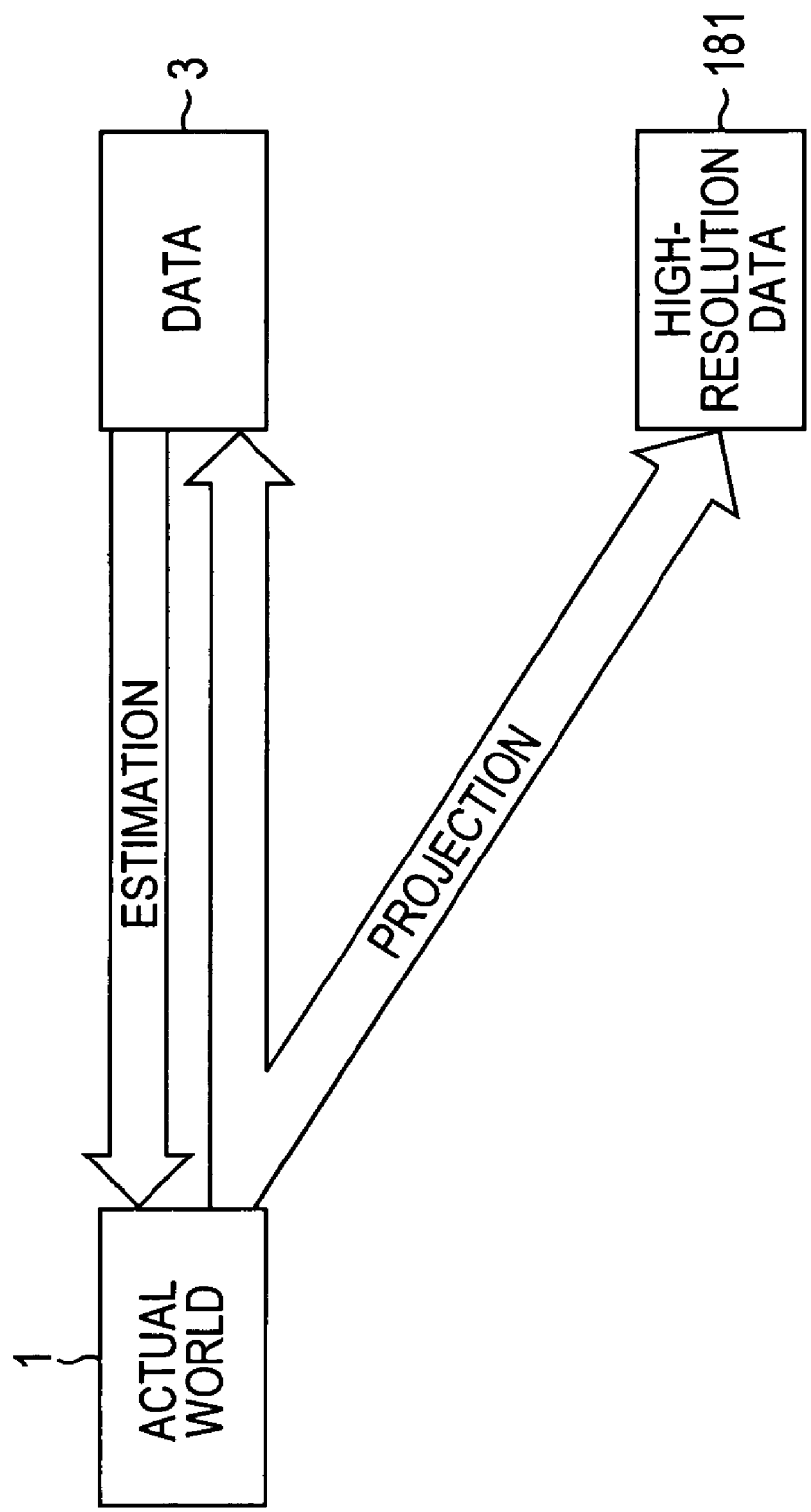
FIG. 19 is a diagram for describing the principle of the present invention.

Conversely, with the signal processing according to the present invention, the actual world 1 is estimated from the data 3, and the high-resolution data 181 is generated based on the estimation results. That is to say, as shown in FIG. 19, the actual world 1 is estimated from the data 3, and the high-resolution data 181 is generated based on the estimated actual world 1, taking into consideration the data 3.

In order to generate the high-resolution data 181 from the actual world 1, there is the need to take into consideration the relationship between the actual world 1 and the data 3. For example, how the actual world 1 is projected on the data 3 by the sensor 2 which is a CCD, is taken into consideration.

The sensor 2 which is a CCD has integration properties as described above. That is to say, one unit of the data 3 (e.g., pixel value) can be calculated by integrating a signal of the actual world 1 with a detection region (e.g., photoreception face) of a detection device (e.g., CCD) of the sensor 2.

Applying this to the high-resolution data 181, the high-resolution data 181 can be obtained by applying processing, wherein a virtual high-resolution sensor projects signals of the actual world 1 to the data 3, to the estimated actual world 1.

Figure 20:
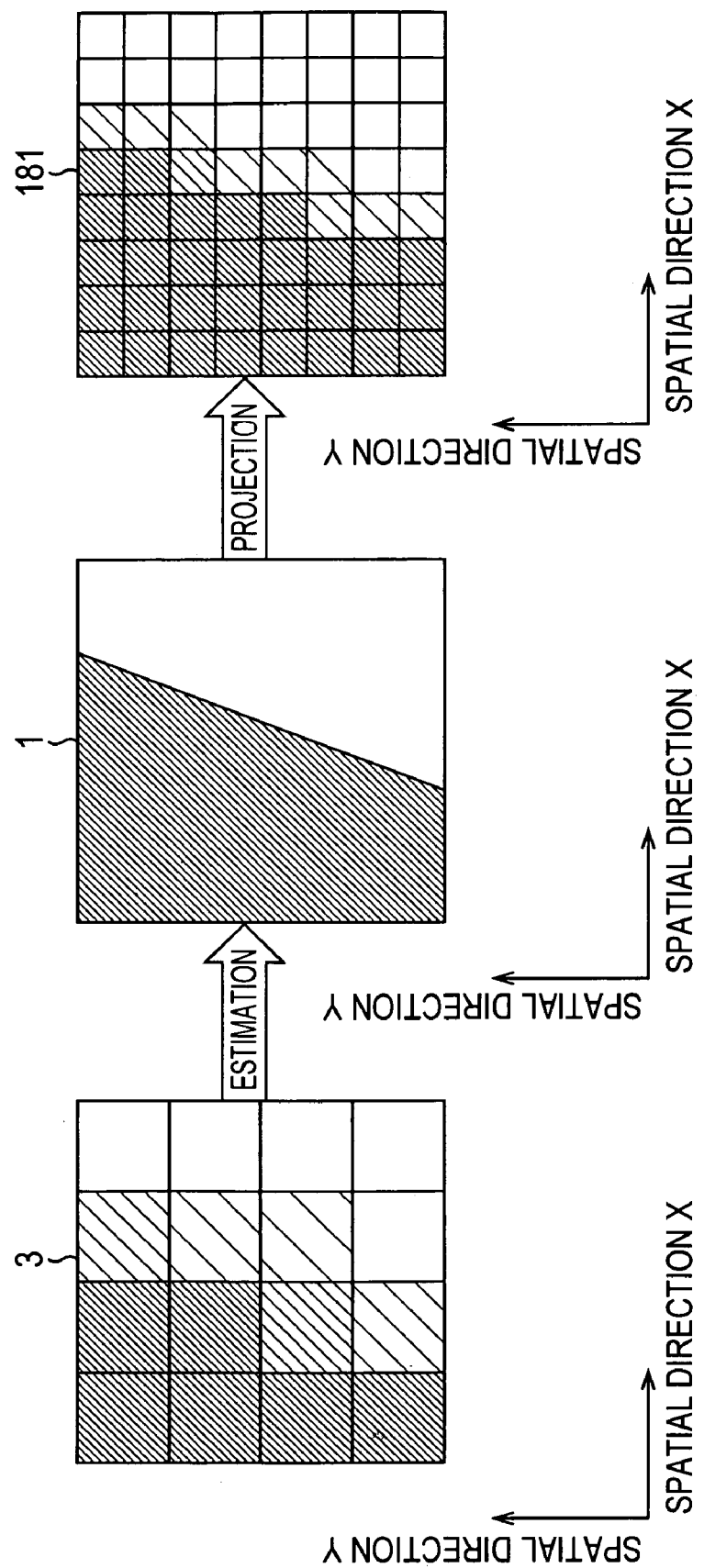
FIG. 20 is a diagram for describing an example of generating high-resolution data.

In other words, as shown in FIG. 20, if the signals of the actual world 1 can be estimated from the data 3, one value contained in the high-resolution data 181 can be obtained by integrating signals of the actual world 1 for each detection region of the detecting elements of the virtual high-resolution sensor (in the time-space direction).

For example, in the event that the change in signals of the actual world 1 are smaller than the size of the detection region of the detecting elements of the sensor 2, the data 3 cannot expresses the small changes in the signals of the actual world 1. Accordingly, high-resolution data 181 indicating small change of the signals of the actual world 1 can be obtained by integrating the signals of the actual world 1 estimated from the data 3 with each region (in the time-space direction) that is smaller in comparison with the change in signals of the actual world 1.

That is to say, integrating the signals of the estimated actual world 1 with the detection region with regard to each detecting element of the virtual high-resolution sensor enables the high-resolution data 181 to be obtained.

With the present invention, the image generating unit 103 generates the high-resolution data 181 by integrating the signals of the estimated actual world 1 in the time-space direction regions of the detecting elements of the virtual high-resolution sensor.

Next, with the present invention, in order to estimate the actual world 1 from the data 3, the relationship between the data 3 and the actual world 1, continuity, and a space mixture in the data 3, are used.

Here, a mixture means a value in the data 3 wherein the signals of two objects in the actual world 1 are mixed to yield a single value.

A space mixture means the mixture of the signals of two objects in the spatial direction due to the spatial integration effects of the sensor 2.

The actual world 1 itself is made up of countless events, and accordingly, in order to represent the actual world 1 itself with mathematical expressions, for example, there is the need to have an infinite number of variables. It is impossible to predict all events of the actual world 1 from the data 3.

In the same way, it is impossible to predict all of the signals of the actual world 1 from the data 3.

Figure 21:
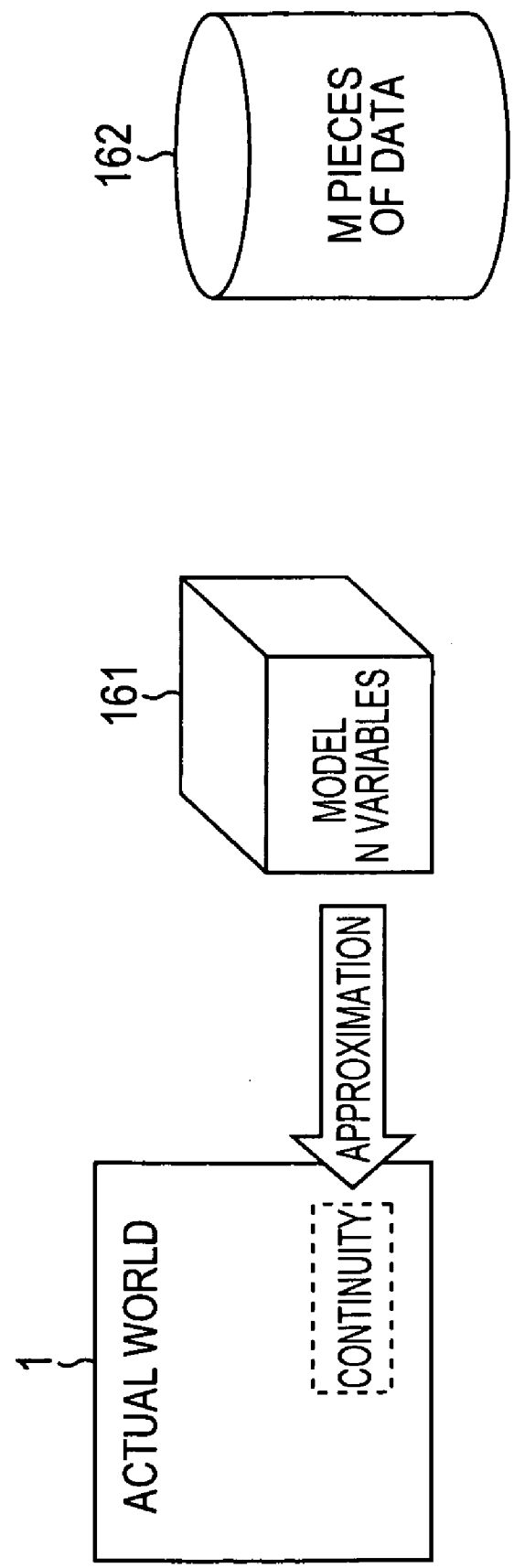
FIG. 21 is a diagram for describing approximation by model.
Figure 22:
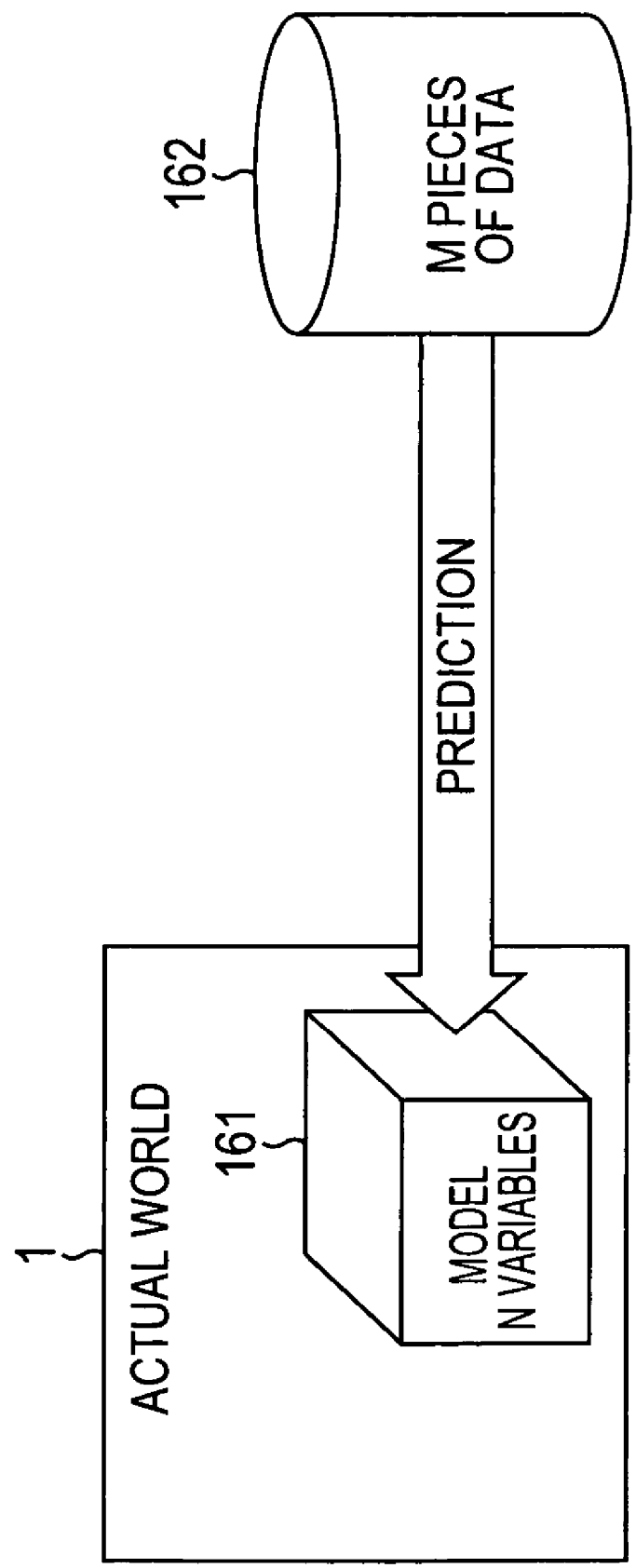
FIG. 22 is a diagram for describing estimation of a model with M pieces of data.

Accordingly, as shown in FIG. 21, with the present embodiment, of the signals of the actual world 1, a portion which has continuity and which can be expressed by the function $f(x, y, z, t)$ is taken note of, and the portion of the signals of the actual world 1 which can be represented by the function $f(x, y, z, t)$ and has continuity is approximated with a model 161 represented by N variables. As shown in FIG. 22, the model 161 is predicted from the M pieces of data 162 in the data 3.

In order to enable the model 161 to be predicted from the M pieces of data 162, first, there is the need to represent the model 161 with N variables based on the continuity, and second, to generate an expression using the N variables which indicates the relationship between the model 161 represented by the N variables and the M pieces of data 162 based on the integral properties of the sensor 2. Since the model 161 is represented by the N variables, based on the continuity, it can be said that the expression using the N variables that indicates the relationship between the model 161 represented by the N variables and the M pieces of data 162, describes the relationship between the part of the signals of the actual world 1 having continuity, and the part of the data 3 having data continuity.

In other words, the part of the signals of the actual world 1 having continuity, that is approximated by the model 161 represented by the N variables, generates data continuity in the data 3.

The data continuity detecting unit 101 detects the part of the data 3 where data continuity has been generated by the part of the signals of the actual world 1 having continuity, and the characteristics of the part where data continuity has been generated.

Figure 23:
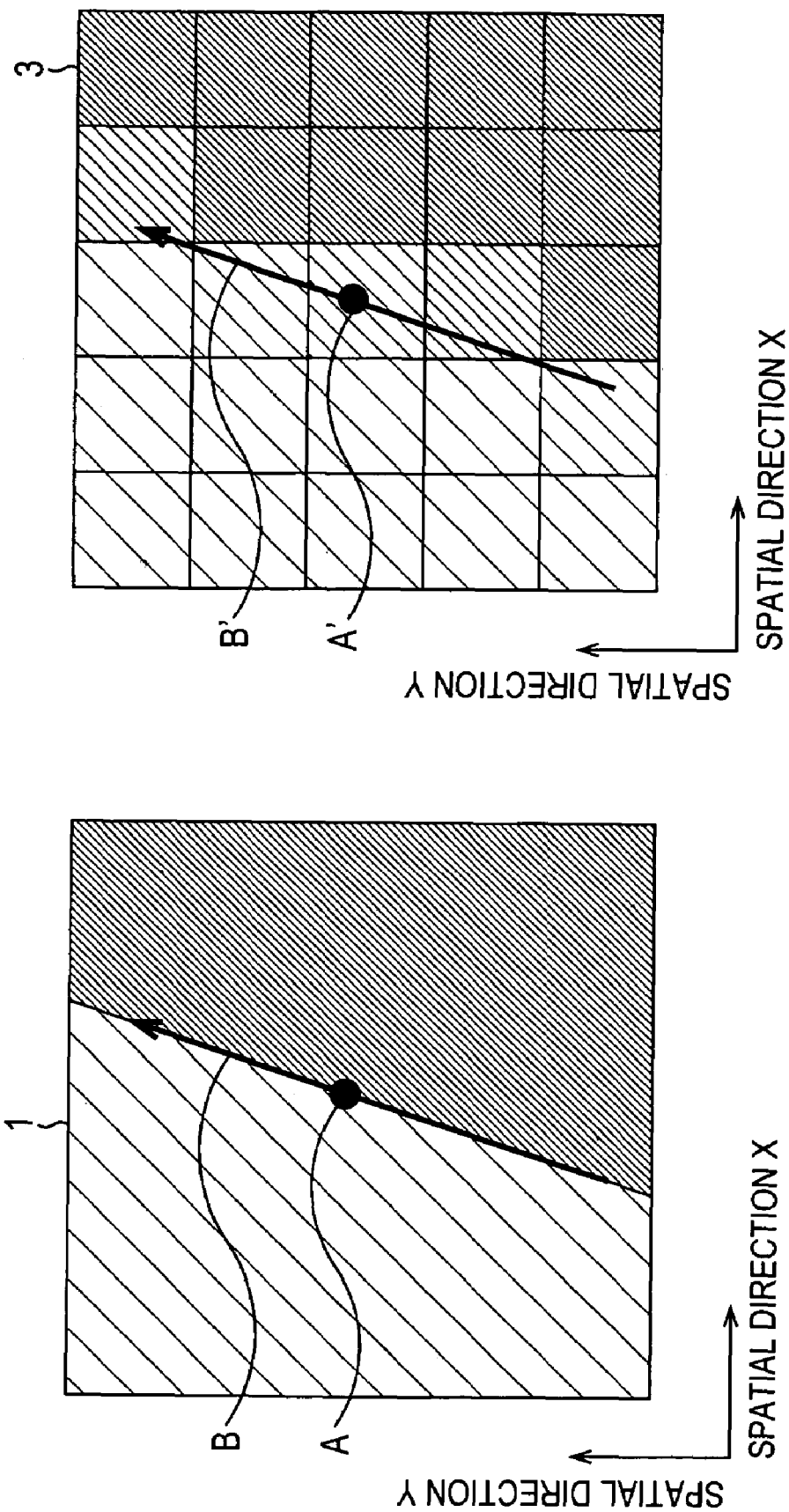
FIG. 23 is a diagram for describing the relationship between signals of the actual world and data.

For example, as shown in FIG. 23, in an image of the object of the actual world 1 which has a straight edge and is of a monotone color different from that of the background, the edge at the position of interest indicated by A in FIG. 23, has a gradient. The arrow B in FIG. 23 indicates the gradient of the edge. A predetermined edge gradient can be represented as an angle as to a reference axis or as a direction as to a reference position. For example, a predetermined edge gradient can be represented as the angle between the coordinates axis of the spatial direction X and the edge. For example, the predetermined edge gradient can be represented as the direction indicated by the length of the spatial direction X and the length of the spatial direction Y.

At the time that the image of the object of the actual world 1 which has a straight edge and is of a monotone color different from that of the background is obtained at the sensor 2 and the data 3 is output, pawl shapes corresponding to the edge are arrayed in the data 3 at the position corresponding to the position of interest (A) of the edge in the image of the actual world 1, which is indicated by A' in FIG. 23, and pawl shapes corresponding to the edge are arrayed in the direction corresponding to the gradient of the edge of the image in the actual world 1, in the direction of the gradient indicated by B' in FIG. 23.

The model 161 represented with the N variables approximates such a portion of the signals of the actual world 1 generating data continuity in the data 3.

At the time of formulating an expression using the N variables indicating the relationship between the model 161 represented with the N variables and the M pieces of data 162, the part where data continuity is generated in the data 3 is used.

Figure 24:
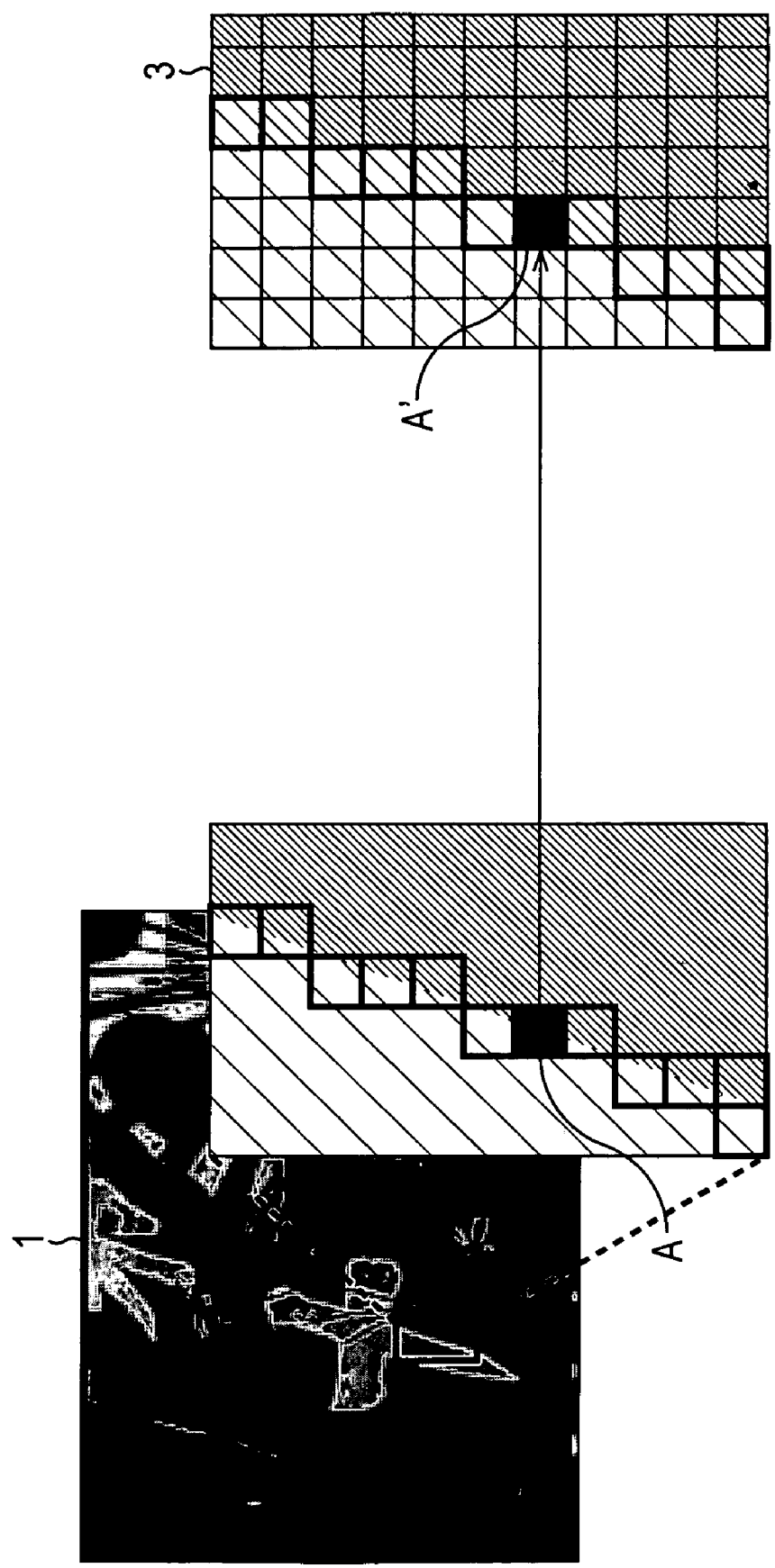
FIG. 24 is a diagram illustrating an example of data of interest at the time of creating an Expression.

In this case, in the data 3 shown in FIG. 24, taking note of the values where data continuity is generated and which belong to a mixed region, an expression is formulated with a value integrating the signals of the actual world 1 as being equal to a value output by the detecting element of the sensor 2. For example, multiple expressions can be formulated regarding the multiple values in the data 3 where data continuity is generated.

In FIG. 24, A denotes the position of interest of the edge, and A' denotes (the position of) the pixel corresponding to the position (A) of interest of the edge in the image of the actual world 1.

Now, a mixed region means a region of data in the data 3 wherein the signals for two objects in the actual world 1 are mixed and become one value. For example, a pixel value wherein, in the image of the object of the actual world 1 which has a straight edge and is of a monotone color different from that of the background in the data 3, the image of the object having the straight edge and the image of the background are integrated, belongs to a mixed region.

Figure 25:
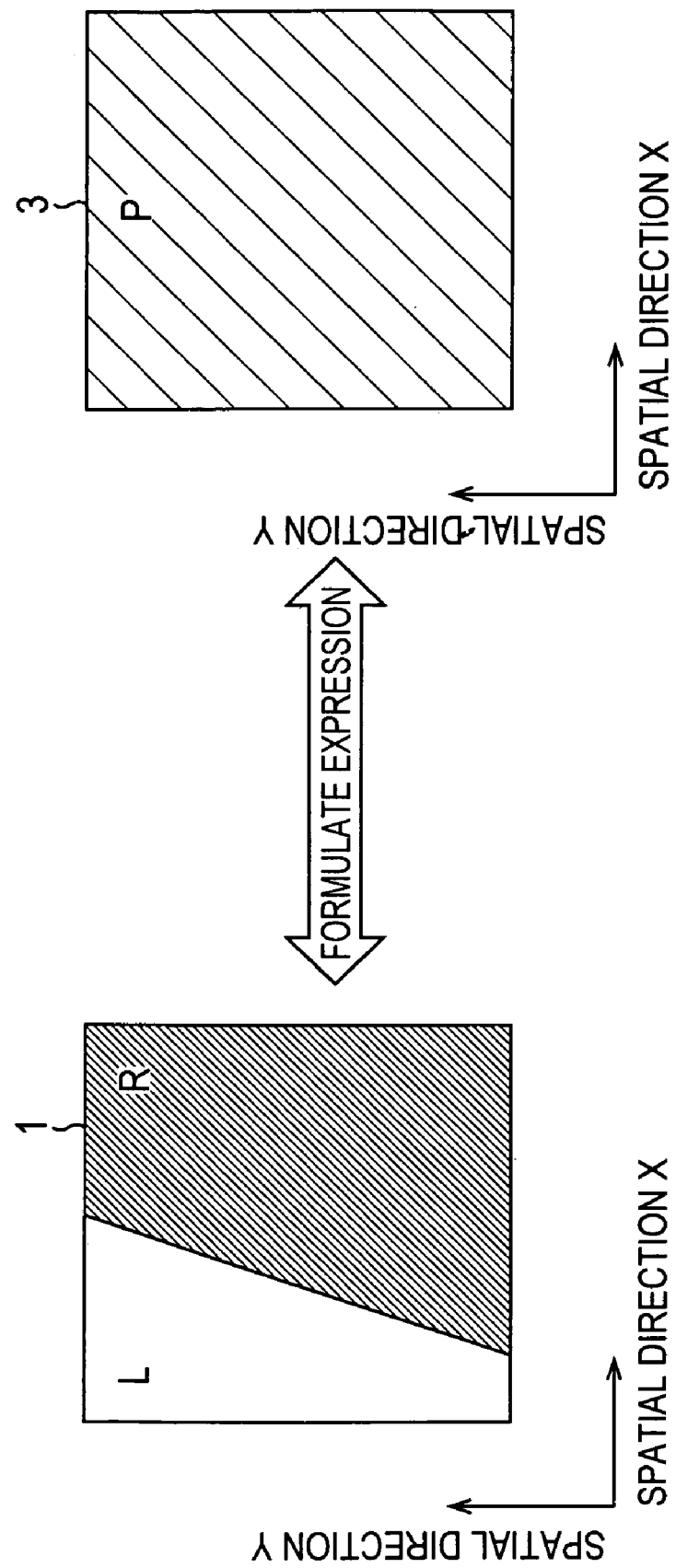
FIG. 25 is a diagram for describing signals for two objects in the actual world, and values belonging to a mixed region at the time of creating an expression.

FIG. 25 is a diagram illustrating signals for two objects in the actual world 1 and values belonging to a mixed region, in a case of formulating an expression.

FIG. 25 illustrates, to the left, signals of the actual world 1 corresponding to two objects in the actual world 1 having a predetermined expansion in the spatial direction X and the spatial direction Y, which are acquired at the detection region of a single detecting element of the sensor 2. FIG. 25 illustrates, to the right, a pixel value P of a single pixel in the data 3 wherein the signals of the actual world 1 illustrated to the left in FIG. 25 have been projected by a single detecting element of the sensor 2. That is to say, illustrates a pixel value P of a single pixel in the data 3 wherein the signals of the actual world 1 corresponding to two objects in the actual world 1 having a predetermined expansion in the spatial direction X and the spatial direction Y which are acquired by a single detecting element of the sensor 2, have been projected.

L in FIG. 25 represents the level of the signal of the actual world 1 which is shown in white in FIG. 25, corresponding to one object in the actual world 1. R in FIG. 25 represents the level of the signal of the actual world 1 which is shown hatched in FIG. 25, corresponding to the other object in the actual world 1.

Here, the mixture ratio $\alpha$ is the ratio of (the area of) the signals corresponding to the two objects cast into the detecting region of the one detecting element of the sensor 2 having a predetermined expansion in the spatial direction X and the spatial direction Y. For example, the mixture ratio $\alpha$ represents the ratio of area of the level L signals cast into the detecting region of the one detecting element of the sensor 2 having a predetermined expansion in the spatial direction X and the spatial direction Y, as to the area of the detecting region of a single detecting element of the sensor 2.

In this case, the relationship between the level L, level R, and the pixel value P, can be represented by Expression (4).

$$\alpha \times L + (1-\alpha) \times R = P \quad (4)$$

Note that there may be cases wherein the level R may be taken as the pixel value of the pixel in the data 3 positioned to the right side of the pixel of interest, and there may be cases wherein the level L may be taken as the pixel value of the pixel in the data 3 positioned to the left side of the pixel of interest.

Also, the time direction can be taken into consideration in the same way as with the spatial direction for the mixture ratio $\alpha$ and the mixed region. For example, in the event that an object in the actual world 1 which is the object of image-taking, is moving as to the sensor 2, the ratio of signals for the two objects cast into the detecting region of the single detecting element of the sensor 2 changes in the time direction. The signals for the two objects regarding which the ratio changes in the time direction, that have been cast into the detecting region of the single detecting element of the sensor 2, are projected into a single value of the data 3 by the detecting element of the sensor 2.

The mixture of signals for two objects in the time direction due to time integration effects of the sensor 2 will be called time mixture.

The data continuity detecting unit 101 detects regions of pixels in the data 3 where signals of the actual world 1 for two objects in the actual world 1, for example, have been projected. The data continuity detecting unit 101 detects gradient in the data 3 corresponding to the gradient of an edge of an image in the actual world 1, for example.

The actual world estimating unit 102 estimates the signals of the actual world by formulating an expression using N variables, representing the relationship between the model 161 represented by the N variables and the M pieces of data 162, based on the region of the pixels having a predetermined mixture ratio $\alpha$ detected by the data continuity detecting unit 101 and the gradient of the region, for example, and solving the formulated expression.

Description will be made further regarding specific estimation of the actual world 1.

Of the signals of the actual world represented by the function $F(x, y, z, t)$ let us consider approximating the signals of the actual world represented by the function $F(x, y, t)$ at the cross-section in the spatial direction Z (the position of the sensor 2), with an approximation function $f(x, y, t)$ determined by a position x in the spatial direction X, a position y in the spatial direction Y, and a point-in-time t.

Now, the detection region of the sensor 2 has an expanse in the spatial direction X and the spatial direction Y. In other words, the approximation function $f(x, y, t)$ is a function approximating the signals of the actual world 1 having an expanse in the spatial direction and time direction, which are acquired with the sensor 2.

Let us say that projection of the signals of the actual world 1 yields a value $P(x, y, t)$ of the data 3. The value $P(x, y, t)$ of the data 3 is a pixel value which the sensor 2 which is an image sensor outputs, for example.

Now, in the event that the projection by the sensor 2 can be formulated, the value obtained by projecting the approximation function $f(x, y, t)$ can be represented as a projection function $S(x, y, t)$.

Obtaining the projection function $S(x, y, t)$ has the following problems.

First, generally, the function $F(x, y, z, t)$ representing the signals of the actual world 1 can be a function with an infinite number of orders.

Second, even if the signals of the actual world could be described as a function, the projection function $S(x, y, t)$ via projection of the sensor 2 generally cannot be determined. That is to say, the action of projection by the sensor 2, in other words, the relationship between the input signals and output signals of the sensor 2, is unknown, so the projection function $S(x, y, t)$ cannot be determined.

With regard to the first problem, let us consider expressing the function $f(x, y, t)$ approximating signals of the actual world 1 with the sum of products of the function $f_i(x, y, t)$ which is a describable function (e.g., a function with a finite number of orders) and variables $w_i$.

Also, with regard to the second problem, formulating projection by the sensor 2 allows us to describe the function $S_i(x, y, t)$ from the description of the function $f_i(x, y, t)$.

That is to say, representing the function $f(x, y, t)$ approximating signals of the actual world 1 with the sum of products of the function $f_i(x, y, t)$ and variables $w_i$, the Expression (5) can be obtained.

$$f(x, y, t) = \sum_{i=1}^{N} w_i f_i(x, y, t) \tag{5}$$

For example, as indicated in Expression (6), the relationship between the data 3 and the signals of the actual world can be formulated as shown in Expression (7) from Expression (5) by formulating the projection of the sensor 2.

$$P_j(x_j, y_j, t_j) = \sum_{i=1}^{N} w_i S_i(x_j, y_j, t_j) \tag{6}$$

$$S_i(x,y,t) = \int \int \int f_i(x,y,t) dx dy dt \tag{7}$$

In Expression (7), j represents the index of the data.

In the event that M data groups (j=1 through M) common with the N variables $w_i$ (i=1 through N) exists in Expression (7), Expression (8) is satisfied, so the model 161 of the actual world can be obtained from data 3.

$$N \leq M \tag{8}$$

N is the number of variables representing the model 161 approximating the actual world 1. M is the number of pieces of data 162 include in the data 3.

Representing the function f(x, y, t) approximating the actual world 1 with Expression (5) allows the variable portion $w_i$ to be handled independently. At this time, i represents the number of variables. Also, the form of the function represented by $f_i$ can be handed independently, and a desired function can be used for $f_i$.

Accordingly, the number N of the variables $w_i$ can be defined without dependence on the function $f_i$, and the variables $w_i$ can be obtained from the relationship between the number N of the variables $w_i$ and the number of pieces of data M.

That is to say, using the following three allows the actual world 1 to be estimated from the data 3.

First, the N variables are determined. That is to say, Expression (5) is determined. This enables describing the actual world 1 using continuity. For example, the signals of the actual world 1 can be described with a model 161 wherein a cross-section is expressed with a polynomial, and the same cross-sectional shape continues in a constant direction.

Second, for example, projection by the sensor 2 is formulated, describing Expression (7). For example, this is formulated such that the results of integration of the signals of the actual world 2 are data 3.

Third, M pieces of data 162 are collected to satisfy Expression (8). For example, the data 162 is collected from a region having data continuity that has been detected with the data continuity detecting unit 101. For example, data 162 of a region wherein a constant cross-section continues, which is an example of continuity, is collected.

In this way, the relationship between the data 3 and the actual world 1 is described with the Expression (5), and M pieces of data 162 are collected, thereby satisfying Expression (8), and the actual world 1 can be estimated.

More specifically, in the event of N=M, the number of variables N and the number of expressions M are equal, so the variables $w_i$ can be obtained by formulating a simultaneous equation.

Also, in the event that N<M, various solving methods can be applied. For example, the variables $w_i$ can be obtained by least-square.

Now, the solving method by least-square will be described in detail.

First, an Expression (9) for predicting data 3 from the actual world 1 will be shown according to Expression (7).

$$P'_j(x_j, y_j, t_j) = \sum_{i=1}^{N} w_i S_i(x_j, y_j, t_j) \tag{9}$$

In Expression (9), $P'_j(x_j, y_j, t_j)$ is a prediction value.

The sum of squared differences E for the prediction value P' and observed value P is represented by Expression (10).

$$E = \sum_{j=1}^{M} (P_j(x_j, y_j, t_j) - P'_j(x_j, y_j, t_j))^2 \tag{10}$$

The variables $w_i$ are obtained such that the sum of squared differences E is the smallest. Accordingly, the partial differential value of Expression (10) for each variable $w_k$ is 0. That is to say, Expression (11) holds.

$$\frac{\partial E}{\partial w_k} = -2 \sum_{j=1}^{M} w_i S_k(x_j, y_j, t_j)(P_j(x_j, y_j, t_j) - \sum_{i=1}^{N} w_i S_i(x_j, y_j, t_j)) = 0 \tag{11}$$

Expression (11) yields Expression (12).

$$\sum_{j=1}^{M} (S_k(x_j, y_j, t_j) \sum_{i=1}^{N} w_i S_i(x_j, y_j, t_j)) = \sum_{j=1}^{M} (S_k(x_j, y_j, t_j)(P_j(x_j, y_j, t_j)) \tag{12}$$

When Expression (12) holds with K=1 through N, the solution by least-square is obtained. The normal equation thereof is shown in Expression (13).

$$\begin{pmatrix} \sum_{j=1}^{M} S_1(j)S_1(j) & \sum_{j=1}^{M} S_1(j)S_2(j) & \cdots & \sum_{j=1}^{M} S_1(j)S_N(j) \\ \sum_{j=1}^{M} S_2(j)S_1(j) & \sum_{j=1}^{M} S_2(j)S_2(j) & \cdots & \sum_{j=1}^{M} S_2(j)S_N(j) \\ \vdots & \vdots & \ddots & \vdots \\ \sum_{j=1}^{M} S_N(j)S_1(j) & \sum_{j=1}^{M} S_N(j)S_2(j) & \cdots & \sum_{j=1}^{M} S_N(j)S_N(j) \end{pmatrix} \begin{pmatrix} w_1 \\ w_2 \\ \vdots \\ w_N \end{pmatrix} = \tag{13}$$

$$\begin{pmatrix} \sum_{j=1}^{M} S_1(j)P_j(j) \\ \sum_{j=1}^{M} S_2(j)P_j(j) \\ \vdots \\ \sum_{j=1}^{M} S_N(j)P_j(j) \end{pmatrix}$$

Note that in Expression (13), $S_i(x_j, y_j, t_j)$ is described as $S_i(j)$.

$$S_{MAT} = \begin{pmatrix} \sum_{j=1}^{M} S_1(j)S_1(j) & \sum_{j=1}^{M} S_1(j)S_2(j) & \cdots & \sum_{j=1}^{M} S_1(j)S_N(j) \\ \sum_{j=1}^{M} S_2(j)S_1(j) & \sum_{j=1}^{M} S_2(j)S_2(j) & \cdots & \sum_{j=1}^{M} S_2(j)S_N(j) \\ \vdots & \vdots & \ddots & \vdots \\ \sum_{j=1}^{M} S_N(j)S_1(j) & \sum_{j=1}^{M} S_N(j)S_2(j) & \cdots & \sum_{j=1}^{M} S_N(j)S_N(j) \end{pmatrix} \quad (14)$$

$$W_{MAT} = \begin{pmatrix} w_1 \\ w_2 \\ \vdots \\ w_N \end{pmatrix} \quad (15)$$

$$P_{MAT} = \begin{pmatrix} \sum_{j=1}^{M} S_1(j)P_j(j) \\ \sum_{j=1}^{M} S_2(j)P_j(j) \\ \vdots \\ \sum_{j=1}^{M} S_N(j)P_j(j) \end{pmatrix} \quad (16)$$

From Expression (14) through Expression (16), Expression (13) can be expressed as $S_{MAT}W_{MAT}=P_{MAT}$.

In Expression (13), $S_i$ represents the projection of the actual world 1. In Expression (13), $P_j$ represents the data 3. In Expression (13), $w_i$ represents variables for describing and obtaining the characteristics of the signals of the actual world 1.

Accordingly, inputting the data 3 into Expression (13) and obtaining $W_{MAT}$ by a matrix solution or the like enables the actual world 1 to be estimated. That is to say, the actual world 1 can be estimated by computing Expression (17).

$$W_{MAT}=S_{MAT}^{-1}P_{MAT} \quad (17)$$

Note that in the event that $S_{MAT}$ is not regular, a transposed matrix of $S_{MAT}$ can be used to obtain $W_{MAT}$.

The actual world estimating unit 102 estimates the actual world 1 by, for example, inputting the data 3 into Expression (13) and obtaining $W_{MAT}$ by a matrix solution or the like.

Now, an even more detailed example will be described. For example, the cross-sectional shape of the signals of the actual world 1, i.e., the change in level as to the change in position, will be described with a polynomial. Let us assume that the cross-sectional shape of the signals of the actual world 1 is constant, and that the cross-section of the signals of the actual world 1 moves at a constant speed. Projection of the signals of the actual world 1 from the sensor 2 to the data 3 is formulated by three-dimensional integration in the time-space direction of the signals of the actual world 1.

The assumption that the cross-section of the signals of the actual world 1 moves at a constant speed yields Expression (18) and Expression (19).

$$\frac{dx}{dt} = v_x \quad (18)$$

$$\frac{dy}{dt} = v_y \quad (19)$$

Here, $v_x$ and $v_y$ are constant.

Using Expression (18) and Expression (19), the cross-sectional shape of the signals of the actual world 1 can be represented as in Expression (20).

$$f(x',y')=f(x+v_xt,y+v_yt) \quad (20)$$

Formulating projection of the signals of the actual world 1 from the sensor 2 to the data 3 by three-dimensional integration in the time-space direction of the signals of the actual world 1 yields Expression (21).

$$S(x, y, t) = \int_{x_s}^{x_e} \int_{y_s}^{y_e} \int_{t_s}^{t_e} f(x', y')dxdydt \quad (21)$$
$$= \int_{x_s}^{x_e} \int_{y_s}^{y_e} \int_{t_s}^{t_e} f(x + v_xt, y + v_yt)dxdydt$$

In Expression (21), $S(x, y, t)$ represents an integrated value the region from position $x_s$ to position $x_e$ for the spatial direction X, from position $y_s$ to position $y_e$ for the spatial direction Y, and from point-in-time $t_s$ to point-in-time $t_e$ for the time direction t, i.e., the region represented as a space-time cuboid.

Solving Expression (13) using a desired function $f(x', y')$ whereby Expression (21) can be determined enables the signals of the actual world 1 to be estimated.

In the following, we will use the function indicated in Expression (22) as an example of the function $f(x', y')$.

$$f(x', y') = w_1 x' + w_2 y' + w_3 \quad (22)$$
$$= w_1(x + v_xt) + w_2(y + v_xt) + w_3$$

Figure 26:
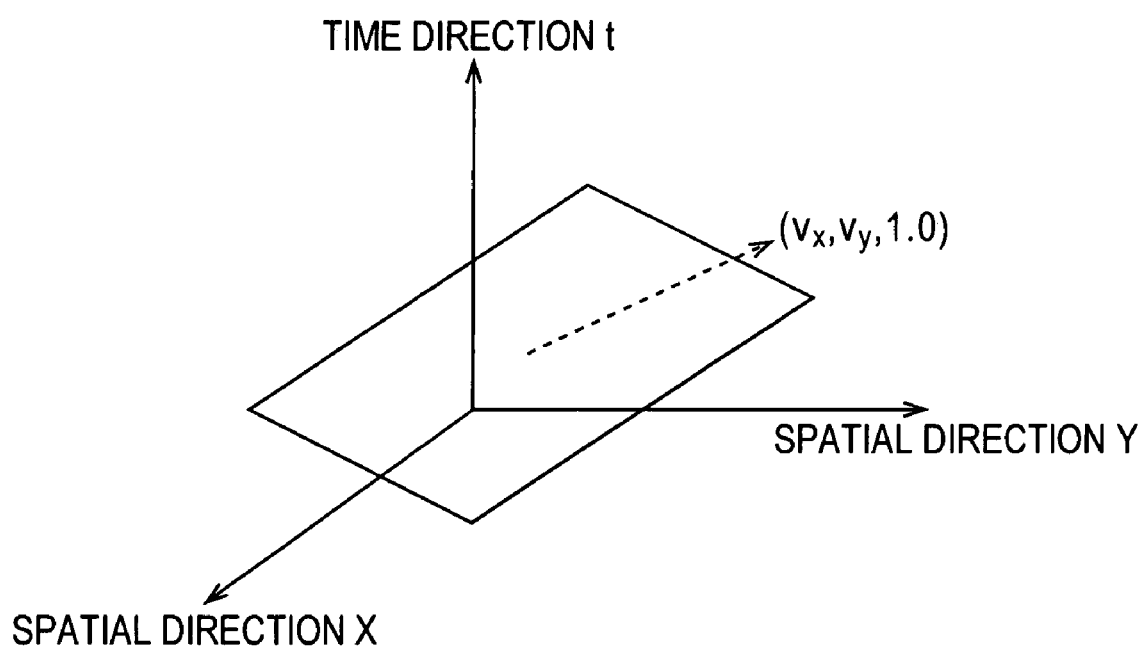
FIG. 26 is a diagram for describing continuity represented by Expression (18), Expression (19), and Expression (22).

That is to say, the signals of the actual world 1 are estimated to include the continuity represented in Expression (18), Expression (19), and Expression (22). This indicates that the cross-section with a constant shape is moving in the space-time direction as shown in FIG. 26.

Substituting Expression (22) into Expression (21) yields Expression (23).

$$S(x, y, t) = \int_{x_s}^{x_e} \int_{y_s}^{y_e} \int_{t_s}^{t_e} f(x + v_xt, y + v_yt)dxdydt \quad (23)$$
$$= \text{Volume} \left( \frac{w_0}{2}(x_e + x_s + v_x(t_e + t_s)) + \frac{w_1}{2}(y_e + y_s + v_y(t_e + t_s)) + w_2 \right)$$
$$= w_0 S_0(x, y, t) + w_1 S_1(x, y, t) + w_2 S_2(x, y, t)$$

wherein $Volume=(x_e-x_s)(y_e-y_s)(t_e-t_s)$
$S_0(x, y, t)=Volume/2\times(x_e+x_s+v_x(t_e+t_s))$
$S_1(x, y, t)=Volume/2\times(y_e+y_s+v_y(t_e+t_s))$
$S_2(x, y, t)=1$ holds.

Figure 27:
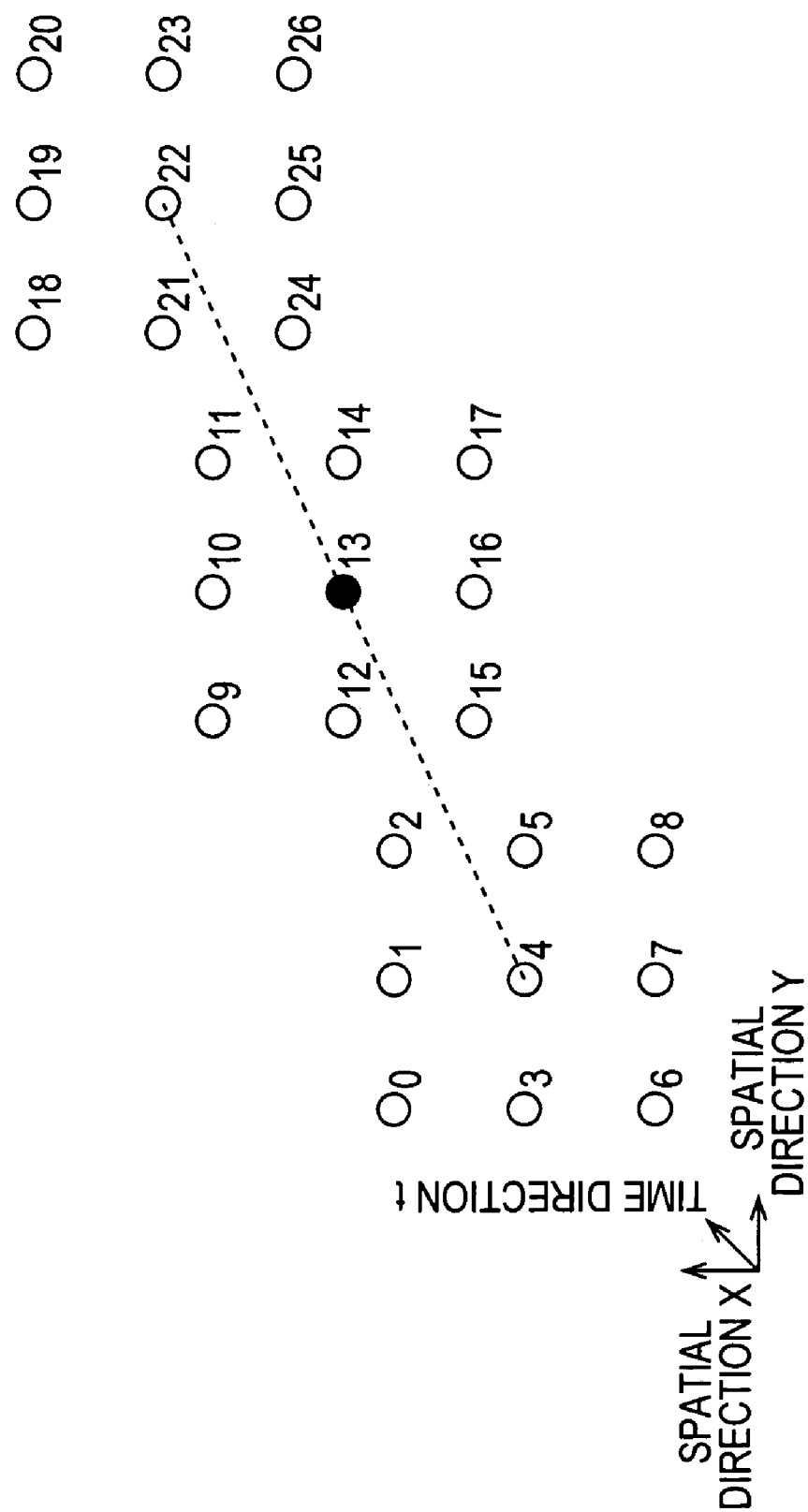
FIG. 27 is a diagram illustrating an example of M pieces of data extracted from data.

FIG. 27 is a diagram illustrating an example of the M pieces of data 162 extracted from the data 3. For example, let us say that 27 pixel values are extracted as the data 162, and that the extracted pixel values are $P_j(x, y, t)$. In this case, j is 0 through 26.

In the example shown in FIG. 27, in the event that the pixel value of the pixel corresponding to the position of interest at the point-in-time t which is n is $P_{13}(x, y, t)$, and the direction of array of the pixel values of the pixels having the continuity of data (e.g., the direction in which the same-shaped pawl shapes detected by the data continuity detecting unit 101 are arrayed) is a direction connecting $P_4(x, y, t)$, $P_{13}(x, y, t)$, and $P_{22}(x, y, t)$, the pixel values $P_9(x, y, t)$ through $P_{17}(x, y, t)$ at the point-in-time t which is n, the pixel values $P_0(x, y, t)$ through $P_8(x, y, t)$ at the point-in-time t which is n−1 which is earlier in time than n, and the pixel values $P_{18}(x, y, t)$ through $P_{26}(x, y, t)$ at the point-in-time t which is n+1 which is later in time than n, are extracted.

Figure 28:
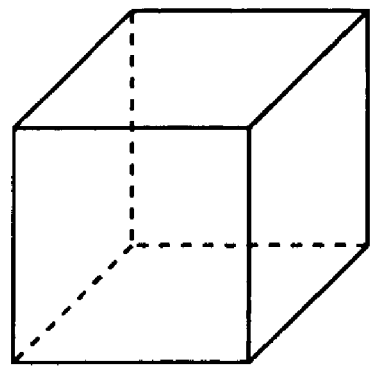
FIG. 28 is a diagram for describing a region where a pixel value, which is data, is obtained.
Figure 29:
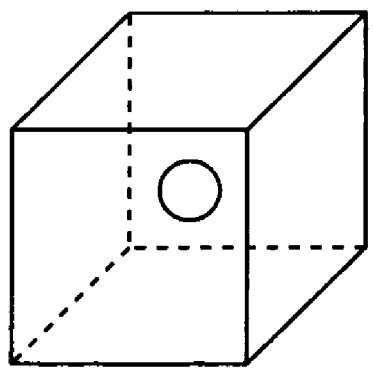
FIG. 29 is a diagram for describing approximation of the position of a pixel in the space-time direction.

Now, the region regarding which the pixel values, which are the data 3 output from the image sensor which is the sensor 2, have been obtained, have a time-direction and two-dimensional spatial direction expansion, as shown in FIG. 28. Now, as shown in FIG. 29, the center of gravity of the cuboid corresponding to the pixel values (the region regarding which the pixel values have been obtained) can be used as the position of the pixel in the space-time direction. The circle in FIG. 29 indicates the center of gravity.

Generating Expression (13) from the 27 pixel values $P_0(x, y, t)$ through $P_{26}(x, y, t)$ and from Expression (23), and obtaining W, enables the actual world 1 to be estimated.

In this way, the actual world estimating unit 102 generates Expression (13) from the 27 pixel values $P_0(x, y, t)$ through $P_{26}(x, y, t)$ and from Expression (23), and obtains W, thereby estimating the signals of the actual world 1.

Note that a Gaussian function, a sigmoid function, or the like, can be used for the function $f_i(x, y, t)$.

An example of processing for generating high-resolution data 181 with even higher resolution, corresponding to the data 3, from the estimated actual world 1 signals, will be described with reference to FIG. 30 through FIG. 34.

Figure 30:
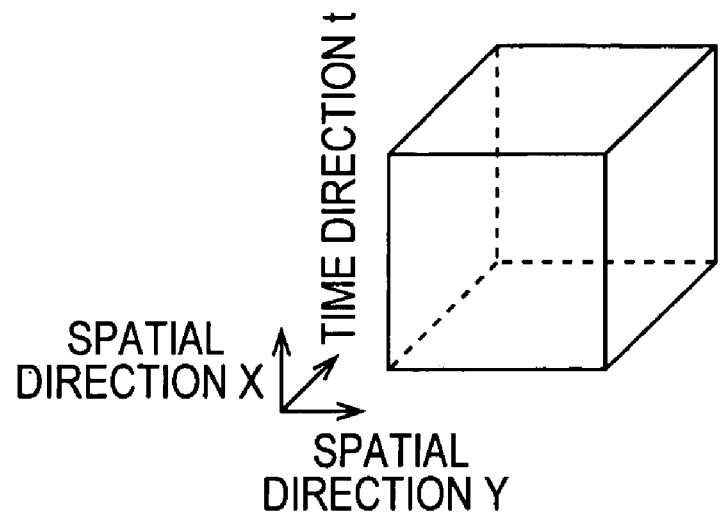
FIG. 30 is a diagram for describing integration of signals of the actual world in the time direction and two-dimensional spatial direction, in the data.

As shown in FIG. 30, the data 3 has a value wherein signals of the actual world 1 are integrated in the time direction and two-dimensional spatial directions. For example, a pixel value which is data 3 that has been output from the image sensor which is the sensor 2 has a value wherein the signals of the actual world 1, which is light cast into the detecting device, are integrated by the shutter time which is the detection time in the time direction, and integrated by the photoreception region of the detecting element in the spatial direction.

Figure 31:
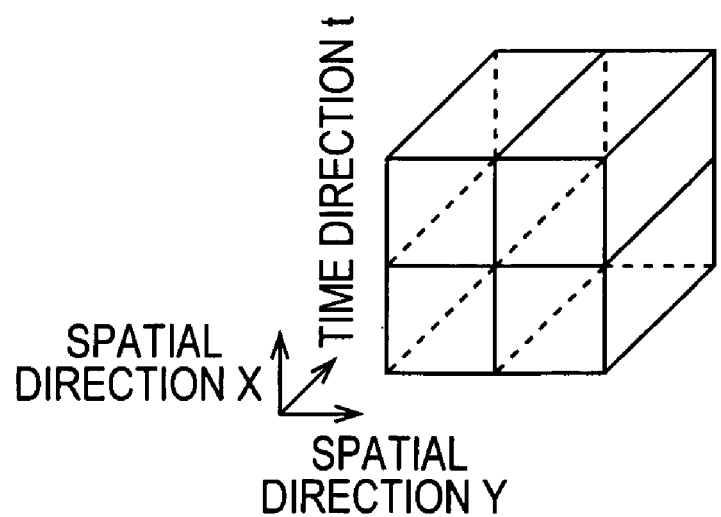
FIG. 31 is a diagram for describing an integration region at the time of generating high-resolution data with higher resolution in the spatial direction.

Conversely, as shown in FIG. 31, the high-resolution data 181 with even higher resolution in the spatial direction is generated by integrating the estimated actual world 1 signals in the time direction by the same time as the detection time of the sensor 2 which has output the data 3, and also integrating in the spatial direction by a region narrower in comparison with the photoreception region of the detecting element of the sensor 2 which has output the data 3.

Note that at the time of generating the high-resolution data 181 with even higher resolution in the spatial direction, the region where the estimated signals of the actual world 1 are integrated can be set completely disengaged from photoreception region of the detecting element of the sensor 2 which has output the data 3. For example, the high-resolution data 181 can be provided with resolution which is that of the data 3 magnified in the spatial direction by an integer, of course, and further, can be provided with resolution which is that of the data 3 magnified in the spatial direction by a rational number such as 5/3 times, for example.

Figure 32:
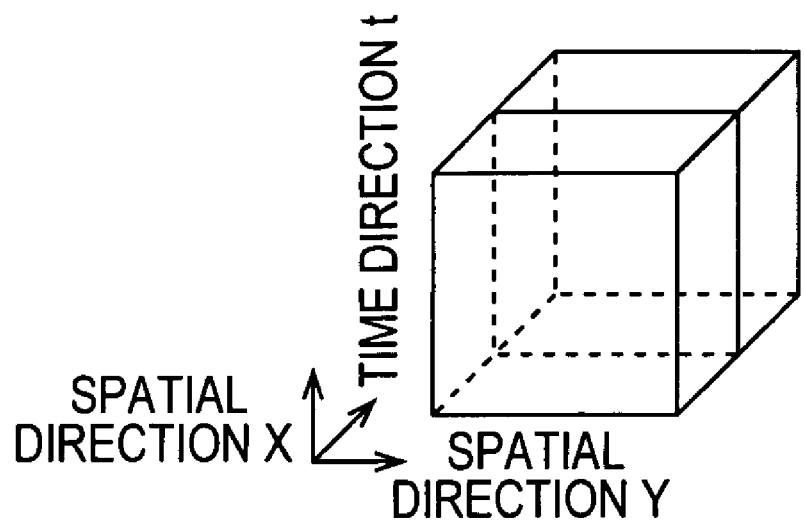
FIG. 32 is a diagram for describing an integration region at the time of generating high-resolution data with higher resolution in the time direction.

Also, as shown in FIG. 32, the high-resolution data 181 with even higher resolution in the time direction is generated by integrating the estimated actual world 1 signals in the spatial direction by the same region as the photoreception region of the detecting element of the sensor 2 which has output the data 3, and also integrating in the time direction by a time shorter than the detection time of the sensor 2 which has output the data 3.

Note that at the time of generating the high-resolution data 181 with even higher resolution in the time direction, the time by which the estimated signals of the actual world 1 are integrated can be set completely disengaged from shutter time of the detecting element of the sensor 2 which has output the data 3. For example, the high-resolution data 181 can be provided with resolution which is that of the data 3 magnified in the time direction by an integer, of course, and further, can be provided with resolution which is that of the data 3 magnified in the time direction by a rational number such as 7/4 times, for example.

Figure 33:
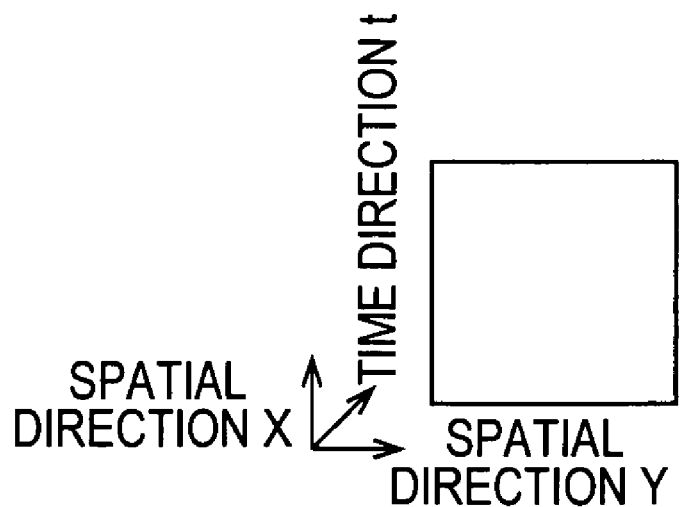
FIG. 33 is a diagram for describing an integration region at the time of generating high-resolution data with blurring due to movement having been removed.

As shown in FIG. 33, high-resolution data 181 with movement blurring removed is generated by integrating the estimated actual world 1 signals only in the spatial direction and not in the time direction.

Figure 34:
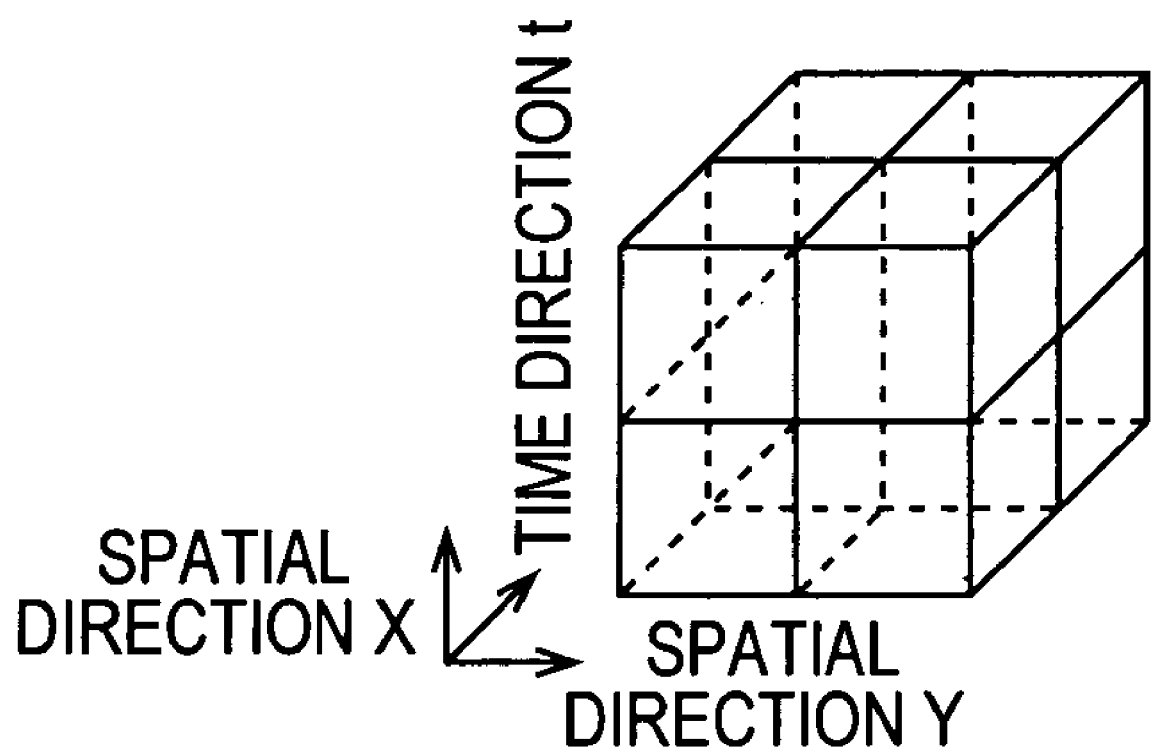
FIG. 34 is a diagram for describing an integration region at the time of generating high-resolution data with higher resolution is the spatial direction.

Further, as shown in FIG. 34, high-resolution data 181 with higher resolution in the time direction and space direction is generated by integrating the estimated actual world 1 signals in the spatial direction by a region narrower in comparison with the photoreception region of the detecting element of the sensor 2 which has output the data 3, and also integrating in the time direction by a time shorter in comparison with the detection time of the sensor 2 which has output the data 3.

In this case, the region and time for integrating the estimated actual world 1 signals can be set completely unrelated to the photoreception region and shutter time of the detecting element of the sensor 2 which has output the data 3.

Thus, the image generating unit 103 generates data with higher resolution in the time direction or the spatial direction, by integrating the estimated actual world 1 signals by a desired space-time region, for example.

Accordingly, data which is more accurate with regard to the signals of the actual world 1, and which has higher resolution in the time direction or the space direction, can be generated by estimating the signals of the actual world 1.

An example of an input image and the results of processing with the signal processing device 4 according to the present invention will be described with reference to FIG. 35 through FIG. 39.

Figure 35:
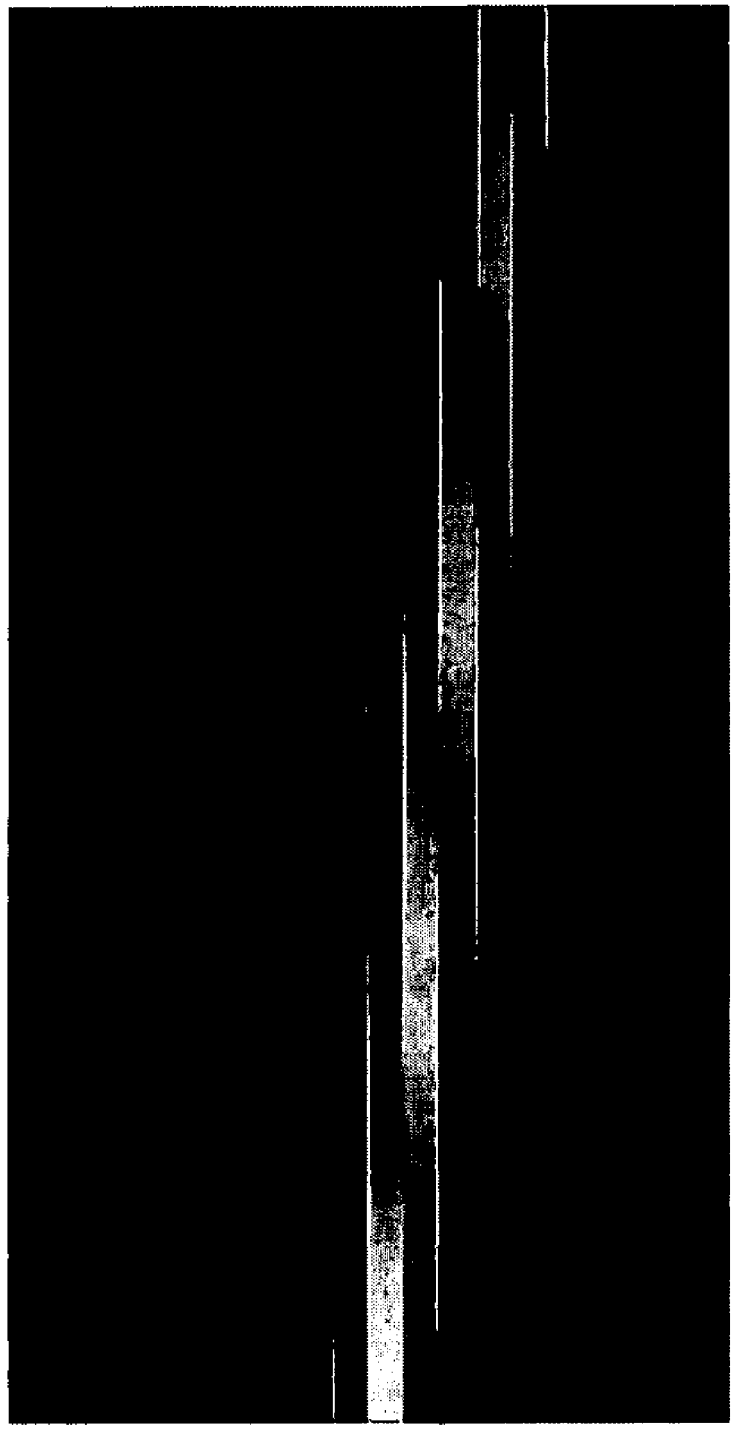
FIG. 35 is a diagram illustrating the original image of the input image.
Figure 36:
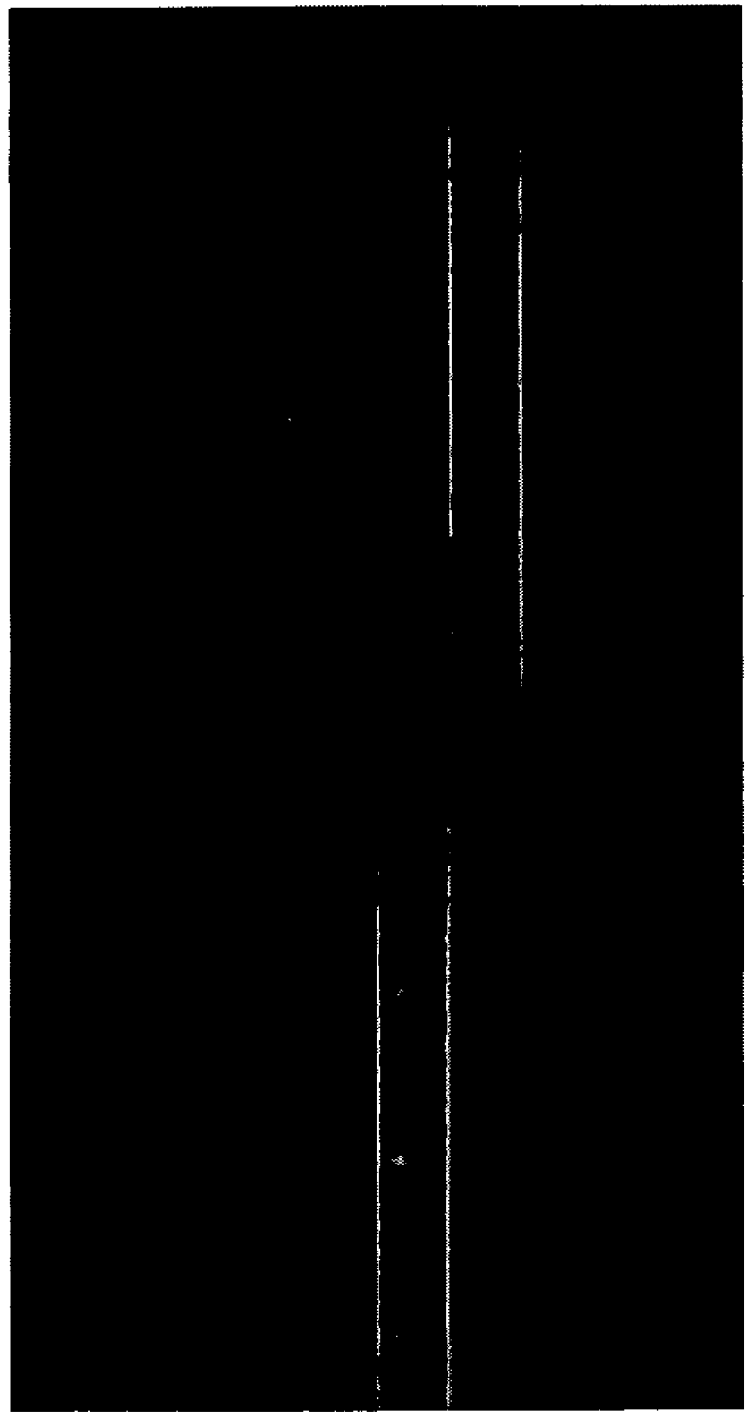
FIG. 36 is a diagram illustrating an example of an input image.

FIG. 35 is a diagram illustrating an original image of an input image. FIG. 36 is a diagram illustrating an example of an input image. The input image shown in FIG. 36 is an image generated by taking the average value of pixel values of pixels belonging to blocks made up of 2 by 2 pixels of the image shown in FIG. 35, as the pixel value of a single pixel. That is to say, the input image is an image obtained by applying spatial direction integration to the image shown in FIG. 35, imitating the integrating properties of the sensor.

The original image shown in FIG. 35 contains an image of a fine line inclined at approximately 5 degrees in the clockwise direction from the vertical direction. In the same way, the input image shown in FIG. 36 contains an image of a fine line inclined at approximately 5 degrees in the clockwise direction from the vertical direction.

Figure 37:
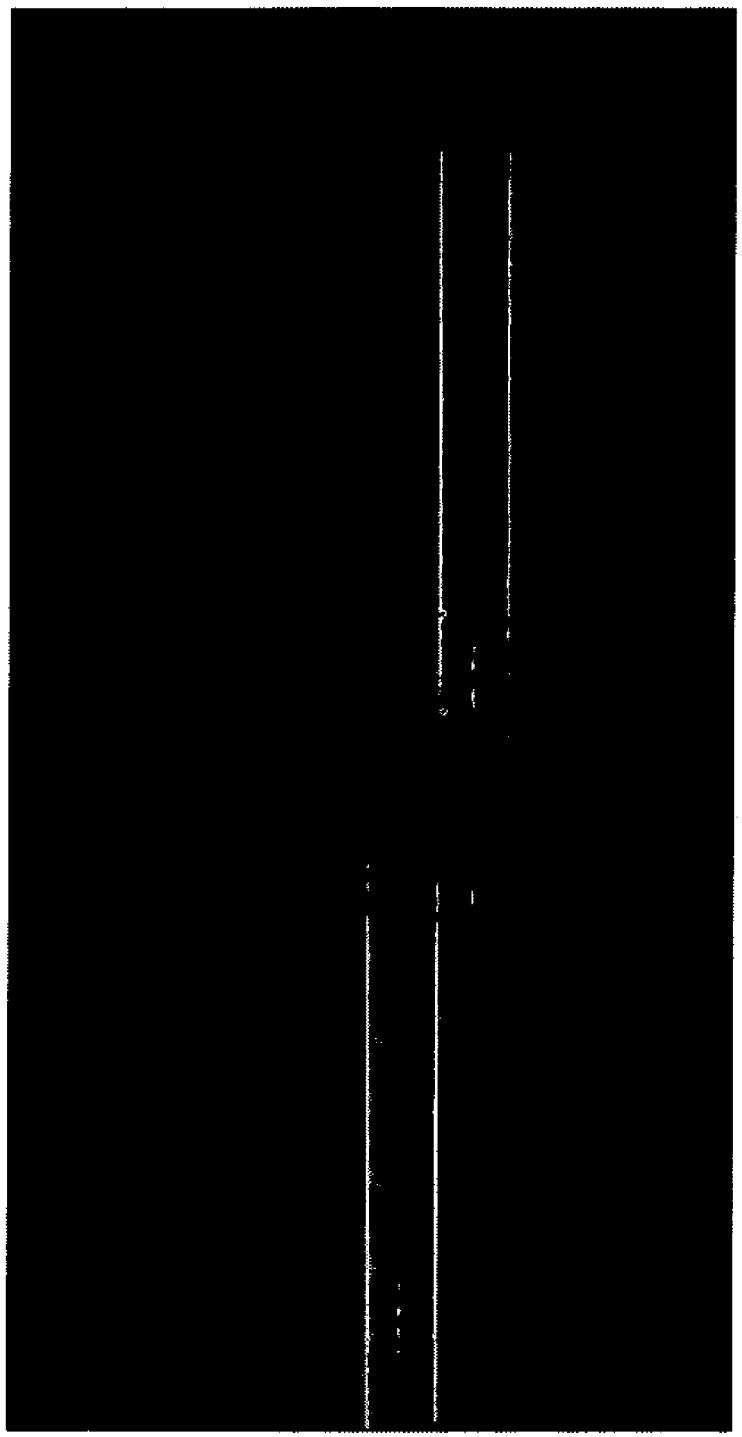
FIG. 37 is a diagram illustrating an image obtained by applying conventional class classification adaptation processing.

FIG. 37 is a diagram illustrating an image obtained by applying conventional class classification adaptation processing to the input image shown in FIG. 36. Now, class classification processing is made up of class classification processing and adaptation processing, wherein the data is classified based on the nature thereof by the class classification adaptation processing, and subjected to adaptation processing for each class. In the adaptation processing, a low-image quality or standard image quality image, for example, is converted into a high image quality image by being subjected to mapping (mapping) using a predetermined tap coefficient.

It can be understood in the image shown in FIG. 37 that the image of the fine line is different to that of the original image in FIG. 35.

Figure 38:
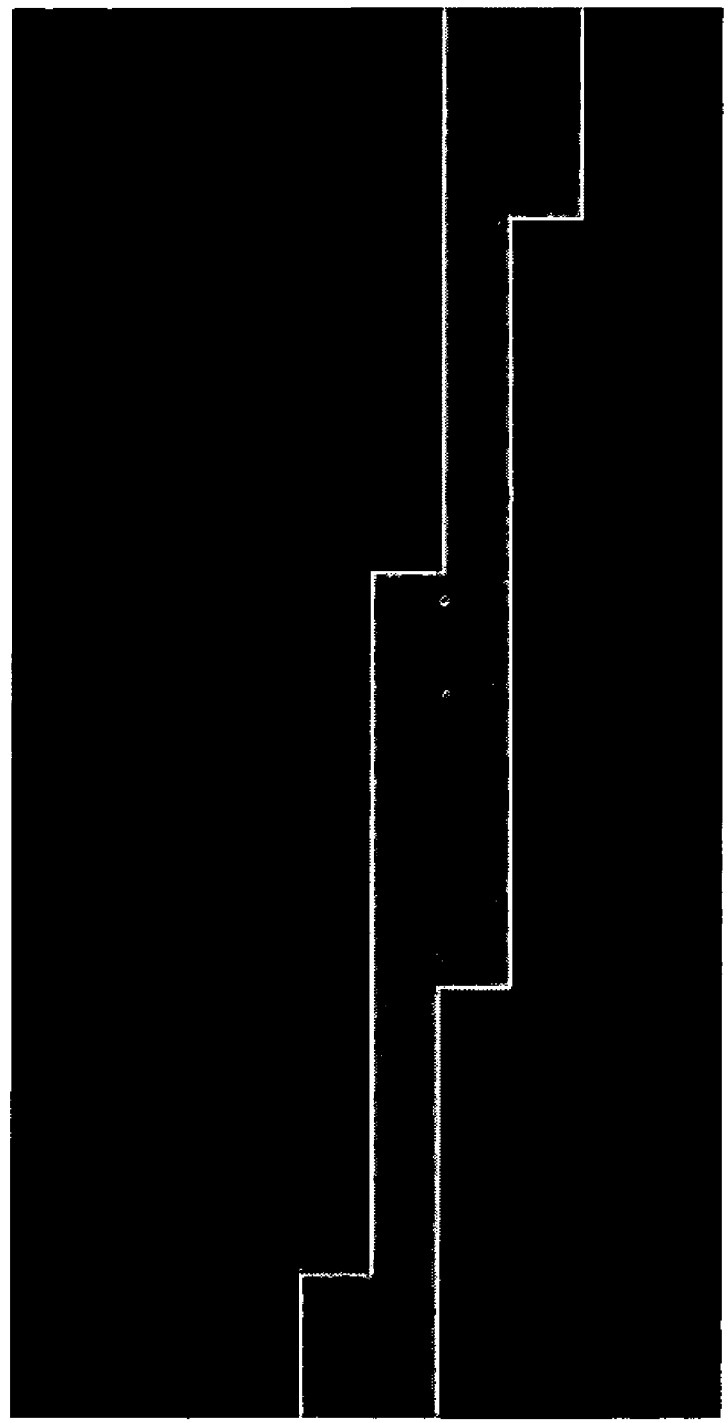
FIG. 38 is a diagram illustrating results of detecting a region with a fine line.

FIG. 38 is a diagram illustrating the results of detecting the fine line regions from the input image shown in the example in FIG. 36, by the data continuity detecting unit 101. In FIG. 38, the white region indicates the fine line region, i.e., the region wherein the arc shapes shown in FIG. 14 are arrayed.

Figure 39:
FIG. 39 is a diagram illustrating an example of an output image output from a signal processing device.

FIG. 39 is a diagram illustrating an example of the output image output from the signal processing device 4 according to the present invention, with the image shown in FIG. 36 as the input image. As shown in FIG. 39, the signals processing device 4 according to the present invention yields an image closer to the fine line image of the original image shown in FIG. 35.

Figure 40:
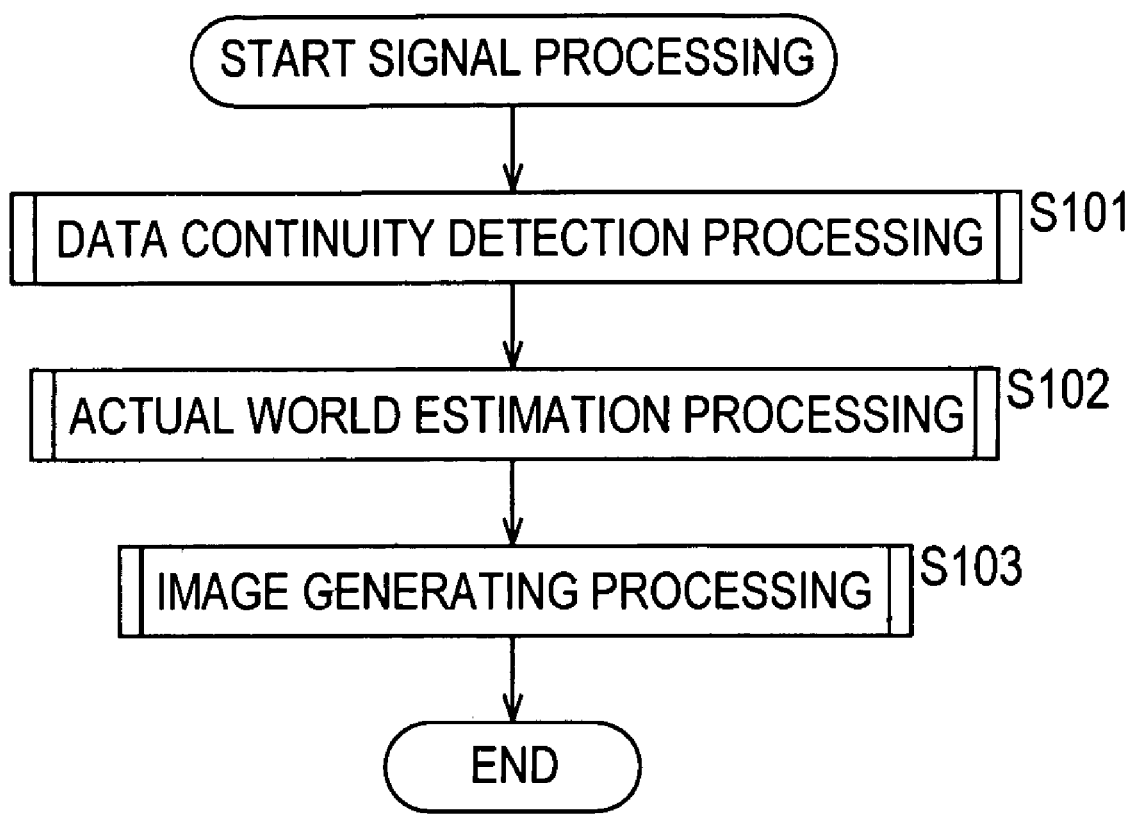
FIG. 40 is a flowchart for describing signal processing with the signal processing device.

FIG. 40 is a flowchart for describing the processing of signals with the signal processing device 4 according to the present invention.

In step S101, the data continuity detecting unit 101 executes the processing for detecting continuity. The data continuity detecting unit 101 detects data continuity contained in the input image which is the data 3, and supplies the data continuity information indicating the detected data continuity to the actual world estimating unit 102 and the image generating unit 103.

The data continuity detecting unit 101 detects the continuity of data corresponding to the continuity of the signals of the actual world. In the processing in step S101, the continuity of data detected by the data continuity detecting unit 101 is either part of the continuity of the image of the actual world 1 contained in the data 3, or continuity which has changed from the continuity of the signals of the actual world 1.

The data continuity detecting unit 101 detects the data continuity by detecting a region having a constant characteristic in a predetermined dimensional direction. Also, the data continuity detecting unit 101 detects data continuity by detecting angle (gradient) in the spatial direction indicating the an array of the same shape.

Details of the continuity detecting processing in step S101 will be described later.

Note that the data continuity information can be used as features, indicating the characteristics of the data 3.

In step S102, the actual world estimating unit 102 executes processing for estimating the actual world. That is to say, the actual world estimating unit 102 estimates the signals of the actual world based on the input image and the data continuity information supplied from the data continuity detecting unit 101. In the processing in step S102 for example, the actual world estimating unit 102 estimates the signals of the actual world 1 by predicting a model 161 approximating (describing) the actual world 1. The actual world estimating unit 102 supplies the actual world estimation information indicating the estimated signals of the actual world 1 to the image generating unit 103.

For example, the actual world estimating unit 102 estimates the actual world 1 signals by predicting the width of the linear object. Also, for example, the actual world estimating unit 102 estimates the actual world 1 signals by predicting a level indicating the color of the linear object.

Details of processing for estimating the actual world in step S102 will be described later.

Note that the actual world estimation information can be used as features, indicating the characteristics of the data 3.

In step S103, the image generating unit 103 performs image generating processing, and the processing ends. That is to say, the image generating unit 103 generates an image based on the actual world estimation information, and outputs the generated image. Or, the image generating unit 103 generates an image based on the data continuity information and actual world estimation information, and outputs the generated image.

For example, in the processing in step S103, the image generating unit 103 integrates a function approximating the generated real world light signals in the spatial direction, based on the actual world estimated information, hereby generating an image with higher resolution in the spatial direction in comparison with the input image, and outputs the generated image. For example, the image generating unit 103 integrates a function approximating the generated real world light signals in the time-space direction, based on the actual world estimated information, hereby generating an image with higher resolution in the time direction and the spatial direction in comparison with the input image, and outputs the generated image. The details of the image generating processing in step S103 will be described later.

Thus, the signal processing device 4 according to the present invention detects data continuity from the data 3, and estimates the actual world 1 from the detected data continuity. The signal processing device 4 then generates signals closer approximating the actual world 1 based on the estimated actual world 1.

As described above, in the event of performing the processing for estimating signals of the real world, accurate and highly-precise processing results can be obtained.

Also, in the event that first signals which are real world signals having first dimensions are projected, the continuity of data corresponding to the lost continuity of the real world signals is detected for second signals of second dimensions, having a number of dimensions fewer than the first dimensions, from which a part of the continuity of the signals of the real world has been lost, and the first signals are estimated by estimating the lost real world signals continuity based on the detected data continuity, accurate and highly-precise processing results can be obtained as to the events in the real world.

Next, the details of the configuration of the data continuity detecting unit 101 will be described.

Figure 41:
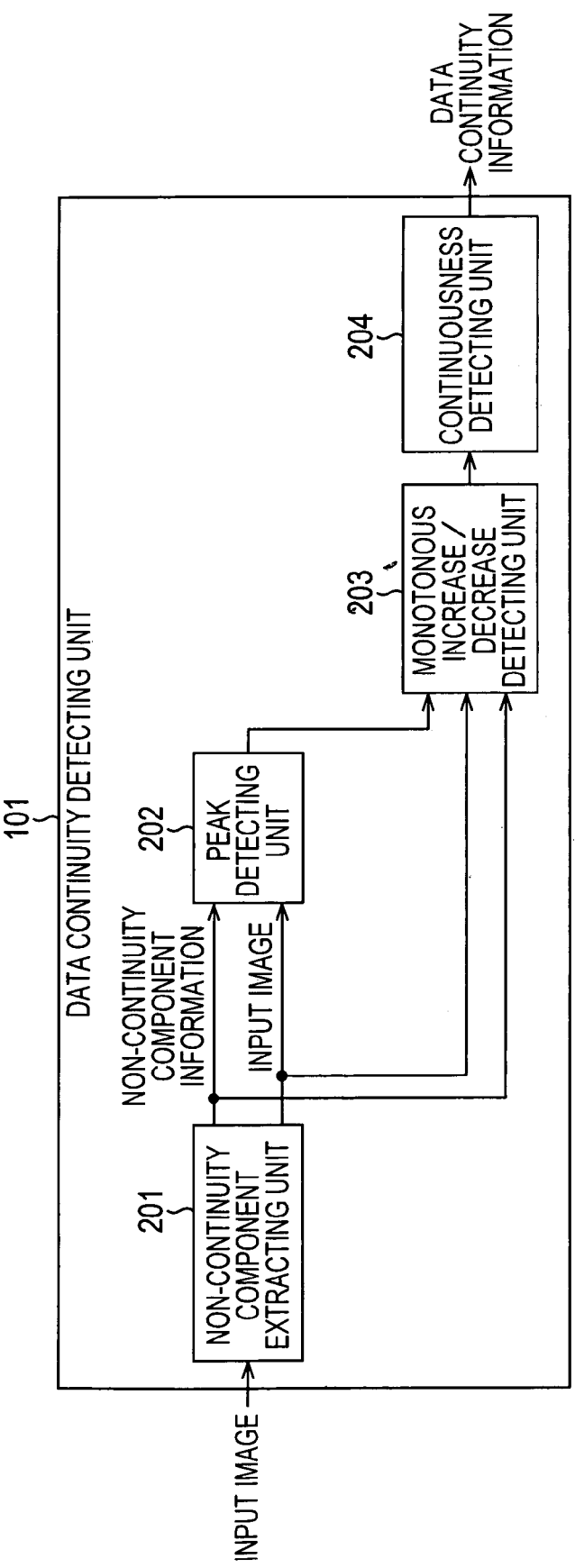
FIG. 41 is a block diagram illustrating the configuration of a data continuity detecting unit.

FIG. 41 is a block diagram illustrating the configuration of the data continuity detecting unit 101.

Upon taking an image of an object which is a fine line, the data continuity detecting unit 101, of which the configuration is shown in FIG. 41, detects the continuity of data contained in the data 3, which is generated from the continuity in that the cross-sectional shape which the object has is the same. That is to say, the data continuity detecting unit 101 of the configuration shown in FIG. 41 detects the continuity of data contained in the data 3, which is generated from the continuity in that the change in level of light as to the change in position in the direction orthogonal to the length-wise direction is the same at an arbitrary position in the length-wise direction, which the image of the actual world 1 which is a fine line, has.

More specifically, the data continuity detecting unit 101 of which configuration is shown in FIG. 41 detects the region where multiple arc shapes (half-disks) having a predetermined length are arrayed in a diagonally-offset adjacent manner, within the data 3 obtained by taking an image of a fine line with the sensor 2 having spatial integration effects.

The data continuity detecting unit 101 extracts the portions of the image data other than the portion of the image data where the image of the fine line having data continuity has been projected (hereafter, the portion of the image data where the image of the fine line having data continuity has been projected will also be called continuity component, and the other portions will be called non-continuity component), from an input image which is the data 3, detects the pixels where the image of the fine line of the actual world 1 has been projected, from the extracted non-continuity component and the input image, and detects the region of the input image made up of pixels where the image of the fine line of the actual world 1 has been projected.

A non-continuity component extracting unit 201 extracts the non-continuity component from the input image, and supplies the non-continuity component information indicating the extracted non-continuity component to a peak detecting unit 202 and a monotonous increase/decrease detecting unit 203 along with the input image.

Figure 42:
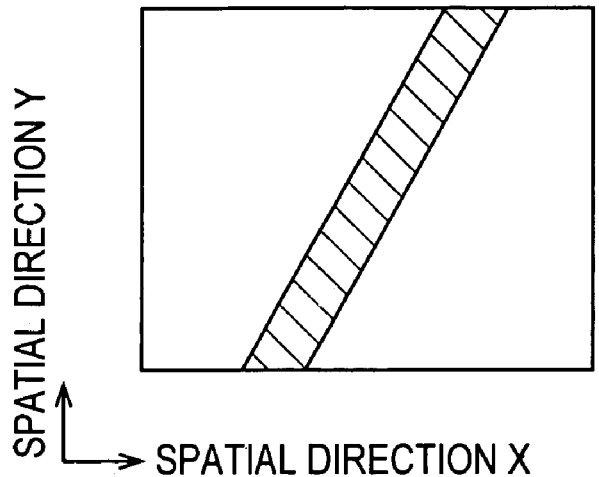
FIG. 42 is a diagram illustrating an image in the actual world with a fine line in front of the background.
Figure 43:
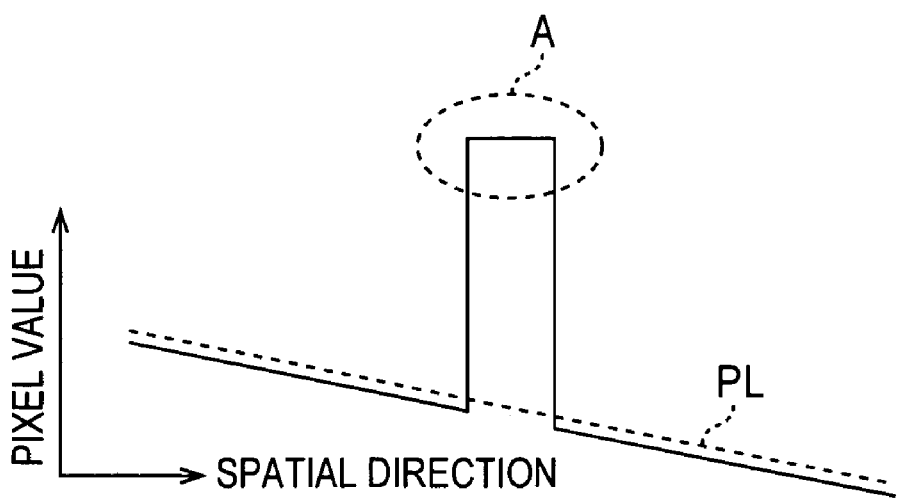
FIG. 43 is a diagram for describing approximation of a background with a plane.

For example, as shown in FIG. 42, in the event that an image of the actual world 1 wherein a fine line exists in front of a background with an approximately constant light level is projected on the data 3, the non-continuity component extracting unit 201 extracts the non-continuity component which is the background, by approximating the background in the input image which is the data 3, on a plane, as shown in FIG. 43. In FIG. 43, the solid line indicates the pixel values of the data 3, and the dotted line illustrates the approximation values indicated by the plane approximating the background. In FIG. 43, A denotes the pixel value of the pixel where the image of the fine line has been projected, and the PL denotes the plane approximating the background.

In this way, the pixel values of the multiple pixels at the portion of the image data having data continuity are discontinuous as to the non-continuity component.

The non-continuity component extracting unit 201 detects the discontinuous portion of the pixel values of the multiple pixels of the image data which is the data 3, where an image which is light signals of the actual world 1 has been projected and a part of the continuity of the image of the actual world 1 has been lost.

Details of the processing for extracting the non-continuity component with the non-continuity component extracting unit 201 will be described later.

The peak detecting unit 202 and the monotonous increase/decrease detecting unit 203 remove the non-continuity component from the input image, based on the non-continuity component information supplied from the non-continuity component extracting unit 201. For example, the peak detecting unit 202 and the monotonous increase/decrease detecting unit 203 remove the non-continuity component from the input image by setting the pixel values of the pixels of the input image where only the background image has been projected, to 0. Also, for example, the peak detecting unit 202 and the monotonous increase/decrease detecting unit 203 remove the non-continuity component from the input image by subtracting values approximated by the plane PL from the pixel values of each pixel of the input image.

Since the background can be removed from the input image, the peak detecting unit 202 through continuousness detecting unit 204 can process only the portion of the image data where the fine line has be projected, thereby further simplifying the processing by the peak detecting unit 202 through the continuousness detecting unit 204.

Note that the non-continuity component extracting unit 201 may supply image data wherein the non-continuity component has been removed form the input image, to the peak detecting unit 202 and the monotonous increase/decrease detecting unit 203.

In the example of processing described below, the image data wherein the non-continuity component has been removed from the input image, i.e., image data made up from only pixel containing the continuity component, is the object.

Now, description will be made regarding the image data upon which the fine line image has been projected, which the peak detecting unit 202 through continuousness detecting unit 204 are to detect.

Figure 44:
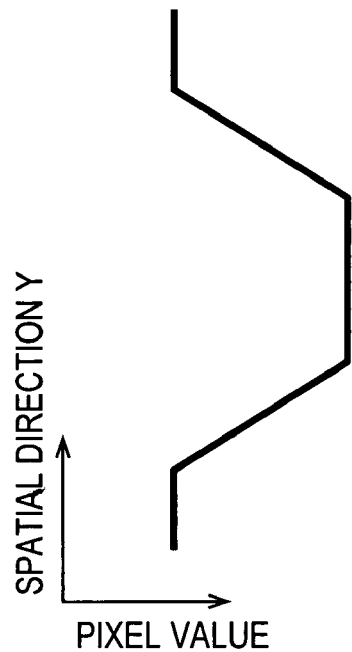
FIG. 44 is a diagram illustrating the cross-sectional shape of image data regarding which the image of a fine line has been projected.
Figure 45:
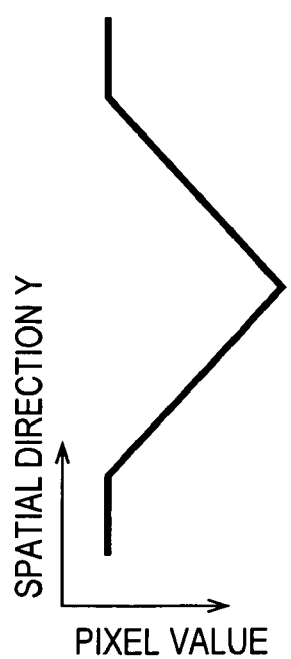
FIG. 45 is a diagram illustrating the cross-sectional shape of image data regarding which the image of a fine line has been projected.
Figure 46:
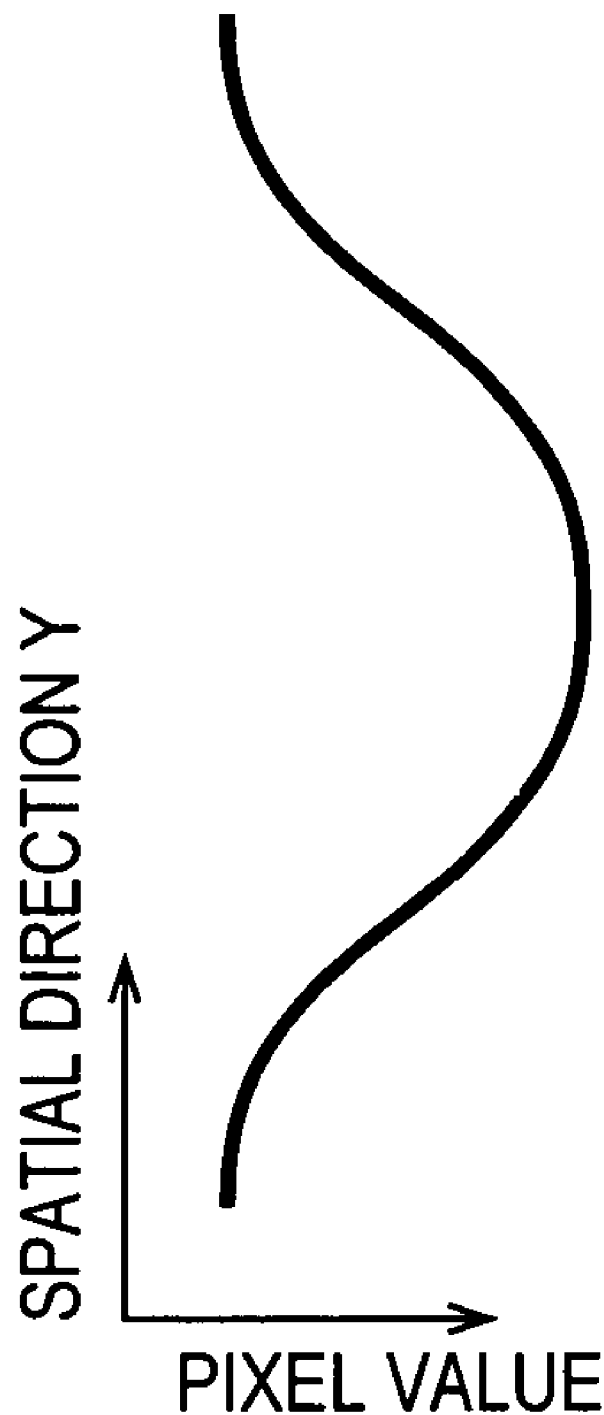
FIG. 46 is a diagram illustrating the cross-sectional shape of image data regarding which the image of a fine line has been projected.

In the event that there is no optical LPF, the cross-dimensional shape in the spatial direction Y (change in the pixel values as to change in the position in the spatial direction) of the image data upon which the fine line image has been projected as shown in FIG. 42 can be thought to be the trapezoid shown in FIG. 44, or the triangle shown in FIG. 45. However, ordinary image sensors have an optical LPF with the image sensor obtaining the image which has passed through the optical LPF and projects the obtained image on the data 3, so in reality, the cross-dimensional shape of the image data with fine lines in the spatial direction Y has a shape resembling Gaussian distribution, as shown in FIG. 46.

The peak detecting unit 202 through continuousness detecting unit 204 detect a region made up of pixels upon which the fine line image has been projected wherein the same cross-sectional shape (change in the pixel values as to change in the position in the spatial direction) is arrayed vertically in the screen at constant intervals, and further, detect a region made up of pixels upon which the fine line image has been projected which is a region having data continuity, by detecting regional connection corresponding to the length-wise direction of the fine line of the actual world 1. That is to say, the peak detecting unit 202 through continuousness detecting unit 204 detect regions wherein arc shapes (half-disc shapes) are formed on a single vertical row of pixels in the input image, and determine whether or not the detected regions are adjacent in the horizontal direction, thereby detecting connection of regions where arc shapes are formed, corresponding to the length-wise direction of the fine line image which is signals of the actual world 1.

Also, the peak detecting unit 202 through continuousness detecting unit 204 detect a region made up of pixels upon which the fine line image has been projected wherein the same cross-sectional shape is arrayed horizontally in the screen at constant intervals, and further, detect a region made up of pixels upon which the fine line image has been projected which is a region having data continuity, by detecting connection of detected regions corresponding to the length-wise direction of the fine line of the actual world 1. That is to say, the peak detecting unit 202 through continuousness detecting unit 204 detect regions wherein arc shapes are formed on a single horizontal row of pixels in the input image, and determine whether or not the detected regions are adjacent in the vertical direction, thereby detecting connection of regions where arc shapes are formed, corresponding to the length-wise direction of the fine line image, which is signals of the actual world 1.

First, description will be made regarding processing for detecting a region of pixels upon which the fine line image has been projected wherein the same arc shape is arrayed vertically in the screen at constant intervals.

The peak detecting unit 202 detects a pixel having a pixel value greater than the surrounding pixels, i.e., a peak, and supplies peak information indicating the position of the peak to the monotonous increase/decrease detecting unit 203. In the event that pixels arrayed in a single vertical row in the screen are the object, the peak detecting unit 202 compares the pixel value of the pixel position upwards in the screen and the pixel value of the pixel position downwards in the screen, and detects the pixel with the greater pixel value as the peak. The peak detecting unit 202 detects one or multiple peaks from a single image, e.g., from the image of a single frame.

A single screen contains frames or fields. This holds true in the following description as well.

For example, the peak detecting unit 202 selects a pixel of interest from pixels of an image of one frame which have not yet been taken as pixels of interest, compares the pixel value of the pixel of interest with the pixel value of the pixel above the pixel of interest, compares the pixel value of the pixel of interest with the pixel value of the pixel below the pixel of interest, detects a pixel of interest which has a greater pixel value than the pixel value of the pixel above and a greater pixel value than the pixel value of the pixel below, and takes the detected pixel of interest as a peak. The peak detecting unit 202 supplies peak information indicating the detected peak to the monotonous increase/decrease detecting unit 203.

There are cases wherein the peak detecting unit 202 does not detect a peak. For example, in the event that the pixel values of all of the pixels of an image are the same value, or in the event that the pixel values decrease in one or two directions, no peak is detected. In this case, no fine line image has been projected on the image data.

The monotonous increase/decrease detecting unit 203 detects a candidate for a region made up of pixels upon which the fine line image has been projected wherein the pixels are vertically arrayed in a single row as to the peak detected by the peak detecting unit 202, based upon the peak information indicating the position of the peak supplied from the peak detecting unit 202, and supplies the region information indicating the detected region to the continuousness detecting unit 204 along with the peak information.

More specifically, the monotonous increase/decrease detecting unit 203 detects a region made up of pixels having pixel values monotonously decreasing with reference to the peak pixel value, as a candidate of a region made up of pixels upon which the image of the fine line has been projected. Monotonous decrease means that the pixel values of pixels which are farther distance-wise from the peak are smaller than the pixel values of pixels which are closer to the peak.

Also, the monotonous increase/decrease detecting unit 203 detects a region made up of pixels having pixel values monotonously increasing with reference to the peak pixel value, as a candidate of a region made up of pixels upon which the image of the fine line has been projected. Monotonous increase means that the pixel values of pixels which are farther distance-wise from the peak are greater than the pixel values of pixels which are closer to the peak.

In the following, the processing regarding regions of pixels having pixel values monotonously increasing is the same as the processing regarding regions of pixels having pixel values monotonously decreasing, so description thereof will be omitted. Also, with the description regarding processing for detecting a region of pixels upon which the fine line image has been projected wherein the same arc shape is arrayed horizontally in the screen at constant intervals, the processing regarding regions of pixels having pixel values monotonously increasing is the same as the processing regarding regions of pixels having pixel values monotonously decreasing, so description thereof will be omitted.

For example, the monotonous increase/decrease detecting unit 203 detects pixel values of each of the pixels in a vertical row as to a peak, the difference as to the pixel value of the pixel above, and the difference as to the pixel value of the pixel below. The monotonous increase/decrease detecting unit 203 then detects a region wherein the pixel value monotonously decreases by detecting pixels wherein the sign of the difference changes.

Further, the monotonous increase/decrease detecting unit 203 detects, from the region wherein pixel values monotonously decrease, a region made up of pixels having pixel values with the same sign as that of the pixel value of the peak, with the sign of the pixel value of the peak as a reference, as a candidate of a region made up of pixels upon which the image of the fine line has been projected.

For example, the monotonous increase/decrease detecting unit 203 compares the sign of the pixel value of each pixel with the sign of the pixel value of the pixel above and sign of the pixel value of the pixel below, and detects the pixel where the sign of the pixel value changes, thereby detecting a region of pixels having pixel values of the same sign as the peak within the region where pixel values monotonously decrease.

Thus, the monotonous increase/decrease detecting unit 203 detects a region formed of pixels arrayed in a vertical direction wherein the pixel values monotonously decrease as to the peak and have pixels values of the same sign as the peak.

Figure 47:
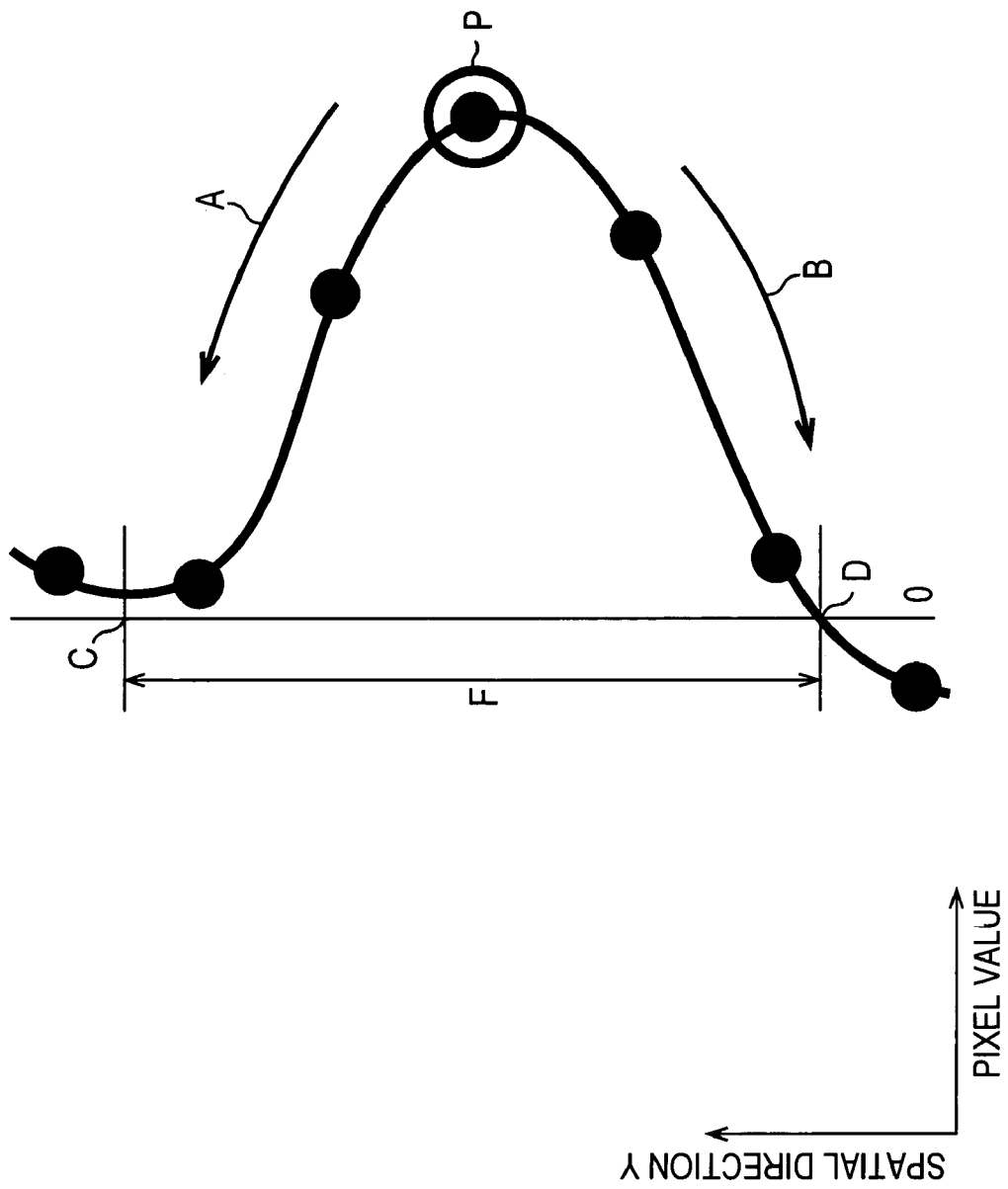
FIG. 47 is a diagram for describing the processing for detecting a peak and detecting of monotonous increase/decrease regions.

FIG. 47 is a diagram describing processing for peak detection and monotonous increase/decrease region detection, for detecting the region of pixels wherein the image of the fine line has been projected, from the pixel values as to a position in the spatial direction Y.

Figure 48:
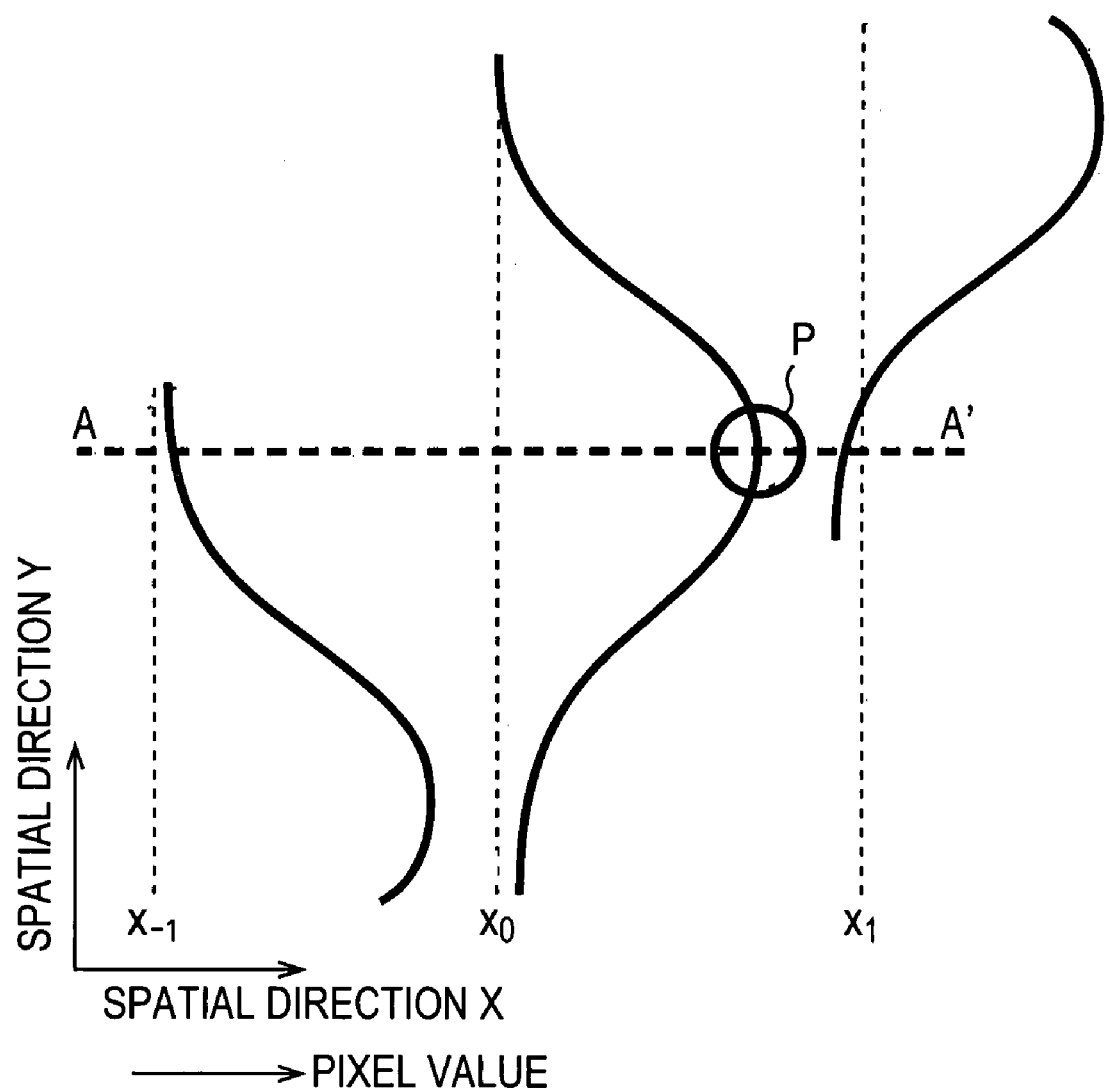
FIG. 48 is a diagram for describing the processing for detecting a fine line region wherein the pixel value of the peak exceeds a threshold, while the pixel value of the adjacent pixel is equal to or below the threshold value.
Figure 49:
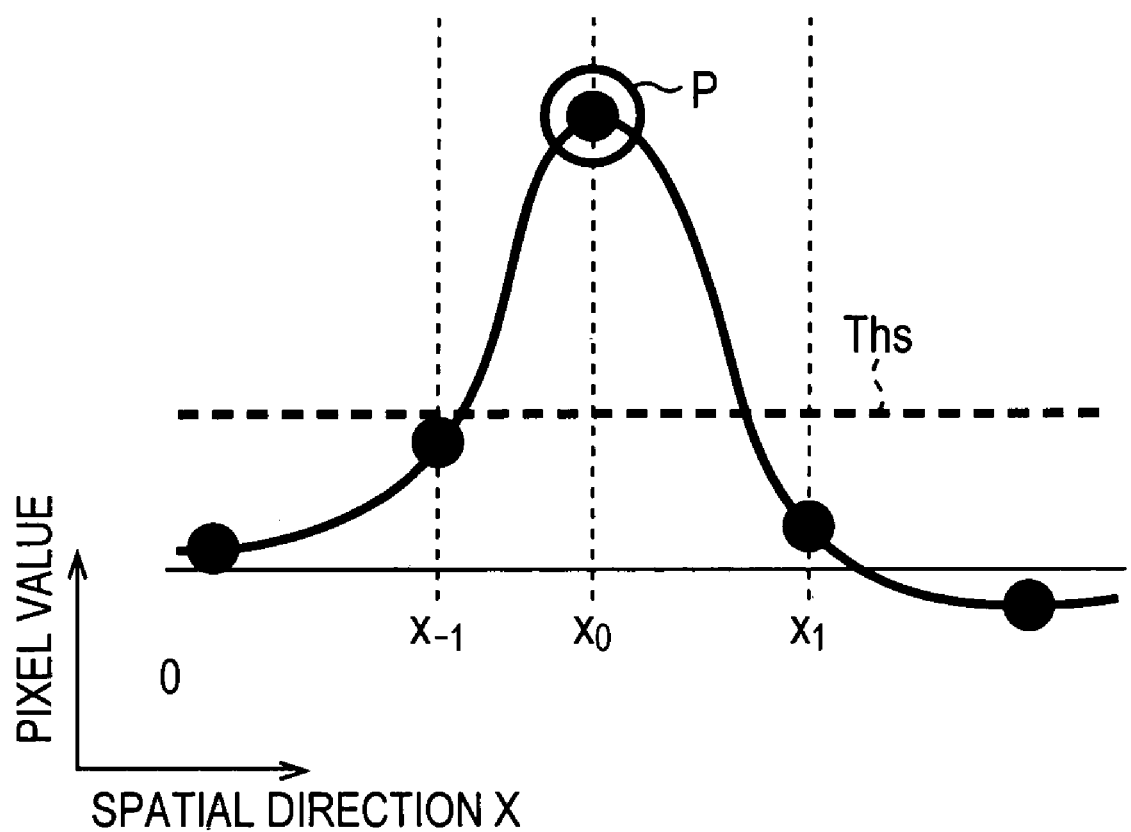
FIG. 49 is a diagram representing the pixel value of pixels arrayed in the direction indicated by dotted line AA' in FIG. 48.

In FIG. 47 through FIG. 49, P represents a peak. In the description of the data continuity detecting unit 101 of which the configuration is shown in FIG. 41, P represents a peak.

The peak detecting unit 202 compares the pixel values of the pixels with the pixel values of the pixels adjacent thereto in the spatial direction Y, and detects the peak P by detecting a pixel having a pixel value greater than the pixel values of the two pixels adjacent in the spatial direction Y.

The region made up of the peak P and the pixels on both sides of the peak P in the spatial direction Y is a monotonous decrease region wherein the pixel values of the pixels on both sides in the spatial direction Y monotonously decrease as to the pixel value of the peak P. In FIG. 47, the arrow denoted A and the arrow denoted by B represent the monotonous decrease regions existing on either side of the peak P.

The monotonous increase/decrease detecting unit 203 obtains the difference between the pixel values of each pixel and the pixel values of the pixels adjacent in the spatial direction Y, and detects pixels where the sign of the difference changes. The monotonous increase/decrease detecting unit 203 takes the boundary between the detected pixel where the sign of the difference changes and the pixel immediately prior thereto (on the peak P side) as the boundary of the fine line region made up of pixels where the image of the fine line has been projected.

In FIG. 47, the boundary of the fine line region which is the boundary between the pixel where the sign of the difference changes and the pixel immediately prior thereto (on the peak P side) is denoted by C.

Further, the monotonous increase/decrease detecting unit 203 compares the sign of the pixel values of each pixel with the pixel values of the pixels adjacent thereto in the spatial direction Y, and detects pixels where the sign of the pixel value changes in the monotonous decrease region. The monotonous increase/decrease detecting unit 203 takes the boundary between the detected pixel where the sign of the pixel value changes and the pixel immediately prior thereto (on the peak P side) as the boundary of the fine line region.

In FIG. 47, the boundary of the fine line region which is the boundary between the pixel where the sign of the pixel value changes and the pixel immediately prior thereto (on the peak P side) is denoted by P.

As shown in FIG. 47, the fine line region F made up of pixels where the image of the fine line has been projected is the region between the fine line region boundary C and the fine line region boundary D.

The monotonous increase/decrease detecting unit 203 obtains a fine line region F which is longer than a predetermined threshold, from fine line regions F made up of such monotonous increase/decrease regions, i.e., a fine line region F having a greater number of pixels than the threshold value. For example, in the event that the threshold value is 3, the monotonous increase/decrease detecting unit 203 detects a fine line region F including 4 or more pixels.

Further, the monotonous increase/decrease detecting unit 203 compares the pixel value of the peak P, the pixel value of the pixel to the right side of the peak P, and the pixel value of the pixel to the left side of the peak P, from the fine line region F thus detected, each with the threshold value, detects a fine pixel region F having the peak P wherein the pixel value of the peak P exceeds the threshold value, and wherein the pixel value of the pixel to the right side of the peak P is the threshold value or lower, and wherein the pixel value of the pixel to the left side of the peak P is the threshold value or lower, and takes the detected fine line region F as a candidate for the region made up of pixels containing the component of the fine line image.

In other words, determination is made that a fine line region F having the peak P, wherein the pixel value of the peak P is the threshold value or lower, or wherein the pixel value of the pixel to the right side of the peak P exceeds the threshold value, or wherein the pixel value of the pixel to the left side of the peak P exceeds the threshold value, does not contain the component of the fine line image, and is eliminated from candidates for the region made up of pixels including the component of the fine line image.

That is, as shown in FIG. 48, the monotonous increase/decrease detecting unit 203 compares the pixel value of the peak P with the threshold value, and also compares the pixel value of the pixel adjacent to the peak P in the spatial direction X (the direction indicated by the dotted line AA') with the threshold value, thereby detecting the fine line region F to which the peak P belongs, wherein the pixel value of the peak P exceeds the threshold value and wherein the pixel values of the pixel adjacent thereto in the spatial direction X are equal to or below the threshold value.

FIG. 49 is a diagram illustrating the pixel values of pixels arrayed in the spatial direction X indicated by the dotted line AA' in FIG. 48. The fine line region F to which the peak P belongs, wherein the pixel value of the peak P exceeds the threshold value $Th_s$ and wherein the pixel values of the pixel adjacent thereto in the spatial direction X are equal to or below the threshold value $Th_s$, contains the fine line component.

Note that an arrangement may be made wherein the monotonous increase/decrease detecting unit 203 compares the difference between the pixel value of the peak P and the pixel value of the background with the threshold value, taking the pixel value of the background as a reference, and also compares the difference between the pixel value of the pixels adjacent to the peak P in the spatial direction and the pixel value of the background with the threshold value, thereby detecting the fine line region F to which the peak P belongs, wherein the difference between the pixel value of the peak P and the pixel value of the background exceeds the threshold value, and wherein the difference between the pixel value of the pixel adjacent in the spatial direction X and the pixel value of the background is equal to or below the threshold value.

The monotonous increase/decrease detecting unit 203 outputs to the continuousness detecting unit 204 monotonous increase/decrease region information indicating a region made up of pixels of which the pixel value monotonously decrease with the peak P as a reference and the sign of the pixel value is the same as that of the peak P, wherein the peak P exceeds the threshold value and wherein the pixel value of the pixel to the right side of the peak P is equal to or below the threshold value and the pixel value of the pixel to the left side of the peak P is equal to or below the threshold value.

In the event of detecting a region of pixels arrayed in a single row in the vertical direction of the screen where the image of the fine line has been projected, pixels belonging to the region indicated by the monotonous increase/decrease region information are arrayed in the vertical direction and include pixels where the image of the fine line has been projected. That is to say, the region indicated by the monotonous increase/decrease region information includes a region formed of pixels arrayed in a single row in the vertical direction of the screen where the image of the fine line has been projected.

In this way, the apex detecting unit 202 and the monotonous increase/decrease detecting unit 203 detects a continuity region made up of pixels where the image of the fine line has been projected, employing the nature that, of the pixels where the image of the fine line has been projected, change in the pixel values in the spatial direction Y approximates Gaussian distribution.

Of the region made up of pixels arrayed in the vertical direction, indicated by the monotonous increase/decrease region information supplied from the monotonous increase/decrease detecting unit 203, the continuousness detecting unit 204 detects regions including pixels adjacent in the horizontal direction, i.e., regions having similar pixel value change and duplicated in the vertical direction, as continuous regions, and outputs the peak information and data continuity information indicating the detected continuous regions. The data continuity information includes monotonous increase/decrease region information, information indicating the connection of regions, and so forth.

Arc shapes are aligned at constant intervals in an adjacent manner with the pixels where the fine line has been projected, so the detected continuous regions include the pixels where the fine line has been projected.

The detected continuous regions include the pixels where arc shapes are aligned at constant intervals in an adjacent manner to which the fine line has been projected, so the detected continuous regions are taken as a continuity region, and the continuousness detecting unit 204 outputs data continuity information indicating the detected continuous regions.

That is to say, the continuousness detecting unit 204 uses the continuity wherein arc shapes are aligned at constant intervals in an adjacent manner in the data 3 obtained by imaging the fine line, which has been generated due to the continuity of the image of the fine line in the actual world 1, the nature of the continuity being continuing in the length direction, so as to further narrow down the candidates of regions detected with the peak detecting unit 202 and the monotonous increase/decrease detecting unit 203.

Figure 50:
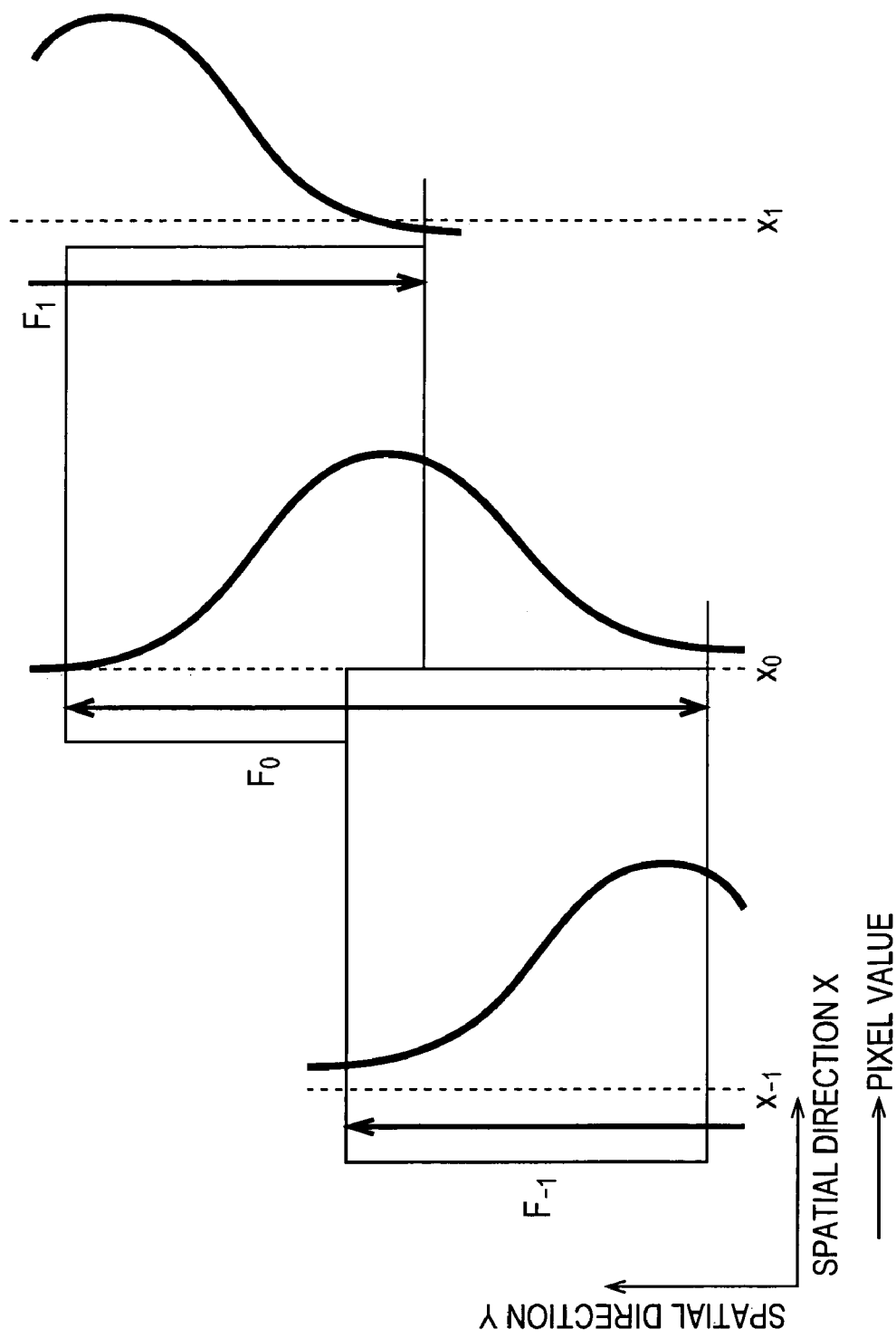
FIG. 50 is a diagram for describing processing for detecting continuity in a monotonous increase/decrease region.

FIG. 50 is a diagram describing the processing for detecting the continuousness of monotonous increase/decrease regions.

As shown in FIG. 50, in the event that a fine line region F formed of pixels aligned in a single row in the vertical direction of the screen includes pixels adjacent in the horizontal direction, the continuousness detecting unit 204 determines that there is continuousness between the two monotonous increase/decrease regions, and in the event that pixels adjacent in the horizontal direction are not included, determines that there is no continuousness between the two fine line regions F. For example, a fine line region $F_{-1}$ made up of pixels aligned in a single row in the vertical direction of the screen is determined to be continuous to a fine line region $F_0$ made up of pixels aligned in a single row in the vertical direction of the screen in the event of containing a pixel adjacent to a pixel of the fine line region $F_0$ in the horizontal direction. The fine line region $F_0$ made up of pixels aligned in a single row in the vertical direction of the screen is determined to be continuous to a fine line region $F_1$ made up of pixels aligned in a single row in the vertical direction of the screen in the event of containing a pixel adjacent to a pixel of the fine line region $F_1$ in the horizontal direction.

In this way, regions made up of pixels aligned in a single row in the vertical direction of the screen where the image of the fine line has been projected are detected by the peak detecting unit 202 through the continuousness detecting unit 204.

As described above, the peak detecting unit 202 through the continuousness detecting unit 204 detect regions made up of pixels aligned in a single row in the vertical direction of the screen where the image of the fine line has been projected, and further detect regions made up of pixels aligned in a single row in the horizontal direction of the screen where the image of the fine line has been projected.

Note that the order of processing does not restrict the present invention, and may be executed in parallel, as a matter of course.

That is to say, the peak detecting unit 202, with regard to of pixels aligned in a single row in the horizontal direction of the screen, detects as a peak a pixel which has a pixel value greater in comparison with the pixel value of the pixel situated to the left side on the screen and the pixel value of the pixel situated to the right side on the screen, and supplies peak information indicating the position of the detected peak to the monotonous increase/decrease detecting unit 203. The peak detecting unit 202 detects one or multiple peaks from one image, for example, one frame image.

For example, the peak detecting unit 202 selects a pixel of interest from pixels in the one frame image which has not yet been taken as a pixel of interest, compares the pixel value of the pixel of interest with the pixel value of the pixel to the left side of the pixel of interest, compares the pixel value of the pixel of interest with the pixel value of the pixel to the right side of the pixel of interest, detects a pixel of interest having a pixel value greater than the pixel value of the pixel to the left side of the pixel of interest and having a pixel value greater than the pixel value of the pixel to the right side of the pixel of interest, and takes the detected pixel of interest as a peak. The peak detecting unit 202 supplies peak information indicating the detected peak to the monotonous increase/decrease detecting unit 203.

There are cases wherein the peak detecting unit 202 does not detect a peak.

The monotonous increase/decrease detecting unit 203 detects candidates for a region made up of pixels aligned in a single row in the horizontal direction as to the peak detected by the peak detecting unit 202 wherein the fine line image has been projected, and supplies the monotonous increase/decrease region information indicating the detected region to the continuousness detecting unit 204 along with the peak information.

More specifically, the monotonous increase/decrease detecting unit 203 detects regions made up of pixels having pixel values monotonously decreasing with the pixel value of the peak as a reference, as candidates of regions made up of pixels where the fine line image has been projected.

For example, the monotonous increase/decrease detecting unit 203 obtains, with regard to each pixel in a single row in the horizontal direction as to the peak, the pixel value of each pixel, the difference as to the pixel value of the pixel to the left side, and the difference as to the pixel value of the pixel to the right side. The monotonous increase/decrease detecting unit 203 then detects the region where the pixel value monotonously decreases by detecting the pixel where the sign of the difference changes.

Further, the monotonous increase/decrease detecting unit 203 detects a region made up of pixels having pixel values with the same sign as the pixel value as the sign of the pixel value of the peak, with reference to the sign of the pixel value of the peak, as a candidate for a region made up of pixels where the fine line image has been projected.

For example, the monotonous increase/decrease detecting unit 203 compares the sign of the pixel value of each pixel with the sign of the pixel value of the pixel to the left side or with the sign of the pixel value of the pixel to the right side, and detects the pixel where the sign of the pixel value changes, thereby detecting a region made up of pixels having pixel values with the same sign as the peak, from the region where the pixel values monotonously decrease.

Thus, the monotonous increase/decrease detecting unit 203 detects a region made up of pixels aligned in the horizontal direction and having pixel values with the same sign as the peak wherein the pixel values monotonously decrease as to the peak.

From a fine line region made up of such a monotonous increase/decrease region, the monotonous increase/decrease detecting unit 203 obtains a fine line region longer than a threshold value set beforehand, i.e., a fine line region having a greater number of pixels than the threshold value.

Further, from the fine line region thus detected, the monotonous increase/decrease detecting unit 203 compares the pixel value of the peak, the pixel value of the pixel above the peak, and the pixel value of the pixel below the peak, each with the threshold value, detects a fine line region to which belongs a peak wherein the pixel value of the peak exceeds the threshold value, the pixel value of the pixel above the peak is within the threshold, and the pixel value of the pixel below the peak is within the threshold, and takes the detected fine line region as a candidate for a region made up of pixels containing the fine line image component.

Another way of saying this is that fine line regions to which belongs a peak wherein the pixel value of the peak is within the threshold value, or the pixel value of the pixel above the peak exceeds the threshold, or the pixel value of the pixel below the peak exceeds the threshold, are determined to not contain the fine line image component, and are eliminated from candidates of the region made up of pixels containing the fine line image component.

Note that the monotonous increase/decrease detecting unit 203 may be arranged to take the background pixel value as a reference, compare the difference between the pixel value of the pixel and the pixel value of the background with the threshold value, and also to compare the difference between the pixel value of the background and the pixel values adjacent to the peak in the vertical direction with the threshold value, and take a detected fine line region wherein the difference between the pixel value of the peak and the pixel value of the background exceeds the threshold value, and the difference between the pixel value of the background and the pixel value of the pixels adjacent in the vertical direction is within the threshold, as a candidate for a region made up of pixels containing the fine line image component.

The monotonous increase/decrease detecting unit 203 supplies to the continuousness detecting unit 204 monotonous increase/decrease region information indicating a region made up of pixels having a pixel value sign which is the same as the peak and monotonously decreasing pixel values as to the peak as a reference, wherein the peak exceeds the threshold value, and the pixel value of the pixel to the right side of the peak is within the threshold, and the pixel value of the pixel to the left side of the peak is within the threshold.

In the event of detecting a region made up of pixels aligned in a single row in the horizontal direction of the screen wherein the image of the fine line has been projected, pixels belonging to the region indicated by the monotonous increase/decrease region information include pixels aligned in the horizontal direction wherein the image of the fine line has been projected. That is to say, the region indicated by the monotonous increase/decrease region information includes a region made up of pixels aligned in a single row in the horizontal direction of the screen wherein the image of the fine line has been projected.

Of the regions made up of pixels aligned in the horizontal direction indicated in the monotonous increase/decrease region information supplied from the monotonous increase/decrease detecting unit 203, the continuousness detecting unit 204 detects regions including pixels adjacent in the vertical direction, i.e., regions having similar pixel value change and which are repeated in the horizontal direction, as continuous regions, and outputs data continuity information indicating the peak information and the detected continuous regions. The data continuity information includes information indicating the connection of the regions.

At the pixels where the fine line has been projected, arc shapes are arrayed at constant intervals in an adjacent manner, so the detected continuous regions include pixels where the fine line has been projected.

The detected continuous regions include pixels where arc shapes are arrayed at constant intervals wherein the fine line has been projected, so the detected continuous regions are taken as a continuity region, and the continuousness detecting unit 204 outputs data continuity information indicating the detected continuous regions.

That is to say, the continuousness detecting unit 204 uses the continuity which is that the arc shapes are arrayed at constant intervals in an adjacent manner in the data 3 obtained by imaging the fine line, generated from the continuity of the image of the fine line in the actual world 1 which is continuation in the length direction, so as to further narrow down the candidates of regions detected by the peak detecting unit 202 and the monotonous increase/decrease detecting unit 203.

Figure 51:
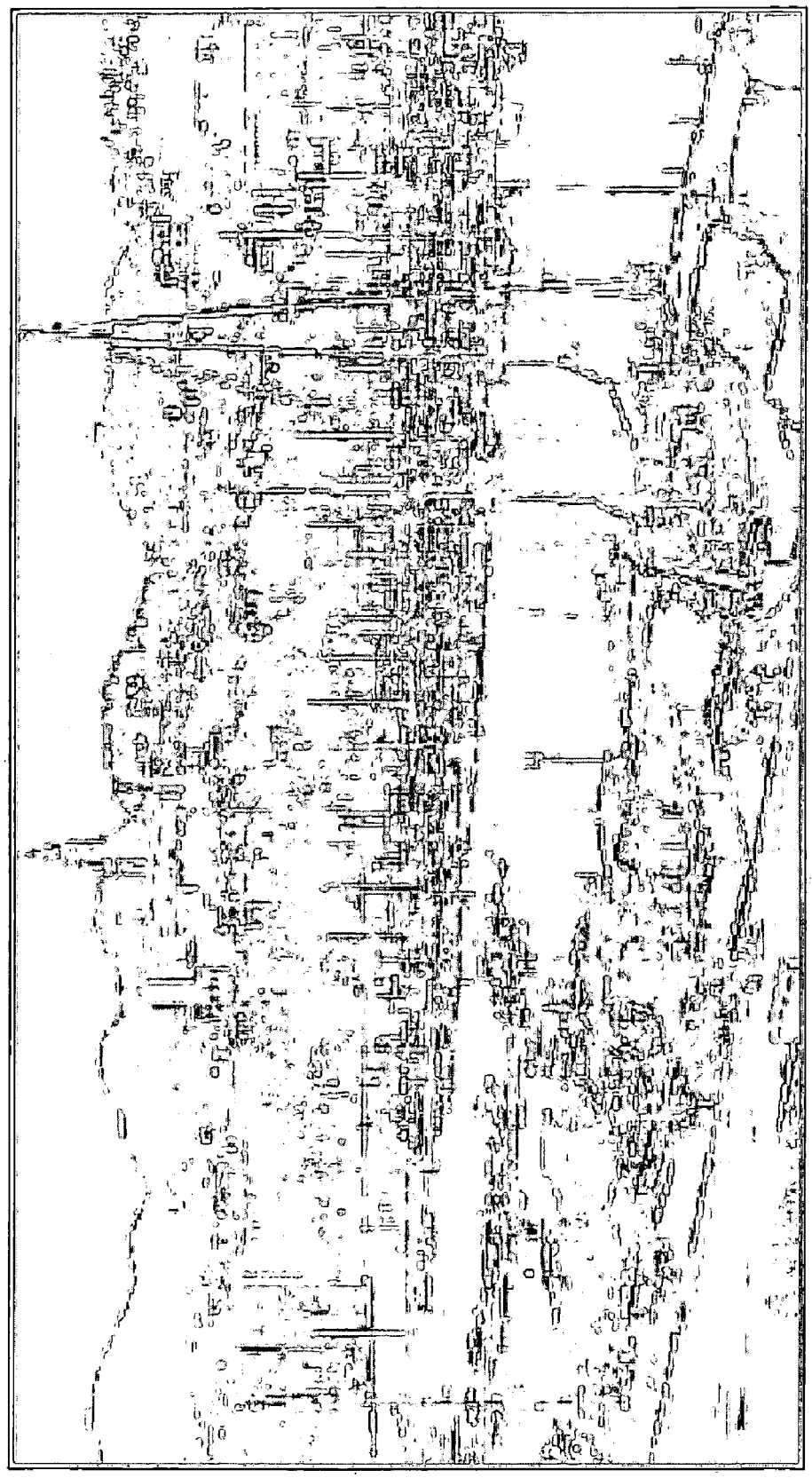
FIG. 51 is a diagram illustrating an example of a image regarding which a continuity component has been extracted by approximation on a plane.

FIG. 51 is a diagram illustrating an example of an image wherein the continuity component has been extracted by planar approximation.

Figure 52:
FIG. 52 is a diagram illustrating results of detecting regions with monotonous decrease.

FIG. 52 is a diagram illustrating the results of detecting peaks in the image shown in FIG. 51, and detecting monotonously decreasing regions. In FIG. 52, the portions indicated by white are the detected regions.

Figure 53:
FIG. 53 is a diagram illustrating regions where continuity has been detected.

FIG. 53 is a diagram illustrating regions wherein continuousness has been detected by detecting continuousness of adjacent regions in the image shown in FIG. 52. In FIG. 53, the portions shown in white are regions where continuity has been detected. It can be understood that detection of continuousness further identifies the regions.

Figure 54:
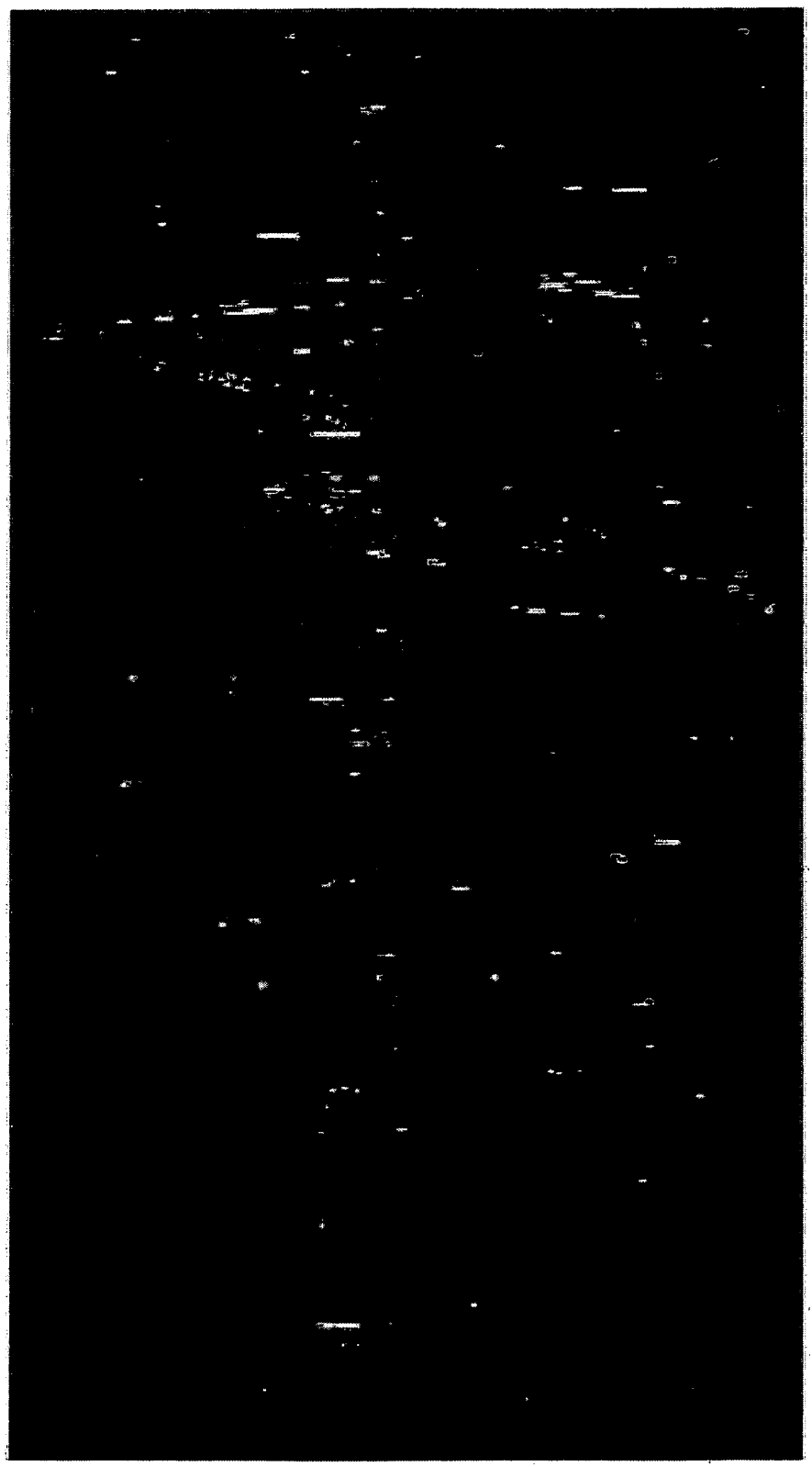
FIG. 54 is a diagram illustrating pixel values at regions where continuity has been detected.

FIG. 54 is a diagram illustrating the pixel values of the regions shown in FIG. 53, i.e., the pixel values of the regions where continuousness has been detected.

Thus, the data continuity detecting unit 101 is capable of detecting continuity contained in the data 3 which is the input image. That is to say, the data continuity detecting unit 101 can detect continuity of data included in the data 3 which has been generated by the actual world 1 image which is a fine line having been projected on the data 3. The data continuity detecting unit 101 detects, from the data 3, regions made up of pixels where the actual world 1 image which is a fine line has been projected.

Figure 55:
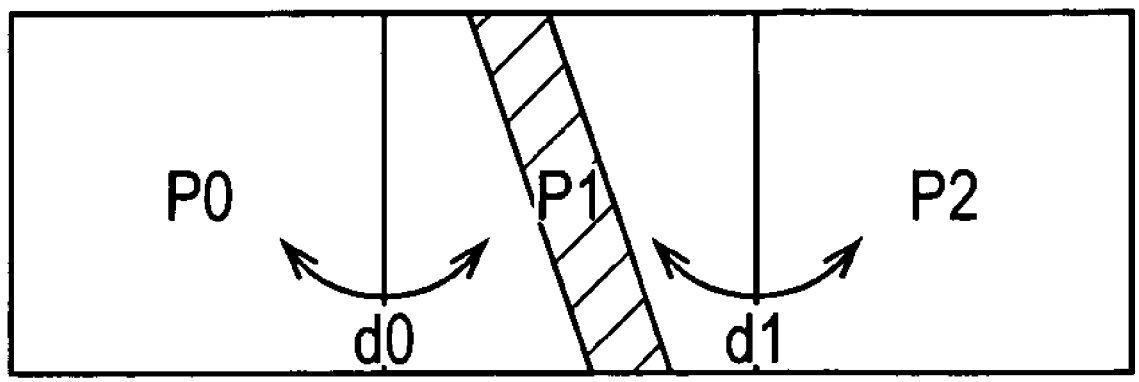
FIG. 55 is a diagram illustrating an example of other processing for detecting regions where an image of a fine line has been projected.

FIG. 55 is a diagram illustrating an example of other processing for detecting regions having continuity, where a fine line image has been projected, with the data continuity detecting unit 101. As shown in FIG. 55, the data continuity detecting unit 101 calculates the absolute value of difference of pixel values for each pixel and adjacent pixels. The calculated absolute values of difference are placed corresponding to the pixels. For example, in a situation such as shown in FIG. 55 wherein there are pixels aligned which have respective pixel values of P0, P1, and P2, the data continuity detecting unit 101 calculates the difference d0=P0−P1 and the difference d1=P1−P2. Further, the data continuity detecting unit 101 calculates the absolute values of the difference d0 and the difference d1.

In the event that the non-continuity component contained in the pixel values P0, P1, and P2 are identical, only values corresponding to the component of the fine line are set to the difference d0 and the difference d1.

Accordingly, of the absolute values of the differences placed corresponding to the pixels, in the event that adjacent difference values are identical, the data continuity detecting unit 101 determines that the pixel corresponding to the absolute values of the two differences (the pixel between the two absolute values of difference) contains the component of the fine line. Also, of the absolute values of the differences placed corresponding to pixels, in the event that adjacent difference values are identical but the absolute values of difference are smaller than a predetermined threshold value, the data continuity detecting unit 101 determines that the pixel corresponding to the absolute values of the two differences (the pixel between the two absolute values of difference) does not contain the component of the fine line.

The data continuity detecting unit 101 can also detect fine lines with a simple method such as this.

Figure 56:
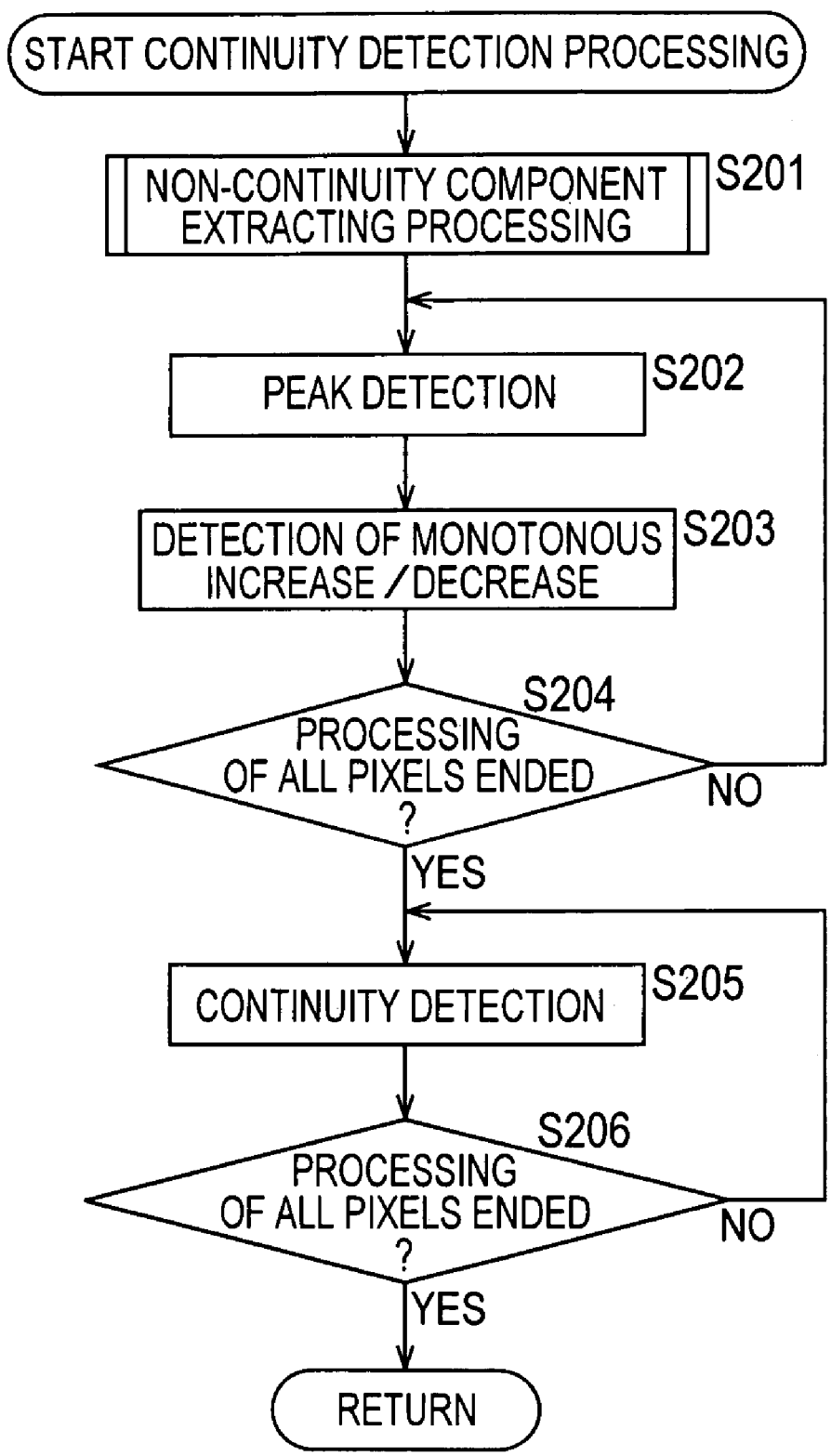
FIG. 56 is a flowchart for describing continuity detection processing.

FIG. 56 is a flowchart for describing continuity detection processing.

In step S201, the non-continuity component extracting unit 201 extracts non-continuity component, which is portions other than the portion where the fine line has been projected, from the input image. The non-continuity component extracting unit 201 supplies non-continuity component information indicating the extracted non-continuity component, along with the input image, to the peak detecting unit 202 and the monotonous increase/decrease detecting unit 203. Details of the processing for extracting the non-continuity component will be described later.

In step S202, the peak detecting unit 202 eliminates the non-continuity component from the input image, based on the non-continuity component information supplied from the non-continuity component extracting unit 201, so as to leave only pixels including the continuity component in the input image. Further, in step S202, the peak detecting unit 202 detects peaks.

That is to say, in the event of executing processing with the vertical direction of the screen as a reference, of the pixels containing the continuity component, the peak detecting unit 202 compares the pixel value of each pixel with the pixel values of the pixels above and below, and detects pixels having a greater pixel value than the pixel value of the pixel above and the pixel value of the pixel below, thereby detecting a peak. Also, in step S202, in the event of executing processing with the horizontal direction of the screen as a reference, of the pixels containing the continuity component, the peak detecting unit 202 compares the pixel value of each pixel with the pixel values of the pixels to the right side and left side, and detects pixels having a greater pixel value than the pixel value of the pixel to the right side and the pixel value of the pixel to the left side, thereby detecting a peak.

The peak detecting unit 202 supplies the peak information indicating the detected peaks to the monotonous increase/decrease detecting unit 203.

In step S203, the monotonous increase/decrease detecting unit 203 eliminates the non-continuity component from the input image, based on the non-continuity component information supplied from the non-continuity component extracting unit 201, so as to leave only pixels including the continuity component in the input image. Further, in step S203, the monotonous increase/decrease detecting unit 203 detects the region made up of pixels having data continuity, by detecting monotonous increase/decrease as to the peak, based on peak information indicating the position of the peak, supplied from the peak detecting unit 202.

In the event of executing processing with the vertical direction of the screen as a reference, the monotonous increase/decrease detecting unit 203 detects monotonous increase/decrease made up of one row of pixels aligned vertically where a single fine line image has been projected, based on the pixel value of the peak and the pixel values of the one row of pixels aligned vertically as to the peak, thereby detecting a region made up of pixels having data continuity. That is to say, in step S203, in the event of executing processing with the vertical direction of the screen as a reference, the monotonous increase/decrease detecting unit 203 obtains, with regard to a peak and a row of pixels aligned vertically as to the peak, the difference between the pixel value of each pixel and the pixel value of a pixel above or below, thereby detecting a pixel where the sign of the difference changes. Also, with regard to a peak and a row of pixels aligned vertically as to the peak, the monotonous increase/decrease detecting unit 203 compares the sign of the pixel value of each pixel with the sign of the pixel value of a pixel above or below, thereby detecting a pixel where the sign of the pixel value changes. Further, the monotonous increase/decrease detecting unit 203 compares pixel value of the peak and the pixel values of the pixels to the right side and to the left side of the peak with a threshold value, and detects a region made up of pixels wherein the pixel value of the peak exceeds the threshold value, and wherein the pixel values of the pixels to the right side and to the left side of the peak are within the threshold.

The monotonous increase/decrease detecting unit 203 takes a region detected in this way as a monotonous increase/decrease region, and supplies monotonous increase/decrease region information indicating the monotonous increase/decrease region to the continuousness detecting unit 204.

In the event of executing processing with the horizontal direction of the screen as a reference, the monotonous increase/decrease detecting unit 203 detects monotonous increase/decrease made up of one row of pixels aligned horizontally where a single fine line image has been projected, based on the pixel value of the peak and the pixel values of the one row of pixels aligned horizontally as to the peak, thereby detecting a region made up of pixels having data continuity. That is to say, in step S203, in the event of executing processing with the horizontal direction of the screen as a reference, the monotonous increase/decrease detecting unit 203 obtains, with regard to a peak and a row of pixels aligned horizontally as to the peak, the difference between the pixel value of each pixel and the pixel value of a pixel to the right side or to the left side, thereby detecting a pixel where the sign of the difference changes. Also, with regard to a peak and a row of pixels aligned horizontally as to the peak, the monotonous increase/decrease detecting unit 203 compares the sign of the pixel value of each pixel with the sign of the pixel value of a pixel to the right side or to the left side, thereby detecting a pixel where the sign of the pixel value changes. Further, the monotonous increase/decrease detecting unit 203 compares pixel value of the peak and the pixel values of the pixels to the upper side and to the lower side of the peak with a threshold value, and detects a region made up of pixels wherein the pixel value of the peak exceeds the threshold value, and wherein the pixel values of the pixels to the upper side and to the lower side of the peak are within the threshold.

The monotonous increase/decrease detecting unit 203 takes a region detected in this way as a monotonous increase/decrease region, and supplies monotonous increase/decrease region information indicating the monotonous increase/decrease region to the continuousness detecting unit 204.

In step S204, the monotonous increase/decrease detecting unit 203 determines whether or not processing of all pixels has ended. For example, the non-continuity component extracting unit 201 detects peaks for all pixels of a single screen (for example, frame, field, or the like) of the input image, and whether or not a monotonous increase/decrease region has been detected is determined.

In the event that determination is made in step S204 that processing of all pixels has not ended, i.e., that there are still pixels which have not been subjected to the processing of peak detection and detection of monotonous increase/decrease region, the flow returns to step S202, a pixel which has not yet been subjected to the processing of peak detection and detection of monotonous increase/decrease region is selected as an object of the processing, and the processing of peak detection and detection of monotonous increase/decrease region are repeated.

In the event that determination is made in step S204 that processing of all pixels has ended, in the event that peaks and monotonous increase/decrease regions have been detected with regard to all pixels, the flow proceeds to step S205, where the continuousness detecting unit 204 detects the continuousness of detected regions, based on the monotonous increase/decrease region information. For example, in the event that monotonous increase/decrease regions made up of one row of pixels aligned in the vertical direction of the screen, indicated by monotonous increase/decrease region information, include pixels adjacent in the horizontal direction, the continuousness detecting unit 204 determines that there is continuousness between the two monotonous increase/decrease regions, and in the event of not including pixels adjacent in the horizontal direction, determines that there is no continuousness between the two monotonous increase/decrease regions. For example, in the event that monotonous increase/decrease regions made up of one row of pixels aligned in the horizontal direction of the screen, indicated by monotonous increase/decrease region information, include pixels adjacent in the vertical direction, the continuousness detecting unit 204 determines that there is continuousness between the two monotonous increase/decrease regions, and in the event of not including pixels adjacent in the vertical direction, determines that there is no continuousness between the two monotonous increase/decrease regions.

The continuousness detecting unit 204 takes the detected continuous regions as continuity regions having data continuity, and outputs data continuity information indicating the peak position and continuity region. The data continuity information contains information indicating the connection of regions. The data continuity information output from the continuousness detecting unit 204 indicates the fine line region, which is the continuity region, made up of pixels where the actual world 1 fine line image has been projected.

In step S206, a continuity direction detecting unit 205 determines whether or not processing of all pixels has ended. That is to say, the continuity direction detecting unit 205 determines whether or not region continuation has been detected with regard to all pixels of a certain frame of the input image.

In the event that determination is made in step S206 that processing of all pixels has not yet ended, i.e., that there are still pixels which have not yet been taken as the object of detection of region continuation, the flow returns to step S205, a pixel which has not yet been subjected to the processing of detection of region continuity is selected, and the processing for detection of region continuity is repeated.

In the event that determination is made in step S206 that processing of all pixels has ended, i.e., that all pixels have been taken as the object of detection of region continuity, the processing ends.

Thus, the continuity contained in the data 3 which is the input image is detected. That is to say, continuity of data included in the data 3 which has been generated by the actual world 1 image which is a fine line having been projected on the data 3 is detected, and a region having data continuity, which is made up of pixels on which the actual world 1 image which is a fine line has been projected, is detected from the data 3.

Now, the data continuity detecting unit 101 shown in FIG. 41 can detect time-directional data continuity, based on the region having data continuity detected form the frame of the data 3.

Figure 57:
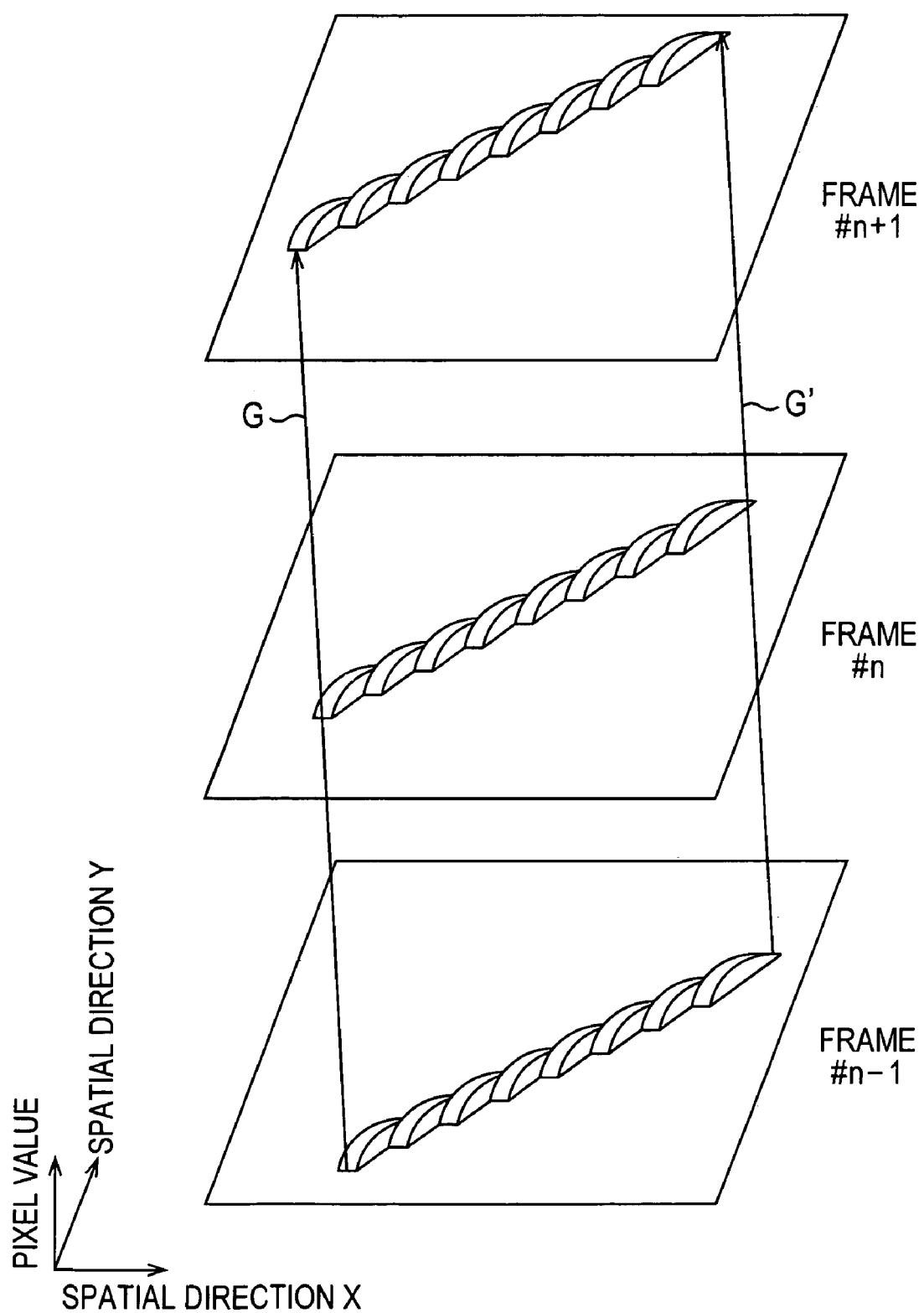
FIG. 57 is a diagram for describing processing for detecting continuity of data in the time direction.

For example, as shown in FIG. 57, the continuousness detecting unit 204 detects time-directional data continuity by connecting the edges of the region having detected data continuity in frame #n, the region having detected data continuity in frame #n−1, and the region having detected data continuity in frame #n+1.

The frame #n−1 is a frame preceding the frame #n time-wise, and the frame #n+1 is a frame following the frame #n time-wise. That is to say, the frame #n−1, the frame #n, and the frame #n+1, are displayed on the order of the frame #n−1, the frame #n, and the frame #n+1.

More specifically, in FIG. 57, G denotes a movement vector obtained by connecting the one edge of the region having detected data continuity in frame #n, the region having detected data continuity in frame #n−1, and the region having detected data continuity in frame #n+1, and G' denotes a movement vector obtained by connecting the other edges of the regions having detected data continuity. The movement vector G and the movement vector G' are an example of data continuity in the time direction.

Further, the data continuity detecting unit 101 of which the configuration is shown in FIG. 41 can output information indicating the length of the region having data continuity as data continuity information.

Figure 58:
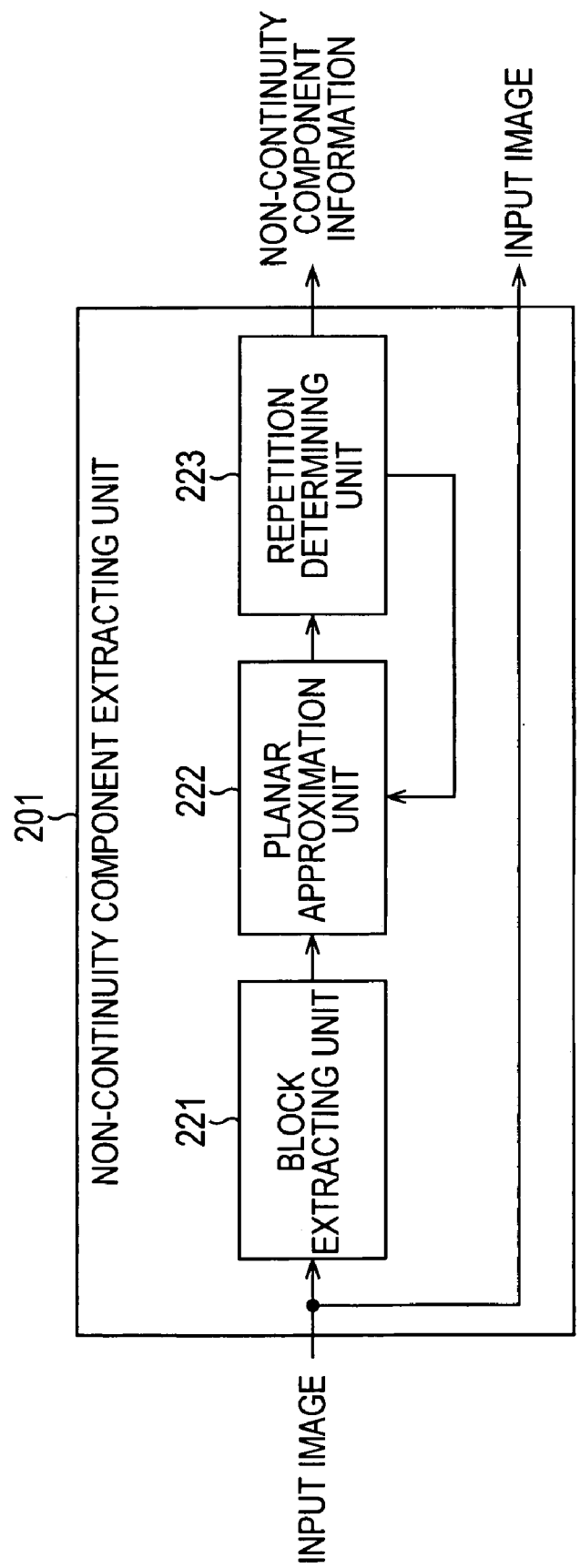
FIG. 58 is a block diagram illustrating the configuration of a non-continuity component extracting unit.

FIG. 58 is a block diagram illustrating the configuration of the non-continuity component extracting unit 201 which performs planar approximation of the non-continuity component which is the portion of the image data which does not have data continuity, and extracts the non-continuity component.

The non-continuity component extracting unit 201 of which the configuration is shown in FIG. 58 extracts blocks, which are made up of a predetermined number of pixels, from the input image, performs planar approximation of the blocks, so that the error between the block and a planar value is below a predetermined threshold value, thereby extracting the non-continuity component.

The input image is supplied to a block extracting unit 221, and is also output without change.

The block extracting unit 221 extracts blocks, which are made up of a predetermined number of pixels, from the input image. For example, the block extracting unit 221 extracts a block made up of 7×7 pixels, and supplies this to a planar approximation unit 222. For example, the block extracting unit 221 moves the pixel serving as the center of the block to be extracted in raster scan order, thereby sequentially extracting blocks from the input image.

The planar approximation unit 222 approximates the pixel values of a pixel contained in the block on a predetermined plane. For example, the planar approximation unit 222 approximates the pixel value of a pixel contained in the block on a plane expressed by Expression (24).

$$Z=ax+by+c \quad (24)$$

In Expression (24), x represents the position of the pixel in one direction on the screen (the spatial direction X), and y represents the position of the pixel in the other direction on the screen (the spatial direction Y). z represents the application value represented by the plane. a represents the gradient of the spatial direction X of the plane, and b represents the gradient of the spatial direction Y of the plane. In Expression (24), c represents the offset of the plane (intercept).

For example, the planar approximation unit 222 obtains the gradient a, gradient b, and offset c, by regression processing, thereby approximating the pixel values of the pixels contained in the block on a plane expressed by Expression (24). The planar approximation unit 222 obtains the gradient a, gradient b, and offset c, by regression processing including rejection, thereby approximating the pixel values of the pixels contained in the block on a plane expressed by Expression (24).

For example, the planar approximation unit 222 obtains the plane expressed by Expression (24) wherein the error is least as to the pixel values of the pixels of the block using the least-square method, thereby approximating the pixel values of the pixels contained in the block on the plane.

Note that while the planar approximation unit 222 has been described approximating the block on the plane expressed by Expression (24), this is not restricted to the plane expressed by Expression (24), rather, the block may be approximated on a plane represented with a function with a higher degree of freedom, for example, an n-order (wherein n is an arbitrary integer) polynomial.

A repetition determining unit 223 calculates the error between the approximation value represented by the plane upon which the pixel values of the block have been approximated, and the corresponding pixel values of the pixels of the block. Expression (25) is an expression which shows the error ei which is the difference between the approximation value represented by the plane upon which the pixel values of the block have been approximated, and the corresponding pixel values zi of the pixels of the block.

$$e_i = z_i - \hat{z} = z_i - (\hat{a}x_i + \hat{b}y_i + \hat{c}) \quad (25)$$

In Expression (25), z-hat (A symbol with ^ over z will be described as z-hat. The same description will be used in the present specification hereafter) represents an approximation value expressed by the plane on which the pixel values of the block are approximated, a-hat represents the gradient of the spatial direction X of the plane on which the pixel values of the block are approximated, b-hat represents the gradient of the spatial direction Y of the plane on which the pixel values of the block are approximated, and c-hat represents the offset (intercept) of the plane on which the pixel values of the block are approximated.

The repetition determining unit 223 rejects the pixel regarding which the error ei between the approximation value and the corresponding pixel values of pixels of the block, shown in Expression (25). Thus, pixels where the fine line has been projected, i.e., pixels having continuity, are rejected. The repetition determining unit 223 supplies rejection information indicating the rejected pixels to the planar approximation unit 222.

Further, the repetition determining unit 223 calculates a standard error, and in the event that the standard error is equal to or greater than threshold value which has been set beforehand for determining ending of approximation, and half or more of the pixels of the pixels of a block have not been rejected, the repetition determining unit 223 causes the planar approximation unit 222 to repeat the processing of planar approximation on the pixels contained in the block, from which the rejected pixels have been eliminated.

Pixels having continuity are rejected, so approximating the pixels from which the rejected pixels have been eliminated on a plane means that the plane approximates the non-continuity component.

At the point that the standard error below the threshold value for determining ending of approximation, or half or more of the pixels of the pixels of a block have been rejected, the repetition determining unit 223 ends planar approximation.

With a block made up of 5×5 pixels, the standard error $e_s$ can be calculated with, for example, Expression (26).

$$e_s = \Sigma(z_i - \hat{z})/(n-3) \quad (26)$$
$$= \Sigma\{(z_i - \hat{a}x_i + \hat{b}y_i + \hat{c})\}/(n-3)$$

Here, n is the number of pixels.

Note that the repetition determining unit 223 is not restricted to standard error, and may be arranged to calculate the sum of the square of errors for all of the pixels contained in the block, and perform the following processing.

Figure 59:
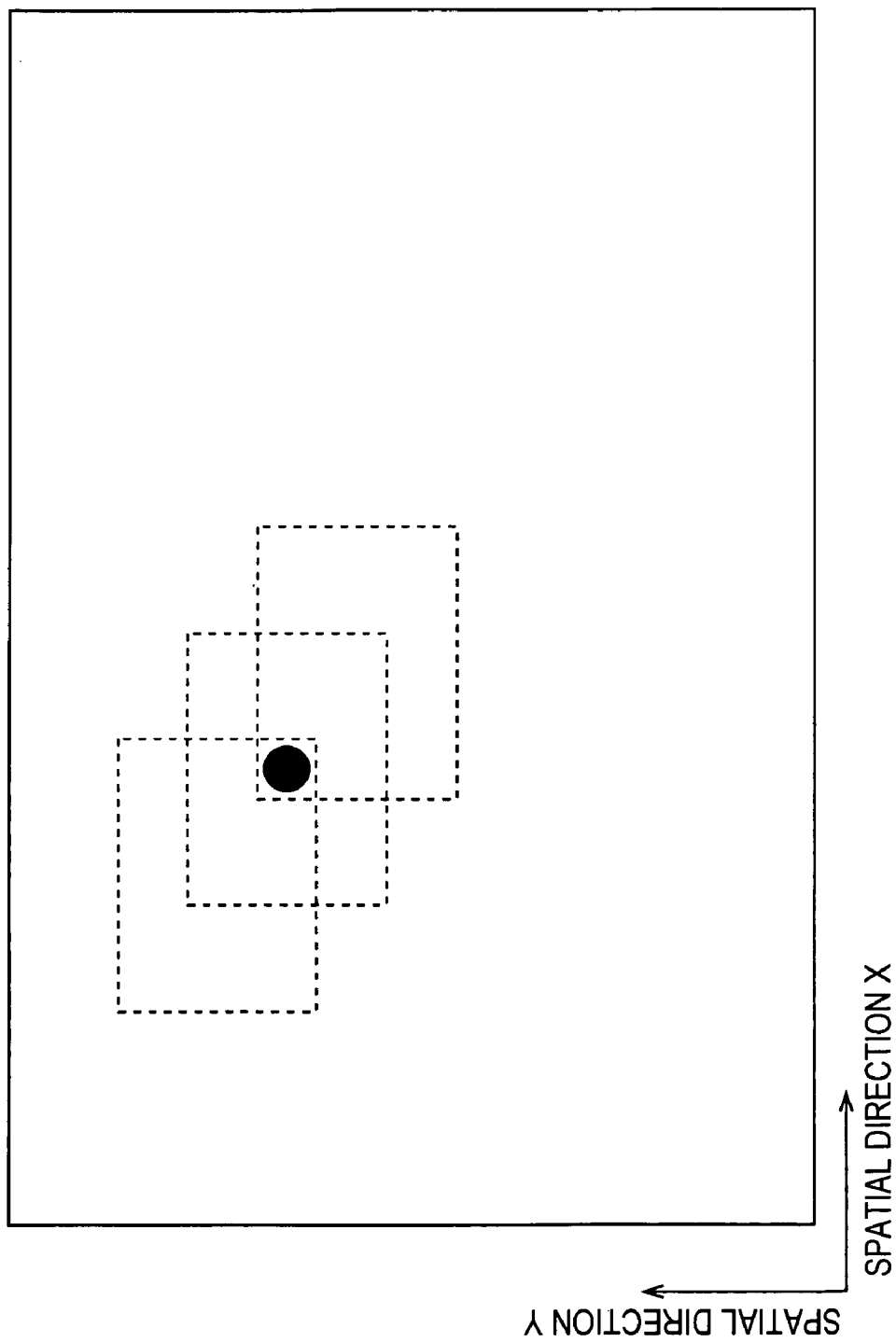
FIG. 59 is a diagram for describing the number of time of rejections.

Now, at the time of planar approximation of blocks shifted one pixel in the raster scan direction, a pixel having continuity, indicated by the black circle in the diagram, i.e., a pixel containing the fine line component, will be rejected multiple times, as shown in FIG. 59.

Upon completing planar approximation, the repetition determining unit 223 outputs information expressing the plane for approximating the pixel values of the block (the gradient and intercept of the plane of Expression 24)) as non-continuity information.

Note that an arrangement may be made wherein the repetition determining unit 223 compares the number of times of rejection per pixel with a preset threshold value, and takes a pixel which has been rejected a number of times equal to or greater than the threshold value as a pixel containing the continuity component, and output the information indicating the pixel including the continuity component as continuity component information. In this case, the peak detecting unit 202 through the continuity direction detecting unit 205 execute their respective processing on pixels containing continuity component, indicated by the continuity component information.

Examples of results of non-continuity component extracting processing will be described with reference to FIG. 60 through FIG. 67.

Figure 60:
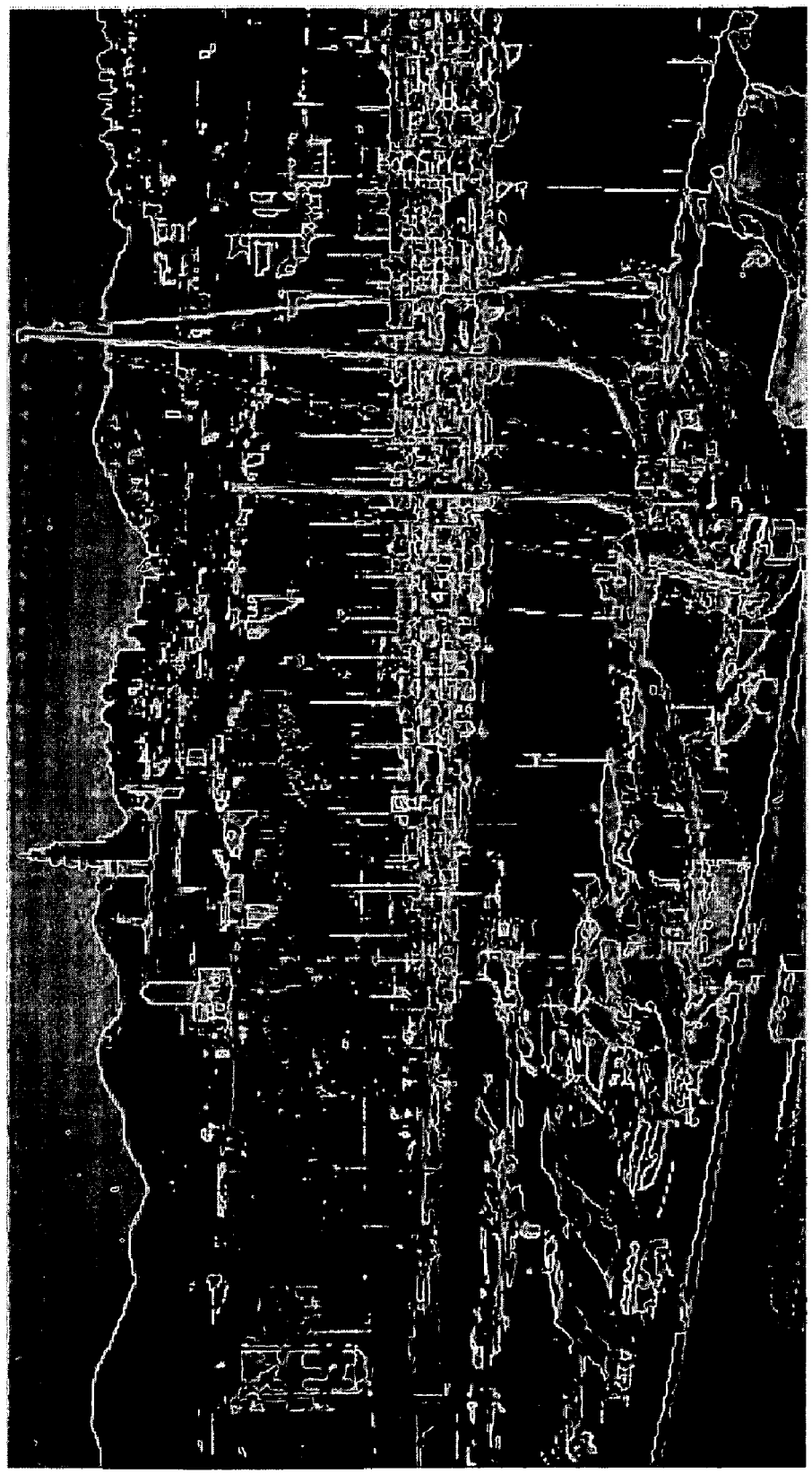
FIG. 60 is a diagram illustrating an example of an input image.

FIG. 60 is a diagram illustrating an example of an input image generated by the average value of the pixel values of 2×2 pixels in an original image containing fine lines having been generated as a pixel value.

Figure 61:
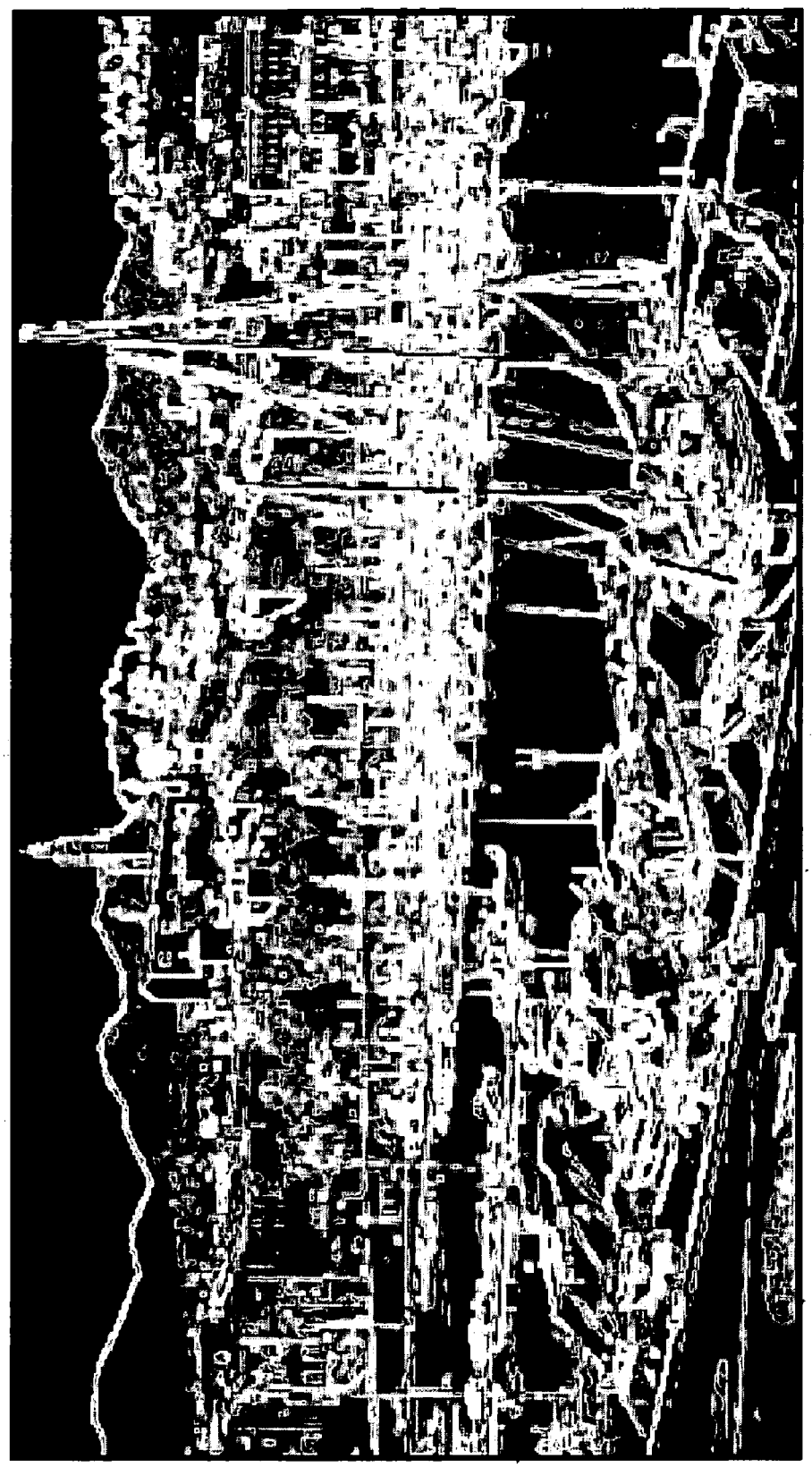
FIG. 61 is a diagram illustrating an image wherein standard error obtained as the result of planar approximation without rejection is taken as pixel values.

FIG. 61 is a diagram illustrating an image from the image shown in FIG. 60 wherein standard error obtained as the result of planar approximation without rejection is taken as the pixel value. In the example shown in FIG. 61, a block made up of 5×5 pixel as to a single pixel of interest was subjected to planar approximation. In FIG. 61, white pixels are pixel values which have greater pixel values, i.e., pixels having greater standard error, and black pixels are pixel values which have smaller pixel values, i.e., pixels having smaller standard error.

From FIG. 61, it can be confirmed that in the event that the standard error obtained as the result of planar approximation without rejection is taken as the pixel value, great values are obtained over a wide area at the perimeter of non-continuity portions.

In the examples shown in FIG. 62 through FIG. 67, a block made up of 7×7 pixels as to a single pixel of interest was subjected to planar approximation. In the event of planar approximation of a block made up of 7×7 pixels, one pixel is repeatedly included in 49 blocks, meaning that a pixel containing the continuity component is rejected as many as 49 times.

Figure 62:
FIG. 62 is a diagram illustrating an image wherein standard error obtained as the result of planar approximation with rejection is taken as pixel values.

FIG. 62 is an image wherein standard error obtained by planar approximation with rejection of the image shown in FIG. 60 is taken as the pixel value.

In FIG. 62, white pixels are pixel values which have greater pixel values, i.e., pixels having greater standard error, and black pixels are pixel values which have smaller pixel values, i.e., pixels having smaller standard error. It can be understood that the standard error is smaller overall in the case of performing rejection, as compared with a case of not performing rejection.

Figure 63:
FIG. 63 is a diagram illustrating an image wherein the number of times of rejection is taken as pixel values.

FIG. 63 is an image wherein the number of times of rejection in planar approximation with rejection of the image shown in FIG. 60 is taken as the pixel value. In FIG. 63, white pixels are greater pixel values, i.e., pixels which have been rejected a greater number of times, and black pixels are smaller pixel values, i.e., pixels which have been rejected a fewer times.

From FIG. 63, it can be understood that pixels where the fine line images are projected have been discarded a greater number of times. An image for masking the non-continuity portions of the input image can be generated using the image wherein the number of times of rejection is taken as the pixel value.

Figure 64:
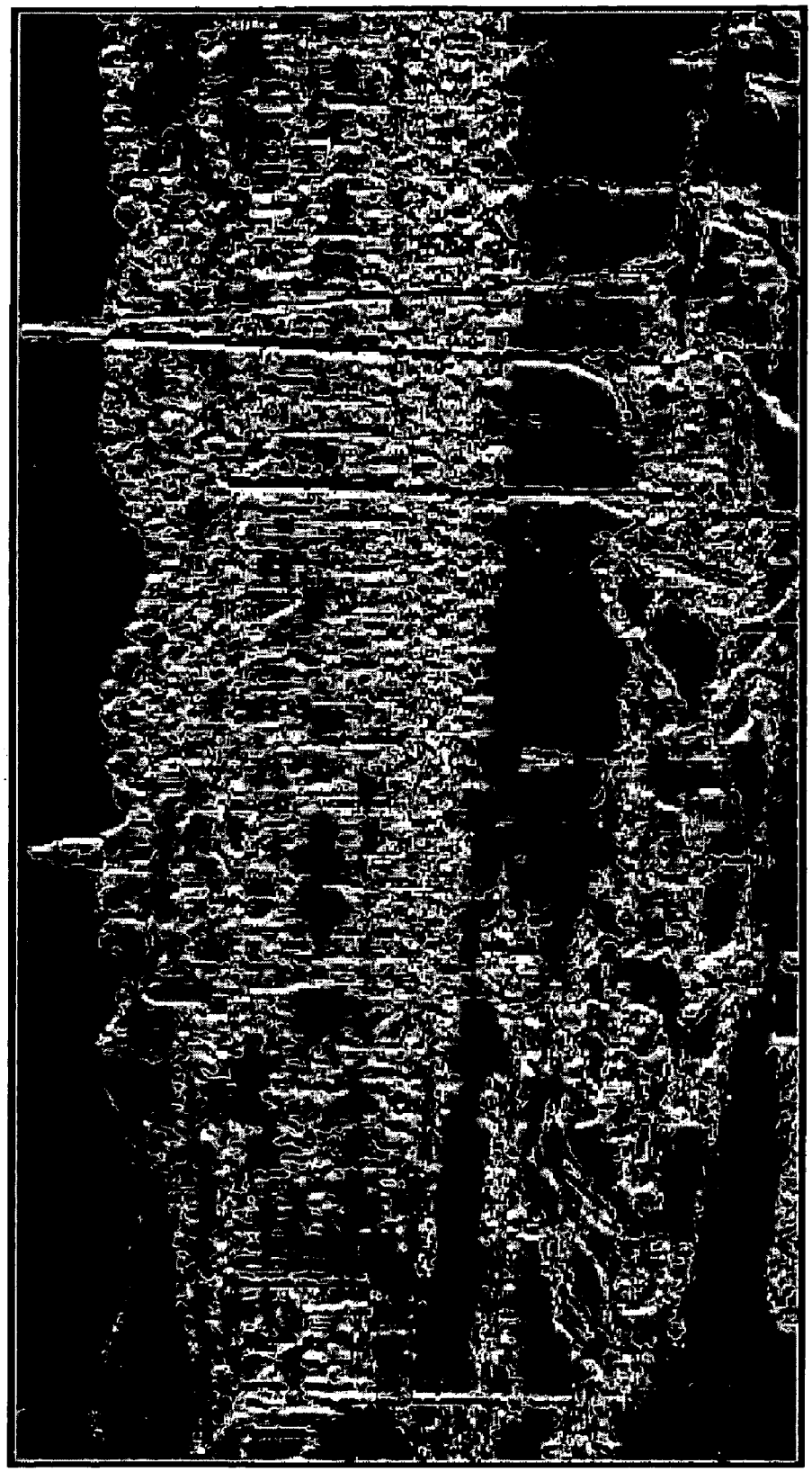
FIG. 64 is a diagram illustrating an image wherein the gradient of the spatial direction X of a plane is taken as pixel values.
Figure 65:
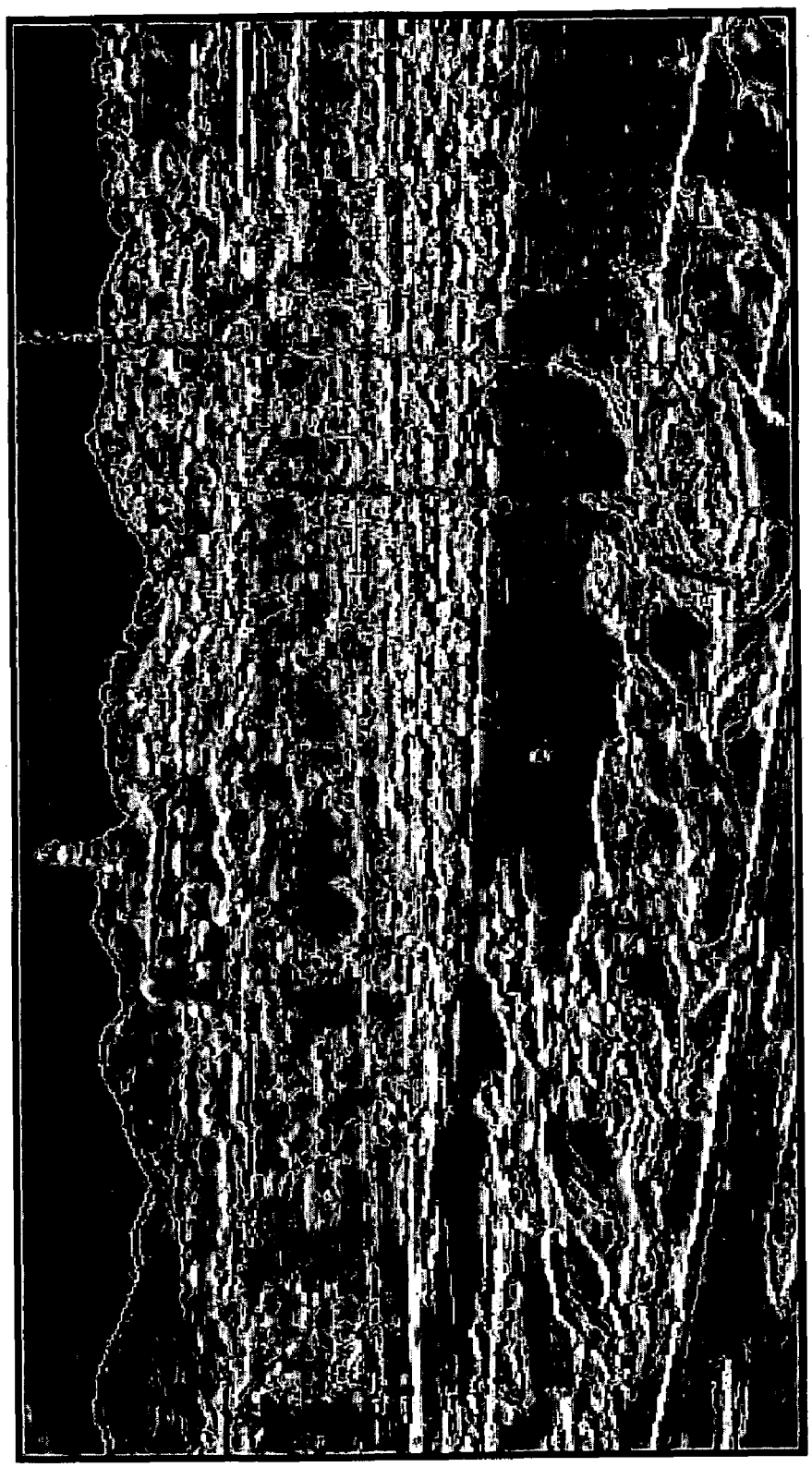
FIG. 65 is a diagram illustrating an image wherein the gradient of the spatial direction Y of a plane is taken as pixel values.

FIG. 64 is a diagram illustrating an image wherein the gradient of the spatial direction X of the plane for approximating the pixel values of the block is taken as the pixel value. FIG. 65 is a diagram illustrating an image wherein the gradient of the spatial direction Y of the plane for approximating the pixel values of the block is taken as the pixel value.

Figure 66:
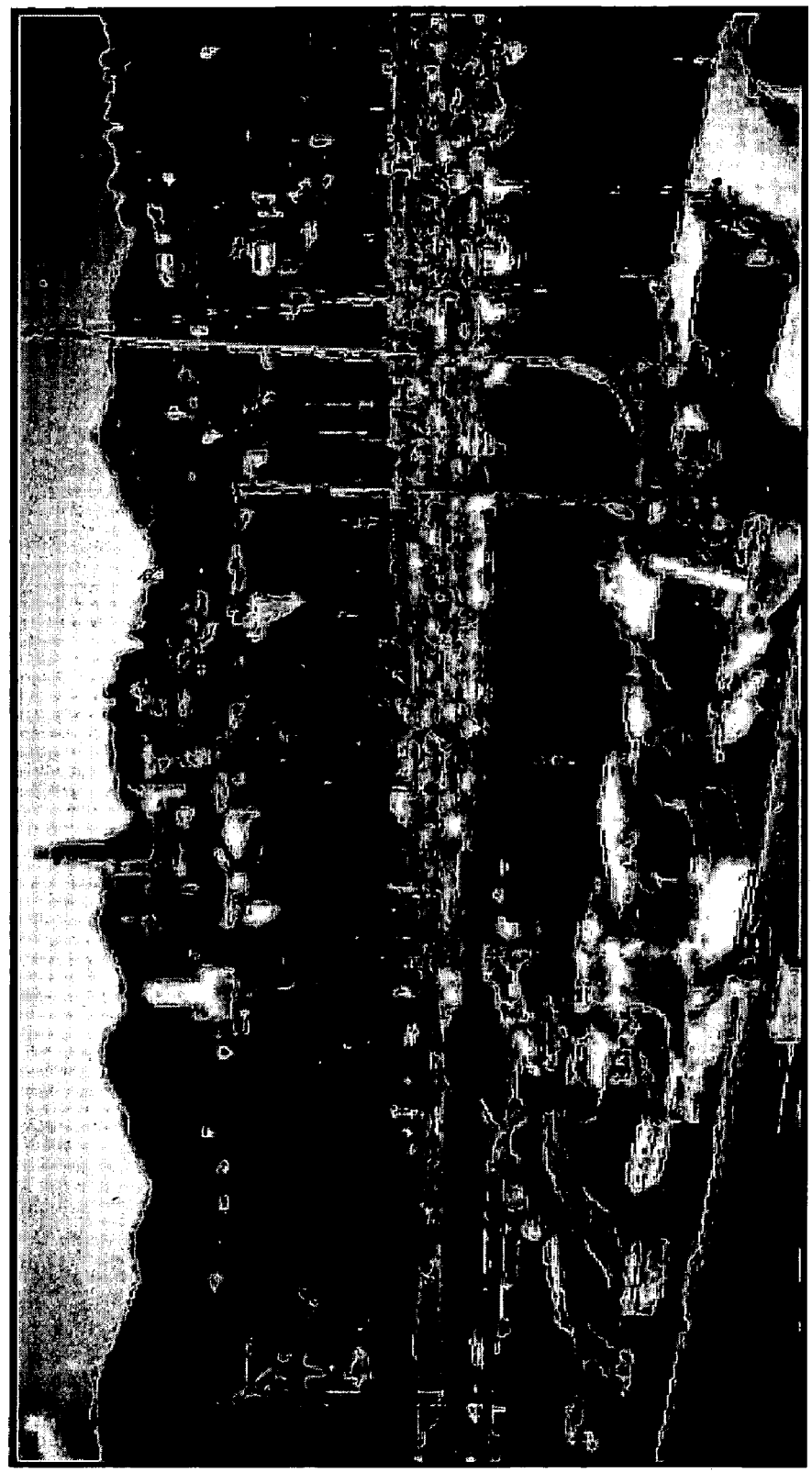
FIG. 66 is a diagram illustrating an image formed of planar approximation values.

FIG. 66 is a diagram illustrating an image formed of approximation values expressed by a plane for approximating the pixel values of the bock. It can be understood that the fine lines have disappeared from the image shown in FIG. 66.

Figure 67:
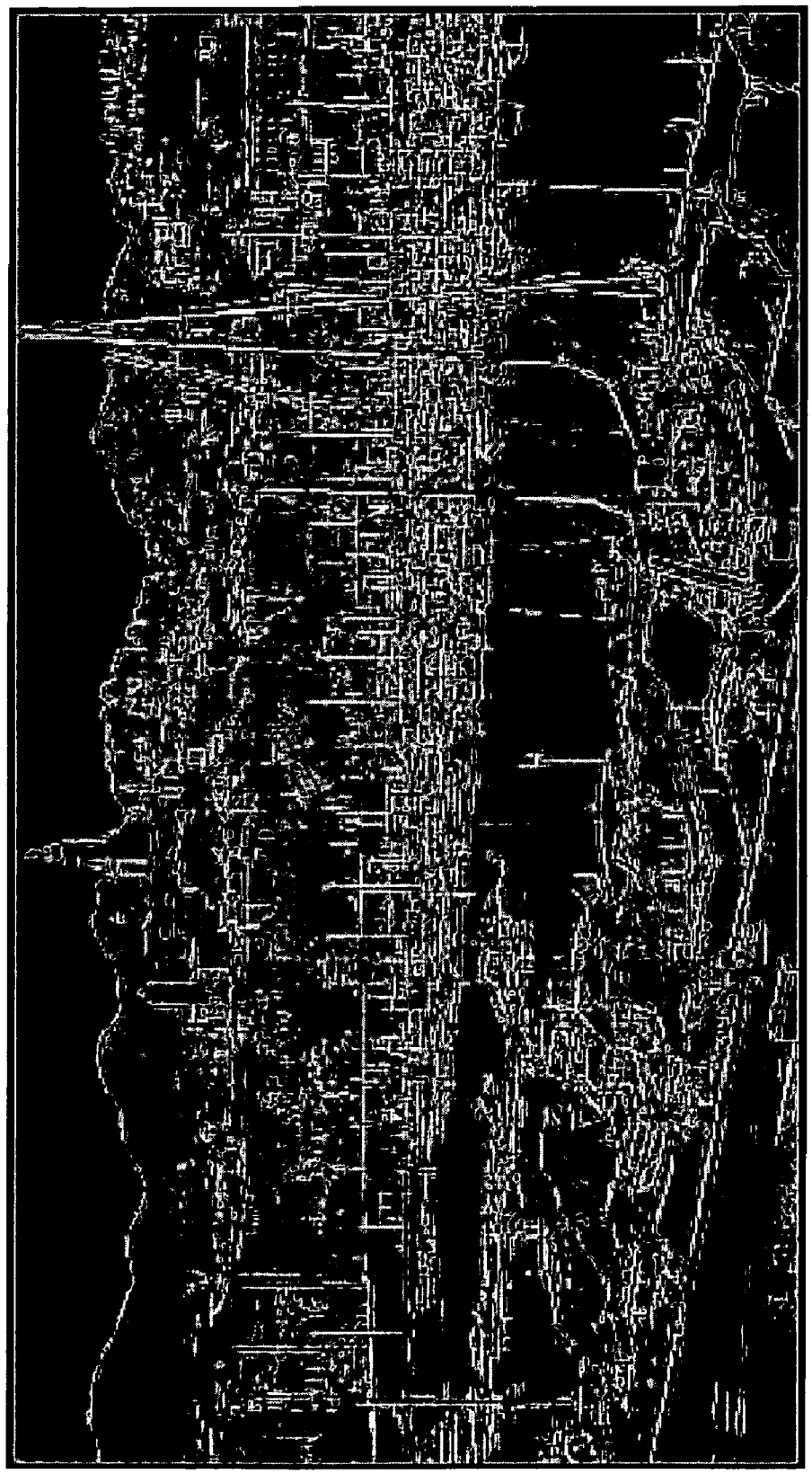
FIG. 67 is a diagram illustrating an image formed of the difference between planar approximation values and pixel values.

FIG. 67 is a diagram illustrating an image made up of the difference between the image shown in FIG. 60 generated by the average value of the block of 2×2 pixels in the original image being taken as the pixel value, and an image made up of approximate values expressed as a plane, shown in FIG. 66. The pixel values of the image shown in FIG. 67 have had the non-continuity component removed, so only the values where the image of the fine line has been projected remain. As can be understood from FIG. 67, with an image made up of the difference between the pixel value of the original image and approximation values expressed by a plane whereby approximation has been performed, the continuity component of the original image is extracted well.

The number of times of rejection, the gradient of the spatial direction X of the plane for approximating the pixel values of the pixel of the block, the gradient of the spatial direction Y of the plane for approximating the pixel values of the pixel of the block, approximation values expressed by the plane approximating the pixel values of the pixels of the block, and the error ei, can be used as features of the input image.

Figure 68:
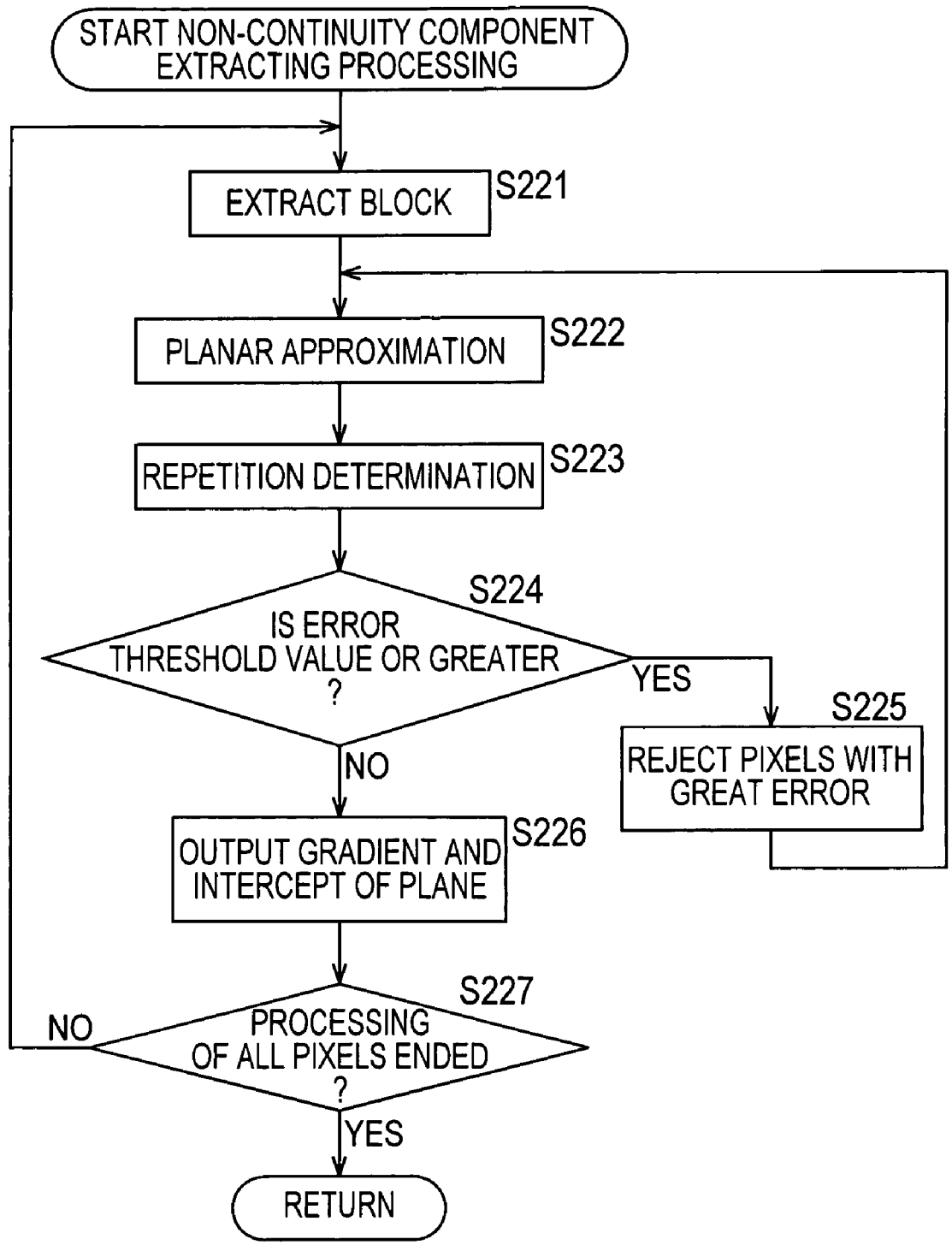
FIG. 68 is a flowchart describing the processing for extracting the non-continuity component.

FIG. 68 is a flowchart for describing the processing of extracting the non-continuity component with the non-continuity component extracting unit 201 of which the configuration is shown in FIG. 58.

In step S221, the block extracting unit 221 extracts a block made up of a predetermined number of pixels from the input image, and supplies the extracted block to the planar approximation unit 222. For example, the block extracting unit 221 selects one pixel of the pixels of the input pixel which have not been selected yet, and extracts a block made up of 7×7 pixels centered on the selected pixel. For example, the block extracting unit 221 can select pixels in raster scan order.

In step S222, the planar approximation unit 222 approximates the extracted block on a plane. The planar approximation unit 222 approximates the pixel values of the pixels of the extracted block on a plane by regression processing, for example. For example, the planar approximation unit 222 approximates the pixel values of the pixels of the extracted block excluding the rejected pixels on a plane, by regression processing. In step S223, the repetition determining unit 223 executes repetition determination. For example, repetition determination is performed by calculating the standard error from the pixel values of the pixels of the block and the planar approximation values, and counting the number of rejected pixels.

In step S224, the repetition determining unit 223 determines whether or not the standard error is equal to or above a threshold value, and in the event that determination is made that the standard error is equal to or above the threshold value, the flow proceeds to step S225.

Note that an arrangement may be made wherein the repetition determining unit 223 determines in step S224 whether or not half or more of the pixels of the block have been rejected, and whether or not the standard error is equal to or above the threshold value, and in the event that determination is made that half or more of the pixels of the block have not been rejected, and the standard error is equal to or above the threshold value, the flow proceeds to step S225.

In step S225, the repetition determining unit 223 calculates the error between the pixel value of each pixel of the block and the approximated planar approximation value, rejects the pixel with the greatest error, and notifies the planar approximation unit 222. The procedure returns to step S222, and the planar approximation processing and repetition determination processing is repeated with regard to the pixels of the block excluding the rejected pixel.

In step S225, in the event that a block which is shifted one pixel in the raster scan direction is extracted in the processing in step S221, the pixel including the fine line component (indicated by the black circle in the drawing) is rejected multiple times, as shown in FIG. 59.

In the event that determination is made in step S224 that the standard error is not equal to or greater than the threshold value, the block has been approximated on the plane, so the flow proceeds to step S226.

Note that an arrangement may be made wherein the repetition determining unit 223 determines in step S224 whether or not half or more of the pixels of the block have been rejected, and whether or not the standard error is equal to or above the threshold value, and in the event that determination is made that half or more of the pixels of the block have been rejected, or the standard error is not equal to or above the threshold value, the flow proceeds to step S225.

In step S226, the repetition determining unit 223 outputs the gradient and intercept of the plane for approximating the pixel values of the pixels of the block as non-continuity component information.

In step S227, the block extracting unit 221 determines whether or not processing of all pixels of one screen of the input image has ended, and in the event that determination is made that there are still pixels which have not yet been taken as the object of processing, the flow returns to step S221, a block is extracted from pixels not yet been subjected to the processing, and the above processing is repeated.

In the event that determination is made in step S227 that processing has ended for all pixels of one screen of the input image, the processing ends.

Thus, the non-continuity component extracting unit 201 of which the configuration is shown in FIG. 58 can extract the non-continuity component from the input image. The non-continuity component extracting unit 201 extracts the non-continuity component from the input image, so the peak detecting unit 202 and monotonous increase/decrease detecting unit 203 can obtain the difference between the input image and the non-continuity component extracted by the non-continuity component extracting unit 201, so as to execute the processing regarding the difference containing the continuity component.

Note that the standard error in the event that rejection is performed, the standard error in the event that rejection is not performed, the number of times of rejection of a pixel, the gradient of the spatial direction X of the plane (a-hat in Expression (24)), the gradient of the spatial direction Y of the plane (b-hat in Expression (24)), the level of planar transposing (c-hat in Expression (24)), and the difference between the pixel values of the input image and the approximation values represented by the plane, calculated in planar approximation processing, can be used as features.

Figure 69:
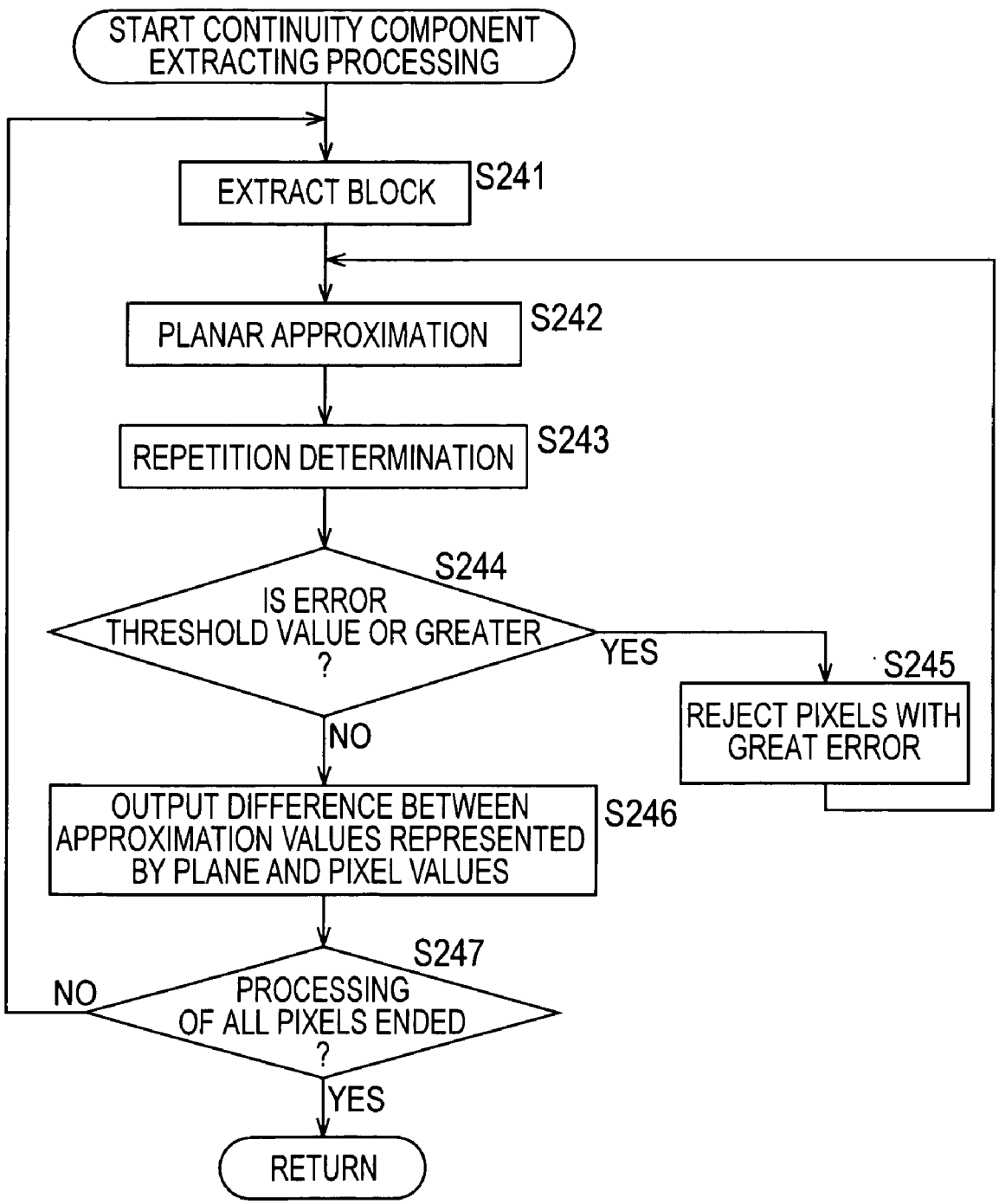
FIG. 69 is a flowchart describing the processing for extracting the continuity component.

FIG. 69 is a flowchart for describing processing for extracting the continuity component with the non-continuity component extracting unit 201 of which the configuration is shown in FIG. 58, instead of the processing for extracting the non-continuity component corresponding to step S201. The processing of step S241 through step S245 is the same as the processing of step S221 through step S225, so description thereof will be omitted.

In step S246, the repetition determining unit 223 outputs the difference between the approximation value represented by the plane and the pixel values of the input image, as the continuity component of the input image. That is to say, the repetition determining unit 223 outputs the difference between the planar approximation values and the true pixel values.

Note that the repetition determining unit 223 may be arranged to output the difference between the approximation value represented by the plane and the pixel values of the input image, regarding pixel values of pixels of which the difference is equal to or greater than a predetermined threshold value, as the continuity component of the input image.

The processing of step S247 is the same as the processing of step S227, and accordingly description thereof will be omitted.

The plane approximates the non-continuity component, so the non-continuity component extracting unit 201 can remove the non-continuity component from the input image by subtracting the approximation value represented by the plane for approximating pixel values, from the pixel values of each pixel in the input image. In this case, the peak detecting unit 202 through the continuousness detecting unit 204 can be made to process only the continuity component of the input image, i.e., the values where the fine line image has been projected, so the processing with the peak detecting unit 202 through the continuousness detecting unit 204 becomes easier.

Figure 70:
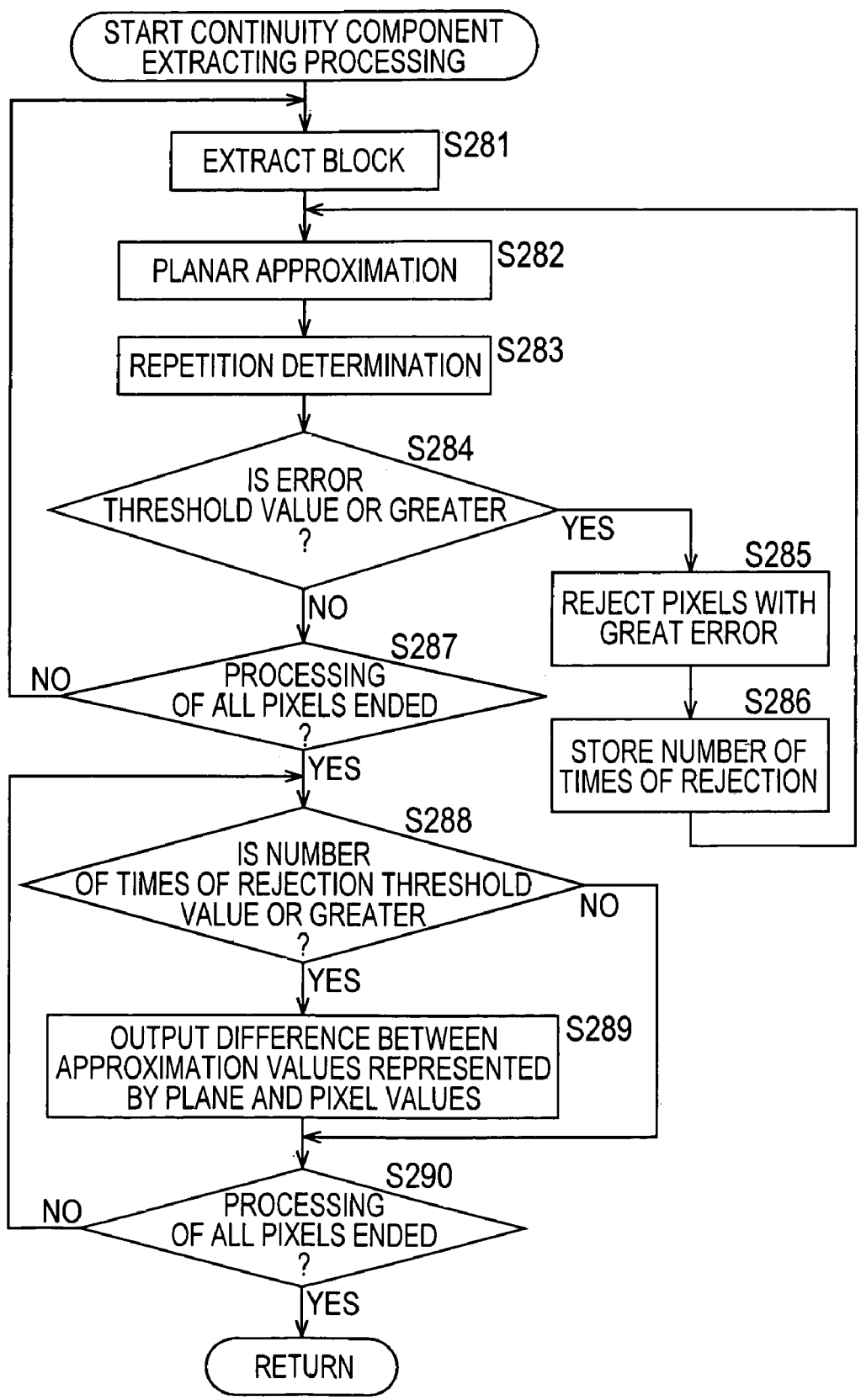
FIG. 70 is a flowchart describing other processing for extracting the continuity component.

FIG. 70 is a flowchart for describing other processing for extracting the continuity component with the non-continuity component extracting unit 201 of which the configuration is shown in FIG. 58, instead of the processing for extracting the non-continuity component corresponding to step S201. The processing of step S261 through step S265 is the same as the processing of step S221 through step S225, so description thereof will be omitted.

In step S266, the repetition determining unit 223 stores the number of times of rejection for each pixel, the flow returns to step S262, and the processing is repeated.

In step S264, in the event that determination is made that the standard error is not equal to or greater than the threshold value, the block has been approximated on the plane, so the flow proceeds to step S267, the repetition determining unit 223 determines whether or not processing of all pixels of one screen of the input image has ended, and in the event that determination is made that there are still pixels which have not yet been taken as the object of processing, the flow returns to step S261, with regard to a pixel which has not yet been subjected to the processing, a block is extracted, and the above processing is repeated.

In the event that determination is made in step S267 that processing has ended for all pixels of one screen of the input image, the flow proceeds to step S268, the repetition determining unit 223 selects a pixel which has not yet been selected, and determines whether or not the number of times of rejection of the selected pixel is equal to or greater than a threshold value. For example, the repetition determining unit 223 determines in step S268 whether or not the number of times of rejection of the selected pixel is equal to or greater than a threshold value stored beforehand.

In the event that determination is made in step S268 that the number of times of rejection of the selected pixel is equal to or greater than the threshold value, the selected pixel contains the continuity component, so the flow proceeds to step S269, where the repetition determining unit 223 outputs the pixel value of the selected pixel (the pixel value in the input image) as the continuity component of the input image, and the flow proceeds to step S270.

In the event that determination is made in step S268 that the number of times of rejection of the selected pixel is not equal to or greater than the threshold value, the selected pixel does not contain the continuity component, so the processing in step S269 is skipped, and the procedure proceeds to step S270. That is to say, the pixel value of a pixel regarding which determination has been made that the number of times of rejection is not equal to or greater than the threshold value is not output.

Note that an arrangement may be made wherein the repetition determining unit 223 outputs a pixel value set to 0 for pixels regarding which determination has been made that the number of times of rejection is not equal to or greater than the threshold value.

In step S270, the repetition determining unit 223 determines whether or not processing of all pixels of one screen of the input image has ended to determine whether or not the number of times of rejection is equal to or greater than the threshold value, and in the event that determination is made that processing has not ended for all pixels, this means that there are still pixels which have not yet been taken as the object of processing, so the flow returns to step S268, a pixel which has not yet been subjected to the processing is selected, and the above processing is repeated.

In the event that determination is made in step S270 that processing has ended for all pixels of one screen of the input image, the processing ends.

Thus, of the pixels of the input image, the non-continuity component extracting unit 201 can output the pixel values of pixels containing the continuity component, as continuity component information. That is to say, of the pixels of the input image, the non-continuity component extracting unit 201 can output the pixel values of pixels containing the component of the fine line image.

Figure 71:
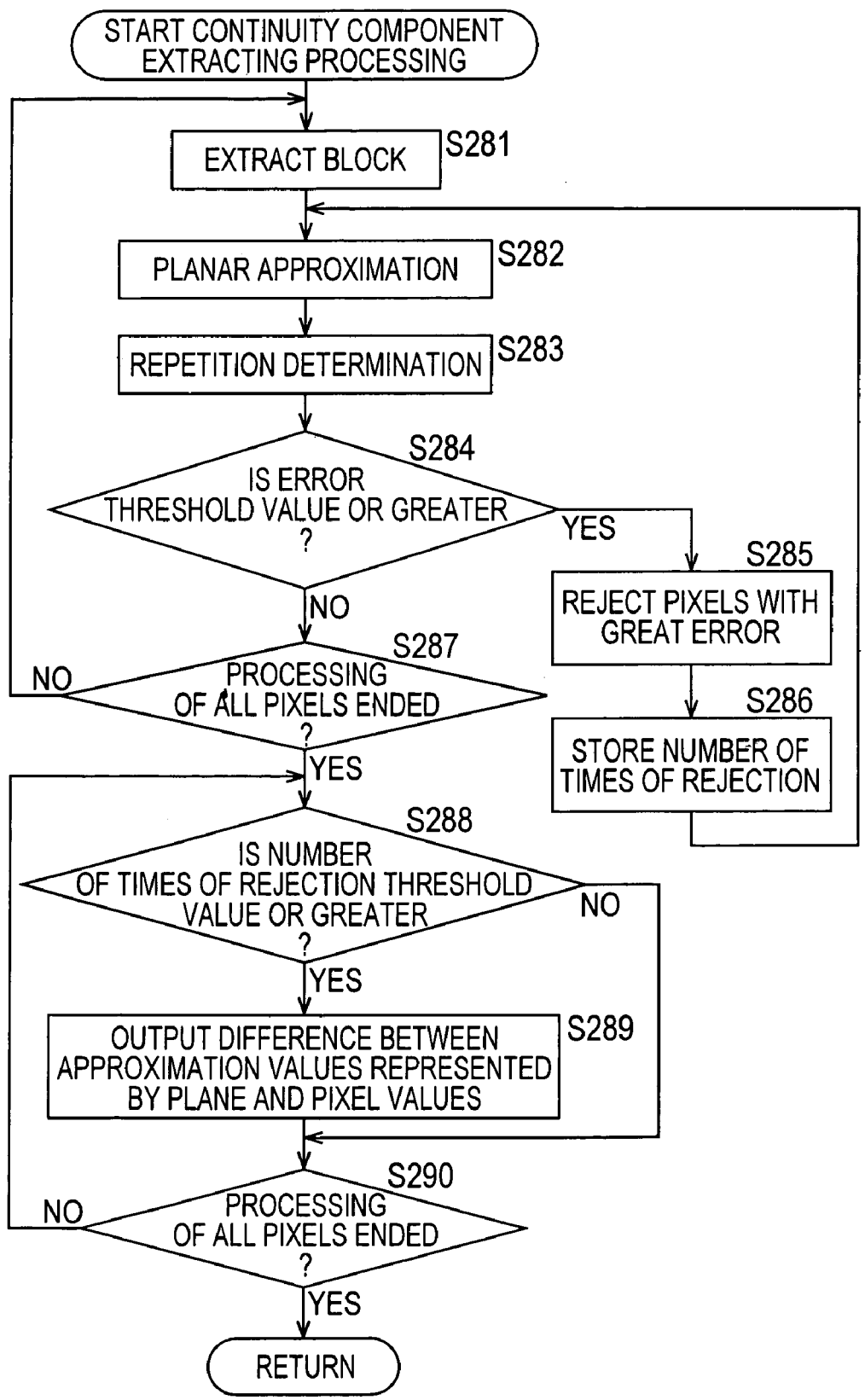
FIG. 71 is a flowchart describing still other processing for extracting the continuity component.

FIG. 71 is a flowchart for describing yet other processing for extracting the continuity component with the non-continuity component extracting unit 201 of which the configuration is shown in FIG. 58, instead of the processing for extracting the non-continuity component corresponding to step S201. The processing of step S281 through step S288 is the same as the processing of step S261 through step S268, so description thereof will be omitted.

In step S289, the repetition determining unit 223 outputs the difference between the approximation value represented by the plane, and the pixel value of a selected pixel, as the continuity component of the input image. That is to say, the repetition determining unit 223 outputs an image wherein the non-continuity component has been removed from the input image, as the continuity information.

The processing of step S290 is the same as the processing of step S270, and accordingly description thereof will be omitted.

Thus, the non-continuity component extracting unit 201 can output an image wherein the non-continuity component has been removed from the input image as the continuity information.

As described above, in a case wherein real world light signals are projected, a non-continuous portion of pixel values of multiple pixels of first image data wherein a part of the continuity of the real world light signals has been lost is detected, data continuity is detected from the detected non-continuous portions, a model (function) is generated for approximating the light signals by estimating the continuity of the real world light signals based on the detected data continuity, and second image data is generated based on the generated function, processing results which are more accurate and have higher precision as to the event in the real world can be obtained.

Figure 72:
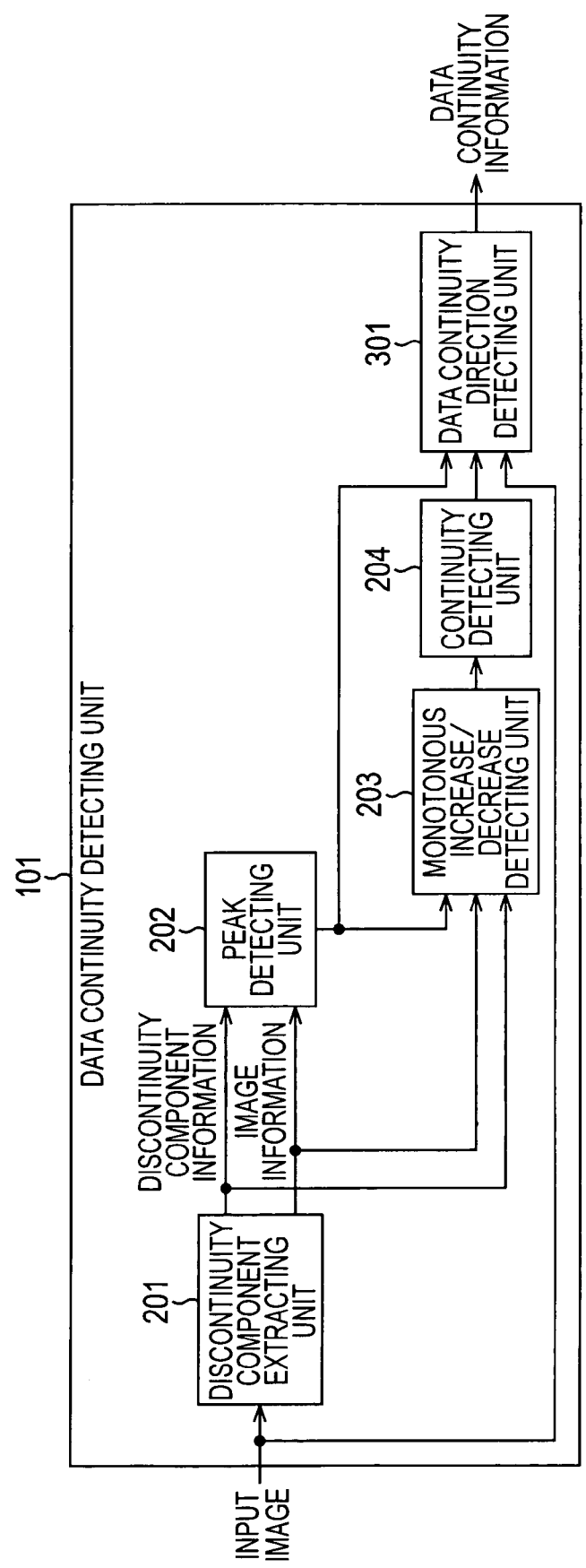
FIG. 72 is a block diagram illustrating another configuration of a continuity component detecting unit.

FIG. 72 is a block diagram illustrating another configuration of the data continuity detecting unit 101. Portions which are the same as that shown in FIG. 41 are denoted with the same numerals, and description thereof will be omitted.

With the data continuity detecting unit 101 of which the configuration is shown in FIG. 72, the direction of the continuousness in the continuity region is detected, based on the change in pixels values of multiple first pixels disposed within a first monotonous increase/decrease region of the monotonous increase/decrease regions detected by the continuousness detecting means, and change in the pixel values of multiple second pixels adjacent to the multiple first pixels, disposed within a second monotonous increase/decrease region adjacent to the first monotonous increase/decrease region.

With the data continuity detecting unit 101 of which the configuration is shown in FIG. 72, the input image is supplied to the non-continuity component extracting unit 201 and a data continuity direction detecting unit 301.

The peak detecting unit 202 supplies peak information indicating the detected peak to the monotonous increase/decrease detecting unit 203 and the data continuity direction detecting unit 301.

The continuousness detecting unit 204 supplies the peak information and data continuity information indicating the continuous region (fine line region (monotonous increase/decrease region)) to the data continuity direction detecting unit 301.

The data continuity direction detecting unit 301 detects the direction of continuousness of the continuity region, which is the direction of continuation of the continuity region having data continuity, based on the input image, the peak information indicating the peak supplied from the peak detecting unit 202, and the pixel values belonging to the continuous region detected by the continuousness detecting unit 204. The data continuity direction detecting unit 301 outputs the peak information, the detected continuous region, and the data continuity information indicating the direction of the continuous region of continuousness.

Figure 73:
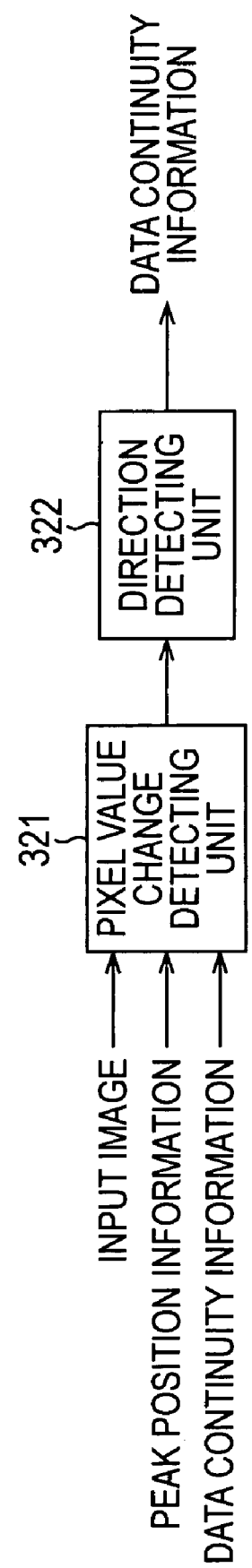
FIG. 73 is a block diagram illustrating the configuration of a data continuity direction detecting unit.

FIG. 73 is a block diagram illustrating the configuration of the data continuity direction detecting unit 301. That is to say, the data continuity direction detecting unit 301 includes a pixel value change detecting unit 321 and a direction detecting unit 322.

The pixel value change detecting unit 321 detects change in the pixel values in the region, based on the input image, the peak information indicating the peak supplied from the peak detecting unit 202, and the pixel values belonging to the continuous region (fine line region (monotonous increase/decrease region)) detected by the continuousness detecting unit 204, and supplies the information indicating change in the pixel values to the direction detecting unit 322.

More specifically, the pixel value change detecting unit 321 calculates the difference between the pixel value of the peak and the pixel value of each pixel belonging to the region, for each continuous region detected by the continuousness detecting unit 204. Also, the pixel value change detecting unit 321 calculates the difference between pixels values of the pixel belonging to the region and adjacent to the peak of another region adjacent to the region, and pixel values of the pixels adjacent to the region. The pixel value change detecting unit 321 supplies to the direction detecting unit 322 information indicating the difference of the pixel value of the peak as it corresponds to each of the pixels belonging to the region, and the difference between the pixel value of a pixel adjacent to the peak of another region which is adjacent to the region, and the pixel values of each of the pixels belonging to the region.

The direction detecting unit 322 detects the direction of continuousness of the continuity region which is the direction of continuation of the continuity region having data continuity, based on information indicating change in pixel value, supplied from the pixel value change detecting unit 321.

More specifically, in the event that the decrease from the peak, which is represented as the difference between the pixel value at a peak belonging to the region and the pixel values of pixel belonging to the region, and the increase, which is represented as the difference between the pixel values of pixels adjacent to the peak in another region adjacent to the region and pixel values of pixels adjacent to pixels belonging to the region, match, the direction determined from the region adjacent to the region is detected as the direction of continuousness of the continuity region.

Figure 74:
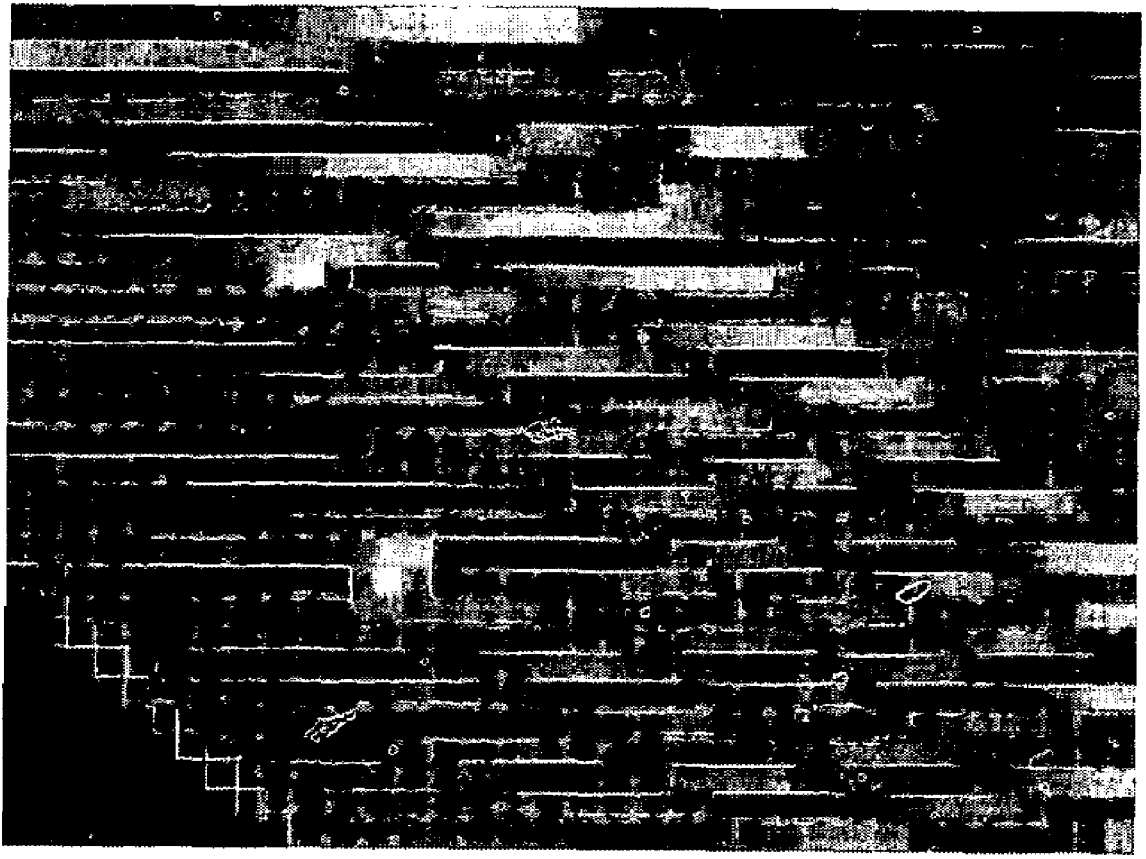
FIG. 74 is a diagram illustrating an example of an input image containing moiré.

FIG. 74 is a diagram illustrating an example of an image exhibiting beading, which is manifested when imaging a repeated fine patter with the sensor 2 which is an image sensor, that is to say, an input image containing so-called moiré.

Figure 75:
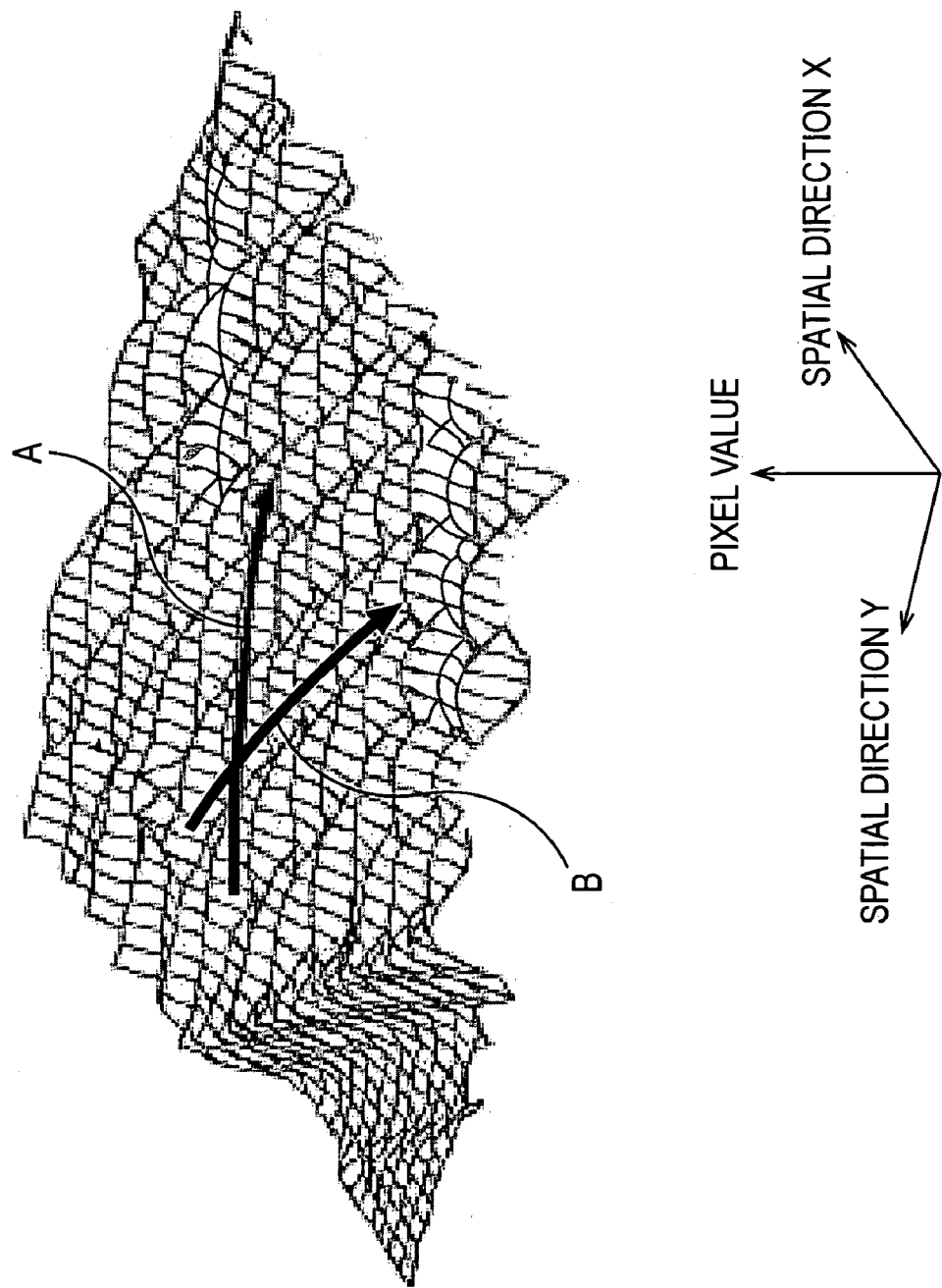
FIG. 75 is a diagram illustrating an example of an input image containing moiré.

With an image containing moiré, in the event that continuity is detected according to simply whether or not a pixel adjacent to a fine line region is contained therein, an erroneous fine line direction B is detected along with the correct fine line direction (direction of the continuousness of the continuity region) A, as illustrated in FIG. 75.

Accordingly, with the present invention, the correct direction of continuousness of the continuity region in the data 3 is obtained using the nature of the data 3 upon which the fine line image is projected.

Figure 76:
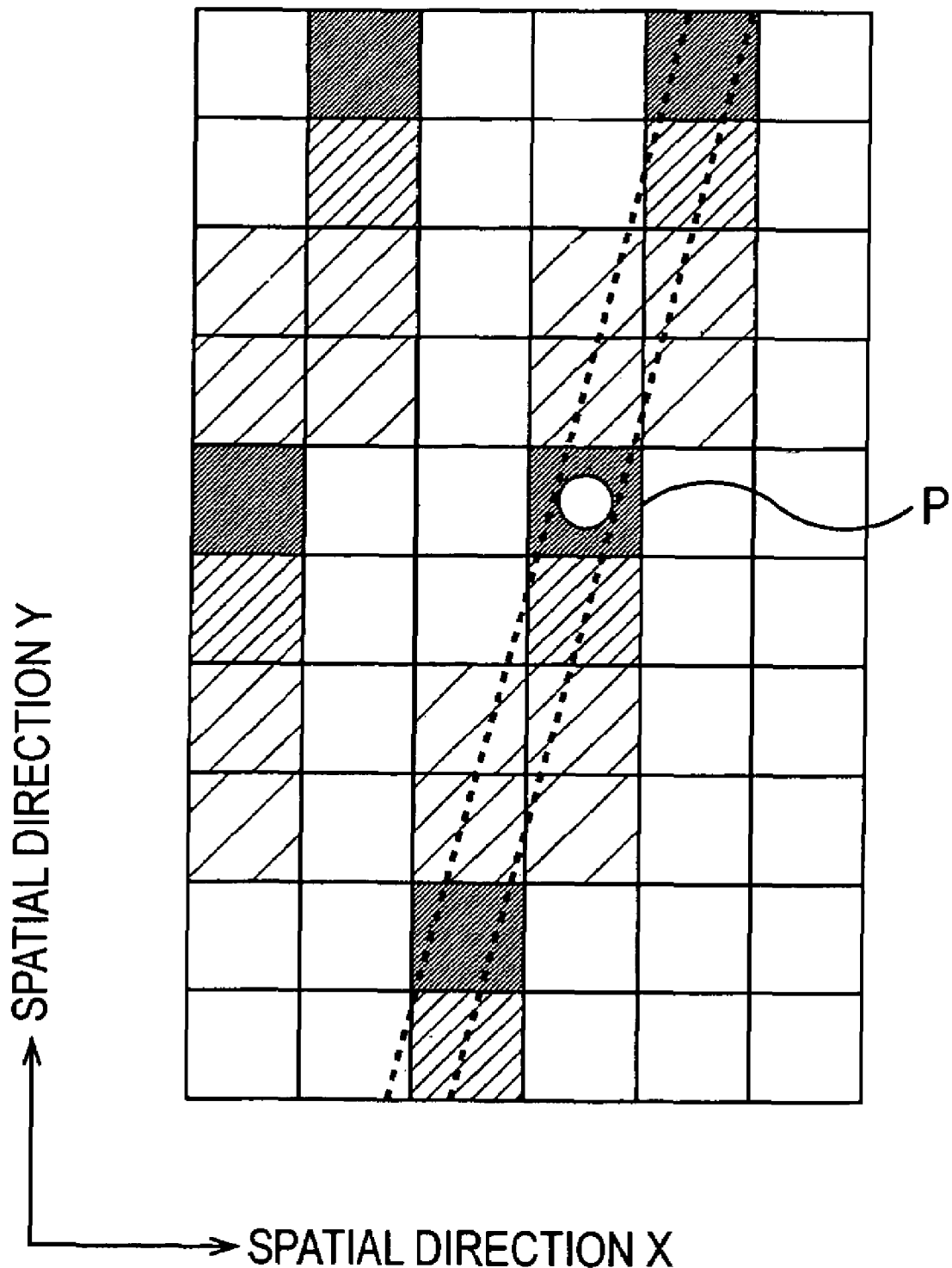
FIG. 76 is a diagram illustrating pixels of data regarding which the image of a fine line has been projected.

FIG. 76 is a diagram illustrating the pixels of the data 3 upon which the fine line image is projected. In FIG. 76, the horizontal direction represents the spatial direction X, and the vertical direction represents the spatial direction Y. In FIG. 76, the region between the two dotted lines represents the region where one fine line image has been projected. In FIG. 76, P denotes the peak.

Figure 77:
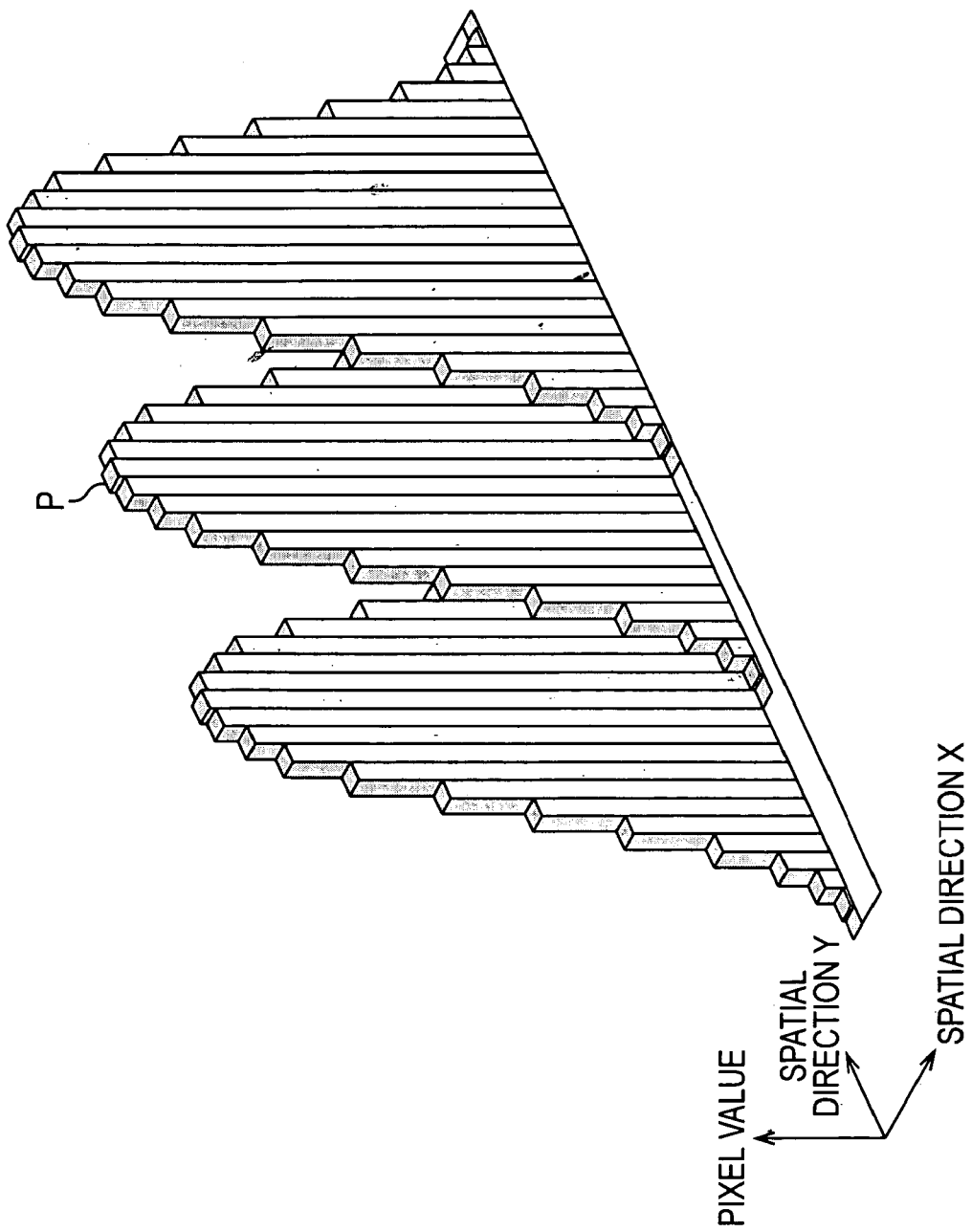
FIG. 77 is a diagram illustrating the pixel values of three rows of pixels in data where the image of a fine line has been projected.

FIG. 77 is a diagram illustrating the pixel values of three rows of pixels in the data 3 upon which the fine line image in FIG. 76 is projected.

In FIG. 77 the upper direction in the diagram represents pixel value, the upper right direction in the diagram represents the spatial direction Y, and the lower right direction in the diagram represents the spatial direction X. In FIG. 77, P denotes the peak.

As shown in FIG. 77, the waveform represented by the pixel values of the pixels of the data 3 upon which the fine line image is projected schematically assumes an arc shape. The fine line image has approximately the same diameter and the same level regardless of the portion thereof, so the sum of the pixel values obtained by projecting a fine line image of a certain length is always constant. In other words, in the event that a fine line image of a certain length is projected on pixel values of multiple pixels, of the pixel values of the multiple pixels, the values, where the image of the fine line of a certain length is projected, are constant.

That is to say, in the event that the pixel values decrease as to the peak P within the pixels belonging to the fine line region, the image of the fine line corresponding to the reduced pixel values is projected on other pixels of another fine line region.

The data continuity detecting unit 101 of which the configuration is shown in FIG. 72 obtains the correct direction of the continuousness of the continuity region corresponding to the direction of the fine line, using the nature that the sum of the pixel values obtained by projecting a fine line image of a certain length is always constant. That is to say, the data continuity detecting unit 101 of which the configuration is shown in FIG. 72 obtains the correct direction of the continuousness of the continuity region corresponding to the direction of the fine line, using the fact that in the event that the pixel values decrease with regard to the pixels belonging to the fine line region, the pixel values of the pixels of the fine line region at positions corresponding to the correct direction of the fine line increase corresponding to the amount of decrease.

Figure 78:
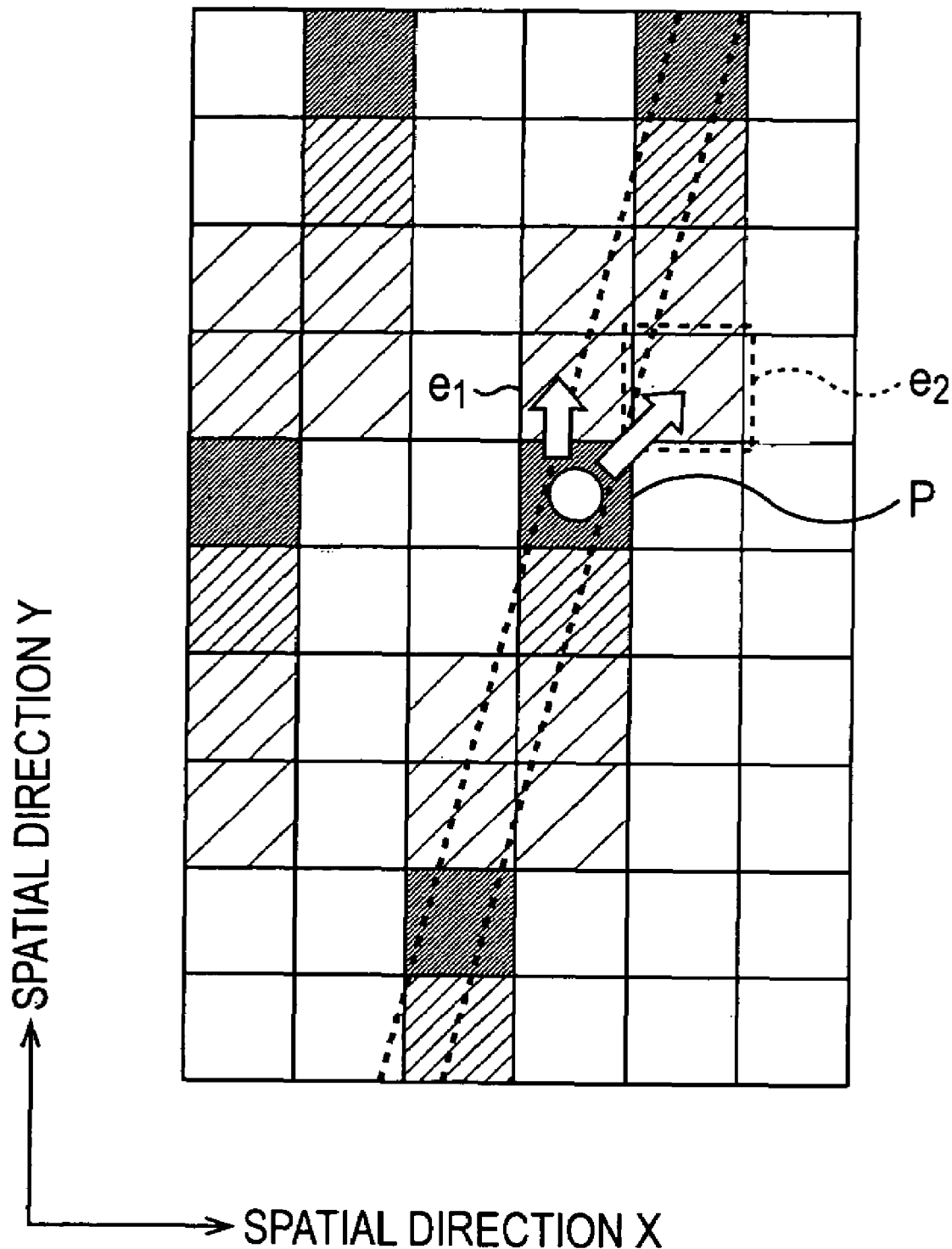
FIG. 78 is a diagram illustrating pixels of data regarding which the image of a fine line has been projected.

As shown in FIG. 78, in the event that the pixel value of a pixel $e_1$ which is a pixel adjacent to the pixel of the peak P and belongs to the same fine line region as the peak P, decreases in comparison to the pixel value of the peak P, the decreased pixel value can be thought to have been allocated to a pixel $e_2$ which is a pixel adjacent to the pixel $e_1$ and belongs to a fine line region adjacent to the fine line region to which the peak P belongs.

Figure 79:
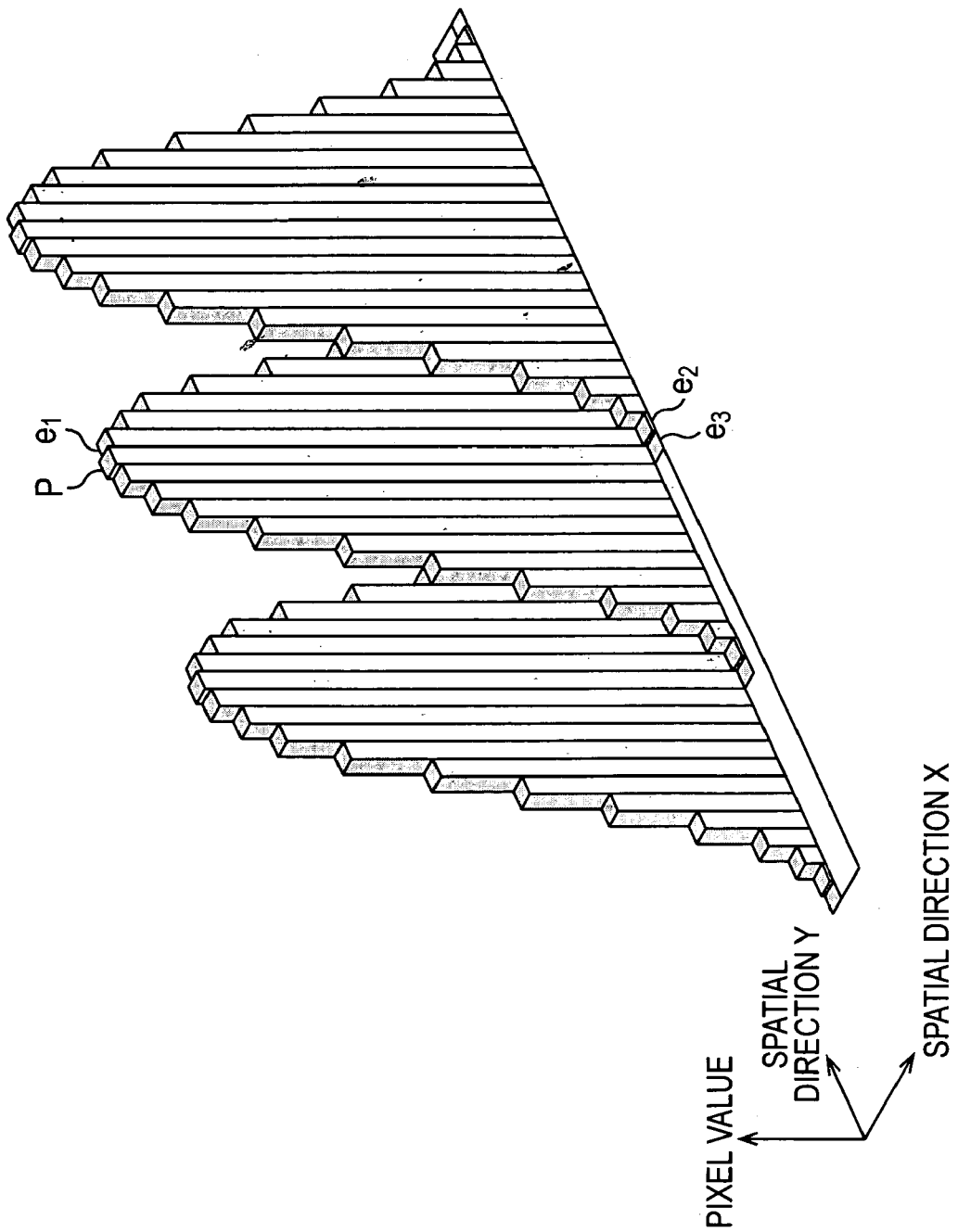
FIG. 79 is a diagram illustrating the pixel values of three rows of pixels in data where the image of a fine line has been projected.

That is to say, as shown in FIG. 79, the absolute value of the decrease A of from the pixel value of the peak P to the pixel value of the pixel $e_1$ is equal to the absolute value of the increase B from a pixel $e_3$ which belongs to the fine line region adjacent to the fine line region to which the peak P belongs and is adjacent to the peak P, to the pixel $e_2$ adjacent to the pixel $e_1$.

Figure 80:
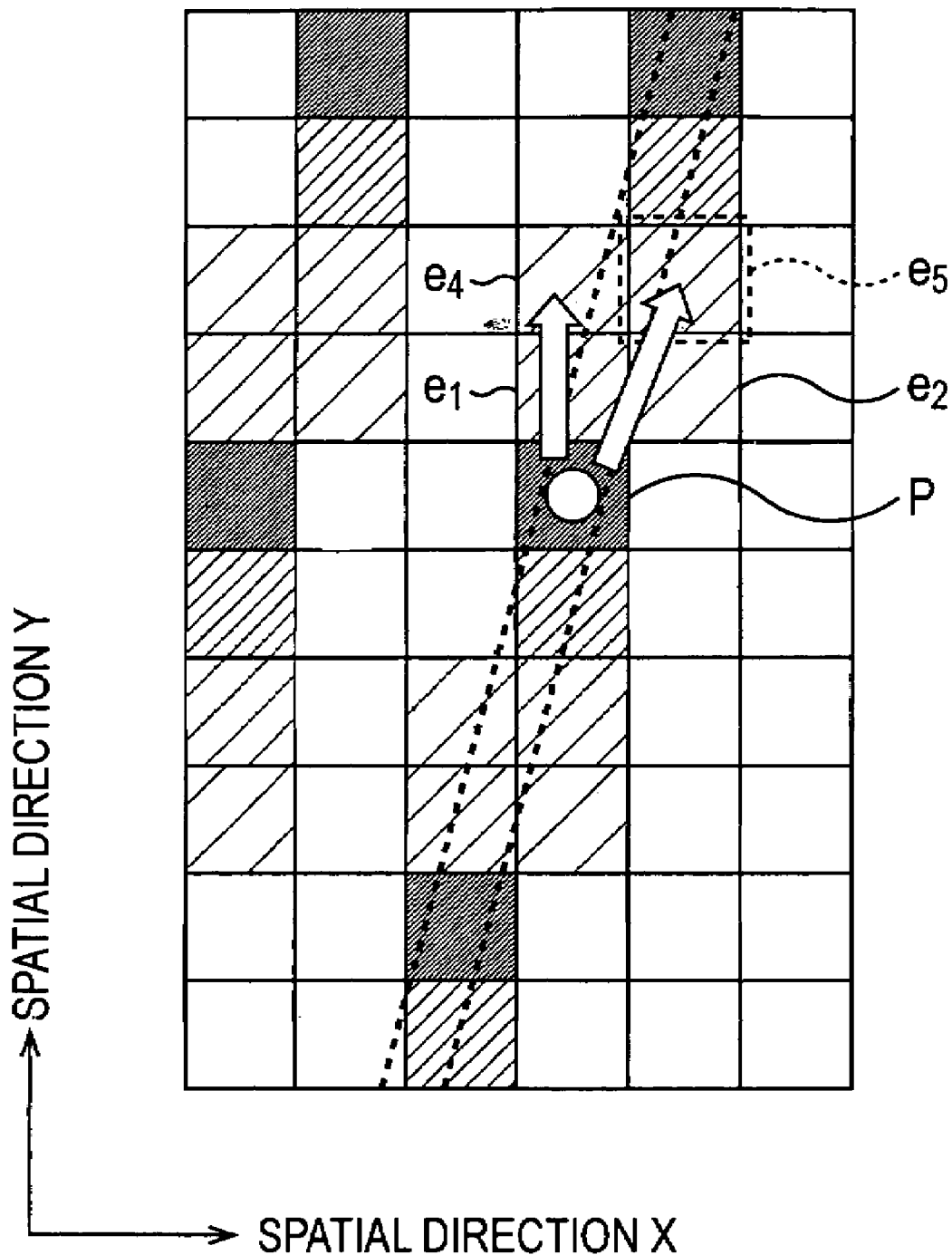
FIG. 80 is a diagram illustrating pixels of data regarding which the image of a fine line has been projected.

Further, as shown in FIG. 80, in the event that the pixel value of a pixel $e_4$ which belongs to the same fine line region as the peak P and is further adjacent to the pixel $e_1$, decreases in comparison to the pixel value of the peak P, the decreased value can be thought to have been allocated to a pixel $e_5$ which belongs to the fine line region adjacent to the fine line region to which the peak P belongs and is adjacent to the pixel $e_4$.

Figure 81:
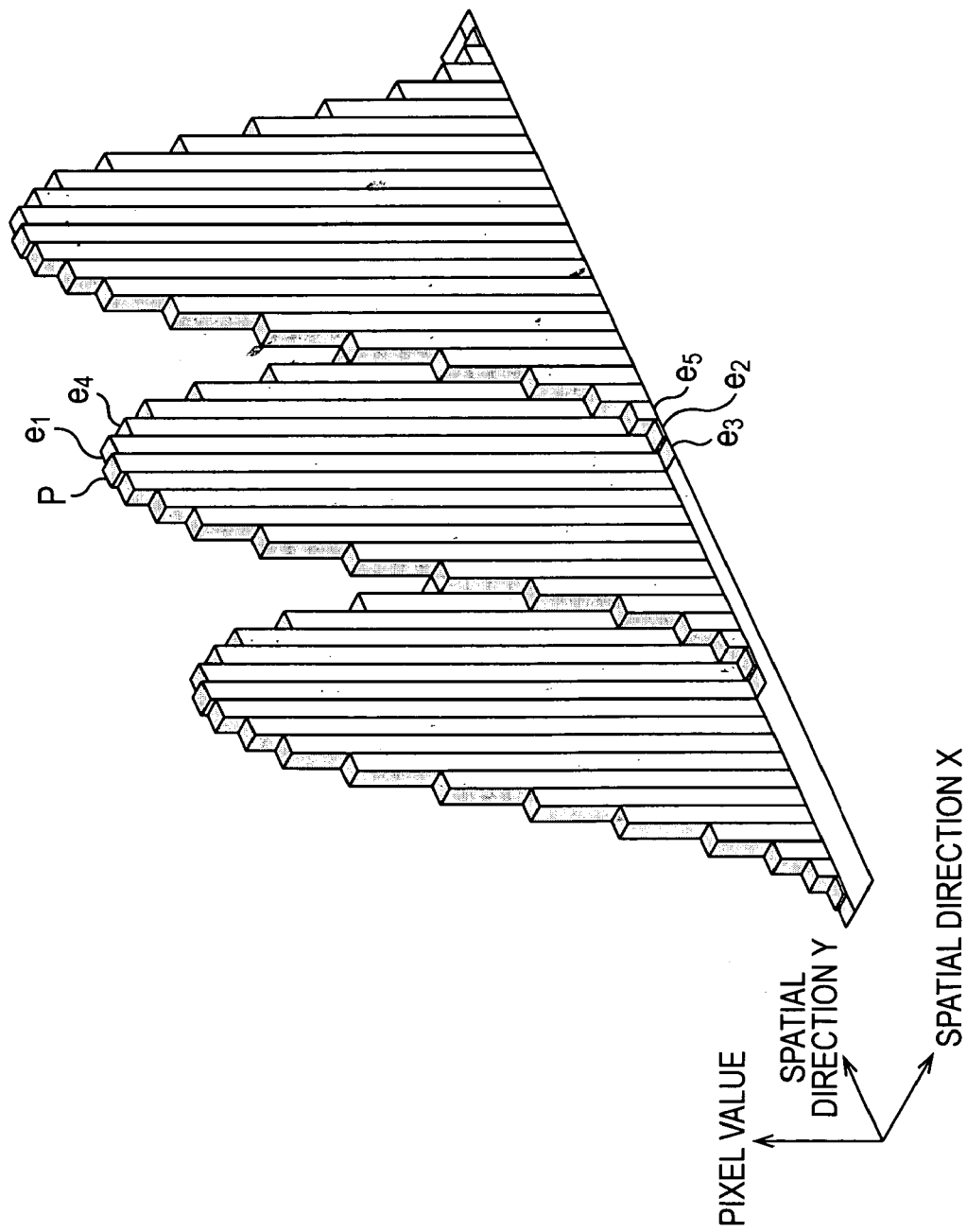
FIG. 81 is a diagram illustrating the pixel values of three rows of pixels in data where the image of a fine line has been projected.

As shown in FIG. 81, the absolute value of the decrease C of from the pixel value of the peak P to the pixel value of the pixel $e_4$ is equal to the absolute value of the increase D from the pixel $e_3$ which belongs to the fine line region adjacent to the fine line region to which the peak P belongs and is adjacent to the peak P, to the pixel $e_5$ adjacent to the pixel $e_4$.

In the event that two or more fine line regions continue in a single fine line region, the data continuity direction detecting unit 301 detects the fine line region containing the pixel values where the pixel values change as the continuity direction, corresponding to the change in pixel values of the fine line region. That is to say, in the event that two or more fine line regions continue in a single fine line region, the data continuity direction detecting unit 301 detects the fine line region containing pixel values wherein the pixel values decrease, as the continuity direction, corresponding to the increase in pixel values of the fine line region, or detects the fine line region containing pixel values wherein the pixel values increase, as the continuity direction of the continuity region, corresponding to the decrease in pixel values of the fine line region.

Figure 82:
FIG. 82 is a diagram illustrating an example of an input image.
Figure 83:
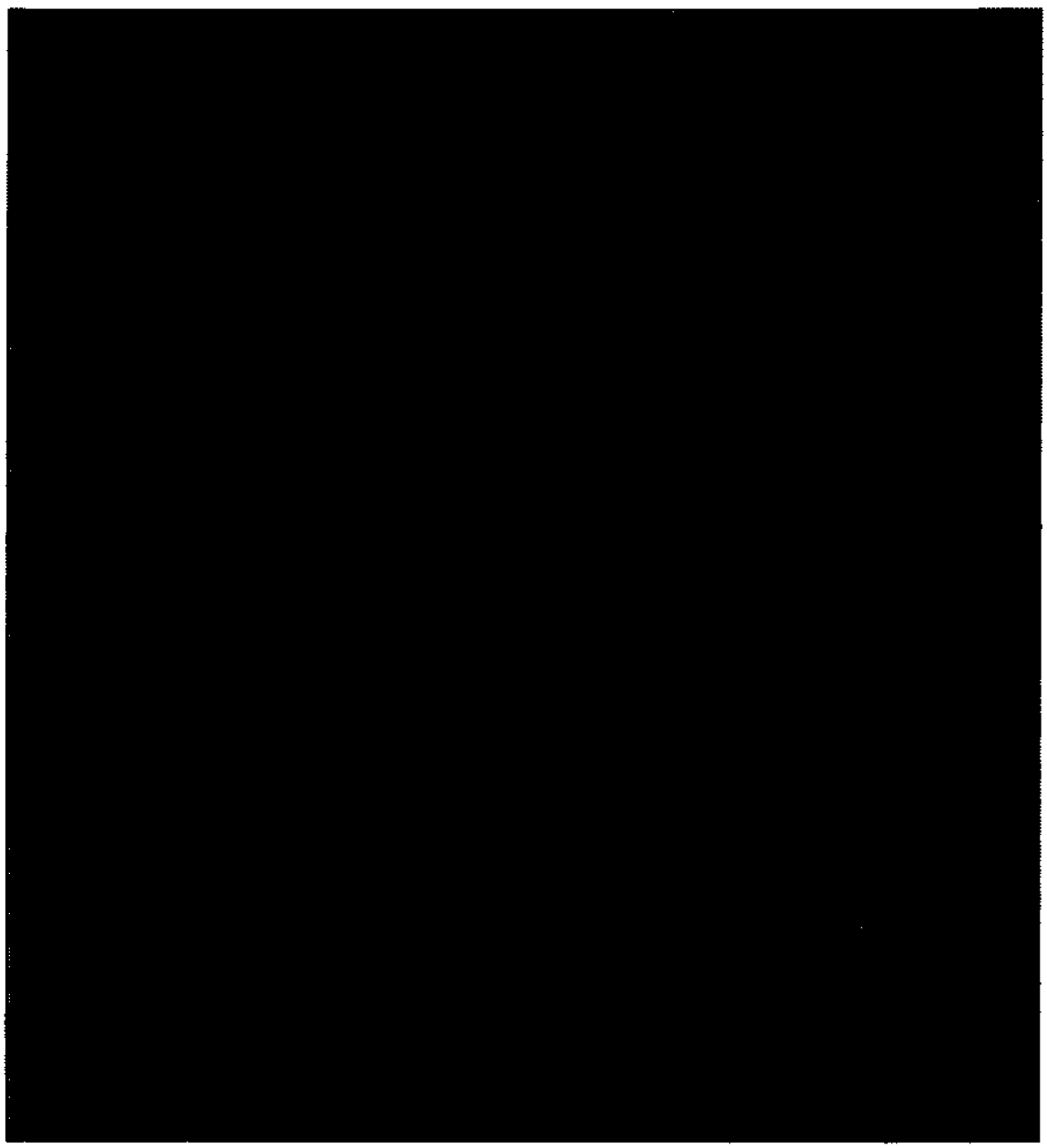
FIG. 83 is a diagram illustrating an example of the results of processing in a case wherein an erroneous direction has been employed to process an image.
Figure 84:
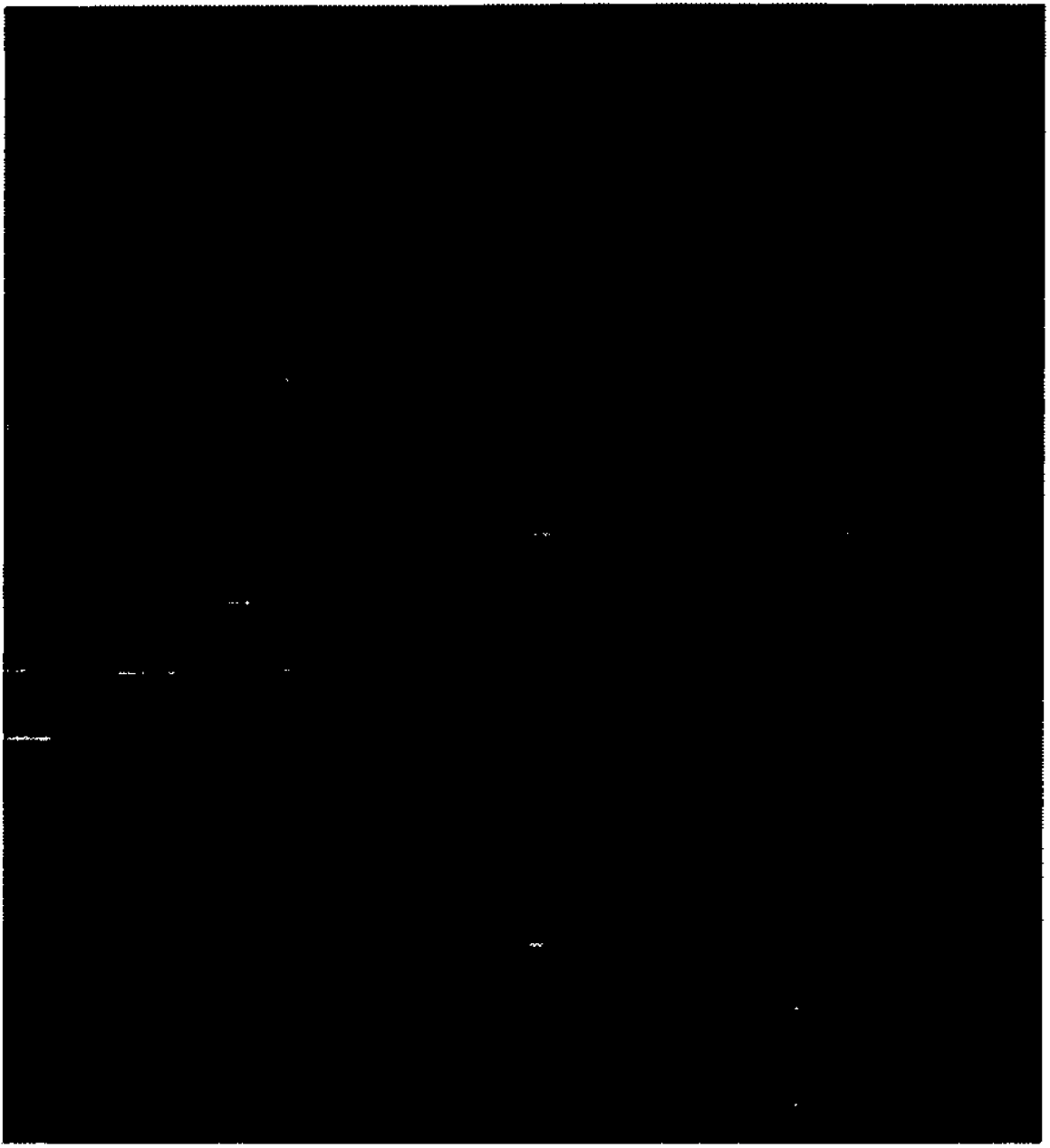
FIG. 84 is a diagram illustrating an example of the results of processing in a case wherein the correct continuity direction has been detected.

FIG. 82 through FIG. 84 are diagrams illustrating examples of the processing results.

FIG. 82 is a diagram illustrating an example of an input image. In FIG. 82, an image of fine lines which head toward of the upper right of the image is included.

In the event that image processing is performed using an erroneous direction without executing the processing for detecting the direction of continuity, the image of the fine line disappears, as shown in FIG. 83. In the case shown in FIG. 83, determination has been made that a fine line image heading to the upper left is included.

Conversely, as shown in FIG. 84, in the event of executing the processing for detecting the direction of continuity, the correct direction of continuity is detected, and the image of the fine lines is generated.

Figure 85:
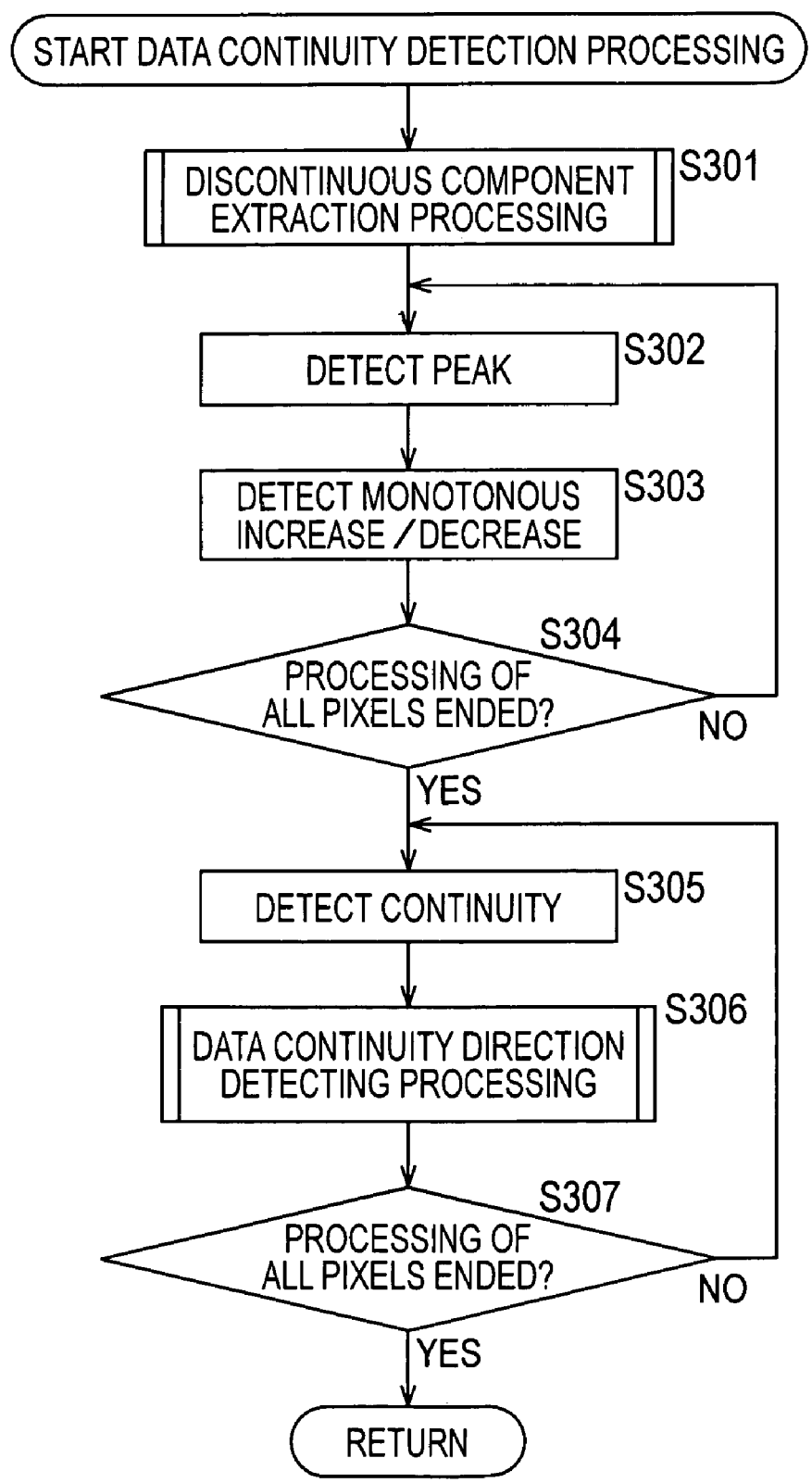
FIG. 85 is a flowchart for describing processing for detecting data continuity.

Next, the processing of detecting data continuity by the data continuity detecting unit 101 of which the configuration is shown in FIG. 72 will be described with reference to the flowchart in FIG. 85.

The processing of steps S301 through S305 is the same as the processing of step S201 through step S205 in FIG. 56, respectively, so description thereof will be omitted.

In step S306, the data continuity direction detecting unit 301 execute processing for detecting the direction of the data continuity. The details of the processing for detecting the direction of data continuity will be described later.

The processing in step S307 is the same as the processing in step S206 in FIG. 56, so description thereof will be omitted.

Figure 86:
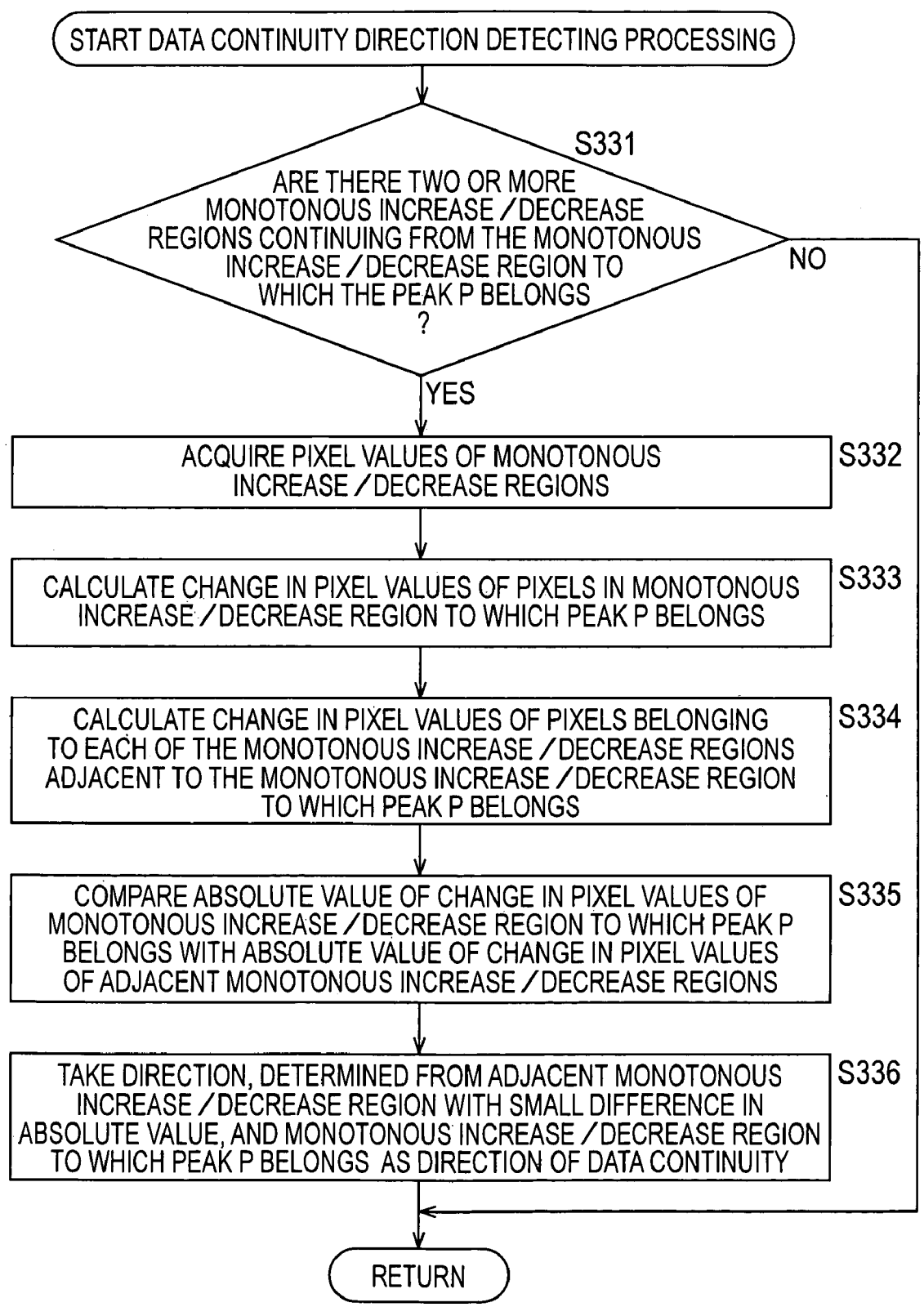
FIG. 86 is a flowchart for describing processing for detecting data continuity direction.

Next, the processing for detecting the direction of data continuity, corresponding to the professing in step S306, will be described, with reference to the flowchart in FIG. 86.

In step S331, the pixel value change detecting unit 321 of the data continuity direction detecting unit 301 determines whether or not there are two or more monotonous increase/decrease regions continuing from the monotonous increase/decrease region which is the fine line region to which the peak P belongs, based on the data continuity information supplied from the continuousness detecting unit 204, and in the even that determination has been made that there are two or more monotonous increase/decrease regions continuing from the monotonous increase/decrease region to which the peak P belongs, there is the need to detect the correct direction of continuity, so the flow proceeds to step S332, where the pixel value change detecting unit 321 obtains the pixel values of the monotonous increase/decrease regions.

In step S333, the pixel value change detecting unit 321 calculates the change in pixel values of the pixels in the fine monotonous increase/decrease region to which the peak P belongs. The pixel value change detecting unit 321 supplies the calculated change of pixel values of the pixels fine monotonous increase/decrease region to which the peak P belongs, to the direction detecting unit 322. For example, the pixel value change detecting unit 321 calculates the decrease in pixel values of the pixels in the fine monotonous increase/decrease region to which the peak P belongs, with the pixel value of the peak P as a reference.

In step S334, the pixel value change detecting unit 321 calculates the change in pixel values of the pixels of the monotonous increase/decrease region adjacent to the fine monotonous increase/decrease region to which the peak P belongs. The pixel value change detecting unit 321 supplies the calculated change in pixel values of the pixels of the monotonous increase/decrease region adjacent to the fine monotonous increase/decrease region to which the peak P belongs, to the direction detecting unit 322. For example, with regard to the pixels of the monotonous increase/decrease region adjacent to the fine monotonous increase/decrease region to which the peak P belongs, the pixel value change detecting unit 321 calculates the increase of pixel values of the pixels belonging to the adjacent monotonous increase/decrease region, with the pixel value of a pixel adjacent to the peak P as a reference.

In step S335, the direction detecting unit 322 compares the absolute value of change of the pixel values of the pixels in the fine monotonous increase/decrease region to which the peak P belongs, with the absolute value of change of the pixel values of the pixels in the monotonous increase/decrease region adjacent to the fine monotonous increase/decrease region to which the peak P belongs. For example, the direction detecting unit 322 compares the absolute value of decrease of the pixel values of the pixels in the fine monotonous increase/decrease region to which the peak P belongs based on the pixel value of the peak P, with the absolute value of increase of the pixel values of the pixels belonging to the monotonous increase/decrease region adjacent to the fine monotonous increase/decrease region to which the peak P belongs, with regard to the pixels of the adjacent monotonous increase/decrease region, based on the pixel value of the pixel adjacent to the peak P.

In step S336, the direction detecting unit 322 takes the direction determined from the adjacent monotonous increase/decrease region with a small difference in absolute value as compared in the processing in step S335, and the fine monotonous increase/decrease region to which the peak P belongs, as the direction of data continuity, and the processing ends. The direction detecting unit 332 outputs data continuity information including information indicating the region having data continuity, and the direction of the data continuity.

For example, the direction detecting unit 322 sets a vector having the peak P as the starting point thereof and the peak of the adjacent monotonous increase/decrease region having a small difference in absolute value as the ending point thereof, to the vector indicating the direction of continuity.

In step S331, in the event that determination has been made that two or more fine line regions continuing from the fine line region to which the peak P belongs do not exist, there is no need to detect the correct direction of continuity of data, so step S332 through step S336 are skipped, and the processing ends.

In this way, the data continuity detecting unit 101 of the configuration shown in FIG. 72 can detect the direction of data continuity, as well as detecting regions having data continuity.

Note that in the event that a plane is fit to the input image, the direction of data continuity can be detected, based on a value obtained by subtracting an approximation value approximated by the plane used for fitting, from the pixel values of the pixels of the input image (difference value).

Figure 87:
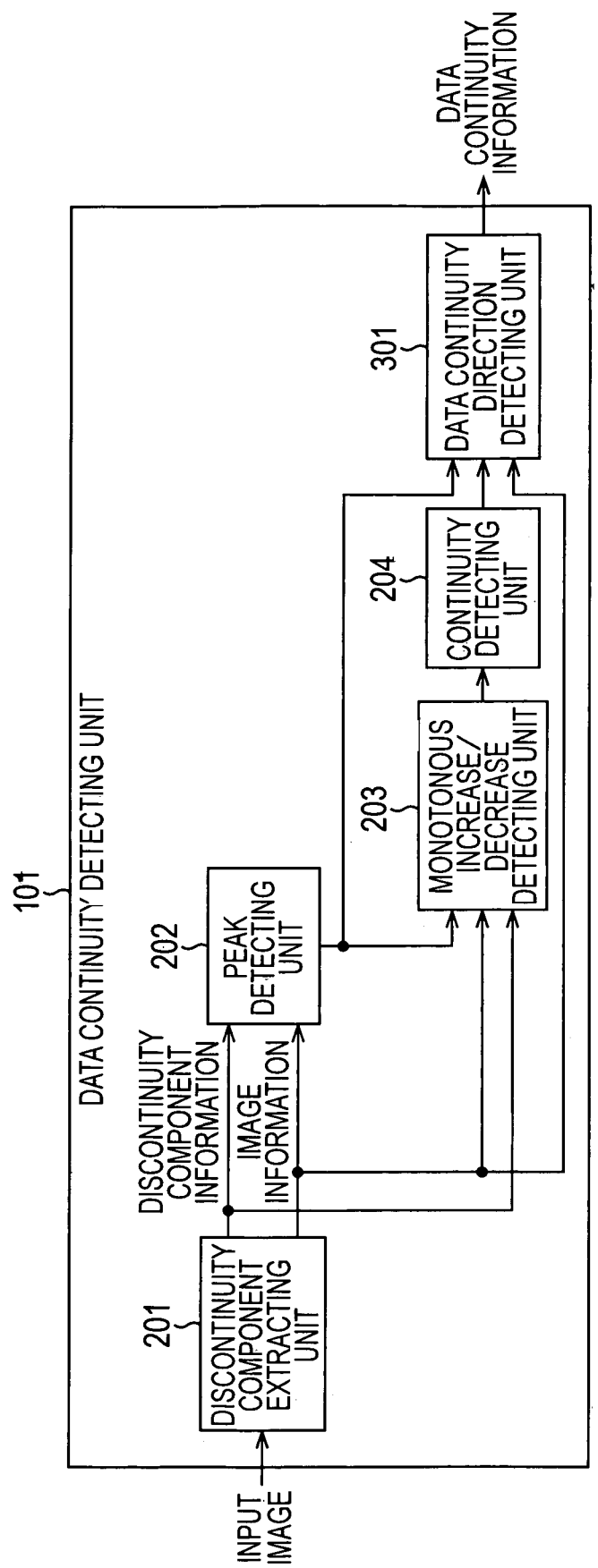
FIG. 87 is a block diagram illustrating another configuration of a continuity component detecting unit.

FIG. 87 is a block diagram illustrating the configuration of the data continuity detecting unit 101 for detecting the direction of data continuity, based on the difference values obtained by subtracting approximation values approximated by the plane used for fitting, from the pixel values of the pixels of the input image.

With the data continuity detecting unit 101 of the configuration shown in FIG. 87, the data continuity direction detecting unit 301 detects change in pixel values of a monotonous increase/decrease region, from the difference value obtained by subtracting approximation values approximated by the plane used for fitting from the pixel values of the pixels of the input image. The data continuity direction detecting unit 301 detects the direction of continuousness of the continuity region, based on the change in pixel values of the monotonous increase/decrease region detected from the difference value.

Thus, in a case of a discontinuity portion of pixel values of multiple pixels within image data wherein light signals of the actual world have been projected and a part of the continuity of the light signals of the real world has been lost, being detected, the peak of change of pixel values being detected from the discontinuity portion, monotonous increase/decrease regions wherein pixel values monotonously increase or decrease from the peak being detected, a monotonous increase/decrease region wherein another monotonous increase/decrease region of the detected monotonous increase/decrease regions is at a position adjacent on the screen being detected as a continuity region having image data continuity, and the direction of the continuousness of the continuity region being detected, the correct direction of continuousness of the continuity region can be detected.

Also, in a case of a discontinuity portion of pixel values of multiple pixels within image data wherein light signals of the actual world have been projected and a part of the continuity of the light signals of the real world has been lost, being detected, the peak of change of pixel values being detected from the discontinuity portion, monotonous increase/decrease regions wherein pixel values monotonously increase or decrease from the peak being detected, a monotonous increase/decrease region wherein another monotonous increase/decrease region of the detected monotonous increase/decrease regions is at a position adjacent on the screen being detected as a continuity region having image data continuity, and the direction of the continuousness of the continuity region being detected, based on the change of multiple of first pixel values situated within a first monotonous increase/decrease region of the detected monotonous increase/decrease regions, and the change of the pixel values of multiple second pixels adjacent to eth multiple first pixel values, situated within a second monotonous increase/decrease region adjacent to the first monotonous increase/decrease region, the correct direction of continuousness of the continuity region can be detected.

Next, description will be made regarding estimation of signals in the actual world 1.

Figure 88:
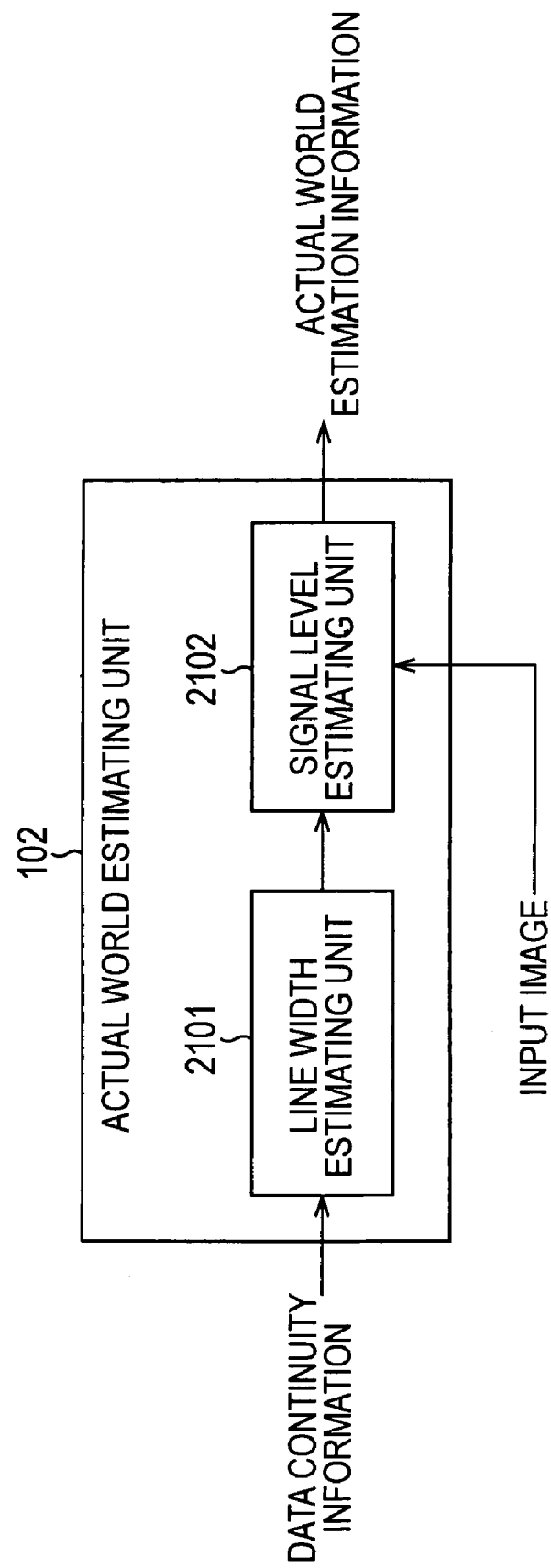
FIG. 88 is a block diagram illustrating the configuration of an actual world estimating unit.

FIG. 88 is a block diagram illustrating the configuration of the actual world estimating unit 102.

With the actual world estimating unit 102 of which the configuration is shown in FIG. 88, based on the input image and the data continuity information supplied from the continuity detecting unit 101, the width of a fine line in the image, which is a signal in the actual world 1, is detected, and the level of the fine line (light intensity of the signal in the actual world 1) is estimated.

A line-width detecting unit 2101 detects the width of a fine line based on the data continuity information indicating a continuity region serving as a fine-line region made up of pixels, on which the fine-line image is projected, supplied from the continuity detecting unit 101. The line-width detecting unit 2101 supplies fine-line width information indicating the width of a fine line detected to a signal-level estimating unit 2102 along with the data continuity information.

The signal-level estimating unit 2102 estimates, based on the input image, the fine-line width information indicating the width of a fine line, which is supplied from the line-width detecting unit 2101, and the data continuity information, the level of the fine-line image serving as the signals in the actual world 1, i.e., the level of light intensity, and outputs actual world estimating information indicating the width of a fine line and the level of the fine-line image.

Figure 89:
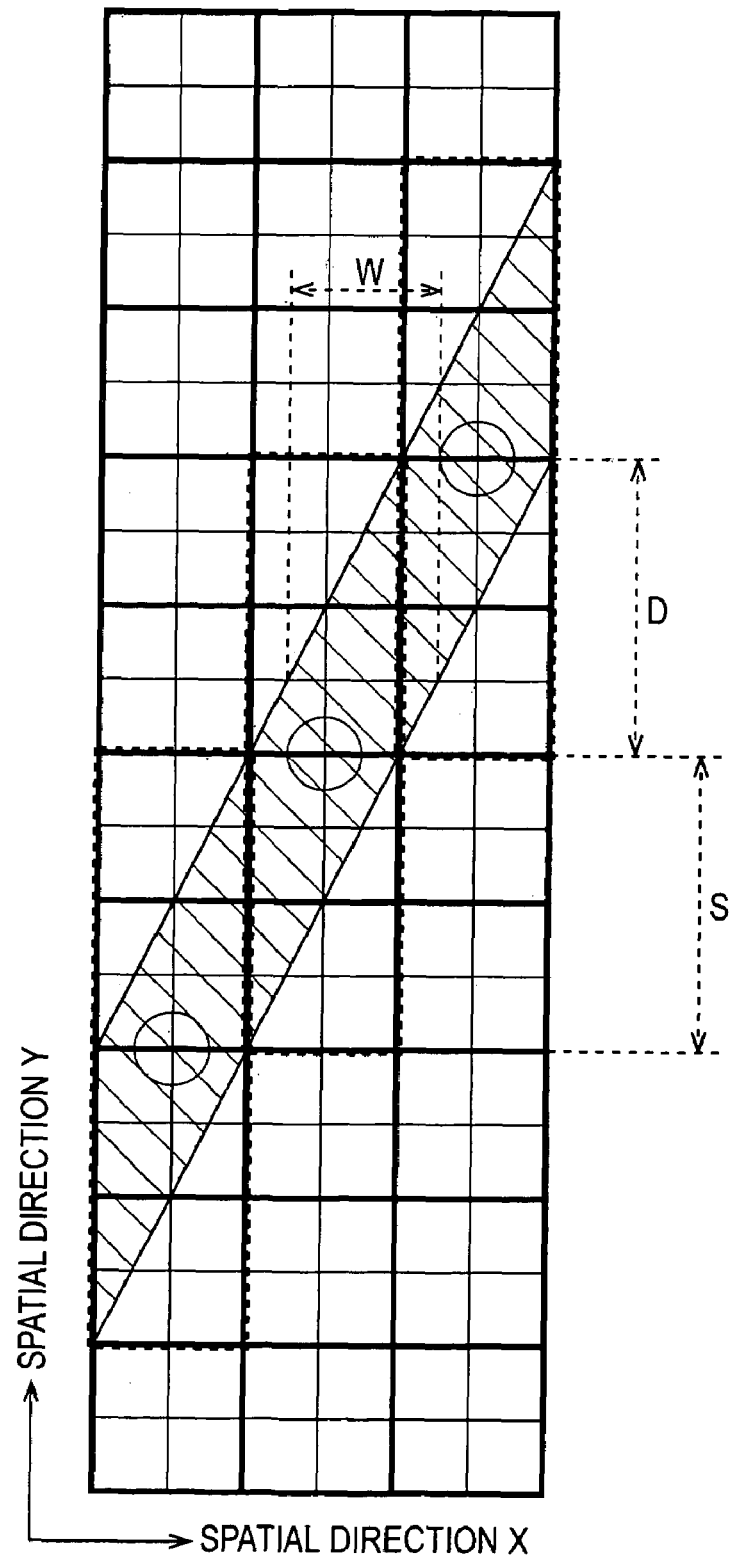
FIG. 89 is a diagram for describing the processing for detecting the width of a fine line in actual world signals.
Figure 90:
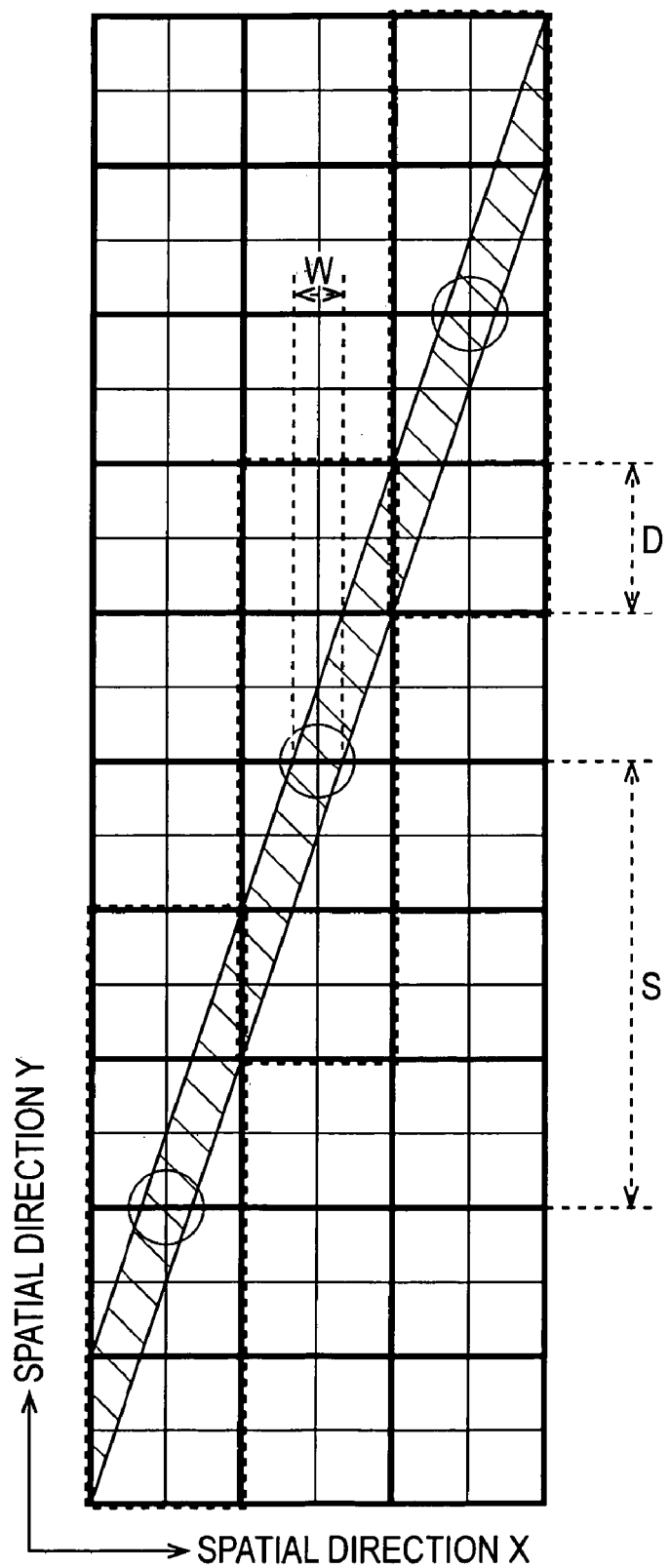
FIG. 90 is a diagram for describing the processing for detecting the width of a fine line in actual world signals.

FIG. 89 and FIG. 90 are diagrams for describing processing for detecting the width of a fine line in signals in the actual world 1.

In FIG. 89 and FIG. 90, a region surrounded with a thick line (region made up of four squares) denotes one pixel, a region surrounded with a dashed line denotes a fine-line region made up of pixels on which a fine-line image is projected, and a circle denotes the gravity of a fine-line region. In FIG. 89 and FIG. 90, a hatched line denotes a fine-line image cast in the sensor 2. In other words, it can be said that this hatched line denotes a region where a fine-line image in the actual world 1 is projected on the sensor 2.

In FIG. 89 and FIG. 90, S denotes a gradient to be calculated from the gravity position of a fine-line region, and D is the duplication of fine-line regions. Here, fine-line regions are adjacent to each other, so the gradient S is a distance between the gravities thereof in increments of pixel. Also, the duplication D of fine-line regions denotes the number of pixels adjacent to each other in two fine-line regions.

In FIG. 89 and FIG. 90, W denotes the width of a fine line.

In FIG. 89, the gradient S is 2, and the duplication D is 2.

In FIG. 90, the gradient S is 3, and the duplication D is 1.

The fine-line regions are adjacent to each other, and the distance between the gravities thereof in the direction where the fine-line regions are adjacent to each other is one pixel, so W:D=1:S holds, the fine-line width W can be obtained by the duplication D/gradient S.

For example, as shown in FIG. 89, when the gradient S is 2, and the duplication D is 2, 2/2 is 1, so the fine-line width W is 1. Also, for example, as shown in FIG. 90, when the gradient S is 3, and the duplication D is 1, the fine-line width W is 1/3.

The line-width detecting unit 2101 thus detects the width of a fine-line based on the gradient calculated from the gravity positions of fine-line regions, and duplication of fine-line regions.

Figure 91:
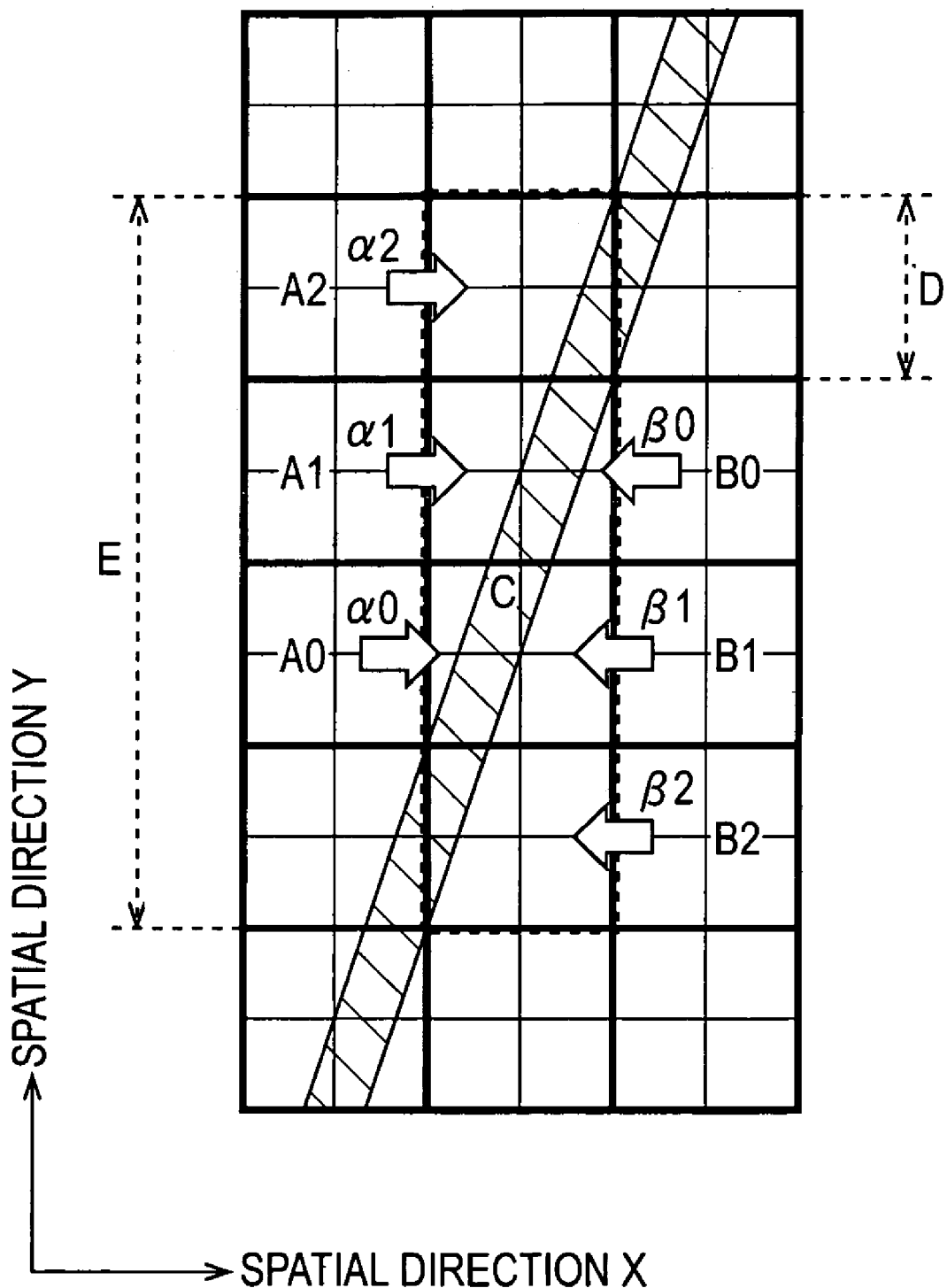
FIG. 91 is a diagram for describing the processing for estimating the level of signals of a fine line in actual world signals.

FIG. 91 is a diagram for describing the processing for estimating the level of a fine-line signal in signals in the actual world 1.

In FIG. 91, a region surrounded with a thick line (region made up of four squares) denotes one pixel, a region surrounded with a dashed line denotes a fine-line region made up of pixels on which a fine-line image is projected. In FIG. 91, E denotes the length of a fine-line region in increments of a pixel in a fine-line region, and D is duplication of fine-line regions (the number of pixels adjacent to another fine-line region).

The level of a fine-line signal is approximated when the level is constant within processing increments (fine-line region), and the level of an image other than a fine line wherein a fine line is projected on the pixel value of a pixel is approximated when the level is equal to a level corresponding to the pixel value of the adjacent pixel.

With the level of a fine-line signal as C, let us say that with a signal (image) projected on the fine-line region, the level of the left side portion of a portion where the fine-line signal is projected is A in the drawing, and the level of the right side portion of the portion where the fine-line signal is projected is B in the drawing.

At this time, Expression (27) holds.

$$\text{Sum of pixel values of a fine-line region} = (E-D)/2 \times A + (E-D)/2 \times B + D \times C \quad (27)$$

The width of a fine line is constant, and the width of a fine-line region is one pixel, so the area of (the portion where the signal is projected of) a fine line in a fine-line region is equal to the duplication D of fine-line regions. The width of a fine-line region is one pixel, so the area of a fine-line region in increments of a pixel in a fine-line region is equal to the length E of a fine-line region.

Of a fine-line region, the area on the left side of a fine line is (E−D)/2. Of a fine-line region, the area on the right side of a fine line is (E−D)/2.

The first term of the right side of Expression (27) is the portion of the pixel value where the signal having the same level as that in the signal projected on a pixel adjacent to the left side is projected, and can be represented with Expression (28).

$$A = \Sigma \alpha_i \times A_i = \Sigma 1/(E-D) \times (i+0.5) \times A_i \quad (28)$$

In Expression (28), $A_i$ denotes the pixel value of a pixel adjacent to the left side.

In Expression (28), $\alpha i$ denotes the proportion of the area where the signal having the same level as that in the signal projected on a pixel adjacent to the left side is projected on the pixel of the fine-line region. In other words, $\alpha_i$ denotes the proportion of the same pixel value as that of a pixel adjacent to the left side, which is included in the pixel value of the pixel in the fine-line region.

i represents the position of a pixel adjacent to the left side of the fine-line region.

For example, in FIG. 91, the proportion of the same pixel value as the pixel value $A_0$ of a pixel adjacent to the left side of the fine-line region, which is included in the pixel value of the pixel in the fine-line region, is $\alpha_0$. In FIG. 91, the proportion of the same pixel value as the pixel value $A_1$ of a pixel adjacent to the left side of the fine-line region, which is included in the pixel value of the pixel in the fine-line region, is $\alpha_1$. In FIG. 91, the proportion of the same pixel value as the pixel value $A_2$ of a pixel adjacent to the left side of the fine-line region, which is included in the pixel value of the pixel in the fine-line region, is $\alpha_2$.

The second term of the right side of Expression (27) is the portion of the pixel value where the signal having the same level as that in the signal projected on a pixel adjacent to the right side is projected, and can be represented with Expression (29).

$$B = \Sigma \beta_j \times B_j = \Sigma 1/(E-D) \times (j+0.5) \times B_j \quad (29)$$

In Expression (29), $B_j$ denotes the pixel value of a pixel adjacent to the right side.

In Expression (29), $\beta_j$ denotes the proportion of the area where the signal having the same level as that in the signal projected on a pixel adjacent to the right side is projected on the pixel of the fine-line region. In other words, $\beta_j$ denotes the proportion of the same pixel value as that of a pixel adjacent to the right side, which is included in the pixel value of the pixel in the fine-line region.

j denotes the position of a pixel adjacent to the right side of the fine-line region.

For example, in FIG. 91, the proportion of the same pixel value as the pixel value $B_0$ of a pixel adjacent to the right side of the fine-line region, which is included in the pixel value of the pixel in the fine-line region, is $\beta_0$. In FIG. 91, the proportion of the same pixel value as the pixel value $B_1$ of a pixel adjacent to the right side of the fine-line region, which is included in the pixel value of the pixel in the fine-line region, is $\beta_1$. In FIG. 91, the proportion of the same pixel value as the pixel value $B_2$ of a pixel adjacent to the right side of the fine-line region, which is included in the pixel value of the pixel in the fine-line region, is $\beta_2$.

Thus, the signal level estimating unit 2102 obtains the pixel values of the image including a fine line alone, of the pixel values included in a fine-line region, by calculating the pixel values of the image other than a fine line, of the pixel values included in the fine-line region, based on Expression (28) and Expression (29), and removing the pixel values of the image other than the fine line from the pixel values in the fine-line region based on Expression (27). Subsequently, the signal level estimating unit 2102 obtains the level of the fine-line signal based on the pixel values of the image including the fine line alone and the area of the fine line. More specifically, the signal level estimating unit 2102 calculates the level of the fine line signal by dividing the pixel values of the image including the fine line alone, of the pixel values included in the fine-line region, by the area of the fine line in the fine-line region, i.e., the duplication D of the fine-line regions.

The signal level estimating unit 2102 outputs actual world estimating information indicating the width of a fine line, and the signal level of a fine line, in a signal in the actual world 1.

With the technique of the present invention, the waveform of a fine line is geometrically described instead of pixels, so any resolution can be employed.

Figure 92:
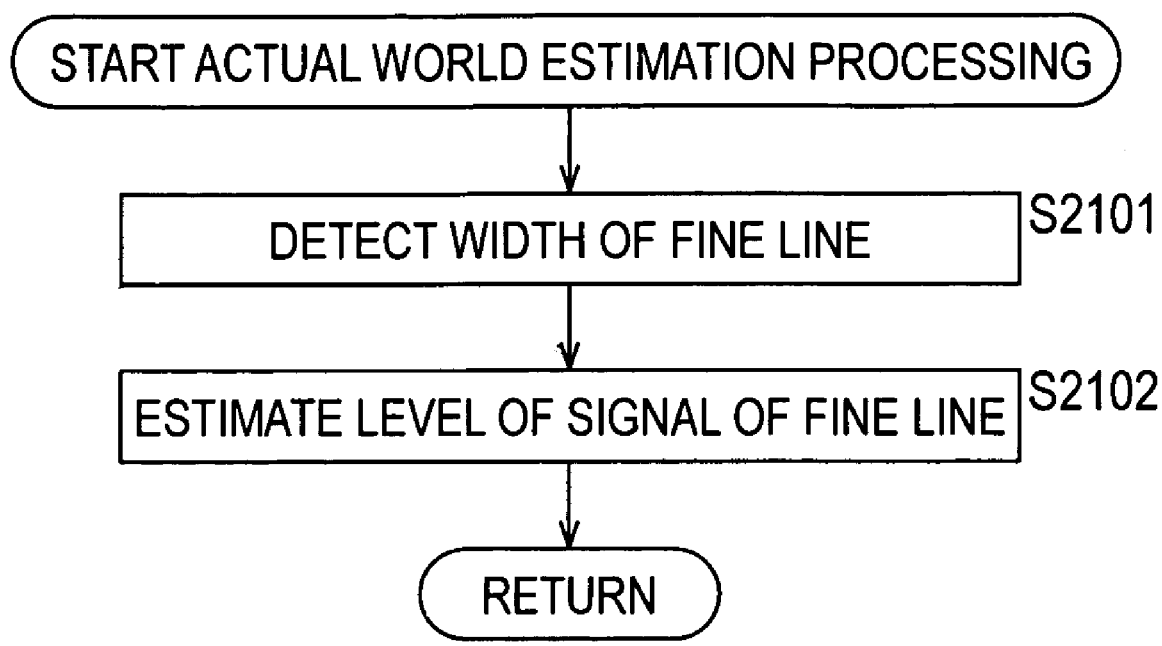
FIG. 92 is a flowchart for describing processing for estimating the actual world.

Next, description will be made regarding actual world estimating processing corresponding to the processing in step S102 with reference to the flowchart in FIG. 92.

In step S2101, the line-width detecting unit 2101 detects the width of a fine line based on the data continuity information. For example, the line-width detecting unit 2101 estimates the width of a fine line in a signal in the actual world 1 by dividing duplication of fine-line regions by a gradient calculated from the gravity positions in fine-line regions.

In step S2102, the signal level estimating unit 2102 estimates the signal level of a fine line based on the width of a fine line, and the pixel value of a pixel adjacent to a fine-line region, outputs actual world estimating information indicating the width of the fine line and the signal level of the fine line, which are estimated, and the processing ends. For example, the signal level estimating unit 2102 obtains pixel values on which the image including a fine line alone is projected by calculating pixel values on which the image other than the fine line included in a fine-line region is projected, and removing the pixel values on which the image other than the fine line from the fine-line region is projected, and estimates the level of the fine line in a signal in the actual world 1 by calculating the signal level of the fine line based on the obtained pixel values on which the image including the fine line alone is projected, and the area of the fine line.

Thus, the actual world estimating unit 102 can estimate the width and level of a fine line of a signal in the actual world 1.

As described above, a light signal in the real world is projected, continuity of data regarding first image data wherein part of continuity of a light signal in the real world drops, is detected, the waveform of the light signal in the real world is estimated from the continuity of the first image data based on a model representing the waveform of the light signal in the real world corresponding to the continuity of data, and in the event that the estimated light signal is converted into second image data, a more accurate higher-precision processing result can be obtained as to the light signal in the real world.

Figure 93:
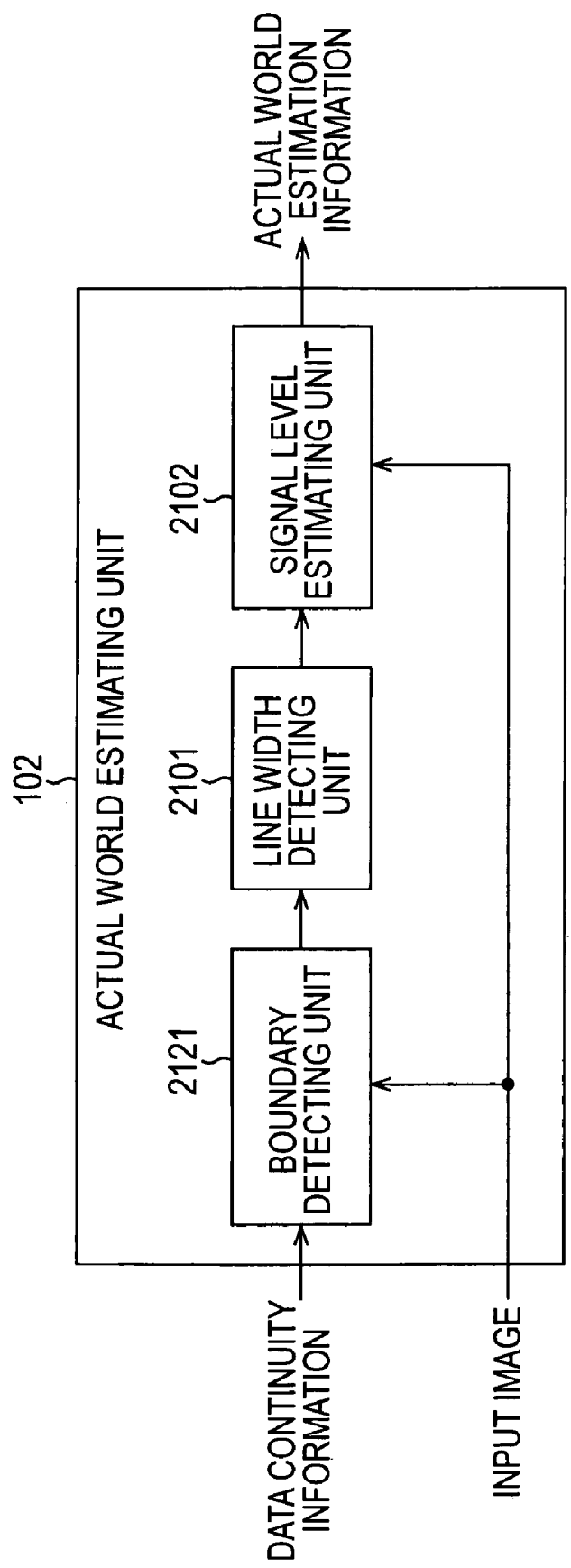
FIG. 93 is a block diagram illustrating another configuration of the actual world estimating unit.

FIG. 93 is a block diagram illustrating another configuration of the actual world estimating unit 102.

With the actual world estimating unit 102 of which the configuration is illustrated in FIG. 93, a region is detected again based on an input image and the data continuity information supplied from the data continuity detecting unit 101, the width of a fine line in the image serving as a signal in the actual world 1 is detected based on the region detected again, and the light intensity (level) of the signal in the actual world 1 is estimated. For example, with the actual world estimating unit 102 of which the configuration is illustrated in FIG. 93, a continuity region made up of pixels on which a fine-line image is projected is detected again, the width of a fine line in an image serving as a signal in the actual world 1 is detected based on the region detected again, and the light intensity of the signal in the actual world 1 is estimated.

The data continuity information, which is supplied from the data continuity detecting unit 101, input to the actual world estimating unit 102 of which configuration is shown in FIG. 93, includes non-continuity component information indicating non-components other than continuity components on which a fine-line image is projected, of input images serving as the data 3, monotonous increase/decrease region information indicating a monotonous increase/decrease region of continuity regions, information indicating a continuity region, and the like. For example, non-continuity component information included in the data continuity information is made up of the gradient of a plane and intercept which approximate non-continuity components such as a background in an input image.

The data continuity information input to the actual world estimating unit 102 is supplied to a boundary detecting unit 2121. The input image input to the actual world estimating unit 102 is supplied to the boundary detecting unit 2121 and signal level estimating unit 2102.

The boundary detecting unit 2121 generates an image made up of continuity components alone on which a fine-line image is projected from the non-continuity component information included in the data continuity information, and the input image, calculates an allocation ratio indicating a proportion wherein a fine-line image serving as a signal in the actual world 1 is projected, and detects a fine-line region serving as a continuity region again by calculating a regression line indicating the boundary of the fine-line region from the calculated allocation ratio.

Figure 94:
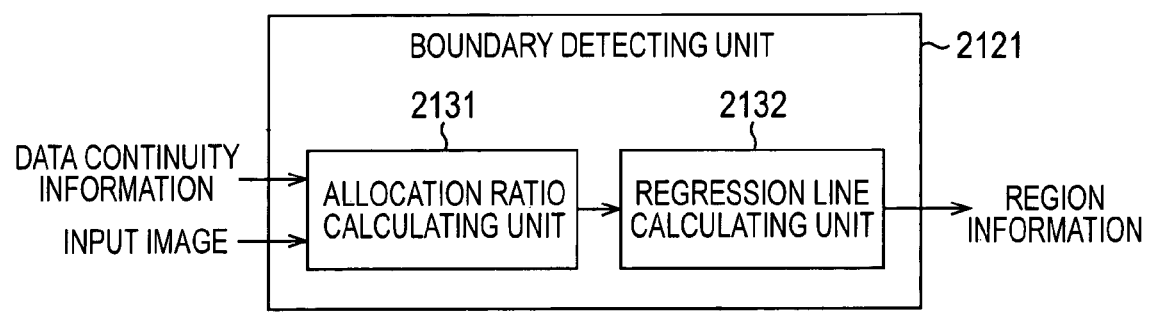
FIG. 94 is a block diagram illustrating the configuration of a boundary detecting unit.

FIG. 94 is a block diagram illustrating the configuration of the boundary detecting unit 2121.

An allocation-ratio calculation unit 2131 generates an image made up of continuity components alone on which a fine-line image is projected from the data continuity information, the non-continuity component information included in the data continuity information, and an input image. More specifically, the allocation-ratio calculation unit 2131 detects adjacent monotonous increase/decrease regions of the continuity region from the input image based on the monotonous increase/decrease region information included in the data continuity information, and generates an image made up of continuity components alone on which a fine-line image is projected by subtracting an approximate value to be approximated at a plane indicated with a gradient and intercept included in the continuity component information from the pixel value of a pixel belonged to the detected monotonous increase/decrease region.

Note that the allocation-ratio calculation unit 2131 may generate an image made up of continuity components alone on which a fine-line image is projected by subtracting an approximate value to be approximated at a plane indicated with a gradient and intercept included in the continuity component information from the pixel value of a pixel in the input image.

The allocation-ratio calculation unit 2131 calculates an allocation ratio indicating proportion wherein a fine-line image serving as a signal in the actual world 1 is allocated into two pixels belonged to adjacent monotonous increase/decrease regions within a continuity region based on the generated image made up of the continuity components alone. The allocation-ratio calculation unit 2131 supplies the calculated allocation ratio to a regression-line calculation unit 2132.

Description will be made regarding allocation-ratio calculation processing in the allocation-ratio calculation unit 2131 with reference to FIG. 95 through FIG. 97.

The numeric values in two columns on the left side in FIG. 95 denote the pixel values of pixels vertically arrayed in two columns of an image calculated by subtracting approximate values to be approximated at a plane indicated with a gradient and intercept included in the continuity component information from the pixel values of an input image. Two regions surrounded with a square on the left side in FIG. 95 denote a monotonous increase/decrease region 2141-1 and monotonous increase/decrease region 2141-2, which are two adjacent monotonous increase/decrease regions. In other words, the numeric values shown in the monotonous increase/decrease region 2141-1 and monotonous increase/decrease region 2141-2 denote the pixel values of pixels belonged to a monotonous increase/decrease region serving as a continuity region, which is detected by the data continuity detecting unit 101.

The numeric values in one column on the right side in FIG. 95 denote values obtained by adding the pixel values of the pixels horizontally arrayed, of the pixel values of the pixels in two columns on the left side in FIG. 95. In other words, the numeric values in one column on the right side in FIG. 95 denote values obtained by adding the pixel values on which a fine-line image is projected for each pixel horizontally adjacent regarding the two monotonous increase/decrease regions made up of pixels in one column vertically arrayed.

For example, when belonging to any one of the monotonous increase/decrease region 2141-1 and monotonous increase/decrease region 2141-2, which are made up of the pixels in one column vertically arrayed respectively, and the pixel values of the pixels horizontally adjacent are 2 and 58, the value added is 60. When belonging to any one of the monotonous increase/decrease region 2141-1 and monotonous increase/decrease region 2141-2, which are made up of the pixels in one column vertically arrayed respectively, and the pixel values of the pixels horizontally adjacent are 1 and 65, the value added is 66.

It can be understood that the numeric values in one column on the right side in FIG. 95, i.e., the values obtained by adding the pixel values on which a fine-line image is projected regarding the pixels adjacent in the horizontal direction of the two adjacent monotonous increase/decrease regions made up of the pixels in one column vertically arrayed, are generally constant.

Similarly, the values obtained by adding the pixel values on which a fine-line image is projected regarding the pixels adjacent in the vertical direction of the two adjacent monotonous increase/decrease regions made up of the pixels in one column horizontally arrayed, are generally constant.

The allocation-ratio calculation unit 2131 calculates how a fine-line image is allocated on the pixel values of the pixels in one column by utilizing characteristics that the values obtained by adding the pixel values on which the fine-line image is projected regarding the adjacent pixels of the two adjacent monotonous increase/decrease regions, are generally constant.

As shown in FIG. 96, the allocation-ratio calculation unit 2131 calculates an allocation ratio regarding each pixel belonged to the two adjacent monotonous increase/decrease regions by dividing the pixel value of each pixel belonged to the two adjacent monotonous increase/decrease regions made up of pixels in one column vertically arrayed by the value obtained by adding the pixel values on which a fine-line image is projected for each pixel horizontally adjacent. However, in the event that the calculated result, i.e., the calculated allocation ratio exceeds 100, the allocation ratio is set to 100.

For example, as shown in FIG. 96, when the pixel values of pixels horizontally adjacent, which are belonged to two adjacent monotonous increase/decrease regions made up of pixels in one column vertically arrayed, are 2 and 58 respectively, the value added is 60, and accordingly, allocation ratios 3.5 and 96.5 are calculated as to the corresponding pixels respectively. When the pixel values of pixels horizontally adjacent, which are belonged to two adjacent monotonous increase/decrease regions made up of pixels in one column vertically arrayed, are 1 and 65 respectively, the value added is 65, and accordingly, allocation ratios 1.5 and 98.5 are calculated as to the corresponding pixels respectively.

Figure 97:
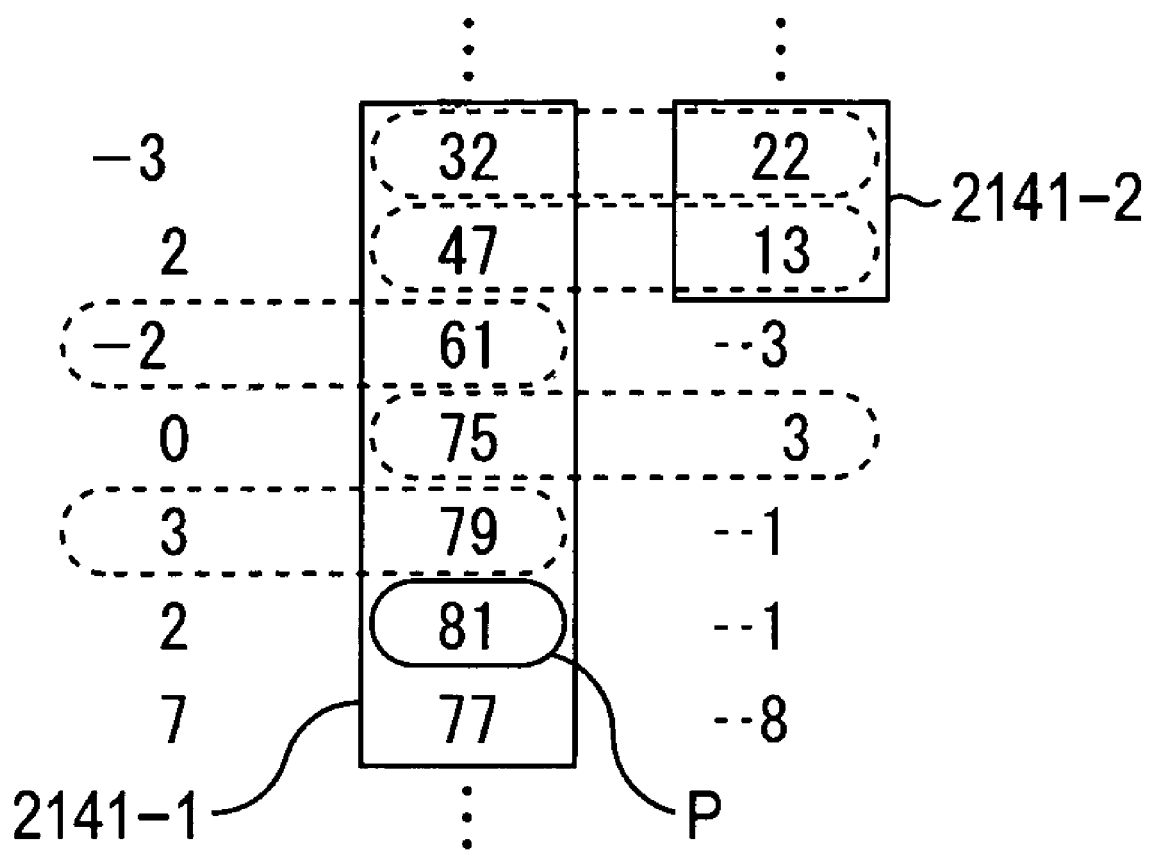
FIG. 97 is a diagram for describing the processing for calculating allocation ratio.

In this case, in the event that three monotonous increase/decrease regions are adjacent, regarding which column is first calculated, of two values obtained by adding the pixel values on which a fine-line image is projected for each pixel horizontally adjacent, an allocation ratio is calculated based on a value closer to the pixel value of the peak P, as shown in FIG. 97.

For example, when the pixel value of the peak P is 81, and the pixel value of a pixel of interest belonged to a monotonous increase/decrease region is 79, in the event that the pixel value of a pixel adjacent to the left side is 3, and the pixel value of a pixel adjacent to the right side is −1, the value obtained by adding the pixel value adjacent to the left side is 82, and the value obtained by adding the pixel value adjacent to the right side is 78, and consequently, 82 which is closer to the pixel value 81 of the peak P is selected, so an allocation ratio is calculated based on the pixel adjacent to the left side. Similarly, when the pixel value of the peak P is 81, and the pixel value of a pixel of interest belonged to the monotonous increase/decrease region is 75, in the event that the pixel value of a pixel adjacent to the left side is 0, and the pixel value of a pixel adjacent to the right side is 3, the value obtained by adding the pixel value adjacent to the left side is 75, and the value obtained by adding the pixel value adjacent to the right side is 78, and consequently, 78 which is closer to the pixel value 81 of the peak P is selected, so an allocation ratio is calculated based on the pixel adjacent to the right side.

Thus, the allocation-ratio calculation unit 2131 calculates an allocation ratio regarding a monotonous increase/decrease region made up of pixels in one column vertically arrayed.

With the same processing, the allocation-ratio calculation unit 2131 calculates an allocation ratio regarding a monotonous increase/decrease region made up of pixels in one column horizontally arrayed.

The regression-line calculation unit 2132 assumes that the boundary of a monotonous increase/decrease region is a straight line, and detects the monotonous increase/decrease region within the continuity region again by calculating a regression line indicating the boundary of the monotonous increase/decrease region based on the calculated allocation ratio by the allocation-ratio calculation unit 2131.

Description will be made regarding processing for calculating a regression line indicating the boundary of a monotonous increase/decrease region in the regression-line calculation unit 2132 with reference to FIG. 98 and FIG. 99.

Figure 98:
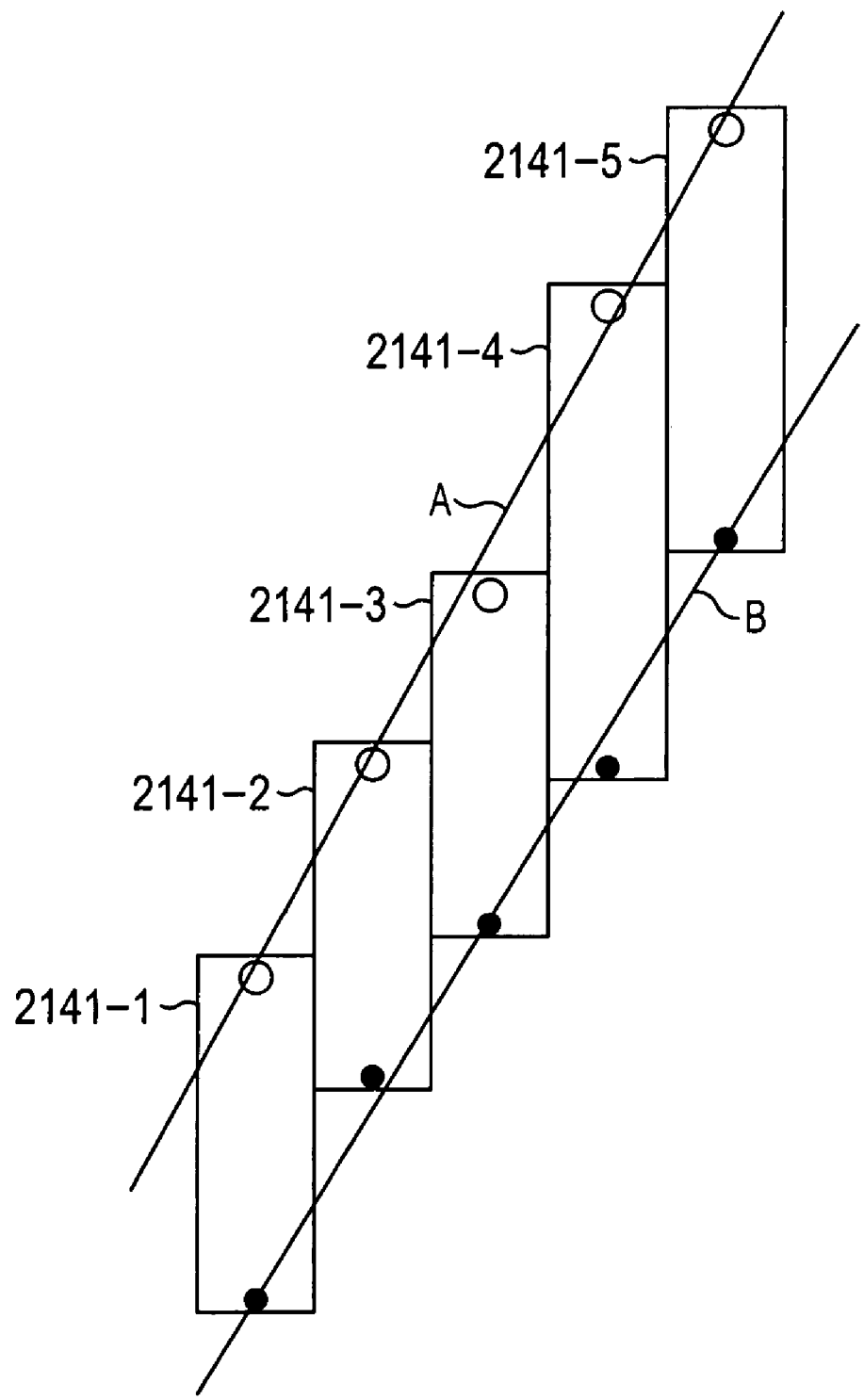
FIG. 98 is a diagram for describing the process for calculating a regression line indicating the boundary of monotonous increase/decrease regions.

In FIG. 98, a white circle denotes a pixel positioned in the boundary on the upper side of the monotonous increase/decrease region 2141-1 through the monotonous increase/decrease region 2141-5. The regression-line calculation unit 2132 calculates a regression line regarding the boundary on the upper side of the monotonous increase/decrease region 2141-1 through the monotonous increase/decrease region 2141-5 using the regression processing. For example, the regression-line calculation unit 2132 calculates a straight line A wherein the sum of squares of the distances with the pixels positioned in the boundary on the upper side of the monotonous increase/decrease region 2141-1 through the monotonous increase/decrease region 2141-5 becomes the minimum value.

Also, in FIG. 98, a black circle denotes a pixel positioned in the boundary on the lower side of the monotonous increase/ decrease region 2141-1 through the monotonous increase/decrease region 2141-5. The regression-line calculation unit 2132 calculates a regression line regarding the boundary on the lower side of the monotonous increase/decrease region 2141-1 through the monotonous increase/decrease region 2141-5 using the regression processing. For example, the regression-line calculation unit 2132 calculates a straight line B wherein the sum of squares of the distances with the pixels positioned in the boundary on the lower side of the monotonous increase/decrease region 2141-1 through the monotonous increase/decrease region 2141-5 becomes the minimum value.

The regression-line calculation unit 2132 detects the monotonous increase/decrease region within the continuity region again by determining the boundary of the monotonous increase/decrease region based on the calculated regression line.

Figure 99:
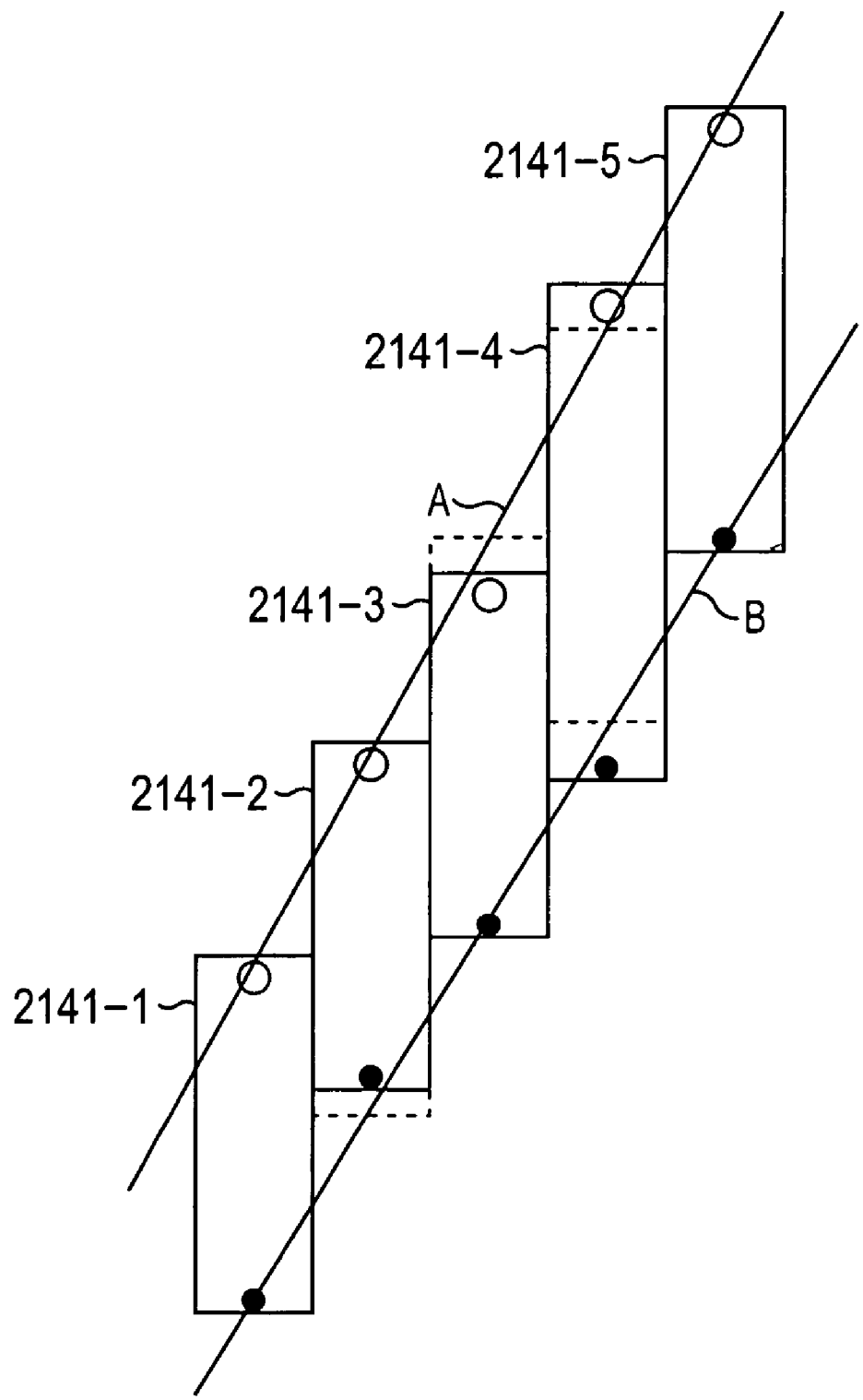
FIG. 99 is a diagram for describing the process for calculating a regression line indicating the boundary of monotonous increase/decrease regions.

As shown in FIG. 99, the regression-line calculation unit 2132 determines the boundary on the upper side of the monotonous increase/decrease region 2141-1 through the monotonous increase/decrease region 2141-5 based on the calculated straight line A. For example, the regression-line calculation unit 2132 determines the boundary on the upper side from the pixel closest to the calculated straight line A regarding each of the monotonous increase/decrease region 2141-1 through the monotonous increase/decrease region 2141-5. For example, the regression-line calculation unit 2132 determines the boundary on the upper side such that the pixel closest to the calculated straight line A is included in each region regarding each of the monotonous increase/decrease region 2141-1 through the monotonous increase/decrease region 2141-5.

As shown in FIG. 99, the regression-line calculation unit 2132 determines the boundary on the lower side of the monotonous increase/decrease region 2141-1 through the monotonous increase/decrease region 2141-5 based on the calculated straight line B. For example, the regression-line calculation unit 2132 determines the boundary on the lower side from the pixel closest to the calculated straight line B regarding each of the monotonous increase/decrease region 2141-1 through the monotonous increase/decrease region 2141-5. For example, the regression-line calculation unit 2132 determines the boundary on the upper side such that the pixel closest to the calculated straight line B is included in each region regarding each of the monotonous increase/decrease region 2141-1 through the monotonous increase/decrease region 2141-5.

Thus, the regression-line calculation unit 2132 detects a region wherein the pixel value monotonously increases or decreases from the peak again based on a regression line for recurring the boundary of the continuity region detected by the data continuity detecting unit 101. In other words, the regression-line calculation unit 2132 detects a region serving as the monotonous increase/decrease region within the continuity region again by determining the boundary of the monotonous increase/decrease region based on the calculated regression line, and supplies region information indicating the detected region to the line-width detecting unit 2101.

As described above, the boundary detecting unit 2121 calculates an allocation ratio indicating proportion wherein a fine-line image serving as a signal in the actual world 1 is projected on pixels, and detects the monotonous increase/decrease region within the continuity region again by calculating a regression line indicating the boundary of the monotonous increase/decrease region from the calculated allocation ratio. Thus, a more accurate monotonous increase/decrease region can be detected.

The line-width detecting unit 2101 shown in FIG. 93 detects the width of a fine line in the same processing as the case shown in FIG. 88 based on the region information indicating the region detected again, which is supplied from the boundary detecting unit 2121. The line-width detecting unit 2101 supplies fine-line width information indicating the width of a fine line detected to the signal level estimating unit 2102 along with the data continuity information.

The processing of the signal level estimating unit 2102 shown in FIG. 93 is the same processing as the case shown in FIG. 88, so the description thereof is omitted.

Figure 100:
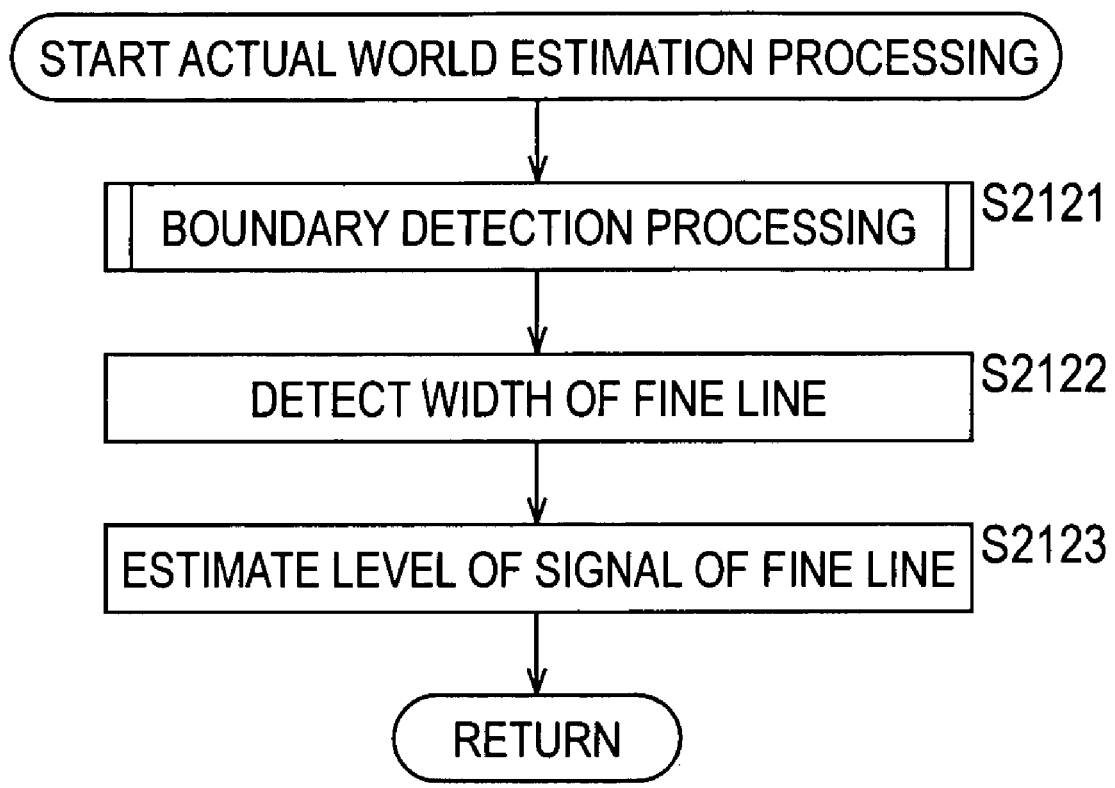
FIG. 100 is a flowchart for describing processing for estimating the actual world.

FIG. 100 is a flowchart for describing actual world estimating processing using the actual world estimating unit 102 of which configuration is shown in FIG. 93, which corresponds to the processing in step S102.

In step S2121, the boundary detecting unit 2121 executes boundary detecting processing for detecting a region again based on the pixel value of a pixel belonged to the continuity region detected by the data continuity detecting unit 101. The details of the boundary detecting processing will be described later.

The processing in step S2122 and step S2123 is the same as the processing in step S2101 and step S2102, so the description thereof is omitted.

Figure 101:
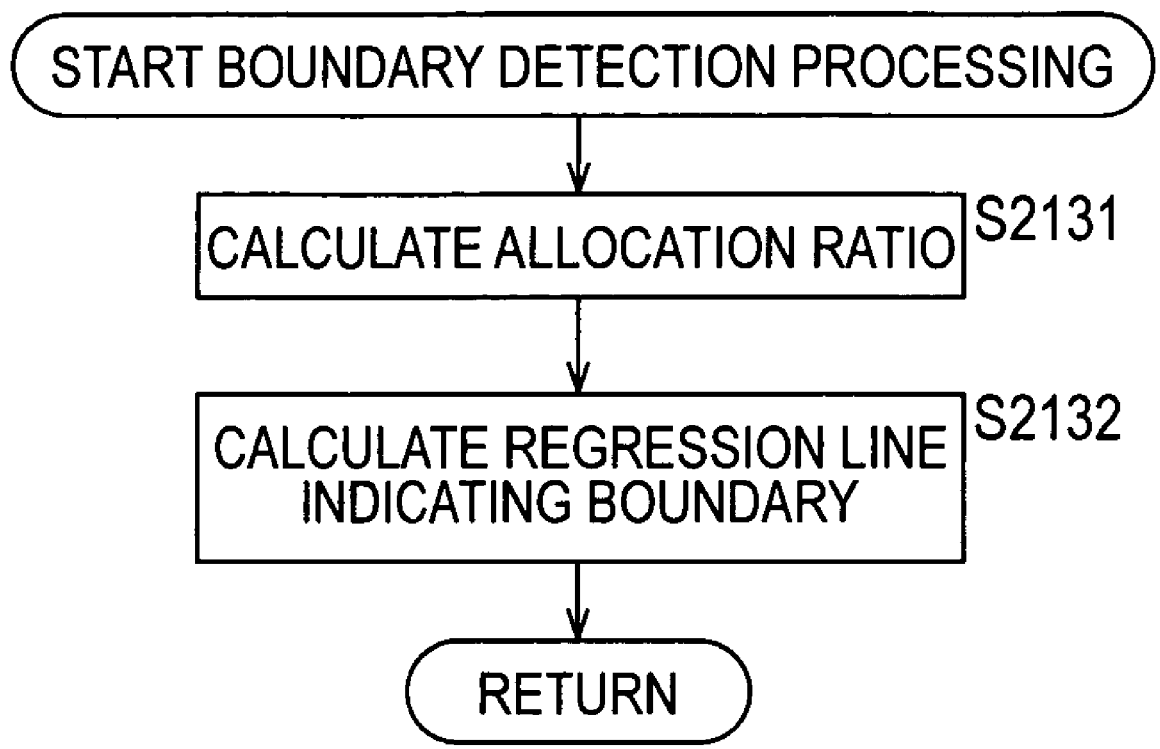
FIG. 101 is a flowchart for describing the processing for boundary detection.

FIG. 101 is a flowchart for describing boundary detecting processing corresponding to the processing in step S2121.

In step S2131, the allocation-ratio calculation unit 2131 calculates an allocation ratio indicating proportion wherein a fine-line image is projected based on the data continuity information indicating a monotonous increase/decrease region and an input image. For example, the allocation-ratio calculation unit 2131 detects adjacent monotonous increase/decrease regions within the continuity region from an input image based on the monotonous increase/decrease region information included in the data continuity information, and generates an image made up of continuity components alone on which a fine-line image is projected by subtracting approximate values to be approximated at a plane indicated with a gradient and intercept included in the continuity component information from the pixel values of the pixels belonged to the detected monotonous increase/decrease region. Subsequently, the allocation-ratio calculation unit 2131 calculates an allocation ratio, by dividing the pixel values of pixels belonged to two monotonous increase/decrease regions made up of pixels in one column by the sum of the pixel values of the adjacent pixels, regarding each pixel belonged to the two adjacent monotonous increase/decrease regions.

The allocation-ratio calculation unit 2131 supplies the calculated allocation ratio to the regression-line calculation unit 2132.

In step S2132, the regression-line calculation unit 2132 detects a region within the continuity region again by calculating a regression line indicating the boundary of a monotonous increase/decrease region based on the allocation ratio indicating proportion wherein a fine-line image is projected. For example, the regression-line calculation unit 2132 assumes that the boundary of a monotonous increase/decrease region is a straight line, and detects the monotonous increase/decrease region within the continuity region again by calculating a regression line indicating the boundary of one end of the monotonous increase/decrease region, and calculating a regression line indicating the boundary of another end of the monotonous increase/decrease region.

The regression-line calculation unit 2132 supplies region information indicating the region detected again within the continuity region to the line-width detecting unit 2101, and the processing ends.

Thus, the actual world estimating unit 102 of which configuration is shown in FIG. 93 detects a region made up of pixels on which a fine-line image is projected again, detects the width of a fine line in the image serving as a signal in the actual world 1 based on the region detected again, and estimates the intensity (level) of light of the signal in the actual world 1. Thus, the width of a fine line can be detected more accurately, and the intensity of light can be estimated more accurately regarding a signal in the actual world 1.

As described above, in the event that a light signal in the real world is projected, a discontinuous portion of the pixel values of multiple pixels in the first image data of witch part of continuity of the light signal in the real world drops is detected, a continuity region having continuity of data is detected from the detected discontinuous portion, a region is detected again based on the pixel values of pixels belonged to the detected continuity region, and the actual world is estimated based on the region detected again, a more accurate and higher-precision processing result can be obtained as to events in the real world.

Next, description will be made regarding the actual world estimating unit 102 for outputting derivative values of the approximation function in the spatial direction for each pixel in a region having continuity as actual world estimating information with reference to FIG. 102.

A reference-pixel extracting unit 2201 determines regarding whether or not each pixel in an input image is a processing region based on the data continuity information (angle as continuity or region information) input from the data continuity detecting unit 101, and in the event of a processing region, extracts reference pixel information necessary for obtaining an approximate function for approximating the pixel values of pixels in the input image (the positions and pixel values of multiple pixels around a pixel of interest necessary for calculation), and outputs this to an approximation-function estimating unit 2202.

The approximation-function estimating unit 2202 estimates, based on the least-squares method, an approximation function for approximately describing the pixel values of pixels around a pixel of interest based on the reference pixel information input from the reference-pixel extracting unit 2201, and outputs the estimated approximation function to a differential processing unit 2203.

The differential processing unit 2203 obtains a shift amount in the position of a pixel to be generated from a pixel of interest according to the angle of the data continuity information (for example, angle as to a predetermined axis of a fine line or two-valued edge: gradient) based on the approximation function input from the approximation-function estimating unit 2202, calculates a derivative value in the position on the approximation function according to the shift amount (the derivative value of a function for approximating the pixel value of each pixel corresponding to a distance from a line corresponding to continuity along in the one-dimensional direction), and further, adds information regarding the position and pixel value of a pixel of interest, and gradient as continuity to this, and outputs this to the image generating unit 103 as actual world estimating information.

Next, description will be made regarding actual world estimating processing by the actual world estimating unit 102 in FIG. 102 with reference to the flowchart in FIG. 103.

In step S2201, the reference-pixel extracting unit 2201 acquires an angle and region information as the data continuity information from the data continuity detecting unit 101 as well as an input image.

In step S2202, the pixel extracting unit 2201 sets a pixel of interest from unprocessed pixels in the input image.

In step S2203, the reference-pixel extracting unit 2201 determines regarding whether or not the pixel of interest is included in a processing region based on the region information of the data continuity information, and in the event that the pixel of interest is not a pixel in a processing region, the processing proceeds to step S2210, the differential processing unit 2203 is informed that the pixel of interest is in a non-processing region via the approximation-function estimating unit 2202, in response to this, the differential processing unit 2203 sets the derivative value regarding the corresponding pixel of interest to zero, further adds the pixel value of the pixel of interest to this, and outputs this to the image generating unit 103 as actual world estimating information, and also the processing proceeds to step S2211. Also, in the event that determination is made that the pixel of interest is in a processing region, the processing proceeds to step S2204.

In step S2204, the reference-pixel extracting unit 2201 determines regarding whether the direction having data continuity is an angle close to the horizontal direction or angle close to the vertical direction based on the angular information included in the data continuity information. That is to say, in the event that an angle θ having data continuity is 45°>θ≧0°, or 180°>θ≧135°, the reference-pixel extracting unit 2201 determines that the direction of continuity of the pixel of interest is close to the horizontal direction, and in the event that the angle θ having data continuity is 135°>θ≧45°, determines that the direction of continuity of the pixel of interest is close to the vertical direction.

Figure 104:
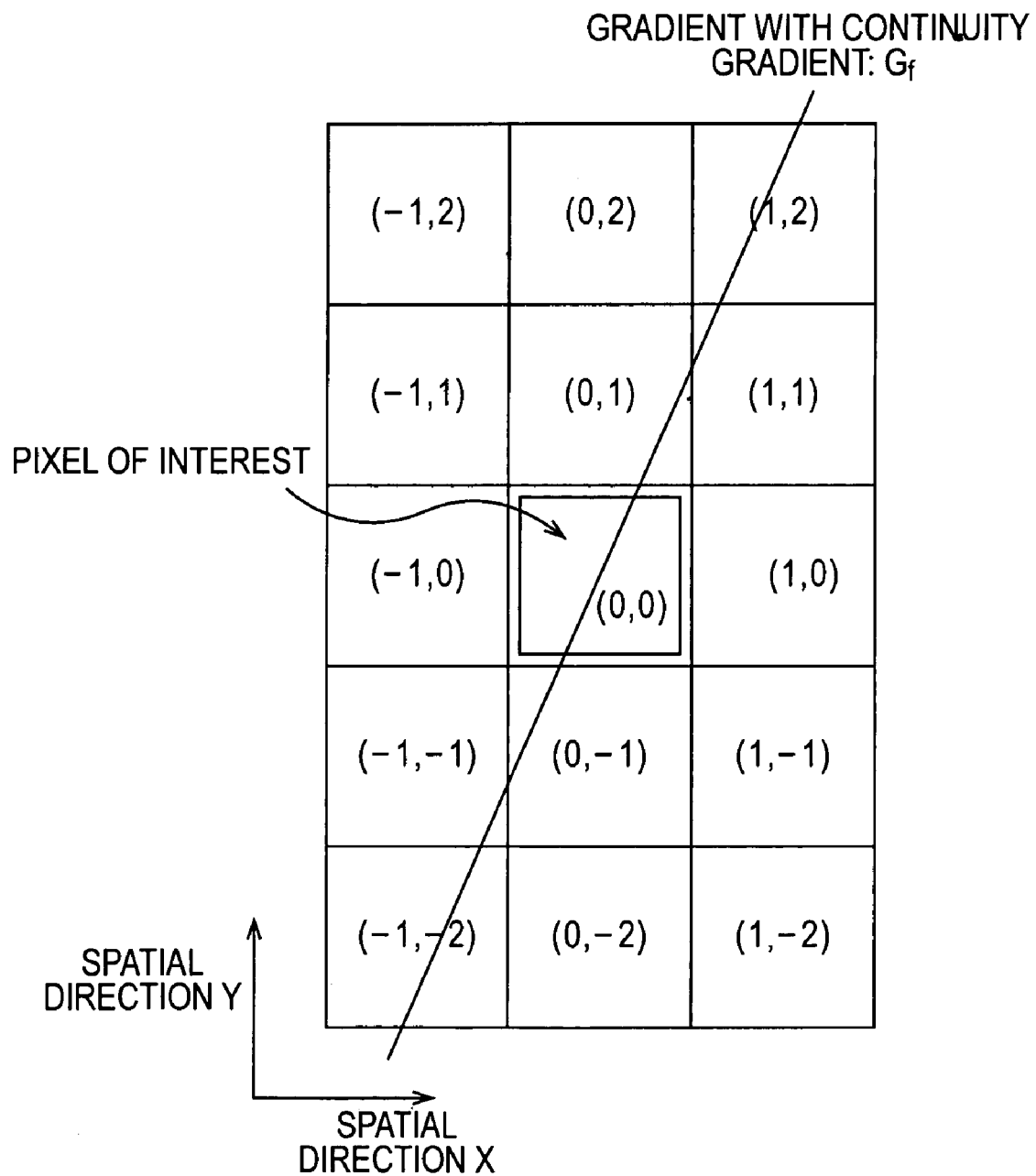
FIG. 104 is a diagram for describing a reference pixel.

In step S2205, the reference-pixel extracting unit 2201 extracts the positional information and pixel values of reference pixels corresponding to the determined direction from the input image respectively, and outputs these to the approximation-function estimating unit 2202. That is to say, reference pixels become data to be used for calculating a later-described approximation function, so are preferably extracted according to the gradient thereof. Accordingly, corresponding to any determined direction of the horizontal direction and the vertical direction, reference pixels in a long range in the direction thereof are extracted. More specifically, for example, as shown in FIG. 104, in the event that a gradient $G_f$ is close to the vertical direction, determination is made that the direction is the vertical direction. In this case, as shown in FIG. 104 for example, when a pixel (0, 0) in the center of FIG. 104 is taken as a pixel of interest, the reference-pixel extracting unit 2201 extracts each pixel value of pixels (−1, 2), (−1, 1), (−1, 0), (−1, −1), (−1, −2), (0, 2), (0, 1), (0, 0), (0, −1), (0, −2), (1, 2), (1, 1), (1, 0), (1, −1), and (1, −2). Note that in FIG. 104, let us say that both sizes in the horizontal direction and in the vertical direction of each pixel is 1.

In other words, the reference-pixel extracting unit 2201 extracts pixels in a long range in the vertical direction as reference pixels such that the reference pixels are 15 pixels in total of 2 pixels respectively in the vertical (upper/lower) direction×1 pixel respectively in the horizontal (left/right) direction centered on the pixel of interest.

On the contrary, in the event that determination is made that the direction is the horizontal direction, the reference-pixel extracting unit 2201 extracts pixels in a long range in the horizontal direction as reference pixels such that the reference pixels are 15 pixels in total of 1 pixel respectively in the vertical (upper/lower) direction×2 pixels respectively in the horizontal (left/right) direction centered on the pixel of interest, and outputs these to the approximation-function estimating unit 2202. Needless to say, the number of reference pixels is not restricted to 15 pixels as described above, so any number of pixels may be employed.

In step S2206, the approximation-function estimating unit 2202 estimates the approximation function f(x) using the least squares method based on information of reference pixels input from the reference-pixel extracting unit 2201, and outputs this to the differential processing unit 2203.

That is to say, the approximation function f(x) is a polynomial such as shown in the following Expression (30).

$$f(x) = w_1 x^n + w_2 x^{n-1} + \ldots + w_{n+1} \quad (30)$$

Thus, if each of coefficients $W_1$ through $W_{n+1}$ of the polynomial in Expression (30) can be obtained, the approximation function f(x) for approximating the pixel value of each reference pixel (reference pixel value) can be obtained. However, reference pixel values exceeding the number of coefficients are necessary, so for example, in the case such as shown in FIG. 104, the number of reference pixels is 15 pixels in total, and accordingly, the number of obtainable coefficients in the polynomial is restricted to 15. In this case, let us say that the polynomial is up to 14-dimension, and the approximation function is estimated by obtaining the coefficients $W_1$ through $W_{15}$. Note that in this case, simultaneous equations may be employed by setting the approximation function f(x) made up of a 15-dimensional polynomial.

Accordingly, when 15 reference pixel values shown in FIG. 104 are employed, the approximation-function estimating unit 2202 estimates the approximation function f(x) by solving the following Expression (31) using the least squares method.

$$P(-1,-2) = f(-1 - Cx(-2))$$

$$P(-1,-1) = f(-1 - Cx(-1))$$

$$P(-1,0) = f(-1)(=f(-1-Cx(0)))$$

$$P(-1,1) = f(-1 - Cx(1))$$

$$P(-1,2) = f(-1 - Cx(2))$$

$$P(0,-2) = f(0 - Cx(-2))$$

$$P(0,-1) = f(0 - Cx(-1))$$

$$P(0,0) = f(0)(=f(0-Cx(0)))$$

$$P(0,1) = f(0 - Cx(1))$$

$$P(0,2) = f(0 - Cx(2))$$

$$P(1,-2) = f(1 - Cx(-2))$$

$$P(1,-1) = f(1 - Cx(-1))$$

$$P(1,0) = f(1)(=f(1-Cx(0)))$$

$$P(1,1) = f(1 - Cx(1))$$

$$P(1,2) = f(1 - Cx(2)) \quad (31)$$

Note that the number of reference pixels may be changed in accordance with the degree of the polynomial.

Here, Cx(ty) denotes a shift amount, and when the gradient as continuity is denoted with $G_f$, $Cx(ty) = ty/G_f$ is defined. This shift amount Cx(ty) denotes the width of a shift as to the spatial direction X in the position in the spatial direction Y=ty on condition that the approximation function f(x) defined on the position in the spatial direction Y=0 is continuous (has continuity) along the gradient $G_f$. Accordingly, for example, in the event that the approximation function is defined as f(x) on the position in the spatial direction Y=0, this approximation function f(x) must be shifted by Cx(ty) as to the spatial direction X along the gradient $G_f$ in the spatial direction Y=ty, so the function is defined as $f(x - Cx(ty))(= f(x - ty/G_f))$.

In step S2207, the differential processing unit 2203 obtains a shift amount in the position of a pixel to be generated based on the approximation function f(x) input from the approximation-function estimating unit 2202.

Figure 105:
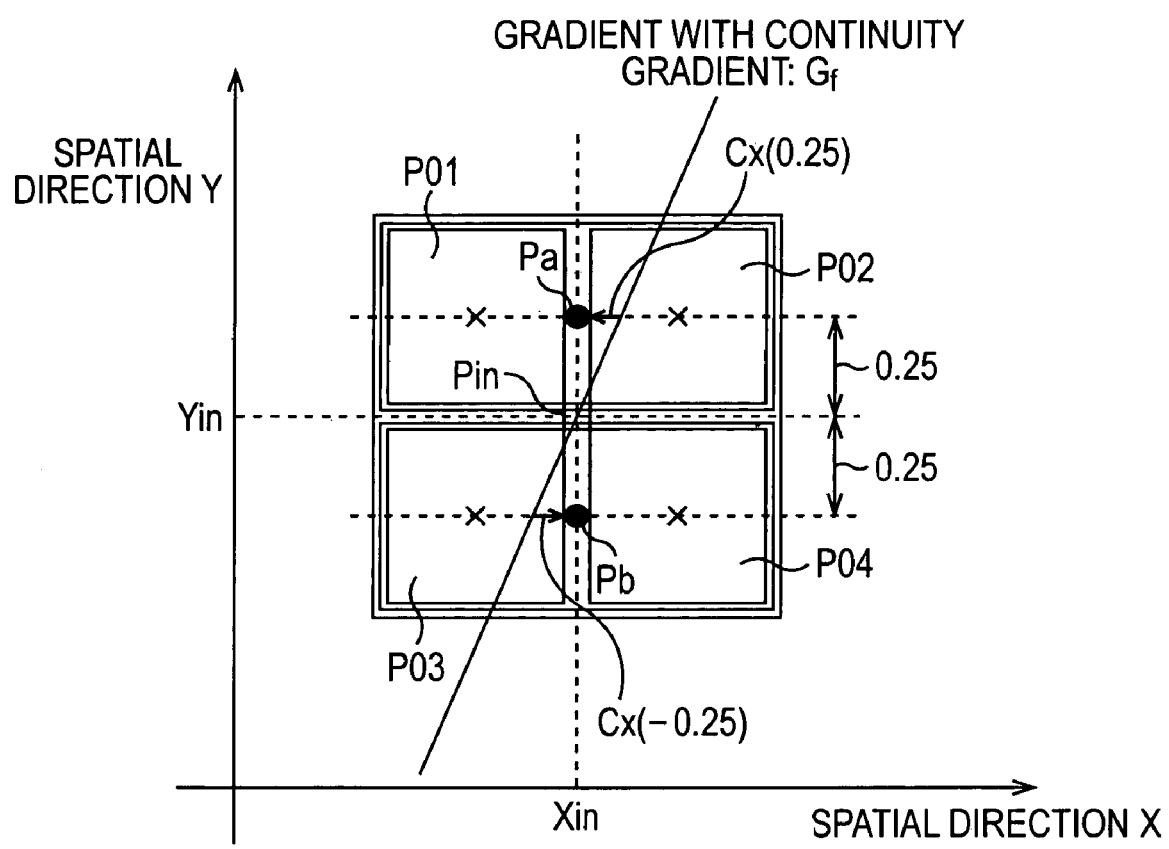
FIG. 105 is a diagram for describing the position for obtaining the derivative value in the spatial direction.

That is to say, in the event that pixels are generated so as to be a double density in the horizontal direction and in the vertical direction respectively (quadruple density in total), the differential processing unit 2203 first obtains a shift amount of Pin(Xin, Yin) in the center position to divide a pixel of interest into two pixels Pa and Pb, which become a double density in the vertical direction, as shown in FIG. 105, to obtain a derivative value at a center position Pin(Xin, Yin) of a pixel of interest. This shift amount becomes Cx(0), so actually becomes zero. Note that in FIG. 105, a pixel Pin of which general gravity position is (Xin, Yin) is a square, and pixels Pa and Pb of which general gravity positions are (Xin, Yin+0.25) and (Xin, Yin−0.25) respectively are rectangles long in the horizontal direction in the drawing.

In step S2208, the differential processing unit 2203 differentiates the approximation function f(x) so as to obtain a primary differential function f(x)' of the approximation function, obtains a derivative value at a position according to the obtained shift amount, and outputs this to the image generating unit 103 as actual world estimating information. That is to say, in this case, the differential processing unit 2203 obtains a derivative value f(Xin)', and adds the position thereof (in this case, a pixel of interest (Xin, Yin)), the pixel value thereof, and the gradient information in the direction of continuity to this, and outputs this.

In step S2209, the differential processing unit 2203 determines regarding whether or not derivative values necessary for generating desired-density pixels are obtained. For example, in this case, the obtained derivative values are only derivative values necessary for a double density (only derivative values to become a double density for the spatial direction Y are obtained), so determination is made that derivative values necessary for generating desired-density pixels are not obtained, and the processing returns to step S2207.

In step S2207, the differential processing unit 2203 obtains a shift amount in the position of a pixel to be generated based on the approximation function f(x) input from the approximation-function estimating unit 2202 again. That is to say, in this case, the differential processing unit 2203 obtains derivative values necessary for further dividing the divided pixels Pa and Pb into 2 pixels respectively. The positions of the pixels Pa and Pb are denoted with black circles in FIG. 105 respectively, so the differential processing unit 2203 obtains a shift amount corresponding to each position. The shift amounts of the pixels Pa and Pb are Cx(0.25) and Cx(−0.25) respectively.

In step S2208, the differential processing unit 2203 subjects the approximation function f(x) to a primary differentiation, obtains a derivative value in the position according to a shift amount corresponding to each of the pixels Pa and Pb, and outputs this to the image generating unit 103 as actual world estimating information.

Figure 106:
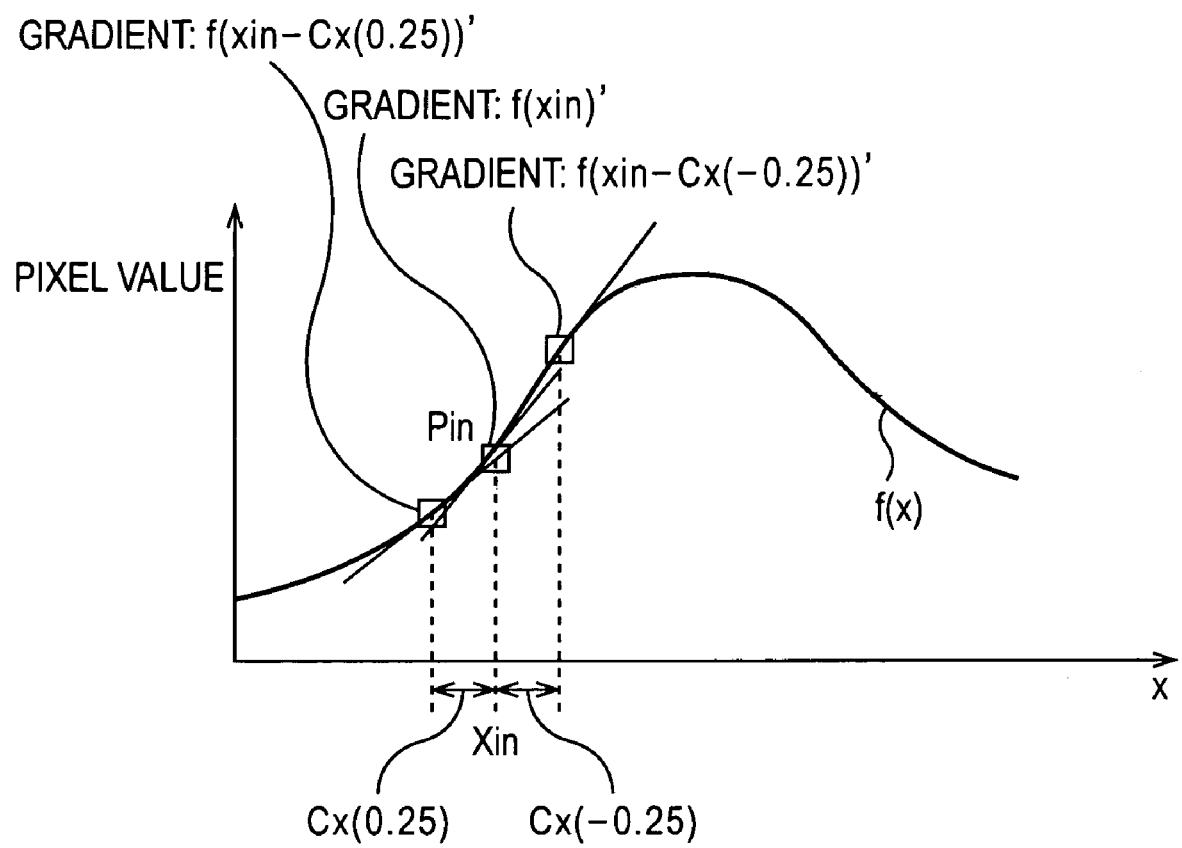
FIG. 106 is a diagram for describing the relationship between the derivative value in the spatial direction and the amount of shift.

That is to say, in the event of employing the reference pixels shown in FIG. 104, the differential processing unit 2203, as shown in FIG. 106, obtains a differential function f(x)' regarding the obtained approximation function f(x), obtains derivative values in the positions (Xin−Cx(0.25)) and (Xin−Cx(−

0.25)), which are positions shifted by shift amounts Cx(0.25) and Cx(−0.25) for the spatial direction X, as f(Xin−Cx(0.25))' and f(Xin−Cx(−0.25))' respectively, adds the positional information corresponding to the derivative values thereof to this, and outputs this as actual world estimating information. Note that the information of the pixel values is output at the first processing, so this is not added at this processing.

In step S2209, the differential processing unit 2203 determines regarding whether or not derivative values necessary for generating desired-density pixels are obtained again. For example, in this case, derivative values to become a quadruple density have been obtained, so determination is made that derivative values necessary for generating desired-density pixels have been obtained, and the processing proceeds to step S2211.

In step S2211, the reference-pixel extracting unit 2201 determines regarding whether or not all of the pixels have been processed, and in the event that determination is made that all of the pixels have not been processed, the processing returns to step S2202. Also, in step S2211, in the event that determination is made that all of the pixels have been processed, the processing ends.

As described above, in the event that pixels are generated so as to become a quadruple density in the horizontal direction and in the vertical direction regarding the input image, pixels are divided by extrapolation/interpolation using the derivative value of the approximation function in the center position of the pixel to be divided, so in order to generate quadruple-density pixels, information of three derivative values in total is necessary.

That is to say, as shown in FIG. 105, derivative values necessary for generating four pixels P01, P02, P03, and P04 (in FIG. 105, pixels P01, P02, P03, and P04 are squares of which the gravity positions are the positions of four cross marks in the drawing, and the length of each side is 1 for the pixel Pin, so around 0.5 for the pixels P01, P02, P03, and P04) are necessary for one pixel in the end, and accordingly, in order to generate quadruple-density pixels, first, double-density pixels in the horizontal direction or in the vertical direction (in this case, in the vertical direction) are generated (the above first processing in steps S2207 and S2208), and further, the divided two pixels are divided in the direction orthogonal to the initial dividing direction (in this case, in the horizontal direction) (the above second processing in steps S2207 and S2208).

Note that with the above example, description has been made regarding derivative values at the time of calculating quadruple-density pixels as an example, but in the event of calculating pixels having a density more than a quadruple density, many more derivative values necessary for calculating pixel values may be obtained by repeatedly performing the processing in steps S2207 through S2209. Also, with the above example, description has been made regarding an example for obtaining double-density pixel values, but the approximation function f(x) is a continuous function, so necessary derivative values may be obtained even regarding pixel values having a density other than a pluralized density.

According to the above arrangement, an approximation function for approximating the pixel values of pixels near a pixel of interest can be obtained, and derivative values in the positions corresponding to the pixel positions in the spatial direction can be output as actual world estimating information.

Figure 102:
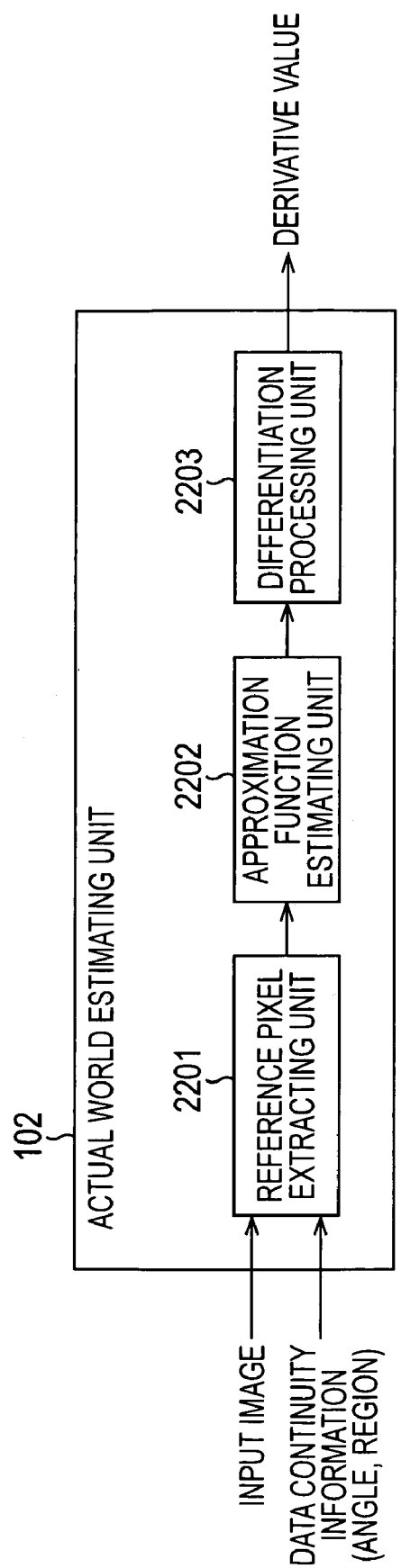
FIG. 102 is a block diagram illustrating the configuration of the real world estimating unit which estimates the derivative value in the spatial direction as actual world estimating information.
Figure 103:
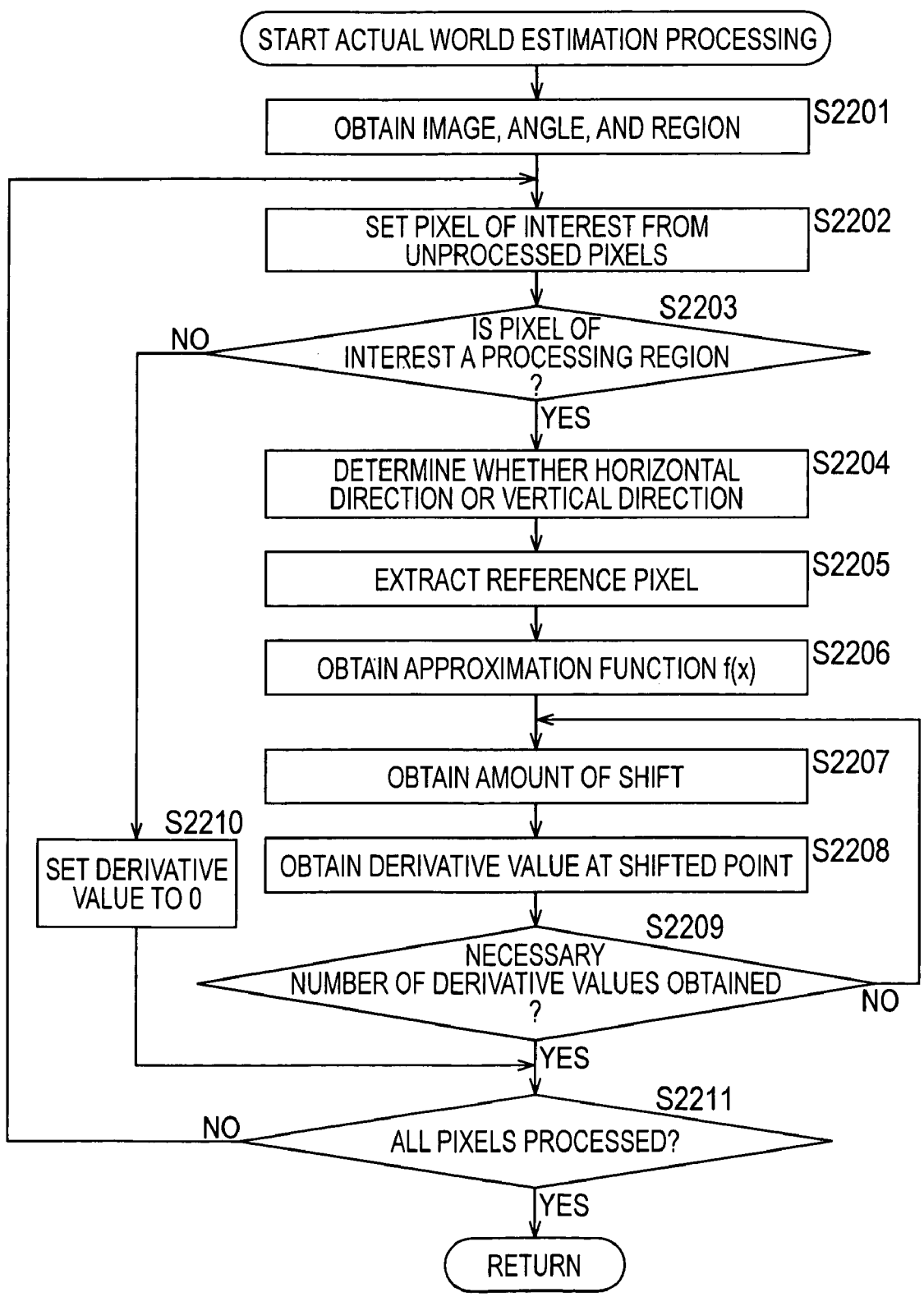
FIG. 103 is a flowchart for describing the processing of actual world estimation with the actual world estimating unit shown in FIG. 102.

With the actual world estimating unit 102 described in FIG. 102, derivative values necessary for generating an image have been output as actual world estimating information, but a derivative value is the same value as a gradient of the approximation function f(x) in a necessary position.

Figure 107:
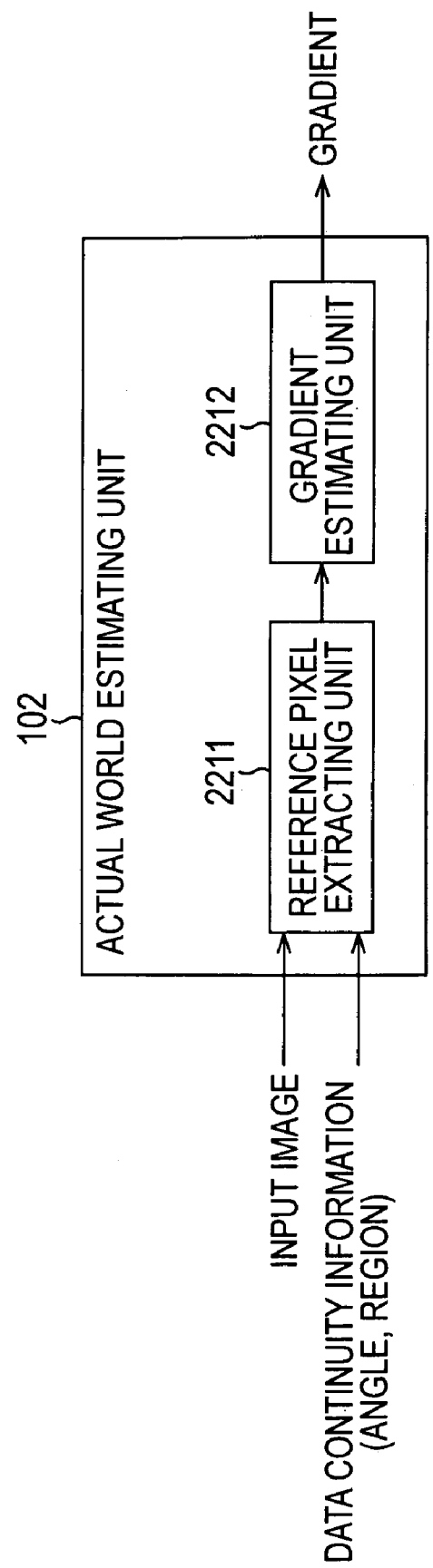
FIG. 107 is a block diagram illustrating the configuration of the actual world estimating unit which estimates the gradient in the spatial direction as actual world estimating information.

Now, description will be made next regarding the actual world estimating unit 102 wherein gradients alone on the approximation function f(x) necessary for generating pixels are directly obtained without obtaining the approximation function f(x), and output as actual world estimating information, with reference to FIG. 107.

The reference-pixel extracting unit 2211 determines regarding whether or not each pixel of an input image is a processing region based on the data continuity information (angle as continuity, or region information) input from the data continuity detecting unit 101, and in the event of a processing region, extracts information of reference pixels necessary for obtaining gradients from the input image (perimeter multiple pixels arrayed in the vertical direction including a pixel of interest, which are necessary for calculation, or the positions of perimeter multiple pixels arrayed in the horizontal direction including a pixel of interest, and information of each pixel value), and outputs this to a gradient estimating unit 2212.

The gradient estimating unit 2212 generates gradient information of a pixel position necessary for generating a pixel based on the reference pixel information input from the reference-pixel extracting unit 2211, and outputs this to the image generating unit 103 as actual world estimating information. More specifically, the gradient estimating unit 2212 obtains a gradient in the position of a pixel of interest on the approximation function f(x) approximately expressing the actual world using the difference information of the pixel values between pixels, outputs this along with the position information and pixel value of the pixel of interest, and the gradient information in the direction of continuity, as actual world estimating information.

Figure 108:
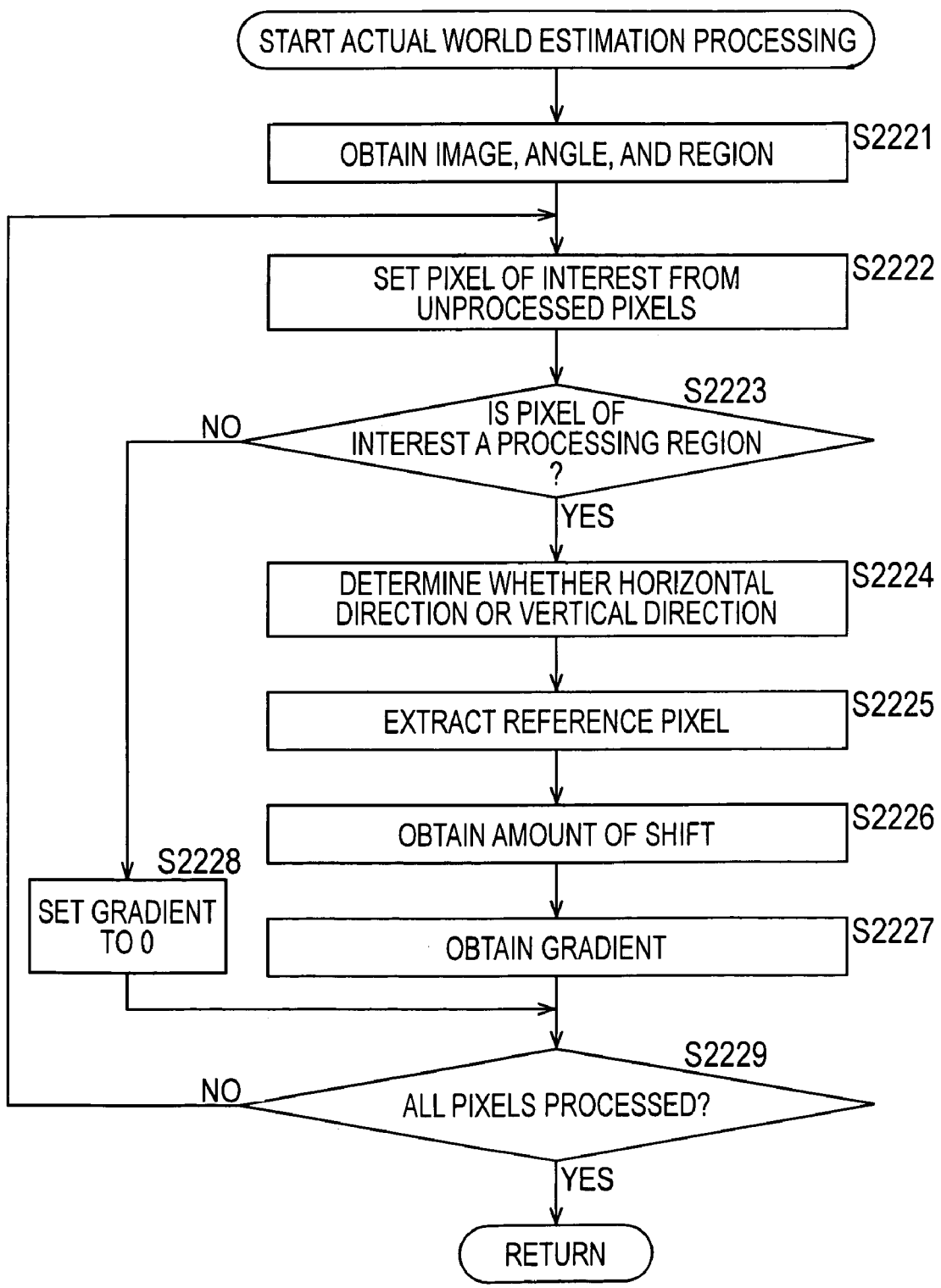
FIG. 108 is a flowchart for describing the processing of actual world estimation with the actual world estimating unit shown in FIG. 107.

Next, description will be made regarding the actual world estimating processing by the actual world estimating unit 102 in FIG. 107 with reference to the flowchart in FIG. 108.

In step S2221, the reference-pixel extracting unit 2211 acquires an angle and region information as the data continuity information from the data continuity detecting unit 101 along with an input image.

In step S2222, the reference-pixel extracting unit 2211 sets a pixel of interest from unprocessed pixels in the input image.

In step S2223, the reference-pixel extracting unit 2211 determines regarding whether or not the pixel of interest is in a processing region based on the region information of the data continuity information, and in the event that determination is made that the pixel of interest is not a pixel in the processing region, the processing proceeds to step S2228, wherein the gradient estimating unit 2212 is informed that the pixel of interest is in a non-processing region, in response to this, the gradient estimating unit 2212 sets the gradient for the corresponding pixel of interest to zero, and further adds the pixel value of the pixel of interest to this, and outputs this as actual world estimating information to the image generating unit 103, and also the processing proceeds to step S2229. Also, in the event that determination is made that the pixel of interest is in a processing region, the processing proceeds to step S2224.

In step S2224, the reference-pixel extracting unit 2211 determines regarding whether the direction having data continuity is an angle close to the horizontal direction or angle close to the vertical direction based on the angular information included in the data continuity information. That is to say, in the event that an angle θ having data continuity is $45°>θ≧0°$, or $180°>θ≧135°$, the reference-pixel extracting unit 2211 determines that the direction of continuity of the pixel of interest is close to the horizontal direction, and in the event that the angle θ having data continuity is 135°>θ≧45°, determines that the direction of continuity of the pixel of interest is close to the vertical direction.

Figure 109:
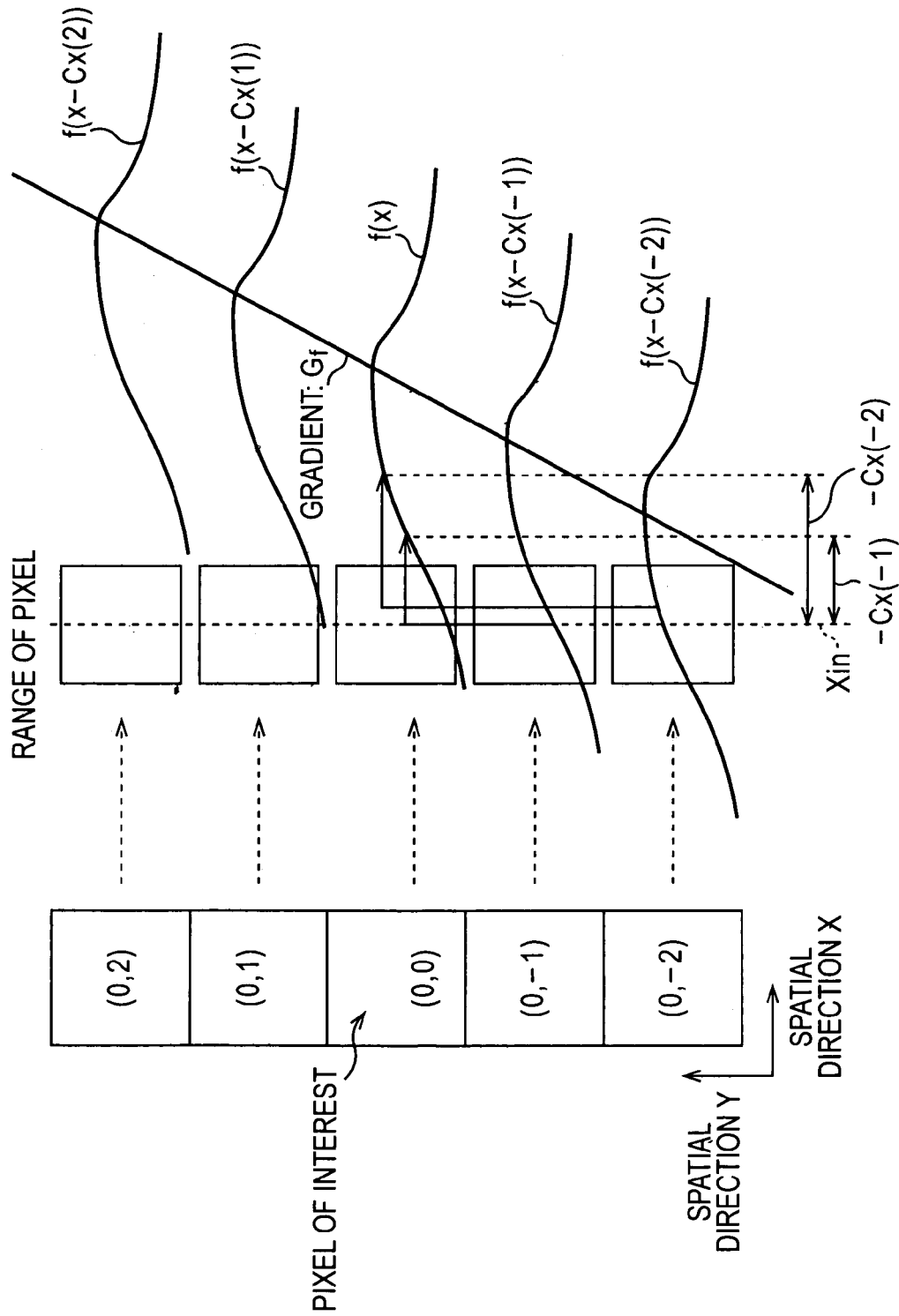
FIG. 109 is a diagram for describing processing for obtaining the gradient in the spatial direction.

In step S2225, the reference-pixel extracting unit 2211 extracts the positional information and pixel values of reference pixels corresponding to the determined direction from the input image respectively, and outputs these to the gradient estimating unit 2212. That is to say, reference pixels become data to be used for calculating a later-described gradient, so are preferably extracted according to a gradient indicating the direction of continuity. Accordingly, corresponding to any determined direction of the horizontal direction and the vertical direction, reference pixels in a long range in the direction thereof are extracted. More specifically, for example, in the event that determination is made that a gradient is close to the vertical direction, as shown in FIG. 109, when a pixel (0, 0) in the center of FIG. 109 is taken as a pixel of interest, the reference-pixel extracting unit 2211 extracts each pixel value of pixels (0, 2), (0, 1), (0, 0), (0, −1), and (0, −2). Note that in FIG. 109, let us say that both sizes in the horizontal direction and in the vertical direction of each pixel is 1.

In other words, the reference-pixel extracting unit 2211 extracts pixels in a long range in the vertical direction as reference pixels such that the reference pixels are 5 pixels in total of 2 pixels respectively in the vertical (upper/lower) direction centered on the pixel of interest.

On the contrary, in the event that determination is made that the direction is the horizontal direction, the reference-pixel extracting unit 2211 extracts pixels in a long range in the horizontal direction as reference pixels such that the reference pixels are 5 pixels in total of 2 pixels respectively in the horizontal (left/right) direction centered on the pixel of interest, and outputs these to the approximation-function estimating unit 2202. Needless to say, the number of reference pixels is not restricted to 5 pixels as described above, so any number of pixels may be employed.

In step S2226, the gradient estimating unit 2212 calculates a shift amount of each pixel value based on the reference pixel information input from the reference-pixel extracting unit 2211, and the gradient $G_f$ in the direction of continuity. That is to say, in the event that the approximation function f(x) corresponding to the spatial direction Y=0 is taken as a basis, the approximation functions corresponding to the spatial directions Y=−2, −1, 1, and 2 are continuous along the gradient $G_f$ as continuity as shown in FIG. 109, so the respective approximation functions are described as f(x−Cx(2)), f(x−Cx(1)), f(x−Cx(−1)), and f(x−Cx(−2)), and are represented as functions shifted by each shift amount in the spatial direction X for each of the spatial directions Y=−2, −1, 1, and 2.

Accordingly, the gradient estimating unit 2212 obtains shift amounts Cx(−2) through Cx(2) of these. For example, in the event that reference pixels are extracted such as shown in FIG. 109, with regard to the shift amounts thereof, the reference pixel (0, 2) in the drawing becomes $Cx(2)=2/G_f$, the reference pixel (0, 1) becomes $Cx(1)=1/G_f$, the reference pixel (0, 0) becomes Cx(0)=0, the reference pixel (0, −1) becomes $Cx(−1)=−1/G_f$, and the reference pixel (0, −2) becomes $Cx(−2)=−2/G_f$.

In step S2227, the gradient estimating unit 2212 calculates (estimates) a gradient on the approximation function f(x) in the position of the pixel of interest. For example, as shown in FIG. 109, in the event that the direction of continuity regarding the pixel of interest is an angle close to the vertical direction, the pixel values between the pixels adjacent in the horizontal direction exhibit great differences, but change between the pixels in the vertical direction is small and similar, and accordingly, the gradient estimating unit 2212 substitutes the difference between the pixels in the vertical direction for the difference between the pixels in the horizontal direction, and obtains a gradient on the approximation function f(x) in the position of the pixel of interest, by seizing change between the pixels in the vertical direction as change in the spatial direction X according to a shift amount.

Figure 110:
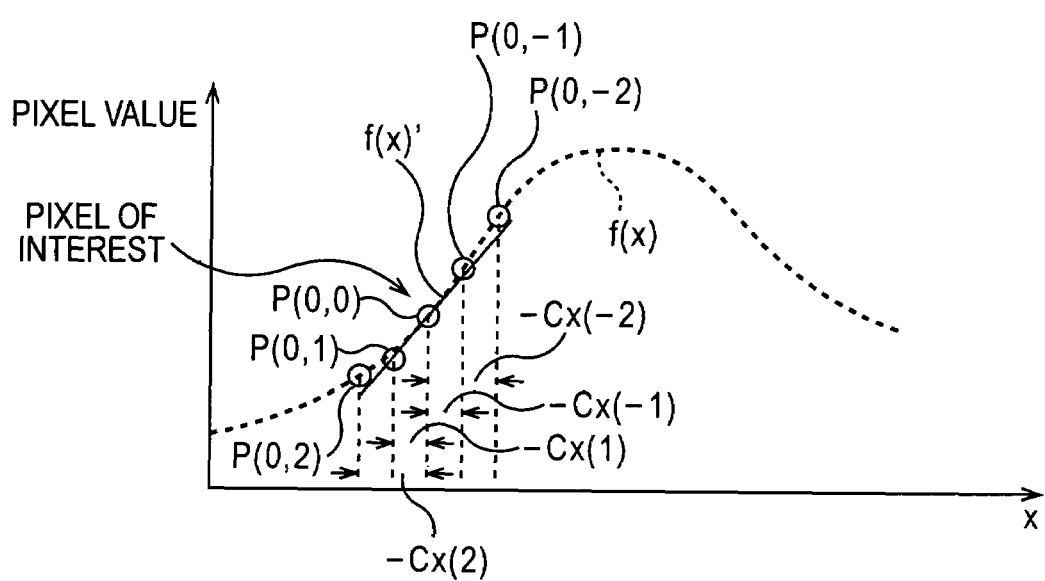
FIG. 110 is a diagram for describing processing for obtaining the gradient in the spatial direction.

That is to say, if we assume that the approximation function f(x) approximately describing the real world exists, the relations between the above shift amounts and the pixel values of the respective reference pixels is such as shown in FIG. 110. Here, the pixel values of the respective pixels in FIG. 109 are represented as P(0, 2), P(0, 1), P(0, 0), P(0, −1), and P(0, −2) from the top. As a result, with regard to the pixel value P and shift amount Cx near the pixel of interest (0, 0), 5 pairs of relations (P, Cx)=((P(0, 2), −Cx(2)), (P(0, 1), −Cx(1)), (P(0, −1), −Cx(−1)), (P(0, −2), −Cx(−2)), and (P(0, 0), 0) are obtained.

Now, with the pixel value P, shift amount Cx, and gradient Kx (gradient on the approximation function f(x)), the relation such as the following Expression (32) holds.

$$P = Kx \times Cx \qquad (32)$$

The above Expression (32) is a one-variable function regarding the variable Kx, so the gradient estimating unit 2212 obtains the gradient Kx (gradient) using the least squares method of one variable.

That is to say, the gradient estimating unit 2212 obtains the gradient of the pixel of interest by solving a normal equation such as shown in the following Expression (33), adds the pixel value of the pixel of interest, and the gradient information in the direction of continuity to this, and outputs this to the image generating unit 103 as actual world estimating information.

$$K_x = \frac{\sum_{i=1}^{m}(C_{xi} - P_i)}{\sum_{i=1}^{m}(C_{xi})^2} \qquad (33)$$

Here, i denotes a number for identifying each pair of the pixel value P and shift amount C of the above reference pixel, 1 through m. Also, m denotes the number of the reference pixels including the pixel of interest.

In step S2229, the reference-pixel extracting unit 2211 determines regarding whether or not all of the pixels have been processed, and in the event that determination is made that all of the pixels have not been processed, the processing returns to step S2222. Also, in the event that determination is made that all of the pixels have been processed in step S2229, the processing ends.

Note that the gradient to be output as actual world estimating information by the above processing is employed at the time of calculating desired pixel values to be obtained finally through extrapolation/interpolation. Also, with the above example, description has been made regarding the gradient at the time of calculating double-density pixels as an example, but in the event of calculating pixels having a density more than a double density, gradients in many more positions necessary for calculating the pixel values may be obtained.

For example, as shown in FIG. 105, in the event that pixels having a quadruple density in the spatial directions in total of a double density in the horizontal direction and also a double density in the vertical direction are generated, the gradient Kx of the approximation function f(x) corresponding to the respective positions Pin, Pa, and Pb in FIG. 105 should be obtained, as described above.

Also, with the above example, an example for obtaining double-density pixels has been described, but the approximation function f(x) is a continuous function, so it is possible to obtain a necessary gradient even regarding the pixel value of a pixel in a position other than a pluralized density.

According to the above arrangements, it is possible to generate and output gradients on the approximation function necessary for generating pixels in the spatial direction as actual world estimating information by using the pixel values of pixels near a pixel of interest without obtaining the approximation function approximately representing the actual world.

Next, description will be made regarding the actual world estimating unit 102, which outputs derivative values on the approximation function in the frame direction (temporal direction) for each pixel in a region having continuity as actual world estimating information, with reference to FIG. 111.

The reference-pixel extracting unit 2231 determines regarding whether or not each pixel in an input image is in a processing region based on the data continuity information (movement as continuity (movement vector), and region information) input from the data continuity detecting unit 101, and in the event that each pixel is in a processing region, extracts reference pixel information necessary for obtaining an approximation function approximating the pixel values of the pixels in the input image (multiple pixel positions around a pixel of interest necessary for calculation, and the pixel values thereof), and outputs this to the approximation-function estimating unit 2202.

The approximation-function estimating unit 2232 estimates an approximation function, which approximately describes the pixel value of each pixel around the pixel of interest based on the reference pixel information in the frame direction input from the reference-pixel extracting unit 2231, based on the least squares method, and outputs the estimated function to the differential processing unit 2233.

The differential processing unit 2233 obtains a shift amount in the frame direction in the position of a pixel to be generated from the pixel of interest according to the movement of the data continuity information based on the approximation function in the frame direction input from the approximation-function estimating unit 2232, calculates a derivative value in a position on the approximation function in the frame direction according to the shift amount thereof (derivative value of the function approximating the pixel value of each pixel corresponding to a distance along in the primary direction from a line corresponding to continuity), further adds the position and pixel value of the pixel of interest, and information regarding movement as continuity to this, and outputs this to the image generating unit 103 as actual world estimating information.

Next, description will be made regarding the actual world estimating processing by the actual world estimating unit 102 in FIG. 111 with reference to the flowchart in FIG. 112.

In step S2241, the reference-pixel extracting unit 2231 acquires the movement and region information as the data continuity information from the data continuity detecting unit 101 along with an input image.

In step S2242, the reference-pixel extracting unit 2231 sets a pixel of interest from unprocessed pixels in the input image.

In step S2243, the reference-pixel extracting unit 2231 determines regarding whether or not the pixel of interest is included in a processing region based on the region information of the data continuity information, and in the event that the pixel of interest is not a pixel in a processing region, the processing proceeds to step S2250, the differential processing unit 2233 is informed that the pixel of interest is in a non-processing region via the approximation-function estimating unit 2232, in response to this, the differential processing unit 2233 sets the derivative value regarding the corresponding pixel of interest to zero, further adds the pixel value of the pixel of interest to this, and outputs this to the image generating unit 103 as actual world estimating information, and also the processing proceeds to step S2251. Also, in the event that determination is made that the pixel of interest is in a processing region, the processing proceeds to step S2244.

Figure 113:
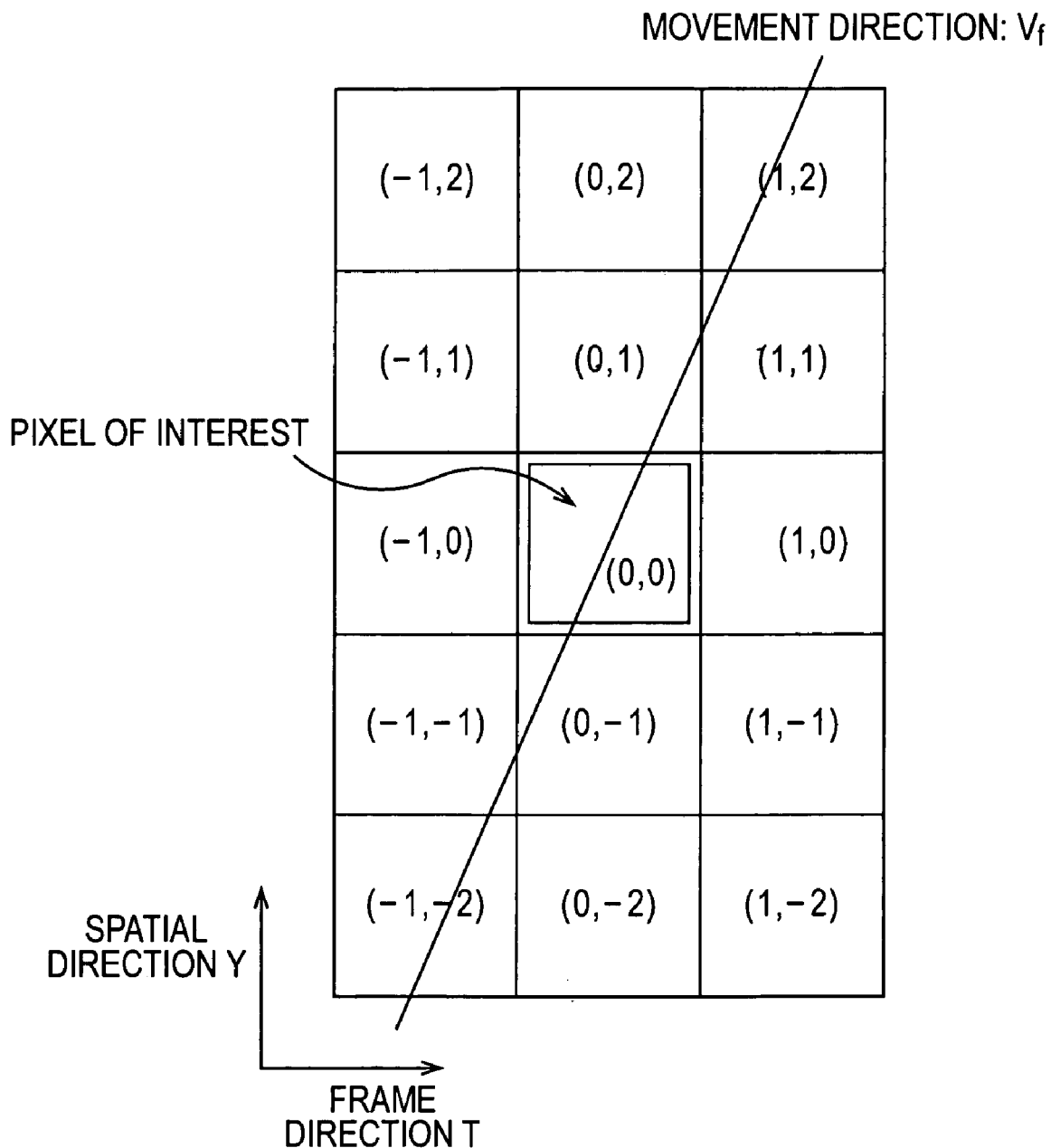
FIG. 113 is a diagram for describing a reference pixel.

In step S2244, the reference-pixel extracting unit 2231 determines regarding whether the direction having data continuity is movement close to the spatial direction or movement close to the frame direction based on movement information included in the data continuity information. That is to say, as shown in FIG. 113, if we say that an angle indicating the spatial and temporal directions within a surface made up of the frame direction T, which is taken as a reference axis, and the spatial direction Y, is taken as θv, in the event that an angle θv having data continuity is 45°>θv≧0°, or 180°>θv≧135°, the reference pixel extracting unit 2201 determines that the movement as continuity of the pixel of interest is close to the frame direction (temporal direction), and in the event that the angle θ having data continuity is 135°>θ≧45°, determines that the direction of continuity of the pixel of interest is close to the spatial direction.

In step S2245, the reference-pixel extracting unit 2201 extracts the positional information and pixel values of reference pixels corresponding to the determined direction from the input image respectively, and outputs these to the approximation-function estimating unit 2232. That is to say, reference pixels become data to be used for calculating a later-described approximation function, so are preferably extracted according to the angle thereof. Accordingly, corresponding to any determined direction of the frame direction and the spatial direction, reference pixels in a long range in the direction thereof are extracted. More specifically, for example, as shown in FIG. 113, in the event that a movement direction $V_f$ is close to the spatial direction, determination is made that the direction is the spatial direction. In this case, as shown in FIG. 113 for example, when a pixel (t, y)=(0, 0) in the center of FIG. 113 is taken as a pixel of interest, the reference-pixel extracting unit 2231 extracts each pixel value of pixels (t, y)=(−1, 2), (−1, 1), (−1, 0), (−1, −1), (−1, −2), (0, 2), (0, 1), (0, 0), (0, −1), (0, −2), (1, 2), (1, 1), (1, 0), (1, −1), and (1, −2). Note that in FIG. 113, let us say that both sizes in the frame direction and in the spatial direction of each pixel is 1.

In other words, the reference-pixel extracting unit 2231 extracts pixels in a long range in the spatial direction as to the frame direction as reference pixels such that the reference pixels are 15 pixels in total of 2 pixels respectively in the spatial direction (upper/lower direction in the drawing)×1 frame respectively in the frame direction (left/right direction in the drawing) centered on the pixel of interest.

On the contrary, in the event that determination is made that the direction is the frame direction, the reference-pixel extracting unit 2231 extracts pixels in a long range in the frame direction as reference pixels such that the reference pixels are 15 pixels in total of 1 pixel respectively in the spatial direction (upper/lower direction in the drawing)×2 frames respectively in the frame direction (left/right direction in the drawing) centered on the pixel of interest, and outputs these to the approximation-function estimating unit 2232.

Needless to say, the number of reference pixels is not restricted to 15 pixels as described above, so any number of pixels may be employed.

In step S2246, the approximation-function estimating unit 2232 estimates the approximation function f(t) using the least squares method based on information of reference pixels input from the reference-pixel extracting unit 2231, and outputs this to the differential processing unit 2233.

That is to say, the approximation function f(t) is a polynomial such as shown in the following Expression (34).

$$f(t)=W_1 t^n + W_2 t^{n-1} + \ldots + W_{n-1} \qquad (34)$$

Thus, if each of coefficients $W_1$ through $W_{n+1}$ of the polynomial in Expression (34) can be obtained, the approximation function f(t) in the frame direction for approximating the pixel value of each reference pixel can be obtained. However, reference pixel values exceeding the number of coefficients are necessary, so for example, in the case such as shown in FIG. 113, the number of reference pixels is 15 pixels in total, and accordingly, the number of obtainable coefficients in the polynomial is restricted to 15. In this case, let us say that the polynomial is up to 14-dimension, and the approximation function is estimated by obtaining the coefficients $W_1$ through $W_{15}$. Note that in this case, simultaneous equations may be employed by setting the approximation function f(t) made up of a 15-dimensional polynomial.

Accordingly, when 15 reference pixel values shown in FIG. 113 are employed, the approximation-function estimating unit 2232 estimates the approximation function f(t) by solving the following Expression (35) using the least squares method.

$$P(-1,-2)=f(-1-Ct(-2))$$

$$P(-1,-1)=f(-1-Ct(-1))$$

$$P(-1,0)=f(-1)(=f(-1-Ct(0)))$$

$$P(-1,1)=f(-1-Ct(1))$$

$$P(-1,2)=f(-1-Ct(2))$$

$$P(0,-2)=f(0-Ct(-2))$$

$$P(0,-1)=f(0-Ct(-1))$$

$$P(0,0)=f(0)(=f(0-Ct(0)))$$

$$P(0,1)=f(0-Ct(1))$$

$$P(0,2)=f(0-Ct(2))$$

$$P(1,-2)=f(1-Ct(-2))$$

$$P(1,-1)=f(1-Ct(-1))$$

$$P(1,0)=f(1)(=f(1-Ct(0)))$$

$$P(1,1)=f(1-Ct(1))$$

$$P(1,2)=f(1-Ct(2)) \qquad (35)$$

Note that the number of reference pixels may be changed in accordance with the degree of the polynomial.

Here, Ct(ty) denotes a shift amount, which is the same as the above Cx(ty), and when the gradient as continuity is denoted with $V_f$, $Ct(ty)=ty/V_f$ is defined. This shift amount Ct(ty) denotes the width of a shift as to the frame direction T in the position in the spatial direction Y=ty on condition that the approximation function f(t) defined on the position in the spatial direction Y=0 is continuous (has continuity) along the gradient $V_f$. Accordingly, for example, in the event that the approximation function is defined as f(t) on the position in the spatial direction Y=0, this approximation function f(t) must be shifted by Ct(ty) as to the frame direction (temporal direction) T in the spatial direction Y=ty, so the function is defined as $f(t-Ct(ty))(=f(t-ty/V_f))$.

In step S2247, the differential processing unit 2233 obtains a shift amount in the position of a pixel to be generated based on the approximation function f(t) input from the approximation-function estimating unit 2232.

Figure 114:
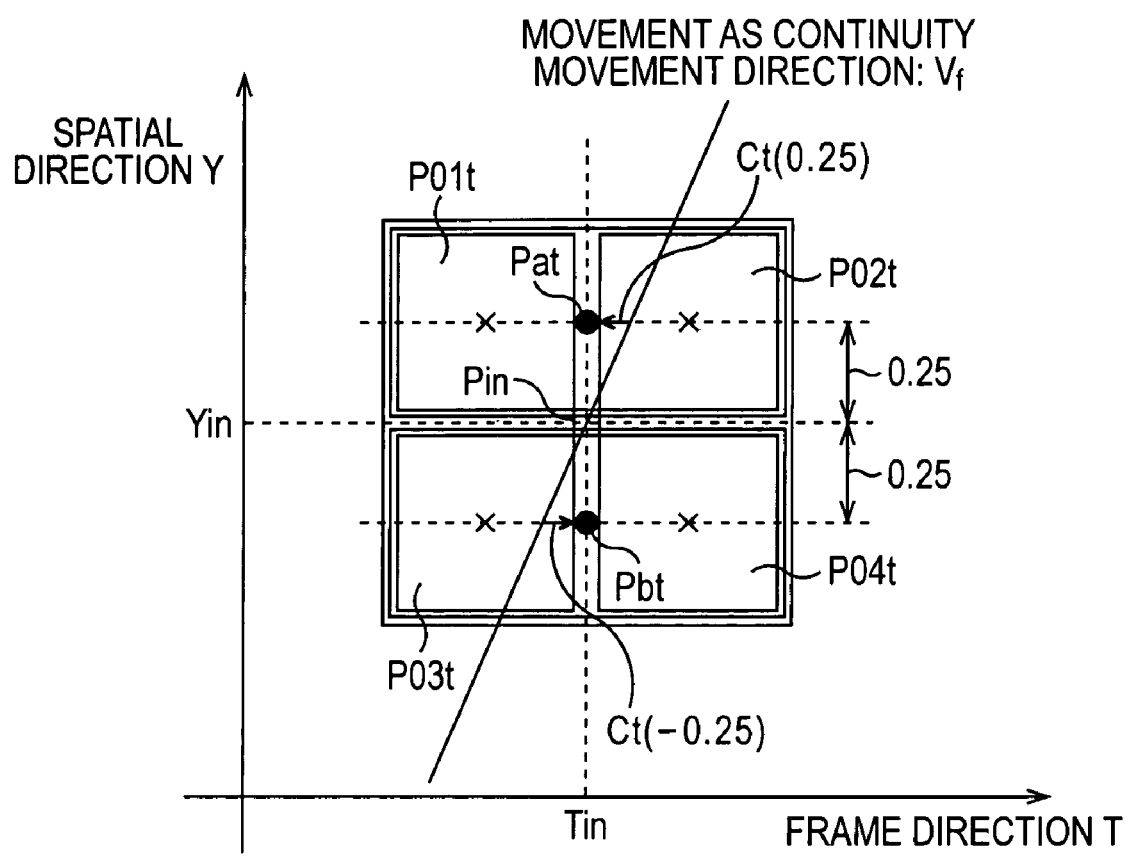
FIG. 114 is a diagram for describing the position for obtaining the derivative value in the frame direction.

That is to say, in the event that pixels are generated so as to be a double density in the frame direction and in the spatial direction respectively (quadruple density in total), the differential processing unit 2233 first obtains, for example, a shift amount of later-described Pin(Tin, Yin) in the center position to be divided into later-described two pixels Pat and Pbt, which become a double density in the spatial direction, as shown in FIG. 114, to obtain a derivative value at a center position Pin(Tin, Yin) of a pixel of interest. This shift amount becomes Ct(0), so actually becomes zero. Note that in FIG. 114, a pixel Pin of which general gravity position is (Tin, Yin) is a square, and pixels Pat and Pbt of which general gravity positions are (Tin, Yin+0.25) and (Tin, Yin−0.25) respectively are rectangles long in the horizontal direction in the drawing. Also, the length in the frame direction T of the pixel of interest Pin is 1, which corresponds to the shutter time for one frame.

In step S2248, the differential processing unit 2233 differentiates the approximation function f(t) so as to obtain a primary differential function f(t)' of the approximation function, obtains a derivative value at a position according to the obtained shift amount, and outputs this to the image generating unit 103 as actual world estimating information. That is to say, in this case, the differential processing unit 2233 obtains a derivative value f(Tin)', and adds the position thereof (in this case, a pixel of interest (Tin, Yin)), the pixel value thereof, and the movement information in the direction of continuity to this, and outputs this.

In step S2249, the differential processing unit 2233 determines regarding whether or not derivative values necessary for generating desired-density pixels are obtained. For example, in this case, the obtained derivative values are only derivative values necessary for a double density in the spatial direction (derivative values to become a double density for the frame direction are not obtained), so determination is made that derivative values necessary for generating desired-density pixels are not obtained, and the processing returns to step S2247.

In step S2247, the differential processing unit 2203 obtains a shift amount in the position of a pixel to be generated based on the approximation function f(t) input from the approximation-function estimating unit 2202 again. That is to say, in this case, the differential processing unit 2203 obtains derivative values necessary for further dividing the divided pixels Pat and Pbt into 2 pixels respectively. The positions of the pixels Pat and Pbt are denoted with black circles in FIG. 114 respectively, so the differential processing unit 2233 obtains a shift amount corresponding to each position. The shift amounts of the pixels Pat and Pbt are Ct(0.25) and Ct(−0.25) respectively.

In step S2248, the differential processing unit 2233 differentiates the approximation function f(t), obtains a derivative value in the position according to a shift amount corresponding to each of the pixels Pat and Pbt, and outputs this to the image generating unit 103 as actual world estimating information.

Figure 115:
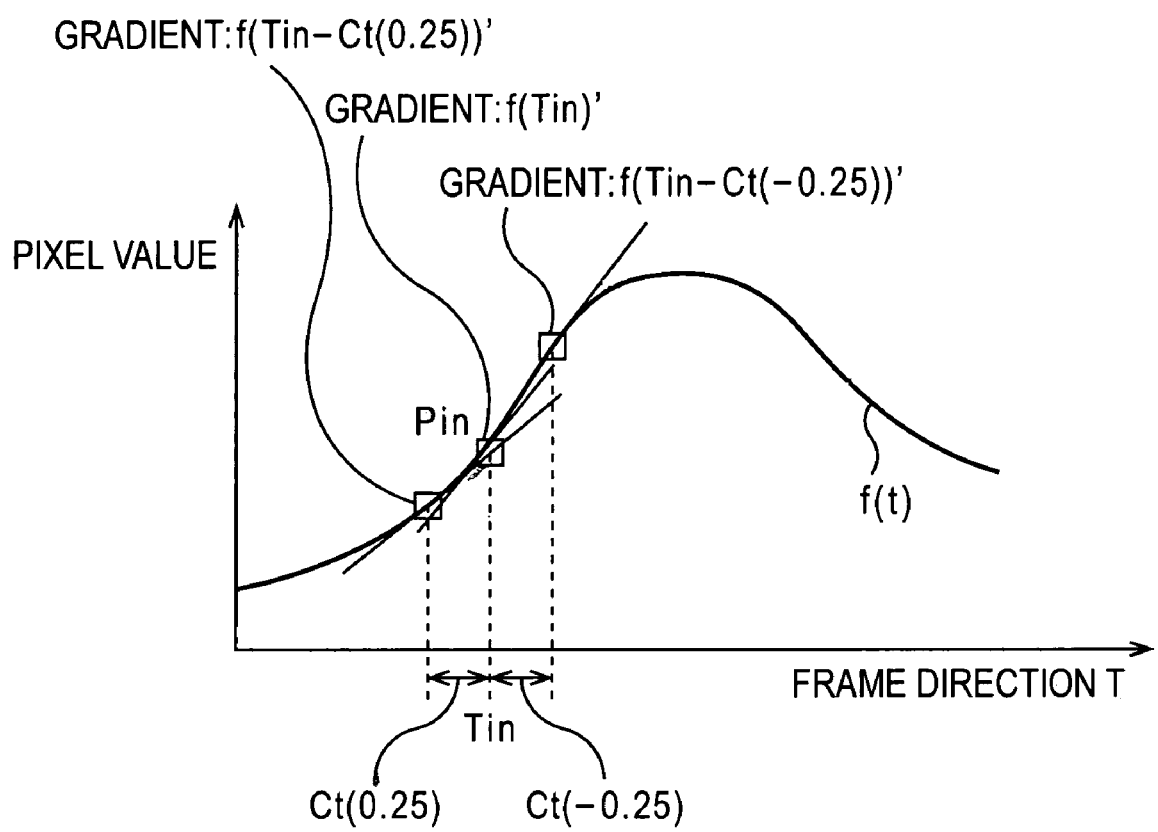
FIG. 115 is a diagram for describing the relationship between the derivative value in the frame direction and the amount of shift.

That is to say, in the event of employing the reference pixels shown in FIG. 113, the differential processing unit 2233, as shown in FIG. 115, obtains a differential function f(t)' regarding the obtained approximation function f(t), obtains derivative values in the positions (Tin−Ct(0.25)) and (Tin−Ct(−0.25)), which are positions shifted by shift amounts Ct(0.25) and Ct(−0.25) for the spatial direction T, as f(Tin−Ct(0.25))' and f(Tin−Ct(−0.25))' respectively, adds the positional information corresponding to the derivative values thereof to this, and outputs this as actual world estimating information. Note that the information of the pixel values is output at the first processing, so this is not added at this processing.

In step S2249, the differential processing unit 2233 determines regarding whether or not derivative values necessary for generating desired-density pixels are obtained again. For example, in this case, derivative values to become a double density in the spatial direction Y and in the frame direction T respectively (quadruple density in total) are obtained, so determination is made that derivative values necessary for generating desired-density pixels are obtained, and the processing proceeds to step S2251.

In step S2251, the reference-pixel extracting unit 2231 determines regarding whether or not all of the pixels have been processed, and in the event that determination is made that all of the pixels have not been processed, the processing returns to step S2242. Also, in step S2251, in the event that determination is made that all of the pixels have been processed, the processing ends.

As described above, in the event that pixels are generated so as to become a quadruple density in the frame direction (temporal direction) and in the spatial direction regarding the input image, pixels are divided by extrapolation/interpolation using the derivative value of the approximation function in the center position of the pixel to be divided, so in order to generate quadruple-density pixels, information of three derivative values in total is necessary.

That is to say, as shown in FIG. 114, derivative values necessary for generating four pixels P01t, P02t, P03t, and P04t (in FIG. 114, pixels P01t, P02t, P03t, and P04t are squares of which the gravity positions are the positions of four cross marks in the drawing, and the length of each side is 1 for the pixel Pin, so around 0.5 for the pixels P01t, P02t, P03t, and P04t) are necessary for one pixel in the end, and accordingly, in order to generate quadruple-density pixels, first, double-density pixels in the frame direction or in the spatial direction are generated (the above first processing in steps S2247 and S2248), and further, the divided two pixels are divided in the direction orthogonal to the initial dividing direction (in this case, in the frame direction) (the above second processing in steps S2247 and S2248).

Note that with the above example, description has been made regarding derivative values at the time of calculating quadruple-density pixels as an example, but in the event of calculating pixels having a density more than a quadruple density, many more derivative values necessary for calculating pixel values may be obtained by repeatedly performing the processing in steps S2247 through S2249. Also, with the above example, description has been made regarding an example for obtaining double-density pixel values, but the approximation function f(t) is a continuous function, so derivative values may be obtained even regarding pixel values having a density other than a pluralized density.

According to the above arrangement, an approximation function for approximately expressing the pixel value of each pixel can be obtained using the pixel values of pixels near a pixel of interest, and derivative values in the positions necessary for generating pixels can be output as actual world estimating information.

Figure 111:
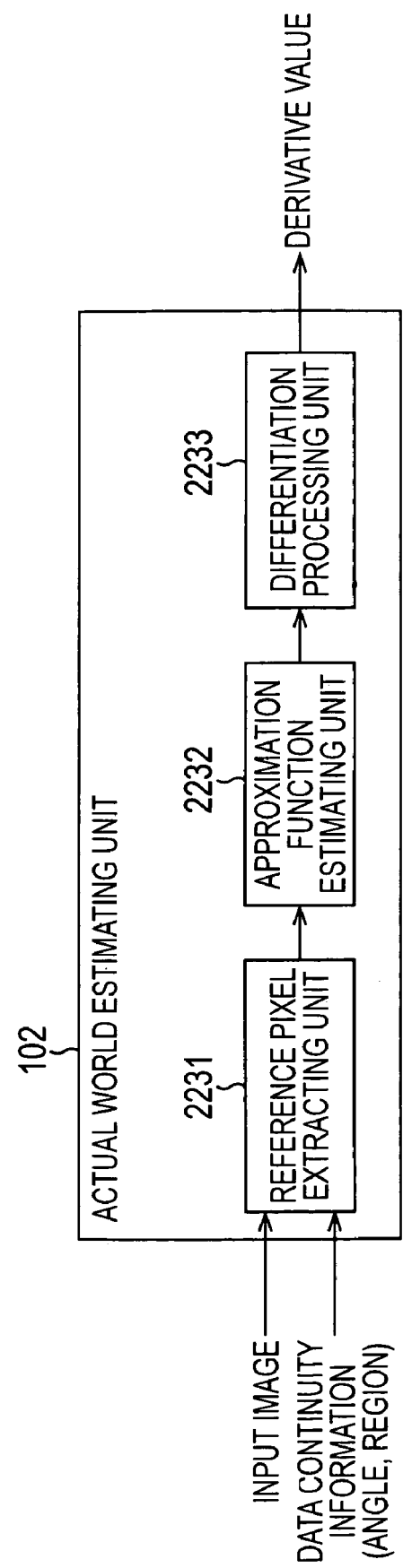
FIG. 111 is a block diagram illustrating the configuration of the actual world estimating unit for estimating the derivative value in the frame direction as actual world estimating information.
Figure 112:
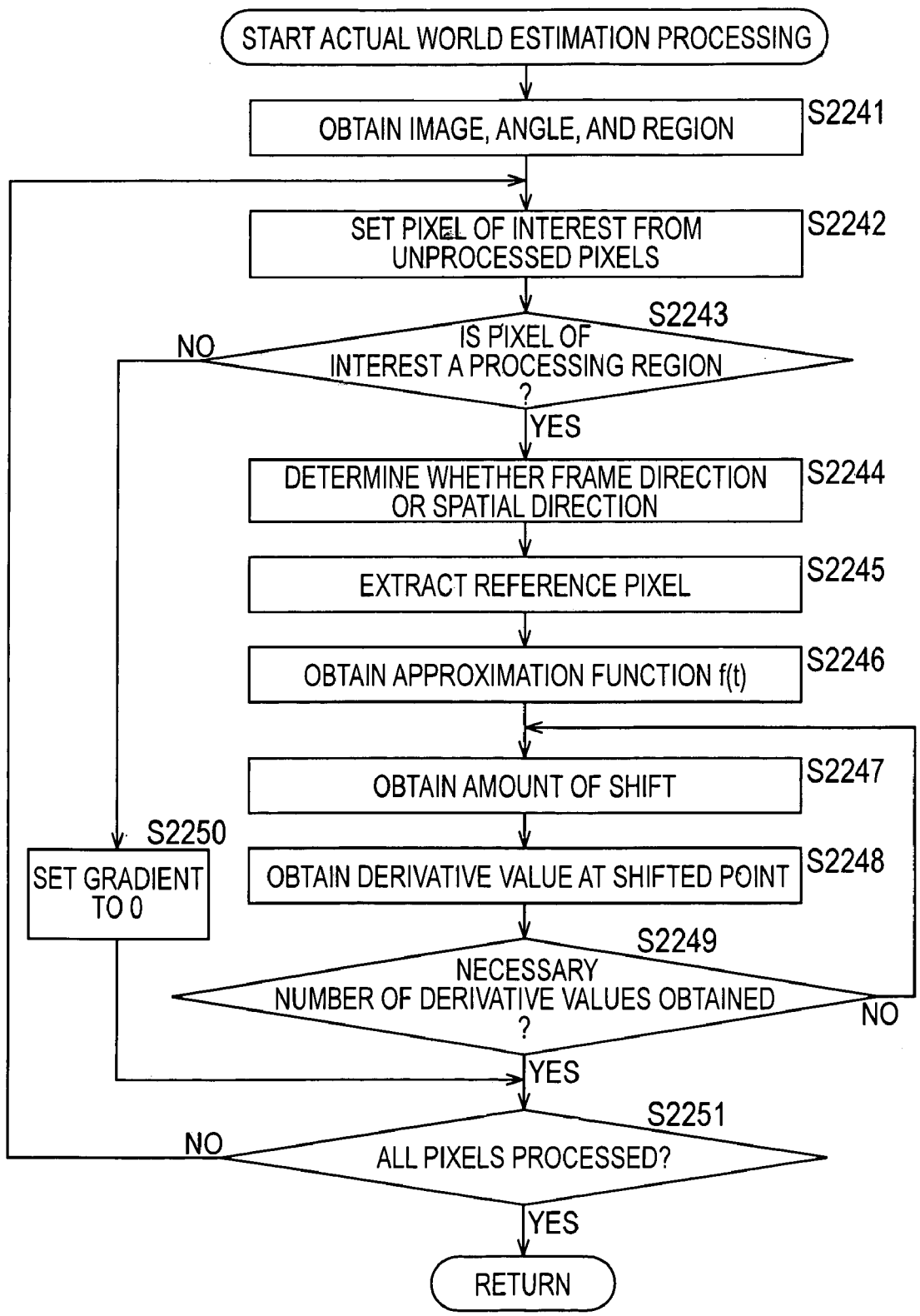
FIG. 112 is a flowchart for describing the processing of actual world estimation with the actual world estimating unit shown in FIG. 111.

With the actual world estimating unit 102 described in FIG. 111, derivative values necessary for generating an image have been output as actual world estimating information, but a derivative value is the same value as a gradient of the approximation function f(t) in a necessary position.

Figure 116:
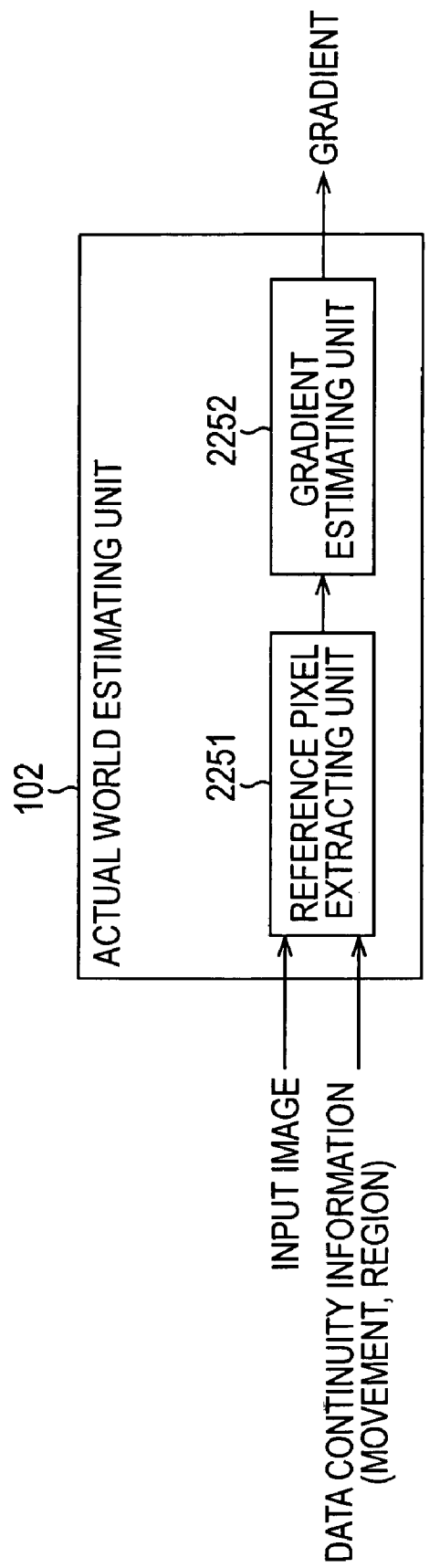
FIG. 116 is a block diagram illustrating the configuration of the real world estimating unit which estimates the gradient in the frame direction as actual world estimating information.

Now, description will be made next regarding the actual world estimating unit 102 wherein gradients alone in the frame direction on the approximation function necessary for generating pixels are directly obtained without obtaining the approximation function, and output as actual world estimating information, with reference to FIG. 116.

A reference-pixel extracting unit 2251 determines regarding whether or not each pixel of an input image is a processing region based on the data continuity information (movement as continuity, or region information) input from the data continuity detecting unit 101, and in the event of a processing region, extracts information of reference pixels necessary for obtaining gradients from the input image (perimeter multiple pixels arrayed in the spatial direction including a pixel of interest, which are necessary for calculation, or the positions of perimeter multiple pixels arrayed in the frame direction including a pixel of interest, and information of each pixel value), and outputs this to a gradient estimating unit 2252.

The gradient estimating unit 2252 generates gradient information of a pixel position necessary for generating a pixel based on the reference pixel information input from the reference-pixel extracting unit 2251, and outputs this to the image generating unit 103 as actual world estimating information. In further detail the gradient estimating unit 2252 obtains a gradient in the frame direction in the position of a pixel of interest on the approximation function approximately expressing the pixel value of each reference pixel using the difference information of the pixel values between pixels, outputs this along with the position information and pixel value of the pixel of interest, and the movement information in the direction of continuity, as actual world estimating information.

Figure 117:
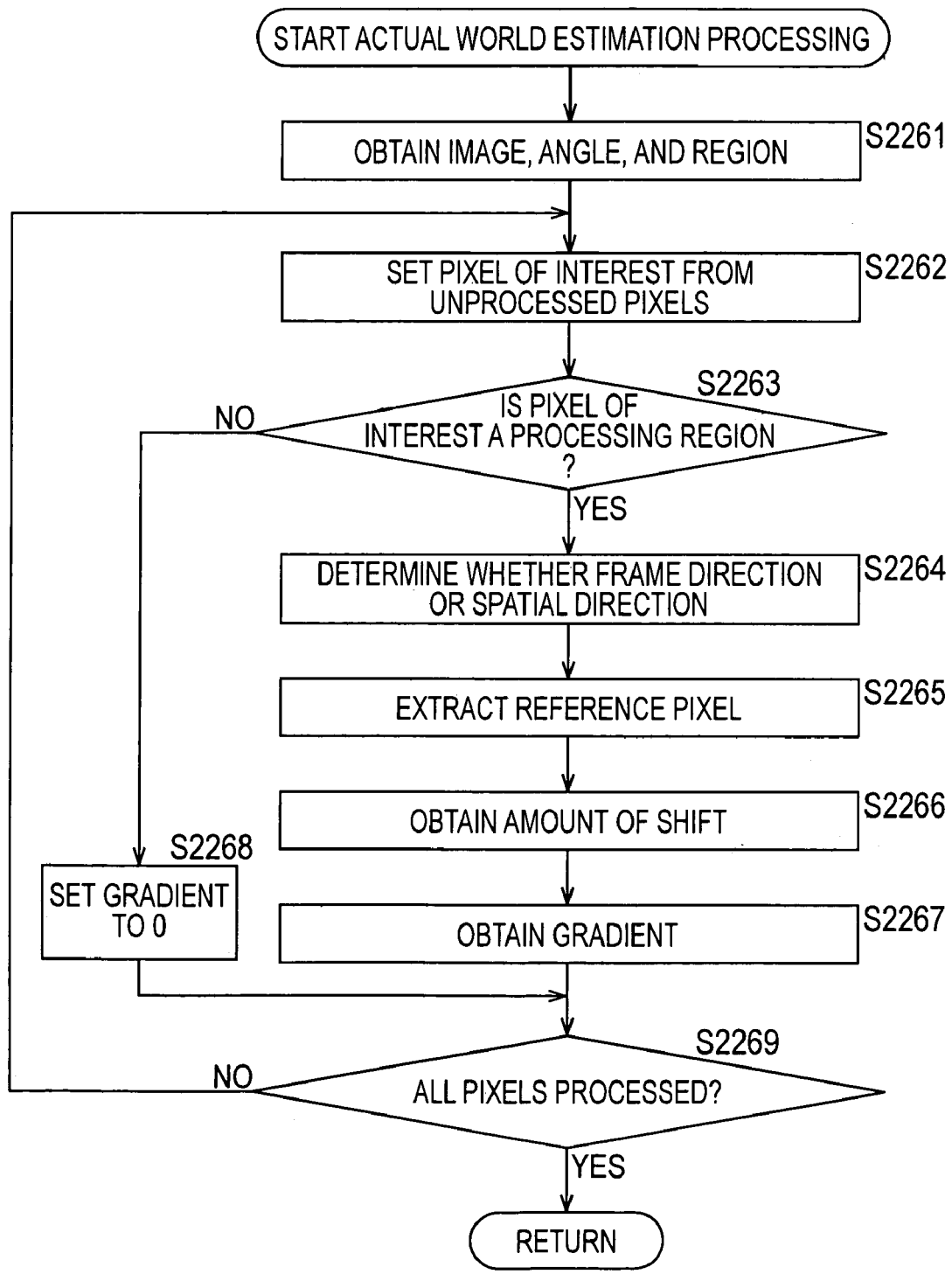
FIG. 117 is a flowchart for describing the processing of actual world estimation with the actual world estimating unit shown in FIG. 116.

Next, description will be made regarding the actual world estimating processing by the actual world estimating unit 102 in FIG. 116 with reference to the flowchart in FIG. 117.

In step S2261, the reference-pixel extracting unit 2251 acquires movement and region information as the data continuity information from the data continuity detecting unit 101 along with an input image.

In step S2262, the reference-pixel extracting unit 2251 sets a pixel of interest from unprocessed pixels in the input image.

In step S2263, the reference-pixel extracting unit 2251 determines regarding whether or not the pixel of interest is in a processing region based on the region information of the data continuity information, and in the event that determination is made that the pixel of interest is not a pixel in a processing region, the processing proceeds to step S2268, wherein the gradient estimating unit 2252 is informed that the pixel of interest is in a non-processing region, in response to this, the gradient estimating unit 2252 sets the gradient for the corresponding pixel of interest to zero, and further adds the pixel value of the pixel of interest to this, and outputs this as actual world estimating information to the image generating unit 103, and also the processing proceeds to step S2269. Also, in the event that determination is made that the pixel of interest is in a processing region, the processing proceeds to step S2264.

In step S2264, the reference-pixel extracting unit 2211 determines regarding whether movement as data continuity is movement close to the frame direction or movement close to the spatial direction based on the movement information included in the data continuity information. That is to say, if we say that an angle indicating the spatial and temporal directions within a surface made up of the frame direction T, which is taken as a reference axis, and the spatial direction Y, is taken as θv, in the event that an angle θv of movement as data continuity is 45°>θv≧0°, or 180°>θv≧135°, the reference-pixel extracting unit 2251 determines that the movement as continuity of the pixel of interest is close to the frame direction, and in the event that the angle θv having data continuity is 135°>θv≧45°, determines that the movement as continuity of the pixel of interest is close to the spatial direction.

Figure 118:
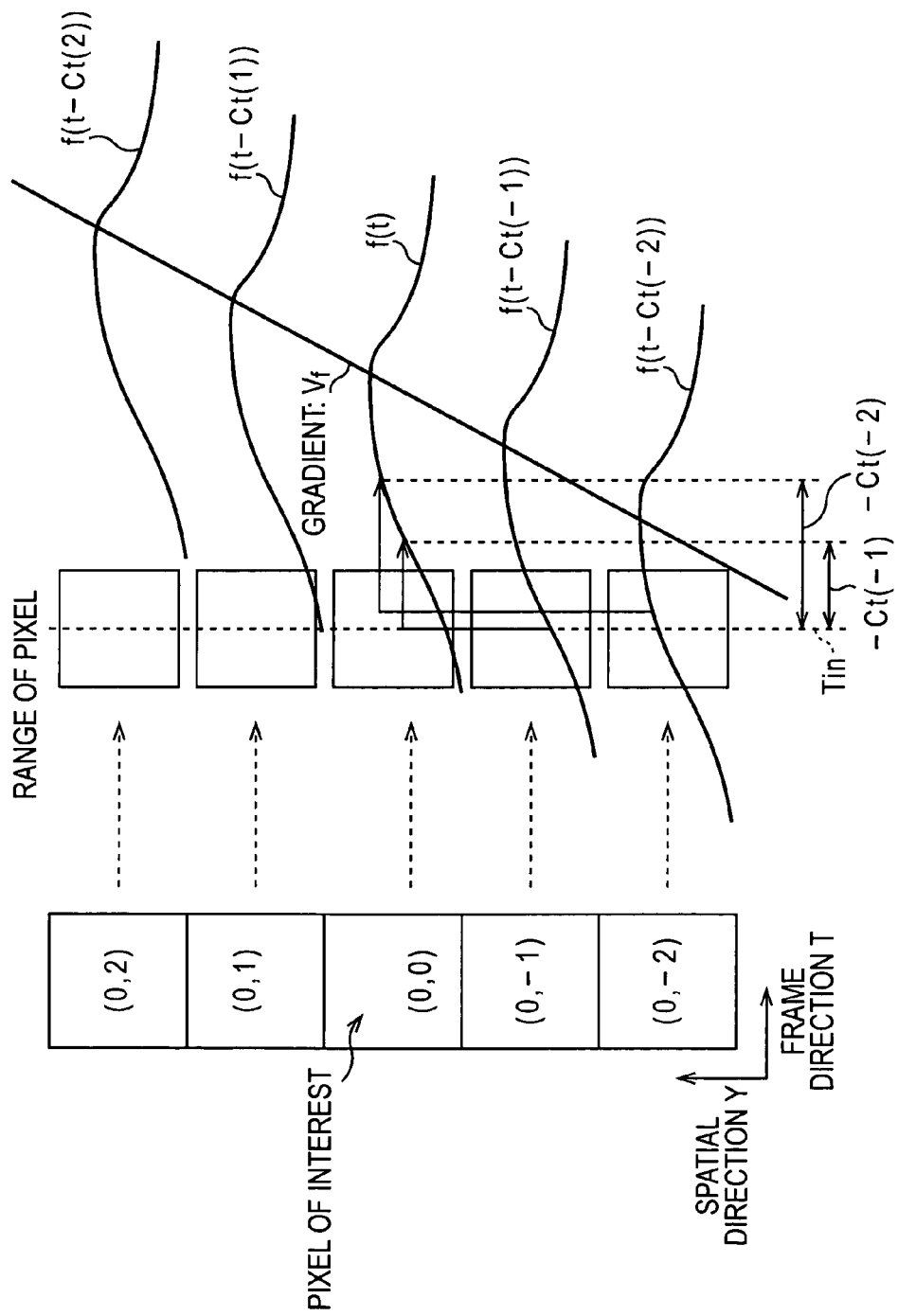
FIG. 118 is a diagram for describing processing for obtaining the gradient in the frame direction.

In step S2265, the reference-pixel extracting unit 2251 extracts the positional information and pixel values of reference pixels corresponding to the determined direction from the input image respectively, and outputs these to the gradient estimating unit 2252. That is to say, reference pixels become data to be used for calculating a later-described gradient, so are preferably extracted according to movement as continuity. Accordingly, corresponding to any determined direction of the frame direction and the spatial direction, reference pixels in a long range in the direction thereof are extracted. More specifically, for example, in the event that determination is made that movement is close to the spatial direction, as shown in FIG. 118, when a pixel (t, y)=(0, 0) in the center of FIG. 118 is taken as a pixel of interest, the reference-pixel extracting unit 2251 extracts each pixel value of pixels (t, y)=(0, 2), (0, 1), (0, 0), (0, −1), and (0, −2). Note that in FIG. 118, let us say that both sizes in the frame direction and in the spatial direction of each pixel is 1.

In other words, the reference-pixel extracting unit 2251 extracts pixels in a long range in the spatial direction as reference pixels such that the reference pixels are 5 pixels in total of 2 pixels respectively in the spatial direction (upper/lower direction in the drawing) centered on the pixel of interest.

On the contrary, in the event that determination is made that the direction is the frame direction, the reference-pixel extracting unit 2251 extracts pixels in a long range in the horizontal direction as reference pixels such that the reference pixels are 5 pixels in total of 2 pixels respectively in the frame direction (left/right direction in the drawing) centered on the pixel of interest, and outputs these to the approximation-function estimating unit 2252. Needless to say, the number of reference pixels is not restricted to 5 pixels as described above, so any number of pixels may be employed.

In step S2266, the gradient estimating unit 2252 calculates a shift amount of each pixel value based on the reference pixel information input from the reference-pixel extracting unit 2251, and the movement $V_f$ in the direction of continuity. That is to say, in the event that the approximation function f(t) corresponding to the spatial direction Y=0 is taken as a basis, the approximation functions corresponding to the spatial directions Y=−2, −1, 1, and 2 are continuous along the gradient $V_f$ as continuity as shown in FIG. 118, so the respective approximation functions are described as f(t−Ct(2)), f(t−Ct(1)), f(t−Ct(−1)), and f(t−Ct(−2)), and are represented as functions shifted by each shift amount in the frame direction T for each of the spatial directions Y=−2, −1, 1, and 2.

Accordingly, the gradient estimating unit 2252 obtains shift amounts Ct(−2) through Ct(2) of these. For example, in the event that reference pixels are extracted such as shown in FIG. 118, with regard to the shift amounts thereof, the reference pixel (0, 2) in the drawing becomes Ct(2)=2/$V_f$, the reference pixel (0, 1) becomes Ct(1)=1/$V_f$, the reference pixel (0, 0) becomes Ct(0)=0, the reference pixel (0, −1) becomes Ct(−1)=−1/$V_f$, and the reference pixel (0, −2) becomes Ct(−2)=−2/$V_f$. The gradient estimating unit 2252 obtains these shift amounts Ct(−2) through Ct(2).

In step S2267, the gradient estimating unit 2252 calculates (estimates) a gradient in the frame direction of the pixel of interest. For example, as shown in FIG. 118, in the event that the direction of continuity regarding the pixel of interest is an angle close to the spatial direction, the pixel values between the pixels adjacent in the frame direction exhibit great differences, but change between the pixels in the spatial direction is small and similar, and accordingly, the gradient estimating unit 2252 substitutes the difference between the pixels in the frame direction for the difference between the pixels in the spatial direction, and obtains a gradient at the pixel of interest, by seizing change between the pixels in the spatial direction as change in the frame direction T according to a shift amount.

Figure 119:
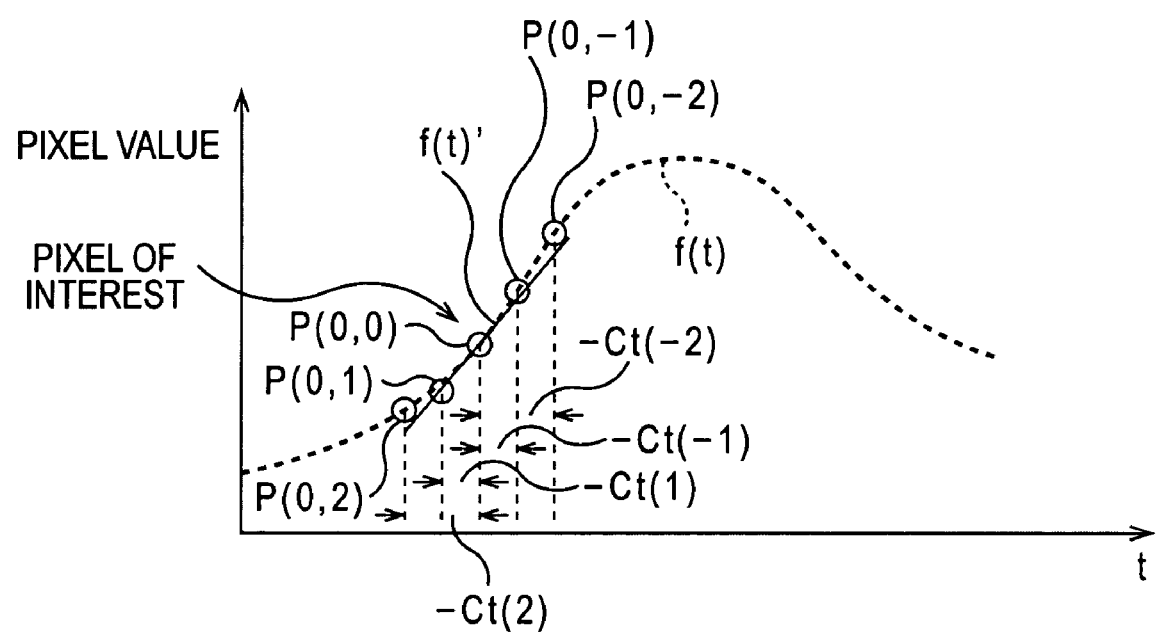
FIG. 119 is a diagram for describing processing for obtaining the gradient in the frame direction.

That is to say, if we assume that the approximation function f(t) approximately describing the real world exists, the relations between the above shift amounts and the pixel values of the respective reference pixels is such as shown in FIG. 119. Here, the pixel values of the respective pixels in FIG. 119 are represented as P(0, 2), P(0, 1), P(0, 0), P(0, −1), and P(0, −2) from the top. As a result, with regard to the pixel value P and shift amount Ct near the pixel of interest (0, 0), 5 pairs of relations (P, Ct)=((P(0, 2), −Ct(2)), (P(0, 1), −Ct(1)), (P(0, −1)), −Ct(−1)), (P(0, −2), −Ct(−2)), and (P(0, 0), 0) are obtained.

Now, with the pixel value P, shift amount Ct, and gradient Kt (gradient on the approximation function f(t)), the relation such as the following Expression (36) holds.

$$P = Kt \times Ct \qquad (36)$$

The above Expression (36) is a one-variable function regarding the variable Kt, so the gradient estimating unit 2212 obtains the variable Kt (gradient) using the least squares method of one variable.

That is to say, the gradient estimating unit 2252 obtains the gradient of the pixel of interest by solving a normal equation such as shown in the following Expression (37), adds the pixel value of the pixel of interest, and the gradient information in the direction of continuity to this, and outputs this to the image generating unit 103 as actual world estimating information.

$$K_t = \frac{\sum_{i=1}^{m}(C_{ti} - P_i)}{\sum_{i=1}^{m}(C_{ti})^2} \qquad (37)$$

Here, i denotes a number for identifying each pair of the pixel value P and shift amount Ct of the above reference pixel, 1 through m. Also, m denotes the number of the reference pixels including the pixel of interest.

In step S2269, the reference-pixel extracting unit 2251 determines regarding whether or not all of the pixels have been processed, and in the event that determination is made that all of the pixels have not been processed, the processing returns to step S2262. Also, in the event that determination is made that all of the pixels have been processed in step S2269, the processing ends.

Note that the gradient in the frame direction to be output as actual world estimating information by the above processing is employed at the time of calculating desired pixel values to be obtained finally through extrapolation/interpolation. Also, with the above example, description has been made regarding the gradient at the time of calculating double-density pixels as an example, but in the event of calculating pixels having a density more than a double density, gradients in many more positions necessary for calculating the pixel values may be obtained.

For example, as shown in FIG. 105, in the event that pixels having a quadruple density in the temporal and spatial directions in total of a double density in the horizontal direction and also a double density in the frame direction are generated, the gradient Kt of the approximation function f(t) corresponding to the respective positions Pin, Pat, and Pbt in FIG. 105 should be obtained, as described above.

Also, with the above example, an example for obtaining double-density pixel values has been described, but the approximation function f(t) is a continuous function, so it is possible to obtain a necessary gradient even regarding the pixel value of a pixel in a position other than a pluralized density.

Needless to say, there is no restriction regarding the sequence of processing for obtaining gradients on the approximation function as to the frame direction or the spatial direction or derivative values. Further, with the above example in the spatial direction, description has been made using the relation between the spatial direction Y and frame direction T, but the relation between the spatial direction X and frame direction T may be employed instead of this. Further, a gradient (in any one-dimensional direction) or a derivative value may be selectively obtained from any two-dimensional relation of the temporal and spatial directions.

According to the above arrangements, it is possible to generate and output gradients on the approximation function in the frame direction (temporal direction) of positions necessary for generating pixels as actual world estimating information by using the pixel values of pixels near a pixel of interest without obtaining the approximation function in the frame direction approximately representing the actual world.

Next, description will be made regarding another embodiment example of the actual world estimating unit 102 (FIG. 3) with reference to FIG. 120 through FIG. 150.

FIG. 120 is a diagram for describing the principle of this embodiment example.

As shown in FIG. 120, a signal (light intensity allocation) in the actual world 1, which is an image cast on the sensor 2, is represented with a predetermined function F. Note that hereafter, with the description of this embodiment example, the signal serving as an image in the actual world 1 is particularly referred to as a light signal, and the function F is particularly referred to as a light signal function F.

With this embodiment example, in the event that the light signal in the actual world 1 represented with the light signal function F has predetermined continuity, the actual world estimating unit 102 estimates the light signal function F by approximating the light signal function F with a predetermined function f using an input image (image data including continuity of data corresponding to continuity) from the sensor 2, and data continuity information (data continuity information corresponding to continuity of the input image data) from the data continuity detecting unit 101. Note that with the description of this embodiment example, the function f is particularly referred to as an approximation function f, hereafter.

In other words, with this embodiment example, the actual world estimating unit 102 approximates (describes) the image (light signal in the actual world 1) represented with the light signal function F using a model 161 (FIG. 7) represented with the approximation function f. Accordingly, hereafter, this embodiment example is referred to as a function approximating method.

Now, description will be made regarding the background wherein the present applicant has invented the function approximating method, prior to entering the specific description of the function approximating method.

Figure 121:
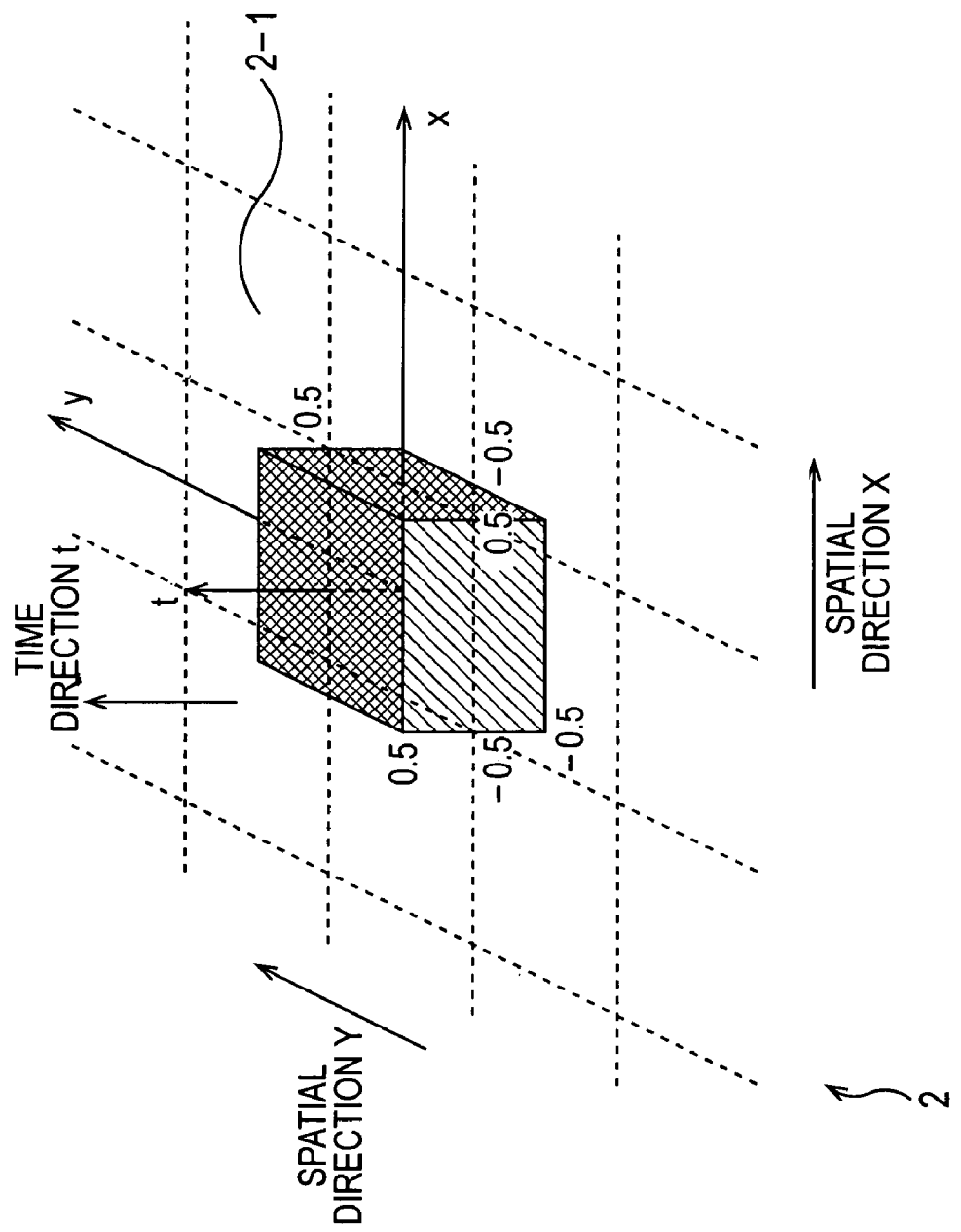

FIG. 121 is a diagram for describing integration effects in the case in which the sensor 2 is treated as a CCD.

As shown in FIG. 121, multiple detecting elements 2-1 are disposed on the plane of the sensor 2.

With the example in FIG. 121, a direction in parallel with a predetermined side of the detecting elements 2-1 is taken as the X direction, which is one direction in the spatial direction, and the a direction orthogonal to the X direction is taken as the Y direction, which is another direction in the spatial direction. Also, the direction perpendicular to the X-Y plane is taken as the direction t serving as the temporal direction.

Also, with the example in FIG. 121, the spatial shape of each detecting element 2-1 of the sensor 2 is represented with a square of which one side is 1 in length. The shutter time (exposure time) of the sensor 2 is represented with 1.

Further, with the example in FIG. 121, the center of one detecting element 2-1 of the sensor 2 is taken as the origin (position x=0 in the X direction, and position y=0 in the Y direction) in the spatial direction (X direction and Y direction), and the intermediate point-in-time of the exposure time is taken as the origin (position t=0 in the t direction) in the temporal direction (t direction).

In this case, the detecting element 2-1 of which the center is in the origin (x=0, y=0) in the spatial direction subjects the light signal function F(x, y, t) to integration with a range between −0.5 and 0.5 in the X direction, range between −0.5 and 0.5 in the Y direction, and range between −0.5 and 0.5 in the t direction, and outputs the integral value thereof as a pixel value P.

That is to say, the pixel value P output from the detecting element 2-1 of which the center is in the origin in the spatial direction is represented with the following Expression (38).

$$P = \int_{-0.5}^{+0.5} \int_{-0.5}^{+0.5} \int_{-0.5}^{+0.5} F(x,y,t) dx dy dt \tag{38}$$

The other detecting elements 2-1 also output the pixel value P shown in Expression (38) by taking the center thereof as the origin in the spatial direction in the same way.

Figure 122:
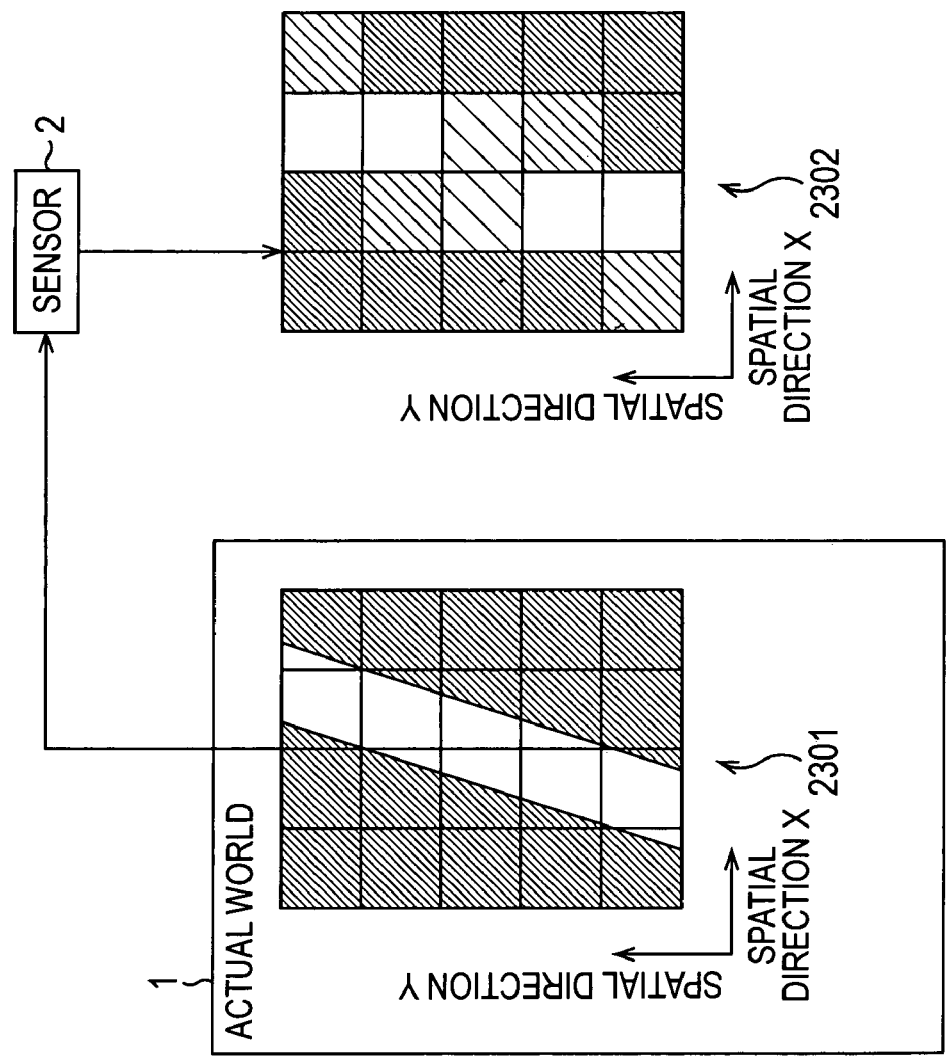

FIG. 122 is a diagram for describing a specific example of the integration effects of the sensor 2.

In FIG. 122, the X direction and Y direction represent the X direction and Y direction of the sensor 2 (FIG. 121).

A portion 2301 of the light signal in the actual world 1 (hereafter, such a portion is referred to as a region) represents an example of a region having predetermined continuity.

Note that the region 2301 is a portion of the continuous light signal (continuous region). On the other hand, in FIG. 122, the region 2301 is shown as divided into 20 small regions (square regions) in reality. This is because of representing that the size of the region 2301 is equivalent to the size wherein the four detecting elements (pixels) of the sensor 2 in the X direction, and also the five detecting elements (pixels) of the sensor 2 in the Y direction are arrayed. That is to say, each of the 20 small regions (virtual regions) within the region 2301 is equivalent to one pixel.

Also, a white portion within the region 2301 represents a light signal corresponding to a fine line. Accordingly, the region 2301 has continuity in the direction wherein a fine line continues. Hereafter, the region 2301 is referred to as the fine-line-including actual world region 2301.

In this case, when the fine-line-including actual world region 2301 (a portion of a light signal in the actual world 1) is detected by the sensor 2, region 2302 (hereafter, this is referred to as a fine-line-including data region 2302) of the input image (pixel values) is output from the sensor 2 by integration effects.

Note that each pixel of the fine-line-including data region 2302 is represented as an image in the drawing, but is data representing a predetermined value in reality. That is to say, the fine-line-including actual world region 2301 is changed (distorted) to the fine-line-including data region 2302, which is divided into 20 pixels (20 pixels in total of 4 pixels in the X direction and also 5 pixels in the Y direction) each having a predetermined pixel value by the integration effects of the sensor 2.

Figure 123:
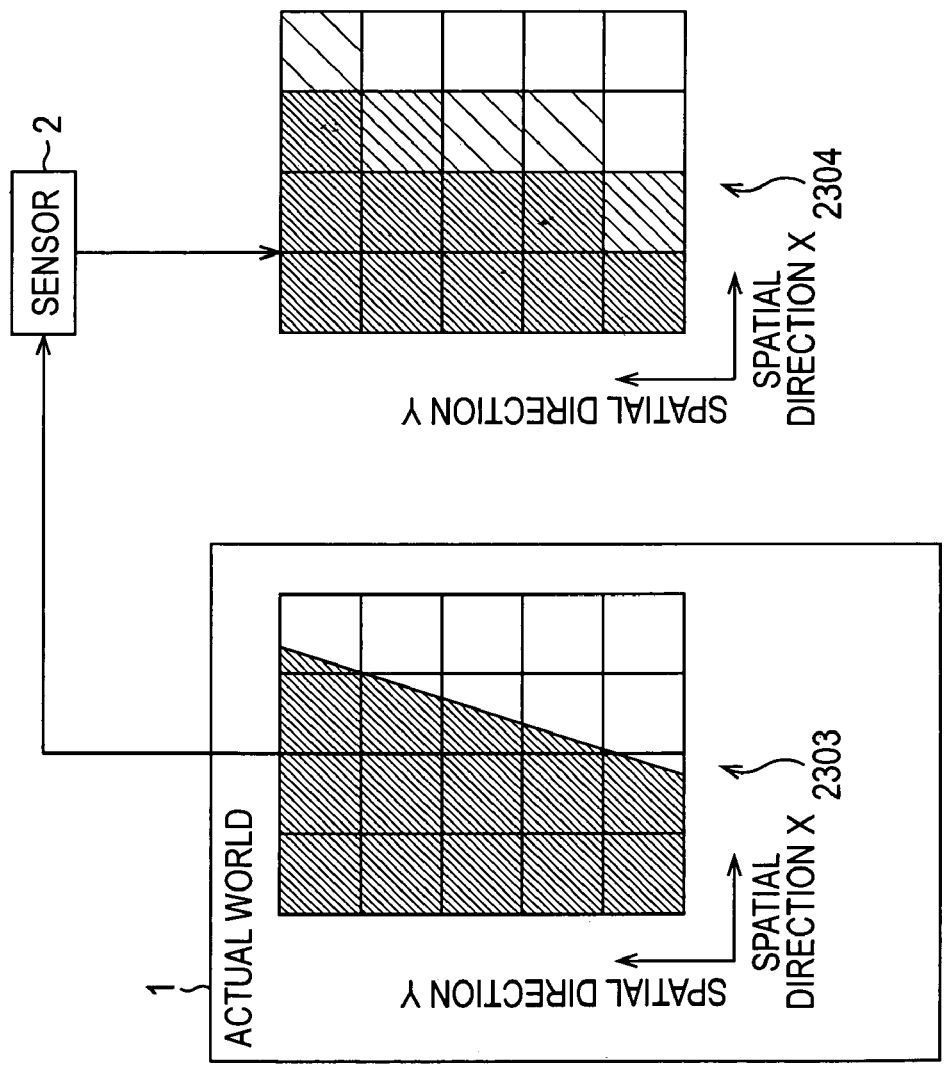

FIG. 123 is a diagram for describing another specific example (example different from FIG. 122) of the integration effects of the sensor 2.

In FIG. 123, the X direction and Y direction represent the X direction and Y direction of the sensor 2 (FIG. 121).

A portion (region) 2303 of the light signal in the actual world 1 represents another example (example different from the fine-line-including actual region 2301 in FIG. 122) of a region having predetermined continuity.

Note that the region 2303 is a region having the same size as the fine-line-including actual world region 2301. That is to say, the region 2303 is also a portion of the continuous light signal in the actual world 1 (continuous region) as with the fine-line-including actual world region 2301 in reality, but is shown as divided into 20 small regions (square regions) equivalent to one pixel of the sensor 2 in FIG. 123.

Also, the region 2303 includes a first portion edge having predetermined first light intensity (value), and a second portion edge having predetermined second light intensity (value). Accordingly, the region 2303 has continuity in the direction wherein the edges continue. Hereafter, the region 2303 is referred to as the two-valued-edge-including actual world region 2303.

In this case, when the two-valued-edge-including actual world region 2303 (a portion of the light signal in the actual world 1) is detected by the sensor 2, a region 2304 (hereafter, referred to as two-valued-edge-including data region 2304) of the input image (pixel value) is output from the sensor 2 by integration effects.

Note that each pixel value of the two-valued-edge-including data region 2304 is represented as an image in the drawing as with the fine-line-including data region 2302, but is data representing a predetermined value in reality. That is to say, the two-valued-edge-including actual world region 2303 is changed (distorted) to the two-valued-edge-including data region 2304, which is divided into 20 pixels (20 pixels in total of 4 pixels in the X direction and also 5 pixels in the Y direction) each having a predetermined pixel value by the integration effects of the sensor 2.

Conventional image processing devices have regarded image data output from the sensor 2 such as the fine-line-including data region 2302, two-valued-edge-including data region 2304, and the like as the origin (basis), and also have subjected the image data to the subsequent image processing. That is to say, regardless of that the image data output from the sensor 2 had been changed (distorted) to data different from the light signal in the actual world 1 by integration effects, the conventional image processing devices have performed image processing on assumption that the data different from the light signal in the actual world 1 is correct.

As a result, the conventional image processing devices have provided a problem wherein based on the waveform (image data) of which the details in the actual world is distorted at the stage wherein the image data is output from the sensor 2, it is very difficult to restore the original details from the waveform.

Accordingly, with the function approximating method, in order to solve this problem, as described above (as shown in FIG. 120), the actual world estimating unit 102 estimates the light signal function F by approximating the light signal function F (light signal in the actual world 1) with the approximation function f based on the image data (input image) such as the fine-line-including data region 2302, and two-valued-edge-including data region 2304 output from the sensor 2.

Thus, at a later stage than the actual world estimating unit 102 (in this case, the image generating unit 103 in FIG. 3), the processing can be performed by taking the image data wherein integration effects are taken into consideration, i.e., image data that can be represented with the approximation function f as the origin.

Hereafter, description will be made independently regarding three specific methods (first through third function approximating methods), of such a function approximating method with reference to the drawings.

First, description will be made regarding the first function approximating method with reference to FIG. 124 through FIG. 138.

Figure 124:
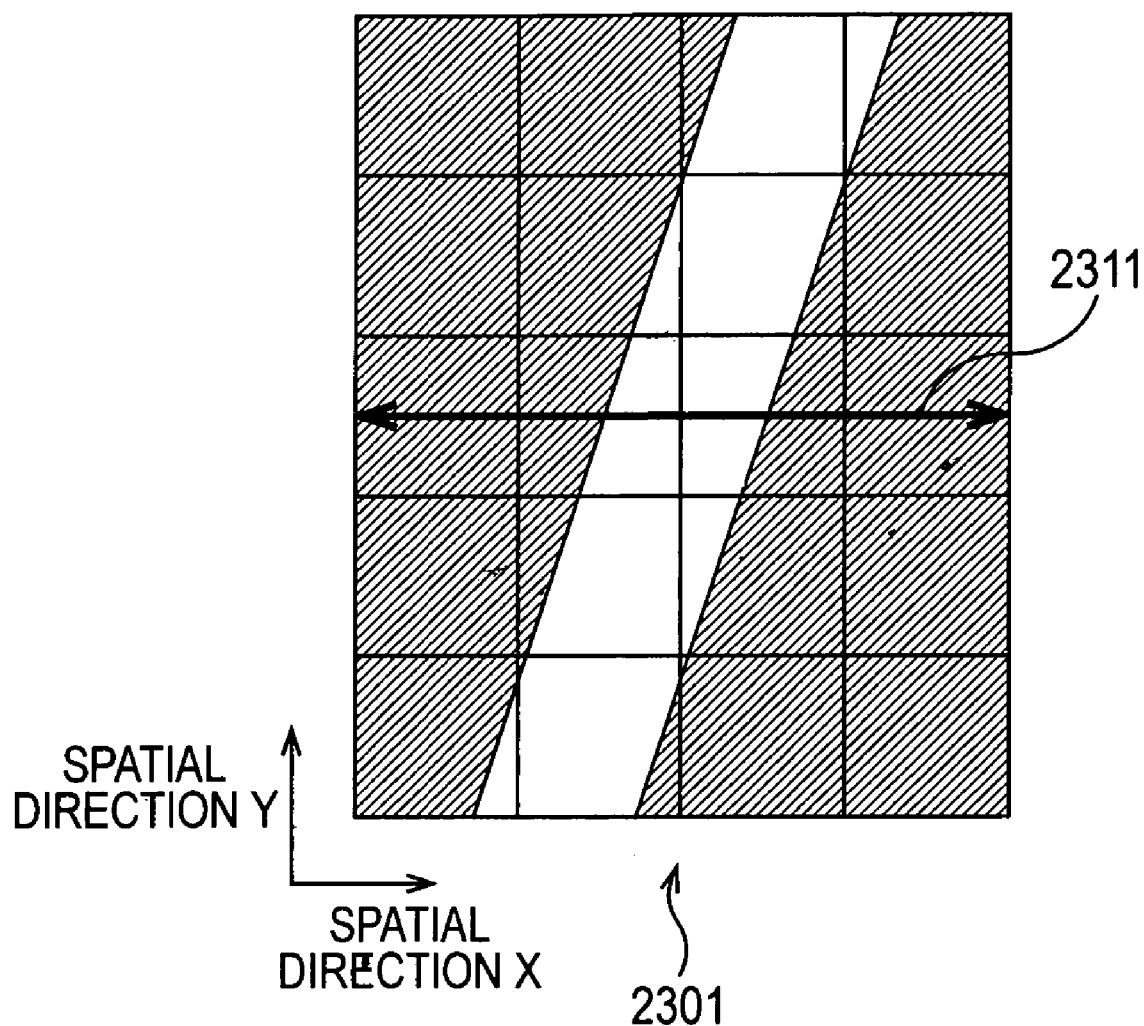

FIG. 124 is a diagram representing the fine-line-including actual world region 2301 shown in FIG. 122 described above again.

In FIG. 124, the X direction and Y direction represent the X direction and Y direction of the sensor 2 (FIG. 121).

The first function approximating method is a method for approximating a one-dimensional waveform (hereafter, such a waveform is referred to as an X cross-sectional waveform F(x)) wherein the light signal function F(x, y, t) corresponding to the fine-line-including actual world region 2301 such as shown in FIG. 124 is projected in the X direction (direction of an arrow 2311 in the drawing), with the approximation function f(x) serving as an n-dimensional (n is an arbitrary integer) polynomial. Accordingly, hereafter, the first function approximating method is particularly referred to as a one-dimensional polynomial approximating method.

Note that with the one-dimensional polynomial approximating method, the X cross-sectional waveform F(x), which is to be approximated, is not restricted to a waveform corresponding to the fine-line-including actual world region 2301 in FIG. 124, of course. That is to say, as described later, with the one-dimensional polynomial approximating method, any waveform can be approximated as long as the X cross-sectional waveform F(x) corresponds to the light signals in the actual world 1 having continuity.

Also, the direction of the projection of the light signal function F(x, y, t) is not restricted to the X direction, or rather the Y direction or t direction may be employed. That is to say, with the one-dimensional polynomial approximating method, a function F(y) wherein the light signal function F(x, y, t) is projected in the Y direction may be approximated with a predetermined approximation function f(y), or a function F(t) wherein the light signal function F(x, y, t) is projected in the t direction may be approximated with a predetermined approximation f(t).

More specifically, the one-dimensional polynomial approximating method is a method for approximating, for example, the X cross-sectional waveform F(x) with the approximation function f(x) serving as an n-dimensional polynomial such as shown in the following Expression (39).

$$f(x) = w_0 + w_1 x + w_2 x + \ldots + w_n x^n = \sum_{i=0}^{n} w_i x^i \qquad (39)$$

That is to say, with the one-dimensional polynomial approximating method, the actual world estimating unit 102 estimates the X cross-sectional waveform F(x) by calculating the coefficient (features) $w_i$ of $x^i$ in Expression (39).

This calculation method of the features $w_i$ is not restricted to a particular method, for example, the following first through third methods may be employed.

That is to say, the first method is a method that has been employed so far.

On the other hand, the second method is a method that has been newly invented by the present applicant, which is a method that considers continuity in the spatial direction as to the first method.

However, as described later, with the first and second methods, the integration effects of the sensor 2 are not taken into consideration. Accordingly, an approximation function f(x) obtained by substituting the features $w_i$ calculated by the first method or the second method for the above Expression (39) is an approximation function regarding an input image, but strictly speaking, cannot be referred to as the approximation function of the X cross-sectional waveform F(x).

Consequently, the present applicant has invented the third method that calculates the features $w_i$ further in light of the integration effects of the sensor 2 as to the second method. An approximation function f(x) obtained by substituting the features $w_i$ calculated with this third method for the above Expression (39) can be referred to as the approximation function of the X cross-sectional waveform F(x) in that the integration effects of the sensor 2 are taken into consideration.

Thus, strictly speaking, the first method and the second method cannot be referred to as the one-dimensional polynomial approximating method, and the third method alone can be referred to as the one-dimensional polynomial approximating method.

Figure 125:
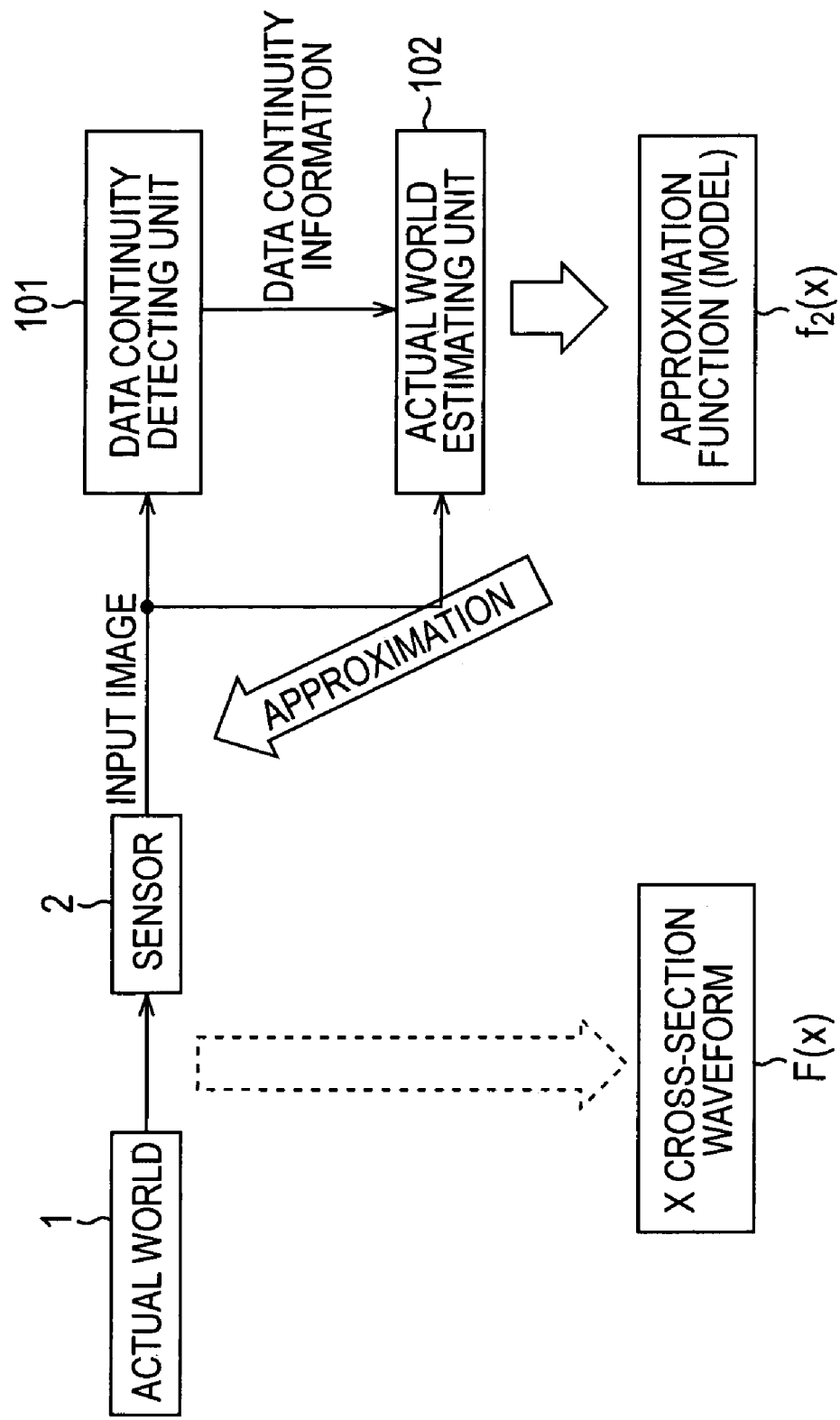

In other words, as shown in FIG. 125, the second method is an embodiment of the actual world estimating unit 102 according to the present invention, which is different from the one-dimensional polynomial approximating method. That is to say, FIG. 125 is a diagram for describing the principle of the embodiment corresponding to the second method.

As shown in FIG. 125, with the embodiment corresponding to the second method, in the event that the light signal in the actual world 1 represented with the light signal function F has predetermined continuity, the actual world estimating unit 102 does not approximate the X cross-sectional waveform F(x) with an input image (image data including continuity of data corresponding to continuity) from the sensor 2, and data continuity information (data continuity information corresponding to continuity of input image data) from the data continuity detecting unit 101, but approximates the input image from the sensor 2 with a predetermined approximation function $f_2(x)$.

Thus, it is hard to say that the second method is a method having the same level as the third method in that approximation of the input image alone is performed without considering the integral effects of the sensor 2. However, the second method is a method superior to the conventional first method in that the second method takes continuity in the spatial direction into consideration.

Hereafter, description will be made independently regarding the details of the first method, second method, and third method in this order.

Note that hereafter, in the event that the respective approximation functions f(x) generated by the first method, second method, and third method are distinguished from that of the other method, they are particularly referred to as approximation function $f_1(x)$, approximation function $f_2(x)$, and approximation function $f_3(x)$ respectively.

First, description will be made regarding the details of the first method.

Figure 126:
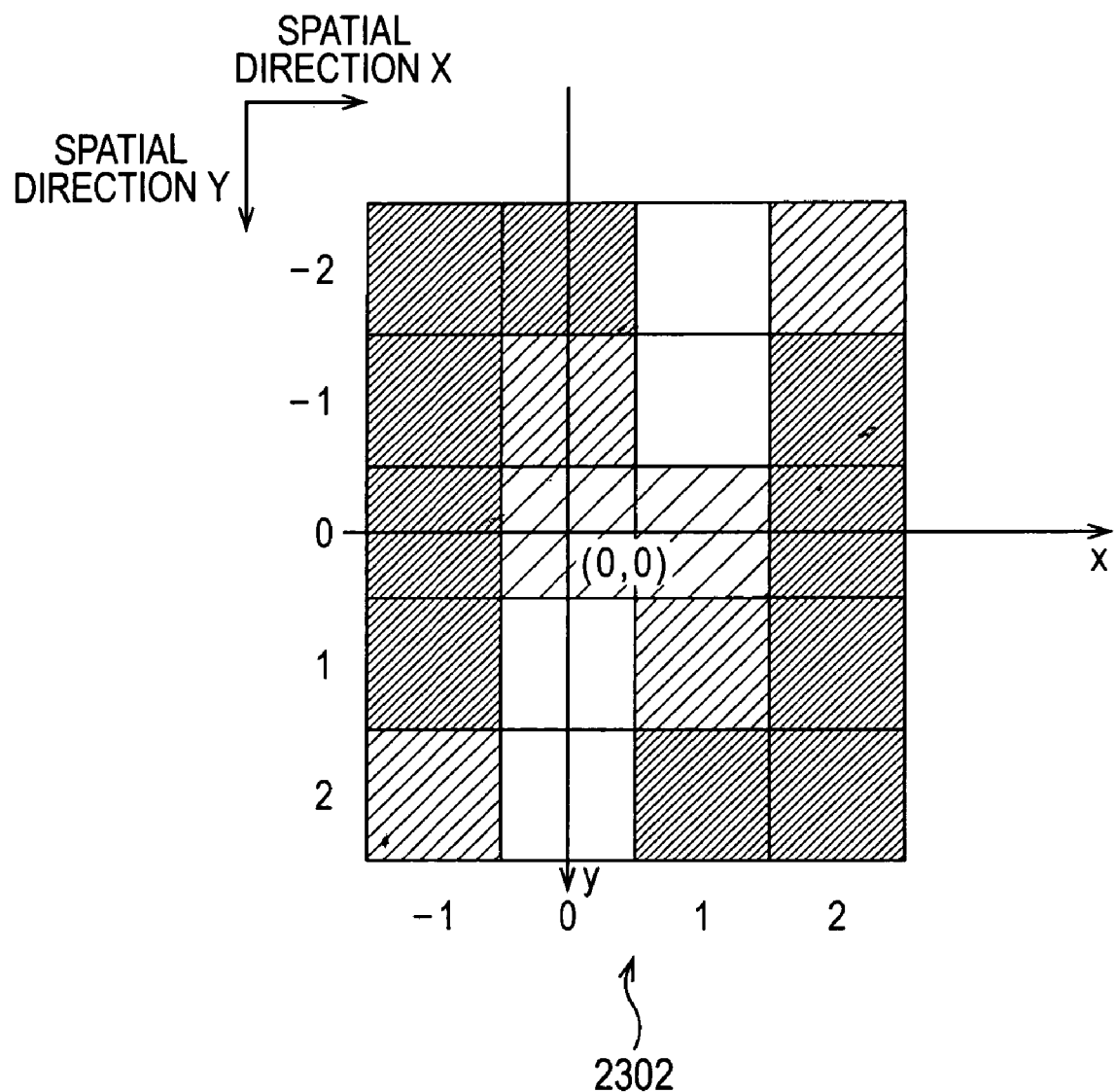

With the first method, on condition that the approximation function $f_1(x)$ shown in the above Expression (39) holds within the fine-line-including actual world region 2301 in FIG. 126, the following prediction equation (40) is defined.

$$P(x,y)=f_1(x)+e \quad (40)$$

In Expression (40), x represents a pixel position relative as to the X direction from a pixel of interest. y represents a pixel position relative as to the Y direction from the pixel of interest. e represents a margin of error. Specifically, for example, as shown in FIG. 126, let us say that the pixel of interest is the second pixel in the X direction from the left, and also the third pixel in the Y direction from the bottom in the drawing, of the fine-line-including data region 2302 (data of which the fine-line-including actual world region 2301 (FIG. 124) is detected by the sensor 2, and output). Also, let us say that the center of the pixel of interest is the origin (0, 0), and a coordinates system (hereafter, referred to as a pixel-of-interest coordinates system) of which axes are an x axis and y axis respectively in parallel with the X direction and Y direction of the sensor 2 (FIG. 121) is set. In this case, the coordinates value (x, y) of the pixel-of-interest coordinates system represents a relative pixel position.

Also, in Expression (40), P(x, y) represents a pixel value in the relative pixel positions (x, y). Specifically, in this case, the P(x, y) within the fine-line-including data region 2302 is such as shown in FIG. 127.

FIG. 127 represents this pixel value P(x, y) in a graphic manner.

In FIG. 127, the respective vertical axes of the graphs represent pixel values, and the horizontal axes represent a relative position x in the X direction from the pixel of interest. Also, in the drawing, the dashed line in the first graph from the top represents an input pixel value P(x, −2), the chain triple-dashed line in the second graph from the top represents an input pixel value P(x, −1), the solid line in the third graph from the top represents an input pixel value P(x, 0), the chain single-dashed line in the fourth graph from the top represents an input pixel value P(x, 1), and the chain double-dashed line in the fifth graph from the top (the first from the bottom) represents an input pixel value P(x, 2) respectively.

Upon the 20 input pixel values P(x, −2), P(x, −1), P(x, 0), P(x, 1), and P(x, 2) (however, x is any one integer value of −1 through 2) shown in FIG. 127 being substituted for the above Expression (40) respectively, 20 equations as shown in the following Expression (41) are generated. Note that each $e_k$ (k is any one of integer values 1 through 20) represents a margin of error.

$$\begin{aligned}
P(-1,-2) &= f_1(-1) + e_1 \\
P(0,-2) &= f_1(0) + e_2 \\
P(1,-2) &= f_1(1) + e_3 \\
P(2,-2) &= f_1(2) + e_4 \\
P(-1,-1) &= f_1(-1) + e_5 \\
P(0,-1) &= f_1(0) + e_6 \\
P(1,-1) &= f_1(1) + e_7 \\
P(2,-1) &= f_1(2) + e_8 \\
P(-1,0) &= f_1(-1) + e_9 \\
P(0,0) &= f_1(0) + e_{10}
\end{aligned} \quad (41)$$

-continued $$P(1, 0) = f_1(1) + e_{11}$$

$$P(2, 0) = f_1(2) + e_{12}$$

$$P(-1, 1) = f_1(-1) + e_{13}$$

$$P(0, 1) = f_1(0) + e_{14}$$

$$P(1, 1) = f_1(1) + e_{15}$$

$$P(2, 1) = f_1(2) + e_{16}$$

$$P(-1, 2) = f_1(-1) + e_{17}$$

$$P(0, 2) = f_1(0) + e_{18}$$

$$P(1, 2) = f_1(1) + e_{19}$$

$$P(2, 2) = f_1(2) + e_{20}$$

Expression (41) is made up of 20 equations, so in the event that the number of the features $w_i$ of the approximation function $f_1(x)$ is less than 20, i.e., in the event that the approximation function $f_1(x)$ is a polynomial having the number of dimensions less than 19, the features $w_i$ can be calculated using the least squares method, for example. Note that the specific solution of the least squares method will be described later.

Figure 128:
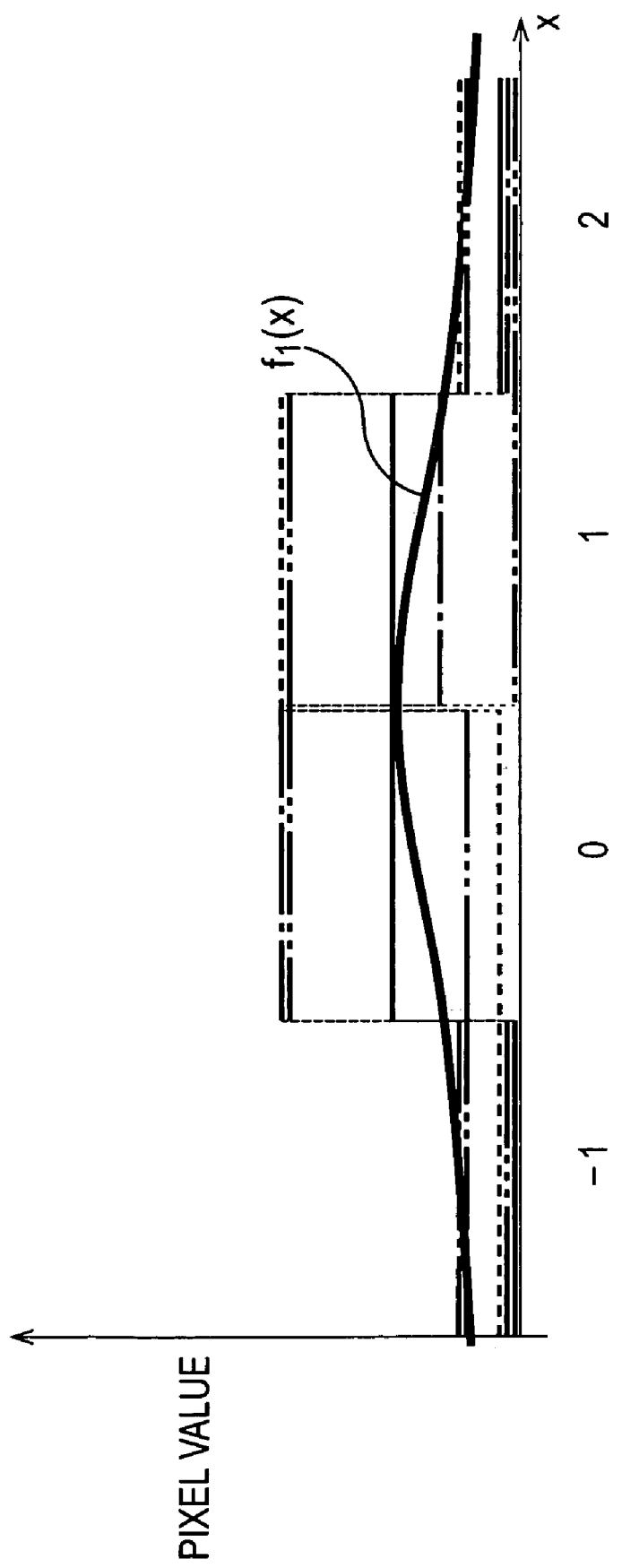

For example, if we say that the number of dimensions of the approximation function $f_1(x)$ is five, the approximation function $f_1(x)$ calculated with the least squares method using Expression (41) (the approximation function $f_1(x)$ generated by the calculated features $w_i$) becomes a curve shown in FIG. 128.

Note that in FIG. 128, the vertical axis represents pixel values, and the horizontal axis represents a relative position x from the pixel of interest.

That is to say, for example, if we supplement the respective 20 pixel values P(x, y) (the respective input pixel values P(x, −2), P(x, −1), P(x, 0), P(x, 1), and P(x, 2) shown in FIG. 127) making up the fine-line-including data region 2302 in FIG. 126 along the x axis without any modification (if we regard a relative position y in the Y direction as constant, and overlay the five graphs shown in FIG. 127), multiple lines (dashed line, chain triple-dashed line, solid line, chain single-dashed line, and chain double-dashed line) in parallel with the x axis, such as shown in FIG. 128, are distributed.

However, in FIG. 128, the dashed line represents the input pixel value P(x, −2), the chain triple-dashed line represents the input pixel value P(x, −1), the solid line represents the input pixel value P(x, 0), the chain single-dashed line represents the input pixel value P(x, 1), and the chain double-dashed line represents the input pixel value P(x, 2) respectively. Also, in the event of the same pixel value, lines more than 2 lines are overlaid in reality, but in FIG. 128, the lines are drawn so as to distinguish each line, and so as not to overlay each line.

The respective 20 input pixel values (P(x, −2), P(x, −1), P(x, 0), P(x, 1), and P(x, 2)) thus distributed, and a regression curve (the approximation function $f_1(x)$ obtained by substituting the features $w_i$ calculated with the least squares method for the above Expression (38)) so as to minimize the error of the value $f_1(x)$ become a curve (approximation function $f_1(x)$) shown in FIG. 128.

Thus, the approximation function $f_1(x)$ represents nothing but a curve connecting in the X direction the means of the pixel values (pixel values having the same relative position x in the X direction from the pixel of interest) P(x, −2), P(x, −1), P(x, 0), P(x, 1), and P(x, 2) in the Y direction. That is to say, the approximation function $f_1(x)$ is generated without considering continuity in the spatial direction included in the light signal.

Figure 129:
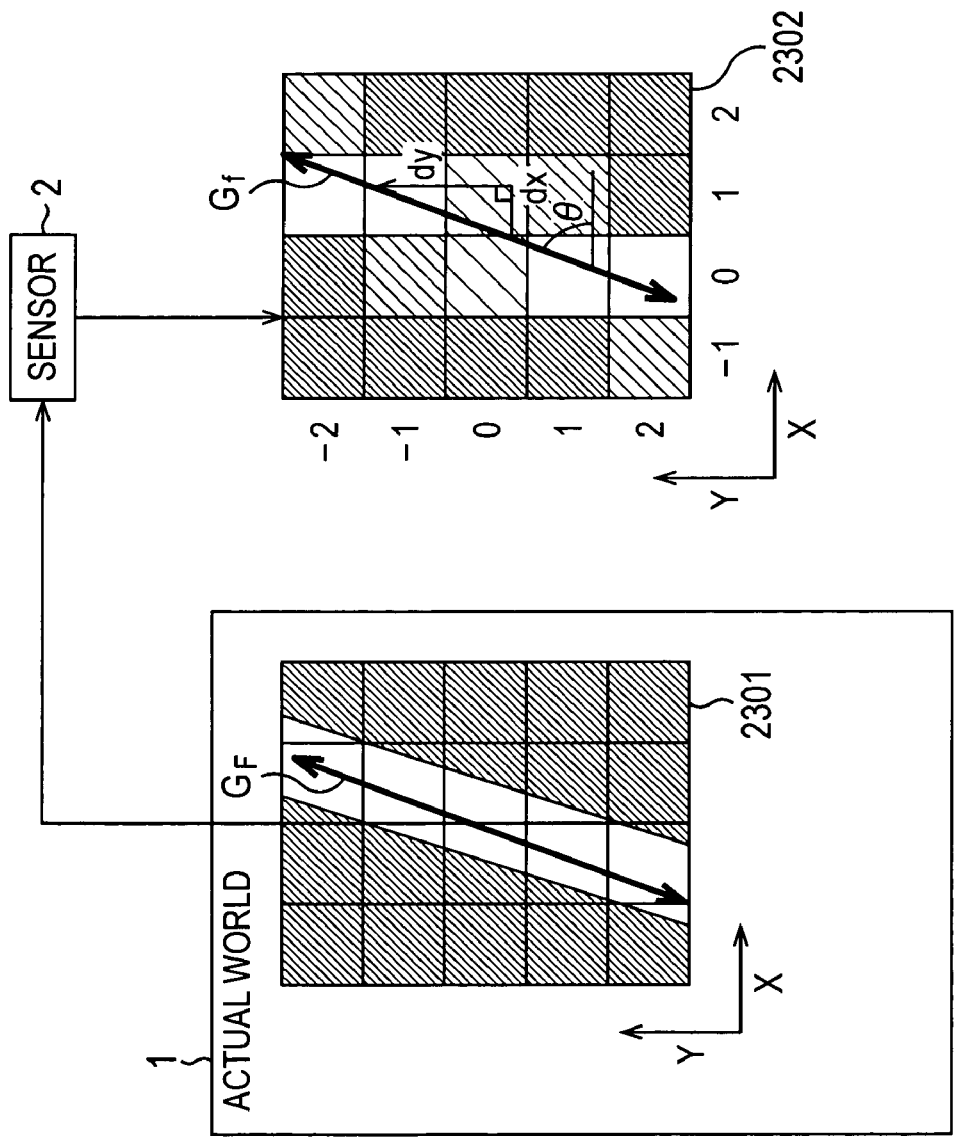

For example, in this case, the fine-line-including actual world region 2301 (FIG. 124) is regarded as a subject to be approximated. This fine-line-including actual world region 2301 has continuity in the spatial direction, which is represented with a gradient $G_F$, such as shown in FIG. 129. Note that in FIG. 129, the X direction and Y direction represent the X direction and Y direction of the sensor 2 (FIG. 121).

Accordingly, the data continuity detecting unit 101 (FIG. 120) can output an angle θ (angle θ generated between the direction of data continuity represented with a gradient $G_f$ corresponding to the gradient $G_F$, and the X direction) such as shown in FIG. 129 as data continuity information corresponding to the gradient $G_F$ as continuity in the spatial direction.

However, with the first method, the data continuity information output from the data continuity detecting unit 101 is not employed at all.

In other words, such as shown in FIG. 129, the direction of continuity in the spatial direction of the fine-line-including actual world region 2301 is a general angle θ direction. However, the first method is a method for calculating the features $w_i$ of the approximation function $f_1(x)$ on assumption that the direction of continuity in the spatial direction of the fine-line-including actual world region 2301 is the Y direction (i.e., on assumption that the angle θ is 90°).

Consequently, the approximation function $f_1(x)$ becomes a function of which the waveform gets dull, and the detail decreases than the original pixel value. In other words, though not shown in the drawing, with the approximation function $f_1(x)$ generated with the first method, the waveform thereof becomes a waveform different from the actual X cross-sectional waveform F(x).

To this end, the present applicant has invented the second method for calculating the features $w_i$ by further taking continuity in the spatial direction into consideration (utilizing the angle θ) as to the first method.

That is to say, the second method is a method for calculating the features $w_i$ of the approximation function $f_2(x)$ on assumption that the direction of continuity of the fine-line-including actual world region 2301 is a general angle θ direction.

Specifically, for example, the gradient $G_f$ representing continuity of data corresponding to continuity in the spatial direction is represented with the following Expression (42).

$$G_f = \tan\theta = \frac{dy}{dx} \quad (42)$$

Note that in Expression (42), dx represents the amount of fine movement in the X direction such as shown in FIG. 129, dy represents the amount of fine movement in the Y direction as to the dx such as shown in FIG. 129.

In this case, if we define the shift amount $C_x(y)$ as shown in the following Expression (43), with the second method, an equation corresponding to Expression (40) employed in the first method becomes such as the following Expression (44).

$$C_x(y) = \frac{y}{G_f} \quad (43)$$

$$P(x, y) = f_2(x - C_x(y)) + e \quad (44)$$

That is to say, Expression (40) employed in the first method represents that the position x in the X direction of the pixel center position (x, y) is the same value regarding the pixel value P(x, y) of any pixel positioned in the same position. In other words, Expression (40) represents that pixels having the same pixel value continue in the Y direction (exhibits continuity in the Y direction).

On the other hand, Expression (44) employed in the second method represents that the pixel value P(x, y) of a pixel of which the center position is (x, y) is not identical to the pixel value (approximate equivalent to $f_2(x)$) of a pixel positioned in a place distant from the pixel of interest (a pixel of which the center position is the origin (0, 0)) in the X direction by x, and is the same value as the pixel value (approximate equivalent to $f_2(x+C_x(y))$) of a pixel positioned in a place further distant from the pixel thereof in the X direction by the shift amount $C_x(y)$ (pixel positioned in a place distant from the pixel of interest in the X direction by $x+C_x(y)$). In other words, Expression (44) represents that pixels having the same pixel value continue in the angle θ direction corresponding to the shift amount $C_x(y)$ (exhibits continuity in the general angle θ direction).

Thus, the shift amount $C_x(y)$ is the amount of correction considering continuity (in this case, continuity represented with the gradient $G_F$ in FIG. 129 (strictly speaking, continuity of data represented with the gradient $G_f$)) in the spatial direction, and Expression (44) is obtained by correcting Expression (40) with the shift amount $C_x(y)$.

In this case, upon the 20 pixel values P(x, y) (however, x is any one integer value of –1 through 2, and y is any one integer value of –2 through 2) of the fine-line-including data region shown in FIG. 126 being substituted for the above Expression (44) respectively, 20 equations as shown in the following Expression (45) are generated.

$$P(-1, -2) = f_2(-1 - C_x(-2)) + e_1$$
$$P(0, -2) = f_2(0 - C_x(-2)) + e_2$$
$$P(1, -2) = f_2(1 - C_x(-2)) + e_3$$
$$P(2, -2) = f_2(2 - C_x(-2)) + e_4$$
$$P(-1, -1) = f_2(-1 - C_x(-1)) + e_5$$
$$P(0, -1) = f_2(0 - C_x(-1)) + e_6$$
$$P(1, -1) = f_2(1 - C_x(-1)) + e_7$$
$$P(2, -1) = f_2(2 - C_x(-1)) + e_8$$
$$P(-1, 0) = f_2(-1) + e_9$$
$$P(0, 0) = f_2(0) + e_{10}$$
$$P(1, 0) = f_2(1) + e_{11}$$
$$P(2, 0) = f_2(2) + e_{12}$$
$$P(-1, 1) = f_2(-1 - C_x(1)) + e_{13}$$
$$P(0, 1) = f_2(0 - C_x(1)) + e_{14}$$
$$P(1, 1) = f_2(1 - C_x(1)) + e_{15}$$
$$P(2, 1) = f_2(2 - C_x(1)) + e_{16}$$
$$P(-1, 2) = f_2(-1 - C_x(2)) + e_{17}$$
$$P(0, 2) = f_2(0 - C_x(2)) + e_{18}$$
$$P(1, 2) = f_2(1 - C_x(2)) + e_{19}$$
$$P(2, 2) = f_2(2 - C_x(2)) + e_{20}$$

(45)

Expression (45) is made up of 20 equations, as with the above Expression (41). Accordingly, with the second method, as with the first method, in the event that the number of the features $w_i$ of the approximation function $f_2(x)$ is less than 20, i.e., the approximation function $f_2(x)$ is a polynomial having the number of dimensions less than 19, the features $w_i$ can be calculated with the least squares method, for example. Note that the specific solution regarding the least squares method will be described later.

For example, if we say that the number of dimensions of the approximation function $f_2(x)$ is five as with the first method, with the second method, the features $w_i$ are calculated as follows.

Figure 130:
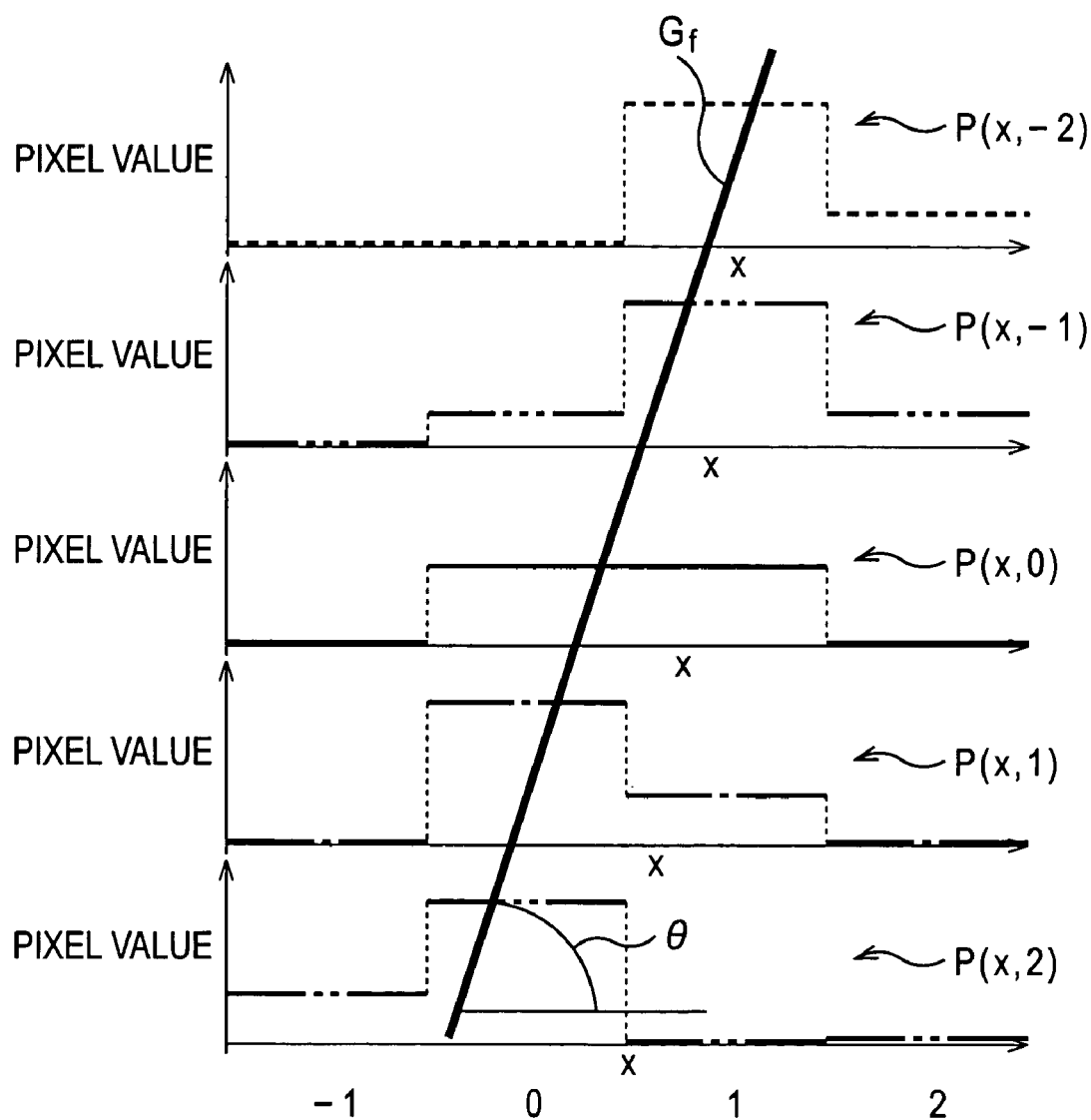

That is to say, FIG. 130 represents the pixel value P(x, y) shown in the left side of Expression (45) in a graphic manner. The respective five graphs shown in FIG. 130 are basically the same as shown in FIG. 127.

As shown in FIG. 130, the maximal pixel values (pixel values corresponding to fine lines) are continuous in the direction of continuity of data represented with the gradient $G_f$.

Figure 131:
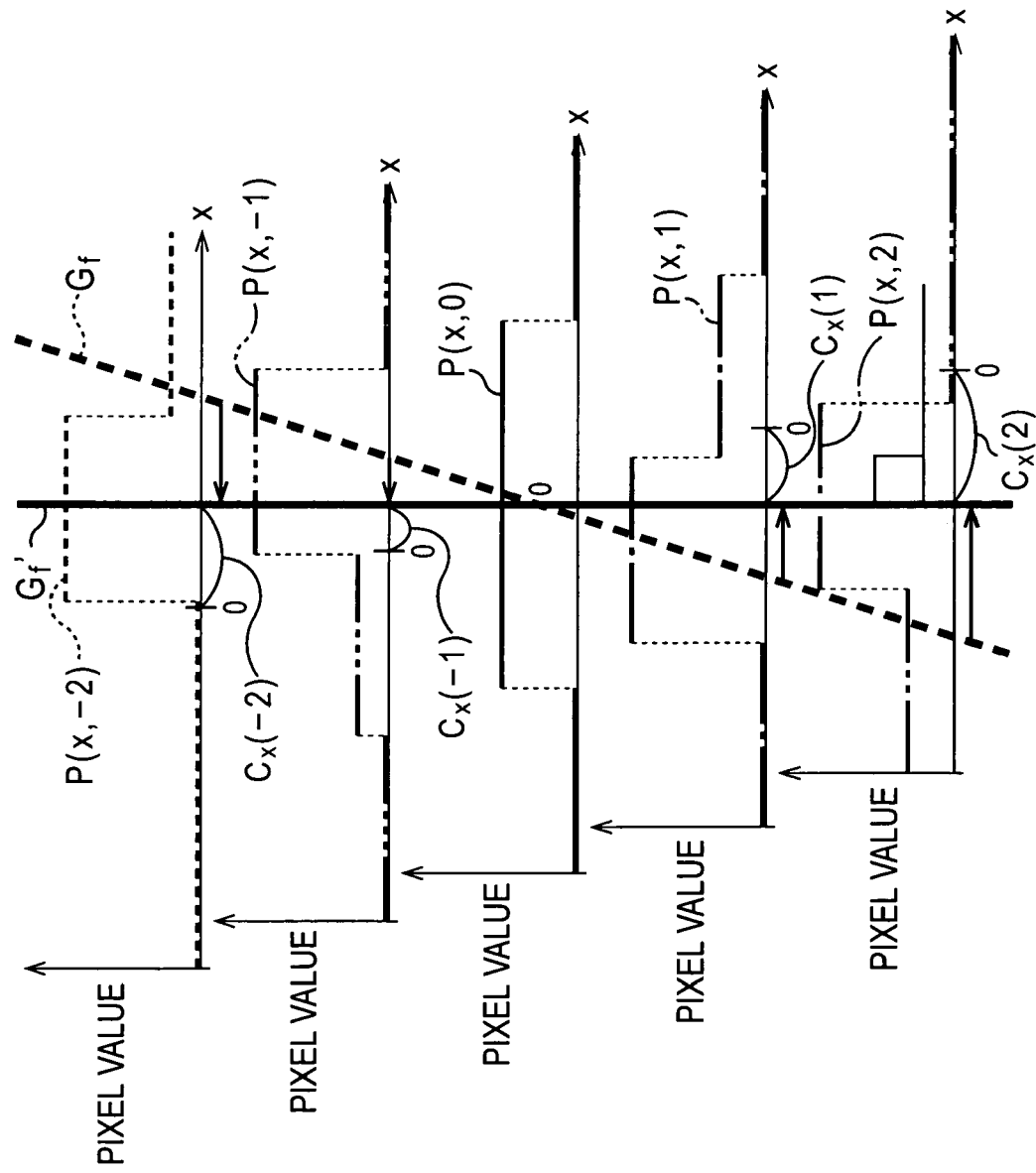

Consequently, with the second method, if we supplement the respective input pixel values P(x, –2), P(x, –1), P(x, 0), P(x, 1), and P(x, 2) shown in FIG. 130, for example, along the x axis, we supplement the pixel values after the pixel values are changed in the states shown in FIG. 131 instead of supplementing the pixel values without any modification as with the first method (let us assume that y is constant, and the five graphs are overlaid in the states shown in FIG. 130).

That is to say, FIG. 131 represents a state wherein the respective input pixel values P(x, –2), P(x, –1), P(x, 0), P(x, 1), and P(x, 2) shown in FIG. 130 are shifted by the shift amount $C_x(y)$ shown in the above Expression (43). In other words, FIG. 131 represents a state wherein the five graphs shown in FIG. 130 are moved as if the gradient $G_F$ representing the actual direction of continuity of data were regarded as a gradient $G_F'$ (in the drawing, a straight line made up of a dashed line were regarded as a straight line made up of a solid line).

In the states in FIG. 131, if we supplement the respective input pixel values P(x, –2), P(x, –1), P(x, 0), P(x, 1), and P(x, 2), for example, along the x axis (in the states shown in FIG. 131, if we overlay the five graphs), multiple lines (dashed line, chain triple-dashed line, solid line, chain single-dashed line, and chain double-dashed line) in parallel with the x axis, such as shown in FIG. 132, are distributed.

Note that in FIG. 132, the vertical axis represents pixel values, and the horizontal axis represents a relative position x from the pixel of interest. Also, the dashed line represents the input pixel value P(x, –2), the chain triple-dashed line represents the input pixel value P(x, –1), the solid line represents the input pixel value P(x, 0), the chain single-dashed line represents the input pixel value P(x, 1), and the chain double-dashed line represents the input pixel value P(x, 2) respectively. Further, in the event of the same pixel value, lines more than 2 lines are overlaid in reality, but in FIG. 132, the lines are drawn so as to distinguish each line, and so as not to overlay each line.

The respective 20 input pixel values P(x, y) (however, x is any one integer value of –1 through 2, and y is any one integer value of –2 through 2) thus distributed, and a regression curve (the approximation function $f_2(x)$ obtained by substituting the features $w_i$ calculated with the least squares method for the above Expression (38)) to minimize the error of the value $f_2(x+C_x(y))$ become a curve $f_2(x)$ shown in the solid line in FIG. 132.

Thus, the approximation function $f_2(x)$ generated with the second method represents a curve connecting in the X direction the means of the input pixel values P(x, y) in the angle θ direction (i.e., direction of continuity in the general spatial direction) output from the data continuity detecting unit 101 (FIG. 120).

On the other hand, as described above, the approximation function $f_1(x)$ generated with the first method represents nothing but a curve connecting in the X direction the means of the input pixel values P(x, y) in the Y direction (i.e., the direction different from the continuity in the spatial direction).

Accordingly, as shown in FIG. 132, the approximation function $f_2(x)$ generated with the second method becomes a function wherein the degree of dullness of the waveform thereof decreases, and also the degree of decrease of the detail as to the original pixel value decreases less than the approximation function $f_1(x)$ generated with the first method. In other words, though not shown in the drawing, with the approximation function $f_2(x)$ generated with the second method, the waveform thereof becomes a waveform closer to the actual X cross-sectional waveform F(x) than the approximation function $f_1(x)$ generated with the first method.

However, as described above, the approximation function $f_2(x)$ is a function considering continuity in the spatial direction, but is nothing but a function generated wherein the input image (input pixel value) is regarded as the origin (basis). That is to say, as shown in FIG. 125 described above, the approximation function $f_2(x)$ is nothing but a function that approximated the input image different from the X cross-sectional waveform F(x), and it is hard to say that the approximation function $f_2(x)$ is a function that approximated the X cross-sectional waveform F(x). In other words, the second method is a method for calculating the features $w_i$ on assumption that the above Expression (44) holds, but does not take the relation in Expression (38) described above into consideration (does not consider the integration effects of the sensor 2).

Consequently, the present applicant has invented the third method that calculates the features $w_i$ of the approximation function $f_3(x)$ by further taking the integration effects of the sensor 2 into consideration as to the second method.

That is to say the third method is a method that introduces the concept of a spatial mixed region.

Description will be made regarding a spatial mixed region with reference to FIG. 133 prior to description of the third method.

In FIG. 133, a portion 2321 (hereafter, referred to as a region 2321) of a light signal in the actual world 1 represents a region having the same area as one detecting element (pixel) of the sensor 2.

Upon the sensor 2 detecting the region 2321, the sensor 2 outputs a value (one pixel value) 2322 obtained by the region 2321 being subjected to integration in the temporal and spatial directions (X direction, Y direction, and t direction). Note that the pixel value 2322 is represented as an image in the drawing, but is actually data representing a predetermined value.

The region 2321 in the actual world 1 is clearly classified into a light signal (white region in the drawing) corresponding to the foreground (the above fine line, for example), and a light signal (black region in the drawing) corresponding to the background.

On the other hand, the pixel value 2322 is a value obtained by the light signal in the actual world 1 corresponding to the foreground and the light signal in the actual world 1 corresponding to the background being subjected to integration. In other words, the pixel value 2322 is a value corresponding to a level wherein the light corresponding to the foreground and the light corresponding to the background are spatially mixed.

Thus, in the event that a portion corresponding to one pixel (detecting element of the sensor 2) of the light signals in the actual world 1 is not a portion where the light signals having the same level are spatially uniformly distributed, but a portion where the light signals having a different level such as a foreground and background are distributed, upon the region thereof being detected by the sensor 2, the region becomes one pixel value as if the different light levels were spatially mixed by the integration effects of the sensor 2 (integrated in the spatial direction). Thus, a region made up of pixels in which an image (light signals in the actual world 1) corresponding to a foreground, and an image (light signals in the actual world 1) corresponding to a background are subjected to spatial integration is, here, referred to as a spatial mixed region.

Accordingly, with the third method, the actual world estimating unit 102 (FIG. 120) estimates the X cross-sectional waveform F(x) representing the original region 2321 in the actual world 1 (of the light signals in the actual world 1, the portion 2321 corresponding to one pixel of the sensor 2) by approximating the X cross-sectional waveform F(x) with the approximation function $f_3(x)$ serving as a one-dimensional polynomial such as shown in FIG. 134.

That is to say, FIG. 134 represents an example of the approximation function $f_3(x)$ corresponding to the pixel value 2322 serving as a spatial mixed region (FIG. 133), i.e., the approximation function $f_3(x)$ that approximates the X cross-sectional waveform F(x) corresponding to the solid line within the region 2331 in the actual world 1 (FIG. 133). In FIG. 134, the axis in the horizontal direction in the drawing represents an axis in parallel with the side from the upper left end $x_s$ to lower right end $x_e$ of the pixel corresponding to the pixel value 2322 (FIG. 133), which is taken as the x axis. The axis in the vertical direction in the drawing is taken as an axis representing pixel values.

In FIG. 134, the following Expression (46) is defined on condition that the result obtained by subjecting the approximation function $f_3(x)$ to integration in a range (pixel width) from the $x_s$ to the $x_e$ is generally identical with the pixel values P(x, y) output from the sensor 2 (dependent on a margin of error e alone).

$$P = \int_{x_s}^{x_e} f_3(x)dx + e \qquad (46)$$

$$= \int_{x_s}^{x_e} (w_0 + w_1 x + w_2 x^2 + \ldots + w_n x^n)dx + e$$

$$= w_0(x_e - x_s) + \ldots + w_{n-1}\frac{x_e^n - x_s^n}{n} + w_n\frac{x_e^{n+1} - x_s^{n+1}}{n+1} + e$$

In this case, the features $w_i$ of the approximation function $f_3(x)$ are calculated from the 20 pixel values P(x, y) (however, x is any one integer value of −1 through 2, and y is any one integer value of −2 through 2) of the fine-line-including data region 2302 shown in FIG. 129, so the pixel value P in Expression (46) becomes the pixel values P(x, y).

Also, as with the second method, it is necessary to take continuity in the spatial direction into consideration, and accordingly, each of the start position $x_s$ and end position $x_e$ in the integral range in Expression (46) is dependent upon the shift amount $C_x(y)$. That is to say, each of the start position $x_s$ and end position $x_e$ of the integral range in Expression (46) is represented such as the following Expression (47).

$x_s = x - C_x(y) - 0.5$ $x_e = x - C_x(y) + 0.5 \qquad (47)$

In this case, upon each pixel value of the fine-line-including data region 2302 shown in FIG. 129, i.e., each of the input pixel values P(x, −2), P(x, −1), P(x, 0), P(x, 1), and P(x, 2) (however, x is any one integer value of −1 through 2) shown in FIG. 130 being substituted for the above Expression (46)

(the integral range is the above Expression (47)), 20 equations shown in the following Expression (48) are generated.

$$P(-1, -2) = \int_{-1-C_x(-2)-0.5}^{-1-C_x(-2)+0.5} f_3(x)dx + e_1, \quad (48)$$

$$P(0, -2) = \int_{0-C_x(-2)-0.5}^{0-C_x(-2)+0.5} f_3(x)dx + e_2,$$

$$P(1, -2) = \int_{1-C_x(-2)-0.5}^{1-C_x(-2)+0.5} f_3(x)dx + e_3,$$

$$P(2, -2) = \int_{2-C_x(-2)-0.5}^{2-C_x(-2)+0.5} f_3(x)dx + e_4,$$

$$P(-1, -1) = \int_{-1-C_x(-1)-0.5}^{-1-C_x(-1)+0.5} f_3(x)dx + e_5,$$

$$P(0, -1) = \int_{0-C_x(-1)-0.5}^{0-C_x(-1)+0.5} f_3(x)dx + e_6,$$

$$P(1, -1) = \int_{1-C_x(-1)-0.5}^{1-C_x(-1)+0.5} f_3(x)dx + e_7,$$

$$P(2, -1) = \int_{2-C_x(-1)-0.5}^{2-C_x(-1)+0.5} f_3(x)dx + e_8,$$

$$P(-1, 0) = \int_{-1-0.5}^{-1+0.5} f_3(x)dx + e_9,$$

$$P(0, 0) = \int_{0-0.5}^{0+0.5} f_3(x)dx + e_{10},$$

$$P(1, 0) = \int_{1-0.5}^{1+0.5} f_3(x)dx + e_{11},$$

$$P(2, 0) = \int_{2-0.5}^{2+0.5} f_3(x)dx + e_{12},$$

$$P(-1, 1) = \int_{-1-C_x(1)-0.5}^{-1-C_x(1)+0.5} f_3(x)dx + e_{13},$$

$$P(0, 1) = \int_{0-C_x(1)-0.5}^{0-C_x(1)+0.5} f_3(x)dx + e_{14},$$

$$P(1, 1) = \int_{1-C_x(1)-0.5}^{1-C_x(1)+0.5} f_3(x)dx + e_{15},$$

$$P(2, 1) = \int_{2-C_x(1)-0.5}^{2-C_x(1)+0.5} f_3(x)dx + e_{16},$$

$$P(-1, 2) = \int_{-1-C_x(2)-0.5}^{-1-C_x(2)+0.5} f_3(x)dx + e_{17},$$

$$P(0, 2) = \int_{0-C_x(2)-0.5}^{0-C_x(2)+0.5} f_3(x)dx + e_{18},$$

$$P(1, 2) = \int_{1-C_x(2)-0.5}^{1-C_x(2)+0.5} f_3(x)dx + e_{19},$$

$$P(2, 2) = \int_{2-C_x(2)-0.5}^{2-C_x(2)+0.5} f_3(x)dx + e_{20},$$

Expression (48) is made up of 20 equations as with the above Expression (45). Accordingly, with the third method as with the second method, in the event that the number of the features $w_i$ of the approximation function $f_3(x)$ is less than 20, i.e., in the event that the approximation function $f_3(x)$ is a polynomial having the number of dimensions less than 19, for example, the features $w_i$ may be calculated with the least squares method. Note that the specific solution of the least squares method will be described later.

For example, if we say that the number of dimensions of the approximation function $f_3(x)$ is five, the approximation function $f_3(x)$ calculated with the least squares method using Expression (48) (the approximation function $f_3(x)$ generated with the calculated features $w_i$) becomes a curve shown with the solid line in FIG. 135.

Note that in FIG. 135, the vertical axis represents pixel values, and the horizontal axis represents a relative position x from the pixel of interest.

As shown in FIG. 135, in the event that the approximation function $f_3(x)$ (a curve shown with a solid line in the drawing) generated with the third method is compared with the approximation function $f_2(x)$ (a curve shown with a dashed line in the drawing) generated with the second method, a pixel value at x=0 becomes great, and also the gradient of the curve creates a steep waveform. This is because details increase more than the input pixels, resulting in being unrelated to the resolution of the input pixels. That is to say, we can say that the approximation function $f_3(x)$ approximates the X cross-sectional waveform F(x). Accordingly, though not shown in the drawing, the approximation function $f_3(x)$ becomes a waveform closer to the X cross-sectional waveform F(x) than the approximation function $f_2(x)$.

FIG. 136 represents an configuration example of the actual world estimating unit 102 employing such a one-dimensional polynomial approximating method.

In FIG. 136, the actual world estimating unit 102 estimates the X cross-sectional waveform F(x) by calculating the features $w_i$ using the above third method (least squares method), and generating the approximation function f(x) of the above Expression (39) using the calculated features $w_i$.

As shown in FIG. 136, the actual world estimating unit 102 includes a conditions setting unit 2331, input image storage unit 2332, input pixel value acquiring unit 2333, integral component calculation unit 2334, normal equation generating unit 2335, and approximation function generating unit 2336.

The conditions setting unit 2331 sets a pixel range (hereafter, referred to as a tap range) used for estimating the X cross-sectional waveform F(x) corresponding to a pixel of interest, and the number of dimensions n of the approximation function f(x).

The input image storage unit 2332 temporarily stores an input image (pixel values) from the sensor 2.

The input pixel acquiring unit 2333 acquires, of the input images stored in the input image storage unit 2332, an input image region corresponding to the tap range set by the conditions setting unit 2231, and supplies this to the normal equation generating unit 2335 as an input pixel value table. That is to say, the input pixel value table is a table in which the respective pixel values of pixels included in the input image region are described. Note that a specific example of the input pixel value table will be described later.

Now, the actual world estimating unit 102 calculates the features $w_i$ of the approximation function f(x) with the least squares method using the above Expression (46) and Expression (47) here, but the above Expression (46) can be represented such as the following Expression (49).

$$P(x, y) = \sum_{i=0}^{n} w_i \times \frac{(x - C_x(y) + 0.5)^{i+1} - (x - C_x(y) - 0.5)^{i+1}}{i+1} + e \quad (49)$$

$$= \sum_{i=0}^{n} w_i \times S_i(x_s, x_e) + e$$

In Expression (49), $S_i(x_s, x_e)$ represents the integral components of the i-dimensional term. That is to say, the integral components $S_i(x_s, x_e)$ are shown in the following Expression (50).

$$S_i(x_s, x_e) = \frac{x_e^{i+1} - x_s^{i+1}}{i+1} \tag{50}$$

The integral component calculation unit 2334 calculates the integral components $S_i(x_s, x_e)$.

Specifically, the integral components $S_i(x_s, x_e)$ (however, the value $x_s$ and value $x_e$ are values shown in the above Expression (46)) shown in Expression (50) may be calculated as long as the relative pixel positions (x, y), shift amount $C_x(y)$, and i of the i-dimensional terms are known. Also, of these, the relative pixel positions (x, y) are determined by the pixel of interest and the tap range, the shift amount $C_x(y)$ is determined by the angle θ (by the above Expression (41) and Expression (43)), and the range of i is determined by the number of dimensions n, respectively.

Accordingly, the integral component calculation unit 2334 calculates the integral components $S_i(x_s, x_e)$ based on the tap range and the number of dimensions set by the conditions setting unit 2331, and the angle θ of the data continuity information output from the data continuity detecting unit 101, and supplies the calculated results to the normal equation generating unit 2335 as an integral component table.

The normal equation generating unit 2335 generates the above Expression (46), i.e., a normal equation in the case of obtaining the features $w_i$ of the right side of Expression (49) with the least squares method using the input pixel value table supplied from the input pixel value acquiring unit 2333, and the integral component table supplied from the integral component calculation unit 2334, and supplies this to the approximation function generating unit 2336 as a normal equation table. Note that a specific example of a normal equation will be described later.

The approximation function generating unit 2336 calculates the respective features $w_i$ of the above Expression (49) (i.e., the respective coefficients $w_i$ of the approximation function f(x) serving as a one-dimensional polynomial) by solving a normal equation included in the normal equation table supplied from the normal equation generating unit 2335 using the matrix solution, and outputs these to the image generating unit 103.

Next, description will be made regarding the actual world estimating processing (processing in step S102 in FIG. 40) of the actual world estimating unit 102 (FIG. 136) which employs the one-dimensional polynomial approximating method with reference to the flowchart in FIG. 137.

For example, let us say that an input image, which is a one-frame input image output from the sensor 2, including the fine-line-including data region 2302 in FIG. 122 described above has been already stored in the input image storage unit 2332. Also, let us say that the data continuity detecting unit 101 has subjected, at the continuity detection processing in step S101 (FIG. 40), the fine-line-including data region 2302 to the processing thereof, and has already output the angle θ as data continuity information.

In this case, the conditions setting unit 2331 sets conditions (a tap range and the number of dimensions) in step S2301 in FIG. 137.

For example, let us say that a tap range 2351 shown in FIG. 138 is set, and 5 dimensions are set as the number of dimensions.

That is to say, FIG. 138 is a diagram for describing an example of a tap range. In FIG. 138, the X direction and Y direction are the X direction and Y direction of the sensor 2 (FIG. 121) respectively. Also, the tap range 2351 represents a pixel group made up of 20 pixels in total (20 squares in the drawing) of 4 pixels in the X direction, and also 5 pixels in the Y direction.

Further, as shown in FIG. 138, let us say that a pixel of interest is set at the second pixel from the left and also the third pixel from the bottom in the drawing, of the tap range 2351. Also, let us say that each pixel is denoted with a number l such as shown in FIG. 138 (l is any integer value of 0 through 19) according to the relative pixel positions (x, y) from the pixel of interest (a coordinate value of a pixel-of-interest coordinates system wherein the center (0, 0) of the pixel of interest is taken as the origin).

Now, description will return to FIG. 137, wherein in step S2302, the conditions setting unit 2331 sets a pixel of interest.

In step S2303, the input pixel value acquiring unit 2333 acquires an input pixel value based on the condition (tap range) set by the conditions setting unit 2331, and generates an input pixel value table. That is to say, in this case, the input pixel value acquiring unit 2333 acquires the fine-line-including data region 2302 (FIG. 126), and generates a table made up of 20 input pixel values P(l) as an input pixel value table.

Note that in this case, the relation between the input pixel values P(l) and the above input pixel values P(x, y) is a relation shown in the following Expression (51). However, in Expression (51), the left side represents the input pixel values P(l), and the right side represents the input pixel values P(x, y).

$$\begin{aligned}
P(0) &= P(0, 0) \\
P(1) &= P(-1, 2) \\
P(2) &= P(0, 2) \\
P(3) &= P(1, 2) \\
P(4) &= P(2, 2) \\
P(5) &= P(-1, 1) \\
P(6) &= P(0, 1) \\
P(7) &= P(1, 1) \\
P(8) &= P(2, 1) \\
P(9) &= P(-1, 0) \\
P(10) &= P(1, 0) \\
P(11) &= P(2, 0) \\
P(12) &= P(-1, -1) \\
P(13) &= P(0 - 1) \\
P(14) &= P(1, -1) \\
P(15) &= P(2, -1) \\
P(16) &= P(-1, -2) \\
P(17) &= P(0, -2) \\
P(18) &= P(1 - 2) \\
P(19) &= P(2, -2)
\end{aligned} \tag{51}$$

In step S2304, the integral component calculation unit 2334 calculates integral components based on the conditions (a tap range and the number of dimensions) set by the conditions setting unit 2331, and the data continuity information (angle θ) supplied from the data continuity detecting unit 101, and generates an integral component table.

In this case, as described above, the input pixel values are not P(x, y) but P(l), and are acquired as the value of a pixel number l, so the integral component calculation unit 2334 calculates the above integral components $S_i(x_s, x_e)$ in Expression (50) as a function of l such as the integral components $S_i(l)$ shown in the left side of the following Expression (52).

$$S_i(l) = S_i(x_s, x_e) \quad (52)$$

Specifically, in this case, the integral components $S_i(l)$ shown in the following Expression (53) are calculated.

$$S_i(0) = S_i(-0, 5, 0.5) \quad (53)$$
$$S_i(1) = S_i(-1.5, -C_x(2), -0.5 - C_x(2))$$
$$S_i(2) = S_i(-0.5 - C_x(2), 0.5 - C_x(2))$$
$$S_i(3) = S_i(0.5 - C_x(2), 1.5 - C_x(2))$$
$$S_i(4) = S_i(1.5 - C_x(2), 2.5 - C_x(2))$$
$$S_i(5) = S_i(-1.5 - C_x(1), -0.5 - C_x(1))$$
$$S_i(6) = S_i(-0.5 - C_x(1), -0.5 - C_x(1))$$
$$S_i(7) = S_i(0.5 - C_x(1), 1.5 - C_x(1))$$
$$S_i(8) = S_i(1.5 - C_x(1), 2.5 - C_x(1))$$
$$S_i(9) = S_i(-1.5, -0.5)$$
$$S_i(10) = S_i(0.5, 1.5)$$
$$S_i(11) = S_i(1.5, 2.5)$$
$$S_i(12) = S_i(-1.5 - C_x(-1), -0.5 - C_x(-1))$$
$$S_i(13) = S_i(-0.5 - C_x(-1), 0.5 - C_x(-1))$$
$$S_i(14) = S_i(0.5 - C_x(-1), 1.5 - C_x(-1))$$
$$S_i(15) = S_i(1.5 - C_x(-1), 2.5 - C_x(-1))$$
$$S_i(16) = S_i(-1.5 - C_x(-2), -0.5 - C_x(-2))$$
$$S_i(17) = S_i(-0.5 - C_x(-2), 0.5 - C_x(-2))$$
$$S_i(18) = S_i(0.5 - C_x(-2), 1.5 - C_x(-2))$$
$$S_i(19) = S_i(1.5 - C_x(-2), 2.5 - C_x(-2))$$

Note that in Expression (53), the left side represents the integral components $S_i(l)$, and the right side represents the integral components $S_i(x_s, x_e)$. That is to say, in this case, i is 0 through 5, and accordingly, the 120 $S_i(l)$ in total of the 20 $S_0(l)$, 20 $S_1(l)$, 20 $S_2(l)$, 20 $S_3(l)$, 20 $S_4(l)$, and 20 $S_5(l)$ are calculated.

More specifically, first the integral component calculation unit 2334 calculates each of the shift amounts $C_x(-2)$, $C_x(-1)$, $C_x(1)$, and $C_x(2)$ using the angle θ supplied from the data continuity detecting unit 101. Next, the integral component calculation unit 2334 calculates each of the 20 integral components $S_i(x_s, x_e)$ shown in the right side of Expression (52) regarding each of i=0 through 5 using the calculated shift amounts $C_x(-2)$, $C_x(-1)$, $C_x(1)$, and $C_x(2)$. That is to say, the 120 integral components $S_i(x_s, x_e)$ are calculated. Note that with this calculation of the integral components $S_i(x_s, x_e)$, the above Expression (50) is used. Subsequently, the integral component calculation unit 2334 converts each of the calculated 120 integral components $S_i(x_s, x_e)$ into the corresponding integral components $S_i(l)$ in accordance with Expression (53), and generates an integral component table including the converted 120 integral components $S_i(l)$.

Note that the sequence of the processing in step S2303 and the processing in step S2304 is not restricted to the example in FIG. 137, the processing in step S2304 may be executed first, or the processing in step S2303 and the processing in step S2304 may be executed simultaneously.

Next, in step S2305, the normal equation generating unit 2335 generates a normal equation table based on the input pixel value table generated by the input pixel value acquiring unit 2333 at the processing in step S2303, and the integral component table generated by the integral component calculation unit 2334 at the processing in step S2304.

Specifically, in this case, the features $w_i$ of the following Expression (54) corresponding to the above Expression (49) are calculated using the least squares method. A normal equation corresponding to this is represented as the following Expression (55).

$$P(l) = \sum_{i=0}^{n} w_i \times S_i(l) + e \quad (54)$$

$$\begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \begin{pmatrix} w_0 \\ w_1 \\ \vdots \\ w_n \end{pmatrix} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \quad (55)$$

Note that in Expression (55), L represents the maximum value of the pixel number l in the tap range. n represents the number of dimensions of the approximation function f(x) serving as a polynomial. Specifically, in this case, n=5, and L=19.

If we define each matrix of the normal equation shown in Expression (55) as the following Expressions (56) through (58), the normal equation is represented as the following Expression (59).

$$S_{MAT} = \begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \quad (56)$$

$$W_{MAT} = \begin{pmatrix} w_0 \\ w_1 \\ \vdots \\ w_n \end{pmatrix} \quad (57)$$

-continued $$P_{MAT} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \quad (58)$$

$$S_{MAT} W_{MAT} = P_{MAT} \quad (59)$$

As shown in Expression (57), the respective components of the matrix $W_{MAT}$ are the features $w_i$ to be obtained. Accordingly, in Expression (59), if the matrix $S_{MAT}$ of the left side and the matrix $P_{MAT}$ of the right side are determined, the matrix $W_{MAT}$ (i.e., features $w_i$) may by be calculated with the matrix solution.

Specifically, as shown in Expression (56), the respective components of the matrix $S_{MAT}$ may be calculated as long as the above integral components $S_i(l)$ are known. The integral components $S_i(l)$ are included in the integral component table supplied from the integral component calculation unit 2334, so the normal equation generating unit 2335 can calculate each component of the matrix $S_{MAT}$ using the integral component table.

Also, as shown in Expression (58), the respective components of the matrix $P_{MAT}$ may be calculated as long as the integral components $S_i(l)$ and the input pixel values P(l) are known. The integral components $S_i(l)$ is the same as those included in the respective components of the matrix $S_{MAT}$, also the input pixel values P(l) are included in the input pixel value table supplied from the input pixel value acquiring unit 2333, so the normal equation generating unit 2335 can calculate each component of the matrix $P_{MAT}$ using the integral component table and input pixel value table.

Thus, the normal equation generating unit 2335 calculates each component of the matrix $S_{MAT}$ and matrix $P_{MAT}$, and outputs the calculated results (each component of the matrix $S_{MAT}$ and matrix $P_{MAT}$) to the approximation function generating unit 2336 as a normal equation table.

Upon the normal equation table being output from the normal equation generating unit 2335, in step S2306, the approximation function generating unit 2336 calculates the features $w_i$ (i.e., the coefficients $w_i$ of the approximation function f(x) serving as a one-dimensional polynomial) serving as the respective components of the matrix $W_{MAT}$ in the above Expression (59) based on the normal equation table.

Specifically, the normal equation in the above Expression (59) can be transformed as the following Expression (60).

$$W_{MAT} = S_{MAT}^{-1} P_{MAT} \quad (60)$$

In Expression (60), the respective components of the matrix $W_{MAT}$ in the left side are the features $w_i$ to be obtained. The respective components regarding the matrix $S_{MAT}$ and matrix $P_{MAT}$ are included in the normal equation table supplied from the normal equation generating unit 2335. Accordingly, the approximation function generating unit 2336 calculates the matrix $W_{MAT}$ by calculating the matrix in the right side of Expression (60) using the normal equation table, and outputs the calculated results (features $w_i$) to the image generating unit 103.

In step S2307, the approximation function generating unit 2336 determines regarding whether or not the processing of all the pixels has been completed.

In step S2307, in the event that determination is made that the processing of all the pixels has not been completed, the processing returns to step S2303, wherein the subsequent processing is repeatedly performed. That is to say, the pixels that have not become a pixel of interest are sequentially taken as a pixel of interest, and the processing in step S2302 through S2307 is repeatedly performed.

In the event that the processing of all the pixels has been completed (in step S2307, in the event that determination is made that the processing of all the pixels has been completed), the estimating processing of the actual world 1 ends.

Note that the waveform of the approximation function f(x) generated with the coefficients (features) $w_i$ thus calculated becomes a waveform such as the approximation function f3(x) in FIG. 135 described above.

Thus, with the one-dimensional polynomial approximating method, the features of the approximation function f(x) serving as a one-dimensional polynomial are calculated on assumption that a waveform having the same form as the one-dimensional X cross-sectional waveform F(x) is continuous in the direction of continuity. Accordingly, with the one-dimensional polynomial approximating method, the features of the approximation function f(x) can be calculated with less amount of calculation processing than other function approximating methods.

In other words, with the one-dimensional polynomial approximating method, for example, the multiple detecting elements of the sensor (for example, detecting elements 2-1 of the sensor 2 in FIG. 121) each having time-space integration effects project the light signals in the actual world 1 (for example, an l portion 2301 of the light signal in the actual world 1 in FIG. 122), and the data continuity detecting unit 101 in FIG. 120 (FIG. 3) detects continuity of data (for example, continuity of data represented with $G_f$ in FIG. 129) in image data (for example, image data (input image region) 2302 in FIG. 122) made up of multiple pixels having a pixel value (for example, input pixel values P(x, y) shown in the respective graphs in FIG. 127) projected by the detecting elements 2-1, which drop part of continuity (for example, continuity represented with the gradient $G_F$ in FIG. 129) of the light signal in the actual world 1.

For example, the actual world estimating unit 102 in FIG. 120 (FIG. 3) estimates the light signal function F by approximating the light signal function F representing the light signal in the actual world 1 (specifically, X cross-sectional waveform F(x)) with a predetermined approximation function f (specifically, for example, the approximation function $f_3(x)$ in FIG. 135) on condition that the pixel value (for example, input pixel value P serving as the left side of the above Expression (46)) of a pixel corresponding to a position in the one-dimensional direction (for example, arrow 2311 in FIG. 124, i.e., X direction) of the time-space directions of image data corresponding to continuity of data detected by the data continuity detecting unit 101 is the pixel value (for example, as shown in the right side of Expression (46), the value obtained by the approximation function $f_3(x)$ being integrated in the X direction) acquired by integration effects in the one-dimensional direction.

Speaking in detail, for example, the actual world estimating unit 102 estimates the light signal function F by approximating the light signal function F with the approximation function f on condition that the pixel value of a pixel corresponding to a distance (for example, shift amounts $C_x(y)$ in FIG. 131) along in the one-dimensional direction (for example, X direction) from a line corresponding to continuity of data (for example, a line (dashed line) corresponding to the gradient $G_f$ in FIG. 131) detected by the continuity detecting hand unit 101 is the pixel value (for example, a value obtained by the approximation function $f_3(x)$ being integrated in the X direction such as shown in the right side of Expression (46) with an integral range such as shown in Expression (46)) acquired by integration effects in the one-dimensional direction.

Accordingly, with the one-dimensional polynomial approximating method, the features of the approximation function f(x) can be calculated with less amount of calculation processing than other function approximating methods.

Next, description will be made regarding the second function approximating method with reference to FIG. 139 through FIG. 145.

That is to say, the second function approximating method is a method wherein the light signal in the actual world 1 having continuity in the spatial direction represented with the gradient $G_F$ such as shown in FIG. 139 for example is regarded as a waveform F(x, y) on the X-Y plane (on the plane level in the X direction serving as one direction of the spatial directions, and in the Y direction orthogonal to the X direction), and the waveform F(x, y) is approximated with the approximation function f(x, y) serving as a two-dimensional polynomial, thereby estimating the waveform F(x, y). Accordingly, hereafter, the second function approximating method is referred to as a two-dimensional polynomial approximating method.

Note that in FIG. 139, the horizontal direction represents the X direction serving as one direction of the spatial directions, the upper right direction represents the Y direction serving as the other direction of the spatial directions, and the vertical direction represents the level of light respectively. $G_F$ represents the gradient as continuity in the spatial direction.

Also, with description of the two-dimensional polynomial approximating method, let us say that the sensor 2 is a CCD made up of the multiple detecting elements 2-1 disposed on the plane thereof, such as shown in FIG. 140.

With the example in FIG. 140, the direction in parallel with a predetermined side of the detecting elements 2-1 is taken as the X direction serving as one direction of the spatial directions, and the direction orthogonal to the X direction is taken as the Y direction serving as the other direction of the spatial directions. The direction orthogonal to the X-Y plane is taken as the t direction serving as the temporal direction.

Also, with the example in FIG. 140, the spatial shape of the respective detecting elements 2-1 of the sensor 2 is taken as a square of which one side is 1 in length. The shutter time (exposure time) of the sensor 2 is taken as 1.

Further, with the example in FIG. 140, the center of one certain detecting element 2-1 of the sensor 2 is taken as the origin (the position in the X direction is x=0, and the position in the Y direction is y=0) in the spatial directions (X direction and Y direction), and also the intermediate point-in-time of the exposure time is taken as the origin (the position in the t direction is t=0) in the temporal direction (t direction).

In this case, the detecting element 2-1 of which the center is in the origin (x=0, y=0) in the spatial directions subjects the light signal function F(x, y, t) to integration with a range of −0.5 through 0.5 in the X direction, with a range of −0.5 through 0.5 in the Y direction, and with a range of −0.5 through 0.5 in the t direction, and outputs the integral value as the pixel value P.

That is to say, the pixel value P output from the detecting element 2-1 of which the center is in the origin in the spatial directions is represented with the following Expression (61).

$$P = \int_{-0.5}^{+0.5} \int_{-0.5}^{+0.5} \int_{-0.5}^{+0.5} F(x,y,t) dx dy dt \quad (61)$$

Similarly, the other detecting elements 2-1 output the pixel value P shown in Expression (61) by taking the center of the detecting element 2-1 to be processed as the origin in the spatial directions.

Incidentally, as described above, the two-dimensional polynomial approximating method is a method wherein the light signal in the actual world 1 is handled as a waveform F(x, y) such as shown in FIG. 139 for example, and the two-dimensional waveform F(x, y) is approximated with the approximation function f(x, y) serving as a two-dimensional polynomial.

First, description will be made regarding a method representing such the approximation function f(x, y) with a two-dimensional polynomial.

As described above, the light signal in the actual world 1 is represented with the light signal function F(x, y, t) of which variables are the position on the three-dimensional space x, y, and z, and point-in-time t. This light signal function F(x, y, t), i.e., a one-dimensional waveform projected in the X direction at an arbitrary position y in the Y direction is referred to as an X cross-sectional waveform F(x), here.

When paying attention to this X cross-sectional waveform F(x), in the event that the signal in the actual world 1 has continuity in a certain direction in the spatial directions, it can be conceived that a waveform having the same form as the X cross-sectional waveform F(x) continues in the continuity direction. For example, with the example in FIG. 139, a waveform having the same form as the X cross-sectional waveform F(x) continues in the direction of the gradient $G_F$. In other words, it can be said that the waveform F(x, y) is formed by a waveform having the same form as the X cross-sectional waveform F(x) continuing in the direction of the gradient $G_F$.

Accordingly, the approximation function f(x, y) can be represented with a two-dimensional polynomial by considering that the waveform of the approximation function f(x, y) approximating the waveform F(x, y) is formed by a waveform having the same form as the approximation function f(x) approximating the X cross-sectional F(x) continuing.

Description will be made in more detail regarding the representing method of the approximation function f(x, y).

For example, let us say that the light signal in the actual world 1 such as shown in FIG. 139 described above, i.e., a light signal having continuity in the spatial direction represented with the gradient $G_F$ is detected by the sensor 2 (FIG. 140), and output as an input image (pixel value).

Further, let us say that as shown in FIG. 141, the data continuity detecting unit 101 (FIG. 3) subjects an input image region 2401 made up of 20 pixels (in the drawing, 20 squares represented with dashed line) in total of 4 pixels in the X direction and also 5 pixels in the Y direction, of this input image, to the processing thereof, and outputs an angle θ (angle θ generated between the direction of data continuity represented with the gradient $G_f$ corresponding to the gradient $G_F$, and the X direction) as one of the data continuity information.

Note that with the input image region 2401, the horizontal direction in the drawing represents the X direction serving as one direction in the spatial directions, and the vertical direction in the drawing represents the Y direction serving as the other direction of the spatial directions.

Also, in FIG. 141, an (x, y) coordinates system is set such that a pixel in the second pixel from the left, and also the third pixel from the bottom is taken as a pixel of interest, and the center of the pixel of interest is taken as the origin (0, 0). A relative distance (hereafter, referred to as a cross-sectional direction distance) in the X direction as to the straight line (straight-line-having the gradient $G_f$ representing the direction of data continuity) having an angle θ passing through the origin (0, 0) is described as x'.

Further, in FIG. 141, the graph on the right side is a function wherein an X cross-sectional waveform F(x') is approximated, which represents an approximation function f(x') serving as an n-dimensional (n is an arbitrary integer) polynomial. Of the axes in the graph on the right side, the axis in the horizontal direction in the drawing represents a cross-sectional direction distance, and the axis in the vertical direction in the drawing represents pixel values.

In this case, the approximation function f(x') shown in FIG. 141 is an n-dimensional polynomial, so is represented as the following Expression (62).

$$f(x') = w_0 + w_1 x' + w_2 x'^2 + \ldots + w_n x'^n = \sum_{i=0}^{n} w_i x'^i \tag{62}$$

Also, since the angle θ is determined, the straight line having angle θ passing through the origin (0, 0) is uniquely determined, and a position $x_1$ in the X direction of the straight line at an arbitrary position y in the Y direction is represented as the following Expression (63). However, in Expression (63), s represents cot θ.

$$x_1 = s \times y \tag{63}$$

That is to say, as shown in FIG. 141, a point on the straight line corresponding to continuity of data represented with the gradient $G_f$ is represented with a coordinate value ($x_1$, y).

The cross-sectional direction distance x' is represented as the following Expression (64) using Expression (63).

$$x' = x - x_1 = x - s \times y \tag{64}$$

Accordingly, the approximation function f(x, y) at an arbitrary position (x, y) within the input image region 2401 is represented as the following Expression (65) using Expression (62) and Expression (64).

$$f(x, y) = \sum_{i=0}^{n} w_i (x - s \times y)^i \tag{65}$$

Note that in Expression (65), $w_i$ represents coefficients of the approximation function f(x, y). Note that the coefficients $w_i$ of the approximation function f including the approximation function f(x, y) can be evaluated as the features of the approximation function f. Accordingly, the coefficients $w_i$ of the approximation function f are also referred to as the features $w_i$ of the approximation function f.

Thus, the approximation function f(x, y) having a two-dimensional waveform can be represented as the polynomial of Expression (65) as long as the angle θ is known.

Accordingly, if the actual world estimating unit 102 can calculate the features $w_i$ of Expression (65), the actual world estimating unit 102 can estimate the waveform F(x, y) such as shown in FIG. 139.

Consequently, hereafter, description will be made regarding a method for calculating the features $w_i$ of Expression (65).

That is to say, upon the approximation function f(x, y) represented with Expression (65) being subjected to integration with an integral range (integral range in the spatial direction) corresponding to a pixel (the detecting element 2-1 of the sensor 2 (FIG. 140)), the integral value becomes the estimated value regarding the pixel value of the pixel. It is the following Expression (66) that this is represented with an equation. Note that with the two-dimensional polynomial approximating method, the temporal direction t is regarded as a constant value, so Expression (66) is taken as an equation of which variables are the positions x and y in the spatial directions (X direction and Y direction).

$$P(x, y) = \int_{y-0.5}^{y+0.5} \int_{x-0.5}^{x+0.5} \sum_{i=0}^{n} w_i (x - s \times y)^i + e \tag{66}$$

In Expression (66), P(x, y) represents the pixel value of a pixel of which the center position is in a position (x, y) (relative position (x, y) from the pixel of interest) of an input image from the sensor 2. Also, e represents a margin of error.

Thus, with the two-dimensional polynomial approximating method, the relation between the input pixel value P(x, y) and the approximation function f(x, y) serving as a two-dimensional polynomial can be represented with Expression (66), and accordingly, the actual world estimating unit 102 can estimate the two-dimensional function F(x, y) (waveform F(x, y) wherein the light signal in the actual world 1 having continuity in the spatial direction represented with the gradient $G_F$ (FIG. 139) is represented focusing attention on the spatial direction) by calculating the features $w_i$ with, for example, the least squares method or the like using Expression (66) (by generating the approximation function f(x, y) by substituting the calculated features $w_i$ for Expression (64)).

FIG. 142 represents a configuration example of the actual world estimating unit 102 employing such a two-dimensional polynomial approximating method.

As shown in FIG. 142, the actual world estimating unit 102 includes a conditions setting unit 2421, input image storage unit 2422, input pixel value acquiring unit 2423, integral component calculation unit 2424, normal equation generating unit 2425, and approximation function generating unit 2426.

The conditions setting unit 2421 sets a pixel range (tap range) used for estimating the function F(x, y) corresponding to a pixel of interest, and the number of dimensions n of the approximation function f(x, y).

The input image storage unit 2422 temporarily stores an input image (pixel values) from the sensor 2.

The input pixel value acquiring unit 2423 acquires, of the input images stored in the input image storage unit 2422, an input image region corresponding to the tap range set by the conditions setting unit 2421, and supplies this to the normal equation generating unit 2425 as an input pixel value table. That is to say, the input pixel value table is a table in which the respective pixel values of pixels included in the input image region are described. Note that a specific example of the input pixel value table will be described later.

Incidentally, as described above, the actual world estimating unit 102 employing the two-dimensional approximating method calculates the features $w_i$ of the approximation function f(x, y) represented with the above Expression (65) by solving the above Expression (66) using the least squares method.

Expression (66) can be represented as the following Expression (71) by using the following Expression (70) obtained by the following Expressions (67) through (69).

$$\int x^i dx = \frac{x^{i+1}}{i+1} \quad (67)$$

$$\int (x - s \times y)^i dx = \frac{(x - s \times y)^{i+1}}{(i+1)} \quad (68)$$

$$\int (x - s \times y)^i dy = \frac{(x - s \times y)^{i+1}}{s(i+1)} \quad (69)$$

$$\int_{y-0.5}^{y+0.5} \int_{x-0.5}^{x+0.5} (x - s \times y)^i dx dy = \int_{y-0.5}^{y+0.5} \left[\frac{(x - s \times y)^{i+1}}{(i+1)}\right]_{x-0.5}^{x+0.5} dy \quad (70)$$

$$= \int_{y-0.5}^{y+0.5} \frac{(x + 0.5 - s \times y)^{i+1} - (x - 0.5 - s \times y)^{i+1}}{i+1} dy$$

$$= \left[\frac{(x + 0.5 - s \times y)^{i+2}}{s(i+1)(i+2)}\right]_{y-0.5}^{y+0.5} - \left[\frac{(x - 0.5 - s \times y)^{i+2}}{s(i+1)(i+2)}\right]_{y-0.5}^{y+0.5}$$

$$= \frac{(x + 0.5 - s \times y + 0.5s)^{i+2} - (x + 0.5 - s \times y - 0.5s)^{i+2} -}{s(i+1)(i+2)}$$
$$\frac{(x - 0.5 - s \times y + 0.5s)^{i+2} + (x - 0.5 - s \times y - 0.5s)^{i+2}}{s(i+1)(i+2)}$$

$$P(x, y) = \sum_{i=0}^{n} \frac{w_i}{s(i+1)(i+2)} \{(x + 0.5 - s \times y + 0.5s)^{i+2} - \quad (71)$$
$$(x + 0.5 - s \times y - 0.5s)^{i+2} - (x - 0.5 - s \times y - 0.5s)^{i+2} +$$
$$(x - 0.5 - s \times y - 0.5s)^{i+2}\} + e$$

$$= \sum_{i=0}^{n} w_i s_i(x - 0.5, x + 0.5, y - 0.5, y + 0.5) + e$$

In Expression (71), $S_i(x-0.5, x+0.5, y-0.5, y+0.5)$ represents the integral components of i-dimensional terms. That is to say, the integral components $S_i(x-0.5, x+0.5, y-0.5, y+0.5)$ are as shown in the following Expression (72).

$$s_i(x - 0.5, x + 0.5, y - 0.5, y + 0.5) = \quad (72)$$
$$\frac{(x + 0.5 - s \times y + 0.5s)^{i+2} - (x + 0.5 - s \times y - 0.5s)^{i+2} -}{s(i+1)(i+2)}$$
$$\frac{(x - 0.5 - s \times y + 0.5s)^{i+2} + (x - 0.5 - s \times y - 0.5s)^{i+2}}{s(i+1)(i+2)}$$

The integral component calculation unit 2424 calculates the integral components $S_i(x-0.5, x+0.5, y-0.5, y+0.5)$.

Specifically, the integral components $S_i(x-0.5, x+0.5, y-0.5, y+0.5)$ shown in Expression (72) can be calculated as long as the relative pixel positions (x, y), the variable s and i of i-dimensional terms in the above Expression (65) are known. Of these, the relative pixel positions (x, y) are determined with a pixel of interest, and a tap range, the variable s is cot θ, which is determined with the angle θ, and the range of i is determined with the number of dimensions n respectively.

Accordingly, the integral component calculation unit 2424 calculates the integral components $S_i(x-0.5, x+0.5, y-0.5, y+0.5)$ based on the tap range and the number of dimensions set by the conditions setting unit 2421, and the angle θ of the data continuity information output from the data continuity detecting unit 101, and supplies the calculated results to the normal equation generating unit 2425 as an integral component table.

The normal equation generating unit 2425 generates a normal equation in the case of obtaining the above Expression (66), i.e., Expression (71) by the least squares method using the input pixel value table supplied from the input pixel value acquiring unit 2423, and the integral component table supplied from the integral component calculation unit 2424, and outputs this to the approximation function generating unit 2426 as a normal equation table. Note that a specific example of a normal equation will be described later.

The approximation function generating unit 2426 calculates the respective features $w_i$ of the above Expression (66) (i.e., the coefficients $w_i$ of the approximation function f(x, y) serving as a two-dimensional polynomial) by solving the normal equation included in the normal equation table supplied from the normal equation generating unit 2425 using the matrix solution, and output these to the image generating unit 103.

Next, description will be made regarding the actual world estimating processing (processing in step S102 in FIG. 40) to which the two-dimensional polynomial approximating method is applied, with reference to the flowchart in FIG. 143.

For example, let us say that the light signal in the actual world 1 having continuity in the spatial direction represented with the gradient $G_F$ has been detected by the sensor 2 (FIG. 140), and has been stored in the input image storage unit 2422 as an input image corresponding to one frame. Also, let us say that the data continuity detecting unit 101 has subjected the region 2401 shown in FIG. 141 described above of the input image to processing in the continuity detecting processing in step S101 (FIG. 40), and has output the angle θ as data continuity information.

In this case, in step S2401, the conditions setting unit 2421 sets conditions (a tap range and the number of dimensions).

For example, let us say that a tap range 2441 shown in FIG. 144 has been set, and also 5 has been set as the number of dimensions.

FIG. 144 is a diagram for describing an example of a tap range. In FIG. 144, the X direction and Y direction represent the X direction and Y direction of the sensor 2 (FIG. 140). Also, the tap range 2441 represents a pixel group made up of 20 pixels (20 squares in the drawing) in total of 4 pixels in the X direction and also 5 pixels in the Y direction.

Further, as shown in FIG. 144, let us say that a pixel of interest has been set to a pixel, which is the second pixel from the left and also the third pixel from the bottom in the drawing, of the tap range 2441. Also, let us say that each pixel is denoted with a number l such as shown in FIG. 144 (l is any integer value of 0 through 19) according to the relative pixel positions (x, y) from the pixel of interest (a coordinate value of a pixel-of-interest coordinates system wherein the center (0, 0) of the pixel of interest is taken as the origin).

Now, description will return to FIG. 143, wherein in step S2402, the conditions setting unit 2421 sets a pixel of interest.

In step S2403, the input pixel value acquiring unit 2423 acquires an input pixel value based on the condition (tap range) set by the conditions setting unit 2421, and generates an input pixel value table. That is to say, in this case, the input pixel value acquiring unit 2423 acquires the input image region 2401 (FIG. 141), generates a table made up of 20 input pixel values P(l) as an input pixel value table.

Note that in this case, the relation between the input pixel values P(l) and the above input pixel values P(x, y) is a relation shown in the following Expression (73). However, in Expression (73), the left side represents the input pixel values P(l), and the right side represents the input pixel values P(x, y).

$$P(0) = P(0, 0)$$
$$P(1) = P(-1, 2)$$
$$P(2) = P(0, 2)$$
$$P(3) = P(1, 2)$$
$$P(4) = P(2, 2)$$
$$P(5) = P(-1, 1)$$
$$P(6) = P(0, 1)$$
$$P(7) = P(1, 1)$$
$$P(8) = P(2, 1)$$
$$P(9) = P(-1, 0)$$
$$P(10) = P(1, 0)$$
$$P(11) = P(2, 0)$$
$$P(12) = P(-1, -1)$$
$$P(13) = P(0, -1)$$
$$P(14) = P(1, -1)$$
$$P(15) = P(2, -1)$$
$$P(16) = P(-1, -2)$$
$$P(17) = P(0, -2)$$
$$P(18) = P(1, -2)$$
$$P(19) = P(2, -2)$$

(73)

In step S2404, the integral component calculation unit 2424 calculates integral components based on the conditions (a tap range and the number of dimensions) set by the conditions setting unit 2421, and the data continuity information (angle θ) supplied from the data continuity detecting unit 101, and generates an integral component table.

In this case, as described above, the input pixel values are not P(x, y) but P(l), and are acquired as the value of a pixel number l, so the integral component calculation unit 2424 calculates the integral components $S_i$(x−0.5, x+0.5, y−0.5, y+0.5) in the above Expression (72) as a function of l such as the integral components $S_i$(l) shown in the left side of the following Expression (74).

$$S_i(l) = S_i(x-0.5, x+0.5, y-0.5, y+0.5)$$ (74)

Specifically, in this case, the integral components $S_i$(l) shown in the following Expression (75) are calculated.

$$S_i(0) = S_i(-0.5, 0.5, -0.5, 0.5)$$
$$S_i(1) = S_i(-1.5, -0.5, 1.5, 2.5)$$
$$S_i(2) = S_i(-0.5, 0.5, 1.5, 2.5)$$
$$S_i(3) = S_i(0.5, 1.5, 1.5, 2.5)$$
$$S_i(4) = S_i(1.5, 2.5, 1.5, 2.5)$$
$$S_i(5) = S_i(-1.5, -0.5, 0.5, 1.5)$$
$$S_i(6) = S_i(-0.5, 0.5, 0.5, 1.5)$$
$$S_i(7) = S_i(0.5, 1.5, 0.5, 1.5)$$
$$S_i(8) = S_i(1.5, 2.5, 0.5, 1.5)$$
$$S_i(9) = S_i(-1.5, -0.5, -0.5, 0.5)$$
$$S_i(10) = S_i(0.5, 1.5, -0.5, 0.5)$$
$$S_i(11) = S_i(1.5, 2.5, -0.5, 0.5)$$
$$S_i(12) = S_i(-1.5, -0.5, -1.5, -0.5)$$
$$S_i(13) = S_i(-0.5, 0.5, -1.5, -0.5)$$
$$S_i(14) = S_i(0.5, 1.5, -1.5, -0.5)$$
$$S_i(15) = S_i(1.5, 2.5, -1.5, -0.5)$$
$$S_i(16) = S_i(-1.5, -0.5, -2.5, -1.5)$$
$$S_i(17) = S_i(-0.5, 0.5, -2.5, -1.5)$$
$$S_i(18) = S_i(0.5, 1.5, -2.5, -1.5)$$
$$S_i(19) = S_i(1.5, 2.5, -2.5, -1.5)$$

(75)

Note that in Expression (75), the left side represents the integral components $S_i$(l), and the right side represents the integral components $S_i$(x−0.5, x+0.5, y−0.5, y+0.5). That is to say, in this case, i is 0 through 5, and accordingly, the 120 $S_i$(l) in total of the 20 $S_0$(l) 20 $S_1$(l), 20 $S_2$(l), 20 $S_3$(l), 20 $S_4$(l), and 20 $S_5$(l) are calculated.

More specifically, first the integral component calculation unit 2424 calculates cot θ corresponding to the angle θ supplied from the data continuity detecting unit 101, and takes the calculated result as a variable s. Next, the integral component calculation unit 2424 calculates each of the 20 integral components $S_i(x-0.5, x+0.5, y-0.5, y+0.5)$ shown in the right side of Expression (74) regarding each of i=0 through 5 using the calculated variable s. That is to say, the 120 integral components $S_i(x-0.5, x+0.5, y-0.5, y+0.5)$ are calculated. Note that with this calculation of the integral components $S_i(x-0.5, x+0.5, y-0.5, y+0.5)$, the above Expression (72) is used. Subsequently, the integral component calculation unit 2424 converts each of the calculated 120 integral components $S_i(x-0.5, x+0.5, y-0.5, y+0.5)$ into the corresponding integral components $S_i(l)$ in accordance with Expression (75), and generates an integral component table including the converted 120 integral components $S_i(l)$.

Note that the sequence of the processing in step S2403 and the processing in step S2404 is not restricted to the example in FIG. 143, the processing in step S2404 may be executed first, or the processing in step S2403 and the processing in step S2404 may be executed simultaneously.

Next, in step S2405, the normal equation generating unit 2425 generates a normal equation table based on the input pixel value table generated by the input pixel value acquiring unit 2423 at the processing in step S2403, and the integral component table generated by the integral component calculation unit 2424 at the processing in step S2404.

Specifically, in this case, the features $w_i$ are calculated with the least squares method using the above Expression (71) (however, in Expression (70), the $S_i(l)$ into which the integral components $S_i(x-0.5, x+0.5, y-0.5, y+0.5)$ are converted using Expression (74) is used), so a normal equation corresponding to this is represented as the following Expression (76).

$$\begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \begin{pmatrix} w_0 \\ w_1 \\ \vdots \\ w_n \end{pmatrix} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \quad (76)$$

Note that in Expression (76), L represents the maximum value of the pixel number l in the tap range. n represents the number of dimensions of the approximation function f(x) serving as a polynomial. Specifically, in this case, n=5, and L=19.

If we define each matrix of the normal equation shown in Expression (76) as the following Expressions (77) through (79), the normal equation is represented as the following Expression (80).

$$S_{MAT} = \begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \quad (77)$$

$$W_{MAT} = \begin{pmatrix} w_0 \\ w_1 \\ \vdots \\ w_n \end{pmatrix} \quad (78)$$

$$P_{MAT} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \quad (79)$$

$$S_{MAT} W_{MAT} = P_{MAT} \quad (80)$$

As shown in Expression (78), the respective components of the matrix $W_{MAT}$ are the features $w_i$ to be obtained. Accordingly, in Expression (80), if the matrix $S_{MAT}$ of the left side and the matrix $P_{MAT}$ of the right side are determined, the matrix $W_{MAT}$ may be calculated with the matrix solution.

Specifically, as shown in Expression (77), the respective components of the matrix $S_{MAT}$ may be calculated with the above integral components $S_i(l)$. That is to say, the integral components $S_i(l)$ are included in the integral component table supplied from the integral component calculation unit 2424, so the normal equation generating unit 2425 can calculate each component of the matrix $S_{MAT}$ using the integral component table.

Also, as shown in Expression (79), the respective components of the matrix $P_{MAT}$ may be calculated with the integral components $S_i(l)$ and the input pixel values P(l). That is to say, the integral components $S_i(l)$ is the same as those included in the respective components of the matrix SET, also the input pixel values P(l) are included in the input pixel value table supplied from the input pixel value acquiring unit 2423, so the normal equation generating unit 2425 can calculate each component of the matrix $P_{MAT}$ using the integral component table and input pixel value table.

Thus, the normal equation generating unit 2425 calculates each component of the matrix $S_{MAT}$ and matrix $P_{MAT}$, and outputs the calculated results (each component of the matrix $S_{MAT}$ and matrix $P_{MAT}$) to the approximation function generating unit 2426 as a normal equation table.

Upon the normal equation table being output from the normal equation generating unit 2425, in step S2406, the approximation function generating unit 2426 calculates the features $w_i$ (i.e., the coefficients $w_i$ of the approximation function f(x, y) serving as a two-dimensional polynomial) serving as the respective components of the matrix $W_{MAT}$ in the above Expression (80) based on the normal equation table.

Specifically, the normal equation in the above Expression (80) can be transformed as the following Expression (81).

$$W_{MAT} = S_{MAT}^{-1} P_{MAT} \tag{81}$$

In Expression (81), the respective components of the matrix $W_{MAT}$ in the left side are the features $w_i$ to be obtained. The respective components regarding the matrix $S_{MAT}$ and matrix $P_{MAT}$ are included in the normal equation table supplied from the normal equation generating unit 2425. Accordingly, the approximation function generating unit 2426 calculates the matrix $W_{MAT}$ by calculating the matrix in the right side of Expression (81) using the normal equation table, and outputs the calculated results (features $w_i$) to the image generating unit 103.

In step S2407, the approximation function generating unit 2426 determines regarding whether or not the processing of all the pixels has been completed.

In step S2407, in the event that determination is made that the processing of all the pixels has not been completed, the processing returns to step S2402, wherein the subsequent processing is repeatedly performed. That is to say, the pixels that have not become a pixel of interest are sequentially taken as a pixel of interest, and the processing in step S2402 through S2407 is repeatedly performed.

In the event that the processing of all the pixels has been completed (in step S2407, in the event that determination is made that the processing of all the pixels has been completed), the estimating processing of the actual world 1 ends.

As description of the two-dimensional polynomial approximating method, an example for calculating the coefficients (features) $w_i$ of the approximation function $f(x, y)$ corresponding to the spatial directions (X direction and Y direction) has been employed, but the two-dimensional polynomial approximating method can be applied to the temporal and spatial directions (X direction and t direction, or Y direction and t direction) as well.

That is to say, the above example is an example in the case of the light signal in the actual world 1 having continuity in the spatial direction represented with the gradient $G_F$ (FIG. 139), and accordingly, the equation including two-dimensional integration in the spatial directions (X direction and Y direction), such as shown in the above Expression (66). However, the concept regarding two-dimensional integration can be applied not only to the spatial direction but also to the temporal and spatial directions (X direction and t direction, or Y direction and t direction).

In other words, with the two-dimensional polynomial approximating method, even in the case in which the light signal function $F(x, y, t)$, which needs to be estimated, has not only continuity in the spatial direction but also continuity in the temporal and spatial directions (however, X direction and t direction, or Y direction and t direction), this can be approximated with a two-dimensional polynomial.

Specifically, for example, in the event that there is an object moving horizontally in the X direction at uniform velocity, the direction of movement of the object is represented with like a gradient $V_F$ in the X-t plane such as shown in FIG. 145. In other words, it can be said that the gradient $V_F$ represents the direction of continuity in the temporal and spatial directions in the X-t plane. Accordingly, the data continuity detecting unit 101 can output movement θ such as shown in FIG. 145 (strictly speaking, though not shown in the drawing, movement θ is an angle generated by the direction of data continuity represented with the gradient $V_F$ corresponding to the gradient $V_F$ and the X direction in the spatial direction) as data continuity information corresponding to the gradient $V_F$ representing continuity in the temporal and spatial directions in the X-t plane as well as the above angle θ (data continuity information corresponding to continuity in the spatial directions represented with the gradient $G_F$ in the X-Y plane).

Accordingly, the actual world estimating unit 102 employing the two-dimensional polynomial approximating method can calculate the coefficients (features) $w_i$ of an approximation function $f(x, t)$ in the same method as the above method by employing the movement θ instead of the angle θ. However, in this case, the equation to be employed is not the above Expression (66) but the following Expression (82).

$$P(x, t) = \int_{t-0.5}^{t+0.5} \int_{x-0.5}^{x+0.5} \sum_{i=0}^{n} w_i (x - s \times t)^i \, dx \, dt + e \tag{82}$$

Note that in Expression (82), s is cot θ (however, θ is movement).

Also, an approximation function $f(y, t)$ focusing attention on the spatial direction Y instead of the spatial direction X can be handled in the same way as the above approximation function $f(x, t)$.

Thus, with the two-dimensional polynomial approximating method, for example, the multiple detecting elements of the sensor (for example, detecting elements 2-1 of the sensor 2 in FIG. 140) each having time-space integration effects project the light signals in the actual world 1 (FIG. 120), and the data continuity detecting unit 101 in FIG. 120 (FIG. 3) detects continuity of data (for example, continuity of data represented with $G_f$ in FIG. 141) in image data (for example, input image in FIG. 120) made up of multiple pixels having a pixel value projected by the detecting elements 2-1, which drop part of continuity (for example, continuity represented with the gradient $G_F$ in FIG. 139) of the light signal in the actual world 1.

For example, the actual world estimating unit 102 in FIG. 120 (FIG. 3) (FIG. 142 for configuration) estimates the light signal function F by approximating the light signal function F representing the light signal in the actual world 1 (specifically, function $F(x, y)$ in FIG. 139) with an approximation function f(for example, approximation function $f(x, y)$ shown in Expression (65)) serving as a polynomial on condition that the pixel value (for example, input pixel value $P(x, y)$ serving as the left side of the above Expression (65)) of a pixel corresponding to a position at least in the two-dimensional direction (for example, spatial direction X and spatial direction Y in FIG. 139 and FIG. 140) of the time-space directions of image data corresponding to continuity of data detected by the data continuity detecting unit 101 is the pixel value (for example, as shown in the right side of Expression (66), the value obtained by the approximation function $f(x, y)$ shown in the above Expression (65) being integrated in the X direction and Y direction) acquired by integration effects in the two-dimensional direction.

Speaking in detail, for example, the actual world estimating unit 102 estimates a first function representing the light signals in the real world by approximating the first function with a second function serving as a polynomial on condition that the pixel value of a pixel corresponding to a distance (for example, cross-sectional direction distance x' in FIG. 141) along in the two-dimensional direction from a line corresponding to continuity of data (for example, a line (arrow) corresponding to the gradient $G_f$ in FIG. 141) detected by the continuity detecting unit 101 is the pixel value acquired by integration effects at least in the two-dimensional direction.

Thus, the two-dimensional polynomial approximating method takes not one-dimensional but two-dimensional integration effects into consideration, so can estimate the light signals in the actual world 1 more accurately than the one-dimensional polynomial approximating method.

Next, description will be made regarding the third function approximating method with reference to FIG. 146 through FIG. 150.

That is to say, the third function approximating method is a method for estimating the light signal function F(x, y, t) by approximating the light signal function F(x, y, t) with the approximation function f(x, y, t) focusing attention on that the light signal in the actual world 1 having continuity in a pre-determined direction of the temporal and spatial directions is represented with the light signal function F(x, y, t), for example. Accordingly, hereafter, the third function approximating method is referred to as a three-dimensional function approximating method.

Also, with description of the three-dimensional function approximating method, let us say that the sensor 2 is a CCD made up of the multiple detecting elements 2-1 disposed on the plane thereof, such as shown in FIG. 146.

With the example in FIG. 146, the direction in parallel with a predetermined side of the detecting elements 2-1 is taken as the X direction serving as one direction of the spatial directions, and the direction orthogonal to the X direction is taken as the Y direction serving as the other direction of the spatial directions. The direction orthogonal to the X-Y plane is taken as the t direction serving as the temporal direction.

Also, with the example in FIG. 146, the spatial shape of the respective detecting elements 2-1 of the sensor 2 is taken as a square of which one side is 1 in length. The shutter time (exposure time) of the sensor 2 is taken as 1.

Further, with the example in FIG. 146, the center of one certain detecting element 2-1 of the sensor 2 is taken as the origin (the position in the X direction is x=0, and the position in the Y direction is y=0) in the spatial directions (X direction and Y direction), and also the intermediate point-in-time of the exposure time is taken as the origin (the position in the t direction is t=0) in the temporal direction (t direction).

In this case, the detecting element 2-1 of which the center is in the origin (x=0, y=0) in the spatial directions subjects the light signal function F(x, y, t) to integration with a range of −0.5 through 0.5 in the X direction, with a range of −0.5 through 0.5 in the Y direction, and with a range of −0.5 through 0.5 in the t direction, and outputs the integral value as the pixel value P.

That is to say, the pixel value P output from the detecting element 2-1 of which the center is in the origin in the spatial directions is represented with the following Expression (83).

$$P=\int_{-0.5}^{+0.5}\int_{-0.5}^{+0.5}\int_{-0.5}^{+0.5}F(x,y,t)dxdydt \quad (83)$$

Similarly, the other detecting elements 2-1 output the pixel value P shown in Expression (83) by taking the center of the detecting element 2-1 to be processed as the origin in the spatial directions.

Incidentally, as described above, with the three-dimensional function approximating method, the light signal function F(x, y, t) is approximated to the three-dimensional approximation function f(x, y, t).

Specifically, for example, the approximation function f(x, y, t) is taken as a function having N variables (features), a relational expression between the input pixel values P(x, y, t) corresponding to Expression (83) and the approximation function f(x, y, t) is defined. Thus, in the event that M input pixel values P(x, y, t) more than N are acquired, N variables (features) can be calculated from the defined relational expression. That is to say, the actual world estimating unit 102 can estimate the light signal function F(x, y, t) by acquiring M input pixel values P(x, y, t), and calculating N variables (features).

In this case, the actual world estimating unit 102 extracts (acquires) M input images P(x, y, t), of the entire input image by using continuity of data included in an input image (input pixel values) from the sensor 2 as a constraint (i.e., using data continuity information as to an input image to be output from the data continuity detecting unit 101). As a result, the prediction function f(x, y, t) is constrained by continuity of data.

For example, as shown in FIG. 147, in the event that the light signal function F(x, y, t) corresponding to an input image has continuity in the spatial direction represented with the gradient $G_F$, the data continuity detecting unit 101 results in outputting the angle θ (the angle θ generated between the direction of continuity of data represented with the gradient $G_f$ (not shown) corresponding to the gradient $G_F$, and the X direction) as data continuity information as to the input image.

In this case, let us say that a one-dimensional waveform wherein the light signal function F(x, y, t) is projected in the X direction (such a waveform is referred to as an X cross-sectional waveform here) has the same form even in the event of projection in any position in the Y direction.

That is to say, let us say that there is an X cross-sectional waveform having the same form, which is a two-dimensional (spatial directional) waveform continuous in the direction of continuity (angle θ direction as to the X direction), and a three-dimensional waveform wherein such a two-dimensional waveform continues in the temporal direction t, is approximated with the approximation function f(x, y, t).

In other words, an X cross-sectional waveform, which is shifted by a position y in the Y direction from the center of the pixel of interest, becomes a waveform wherein the X cross-sectional waveform passing through the center of the pixel of interest is moved (shifted) by a predetermined amount (amount varies according to the angle θ) in the X direction. Note that hereafter, such an amount is referred to as a shift amount.

This shift amount can be calculated as follows.

That is to say, the gradient $V_f$ (for example, gradient $V_f$ representing the direction of data continuity corresponding to the gradient $V_F$ in FIG. 147) and angle θ are represented as the following Expression (84).

$$G_f = \tan\theta = \frac{dy}{dx} \quad (84)$$

Note that in Expression (84), dx represents the amount of fine movement in the X direction, and dy represents the amount of fine movement in the Y direction as to the dx.

Accordingly, if the shift amount as to the X direction is described as $C_x(y)$, this is represented as the following Expression (85).

$$C_x(y) = \frac{y}{G_f} \quad (85)$$

If the shift amount $C_x(y)$ is thus defined, a relational expression between the input pixel values P(x, y, t) corresponding to Expression (83) and the approximation function f(x, y, t) is represented as the following Expression (86).

$$P(x,y,t)=\int_{t_s}^{t_e}\int_{y_s}^{y_e}\int_{x_s}^{x_e}f(x,y,t)dxdydt+e \quad (86)$$

In Expression (86), e represents a margin of error. $t_s$ represents an integration start position in the t direction, and $t_e$ represents an integration end position in the t direction. In the same way, $y_s$ represents an integration start position in the Y direction, and $y_e$ represents an integration end position in the Y direction. Also, $x_s$ represents an integration start position in the X direction, and $x_e$ represents an integration end position in the X direction. However, the respective specific integral ranges are as shown in the following Expression (87).

$$t_s = t - 0.5$$
$$t_e = t + 0.5$$
$$y_s = y - 0.5$$
$$y_e = y + 0.5$$
$$x_s = x - C_x(y) - 0.5$$
$$x_e = x - C_x(y) + 0.5 \quad (87)$$

As shown in Expression (87), it can be represented that an X cross-sectional waveform having the same form continues in the direction of continuity (angle θ direction as to the X direction) by shifting an integral range in the X direction as to a pixel positioned distant from the pixel of interest by (x, y) in the spatial direction by the shift amount $C_x(y)$.

Thus, with the three-dimensional function approximating method, the relation between the pixel values P(x, y, t) and the three-dimensional approximation function f(x, y, t) can be represented with Expression (86) (Expression (87) for the integral range), and accordingly, the light signal function F(x, y, t) (for example, a light signal having continuity in the spatial direction represented with the gradient $V_F$ such as shown in FIG. 147) can be estimated by calculating the N features of the approximation function f(x, y, t), for example, with the least squares method using Expression (86) and Expression (87).

Note that in the event that a light signal represented with the light signal function F(x, y, t) has continuity in the spatial direction represented with the gradient $V_F$ such as shown in FIG. 147, the light signal function F(x, y, t) may be approximated as follows.

That is to say, let us say that a one-dimensional waveform wherein the light signal function F(x, y, t) is projected in the Y direction (hereafter, such a waveform is referred to as a Y cross-sectional waveform) has the same form even in the event of projection in any position in the X direction.

In other words, let us say that there is a two-dimensional (spatial directional) waveform wherein a Y cross-sectional waveform having the same form continues in the direction of continuity (angle θ direction as to in the X direction), and a three-dimensional waveform wherein such a two-dimensional waveform continues in the temporal direction t is approximated with the approximation function f(x, y, t).

Accordingly, the Y cross-sectional waveform, which is shifted by x in the X direction from the center of the pixel of interest, becomes a waveform wherein the Y cross-sectional waveform passing through the center of the pixel of interest is moved by a predetermined shift amount (shift amount changing according to the angle θ) in the Y direction.

This shift amount can be calculated as follows.

That is to say, the gradient $G_F$ is represented as the above Expression (84), so if the shift amount as to the Y direction is described as $C_y(x)$, this is represented as the following Expression (88).

$$C_y(x) = G_f \times x \quad (88)$$

If the shift amount $C_x(y)$ is thus defined, a relational expression between the input pixel values P(x, y, t) corresponding to Expression (83) and the approximation function f(x, y, t) is represented as the above Expression (86), as with when the shift amount $C_x(y)$ is defined.

However, in this case, the respective specific integral ranges are as shown in the following Expression (89).

$$t_s = t - 0.5 \quad (89)$$
$$t_e = t + 0.5$$
$$y_s = y - C_y(x) - 0.5$$
$$y_e = y - C_y(x) + 0.5$$
$$x_s = x - 0.5$$
$$x_e = x + 0.5$$

As shown in Expression (89) (and the above Expression (86)), it can be represented that a Y cross-sectional waveform having the same form continues in the direction of continuity (angle θ direction as to the X direction) by shifting an integral range in the Y direction as to a pixel positioned distant from the pixel of interest by (x, y), by the shift amount $C_x(y)$.

Thus, with the three-dimensional function approximating method, the integral range of the right side of the above Expression (86) can be set to not only Expression (87) but also Expression (89), and accordingly, the light signal function F(x, y, t) (light signal in the actual world 1 having continuity in the spatial direction represented with the gradient $G_F$) can be estimated by calculating the n features of the approximation function f(x, y, t) with, for example, the least squares method or the like using Expression (86) in which Expression (89) is employed as an integral range.

Thus, Expression (87) and Expression (89), which represent an integral range, represent essentially the same with only a difference regarding whether perimeter pixels are shifted in the X direction (in the case of Expression (87)) or shifted in the Y direction (in the case of Expression (89)) in response to the direction of continuity.

However, in response to the direction of continuity (gradient $G_F$), there is a difference regarding whether the light signal function F(x, y, t) is regarded as a group of X cross-sectional waveforms, or is regarded as a group of Y cross-sectional waveforms. That is to say, in the event, that the direction of continuity is close to the Y direction, the light signal function F(x, y, t) is preferably regarded as a group of X cross-sectional waveforms. On the other hand, in the event that the direction of continuity is close to the X direction, the light signal function F(x, y, t) is preferably regarded as a group of Y cross-sectional waveforms.

Accordingly, it is preferable that the actual world estimating unit 102 prepares both Expression (87) and Expression (89) as an integral range, and selects any one of Expression (87) and Expression (89) as the integral range of the right side of the appropriate Expression (86) in response to the direction of continuity.

Description has been made regarding the three-dimensional function method in the case in which the light signal function F(x, y, t) has continuity (for example, continuity in the spatial direction represented with the gradient $G_F$ in FIG. 147) in the spatial directions (X direction and Y direction), but the three-dimensional function method can be applied to the case in which the light signal function F(x, y, t) has continuity (continuity represented with the gradient $V_F$) in the temporal and spatial directions (X direction, Y direction, and t direction), as shown in FIG. 148.

That is to say, in FIG. 148, a light signal function corresponding to a frame #N−1 is taken as F(x, y, #N−1), a light signal function corresponding to a frame #N is taken as F(x, y, #N), and a light signal function corresponding to a frame #N+1 is taken as F(x, y, #N+1).

Note that in FIG. 148, the horizontal direction is taken as the X direction serving as one direction of the spatial directions, the upper right diagonal direction is taken as the Y direction serving as the other direction of the spatial directions, and also the vertical direction is taken as the t direction serving as the temporal direction in the drawing.

Also, the frame #N−1 is a frame temporally prior to the frame #N, the frame #N+1 is a frame temporally following the frame #N. That is to say, the frame #N−1, frame #N, and frame #N+1 are displayed in the sequence of the frame #N−1, frame #N, and frame #N+1.

With the example in FIG. 148, a cross-sectional light level along the direction shown with the gradient $V_F$ (upper right inner direction from lower left near side in the drawing) is regarded as generally constant. Accordingly, with the example in FIG. 148, it can be said that the light signal function F(x, y, t) has continuity in the temporal and spatial directions represented with the gradient $V_F$.

In this case, in the event that a function C(x, y, t) representing continuity in the temporal and spatial directions is defined, and also the integral range of the above Expression (86) is defined with the defined function C(x, y, t), N features of the approximation function f(x, y, t) can be calculated as with the above Expression (87) and Expression (89).

The function C(x, y, t) is not restricted to a particular function as long as this is a function representing the direction of continuity. However, hereafter, let us say that linear continuity is employed, and $C_x(t)$ and $C_y(t)$ corresponding to the shift amount $C_x(y)$ (Expression (85)) and shift amount $C_y(x)$ (Expression (87)), which are functions representing continuity in the spatial direction described above, are defined as a function C (x, y, t) corresponding thereto as follows.

That is to say, if the gradient as continuity of data in the temporal and spatial directions corresponding to the gradient $G_f$ representing continuity of data in the above spatial direction is taken as $V_f$, and if this gradient $V_f$ is divided into the gradient in the X direction (hereafter, referred to as $V_{fx}$) and the gradient in the Y direction (hereafter, referred to as $V_{fy}$), the gradient $V_{fx}$ is represented with the following Expression (90), and the gradient $V_{fy}$ is represented with the following Expression (91), respectively.

$$V_{fx} = \frac{dx}{dt} \quad (90)$$

$$V_{fy} = \frac{dy}{dt} \quad (91)$$

In this case, the function $C_x(t)$ is represented as the following Expression (92) using the gradient $V_{fx}$ shown in Expression (90).

$$C_x(t) = V_{fx} \times t \quad (92)$$

Similarly, the function $C_y(t)$ is represented as the following Expression (93) using the gradient $V_{fy}$ shown in Expression (91).

$$C_x(t) = V_{fy} \times t \quad (93)$$

Thus, upon the function $C_x(t)$ and function $C_y(t)$, which represent continuity 2511 in the temporal and spatial directions, being defined, the integral range of Expression (86) is represented as the following Expression (94).

$$t_s = t - 0.5 \quad (94)$$
$$t_e = t + 0.5$$
$$y_s = y - C_y(t) - 0.5$$
$$y_e = y - C_y(t) + 0.5$$
$$x_s = x - C_x(t) - 0.5$$
$$x_e = x - C_x(t) + 0.5$$

Thus, with the three-dimensional function approximating method, the relation between the pixel values P(x, y, t) and the three-dimensional approximation function f(x, y, t) can be represented with Expression (86), and accordingly, the light signal function F(x, y, t) (light signal in the actual world 1 having continuity in a predetermined direction of the temporal and spatial directions) can be estimated by calculating the n+1 features of the approximation function f(x, y, t) with, for example, the least squares method or the like using Expression (94) as the integral range of the right side of Expression (86).

FIG. 149 represents a configuration example of the actual world estimating unit 102 employing such a three-dimensional function approximating method.

Note that the approximation function f(x, y, t) (in reality, the features (coefficients) thereof) calculated by the actual world estimating unit 102 employing the three-dimensional function approximating method is not restricted to a particular function, but an n (n=N−1)-dimensional polynomial is employed in the following description.

As shown in FIG. 149, the actual world estimating unit 102 includes a conditions setting unit 2521, input image storage unit 2522, input pixel value acquiring unit 2523, integral component calculation unit 2524, normal equation generating unit 2525, and approximation function generating unit 2526.

The conditions setting unit 2521 sets a pixel range (tap range) used for estimating the light signal function F(x, y, t) corresponding to a pixel of interest, and the number of dimensions n of the approximation function f(x, y, t).

The input image storage unit 2522 temporarily stores an input image (pixel values) from the sensor 2.

The input pixel acquiring unit 2523 acquires, of the input images stored in the input image storage unit 2522, an input image region corresponding to the tap range set by the conditions setting unit 2521, and supplies this to the normal equation generating unit 2525 as an input pixel value table. That is to say, the input pixel value table is a table in which the respective pixel values of pixels included in the input image region are described.

Incidentally, as described above, the actual world estimating unit 102 employing the three-dimensional function approximating method calculates the N features (in this case, coefficient of each dimension) of the approximation function f(x, y) with the least squares method using the above Expression (86) (however, Expression (87), Expression (90), or Expression (94) for the integral range).

The right side of Expression (86) can be represented as the following Expression (95) by calculating the integration thereof.

$$P(x, y, t) = \sum_{i=0}^{n} w_i S_i(x_s, x_e, y_s, y_e, t_s, t_e) + e \quad (95)$$

In Expression (95), $w_i$ represents the coefficients (features) of the i-dimensional term, and also $S_i(x_s, x_e, y_s, y_e, t_s, t_e)$ represents the integral components of the i-dimensional term. However, $x_s$ represents an integral range start position in the X direction, $x_e$ represents an integral range end position in the X direction, $y_s$ represents an integral range start position in the Y direction, $y_e$ represents an integral range end position in the Y direction, $t_s$ represents an integral range start position in the t direction, $t_e$ represents an integral range end position in the t direction, respectively.

The integral component calculation unit 2524 calculates the integral components $S_i(x_s, x_e, y_s, y_e, t_s, t_e)$.

That is to say, the integral component calculation unit 2524 calculates the integral components $S_i(x_s, x_e, y_s, y_e, t_s, t_e)$ based on the tap range and the number of dimensions set by the conditions setting unit 2521, and the angle or movement (as the integral range, angle in the case of using the above Expression (87) or Expression (90), and movement in the case of using the above Expression (94)) of the data continuity information output from the data continuity detecting unit 101, and supplies the calculated results to the normal equation generating unit 2525 as an integral component table.

The normal equation generating unit 2525 generates a normal equation in the case of obtaining the above Expression (95) with the least squares method using the input pixel value table supplied from the input pixel value acquiring unit 2523, and the integral component table supplied from the integral component calculation unit 2524, and outputs this to the approximation function generating unit 2526 as a normal equation table. An example of a normal equation will be described later.

The approximation function generating unit 2526 calculates the respective features $w_i$ (in this case, the coefficients $w_i$ of the approximation function f(x, y) serving as a three-dimensional polynomial) by solving the normal equation included in the normal equation table supplied from the normal equation generating unit 2525 with the matrix solution, and output these to the image generating unit 103.

Next, description will be made regarding the actual world estimating processing (processing in step S102 in FIG. 40) to which the three-dimensional function approximating method is applied, with reference to the flowchart in FIG. 150.

First, in step S2501, the conditions setting unit 2521 sets conditions (a tap range and the number of dimensions).

For example, let us say that a tap range made up of L pixels has been set. Also, let us say that a predetermined number l (l is any one of integer values 0 through L−1) is appended to each of the pixels.

Next, in step S2502, the conditions setting unit 2521 sets a pixel of interest.

In step S2503, the input pixel value acquiring unit 2523 acquires an input pixel value based on the condition (tap range) set by the conditions setting unit 2521, and generates an input pixel value table. In this case, a table made up of L input pixel values P(x, y, t) is generated. Here, let us say that each of the L input pixel values P(x, y, t) is described as P(l) serving as a function of the number l of the pixel thereof. That is to say, the input pixel value table becomes a table including L P(l).

In step S2504, the integral component calculation unit 2524 calculates integral components based on the conditions (a tap range and the number of dimensions) set by the conditions setting unit 2521, and the data continuity information (angle or movement) supplied from the data continuity detecting unit 101, and generates an integral component table.

However, in this case, as described above, the input pixel values are not P(x, y, t) but P(l), and are acquired as the value of a pixel number l, so the integral component calculation unit 2524 results in calculating the integral components $S_i(x_s, x_e, y_s, y_e, t_s, t_e)$ in the above Expression (95) as a function of l such as the integral components $S_i(l)$. That is to say, the integral component table becomes a table including L×i $S_i(l)$.

Note that the sequence of the processing in step S2503 and the processing in step S2504 is not restricted to the example in FIG. 150, so the processing in step S2504 may be executed first, or the processing in step S2503 and the processing in step S2504 may be executed simultaneously.

Next, in step S2505, the normal equation generating unit 2525 generates a normal equation table based on the input pixel value table generated by the input pixel value acquiring unit 2523 at the processing in step S2503, and the integral component table generated by the integral component calculation unit 2524 at the processing in step S2504.

Specifically, in this case, the features $w_i$ of the following Expression (96) corresponding to the above Expression (95) are calculated using the least squares method. A normal equation corresponding to this is represented as the following Expression (97).

$$P(l) = \sum_{i=0}^{n} w_i S_i(l) + e \quad (96)$$

$$\begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \begin{pmatrix} w_0 \\ w_1 \\ \vdots \\ w_n \end{pmatrix} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \quad (97)$$

If we define each matrix of the normal equation shown in Expression (97) as the following Expressions (98) through (100), the normal equation is represented as the following Expression (101).

$$S_{MAT} = \begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \quad (98)$$

$$W_{MAT} = \begin{pmatrix} w_0 \\ w_1 \\ \vdots \\ w_n \end{pmatrix} \quad (99)$$

$$P_{MAT} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \quad (100)$$

$$S_{MAT} W_{MAT} = P_{MAT} \quad (101)$$

As shown in Expression (99), the respective components of the matrix $W_{MAT}$ are the features $w_i$ to be obtained. Accordingly, in Expression (101), if the matrix $S_{MAT}$ of the left side and the matrix $P_{MAT}$ of the right side are determined, the matrix $W_{MAT}$ (i.e., features $w_i$) may by be calculated with the matrix solution.

Specifically, as shown in Expression (98), the respective components of the matrix $S_{MAT}$ may be calculated as long as the above integral components $S_i(l)$ are known. The integral components $S_i(l)$ are included in the integral component table supplied from the integral component calculation unit 2524, so the normal equation generating unit 2525 can calculate each component of the matrix $S_{MAT}$ using the integral component table.

Also, as shown in Expression (100), the respective components of the matrix $P_{MAT}$ may be calculated as long as the integral components $S_i(l)$ and the input pixel values $P(l)$ are known. The integral components $S_i(l)$ is the same as those included in the respective components of the matrix $S_{MAT}$, also the input pixel values $P(l)$ are included in the input pixel value table supplied from the input pixel value acquiring unit 2523, so the normal equation generating unit 2525 can calculate each component of the matrix $P_{MAT}$ using the integral component table and input pixel value table.

Thus, the normal equation generating unit 2525 calculates each component of the matrix $S_{MAT}$ and matrix $P_{MAT}$, and outputs the calculated results (each component of the matrix $S_{MAT}$ and matrix $P_{MAT}$) to the approximation function generating unit 2526 as a normal equation table.

Upon the normal equation table being output from the normal equation generating unit 2526, in step S2506, the approximation function generating unit 2526 calculates the features $w_i$ (i.e., the coefficients $w_i$ of the approximation function f(x, y, t)) serving as the respective components of the matrix $W_{MAT}$ in the above Expression (101) based on the normal equation table.

Specifically, the normal equation in the above Expression (101) can be transformed as the following Expression (102).

$$W_{MAT} = S_{MAT}^{-1} P_{MAT} \quad (102)$$

In Expression (102), the respective components of the matrix $W_{MAT}$ in the left side are the features $w_i$ to be obtained. The respective components regarding the matrix $S_{MAT}$ and matrix $P_{MAT}$ are included in the normal equation table supplied from the normal equation generating unit 2525. Accordingly, the approximation function generating unit 2526 calculates the matrix $W_{MAT}$ by calculating the matrix in the right side of Expression (102) using the normal equation table, and outputs the calculated results (features $w_i$) to the image generating unit 103.

In step S2507, the approximation function generating unit 2526 determines regarding whether or not the processing of all the pixels has been completed.

In step S2507, in the event that determination is made that the processing of all the pixels has not been completed, the processing returns to step S2502, wherein the subsequent processing is repeatedly performed. That is to say, the pixels that have not become a pixel of interest are sequentially taken as a pixel of interest, and the processing in step S2502 through S2507 is repeatedly performed.

In the event that the processing of all the pixels has been completed (in step S5407, in the event that determination is made that the processing of all the pixels has been completed), the estimating processing of the actual world 1 ends.

As described above, the three-dimensional function approximating method takes three-dimensional integration effects in the temporal and spatial directions into consideration instead of one-dimensional or two-dimensional integration effects, and accordingly, can estimate the light signals in the actual world 1 more accurately than the one-dimensional polynomial approximating method and two-dimensional polynomial approximating method.

In other words, with the three-dimensional function approximating method, for example, the actual world estimating unit 102 in FIG. 120 (FIG. 3) (for example, FIG. 149 for configuration) estimates the light signal function F by approximating the light signal function F representing the light signal in the actual world (specifically, for example, the light signal function F(x, y, t) in FIG. 147 and FIG. 148) with a predetermined approximation function f(specifically, for example, the approximation function f(x, y, t) in the right side of Expression (86)), on condition that the multiple detecting elements of the sensor (for example, detecting elements 2-1 of the sensor 2 in FIG. 146) each having time-space integration effects project the light signals in the actual world 1, of the input image made up of multiple pixels having a pixel value projected by the detecting elements, which drop part of continuity (for example, continuity represented with the gradient $G_F$ in FIG. 147, or represented with the gradient VF in FIG. 148) of the light signal in the actual world 1, the above pixel value (for example, input pixel values P(x, y, z) in the left side of Expression (87)) of the above pixel corresponding to at least a position in the one-dimensional direction (for example, three-dimensional directions of the spatial direction X, spatial direction Y, and temporal direction t in FIG. 148) of the time-space directions is a pixel value (for example, a value obtained by the approximation function f(x, y, t) being integrated in three dimensions of the X direction, Y direction, and t direction, such as shown in the right side of the above Expression (86)) acquired by at least integration effects in the one-dimensional direction.

Further, for example, in the event that the data continuity detecting unit 101 in FIG. 120 (FIG. 3) detects continuity of input image data, the actual world estimating unit 102 estimates the light signal function F by approximating the light signal function F with the approximation function f on condition that the pixel value of a pixel corresponding to at least a position in the one-dimensional direction of the time-space directions of the image data corresponding to continuity of data detected by the data continuity detecting unit 101 is the pixel value acquired by at least integration effects in the one-dimensional direction.

Speaking in detail, for example, the actual world estimating unit 102 estimates the light signal function by approximating the light signal function F with the approximation function f on condition that the pixel value of a pixel corresponding to a distance (for example, shift amounts $C_x(y)$ in the above Expression (85)) along at least in the one-dimensional direction from a line corresponding to continuity of data detected by the continuity detecting unit 101 is the pixel value (for example, a value obtained by the approximation function f(x, y, t) being integrated in three dimensions of the X direction, Y direction, and t direction, such as shown in the right side of Expression (86) with an integral range such as shown in the above Expression (87)) acquired by at least integration effects in the one-dimensional direction.

Accordingly, the three-dimensional function approximating method can estimate the light signals in the actual world 1 more accurately.

Next, description will be made regarding an embodiment of the image generating unit 103 (FIG. 3) with reference to FIG. 151 through FIG. 172.

FIG. 151 is a diagram for describing the principle of the present embodiment.

As shown in FIG. 151, the present embodiment is based on condition that the actual world estimating unit 102 employs a function approximating method. That is to say, let us say that the signals in the actual world 1 (distribution of light intensity) serving as an image cast in the sensor 2 are represented with a predetermined function F, it is an assumption for the actual world estimating unit 102 to estimate the function F by approximating the function F with a predetermined function f using the input image (pixel value P) output from the sensor 2 and the data continuity information output from the data continuity detecting unit 101.

Note that hereafter, with description of the present embodiment, the signals in the actual world 1 serving as an image are particularly referred to as light signals, and the function F is particularly referred to as a light signal function F. Also, the function f is particularly referred to as an approximation function f.

With the present embodiment, the image generating unit 103 integrates the approximation function f with a predetermined time-space region using the data continuity information output from the data continuity detecting unit 101, and the actual world estimating information (in the example in FIG. 151, the features of the approximation function f) output from the actual world estimating unit 102 based on such an assumption, and outputs the integral value as an output pixel value M (output image). Note that with the present embodiment, an input pixel value is described as P, and an output pixel value is described as M in order to distinguish an input image pixel from an output image pixel.

In other words, upon the light signal function F being integrated once, the light signal function F becomes an input pixel value P, the light signal function F is estimated from the input pixel value P (approximated with the approximation function f), the estimated light signal function F (i.e., approximation function f) is integrated again, and an output pixel value M is generated. Accordingly, hereafter, integration of the approximation function f executed by the image generating unit 103 is referred to as reintegration. Also, the present embodiment is referred to as a reintegration method.

Note that as described later, with the reintegration method, the integral range of the approximation function f in the event that the output pixel value M is generated is not restricted to the integral range of the light signal function F in the event that the input pixel value P is generated (i.e., the vertical width and horizontal width of the detecting element of the sensor 2 for the spatial direction, the exposure time of the sensor 2 for the temporal direction), an arbitrary integral range may be employed.

For example, in the event that the output pixel value M is generated, varying the integral range in the spatial direction of the integral range of the approximation function f enables the pixel pitch of an output image according to the integral range thereof to be varied. That is to say, creation of spatial resolution is available.

In the same way, for example, in the event that the output pixel value M is generated, varying the integral range in the temporal direction of the integral range of the approximation function f enables creation of temporal resolution.

Hereafter, description will be made individually regarding three specific methods of such a reintegration method with reference to the drawings.

That is to say, three specific methods are reintegration methods corresponding to three specific methods of the function approximating method (the above three specific examples of the embodiment of the actual world estimating unit 102) respectively.

Specifically, the first method is a reintegration method corresponding to the above one-dimensional polynomial approximating method (one method of the function approximating method). Accordingly, with the first method, one-dimensional reintegration is performed, so hereafter, such a reintegration method is referred to as a one-dimensional reintegration method.

The second method is a reintegration method corresponding to the above two-dimensional polynomial approximating method (one method of the function approximating method). Accordingly, with the second method, two-dimensional reintegration is performed, so hereafter, such a reintegration method is referred to as a two-dimensional reintegration method.

The third method is a reintegration method corresponding to the above three-dimensional function approximating method (one method of the function approximating method). Accordingly, with the third method, three-dimensional reintegration is performed, so hereafter, such a reintegration method is referred to as a three-dimensional reintegration method.

Hereafter, description will be made regarding each details of the one-dimensional reintegration method, two-dimensional reintegration method, and three-dimensional reintegration method in this order.

First, the one-dimensional reintegration method will be described.

With the one-dimensional reintegration method, it is an assumption that the approximation function f(x) is generated using the one-dimensional polynomial approximating method.

That is to say, it is an assumption that a one-dimensional waveform (with description of the reintegration method, a waveform projected in the X direction of such a waveform is referred to as an X cross-sectional waveform F(x)) wherein the light signal function F(x, y, t) of which variables are positions x, y, and z on the three-dimensional space, and a point-in-time t is projected in a predetermined direction (for example, X direction) of the X direction, Y direction, and z direction serving as the spatial direction, and t direction serving as the temporal direction, is approximated with the approximation function f(x) serving as an n-dimensional (n is an arbitrary integer) polynomial.

In this case, with the one-dimensional reintegration method, the output pixel value M is calculated such as the following Expression (103).

$$M = G_e \times \int_{x_s}^{x_e} f(x)dx \tag{103}$$

Note that in Expression (103), $x_s$ represents an integration start position, $x_e$ represents an integration end position. Also, $G_e$ represents a predetermined gain.

Specifically, for example, let us say that the actual world estimating unit 102 has already generated the approximation function f(x) (the approximation function f(x) of the X cross-sectional waveform F(x)) such as shown in FIG. 152 with a pixel 3101 (pixel 3101 corresponding to a predetermined detecting element of the sensor 2) such as shown in FIG. 152 as a pixel of interest.

Note that with the example in FIG. 152, the pixel value (input pixel value) of the pixel 3101 is taken as P, and the shape of the pixel 3101 is taken as a square of which one side is 1 in length. Also, of the spatial directions, the direction in parallel with one side of the pixel 3101 (horizontal direction in the drawing) is taken as the X direction, and the direction orthogonal to the X direction (vertical direction in the drawing) is taken as the Y direction.

Also, on the lower side in FIG. 152, the coordinates system (hereafter, referred to as a pixel-of-interest coordinates system) in the spatial directions (X direction and Y direction) of which the origin is taken as the center of the pixel 3101, and the pixel 3101 in the coordinates system are shown.

Further, on the upward direction in FIG. 152, a graph representing the approximation function f(x) at y=0 (y is a coordinate value in the Y direction in the pixel-of-interest coordinates system shown on the lower side in the drawing) is shown. In this graph, the axis in parallel with the horizontal direction in the drawing is the same axis as the x axis in the X direction in the pixel-of-interest coordinates system shown on the lower side in the drawing (the origin is also the same), and also the axis in parallel with the vertical direction in the drawing is taken as an axis representing pixel values.

In this case, the relation of the following Expression (104) holds between the approximation function f(x) and the pixel value P of the pixel 3101.

$$P = \int_{-0.5}^{+0.5} f(x)dx + e \tag{104}$$

Also, as shown in FIG. 152, let us say that the pixel 3101 has continuity of data in the spatial direction represented with the gradient $G_f$. Further, let us say that the data continuity detecting unit 101 (FIG. 151) has already output the angle θ such as shown in FIG. 152 as data continuity information corresponding to continuity of data represented with the gradient $G_f$.

In this case, for example, with the one-dimensional reintegration method, as shown in FIG. 153, four pixels 3111 through 3114 can be newly created in a range of −0.5 through 0.5 in the X direction, and also in a range of −0.5 through 0.5 in the Y direction (in the range where the pixel 3101 in FIG. 152 is positioned).

Note that on the lower side in FIG. 153, the same pixel-of-interest coordinates system as that in FIG. 152, and the pixels 3111 through 3114 in the pixel-of-interest coordinates system thereof are shown. Also, on the upper side in FIG. 153, the same graph (graph representing the approximation function f(x) at y=0) as that in FIG. 152 is shown.

Specifically, as shown in FIG. 153, with the one-dimensional reintegration method, calculation of the pixel value M(1) of the pixel 3111 using the following Expression (105), calculation of the pixel value M(2) of the pixel 3112 using the following Expression (106), calculation of the pixel value M(3) of the pixel 3113 using the following Expression (107), and calculation of the pixel value M(4) of the pixel 3114 using the following Expression (108) are available respectively.

$$M(1) = 2 \times \int_{x_{s1}}^{x_{e1}} f(x)dx \tag{105}$$

$$M(2) = 2 \times \int_{x_{s2}}^{x_{e2}} f(x)dx \tag{106}$$

$$M(3) = 2 \times \int_{x_{s3}}^{x_{e3}} f(x)dx \tag{107}$$

$$M(4) = 2 \times \int_{x_{s4}}^{x_{e4}} f(x)dx \tag{108}$$

Note that $x_{s1}$ in Expression (105), $x_{s2}$ in Expression (106), $x_{s3}$ in Expression (107), and $x_{s4}$ in Expression (108) each represent the integration start position of the corresponding expression. Also, $x_{e1}$ in Expression (105), $x_{e2}$ in Expression (106), $x_{e3}$ in Expression (107), and $x_{e4}$ in Expression (108) each represent the integration end position of the corresponding expression.

The integral range in the right side of each of Expression (105) through Expression (108) becomes the pixel width (length in the X direction) of each of the pixel 3111 through pixel 3114. That is to say, each of $x_{e1}-x_{s1}$, $x_{e2}-x_{s2}$, $x_{e3}-x_{s3}$, and $x_{e4}-x_{s4}$ becomes 0.5.

However, in this case, it can be conceived that a one-dimensional waveform having the same form as that in the approximation function f(x) at y=0 continues not in the Y direction but in the direction of data continuity represented with the gradient $G_f$ (i.e., angle θ direction) (in fact, a waveform having the same form as the X cross-sectional waveform F(x) at y=0 continues in the direction of continuity). That is to say, in the case in which a pixel value f(0) in the origin (0, 0) in the pixel-of-interest coordinates system in FIG. 153 (center of the pixel 3101 in FIG. 152) is taken as a pixel value f1, the direction where the pixel value f1 continues is not the Y direction but the direction of data continuity represented with the gradient $G_f$ (angle θ direction).

In other words, in the case of conceiving the waveform of the approximation function f(x) in a predetermined position y in the Y direction (however, y is a numeric value other than zero), the position corresponding to the pixel value f1 is not a position (0, y) but a position ($C_x(y)$, y) obtained by moving in the X direction from the position (0, y) by a predetermined amount (here, let us say that such an amount is also referred to as a shift amount. Also, a shift amount is an amount depending on the position y in the Y direction, so let us say that this shift amount is described as $C_x(y)$).

Accordingly, as the integral range of the right side of each of the above Expression (105) through Expression (108), the integral range needs to be set in light of the position y in the Y direction where the center of the pixel value M(1) to be obtained (however, 1 is any integer value of 1 through 4) exists, i.e., the shift amount $C_x(y)$.

Specifically, for example, the position y in the Y direction where the centers of the pixel 3111 and pixel 3112 exist is not y=0 but y=0.25.

Accordingly, the waveform of the approximation function f(x) at y=0.25 is equivalent to a waveform obtained by moving the waveform of the approximation function f(x) at y=0 by the shift amount $C_x(0.25)$ in the X direction.

In other words, in the above Expression (105), if we say that the pixel value M(1) as to the pixel 3111 is obtained by integrating the approximation function f(x) at y=0 with a predetermined integral range (from the start position $x_{s1}$ to the end position $x_{e1}$), the integral range thereof becomes not a range from the start position $x_{s1}$=−0.5 to the end position $x_{e1}$=0 (a range itself where the pixel 3111 occupies in the X direction) but the range shown in FIG. 153, i.e., from the start position $x_{s1}$=−0.5+$C_x$(0.25) to the end position $x_{e1}$=0+$C_x$(0.25) (a range where the pixel 3111 occupies in the X direction in the event that the pixel 3111 is tentatively moved by the shift amount $C_x$(0.25)).

Similarly, in the above Expression (106), if we say that the pixel value M(2) as to the pixel 3112 is obtained by integrating the approximation function f(x) at y=0 with a predetermined integral range (from the start position $x_{s2}$ to the end position $x_{e2}$), the integral range thereof becomes not a range from the start position $x_{s2}$=0 to the end position $x_{e2}$=0.5 (a range itself where the pixel 3112 occupies in the X direction) but the range shown in FIG. 153, i.e., from the start position $x_{s2}$=0+$C_x$(0.25) to the end position $x_{e1}$=0.5+$C_x$(0.25) (a range where the pixel 3112 occupies in the X direction in the event that the pixel 3112 is tentatively moved by the shift amount $C_x$(0.25)).

Also, for example, the position y in the Y direction where the centers of the pixel 3113 and pixel 3114 exist is not y=0 but y=−0.25.

Accordingly, the waveform of the approximation function f(x) at y=−0.25 is equivalent to a waveform obtained by moving the waveform of the approximation function f(x) at y=0 by the shift amount $C_x$(−0.25) in the X direction.

In other words, in the above Expression (107), if we say that the pixel value M(3) as to the pixel 3113 is obtained by integrating the approximation function f(x) at y=0 with a predetermined integral range (from the start position $x_{s3}$ to the end position $x_{e3}$), the integral range thereof becomes not a range from the start position $x_{s3}$=−0.5 to the end position $x_{e3}$=0 (a range itself where the pixel 3113 occupies in the X direction) but the range shown in FIG. 153, i.e., from the start position $x_{s3}$=−0.5+$C_x$(−0.25) to the end position $x_{e3}$=0+$C_x$(−0.25) (a range where the pixel 3113 occupies in the X direction in the event that the pixel 3113 is tentatively moved by the shift amount $C_x$(−0.25)).

Similarly, in the above Expression (108), if we say that the pixel value M(4) as to the pixel 3114 is obtained by integrating the approximation function f(x) at y=0 with a predetermined integral range (from the start position $x_{s4}$ to the end position $x_{e4}$), the integral range thereof becomes not a range from the start position $x_{s4}$=0 to the end position $x_{e4}$=0.5 (a range itself where the pixel 3114 occupies in the X direction) but the range shown in FIG. 153, i.e., from the start position $x_{s4}$=0+$C_x$(−0.25) to the end position $x_{e1}$=0.5+$C_x$(−0.25) (a range where the pixel 3114 occupies in the X direction in the event that the pixel 3114 is tentatively moved by the shift amount $C_x$(−0.25)).

Accordingly, the image generating unit 102 (FIG. 151) calculates the above Expression (105) through Expression (108) by substituting the corresponding integral range of the above integral ranges for each of these expressions, and outputs the calculated results of these as the output pixel values M(1) through M(4).

Thus, the image generating unit 102 can create four pixels having higher spatial resolution than that of the output pixel 3101, i.e., the pixel 3111 through pixel 3114 (FIG. 153) by employing the one-dimensional reintegration method as a pixel at the output pixel 3101 (FIG. 152) from the sensor 2 (FIG. 151). Further, though not shown in the drawing, as described above, the image generating unit 102 can create a pixel having an arbitrary powered spatial resolution as to the output pixel 3101 without deterioration by appropriately changing an integral range, in addition to the pixel 3111 through pixel 3114.

FIG. 154 represents a configuration example of the image generating unit 103 employing such a one-dimensional reintegration method.

As shown in FIG. 154, the image generating unit 103 shown in this example includes a conditions setting unit 3121, features storage unit 3122, integral component calculation unit 3123, and output pixel value calculation unit 3124.

The conditions setting unit 3121 sets the number of dimensions n of the approximation function f(x) based on the actual world estimating information (the features of the approximation function f(x) in the example in FIG. 154) supplied from the actual world estimating unit 102.

The conditions setting unit 3121 also sets an integral range in the case of reintegrating the approximation function f(x) (in the case of calculating an output pixel value). Note that an integral range set by the conditions setting unit 3121 does not need to be the width of a pixel. For example, the approximation function f(x) is integrated in the spatial direction (X direction), and accordingly, a specific integral range can be determined as long as the relative size (power of spatial resolution) of an output pixel (pixel to be calculated by the image generating unit 103) as to the spatial size of each pixel of an input image from the sensor 2 (FIG. 151) is known. Accordingly, the conditions setting unit 3121 can set, for example, a spatial resolution power as an integral range.

The features storage unit 3122 temporally stores the features of the approximation function f(x) sequentially supplied from the actual world estimating unit 102. Subsequently, upon the features storage unit 3122 storing all of the features of the approximation function f(x), the features storage unit 3122 generates a features table including all of the features of the approximation function f(x), and supplies this to the output pixel value calculation unit 3124.

Incidentally, as described above, the image generating unit 103 calculates the output pixel value M using the above Expression (103), but the approximation function f(x) included in the right side of the above Expression (103) is represented as the following Expression (109) specifically.

$$f(x) = \sum_{i=0}^{n} w_i \times x^i dx \qquad (109)$$

Note that in Expression (109), $w_i$ represents the features of the approximation function f(x) supplied from the actual world estimating unit 102.

Accordingly, upon the approximation function f(x) of Expression (109) being substituted for the approximation function f(x) of the right side of the above Expression (103) so as to expand (calculate) the right side of Expression (103), the output pixel value M is represented as the following Expression (110)

$$M = G_e \times \sum_{i=0}^{n} w_i \times \frac{x_e^{i+1} - x_s^{i+1}}{i+1} \quad (110)$$

$$= \sum_{i=0}^{n} w_i \times k_i(x_s, x_e)$$

In Expression (110), $K_i(x_s, x_e)$ represent the integral components of the i-dimensional term. That is to say, the integral components $K_i(x_s, x_e)$ are such as shown in the following Expression (111).

$$k_i(x_s, x_e) = G_e \times \frac{x_e^{i+1} - x_s^{i+1}}{i+1} \quad (111)$$

The integral component calculation unit 3123 calculates the integral components $K_i(x_s, x_e)$.

Specifically, as shown in Expression (111), the components $K_i(x_s, x_e)$ can be calculated as long as the start position $x_s$ and end position $x_e$ of an integral range, gain $G_e$, and i of the i-dimensional term are known.

Of these, the gain $G_e$ is determined with the spatial resolution power (integral range) set by the conditions setting unit 3121.

The range of i is determined with the number of dimensions n set by the conditions setting unit 3121.

Also, each of the start position $x_s$ and end position $x_e$ of an integral range is determined with the center pixel position (x, y) and pixel width of an output pixel to be generated from now, and the shift amount $C_x(y)$ representing the direction of data continuity. Note that (x, y) represents the relative position from the center position of a pixel of interest when the actual world estimating unit 102 generates the approximation function f(x).

Further, each of the center pixel position (x, y) and pixel width of an output pixel to be generated from now is determined with the spatial resolution power (integral range) set by the conditions setting unit 3121.

Also, with the shift amount $C_x(y)$, and the angle θ supplied from the data continuity detecting unit 101, the relation such as the following Expression (112) and Expression (113) holds, and accordingly, the shift amount $C_x(y)$ is determined with the angle θ.

$$G_f = \tan\theta = \frac{dy}{dx} \quad (112)$$

$$C_x(y) = \frac{y}{G_f} \quad (113)$$

Note that in Expression (112), $G_f$ represents a gradient representing the direction of data continuity, θ represents an angle (angle generated between the X direction serving as one direction of the spatial directions and the direction of data continuity represented with a gradient $G_f$) of one of the data continuity information output from the data continuity detecting unit 101 (FIG. 151). Also, dx represents the amount of fine movement in the X direction, and dy represents the amount of fine movement in the Y direction (spatial direction perpendicular to the X direction) as to the dx.

Accordingly, the integral component calculation unit 3123 calculates the integral components $K_i(x_s, x_e)$ based on the number of dimensions and spatial resolution power (integral range) set by the conditions setting unit 3121, and the angle θ of the data continuity information output from the data continuity detecting unit 101, and supplies the calculated results to the output pixel value calculation unit 3124 as an integral component table.

The output pixel value calculation unit 3124 calculates the right side of the above Expression (110) using the features table supplied from the features storage unit 3122 and the integral component table supplied from the integral component calculation unit 3123, and outputs the calculation result as an output pixel value M.

Next, description will be made regarding image generating processing (processing in step S103 in FIG. 40) by the image generating unit 103 (FIG. 154) employing the one-dimensional reintegration method with reference to the flowchart in FIG. 155.

For example, now, let us say that the actual world estimating unit 102 has already generated the approximation function f(x) such as shown in FIG. 152 while taking the pixel 3101 such as shown in FIG. 152 described above as a pixel of interest at the processing in step S102 in FIG. 40 described above.

Also, let us say that the data continuity detecting unit 101 has already output the angle θ such as shown in FIG. 152 as data continuity information at the processing in step S101 in FIG. 40 described above.

In this case, the conditions setting unit 3121 sets conditions (the number of dimensions and an integral range) at step S3101 in FIG. 155.

For example, now, let us say that 5 has been set as the number of dimensions, and also a spatial quadruple density (spatial resolution power to cause the pitch width of a pixel to become half power in the upper/lower/left/right sides) has been set as an integral range.

That is to say, in this case, consequently, it has been set that the four pixel 3111 through pixel 3114 are created newly in a range of −0.5 through 0.5 in the X direction, and also a range of −0.5 through 0.5 in the Y direction (in the range of the pixel 3101 in FIG. 152), such as shown in FIG. 153.

In step S3102, the features storage unit 3122 acquires the features of the approximation function f(x) supplied from the actual world estimating unit 102, and generates a features table. In this case, coefficients $w_0$ through $w_5$ of the approximation function f(x) serving as a five-dimensional polynomial are supplied from the actual world estimating unit 102, and accordingly, ($w_0$, $w_1$, $w_2$, $w_3$, $w_4$, $w_5$) is generated as a features table.

In step S3103, the integral component calculation unit 3123 calculates integral components based on the conditions (the number of dimensions and integral range) set by the conditions setting unit 3121, and the data continuity information (angle θ) supplied from the data continuity detecting unit 101, and generates an integral component table.

Specifically, for example, if we say that the respective pixels 3111 through 3114, which are to be generated from now, are appended with numbers (hereafter, such a number is referred to as a mode number) 1 through 4, the integral component calculation unit 3123 calculates the integral components $K_i(x_s, x_e)$ of the above Expression (111) as a function of l (however, l represents a mode number) such as integral components $K_i(l)$ shown in the left side of the following Expression (114).

$$K_i(l) = K_i(x_s, x_e) \quad (114)$$

Specifically, in this case, the integral components $K_i(l)$ shown in the following Expression (115) are calculated.

$$k_i(1)=k_i(-0.5-C_x(-0.25),0-C_x(-0.25))$$

$$k_i(2)=k_i(0-C_x(-0.25),0.5-C_x(-0.25))$$

$$k_i(3)=k_i(-0.5-C_x(0.25),0-C_x(0.25))$$

$$k_i(4)=k_i(0-C_x(0.25),0.5-C_x(0.25)) \quad (115)$$

Note that in Expression (115), the left side represents the integral components $K_i(l)$, and the right side represents the integral components $K_i(x_s, x_e)$. That is to say, in this case, l is any one of 1 through 4, and also i is any one of 0 through 5, and accordingly, 24 $K_i(l)$ in total of 6 $K_i(1)$, 6 $K_i(2)$, 6 $K_i(3)$, and 6 $K_i(4)$ are calculated.

More specifically, first, the integral component calculation unit 3123 calculates each of the shift amounts $C_x(-0.25)$ and $C_x(0.25)$ from the above Expression (112) and Expression (113) using the angle θ supplied from the data continuity detecting unit 101.

Next, the integral component calculation unit 3123 calculates the integral components $K_i(x_s, x_e)$ of each right side of the four expressions in Expression (115) regarding i=0 through 5 using the calculated shift amounts $C_x(-0.25)$ and $C_x(0.25)$. Note that with this calculation of the integral components $K_i(x_s, x_e)$, the above Expression (111) is employed.

Subsequently, the integral component calculation unit 3123 converts each of the 24 integral components $K_i(x_s, x_e)$ calculated into the corresponding integral components $K_i(l)$ in accordance with Expression (115), and generates an integral component table including the 24 integral components $K_i(l)$ converted (i.e., 6 $K_i(1)$, 6 $K_i(2)$, 6 $K_i(3)$, and 6 $K_i(4)$).

Note that the sequence of the processing in step S3102 and the processing in step S3103 is not restricted to the example in FIG. 155, the processing in step S3103 may be executed first, or the processing in step S3102 and the processing in step S3103 may be executed simultaneously.

Next, in step S3104, the output pixel value calculation unit 3124 calculates the output pixel values M(1) through M(4) respectively based on the features table generated by the features storage unit 3122 at the processing in step S3102, and the integral component table generated by the integral component calculation unit 3123 at the processing in step S3103.

Specifically, in this case, the output pixel value calculation unit 3124 calculates each of the pixel value M(1) of the pixel 3111 (pixel of mode number 1), the pixel value M(2) of the pixel 3112 (pixel of mode number 2), the pixel value M(3) of the pixel 3113 (pixel of mode number 3), and the pixel value M(4) of the pixel 3114 (pixel of mode number 4) by calculating the right sides of the following Expression (116) through Expression (119) corresponding to the above Expression (110).

$$M(1) = \sum_{i=0}^{5} w_i k_i(1) \quad (116)$$

$$M(2) = \sum_{i=0}^{5} w_i k_i(2) \quad (117)$$

$$M(3) = \sum_{i=0}^{5} w_i k_i(3) \quad (118)$$

$$M(4) = \sum_{i=0}^{5} w_i k_i(4) \quad (119)$$

In step S3105, the output pixel value calculation unit 3124 determines regarding whether or not the processing of all the pixels has been completed.

In step S3105, in the event that determination is made that the processing of all the pixels has not been completed, the processing returns to step S3102, wherein the subsequent processing is repeatedly performed. That is to say, the pixels that have not become a pixel of interest are sequentially taken as a pixel of interest, and the processing in step S3102 through S3104 is repeatedly performed.

In the event that the processing of all the pixels has been completed (in step S3105, in the event that determination is made that the processing of all the pixels has been completed), the output pixel value calculation unit 3124 outputs the image in step S3106. Then, the image generating processing ends.

Next, description will be made regarding the differences between the output image obtained by employing the one-dimensional reintegration method and the output image obtained by employing another method (conventional classification adaptive processing) regarding a predetermined input image with reference to FIG. 156 through FIG. 163.

FIG. 156 is a diagram illustrating the original image of the input image, and FIG. 157 illustrates image data corresponding to the original image in FIG. 156. In FIG. 157, the axis in the vertical direction in the drawing represents pixel values, and the axis in the lower right direction in the drawing represents the X direction serving as one direction of the spatial directions of the image, and the axis in the upper right direction in the drawing represents the Y direction serving as the other direction of the spatial directions of the image. Note that the respective axes in later-described FIG. 159, FIG. 161, and FIG. 163 corresponds to the axes in FIG. 157.

FIG. 158 is a diagram illustrating an example of an input image. The input image illustrated in FIG. 158 is an image generated by taking the mean of the pixel values of the pixels belonged to a block made up of 2×2 pixels shown in FIG. 156 as the pixel value of one pixel. That is to say, the input image is an image obtained by integrating the image shown in FIG. 156 in the spatial direction, which imitates the integration property of a sensor. Also, FIG. 159 illustrates image data corresponding to the input image in FIG. 158.

The original image illustrated in FIG. 156 includes a fine-line image inclined almost 5° clockwise from the vertical direction. Similarly, the input image illustrated in FIG. 158 includes a fine-line image inclined almost 5° clockwise from the vertical direction.

FIG. 160 is a diagram illustrating an image (hereafter, the image illustrated in FIG. 160 is referred to as a conventional image) obtained by subjecting the input image illustrated in FIG. 158 to conventional classification adaptive processing. Also, FIG. 161 illustrates image data corresponding to the conventional image.

Note that the classification adaptive processing is made up of classification processing and adaptive processing, data is classified based on the property thereof by the class classification processing, and is subjected to the adaptive processing for each class. With the adaptive processing, for example, a low-quality or standard-quality image is subjected to mapping using a predetermined tap coefficient so as to be converted into a high-quality image.

FIG. 162 is a diagram illustrating an image (hereafter, the image illustrated in FIG. 162 is referred to as an image according to the present invention) obtained by applying the one-dimensional reintegration method to which the present invention is applied, to the input image illustrated in FIG. 158.

Also, FIG. 163 illustrates image data corresponding to the image according to the present invention.

It can be understood that upon the conventional image in FIG. 160 being compared with the image according to the present invention in FIG. 162, a fine-line image is different from that in the original image in FIG. 156 in the conventional image, but on the other hand, the fine-line image is almost the same as that in the original image in FIG. 156 in the image according to the present invention.

This difference is caused by a difference wherein the conventional class classification adaptation processing is a method for performing processing on the basis (origin) of the input image in FIG. 158, but on the other hand, the one-dimensional reintegration method according to the present invention is a method for estimating the original image in FIG. 156 (generating the approximation function f(x) corresponding to the original image) in light of continuity of a fine line, and performing processing (performing reintegration so as to calculate pixel values) on the basis (origin) of the original image estimated.

Thus, with the one-dimensional reintegration method, an output image (pixel values) is generated by integrating the approximation function f(x) in an arbitrary range on the basis (origin) of the approximation function f(x) (the approximation function f(x) of the X cross-sectional waveform F(x) in the actual world) serving as the one-dimensional polynomial generated with the one-dimensional polynomial approximating method.

Accordingly, with the one-dimensional reintegration method, it becomes possible to output an image more similar to the original image (the light signal in the actual world 1 which is to be cast in the sensor 2) in comparison with the conventional other methods.

In other words, the one-dimensional reintegration method is based on condition that the data continuity detecting unit 101 in FIG. 151 detects continuity of data in an input image made up of multiple pixels having a pixel value on which the light signals in the actual world 1 are projected by the multiple detecting elements of the sensor 2 each having spatio-temporal integration effects, and projected by the detecting elements of which a part of continuity of the light signals in the actual world 1 drops, and in response to the detected continuity of data, the actual world estimating unit 102 estimates the light signal function F by approximating the light signal function F (specifically, X cross-sectional waveform F(x)) representing the light signals in the actual world 1 with a predetermined approximation function f(x) on assumption that the pixel value of a pixel corresponding to a position in the one-dimensional direction of the time-space directions of the input image is the pixel value acquired by integration effects in the one-dimensional direction thereof.

Speaking in detail, for example, the one-dimensional reintegration method is based on condition that the X cross-sectional waveform F(x) is approximated with the approximation function f(x) on assumption that the pixel value of each pixel corresponding to a distance along in the one-dimensional direction from a line corresponding to the detected continuity of data is the pixel value obtained by the integration effects in the one-dimensional direction thereof.

With the one-dimensional reintegration method, for example, the image generating unit 103 in FIG. 151 (FIG. 3) generates a pixel value M corresponding to a pixel having a desired size by integrating the X cross-sectional waveform F(x) estimated by the actual world estimating unit 102, i.e., the approximation function f(x) in desired increments in the one-dimensional direction based on such an assumption, and outputs this as an output image.

Accordingly, with the one-dimensional reintegration method, it becomes possible to output an image more similar to the original image (the light signal in the actual world 1 which is to be cast in the sensor 2) in comparison with the conventional other methods.

Also, with the one-dimensional reintegration method, as described above, the integral range is arbitrary, and accordingly, it becomes possible to create resolution (temporal resolution or spatial resolution) different from the resolution of an input image by varying the integral range. That is to say, it becomes possible to generate an image having arbitrary powered resolution as well as an integer value as to the resolution of the input image.

Further, the one-dimensional reintegration method enables calculation of an output image (pixel values) with less calculation processing amount than other reintegration methods.

Next, description will be made regarding a two-dimensional reintegration method with reference to FIG. 164 through FIG. 170.

The two-dimensional reintegration method is based on condition that the approximation function f(x, y) has been generated with the two-dimensional polynomial approximating method.

That is to say, for example, it is an assumption that the image function F(x, y, t) representing the light signal in the actual world 1 (FIG. 151) having continuity in the spatial direction represented with the gradient $G_F$ has been approximated with a waveform projected in the spatial directions (X direction and Y direction), i.e., the waveform F(x, y) on the X-Y plane has been approximated with the approximation function f(x, y) serving as a n-dimensional (n is an arbitrary integer) polynomial, such as shown in FIG. 164.

In FIG. 164, the horizontal direction represents the X direction serving as one direction in the spatial directions, the upper right direction represents the Y direction serving as the other direction in the spatial directions, and the vertical direction represents light levels, respectively in the drawing. $G_F$ represents gradient as continuity in the spatial directions.

Note that with the example in FIG. 164, the direction of continuity is taken as the spatial directions (X direction and Y direction), so the projection function of a light signal to be approximated is taken as the function F(x, y), but as described later, the function F(x, t) or function F(y, t) may be a target of approximation according to the direction of continuity.

In the case of the example in FIG. 164, with the two-dimensional reintegration method, the output pixel value M is calculated as the following Expression (120).

$$M = G_e \int_{y_s}^{y_e} \int_{x_s}^{x_e} f(x,y) dx dy \qquad (120)$$

Note that in Expression (120), $y_s$ represents an integration start position in the Y direction, and $y_e$ represents an integration end position in the Y direction. Similarly, $x_s$ represents an integration start position in the X direction, and $x_e$ represents an integration end position in the X direction. Also, $G_e$ represents a predetermined gain.

In Expression (120), an integral range can be set arbitrarily, and accordingly, with the two-dimensional reintegration method, it becomes possible to create pixels having an arbitrary powered spatial resolution as to the original pixels (the pixels of an input image from the sensor 2 (FIG. 151)) without deterioration by appropriately changing this integral range.

FIG. 165 represents a configuration example of the image generating unit 103 employing the two-dimensional reintegration method.

As shown in FIG. 165, the image generating unit 103 in this example includes a conditions setting unit 3201, features storage unit 3202, integral component calculation unit 3203, and output pixel value calculation unit 3204.

The conditions setting unit 3201 sets the number of dimensions n of the approximation function f(x, y) based on the actual world estimating information (with the example in FIG. 165, the features of the approximation function f(x, y)) supplied from the actual world estimating unit 102.

The conditions setting unit 3201 also sets an integral range in the case of reintegrating the approximation function f(x, y) (in the case of calculating an output pixel value). Note that an integral range set by the conditions setting unit 3201 does not need to be the vertical width or the horizontal width of a pixel. For example, the approximation function f(x, y) is integrated in the spatial directions (X direction and Y direction), and accordingly, a specific integral range can be determined as long as the relative size (power of spatial resolution) of an output pixel (pixel to be generated from now by the image generating unit 103) as to the spatial size of each pixel of an input image from the sensor 2 is known. Accordingly, the conditions setting unit 3201 can set, for example, a spatial resolution power as an integral range.

The features storage unit 3202 temporally stores the features of the approximation function f(x, y) sequentially supplied from the actual world estimating unit 102. Subsequently, upon the features storage unit 3202 storing all of the features of the approximation function f(x, y), the features storage unit 3202 generates a features table including all of the features of the approximation function f(x, y), and supplies this to the output pixel value calculation unit 3204.

Now, description will be made regarding the details of the approximation function f(x, y).

For example, now, let us say that the light signals (light signals represented with the wave F(x, y)) in the actual world 1 (FIG. 151) having continuity in the spatial directions represented with the gradient $G_F$ shown in FIG. 164 described above have been detected by the sensor 2 (FIG. 151), and have been output as an input image (pixel values).

Further, for example, let us say that the data continuity detecting unit 101 (FIG. 3) has subjected a region 3221 of an input image made up of 20 pixels in total (20 squares represented with a dashed line in the drawing) of 4 pixels in the X direction and also 5 pixels in the Y direction of this input image to the processing thereof, and has output an angle θ (angle θ generated between the direction of data continuity represented with the gradient $G_f$ corresponding to the gradient $G_F$ and the X direction) as one of data continuity information, as shown in FIG. 166.

Note that as viewed from the actual world estimating unit 102, the data continuity detecting unit 101 should simply output the angle θ at a pixel of interest, and accordingly, the processing region of the data continuity detecting unit 101 is not restricted to the above region 3221 in the input image.

Also, with the region 3221 in the input image, the horizontal direction in the drawing represents the X direction serving as one direction of the spatial directions, and the vertical direction in the drawing represents the Y direction serving the other direction of the spatial directions.

Further, in FIG. 166, a pixel, which is the second pixel from the left, and also the third pixel from the bottom, is taken as a pixel of interest, and an (x, y) coordinates system is set so as to take the center of the pixel of interest as the origin (0, 0). A relative distance (hereafter, referred to as a cross-sectional direction distance) in the X direction as to a straight line (straight line of the gradient $G_f$ representing the direction of data continuity) having an angle θ passing through the origin (0, 0) is taken as x'.

Further, in FIG. 166, the graph on the right side represents the approximation function f(x') serving as a n-dimensional (n is an arbitrary integer) polynomial, which is a function approximating a one-dimensional waveform (hereafter, referred to as an X cross-sectional waveform F(x')) wherein the image function F(x, y, t) of which variables are positions x, y, and z on the three-dimensional space, and point-in-time t is projected in the X direction at an arbitrary position y in the Y direction. Of the axes in the graph on the right side, the axis in the horizontal direction in the drawing represents a cross-sectional direction distance, and the axis in the vertical direction in the drawing represents pixel values.

In this case, the approximation function f(x') shown in FIG. 166 is a n-dimensional polynomial, so is represented as the following Expression (121).

$$f(x') = w_0 + w_1 x' + w_2 x' + \ldots + w_n x'^n = \sum_{i=0}^{n} w_i x'^i \quad (121)$$

Also, since the angle θ is determined, the straight line having angle θ passing through the origin (0, 0) is uniquely determined, and a position $x_1$ in the X direction of the straight line at an arbitrary position y in the Y direction is represented as the following Expression (122). However, in Expression (122), s represents cot θ.

$$x_1 = s \times y \quad (122)$$

That is to say, as shown in FIG. 166, a point on the straight line corresponding to continuity of data represented with the gradient $G_f$ is represented with a coordinate value ($x_1$, y).

The cross-sectional direction distance x' is represented as the following Expression (123) using Expression (122).

$$x' = x - x_1 = x - s \times y \quad (123)$$

Accordingly, the approximation function f(x, y) at an arbitrary position (x, y) within the input image region 3221 is represented as the following Expression (124) using Expression (121) and Expression (123).

$$f(x, y) = \sum_{i=0}^{n} w_i (x - s \times y) \quad (124)$$

Note that in Expression (124), $w_i$ represents the features of the approximation function f(x, y).

Now, description will return to FIG. 165, wherein the features $w_i$ included in Expression (124) are supplied from the actual world estimating unit 102, and stored in the features storage unit 3202. Upon the features storage unit 3202 storing all of the features $w_i$ represented with Expression (124), the features storage unit 3202 generates a features table including all of the features $w_i$, and supplies this to the output pixel value calculation unit 3204.

Also, upon the right side of the above Expression (120) being expanded (calculated) by substituting the approximation function f(x, y) of Expression (124) for the approximation function f(x, y) in the right side of Expression (120), the output pixel value M is represented as the following Expression (125).

$$M = G_e \times \sum_{i=0}^{n} w_i \times \frac{\{(x_e - s \times y_e)^{i+2} - (x_e - s \times y_s)^{i+2} - (x_s - s \times y_e)^{i+2} + (x_s - s \times y_s)^{i+2}\}}{s(i+1)(i+2)} \quad (125)$$

$$= \sum_{i=0}^{n} w_i \times k_i(x_s, x_e, y_s, y_e)$$

In Expression (125), $K_i(x_s, x_e, y_s, y_e)$ represent the integral components of the i-dimensional term. That is to say, the integral components $K_i(x_s, x_e, y_s, y_e)$ are such as shown in the following Expression (126).

$$k_i(x_s, x_e, y_s, y_e) = \quad (126)$$

$$G_e \times \frac{\{(x_e - s \times y_e)^{i+2} - (x_e - s \times y_s)^{i+2} - (x_s - s \times y_e)^{i+2} + (x_s - s \times y_s)^{i+2}\}}{s(i+1)(i+2)}$$

The integral component calculation unit 3203 calculates the integral components $K_i(x_s, x_e, y_s, y_e)$.

Specifically, as shown in Expression (125) and Expression (126), the integral components $K_i(x_s, x_e, y_s, y_e)$ can be calculated as long as the start position $x_s$ in the X direction and end position $x_e$ in the X direction of an integral range, the start position $y_s$ in the Y direction and end position $y_e$ in the Y direction of an integral range, variable s, gain $G_e$, and i of the i-dimensional term are known.

Of these, the gain $G_e$ is determined with the spatial resolution power (integral range) set by the conditions setting unit 3201.

The range of i is determined with the number of dimensions n set by the conditions setting unit 3201.

A variable s is, as described above, cot θ, so is determined with the angle θ output from the data continuity detecting unit 101.

Also, each of the start position $x_s$ in the X direction and end position $x_e$ in the X direction of an integral range, and the start position $y_s$ in the Y direction and end position $y_e$ in the Y direction of an integral range is determined with the center pixel position (x, y) and pixel width of an output pixel to be generated from now. Note that (x, y) represents a relative position from the center position of the pixel of interest when the actual world estimating unit 102 generates the approximation function f(x).

Further, each of the center pixel position (x, y) and pixel width of an output pixel to be generated from now is determined with the spatial resolution power (integral range) set by the conditions setting unit 3201.

Accordingly, the integral component calculation unit 3203 calculates $K_i(x_s, x_e, y_s, y_e)$ based on the number of dimensions and the spatial resolution power (integral range) set by the conditions setting unit 3201, and the angle θ of the data continuity information output from the data continuity detecting unit 101, and supplies the calculated result to the output pixel value calculation unit 3204 as an integral component table.

The output pixel value calculation unit 3204 calculates the right side of the above Expression (125) using the features table supplied from the features storage unit 3202, and the integral component table supplied from the integral component calculation unit 3203, and outputs the calculated result to the outside as the output pixel value M.

Next, description will be made regarding image generating processing (processing in step S103 in FIG. 40) by the image generating unit 103 (FIG. 166) employing the two-dimensional reintegration method with reference to the flowchart in FIG. 167.

For example, let us say that the light signals represented with the function F(x, y) shown in FIG. 164 have been cast in the sensor 2 so as to become an input image, and the actual world estimating unit 102 has already generated the approximation function f(x, y) for approximating the function F(x, y) with one pixel 3231 such as shown in FIG. 168 as a pixel of interest at the processing in step S102 in FIG. 40 described above.

Note that in FIG. 168, the pixel value (input pixel value) of the pixel 3231 is taken as P, and the shape of the pixel 3231 is taken as a square of which one side is 1 in length. Also, of the spatial directions, the direction in parallel with one side of the pixel 3231 is taken as the X direction, and the direction orthogonal to the X direction is taken as the Y direction. Further, a coordinates system (hereafter, referred to as a pixel-of-interest coordinates system) in the spatial directions (X direction and Y direction) of which the origin is the center of the pixel 3231 is set.

Also, let us say that in FIG. 168, the data continuity detecting unit 101, which takes the pixel 3231 as a pixel of interest, has already output the angle θ as data continuity information corresponding to continuity of data represented with the gradient $G_f$ at the processing in step S101 in FIG. 40 described above.

Description will return to FIG. 167, and in this case, the conditions setting unit 3201 sets conditions (the number of dimensions and an integral range) at step S3201.

For example, now, let us say that 5 has been set as the number of dimensions, and also spatial quadruple density (spatial resolution power to cause the pitch width of a pixel to become half power in the upper/lower/left/right sides) has been set as an integral range.

That is to say, in this case, it has been set that the four pixel 3241 through pixel 3244 are created newly in a range of −0.5 through 0.5 in the X direction, and also a range of −0.5 through 0.5 in the Y direction (in the range of the pixel 3231 in FIG. 168), such as shown in FIG. 169. Note that in FIG. 169 as well, the same pixel-of-interest coordinates system as that in FIG. 168 is shown.

Also, in FIG. 169, M(1) represents the pixel value of the pixel 3241 to be generated from now, M(2) represents the pixel value of the pixel 3242 to be generated from now, M (3) represents the pixel value of the pixel 3243 to be generated from now, and M(4) represents the pixel value of the pixel 3241 to be generated from now.

Description will return to FIG. 167, in step S3202, the features storage unit 3202 acquires the features of the approximation function f(x, y) supplied from the actual world estimating unit 102, and generates a features table. In this case, the coefficients $w_0$ through $w_5$ of the approximation function f(x) serving as a 5-dimensional polynomial are supplied from the actual world estimating unit 102, and accordingly, ($w_0, w_1, w_2, w_3, w_4, w_5$) is generated as a features table.

In step S3203, the integral component calculation unit 3203 calculates integral components based on the conditions (the number of dimensions and an integral range) set by the conditions setting unit 3201, and the data continuity information (angle θ) supplied from the data continuity detecting unit 101, and generates an integral component table.

Specifically, for example, let us say that numbers (hereafter, such a number is referred to as a mode number) 1 through 4 are respectively appended to the pixel 3241 through pixel 3244 to be generated from now, the integral component calculation unit 3203 calculates the integral components $K_i(x_s, x_e, y_s, y_e)$ of the above Expression (125) as a function of l (however, l represents a mode number) such as the integral components $K_i(l)$ shown in the left side of the following Expression (127).

$$K_i(l)=K_i(x_s,x_e,y_s,y_e) \qquad (127)$$

Specifically, in this case, the integral components $K_i(l)$ shown in the following Expression (128) are calculated.

$$k_i(1)=k_i(-0.5,0,0,0.5)$$

$$k_i(2)=k_i(0,0.5,0,0.5)$$

$$k_i(3)=k_i(-0.5,0,-0.5,0)$$

$$k_i(4)=k_i(0,0.5,-0.5,0) \qquad (128)$$

Note that in Expression (128), the left side represents the integral components $K_i(l)$, and the right side represents the integral components $K_i(x_s, x_e, y_s, y_e)$. That is to say, in this case, l is any one of 1 thorough 4, and also i is any one of 0 through 5, and accordingly, 24 $K_i(l)$ in total of 6 $K_i(1)$, 6 $K_i(2)$, 6 $K_i(3)$, and 6 $K_i(4)$ are calculated.

More specifically, first, the integral component calculation unit 3203 calculates the variable s (s=cot θ) of the above Expression (122) using the angle θ supplied from the data continuity detecting unit 101.

Next, the integral component calculation unit 3203 calculates the integral components $K_i(x_s, x_e, y_s, y_e)$ of each right side of the four expressions in Expression (128) regarding i=0 through 5 using the calculated variable s. Note that with this calculation of the integral components $K_i(x_s, x_e, y_s, y_e)$, the above Expression (125) is employed.

Subsequently, the integral component calculation unit 3203 converts each of the 24 integral components $K_i(x_s, x_e, y_s, y_e)$ calculated into the corresponding integral components $K_i(l)$ in accordance with Expression (128), and generates an integral component table including the 24 integral components $K_i(l)$ converted (i.e., 6 $K_i(1)$, 6 $K_i(2)$, 6 $K_i(3)$, and 6 $K_i(4)$).

Note that the sequence of the processing in step S3202 and the processing in step S3203 is not restricted to the example in FIG. 167, the processing in step S3203 may be executed first, or the processing in step S3202 and the processing in step S3203 may be executed simultaneously.

Next, in step S3204, the output pixel value calculation unit 3204 calculates the output pixel values M(1) through M(4) respectively based on the features table generated by the features storage unit 3202 at the processing in step S3202, and the integral component table generated by the integral component calculation unit 3203 at the processing in step S3203.

Specifically, in this case, the output pixel value calculation unit 3204 calculates each of the pixel value M(1) of the pixel 3241 (pixel of mode number 1), the pixel value M(2) of the pixel 3242 (pixel of mode number 2), the pixel value M(3) of the pixel 3243 (pixel of mode number 3), and the pixel value M(4) of the pixel 3244 (pixel of mode number 4) shown in FIG. 169 by calculating the right sides of the following Expression (129) through Expression (132) corresponding to the above Expression (125).

$$M(1) = \sum_{i=0}^{n} w_i \times k_i(1) \qquad (129)$$

$$M(2) = \sum_{i=0}^{5} w_i \times k_i(2) \qquad (130)$$

$$M(3) = \sum_{i=0}^{5} w_i \times k_i(3) \qquad (131)$$

$$M(4) = \sum_{i=0}^{5} w_i \times k_i(4) \qquad (132)$$

However, in this case, each n of Expression (129) through Expression (132) becomes 5.

In step S3205, the output pixel value calculation unit 3204 determines regarding whether or not the processing of all the pixels has been completed.

In step S3205, in the event that determination is made that the processing of all the pixels has not been completed, the processing returns to step S3202, wherein the subsequent processing is repeatedly performed. That is to say, the pixels that have not become a pixel of interest are sequentially taken as a pixel of interest, and the processing in step S3202 through S3204 is repeatedly performed.

In the event that the processing of all the pixels has been completed (in step S3205, in the event that determination is made that the processing of all the pixels has been completed), the output pixel value calculation unit 3204 outputs the image in step S3206. Then, the image generating processing ends.

Thus, four pixels having higher spatial resolution than the input pixel 3231, i.e., the pixel 3241 through pixel 3244 (FIG. 169) can be created by employing the two-dimensional reintegration method as a pixel at the pixel 3231 of the input image (FIG. 168) from the sensor 2 (FIG. 151). Further, though not shown in the drawing, as described above, the image generating unit 103 can create a pixel having an arbitrary powered spatial resolution as to the input pixel 3231 without deterioration by appropriately changing an integral range, in addition to the pixel 3241 through pixel 3244.

As described above, as description of the two-dimensional reintegration method, an example for subjecting the approximation function f(x, y) as to the spatial directions (X direction and Y direction) to two-dimensional integration has been employed, but the two-dimensional reintegration method can be applied to the time-space directions (X direction and t direction, or Y direction and t direction).

That is to say, the above example is an example in the case in which the light signals in the actual world 1 (FIG. 151) have continuity in the spatial directions represented with the gradient $G_F$ such as shown in FIG. 164, and accordingly, an expression including two-dimensional integration in the spatial directions (X direction and Y direction) such as shown in the above Expression (120) has been employed. However, the concept regarding two-dimensional integration can be applied not only to the spatial direction but also the time-space directions (X direction and t direction, or Y direction and t direction).

In other words, with the two-dimensional polynomial approximating method serving as an assumption of the two-dimensional reintegration method, it is possible to perform approximation using a two-dimensional polynomial even in the case in which the image function F(x, y, t) representing the light signals has continuity in the time-space directions (however, X direction and t direction, or Y direction and t direction) as well as continuity in the spatial directions.

Specifically, for example, in the event that there is an object moving horizontally in the X direction at uniform velocity, the direction of movement of the object is represented with like a gradient $V_F$ in the X-t plane such as shown in FIG. 170. In other words, it can be said that the gradient $V_F$ represents the direction of continuity in the time-space directions in the X-t plane. Accordingly, the data continuity detecting unit 101 (FIG. 151) can output movement θ such as shown in FIG. 170 (strictly speaking, though not shown in the drawing, movement θ is an angle generated by the direction of data continuity represented with the gradient $V_f$ corresponding to the gradient $V_F$ and the X direction in the spatial direction) as data continuity information corresponding to the gradient $V_F$ representing continuity in the time-space directions in the X-t plane as well as the above angle θ (data continuity information corresponding to the gradient $G_F$ representing continuity in the spatial directions in the X-Y plane).

Also, the actual world estimating unit 102 (FIG. 151) employing the two-dimensional polynomial approximating method can calculate the coefficients (features) $w_i$ of an approximation function f(x, t) with the same method as the above method by employing the movement θ instead of the angle θ. However, in this case, the equation to be employed is not the above Expression (124) but the following Expression (133).

$$f(x, y) = \sum_{i=0}^{n} w_i(x - s \times t) \tag{133}$$

Note that in Expression (133), s is cot θ (however, θ is movement).

Accordingly, the image generating unit 103 (FIG. 151) employing the two-dimensional reintegration method can calculate the pixel value M by substituting the f(x, t) of the above Expression (133) for the right side of the following Expression (134), and calculating this.

$$M = G_e \times \int_{t_s}^{t_e} \int_{x_s}^{x_e} f(x,t) dx dt \tag{134}$$

Note that in Expression (134), $t_s$ represents an integration start position in the t direction, and $t_e$ represents an integration end position in the t direction. Similarly, $x_s$ represents an integration start position in the X direction, and $x_e$ represents an integration end position in the X direction. $G_e$ represents a predetermined gain.

Alternately, an approximation function f(y, t) focusing attention on the spatial direction Y instead of the spatial direction X can be handled as the same way as the above approximation function f(x, t).

Incidentally, in Expression (133), it becomes possible to obtain data not integrated in the temporal direction, i.e., data without movement blurring by regarding the t direction as constant, i.e., by performing integration while ignoring integration in the t direction. In other words, this method may be regarded as one of two-dimensional reintegration methods in that reintegration is performed on condition that one certain dimension of two-dimensional polynomials is constant, or in fact, may be regarded as one of one-dimensional reintegration methods in that one-dimensional reintegration in the X direction is performed.

Also, in Expression (134), an integral range may be set arbitrarily, and accordingly, with the two-dimensional reintegration method, it becomes possible to create a pixel having an arbitrary powered resolution as to the original pixel (pixel of an input image from the sensor 2 (FIG. 151)) without deterioration by appropriately changing this integral range.

That is to say, with the two-dimensional reintegration method, it becomes possible to create temporal resolution by appropriately changing an integral range in the temporal direction t. Also, it becomes possible to create spatial resolution by appropriately changing an integral range in the spatial direction X (or spatial direction Y). Further, it becomes possible to create both temporal resolution and spatial resolution by appropriately changing each integral range in the temporal direction and in the spatial direction X.

Note that as described above, creation of any one of temporal resolution and spatial resolution may be performed even with the one-dimensional reintegration method, but creation of both temporal resolution and spatial resolution cannot be performed with the one-dimensional reintegration method in theory, which becomes possible only by performing two-dimensional or more reintegration. That is to say, creation of both temporal resolution and spatial resolution becomes possible only by employing the two-dimensional reintegration method and a later-described three-dimensional reintegration method.

Also, the two-dimensional reintegration method takes not one-dimensional but two-dimensional integration effects into consideration, and accordingly, an image more similar to the light signal in the actual world 1 (FIG. 151) may be created.

In other words, with the two-dimensional reintegration method, for example, the data continuity detecting unit 101 in FIG. 151 (FIG. 3) detects continuity (e.g., continuity of data represented with the gradient $G_f$ in FIG. 166) of data in an input image made up of multiple pixels having a pixel value on which the light signals in the actual world 1 are projected by the multiple detecting elements of the sensor 2 each having spatio-temporal integration effects, and projected by the detecting elements of which a part of continuity (e.g., continuity represented with the gradient $G_F$ in FIG. 164) of the light signals in the actual world 1 drops.

Subsequently, for example, in response to the continuity of data detected by the data continuity detecting unit 101, the actual world estimating unit 102 in FIG. 151 (FIG. 3) estimates the light signal function F by approximating the light signal function F(specifically, function F(x, y) in FIG. 164) representing the light signals in the actual world 1 with an approximation function f(x, y), which is a polynomial, on assumption that the pixel value of a pixel corresponding to at least a position in the two-dimensional direction (e.g., spatial direction X and spatial direction Y in FIG. 164) of the time-space directions of the image data is the pixel value acquired by at least integration effects in the two-dimensional direction, which is an assumption.

Speaking in detail, for example, the actual world estimating unit 102 estimates a first function representing the light signals in the real world by approximating the first function with a second function serving as a polynomial on condition that the pixel value of a pixel corresponding to at least a distance (for example, cross-sectional direction distance x' in FIG. 166) along in the two-dimensional direction from a line corresponding to continuity of data (for example, a line (arrow) corresponding to the gradient $G_f$ in FIG. 166) detected by the continuity detecting unit 101 is the pixel value acquired by at least integration effects in the two-dimensional direction, which is an assumption.

With the two-dimensional reintegration method, based on such an assumption, for example, the image generating unit 103 (FIG. 165 for configuration) in FIG. 151 (FIG. 3) generates a pixel value corresponding to a pixel (for example, output image (pixel value M) in FIG. 151. Specifically, for example, the pixel 3241 through pixel 3244 in FIG. 169) having a desired size by integrating the function F(x, y) estimated by the actual world estimating unit 102, i.e., the approximation function f(x, y) in at least desired increments in the two-dimensional direction (e.g., by calculating the right side of the above Expression (120)).

Accordingly, the two-dimensional reintegration method enables not only any one of temporal resolution and spatial resolution but also both temporal resolution and spatial resolution to be created. Also, with the two-dimensional reintegration method, an image more similar to the light signal in the actual world 1 (FIG. 151) than that in the one-dimensional reintegration method may be generated.

Next, description will be made regarding a three-dimensional reintegration method with reference to FIG. 171 and FIG. 172.

With the three-dimensional reintegration method, the approximation function f(x, y, t) has been created using the three-dimensional function approximating method, which is an assumption.

In this case, with the three-dimensional reintegration method, the output pixel value M is calculated as the following Expression (135).

$$M = G_e \times \int_{t_s}^{t_e} \int_{y_s}^{y_e} \int_{x_s}^{x_e} f(x,y,t) dx dy dt \quad (135)$$

Note that in Expression (135), $t_s$ represents an integration start position in the t direction, and $t_e$ represents an integration end position in the t direction. Similarly, $y_s$ represents an integration start position in the Y direction, and $y_e$ represents an integration end position in the Y direction. Also, $x_s$ represents an integration start position in the X direction, and $x_e$ represents an integration end position in the X direction. $G_e$ represents a predetermined gain.

Also, in Expression (135), an integral range may be set arbitrarily, and accordingly, with the three-dimensional reintegration method, it becomes possible to create a pixel having an arbitrary powered time-space resolution as to the original pixel (pixel of an input image from the sensor 2 (FIG. 151)) without deterioration by appropriately changing this integral range. That is to say, upon the integral range in the spatial direction being reduced, a pixel pitch can be reduced without restraint. On the other hand, upon the integral range in the spatial direction being enlarged, a pixel pitch can be enlarged without restraint. Also, upon the integral range in the temporal direction being reduced, temporal resolution can be created based on an actual waveform.

FIG. 171 represents a configuration example of the image generating unit 103 employing the three-dimensional reintegration method.

As shown in FIG. 171, this example of the image generating unit 103 includes a conditions setting unit 3301, features storage unit 3302, integral component calculation unit 3303, and output pixel value calculation unit 3304.

The conditions setting unit 3301 sets the number of dimensions n of the approximation function f(x, y, t) based on the actual world estimating information (with the example in FIG. 171, features of the approximation function f(x, y, t)) supplied from the actual world estimating unit 102.

The conditions setting unit 3301 sets an integral range in the case of reintegrating the approximation function f(x, y, t) (in the case of calculating output pixel values). Note that an integral range set by the conditions setting unit 3301 needs not to be the width (vertical width and horizontal width) of a pixel or shutter time itself. For example, it becomes possible to determine a specific integral range in the spatial direction as long as the relative size (spatial resolution power) of an output pixel (pixel to be generated from now by the image generating unit 103) as to the spatial size of each pixel of an input image from the sensor 2 (FIG. 151) is known. Similarly, it becomes possible to determine a specific integral range in the temporal direction as long as the relative time (temporal resolution power) of an output pixel as to the shutter time of the sensor 2 (FIG. 151) is known. Accordingly, the conditions setting unit 3301 can set, for example, a spatial resolution power and temporal resolution power as an integral range.

The features storage unit 3302 temporally stores the features of the approximation function f(x, y, t) sequentially supplied from the actual world estimating unit 102. Subsequently, upon the features storage unit 3302 storing all of the features of the approximation function f(x, y, t), the features storage unit 3302 generates a features table including all of the features of the approximation function f(x, y, t), and supplies this to the output pixel value calculation unit 3304.

Incidentally, upon the right side of the approximation function f(x, y) of the right side of the above Expression (135) being expanded (calculated), the output pixel value M is represented as the following Expression (136).

$$M = \sum_{i=0}^{n} w_i \times k_i(x_s, x_e, y_s, y_e, t_s, t_e) \quad (136)$$

In Expression (136), $K_i(x_s, x_e, y_s, y_e, t_s, t_e)$ represents the integral components of the i-dimensional term. However, $x_s$ represents an integration range start position in the X direction, $x_e$ represents an integration range end position in the X direction, $y_s$ represents an integration range start position in the Y direction, $y_e$ represents an integration range end position in the Y direction, $t_s$ represents an integration range start position in the t direction, and $t_e$ represents an integration range end position in the t direction, respectively.

The integral component calculation unit 3303 calculates the integral components $K_i(x_s, x_e, y_s, y_e, t_s, t_e)$.

Specifically, the integral component calculation unit 3303 calculates the integral components $K_i(x_s, x_e, y_s, y_e, t_s, t_e)$ based on the number of dimensions and the integral range (spatial resolution power or temporal resolution power) set by the conditions setting unit 3301, and the angle θ or movement θ of the data continuity information output from the data continuity detecting unit 101, and supplies the calculated results to the output pixel value calculation unit 3304 as an integral component table.

The output pixel value calculation unit 3304 calculates the right side of the above Expression (136) using the features table supplied from the features storage unit 3302, and the integral component table supplied from the integral component calculation unit 3303, and outputs the calculated result to the outside as the output pixel value M.

Next, description will be made regarding image generating processing (processing in step S103 in FIG. 40) by the image generating unit 103 (FIG. 171) employing the three-dimensional reintegration method with reference to the flowchart in FIG. 172.

For example, let us say that the actual world estimating unit 102 (FIG. 151) has already generated an approximation function f(x, y, t) for approximating the light signals in the actual world 1 (FIG. 151) with a predetermined pixel of an input image as a pixel of interest at the processing in step S102 in FIG. 40 described above.

Also, let us say that the data continuity detecting unit 101 (FIG. 151) has already output the angle θ or movement θ as data continuity information with the same pixel as the actual world estimating unit 102 as a pixel of interest.

In this case, the conditions setting unit 3301 sets conditions (the number of dimensions and an integral range) at step S3301 in FIG. 172.

In step S3302, the features storage unit 3302 acquires the features $w_i$ of the approximation function f(x, y, t) supplied from the actual world estimating unit 102, and generates a features table.

In step S3303, the integral component calculation unit 3303 calculates integral components based on the conditions (the number of dimensions and an integral range) set by the conditions setting unit 3301, and the data continuity information (angle θ or movement θ) supplied from the data continuity detecting unit 101, and generates an integral component table.

Note that the sequence of the processing in step S3302 and the processing in step S3303 is not restricted to the example in FIG. 172, the processing in step S3303 may be executed first, or the processing in step S3302 and the processing in step S3303 may be executed simultaneously.

Next, in step S3304, the output pixel value calculation unit 3304 calculates each output pixel value based on the features table generated by the features storage unit 3302 at the processing in step S3302, and the integral component table generated by the integral component calculation unit 3303 at the processing in step S3303.

In step S3305, the output pixel value calculation unit 3304 determines regarding whether or not the processing of all the pixels has been completed.

In step S3305, in the event that determination is made that the processing of all the pixels has not been completed, the processing returns to step S3302, wherein the subsequent processing is repeatedly performed. That is to say, the pixels that have not become a pixel of interest are sequentially taken as a pixel of interest, and the processing in step S3302 through S3304 is repeatedly performed.

In the event that the processing of all the pixels has been completed (in step S3305, in the event that determination is made that the processing of all the pixels has been completed), the output pixel value calculation unit 3304 outputs the image in step S3306. Then, the image generating processing ends.

Thus, in the above Expression (135), an integral range may be set arbitrarily, and accordingly, with the three-dimensional reintegration method, it becomes possible to create a pixel having an arbitrary powered resolution as to the original pixel (pixel of an input image from the sensor 2 (FIG. 151)) without deterioration by appropriately changing this integral range.

That is to say, with the three-dimensional reintegration method, appropriately changing an integral range in the temporal direction enables temporal resolution to be created. Also, appropriately changing an integral range in the spatial direction enables spatial resolution to be created. Further, appropriately changing each integral range in the temporal direction and in the spatial direction enables both temporal resolution and spatial resolution to be created.

Specifically, with the three-dimensional reintegration method, approximation is not necessary when degenerating three dimension to two dimension or one dimension, thereby enabling high-precision processing. Also, movement in an oblique direction may be processed without degenerating to two dimension. Further, no degenerating to two dimension enables process at each dimension. For example, with the two-dimensional reintegration method, in the event of degenerating in the spatial directions (X direction and Y direction), process in the t direction serving as the temporal direction cannot be performed. On the other hand, with the three-dimensional reintegration method, any process in the time-space directions may be performed.

Note that as described above, creation of any one of temporal resolution and spatial resolution may be performed even with the one-dimensional reintegration method, but creation of both temporal resolution and spatial resolution cannot be performed with the one-dimensional reintegration method in theory, which becomes possible only by performing two-dimensional or more reintegration. That is to say, creation of both temporal resolution and spatial resolution becomes possible only by employing the above two-dimensional reintegration method and the three-dimensional reintegration method.

Also, the three-dimensional reintegration method takes not one-dimensional and two-dimensional but three-dimensional integration effects into consideration, and accordingly, an image more similar to the light signal in the actual world 1 (FIG. 151) may be created.

In other words, with the three-dimensional reintegration method, for example, the actual world estimating unit 102 in FIG. 151 (FIG. 3) estimates the light signal function F representing the light signals in the actual world by approximating the light signal function F with a predetermined approximation function f on condition that, the pixel value of a pixel corresponding to at least a position in the one-dimensional direction of the time-space directions, of an input image made up of multiple pixels having a pixel value on which the light signals in the actual world 1 are projected by the multiple detecting elements of the sensor 2 each having spatio-temporal integration effects, and projected by the detecting elements of which a part of continuity of the light signals in the actual world 1 drops, is a pixel value acquired by at least integration effects in the one-dimensional direction, which is an assumption.

Further, for example, in the event that the data continuity detecting unit 101 in FIG. 151 (FIG. 3) detects continuity of data of an input image, the actual world estimating unit 102 estimates the light signal function F by approximating the light signal function F with the approximation function f on condition that the pixel value of a pixel corresponding to at least a position in the one-dimensional direction in the time-space directions of the image data, corresponding to continuity of data detected by the data continuity detecting unit 101 is the pixel value acquired by at least integration effects in the one-dimensional direction, which is an assumption.

Speaking in detail, for example, the actual world estimating unit 102 estimates the light signal function by approximating the light signal function F with an approximation function on condition that the pixel value of a pixel corresponding to at least a distance along in the one-dimensional direction from a line corresponding to continuity of data detected by the continuity detecting nit 101 is the pixel value acquired by at least integration effects in the one-dimensional direction, which is an assumption.

With the three-dimensional reintegration method, for example, the image generating unit 103 (configuration is FIG. 171) in FIG. 151 (FIG. 3) generates a pixel value corresponding to a pixel having a desired size by integrating the light signal function F estimated by the actual world estimating unit 102, i.e., the approximation function f in at least desired increments in the one-dimensional direction (e.g., by calculating the right side of the above Expression (135)).

Accordingly, with the three-dimensional reintegration method, an image more similar to the light signal in the actual world 1 (FIG. 151) than that in conventional image generating methods, or the above one-dimensional or two-dimensional reintegration method may be generated.

Next, description will be made regarding the image generating unit 103 which newly generates pixels based on the derivative value or gradient of each pixel in the event that the actual world estimating information input from the actual world estimating unit 102 is information of the derivative value or gradient of each pixel on the approximation function f(x) approximately representing each pixel value of reference pixels with reference to FIG. 173.

Note that the term "derivative value" mentioned here, following the approximation function f(x) approximately representing each pixel value of reference pixels being obtained, means a value obtained at a predetermined position using a one-dimensional differential equation f(x)' obtained from the approximation function f(x) thereof (one-dimensional differential equation f(t)' obtained from an approximation function f(t) in the event that the approximation function is in the frame direction). Also, the term "gradient" mentioned here means the gradient of a predetermined position on the approximation function f(x) directly obtained from the pixel values of perimeter pixels at the predetermined position without obtaining the above approximation function f(x) (or f(t)). However, derivative values mean the gradient at a predetermined position on the approximation function f(x), and accordingly, either case means the gradient at a predetermined position on the approximation function f(x). Accordingly, with regard to derivative values and a gradient serving as the actual world estimating information input from the actual world estimating unit 102, they are unified and referred to as the gradient on the approximation function f(x) (or f(t)), with description of the image generating unit 103 in FIG. 173 and FIG. 177.

A gradient acquiring unit 3401 acquires the gradient information of each pixel, the pixel value of the corresponding pixel, and the gradient in the direction of continuity regarding the approximation function f(x) approximately representing the pixel values of the reference pixels input from the actual world estimating unit 102, and outputs these to an extrapolation/interpolation unit 3402.

The extrapolation/interpolation unit 3402 generates certain-powered higher-density pixels than an input image using extrapolation/interpolation based on the gradient of each pixel on the approximation function f(x), the pixel value of the corresponding pixel, and the gradient in the direction of continuity, which are input from the gradient acquiring unit 3401, and outputs the pixels as an output image.

Next, description will be made regarding image generating processing by the image generating unit 103 in FIG. 173 with reference to the flowchart in FIG. 174.

In step S3401, the gradient acquiring unit 3401 acquires information regarding the gradient (derivative value) on the approximation function f(x), position, and pixel value of each pixel, and the gradient in the direction of continuity, which is input from the actual world estimating unit 102, as actual world estimating information.

At this time, for example, in the event of generating an image made up of pixels having double density in the spatial direction X and spatial direction Y (quadruple in total) as to an input image, information regarding as to a pixel Pin such as shown in FIG. 175, gradients f(Xin)' (gradient in the center position of the pixel Pin), f(Xin−Cx(−0.25))' (gradient of the center position of a pixel Pa when generating a pixel of double density in the Y direction from the pixel Pin), and f(Xin−Cx(0.25))' (gradient of the center position of a pixel Pb when generating a pixel of double density in the Y direction from the pixel Pin), the position and pixel value of the pixel Pin, and a gradient $G_f$ in the direction of continuity is input from the actual world estimating unit 102.

In step S3402, the gradient acquiring unit 3401 selects information of the corresponding pixel of interest, of the actual world estimating information input, and outputs this to the extrapolation/interpolation unit 3402.

In step S3403, the extrapolation/interpolation unit 3402 obtains a shift amount from the position information of the input pixels, and the gradient $G_f$ in the direction of continuity.

Here, a shift amount Cx(ty) is defined as Cx(ty)=ty/$G_f$ when the gradient as continuity is represented with $G_f$. This shift amount Cx(ty) represents a shift width as to the spatial direction X at a position in the spatial direction Y=ty of the approximation function f(x), which is defined on the position in the spatial direction Y=0. Accordingly, for example, in the event that an approximation function on the position in the spatial direction Y=0 is defined as f(x), in the spatial direction Y=ty this approximation function f(x) becomes a function shifted by the Cx(ty) as to the spatial direction X, so that this approximation function is defined as f(x−Cx(ty))(=f(x−ty/$G_f$).

For example, in the event of the pixel Pin such as shown in FIG. 175, when one pixel (one pixel size in the drawing is 1 both in the horizontal direction and in the vertical direction) in the drawing is divided into two pixels in the vertical direction (when generating a double-density pixel in the vertical direction), the extrapolation/interpolation unit 3402 obtains the shift amounts of the pixels Pa and Pb, which are to be obtained. That is to say, in this case, the pixels Pa and Pb are shifted by −0.25 and 0.25 as to the spatial direction Y respectively as viewed from the pixel Pin, so that the shift amounts of the pixels Pa and Pb become Cx(−0.25) and Cx(0.25) respectively. Note that in FIG. 175, the pixel Pin is a square of which general gravity position is (Xin, Yin), and the pixels Pa and Pb are rectangles long in the horizontal direction in the drawing of which general gravity positions are (Xin, Yin+0.25) and (Xin, Yin−0.25) respectively.

In step S3404, the extrapolation/interpolation unit 3402 obtains the pixel values of the pixels Pa and Pb using extrapolation/interpolation through the following Expression (137) and Expression (138) based on the shift amount Cx obtained at the processing in step S3403, the gradient f(Xin)' on the pixel of interest on the approximation function f(x) of the pixel Pin acquired as the actual world estimating information, and the pixel value of the pixel Pin.

$$Pa=Pin-f(Xin)'\times Cx(0.25) \quad (137)$$

$$Pb=Pin-f(Xin)'\times Cx(-0.25) \quad (138)$$

In the above Expression (137) and Expression (138), Pa, Pb, and Pin represent the pixel values of the pixels Pa, Pb, and Pin respectively.

That is to say, as shown in FIG. 176, the amount of change of the pixel value is set by multiplying the gradient f(Xin)' in the pixel of interest Pin by the movement distance in the X direction, i.e., shift amount, and the pixel value of a pixel to be newly generated is set on the basis of the pixel value of the pixel of interest.

In step S3405, the extrapolation/interpolation unit 3402 determines regarding whether or not pixels having predetermined resolution have been obtained. For example, in the event that predetermined resolution is pixels having double density in the vertical direction as to the pixels in an input image, the extrapolation/interpolation unit 3402 determines that pixels having predetermined resolution have been obtained by the above processing, but for example, in the event that pixels having quadruple density (double in the horizontal direction×double in the vertical direction) as to the pixels in the input image have been desired, pixels having predetermined resolution have not been obtained by the above processing. Consequently, in the event that a quadruple-density image is a desired image, the extrapolation/interpolation unit 3402 determines that pixels having predetermined resolution have not been obtained, and the processing returns to step S3403.

In step S3403, the extrapolation/interpolation unit 3402 obtains the shift amounts of pixels P01, P02, P03, and P04 (pixel having quadruple density as to the pixel of interest Pin), which are to be obtained, from the center position of a pixel, which is to be generated, at the second processing respectively. That is to say, in this case, the pixels P01 and P02 are pixels to be obtained from the pixel Pa, so that each shift amount from the pixel Pa is obtained respectively. Here, the pixels P01 and P02 are shifted by −0.25 and 0.25 as to the spatial direction X respectively as viewed from the pixel Pa, and accordingly, each value itself becomes the shift amount thereof (since the pixels are shifted as to the spatial direction X). Similarly, the pixels P03 and P04 are shifted by −0.25 and 0.25 respectively as to the spatial direction X as viewed from the pixel Pb, and accordingly, each value itself becomes the shift amount thereof. Note that in FIG. 175, the pixels P01, P02, P03, and P04 are squares of which gravity positions are four cross-marked positions in the drawing, and the length of each side is 1 for the pixel Pin, and accordingly, around 0.5 for the pixels P01, P02, P03, and P04 respectively.

In step S3404, the extrapolation/interpolation unit 3402 obtains the pixel values of the pixels P01, P02, P03, and P04 using extrapolation/interpolation through the following Expression (139) through Expression (142) based on the shift amount Cx obtained at the processing in step S3403, the gradients f(Xin−Cx(−0.25))' and f(Xin−Cx(0.25))' at a predetermined position on the approximation function f(x) of the pixels Pa and Pb acquired as actual world estimating information, and the pixel values of the pixels Pa and Pb obtained at the above processing, and stores these in unshown memory.

$$P01 = Pa + f(Xin - Cx(0.25))' \times (-0.25) \quad (139)$$

$$P02 = Pa + f(Xin - Cx(0.25))' \times (0.25) \quad (140)$$

$$P03 = Pb + f(Xin - Cx(-0.25))' \times (-0.25) \quad (141)$$

$$P04 = Pb + f(Xin - Cx(-0.25))' \times (0.25) \quad (142)$$

In the above Expression (139) through Expression (142), P01 through P04 represent the pixel values of the pixels P01 through P04 respectively.

In step S3405, the extrapolation/interpolation unit 3402 determines regarding whether or not pixels having predetermined resolution have been obtained, and in this case, the desired quadruple-density pixels have been obtained, and accordingly, the extrapolation/interpolation unit 3402 determines that the pixels having predetermined resolution have been obtained, and the processing proceeds to step S3406.

In step S3406, the gradient acquiring unit 3401 determines regarding whether or not the processing of all pixels has been completed, and in the event that determination is made that the processing of all pixels has not been completed, the processing returns to step S3402, wherein the subsequent processing is repeatedly performed.

In step S3406, in the event that the gradient acquiring unit 3401 determines that the processing of all pixels has been completed, the extrapolation/interpolation unit 3402 outputs an image made up of the generated pixels, which are stored in unshown memory, in step S3407.

That is to say, as shown in FIG. 176, the pixel values of new pixels are obtained using extrapolation/interpolation according to a distance apart in the spatial direction X from the pixel of interest of which gradient is obtained using the gradient f(x)' on the approximation function f(x).

Note that with the above example, description has been made regarding the gradient (derivative value) at the time of calculating a quadruple-density pixel as an example, but in the event that gradient information at many more positions can be obtained as the actual world estimating information, pixels having more density in the spatial directions than that in the above example may be calculated using the same method as the above example.

Also, with regard to the above example, description has been made regarding an example for obtaining double-density pixel values, but the approximation function f(x) is a continuous function, and accordingly, in the event that necessary gradient (derivative value) information can be obtained even regarding pixel values having density other than double density, an image made up of further high-density pixels may be generated.

According to the above description, based on the gradient (or derivative value) f(x)' information of the approximation function f(x) approximating the pixel value of each pixel of an input image supplied as the actual world estimating information in the spatial direction, the pixels of an higher resolution image than the input image may be generated.

Next, description will be made with reference to FIG. 177 regarding the image generating unit 103 for generating new pixel values so as to output an image based upon the derivative values or gradient information for each pixel in a case that the actual world estimation information input from the actual world estimating unit 102 is derivative values or gradient information for these pixels, obtained from f(t) that is a function in the frame direction (time direction) representing approximate pixel values of the reference pixels.

An gradient acquisition unit 3411 acquires the gradient information obtained from an approximate function f(t) which represents approximate pixel values of the reference pixels, the corresponding pixel value, and movement as continuity, for each pixel position, which are input from the actual world estimating unit 102, and outputs the information thus obtained to an extrapolation unit 3412.

The extrapolation unit 3412 generates a high-density pixel of a predetermined order higher than that of the input image using extrapolation based upon the gradient which is obtained from the approximate function f(t), the corresponding pixel value, and movement as continuity, for each pixel, which are input from the gradient acquisition unit 3411, and outputs the image thus generated as an output image.

Next, description will be made regarding image generating processing by the image generating unit 103 shown in FIG. 177, with reference to the flowchart shown in FIG. 178.

In Step S3421, the gradient acquisition unit 3411 acquires information regarding the gradient (derivative value) which is obtained from the approximate function f(t), the position, the pixel value, and movement as continuity, for each pixel, which are input from the actual world estimating unit 102, as actual world estimation information.

For example, in a case of generating an image from the input image with double pixel density in both the spatial direction and the frame direction (i.e., a total of quadruple pixel density), the input information regarding the pixel Pin shown in FIG. 179, received from the actual world estimating unit 102 includes: the gradient f(Tin)' (the gradient at the center of the pixel Pin), f(Tin−Ct(0.25))' (the gradient at the center of the pixel Pat generated in a step for generating pixels in the Y direction from the pixel Pin with double pixel density), f(Tin−Ct(−0.25))' (the gradient at the center of the pixel Pbt generated in a step for generating pixels in the Y direction from the pixel Pin with double pixel density), the position of the pixel Pin, the pixel value, and movement as continuity (motion vector).

In Step S3422, the gradient acquisition unit 3411 selects the information regarding the pixel of interest, from the input actual world estimation information, and outputs the information thus acquired, to the extrapolation unit 3412.

In Step S3423, the extrapolation unit 3412 calculates the shift amount based upon the position information thus input, regarding the pixel and the gradient of continuity direction.

Here, with movement as continuity (gradient on the plane having the frame direction and the spatial direction) as $V_f$, the shift amount Ct(ty) is obtained by the equation Ct(ty)=ty/$V_f$. The shift amount Ct(ty) represents the shift of the approximate function f(t) in the frame direction T, calculated at the position of Y=ty in the spatial direction. Note that the approximate function f(t) is defined at the position Y=0 in the spatial direction. Accordingly, in a case that the approximate function f(t) is defined at the position Y=0 in the spatial direction, for example, the approximate function f(t) is shifted at Y=ty in the spatial direction by Ct(ty) in the spatial direction T, and accordingly, the approximate function at Y=ty is defined as f(t−Ct(ty))(=f(t−ty/$V_f$)).

For example, let us consider the pixel Pin as shown in FIG. 179. In a case that the one pixel in the drawing (let us say that the pixel is formed with a pixel size of (1, 1) both in the frame direction and the spatial direction) is divided into two in the spatial direction (in a case of generating an image with double pixel density in the spatial direction), the extrapolation unit 3412 calculates the shift amounts for obtaining the pixels Pat and Pbt. That is to say, the pixels Pat and Pbt are shifted along the spatial direction Y from the pixel Pin by 0.25 and −0.25, respectively. Accordingly, the shift amounts for obtaining the pixel values of the pixels Pat and Pbt are Ct(0.25) and Ct(−0.25), respectively. Note that in FIG. 179, the pixel Pin is formed in the shape of a square with the center of gravity at around (Xin, Yin). On the other hand, the pixels Pat and Pbt are formed in the shape of a rectangle having long sides in the horizontal direction in the drawing with the centers of gravity of around (Xin, Yin+0.25) and (Xin, Yin−0.25), respectively.

In Step S3424, the extrapolation unit 3412 calculates the pixel values of the pixels Pat and Pbt with the following Expressions (143) and (144) using extrapolation based upon the shift amount obtained in Step S3423, the gradient f(Tin)' at the pixel of interest, which is obtained from the approximate function f(t) for providing the pixel value of the pixel Pin and has been acquired as the actual world estimation information, and the pixel value of the pixel Pin.

$$pat=Pin-f(Tin)'\times Ct(0.25) \quad (143)$$

$$pbt=Pin-f(Xin)'\times Ct(-0.25) \quad (144)$$

In the above Expressions (143) and (144), Pat, Pbt, and Pin represent the pixel values of the pixel Pat, Pbt, and Pin, respectively.

That is to say, as shown in FIG. 180, the change in the pixel value is calculated by multiplying the gradient f(Xin)' at the pixel of interest Pin by the distance in the X direction, i.e., the shift amount. Then, the value of a new pixel, which is to be generated, is determined using the change thus calculated with the pixel value of the pixel of interest as a base.

In Step S3425, the extrapolation unit 3412 determines whether or not the pixels thus generated provide requested resolution. For example, in a case that the user has requested resolution of double pixel density in the spatial direction as compared with the input image, the extrapolation unit 3412 determines that requested resolution image has been obtained. However, in a case that the user has requested resolution of quadruple pixel density (double pixel density in both the frame direction and the spatial direction), the above processing does not provide the requested pixel density. Accordingly, in a case that the user has requested resolution of quadruple pixel density, the extrapolation unit 3412 determines that requested resolution image has not been obtained, and the flow returns to Step S3423.

In Step S3423 for the second processing, the extrapolation unit 3412 calculates the shift amounts from the pixels as bases for obtaining the centers of the pixels P01t, P02t, P03t, and P04t (quadruple pixel density as compared with the pixel of interest Pin). That is to say, in this case, the pixels P01t and P02t are obtained from the pixel Pat, and accordingly, the shift amounts from the pixel Pat are calculated for obtaining these pixels. Here, the pixels P01t and P02t are shifted from the pixel Pat in the frame direction T by −0.25 and 0.25, respectively, and accordingly, the distances therebetween without any conversion are employed as the shift amounts. In the same way, the pixels P03t and P04t are shifted from the pixel Pbt in the frame direction T by −0.25 and 0.25, respectively, and accordingly, the distances therebetween without any conversion are employed as the shift amounts. Note that in FIG. 179, each of the pixels P01t, P02t, P03t, and P04t is formed in the shape of a square having the center of gravity denoted by a corresponding one of the four cross marks in the drawing, and the length of each side of each of these pixels P01t, P02t, P03t, and P04t is approximately 0.5, since the length of each side of the pixel Pin is 1.

In Step S3424, the extrapolation unit 3412 calculates the pixel values of the pixels P01t, P02t, P03t, and P04t, with the following Expressions (145) through (148) using extrapolation based upon the shift amount Ct obtained in Step S3423, f(Tin−Ct(0.25))' and f(Tin−Ct(−0.25))' which are the gradients of the approximate function f(t) at the corresponding positions of Pat and Pbt and acquired as the actual world estimation information, and the pixel values of the pixels Pat and Pbt obtained in the above processing. The pixel values of the pixels P01t, P02t, P03t, and P04t thus obtained are stored in unshown memory.

$$P01t=Pat+f(Tin-Ct(0.25))'\times(-0.25) \quad (145)$$

$$P02t=Pat+f(Tin-Ct(0.25))'\times(0.25) \quad (146)$$

$$P03t=Pbt+f(Tin-Ct(-0.25))'\times(-0.25) \quad (147)$$

$$P04t=Pbt+f(Tin-Ct(-0.25))'\times(0.25) \quad (148)$$

In the above Expressions (139) through (142), P01t through P04t represent the pixel values of the pixels P01t through P04t, respectively.

In Step S3425, the extrapolation unit 3412 determines whether or not the pixel density for achieving the requested resolution has been obtained. In this stage, the requested quadruple pixel density is obtained. Accordingly, the extrapolation unit 3412 determines that the pixel density for requested resolution has been obtained, following which the flow proceeds to Step S3426.

In Step S3426, the gradient acquisition unit 3411 determines whether or not processing has been performed for all the pixels. In a case that the gradient acquisition unit 3411 determines that processing has not been performed for all the pixels, the flow returns to Step S3422, and subsequent processing is repeated.

In Step S3426, the gradient acquisition unit 3411 determines that processing has been performed for all the pixels, the extrapolation unit 3412 outputs an image formed of generated pixels stored in the unshown memory in Step S3427.

That is to say, as shown in FIG. 180, the gradient of the pixel of interest is obtained using the gradient f(t)' of the approximate function f(t), and the pixel values of new pixels are calculated corresponding to the number of frames positioned along the frame direction T from the pixel of interest.

While description has been made in the above example regarding an example of the gradient (derivative value) at the time of computing a quadruple-density pixel, the same technique can be used to further compute pixels in the frame direction as well, if gradient information at a greater number of positions can be obtained as actual world estimation information.

While description has been made regarding an arrangement for obtaining a double pixel-density image, an arrangement may be made wherein much higher pixel-density image is obtained based upon the information regarding the necessary gradient information (derivative values) using the nature of the approximate function f(t) as a continuous function.

The above-described processing enables creation of a higher resolution pixel image than the input image in the frame direction based upon the information regarding f(t)' which is supplied as the actual world estimation information, and is the gradient (or derivative value) of the approximate function f(t) which provides an approximate value of the pixel value of each pixel of the input image.

With the present embodiment described above, data continuity is detected from the image data formed of multiple pixels having the pixel values obtained by projecting the optical signals in the real world by actions of multiple detecting elements; a part of continuity of the optical signals in the real world being lost due to the projection with the multiple detecting elements each of which has time-space integration effects. Then, the gradients at the multiple pixels shifted from the pixel of interest in the image data in one dimensional direction of the time-space directions are employed as a function corresponding to the optical signals in the real world. Subsequently, the line is calculated for each of the aforementioned multiple pixels shifted from the center of the pixel of interest in the predetermined direction, with the center matching that of the corresponding pixel and with the gradient at the pixel thus employed. Then, the values at both ends of the line thus obtained within the pixel of interest are employed as the pixel values of a higher pixel-density image than the input image formed of the pixel of interest. This enables creation of high-resolution image in the time-space directions than the input image.

Next, description will be made regarding another arrangement of the image generating unit 103 (see FIG. 3) according to the present embodiment with reference to FIG. 181 through FIG. 206.

FIG. 181 shows an example of a configuration of the image generating unit 103 according to the present embodiment.

The image generating unit 103 shown in FIG. 181 includes a class classification adaptation unit 3501 for executing conventional class classification adaptation processing, a class classification adaptation correction unit 3502 for performing correction of the results of the class classification adaptation processing (detailed description will be made later), and addition unit 3503 for making the sum of an image output from the class classification adaptation unit 3501 and an image output from the class classification adaptation processing correction unit 3502, and outputting the summed image as an output image to external circuits.

Note that the image output from the class classification adaptation processing unit 3501 will be referred to as "predicted image" hereafter. On the other hand, the image output from the class classification adaptation processing correction unit 3502 will be referred to as "correction image" or "subtraction predicted image". Note that description will be made later regarding the concept behind the "predicted image" and "subtraction predicted image".

Also, in the present embodiment, let us say that the class classification adaptation processing is processing for improving the spatial resolution of the input image, for example. That is to say, the class classification adaptation processing is processing for converting the input image with standard resolution into the predicted image with high resolution.

Note that the image with the standard resolution will be referred to as "SD (Standard Definition) image" hereafter as appropriate. Also, the pixels forming the SD image will be referred to as "SD pixels" as appropriate.

On the other hand, the high-resolution image will be referred to as "HD (High Definition) image" hereafter as appropriate. Also, the pixels forming the HD image will be referred to as "HD pixels" as appropriate.

Next, description will be made below regarding a specific example of the class classification adaptation processing according to the present embodiment.

First, the features are obtained for each of the SD pixels including the pixel of interest and the pixels therearound (such SD pixels will be referred to as "class tap" hereafter) for calculating the HD pixels of the predicted image (HD image) corresponding to the pixel of interest (SD pixel) of the input image (SD image). Then, the class of the class tap is selected from classes prepared beforehand, based upon the features thus obtained (the class code of the class tap is determined).

Then, product-sum calculation is performed using the coefficients forming a coefficient set selected from multiple coefficient sets prepared beforehand (each coefficient set corresponds to a certain class code) based upon the class code thus determined, and the SD pixels including the pixel of interest and the pixels therearound (Such SD pixels will be referred to as "prediction tap" hereafter. Note that the class tap may also be employed as the prediction tap), so as to obtain HD pixels of a predicted image (HD image) corresponding to the pixel of interest (SD pixel) of the input image (SD image).

Accordingly, with the arrangement according to the present embodiment, the input image (SD image) is subjected to conventional class classification adaptation processing at the class classification adaptation processing unit 3501 so as to generate the predicted image (HD image). Furthermore, the predicted image thus obtained is corrected at the addition unit 3503 using the correction image output from the class classification adaptation processing correction unit 3502 (by making the sum of the predicted image and the correction image), thereby obtaining the output image (HD image).

That is to say, the arrangement according to the present embodiment can be said to be an arrangement of the image generating unit 103 of the image processing device (FIG. 3) for performing processing based upon the continuity, from the perspective of the continuity. On the other hand, the arrangement according to the present embodiment can also be said to be an arrangement of the image processing device further including the data continuity detecting unit 101, the actual world estimating unit 102, the class classification adaptation correction unit 3502, and the addition unit 3503, for performing correction of the class classification adaptation processing, as compared with a conventional image processing device formed of the sensor 2 and the class classification adaptation processing unit 3501, from the perspective of class classification adaptation processing.

Accordingly, such an arrangement according to the present embodiment will be referred to as "class classification processing correction means" hereafter, as opposed to reintegration means described above.

Detailed description will be made regarding the image generating unit 103 using the class classification processing correction means.

In FIG. 181, upon input of signals in the actual world 1 (distribution of the light intensity) to the sensor 2, the input image is output from the sensor 2. The input image is input to the class classification adaptation processing unit 3501 of the image generating unit 103, as well as to the data continuity detecting unit 101.

The class classification adaptation processing unit 3501 performs conventional class classification adaptation processing for the input image so as to generate the predicted image, and output the predicted image to the addition unit 3503.

As described above, with the class classification adaptation processing unit 3501, the input image (image data) input from the sensor 2 is employed as a target image which is to be subjected to processing, as well as to a reference image. That is to say, although the input image from the sensor 2 is different (distorted) from the signals of the actual world 1 due to the integration effects described above, the class classification adaptation processing unit 3501 performs the processing using the input image different from the signals of the actual world 1, as a correct reference image.

As a result, in a case that the HD image is generated using the class classification adaptation processing based upon the input image (SD image) in which original details have been lost in the input stage where the input image has been output from the sensor 2, such an HD image may have a problem that original details cannot be reproduced completely.

In order to solve the aforementioned problem, with the class classification processing correction means, the class classification adaptation processing correction unit 3502 of the image generating unit 103 employs the information (actual world estimation information) for estimating the original image (signals of the actual world 1 having original continuity) which is to be input to the sensor 2, as a target image to be subjected to processing as well as a reference image, instead of the input image from the sensor 2, so as to create a correction image for correcting the predicted image output from the class classification adaptation processing unit 3501.

The actual world estimation information is created by actions of the data continuity detecting unit 101 and the actual world estimating unit 102.

That is to say, the data continuity detecting unit 101 detects the continuity of the data (the data continuity corresponding to the continuity contained in signals of the actual world 1, which are input to the sensor 2) contained in the input image output from the sensor 2, and outputs the detection results as the data continuity information, to the actual world estimating unit 102.

Note that while FIG. 181 shows an arrangement wherein the angle is employed as the data continuity information, the data continuity information is not restricted to the angle, rather various kinds information may be employed as the data continuity information.

The actual world estimating unit 102 creates the actual estimation information based upon the angle (data continuity information) thus input, and outputs the actual world estimation information thus created, to the class classification adaptation correction unit 3502 of the image generating unit 103.

Note that while FIG. 181 shows an arrangement wherein the features-amount image (detailed description thereof will be made later) is employed as the actual world estimation information, the actual world estimation information is not restricted to the features-amount image, various information may be employed as described above.

The class classification adaptation processing correction unit 3502 creates a correction image based upon the features-amount image (actual world estimation information) thus input, and outputs the correction image to the addition unit 3503.

The addition unit 3503 makes the sum of the predicted image output from the class classification adaptation processing unit 3501 and the correction image output from the class classification adaptation processing correction unit 3502, and outputs the summed image (HD image) as an output image, to external circuits.

The output image thus output is similar to the signals (image) of the actual world 1 with higher precision than the predicted image. That is to say, the class classification adaptation processing correction means enable the user to solve the aforementioned problem.

Furthermore, with the signal processing device (image processing device) 4 having a configuration as shown in FIG. 181, such processing can be applied for the entire area of one frame. That is to say, while a signal processing device using a hybrid technique described later (e.g., an arrangement described later with reference to FIG. 207) or the like has need of identifying the pixel region for generating the output image, the signal processing device 4 shown in FIG. 181 has the advantage that there is no need of identifying such pixel region.

Next, description will be made in detail regarding the class classification adaptation processing unit 3510 of the image generating device 103.

FIG. 182 shows a configuration example of the class classification adaptation processing unit 3501.

In FIG. 182, the input image (SD image) input from the sensor 2 is supplied to a region extracting unit 3511 and a region extracting unit 3515. The region extracting unit 3511 extracts a class tap (the SD pixels existing at predetermined positions, which includes the pixel of interest (SD pixel)), and outputs the class tap to a pattern detecting unit 3512. The pattern detecting unit 3512 detects the pattern of the input image based upon the class tap thus input.

A class-code determining unit 3513 determines the class code based upon the pattern detected by the pattern detecting unit 3512, and outputs the class code to a coefficient memory 3514 and a region extracting unit 3515. The coefficient memory 3514 stores the coefficients for each class code prepared beforehand by learning, reads out the coefficients corresponding to the class code input from the class code determining unit 3513, and outputs the coefficients to a prediction computing unit 3516.

Note that description will be made later regarding the learning processing for obtaining the coefficients stored in the coefficient memory 3514, with reference to a block diagram of a class classification adaptation processing learning unit shown in FIG. 184.

Also, the coefficients stored in the coefficient memory 3514 are used for creating a prediction image (HD image) as described later. Accordingly, the coefficients stored in the coefficient memory 3514 will be referred to as "prediction coefficients" in order to distinguishing the aforementioned coefficients from other kinds of coefficients.

The region extracting unit 3515 extracts a prediction tap (SD pixels which exist at predetermined positions including the pixel of interest) necessary for predicting and creating a prediction image (HD image) from the input image (SD image) input from the sensor 2 based upon the class code input from the class code determining unit 3513, and outputs the prediction tap to the prediction computing unit 3516.

The prediction computing unit 3516 executes product-sum computation using the prediction tap input from the region extracting unit 3515 and the prediction coefficients input from the coefficient memory 3514, creates the HD pixels of the prediction image (HD image) corresponding to the pixel of interest (SD pixel) of the input image (SD image), and outputs the HD pixels to the addition unit 3503.

More specifically, the coefficient memory 3514 outputs the prediction coefficients corresponding to the class code supplied from the class code determining unit 3513 to the prediction computing unit 3516. The prediction computing unit 3516 executes the product-sum computation represented by the following Expression (149) using the prediction tap which is supplied from the region extracting unit 3515 and is extracted from the pixel values of predetermined pixels of the input image, and the prediction coefficients supplied from the coefficient memory 3514, thereby obtaining (predicting and estimating) the HD pixels of the prediction image (HD image).

$$q' = \sum_{i=0}^{n} d_i \times c_i \qquad (149)$$

In Expression (149), q' represents the HD pixel of the prediction image (HD image). Each of $c_i$ (i represents an integer of 1 through n) represents the corresponding prediction tap (SD pixel). Furthermore, each of $d_i$ represents the corresponding prediction coefficient.

As described above, the class classification adaptation processing unit 3501 predicts and estimates the corresponding HD image based upon the SD image (input image), and accordingly, in this case, the HD image output from the class classification adaptation processing unit 3501 is referred to as "prediction image".

FIG. 183 shows a learning device (calculating device for obtaining the prediction coefficients) for determining the prediction coefficients ($d_i$ in Expression (149)) stored in the coefficient memory 3514 of the class classification adaptation processing unit 3501.

Note that with the class classification adaptation processing correction technique, coefficient memory (correction coefficient memory 3554 which will be described later with reference to FIG. 191) is included in the class classification adaptation processing correction unit 3502, in addition to the coefficient memory 3514. Accordingly, as shown in FIG. 183, a learning device 3504 according to the class classification adaptation processing technique includes a learning unit 3561 (which will be referred to as "class classification adaptation processing correction learning unit 3561" hereafter) for determining the coefficients stored in the correction coefficient memory 3554 of the class classification adaptation processing correction unit 3502 as well as a learning unit 3521 (which will be referred to as "class classification adaptation processing learning unit 3521" hereafter) for determining the prediction coefficients ($d_i$ in Expression (149)) stored in the coefficient memory 3514 of the class classification adaptation processing unit 3501.

Accordingly, while the tutor image used in the class classification adaptation processing learning unit 3521 will be referred to as "first tutor image" hereafter the tutor image used in the class classification adaptation processing correction learning unit 3561 will be referred to as "second tutor image" hereafter. In the same way, while the student image used in the class classification adaptation processing learning unit 3521 will be referred to as "first student image" hereafter, the student image used in the class classification adaptation processing correction learning unit 3561 will be referred to as "second student image" hereafter.

Note that description will be made later regarding the class classification adaptation processing correction learning unit 3561.

FIG. 184 shows a detailed configuration example of the class classification adaptation processing learning unit 3521.

In FIG. 184, a certain image is input to the class classification adaptation processing correction learning unit 3561 (FIG. 183), as well as to a down-converter unit 3531 and a normal equation generating unit 3536 as a first tutor image (HD image).

The down-converter unit 3531 generates a first student image (SD image) with a lower resolution than the first tutor image based upon the input first tutor image (HD image) (converts the first tutor image into a first student image with a lower resolution), and outputs the first student image to region extracting units 3532 and 3535, and the class classification adaptation processing correction learning unit 3561 (FIG. 183).

As described above, the class classification adaptation processing learning unit 3521 includes the down-converter unit 3531, and accordingly, the first tutor image (HD image) has no need of having a higher resolution than the input image from the aforementioned sensor 2 (FIG. 181). The reason is that in this case, the first tutor image subjected to down-converting processing (the processing for reducing the resolution of the image) is employed as the first student image, i.e., the SD image. That is to say, the first tutor image corresponding to the first student image is employed as an HD image. Accordingly, the input image from the sensor 2 may be employed as the first tutor image without any conversion.

The region extracting unit 3532 extracts the class tap (SD pixels) necessary for class classification from the first student image (SD image) thus supplied, and outputs the class tap to a pattern detecting unit 3533. The pattern detecting unit 3533 detects the pattern of the class tap thus input, and outputs the detection results to a class code determining unit 3534. The class code determining unit 3534 determines the class code corresponding to the input pattern, and outputs the class code the region extracting unit 3535 and the normal equation generating unit 3536.

The region extracting unit 3535 extracts the prediction tap (SD pixels) from the first student image (SD image) input from the down-converter unit 3531 based upon the class code input from the class code determining unit 3534, and outputs the prediction tap to the normal equation generating unit 3536 and a prediction computing unit 3558.

Note that the region extracting unit 3532, the pattern detecting unit 3533, the class-code determining unit 3534, and the region extracting unit 3535 have generally the same configurations and functions as those of the region extracting unit 3511, the pattern detecting unit 3512, the class-code determining unit 3513, and the region extracting unit 3515, of the class classification adaptation processing unit 3501 shown in FIG. 182.

The normal equation generating unit 3536 generates normal equations based upon the prediction tap (SD pixels) of the first student image (SD image) input from the region extracting unit 3535, and the HD pixels of the first tutor image (HD image), for each class code of all class codes input form the class code determining unit 3545, and supplies the normal equations to a coefficient determining unit 3537. Upon reception of the normal equations corresponding to a certain class code from the normal equation generating unit 3537, the coefficient determining unit 3537 computes the prediction coefficients using the normal equations. Then, the coefficient determining unit 3537 supplies the computed prediction coefficients to a prediction computing unit 3538, as well as storing the prediction coefficients in the coefficient memory 3514 in association with the class code.

Detailed description will be made regarding the normal equation generating unit 3536 and the coefficient determining unit 3537.

In the aforementioned Expression (149), each of the prediction coefficients $d_i$ is undetermined coefficients before learning processing. The learning processing is performed by inputting HD pixels of the multiple tutor images (HD image) for each class code. Let us say that there are m HD pixels corresponding to a certain class code. With each of the m HD pixels as $q_k$ (k represents an integer of 1 through m), the following Expression (150) is introduced from the Expression (149).

$$q_k = \sum_{i=0}^{n} d_i \times c_{ik} + e_k \quad (150)$$

That is to say, the Expression (150) indicates that the HD pixel $q_k$ can be predicted and estimated by computing the right side of the Expression (150). Note that in Expression (150), $e_k$ represents error. That is to say, the HD pixel $q_k'$ which is a prediction image (HD image) which is the results of computing the right side, does not completely match the actual HD pixel $q_k$, and includes a certain error $e_k$.

Accordingly, the prediction coefficients $d_i$ which exhibit the minimum of the sum of the squares of errors $e_k$ should be obtained by the learning processing, for example.

Specifically, the number of the HD pixels $q_k$ prepared for the learning processing should be greater than n (i.e., m>n). In this case, the prediction coefficients $d_i$ are determined as a unique solution using the least squares method.

That is to say, the normal equations for obtaining the prediction coefficients $d_i$ in the right side of the Expression (150) using the least squares method are represented by the following Expression (151).

$$\begin{bmatrix} \sum_{k=1}^{m} c_{1k} \times c_{1k} & \sum_{k=1}^{m} c_{1k} \times c_{2k} & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \sum_{k=1}^{m} c_{2k} \times c_{nk} \\ \vdots & \vdots & \ddots & \vdots \\ \sum_{k=1}^{m} c_{nk} \times c_{1k} & \sum_{k=1}^{m} c_{nk} \times c_{2k} & \cdots & \sum_{k=1}^{m} c_{nk} \times c_{nk} \end{bmatrix} \begin{bmatrix} d_1 \\ d_2 \\ \vdots \\ d_n \end{bmatrix} = \begin{bmatrix} \sum_{k=1}^{m} c_{1k} \times q_k \\ \sum_{k=1}^{m} c_{2k} \times q_k \\ \vdots \\ \sum_{k=1}^{m} c_{nk} \times q_k \end{bmatrix} \quad (151)$$

Accordingly, the normal equations represented by the Expression (151) are created and solved, thereby determining the prediction coefficients $d_i$ as a unique solution.

Specifically, let us say that the matrices in the Expression (151) representing the normal equations are defined as the following Expressions (152) through (154). In this case, the normal equations are represented by the following Expression (155).

$$C_{MAT} = \begin{bmatrix} \sum_{k=1}^{m} c_{1k} \times c_{1k} & \sum_{k=1}^{m} c_{1k} \times c_{2k} & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \sum_{k=1}^{m} c_{2k} \times c_{nk} \\ \vdots & \vdots & \ddots & \vdots \\ \sum_{k=1}^{m} c_{nk} \times c_{1k} & \sum_{k=1}^{m} c_{nk} \times c_{2k} & \cdots & \sum_{k=1}^{m} c_{nk} \times c_{nk} \end{bmatrix} \quad (152)$$

$$D_{MAT} = \begin{bmatrix} d_1 \\ d_2 \\ \vdots \\ d_n \end{bmatrix} \quad (153)$$

$$Q_{MAT} = \begin{bmatrix} \sum_{k=1}^{m} c_{1k} \times q_k \\ \sum_{k=1}^{m} c_{2k} \times q_k \\ \vdots \\ \sum_{k=1}^{m} c_{nk} \times q_k \end{bmatrix} \quad (154)$$

$$C_{MAT} D_{MAT} = Q_{MAT} \quad (155)$$

As shown in Expression (153), each component of the matrix $D_{MAT}$ is the prediction coefficient $d_i$ which is to be obtained. With the present embodiment, the matrix $C_{MAT}$ in the left side and the matrix $Q_{MAT}$ in the right side in Expression (155) are determined, thereby obtaining the matrix $D_{MAT}$ (i.e., the prediction coefficients $d_i$) using matrix computation.

More specifically, as shown in Expression (152), each component of the matrix $C_{MAT}$ can be computed since the prediction tap $c_{ik}$ is known. With the present embodiment, the prediction tap $c_{ik}$ is extracted by the region extracting unit 3535. The normal equation generating unit 3536 computes each component of the matrix $C_{MAT}$ using the prediction tap $c_{ik}$ supplied from the region extracting unit 3535.

Also, with the present embodiment, the prediction tap $C_{ik}$ and the HD pixel $q_k$ are known. Accordingly, each component of the matrix $Q_{MAT}$ can be computed as shown in Expression (154). Note that the prediction tap $C_{ik}$ is the same as in the matrix $C_{MAT}$. Also, employed as the HD pixel $q_k$ is the HD pixel of the first tutor image corresponding to the pixel of interest (SD pixel of the first student image) included in the prediction tap $c_{ik}$. Accordingly, the normal equation generating unit 3536 computes each component of the matrix $Q_{MAT}$ based upon the prediction tap $c_{ik}$ supplied from the region extracting unit 3535 and the first tutor image.

As described above, the normal equation generating unit 3536 computes each component of the matrix $C_{MAT}$ and the matrix $Q_{MAT}$, and supplies the computation results in association with the class code to the coefficient determining unit 3537.

The coefficient determining unit 3537 computes the prediction coefficient $d_i$ serving as each component of the matrix $D_{MAT}$ in the above Expression (155) based upon the normal equation corresponding to the supplied certain class code.

Specifically, the above Expression (155) can be transformed into the following Expression (156)

$$D_{MAT} = C_{MAT}^{-1} Q_{MAT} \quad (156)$$

In Expression (156), each component of the matrix $D_{MAT}$ in the left side is the prediction coefficient $d_i$ which is to be obtained. On the other hand, each component of the matrix $C_{MAT}$ and the matrix $Q_{MAT}$ is supplied from the normal equation generating unit 3536. With the present embodiment, upon reception of each component of the matrix $C_{MAT}$ and the matrix $Q_{MAT}$ corresponding to the current class code from the normal equation generating unit 3536, the coefficient determining unit 3537 executes the matrix computation represented by the right side of Expression (156), thereby computing the matrix $D_{MAT}$. Then, the coefficient determining unit 3537 supplies the computation results (prediction coefficient $d_i$) to the prediction computation unit 3538, as well as storing the computation results in the coefficient memory 3514 in association with the class code.

The prediction computation unit 3538 executes product-sum computation using the prediction tap input from the region extracting unit 3535 and the prediction coefficients determined by the coefficient determining unit 3537, thereby generating the HD pixel of the prediction image (predicted image as the first tutor image) corresponding to the pixel of interest (SD pixel) of the first student image (SD image). The HD pixels thus generated are output as a learning-prediction image to the class classification adaptation processing correction learning unit 3561 (FIG. 183).

More specifically, with the prediction computation unit 3538, the prediction tap extracted from the pixel values around a certain pixel position in the first student image supplied from the region extracting unit 3535 is employed as $c_i$ (i represents an integer of 1 through n). Furthermore, each of the prediction coefficients supplied from the coefficient determining unit 3537 is employed as $d_i$. The prediction computation unit 3538 executes product-sum computation represented by the above Expression (149) using the $c_i$ and $d_i$ thus employed, thereby obtaining the HD pixel q' of the learning-prediction image (HD image) (i.e., thereby predicting and estimating the first tutor image).

Now, description will be made with reference to FIG. 185 through FIG. 190 regarding a problem of the conventional class classification adaptation processing (class classification adaptation processing unit 3501) described above, i.e., a problem that original details cannot be reproduced completely in a case that the HD image (predicted image of signals in the actual world 1) is generated by the class classification adaptation processing unit 3501 shown in FIG. 181 based upon the input image (SD image) in which original details have been lost in the input stage where the input image has been output from the sensor 2.

FIG. 185 shows an example of processing results of the class classification adaptation unit 3501.

In FIG. 185, an HD image 3541 has a fine line with a gradient of around 5° clockwise as to the vertical direction in the drawing. On the other hand, an SD image 3542 is generated from the HD image 3541 such that the average of each block of 2×2 pixels (HD pixels) of the HD image 3541 is employed as the corresponding single pixel (SD pixel) thereof. That is to say, the SD image 3542 is "down-converted" (reduced-resolution) image of the HD image 3541.

In other words, the HD image 3541 can be assumed to be an image (signals in the actual world 1 (FIG. 181)) which is to be output from the sensor 2 (FIG. 181) in this simulation. In this case, the SD image 3542 can be assumed to be an image corresponding to the HD image 3541, obtained from the sensor 2 having certain integration properties in the spatial direction in this simulation. That is to say, the SD image 3542 can be assumed to be an image input from the sensor 2 in this simulation.

In this simulation, the SD image 3542 is input to the class classification adaptation processing unit 3501 (FIG. 181). The predicted image output from the class classification adaptation processing unit 3501 is a predicted image 3543. That is to say, the predicted image 3543 is an HD image (image with the same resolution as with the original HD image 3541) generated by conventional class classification adaptation processing. Note that the prediction coefficients (prediction coefficients stored in the coefficient memory 3514 (FIG. 182)) used for prediction computation by the class classification adaptation processing unit 3501 are obtained with learning/computation processing performed by the class classification adaptation processing learning unit 3561 (FIG. 184) with the HD image 3541 as the first tutor image and with the SD image 3542 as the first student image.

Making a comparison between the HD image 3541, the SD image 3542, and the predicted image 3543, it has been confirmed that the predicted image 3543 is more similar to the HD image 3541 than the SD image 3542.

The comparison results indicate that the class classification adaptation processing 3501 generates the predicted image 3543 with reproduced original details using conventional class classification adaptation processing based upon the SD image 3542 in which the original details in the HD image 3541 have been lost.

However, making a comparison between the predicted image 3543 and the HD image 3541, it cannot be said definitely that the predicted image 3543 is a complete reproduced image of the HD image 3541.

In order to investigate the cause of such insufficient reproduction of the predicted image 3543 as to the HD image 3541, the present applicant formed a summed image by making the sum of the HD image 3541 and the inverse image of the predicted image 3534 using the addition unit 3546, i.e., a subtraction image 3544 obtained by subtracting the predicted image 3543 from the HD image 3541 (In a case of large difference in pixel values therebetween, the pixel of the subtraction image is formed with a density close to white. On the other hand, in a case of small difference in pixel values therebetween, the pixel of the subtraction image is formed with a density close to black).

In the same way, the present applicant formed a summed image by making the sum of the HD image 3541 and the inverse image of the SD image 3542 using the addition unit 3547, i.e., a subtraction image 3545 obtained by subtracting the SD image 3542 from the HD image 3541 (In a case of large difference in pixel values therebetween, the pixel of the subtraction image is formed with a density close to white. On the other hand, in a case of small difference in pixel values therebetween, the pixel of the subtraction image is formed with a density close to black).

Then, making a comparison between the subtraction image 3544 and the subtraction image 3545, the present applicant obtained investigation results as follows.

That is to say, the region which exhibits great difference in the pixel value between the HD image 3541 and the SD image 3542 (i.e., the region formed with a density close to white, in the subtraction image 3545) generally matches the region which exhibits great difference in the pixel value between the HD image 3541 and the predicted image 3543 (i.e., the region formed with a density close to white, in the subtraction image 3544).

In other words, the region in the predicted image 3543, exhibiting insufficient reproduction results as to the HD image 3541 generally matches the region which exhibits great difference in the pixel value between the HD image 3541 and the SD image 3542 (i.e., the region formed with a density close to white, in the subtraction image 3545).

Then, in order to solve the cause of the investigation results, the present applicant further made investigation as follows.

That is to say, first, the present applicant investigated reproduction results in the region which exhibits small difference in the pixel value between the HD image 3541 and the predicted image 3543 (i.e., the region formed with a density close to black, in the subtraction image 3544). With the aforementioned region, information obtained for this investigation are: the actual values of the HD image 3541; the actual pixel values of the SD image 3542; and the actual waveform corresponding to the HD image 3541 (signals in the actual world 1). The investigation results are shown in FIG. 186 and FIG. 187.

FIG. 186 shows an example of the investigation-target region. Note that in FIG. 186, the horizontal direction is represented by the X direction which is one spatial direction, and the vertical direction is represented by the Y direction which is another spatial direction.

That is to say, the present applicant investigated reproduction results of a region 3544-1 in the subtraction image 3544 shown in FIG. 186, which is an example of a region which exhibits small difference in the pixel value between the HD image 3541 and the predicted image 3543.

FIG. 187 is a chart which shows: the actual pixel values of the HD image 3541; the actual pixel values of the SD image 3542, corresponding to the four pixels from the left side of a series of six HD pixels in the X direction within the region 3544-1 shown in FIG. 186; and the actual waveform (signals in the actual world 1).

In FIG. 187, the vertical axis represents the pixel value, and the horizontal axis represents the x-axis parallel with the spatial direction X. Note that the X axis is defined with the origin as the position of the left end of the third HD pixel form the left side of the six HD pixels within the subtraction image 3544 in the drawing. Each coordinate value is defined with the origin thus obtained as the base. Note that the X-axis coordinate values are defined with the pixel width of an HD pixel of the subtraction image 3544 as 0.5. That is to say, the subtraction image 3544 is an HD image, and accordingly, each pixel of the HD image is plotted in the chart with the pixel width $L_t$ of 0.5 (which will be referred to as "HD-pixel width $L_t$" hereafter). On the other hand, in this case, each pixel of the SD image 3542 is plotted with the pixel width (which will be referred to as "SD-pixel width $L_s$" hereafter) which is twice the HD-pixel width $L_t$, i.e., with the SD-pixel width $L_s$ of 1.

Also, in FIG. 187, the solid line represents the pixel values of the HD image 3541, the dotted line represents the pixel values of the SD image 3542, and the broken line represents the signal waveform of the actual world 1 along the X-direction. Note that it is difficult to plot the actual waveform of the actual world 1 in reality. Accordingly, the broken line shown in FIG. 187 represents an approximate function f(x) which approximates the waveform along the X-direction using the aforementioned linear polynomial approximation technique (the actual estimating unit 102 according to the first embodiment shown in FIG. 181).

Then, the present applicant investigated reproduction results in the region which exhibits large difference in the pixel value between the HD image 3541 and the predicted image 3543 (i.e., the region formed with a density close to white, in the subtraction image 3544) in the same way as in the aforementioned investigation with regard to the region which exhibits small difference in the pixel value therebetween. With the aforementioned region, information obtained for this investigation are: the actual values of the HD image 3541; the actual pixel values of the SD image 3542; and the actual waveform corresponding to the HD image 3541 (signals in the actual world 1), in the same way. The investigation results are shown in FIG. 188 and FIG. 189.

FIG. 188 shows an example of the investigation-target region. Note that in FIG. 188, the horizontal direction is represented by the X direction which is a spatial direction, and the vertical direction is represented by the Y direction which is another spatial direction.

That is to say, the present applicant investigated reproduction results of a region 3544-2 in the subtraction image 3544 shown in FIG. 188, which is an example of a region which exhibits large difference in the pixel value between the HD image 3541 and the predicted image 3543.

FIG. 189 is a chart which shows: the actual pixel values of the HD image 3541; the actual pixel values of the SD image 3542, corresponding to the four pixels from the left side of a series of six HD pixels in the X direction within the region 3544-2 shown in FIG. 188; and the actual waveform (signals in the actual world 1).

In FIG. 189, the vertical axis represents the pixel value, and the horizontal axis represents the x-axis parallel with the spatial direction X. Note that the X axis is defined with the origin as the position of the left end of the third HD pixel form the left side of the six HD pixels within the subtraction image 3544 in the drawing. Each coordinate value is defined with the origin thus obtained as the base. Note that the X-axis coordinate values are defined with the SD-pixel width $L_s$ of 1.

In FIG. 189, the solid line represents the pixel values of the HD image 3541, the dotted line represents the pixel values of the SD image 3542, and the broken line represents the signal waveform of the actual world 1 along the X-direction. Note that the broken line shown in FIG. 189 represents an approximate function f(x) which approximates the waveform along the X-direction, in the same way as with the broken line shown in FIG. 187.

Making a comparison between the charts shown in FIG. 187 and FIG. 189, it is clear that each region in the drawing includes the line object from the waveforms of the approximate functions f(x) shown in the drawings.

However, there is the difference therebetween as follows. That is to say, while the line object extends over the region of x of around 0 to 1 in FIG. 187, the line object extends over the region of x of around −0.5 to 0.5 in FIG. 189. That is to say, in FIG. 187, the most part of the line object is included within the single SD pixel positioned at the region of x of 0 to 1 in the SD image 3542. On the other hand, in FIG. 189, a part of the line object is included within the single SD pixel positioned at the region of x of 0 to 1 in the SD image 3542 (the edge of the line object adjacent to the background is also included therewithin).

Accordingly, in a case shown in FIG. 187, there is the small difference in the pixel value between the two HD pixels (represented by the solid line) extending the region of x of 0 to 1.0 in the HD image 3541. The pixel value of the corresponding SD pixel (represented by the dotted line in the drawing) is the average of the pixel values of the two HD pixels. As a result, it can be easily understood that there is the small difference in the pixel value between the SD pixel of the SD image 3542 and the two HD pixels of the HD image 3541.

In such a state (the state shown in FIG. 187), let us consider reproduction processing for generating two HD pixels (the pixels of the predicted image 3543) which extend over the region of x of 0 to 1.0 with the single SD pixel extending the region of x of 0 to 1.0 as the pixel of interest using the conventional class classification adaptation processing. In this case, the generated HD pixels of the predicted image 3543 approximate the HD pixels of the HD image 3541 with sufficiently high precision as shown in FIG. 186. That is to say, in the region 3544-1, there is the small difference in the pixel value of the HD pixel between the predicted image 3543 and the HD image 3541, and accordingly, the subtraction image is formed with a density close to black as shown in FIG. 186.

On the other hand, in a case shown in FIG. 189, there is the large difference in the pixel value between the two HD pixels (represented by the solid line) extending the region of x of 0 to 1.0 in the HD image 3541. The pixel value of the corresponding SD pixel (represented by the dotted line in the drawing) is the average of the pixel values of the two HD pixels. As a result, it can be easily understood that there is the large difference in the pixel value between the SD pixel of the SD image 3541 and the two HD pixels of the HD image 3541, as compared with the corresponding difference shown in FIG. 187.

In such a state (the state shown in FIG. 189), let us consider reproduction processing for generating two HD pixels (the pixels of the predicted image 3543) which extend over the region of x of 0 to 1.0 with the single SD pixel extending the region of x of 0 to 1.0 as the pixel of interest using the conventional class classification adaptation processing. In this case, the generated HD pixels of the predicted image 3543 approximate the HD pixels of the HD image 3541 with poor precision as shown in FIG. 188. That is to say, in the region 3544-2, there is the large difference in the pixel value of the HD pixel between the predicted image 3543 and the HD image 3541, and accordingly, the subtraction image is formed with a density close to white as shown in FIG. 188.

Making a comparison between the approximate functions f(x) (represented by the broken line shown in the drawings) for the signals in the actual world 1 shown in FIG. 187 and FIG. 189, it can be understood as follows. That is to say, while the change in the approximate function f(x) is small over the region of x of 0 to 1 in FIG. 187, the change in the approximate function f(x) is large over the region of x of 0 to 1 in FIG. 189.

Accordingly, there is an SD pixel in the SD image 3542 as shown in FIG. 187, which extends over the range of x of 0 to 1.0, over which the change in the approximate function f(x) is small (i.e., the change in signals in the actual world 1 is small).

From this perspective, the investigation results described above can also be said as follows. That is to say, in a case of reproduction of the HD pixels based upon the SD pixels which extends over the region over which the change in the approximate function f(x) is small (i.e., the change in signals in the actual world 1 is small), such as the SD pixel extending over the region of x of 0 to 1.0 shown in FIG. 187, using the conventional class classification adaptation processing, the generated HD pixels approximate the signals in the actual world 1 (in this case, the image of the line object) with sufficiently high precision.

On the other hand, there is another SD pixel in the SD image 3542 as shown in FIG. 189, which extends over the range of x of 0 to 1.0, over which the change in the approximate function f(x) is large (i.e., the change in signals in the actual world 1 is large).

From this perspective, the investigation results described above can also be said as follows. That is to say, in a case of reproduction of the HD pixels based upon the SD pixels which extends over the region over which the change in the approximate function f(x) is large (i.e., the change in signals in the actual world 1 is large), such as the SD pixel extending over the region of x of 0 to 1.0 shown in FIG. 189, using the conventional class classification adaptation processing, the generated HD pixels approximate the signals in the actual world 1 (in this case, the image of the line object) with poor precision.

The conclusion of the investigation results described above is that in a case as shown in FIG. 190, it is difficult to reproduce the details extending over the region corresponding to a single pixel using the conventional signal processing based upon the relation between pixels (e.g., the class classification adaptation processing).

That is to say, FIG. 190 is a diagram for describing the investigation results obtained by the present applicant.

In FIG. 190, the horizontal direction in the drawing represents the X-direction which is a direction (spatial direction) along which the detecting elements of the sensor 2 (FIG. 181) are arrayed. On the other hand, the vertical direction in the drawing represents the light-amount level or the pixel value. The dotted line represents the X cross-sectional waveform F(x) of the signal in the actual world 1 (FIG. 181). The solid line represents the pixel value P output from the sensor 2 in a case the sensor 2 receives a signal (image) in the actual world 1 represented as described above. Also, the width (length in the X-direction) of a detecting element of the sensor 2 is represented by $L_c$. The change in the X cross-sectional waveform F(x) as to the pixel width $L_c$ of the sensor 2, which is the width $L_c$ of the detecting element of the sensor 2, is represented by ΔP.

Here, the aforementioned SD image 3542 (FIG. 185) is an image for simulating the image (FIG. 181) input from the sensor 2. With this simulation, evaluation can be made with the SD-pixel width $L_s$ of the SD image 3542 (FIG. 187 and FIG. 189) as the pixel width (width of the detecting element) $L_c$ of the sensor 2.

While description has been made regarding investigation for the signal in the actual world 1 (approximate function f(x)) which reflects the fine line, there are various types of change in the signal level in the actual world 1.

Accordingly, the reproduction results under the conditions shown in FIG. 190 can be estimated based upon the investigation results. The reproduction results thus estimated are as follows.

That is to say, as shown in FIG. 190, in a case of reproducing HD pixels (e.g., pixels of the predicted image output from the class classification adaptation processing unit 3501 in FIG. 181) using the conventional class classification adaptation processing with an SD pixel (output pixel from the sensor 2), over which the change ΔP in signals in the actual world 1 (the change in the X cross-sectional waveform F(x)) is large, as the pixel of interest, the generated HD pixels approximate the signals in the actual world 1 (X cross-sectional waveform F(x) in a case shown in FIG. 190) with poor precision.

Specifically, with the conventional methods such as the class classification adaptation processing, image processing is performed based upon the relation between multiple pixels output from the sensor 2.

That is to say, as shown in FIG. 190, let us consider a signal which exhibits rapid change ΔP in the X cross-sectional waveform F(x), i.e., rapid change in the signal in the actual world 1, over the region corresponding to a single pixel. Such a signal is integrated (strictly, time-spatial integration), and only a single pixel value P is output (the signal over the single pixel is represented by the uniform pixel value P).

With the conventional methods, image processing is performed with the pixel value P as both the reference and the target. In other words, with the conventional methods, image processing is performed without giving consideration to the change in the signal in the actual world 1 (X cross-sectional waveform F(x)) over a single pixel, i.e., without giving consideration to the details extending over a single pixel.

Any image processing (even class classification adaptation processing) has difficulty in reproducing change in the signal in the actual world 1 over a single pixel with high precision as long as the image processing is performed in increments of pixels. In particular, great change ΔP in the signal in the actual world 1 leads to marked difficulty therein.

In other words, the problem of the aforementioned class classification adaptation processing, i.e., the cause of insufficient reproduction of the original details using the class classification adaptation processing, which often occurs in a case of employing the input image (SD image) in which the details have been lost in the stage where the image has been output from the sensor 2, is as follows. The cause is that the class classification adaptation processing is performed in increment of pixels (a single pixel has a single pixel value) without giving consideration to change in signals in the actual world 1 over a single pixel, as shown in FIG. 181.

Note that all the conventional image processing methods including the class classification adaptation processing have the same problem, the cause of the problem is completely the same.

As described above, the conventional image processing methods have the same problem and the same cause of the problem.

On the other hand, the combination of the data continuity detecting unit 101 and the actual world estimating unit 102 (FIG. 3) allows estimation of the signals in the actual world 1 based upon the input image from the sensor 2 (i.e., the image in which the change in the signal in the actual world 1 has been lost) using the continuity of the signals in the actual world 1. That is to say, the actual world estimating unit 102 has a function for outputting the actual world estimation information which allows estimation of the signal in the actual world 1.

Accordingly, the change in the signals in the actual world 1 over a single pixel can be estimated based upon the actual world estimation information.

In this specification, the present applicant has proposed a class classification adaptation processing correction method as shown in FIG. 181, for example, based upon the mechanism in which the predicted image (which represents the image in the actual world 1, predicted without giving consideration to the change in the signal in the actual world 1 over a single pixel) generated by the conventional class classification adaptation processing is corrected using a predetermined correction image (which represents the estimated error of the predicted image due to change in the signal in the actual world 1 over a single pixel) generated based on the actual world estimation information, thereby solving the aforementioned problem.

That is to say, in FIG. 181, the data continuity detecting unit 101 and the actual world estimating unit 102 generate the actual world estimation information. Then, the class classification adaptation processing correction unit 3502 generates a correction image having a predetermined format based upon the actual world estimation information thus generated. Subsequently, the addition unit 3503 corrects the predicted image output from the class classification adaptation processing unit 3501 using the correction image output from the class classification adaptation processing correction unit 3502 (Specifically, makes the sum of the predicted image and the correction image, and outputs the summed image as an output image).

Note that detailed description has been made regarding the class classification adaptation processing unit 3501 included in the image generating unit 103 for performing class classification adaptation processing correction method. Also, the type of the addition unit 3503 is not restricted in particular as long as the addition unit 3503 has a function of making the sum of the predicted image and the correction image. Examples employed as the addition unit 3503 include various types of adders, addition programs, and so forth.

Accordingly, detailed description will be made below regarding the class classification adaptation processing correction unit 3502 which has not been described.

First description will be made regarding the mechanism of the class classification adaptation processing correction unit 3502.

As described above, in FIG. 185, let us assume the HD image 3541 as the original image (signals in the actual world 1) which is to be input to the sensor 2 (FIG. 181). Furthermore, let us assume the SD image 3542 as the input image from the sensor 2. In this case, the predicted image 3543 can be assumed as the predicted image (image obtained by predicting the original image (HD image 3541)) output from the class classification adaptation processing unit 3501.

On the other hand, the image obtained by subtracting the predicted image 3543 from the HD image 3541 is the subtraction image 3544.

Accordingly, the HD image 3541 is reproduced by actions of: the class classification adaptation processing correction unit 3502 having a function of creating the subtraction image 3544 and outputting the subtraction image 3544 as a correction image; and the addition unit 3503 having a function of making the sum of the predicted image 3543 output from the class classification adaptation processing unit 3501 and the subtraction image 3544 (correction image) output from the class classification adaptation processing correction unit 3502.

That is to say, the class classification adaptation processing correction unit 3502 suitably predicts the subtraction image (with the same resolution as with the predicted image output from the class classification adaptation processing unit 3501), which is the difference between the image which represents the signals in the actual world 1 (original image which is to be input to the sensor 2) and the predicted image output from the class classification adaptation processing unit 3501, and outputs the subtraction image thus predicted (which will be referred to as "subtraction predicted image" hereafter) as a correction image, thereby almost completely reproducing the signals in the actual world 1 (original image).

On the other hand, as described above, there is a relation between: the difference (error) between the signals in the actual world 1 (the original image which is to be input to the sensor 2) and the predicted image output from the class classification adaptation processing unit 3501; and the change in the signals in the actual world 1 over a single pixel of the input image. Also, the actual world estimating unit 102 has a function of estimating the signals in the actual world 1, thereby allowing estimation of the features for each pixel, representing the change in the signal in the actual world 1 over a single pixel of the input image.

With such a configuration, the class classification adaptation processing correction unit 3502 receives the features for each pixel of the input image, and creates the subtraction predicted image based thereupon (predicts the subtraction image).

Specifically, for example, the class classification adaptation processing correction unit 3502 receives an image (which will be referred to as "feature-amount image" hereafter) from the actual world estimating unit 102, as the actual world estimation information in which the features is represented by each pixel value.

Note that the feature-amount image has the same resolution as with the input image from the sensor 2. On the other hand, the correction image (subtraction predicted image) has the same resolution as with the predicted image output from the class classification adaptation processing unit 3501.

With such a configuration, the class classification adaptation processing correction unit 3502 predicts and computes the subtraction image based upon the feature-amount image using the conventional class classification adaptation processing with the feature-amount image as an SD image and with the correction image (subtraction predicted image) as an HD image, thereby obtaining suitable subtraction predicted image as a result of the prediction computation.

The above is the arrangement of the class classification adaptation processing correction unit 3502.

FIG. 191 shows a configuration example of the class classification adaptation processing correction unit 3502 which works on the mechanism.

In FIG. 191, the feature-amount image (SD image) input from the actual world estimating unit 102 is supplied to region extracting units 3551 and 3555. The region extracting unit 3551 extracts a class tap (a set of SD pixels positioned at a predetermined region including the pixel of interest) necessary for class classification from the supplied feature-amount image, and outputs the extracted class tap to a pattern detecting unit 3552. The pattern detecting unit 3552 detects the pattern of the feature-amount image based upon the class tap thus input.

A class code determining unit 3553 determines the class code based upon the pattern detected by the pattern detecting unit 3552, and outputs the determined class code to correction coefficient memory 3554 and the region extracting unit 3555. The correction coefficient memory 3554 stores the coefficients for each class code, obtained by learning. The correction coefficient memory 3554 reads out the coefficients corresponding to the class code input from the class code determining unit 3553, and outputs the class code to a correction computing unit 3556.

Note that description will be made later with reference to the block diagram of the class classification adaptation processing correction learning unit shown in FIG. 192 regarding the learning processing for calculating the coefficients stored in the correction coefficient memory 3554.

On the other hand, the coefficients, i.e., prediction coefficients, stored in the correction coefficient memory 3554 are used for predicting the subtraction image (for generating the subtraction predicted image which is an HD image) as described later. However, the term, "prediction coefficients" used in the above description has indicated the coefficients stored in the coefficient memory 3514 (FIG. 182) of the class classification adaptation processing unit 3501. Accordingly, the prediction coefficients stored in the correction coefficient memory 3554 will be refereed to as "correction coefficients" hereafter in order to distinguish the coefficients from the prediction coefficients stored in the coefficient memory 3514.

The region extracting unit 3555 extracts a prediction tap (a set of the SD pixels positioned at a predetermined region including the pixel of interest) from the feature-amount image (SD image) input from the actual world estimating unit 102 based upon the class code input from the class code determining unit 3553, necessary for predicting the subtraction image (HD image) (i.e., for generating subtraction predicted image which is an HD image) corresponding to a class code, and outputs the extracted class tap to the correction computing unit 3556. The correction computing unit 3556 executes product-sum computation using the prediction tap input from the region extracting unit 3555 and the correction coefficients input from the correction coefficient memory 3554, thereby generating HD pixels of the subtraction predicted image (HD image) corresponding to the pixel of interest (SD pixel) of the feature-amount image (SD image).

More specifically, the correction coefficient memory 3554 outputs the correction coefficients corresponding to the class code supplied from the class code determining unit 3553 to the correction computing unit 3556. The correction computing unit 3556 executes product-sum computation represented by the following Expression (157) using the prediction tap (SD pixels) extracted from the pixel values at a predetermined position at a pixel in the input image supplied from the region extracting unit 3555 and the correction coefficients supplied from the correction coefficient memory 3554, thereby obtaining HD pixels of the subtraction predicted image (HD image) (i.e., predicting and estimating the subtraction image).

$$u' = \sum_{i=0}^{n} g_i \times a_i \tag{157}$$

In Expression (157), u' represents the HD pixel of the subtraction predicted image (HD image). Each of $a_i$ (i represents an integer of 1 through n) represents the corresponding prediction tap (SD pixels). On the other hand, each of $g_i$ represents the corresponding correction coefficient.

Accordingly, while the class classification adaptation processing unit 3501 shown in FIG. 181 outputs the HD pixel q' represented by the above Expression (149), the class classification adaptation processing correction unit 3502 outputs the HD pixel u' of the subtraction predicted image represented by Expression (157). Then, the addition unit 3503 makes the sum of the HD pixel q' of the predicted image and the HD pixel u' of the subtraction predicted image (which will be represented by "o'" hereafter), and outputs the sum to external circuits, as an HD pixel of the output image.

That is to say, the HD pixel o' of the output image output from the image generating unit 103 in the final stage is represented by the following Expression (158).

$$o' = q' + u' = \sum_{i=0}^{n} d_i \times c_i + \sum_{i=0}^{n} g_i \times a_i \tag{158}$$

FIG. 192 shows a detailed configuration example of the learning unit for determining the correction coefficients ($g_i$ used in the above Expression (156)) stored in the correction coefficient memory 3554 of the class classification adaptation processing correction unit 3502, i.e., the class classification adaptation processing correction learning unit 3561 of the learning device 3504 shown in FIG. 183 described above.

In FIG. 183 as described above, upon completion of leaning processing, the class classification adaptation processing learning unit 3521 outputs learning predicted image obtained by predicting the first tutor image based upon the first student image using the prediction coefficients calculated by learning, as well as outputting the first tutor image (HD image) and the first student image (SD image) used for learning processing to the class classification adaptation processing correction learning unit 3561.

Returning to FIG. 192, of these images, the first student image is input to a data continuity detecting unit 3572.

On the other hand, of these images, the first tutor image and the learning predicted image are input to an addition unit 3571. Note that the learning predicted image is inverted before input to the addition unit 3571.

The addition unit 3571 makes the sum of the input first tutor image and the inverted input learning predicted image, i.e., generates a subtraction image between the first tutor image and the learning predicted image, and outputs the generated subtraction image to a normal equation generating unit 3578 as a tutor image used in the class classification adaptation processing correction learning unit 3561 (which will be referred to as "second tutor image" for distinguish this image from the first tutor image).

The data continuity detecting unit 3572 detects the continuity of the data contained in the input first student image, and outputs the detection results to an actual world estimating unit 3573 as data continuity information.

The actual world estimating unit 3573 generates a feature-amount image based upon the data continuity information thus input, and outputs the generated image to region extracting units 3574 and 3577 as a student image used in the class classification adaptation processing correction learning unit 3561 (the student image will be referred to as "second student image" for distinguishing this student image from the first student image described above).

The region extracting unit 3574 extracts SD pixels (class tap) necessary for class classification from the second student image (SD image) thus supplied, and outputs the extracted class tap to a pattern detecting unit 3575. The pattern detecting unit 3575 detects the pattern of the input class tap, and outputs the detection results to a class code determining unit 3576. The class code determining unit 3576 determines the class code corresponding to the input pattern, and outputs the determined class code to the region extracting unit 3577 and the normal equation generating unit 3578.

The region extracting unit 3577 extracts the prediction tap (SD pixels) from the second student image (SD image) input from the actual world estimating unit 3573 based upon the class code input from the class code determining unit 3576, and outputs the extracted prediction tap to the normal equation generating unit 3578.

Note that the aforementioned region extracting unit 3574, the pattern detecting unit 3575, the class code determining unit 3576, and the region extracting unit 3577, have generally the same configurations and functions as with the region extracting unit 3551, the pattern detecting unit 3552, the class code determining unit 3553, and the region extracting unit 3555 of the class classification adaptation processing correction unit 3502 shown in FIG. 191, respectively. Also, the aforementioned data continuity detecting unit 3572 and the actual world estimating unit 3773 have generally the same configurations and functions as with the data continuity detecting unit 101 and the actual world estimating unit 102 shown in FIG. 181, respectively.

The normal equation generating unit 3578 generates a normal equation based upon the prediction tap (SD pixels) of the second student image (SD image) input from the region extracting unit 3577 and the HD pixels of the second tutor image (HD image), for each of the class codes input from the class code determining unit 3576, and supplies the normal equation to a correction coefficient determining unit 3579. Upon reception of the normal equation for the corresponding class code from the normal equation generating unit 3578, the correction coefficient determining unit 3579 computes the correction coefficients using the normal equation, which and are stored in the correction coefficient memory 3554 in association with the class code.

Now, detailed description will be made regarding the normal equation generating unit 3578 and the correction coefficient determining unit 3579.

In the above Expression (157), all the correction coefficients $g_i$ are undetermined before learning. With the present embodiment, learning is performed by inputting multiple HD pixels of the tutor image (HD image) for each class code. Let us say that there are m HD pixels corresponding to a certain class code, and each of the m HD pixels are represented by $u_k$ (k is an integer of 1 through m). In this case, the following Expression (159) is introduced from the above Expression (157).

$$u_k = \sum_{i=0}^{n} g_i \times a_{ik} + e_k \tag{159}$$

That is to say, the Expression (159) indicates that the HD pixels corresponding to a certain class code can be predicted and estimated by computing the right side of this Expression. Note that in Expression (159), $e_k$ represents error. That is to say, the HD pixel $U_k'$ of the subtraction predicted image (HD image) which is computation results of the right side of this Expression does not exactly matches the HD pixel $u_k$ of the actual subtraction image, but contains a certain error $e_k$.

With Expression (156), the correction coefficients $a_i$ are obtained by learning such that the sum of squares of the errors $e_k$ exhibits the minimum, for example.

With the present embodiment, the m (m>n) HD pixels $u_k$ are prepared for learning processing. In this case, the correction coefficients $a_i$ can be calculated as a unique solution using the least squares method.

That is to say, the normal equation for calculating the correction coefficients $a_i$ in the right side of the Expression (159) using the least squares method is represented by the following Expression (160).

$$\begin{bmatrix} \sum_{k=1}^{m} a_{1k} \times a_{1k} & \sum_{k=1}^{m} a_{1k} \times a_{2k} & \cdots & \sum_{k=1}^{m} a_{1k} \times a_{nk} \\ \sum_{k=1}^{m} a_{2k} \times a_{1k} & \sum_{k=1}^{m} a_{2k} \times a_{2k} & \cdots & \sum_{k=1}^{m} a_{2k} \times a_{nk} \\ \vdots & \vdots & \ddots & \vdots \\ \sum_{k=1}^{m} a_{nk} \times a_{1k} & \sum_{k=1}^{m} a_{nk} \times a_{2k} & \cdots & \sum_{k=1}^{m} a_{nk} \times a_{nk} \end{bmatrix} \begin{bmatrix} g_1 \\ g_2 \\ \vdots \\ g_n \end{bmatrix} = \begin{bmatrix} \sum_{k=1}^{m} a_{1k} \times u_k \\ \sum_{k=1}^{m} a_{2k} \times u_k \\ \vdots \\ \sum_{k=1}^{m} a_{nk} \times u_k \end{bmatrix} \tag{160}$$

With the matrix in the Expression (160) as the following Expressions (161) through (163), the normal equation is represented by the following Expression (164).

$$A_{MAT} = \begin{bmatrix} \sum_{k=1}^{m} a_{1k} \times a_{1k} & \sum_{k=1}^{m} a_{1k} \times a_{2k} & \cdots & \sum_{k=1}^{m} a_{1k} \times a_{nk} \\ \sum_{k=1}^{m} a_{2k} \times a_{1k} & \sum_{k=1}^{m} a_{2k} \times a_{2k} & \cdots & \sum_{k=1}^{m} a_{2k} \times a_{nk} \\ \vdots & \vdots & \ddots & \vdots \\ \sum_{k=1}^{m} a_{nk} \times a_{1k} & \sum_{k=1}^{m} a_{nk} \times a_{2k} & \cdots & \sum_{k=1}^{m} a_{nk} \times a_{nk} \end{bmatrix} \quad (161)$$

$$G_{MAT} = \begin{bmatrix} g_1 \\ g_2 \\ \vdots \\ g_n \end{bmatrix} \quad (162)$$

$$U_{MAT} = \begin{bmatrix} \sum_{k=1}^{m} a_{1k} \times u_k \\ \sum_{k=1}^{m} a_{2k} \times u_k \\ \vdots \\ \sum_{k=1}^{m} a_{nk} \times u_k \end{bmatrix} \quad (163)$$

$$A_{MAT} G_{MAT} = U_{MAT} \quad (164)$$

As shown in Expression (162), each component of the matrix $G_{MAT}$ is the correction coefficient $g_i$ which is to be obtained. With the present embodiment, in Expression (164), the matrix $A_{MAT}$ in the left side thereof and the matrix $U_{MAT}$ in the right side thereof are prepared, thereby calculating the matrix $G_{MAT}$ (i.e., the correction coefficients $g_i$) using the matrix solution method.

Specifically, with the present embodiment, each prediction tap $a_{ik}$ is known, and accordingly, each component of the matrix $A_{MAT}$ represented by Expression (161) can be obtained. Each prediction tap $a_{ik}$ is extracted by the region extracting unit 3577, and the normal equation generating unit 3578 computes each component of the matrix $A_{MAT}$ using the prediction tap $a_{ik}$ supplied from the region extracting unit 3577.

On the other hand, with the present embodiment, the prediction tap $a_{ik}$ and the HD pixel $u_k$ of the subtraction image are prepared, and accordingly, each component of the matrix $U_{MAT}$ represented by Expression (163) can be calculated. Note that the prediction tap $a_{ik}$ is the same as that of the matrix $A_{MAT}$. On the other hand, the HD pixel $u_k$ of the subtraction image matches the corresponding HD pixel of the second tutor image output from the addition unit 3571. With the present embodiment, the normal equation generating unit 3578 computes each component of the matrix $U_{MAT}$ using the prediction tap $a_{ik}$ supplied from the region extracting unit 3577 and the second tutor image (the subtraction image between the first tutor image and the learning predicted image).

As described above, the normal equation generating unit 3578 computes each component of the matrix $A_{MAT}$ and the matrix $U_{MAT}$ for each class code, and supplies the computation results to the correction coefficient determining unit 3579 in association with the class code.

The correction coefficient determining unit 3579 computes the correction coefficients $g_i$ each of which is the component of the matrix $G_{MAT}$ represented by the above Expression (164) based upon the normal equation corresponding to the supplied class code.

Specifically, the normal equation represented by the above Expression (164) can be transformed into the following Expression (165).

$$G_{MAT} = A_{MAT}^{-1} U_{MAT} \quad (165)$$

In Expression (165), each component of the matrix $G_{MAT}$ in the left side thereof is the correction coefficient $g_i$ which is to be obtained. Note that each component of the matrix $A_{MAT}$ and each component of the matrix $U_{MAT}$ are supplied from the normal equation generating unit 3578. With the present embodiment, upon reception of the components of the matrix $A_{MAT}$ in association with a certain class code and the components of the matrix $U_{MAT}$ from the normal equation generating unit 3578, the correction coefficient determining unit 3579 computes the matrix $G_{MAT}$ by executing matrix computation represented by the right side of Expression (165), and stores the computation results (correction coefficients $g_i$) in the correction coefficient memory 3554 in association with the class code.

The above is the detailed description regarding the class classification adaptation processing correction unit 3502 and the class classification adaptation processing correction learning unit 3561 which is a learning unit and a sub-unit of the class classification adaptation processing correction unit 3502.

Note that the type of the feature-amount image employed in the present invention is not restricted in particular as long as the correction image (subtraction predicted image) is generated based thereupon by actions of the class classification adaptation processing correction unit 3502. In other words, the pixel value of each pixel in the feature-amount image, i.e., the features, employed in the present invention is not restricted in particular as long as the features represents the change in the signal in the actual world 1 (FIG. 181) over a single pixel (pixel of the sensor 2 (FIG. 181)).

For example, "intra-pixel gradient" can be employed as the features.

Note that the "intra-pixel gradient" is a new term defined here. Description will be made below regarding the intra-pixel gradient.

As described above, the signal in the actual world 1, which is an image in FIG. 181, is represented by the function F(x, y, t) with the positions x, y, and z in the three-dimensional space and time t as variables.

Now, let us say that the signal in the actual world 1 which is an image has continuity in a certain spatial direction. In this case, let us consider a one-dimensional waveform (the waveform obtained by projecting the function F along the X direction will be referred to as "X cross-section waveform F(x)") obtained by projecting the function F(x, y, t) along a certain direction (e.g., X-direction) selected from the spatial directions of the X-direction, Y-direction, and Z-direction. In this case, it can be understood that waveforms similar to the aforementioned one-dimensional waveform F(x) can be obtained therearound along the direction of the continuity.

Based upon the fact described above, with the present embodiment, the actual world estimating unit 102 approximates the X cross-section waveform F(x) using a n'th (n represents a certain integer) polynomial approximate function f(x) based upon the data continuity information (e.g., angle) which reflects the continuity of the signal in the actual world 1, which is output form the data continuity detecting unit 101, for example.

FIG. 193 shows $f_4(x)$ (which is a fifth polynomial function) represented by the following Expression (166), and $f_5(x)$ (which is a first polynomial function) represented by the following Expression (167), for example of such a polynomial approximate function f(x).

$$f_4(x) = w_0 + w_1 x + w_2 x^2 + w_3 x^3 + w_4 x^4 + w_5 x^5 \quad (166)$$

$$f_5(x) = w_0' + w_1' x \quad (167)$$

Note that each of $W_0$ through $W_5$ in Expression (166) and $W_0'$ and $W_1'$ in Expression (167) represents the coefficient of the corresponding order of the function computed by the actual world estimating unit 102.

On the other hand, in FIG. 193, the x-axis in the horizontal direction in the drawing is defined with the left end of the pixel of interest as the origin (x=0), and represents the relative position from the pixel of interest along the spatial direction x. Note that the x-axis is defined with the width $L_c$ of the detecting element of the sensor 2 as 1. On the other hand, the axis in the vertical direction in the drawing represents the pixel value.

As shown in FIG. 193, the one-dimensional approximate function $f_5(x)$ (approximate function $f_5(x)$ represented by Expression (166)) approximates the X cross-sectional waveform F(x) around the pixel of interest using collinear approximation. In this specification, the gradient of the linear approximate function will be referred to as "intra-pixel gradient". That is to say, the intra-pixel gradient is represented by the coefficient $w_1'$ of x in Expression (167).

The rapid intra-pixel gradient reflects great change in the X cross-sectional waveform F(x) around the pixel of the interest. On the other hand, the gradual gradient reflects small change in the X cross-sectional waveform F(x) around the pixel of interest.

As described above, the intra-pixel gradient suitably reflects change in the signal in the actual world 1 over a single pixel (pixel of the sensor 2). Accordingly, the intra-pixel gradient may be employed as the features.

For example, FIG. 194 shows the actual feature-amount image generated with the intra-pixel gradient as the features.

That is to say, the image on the left side in FIG. 194 is the same as the SD image 3542 shown in FIG. 185 described above. On the other hand, the image on the right side in FIG. 194 is a feature-amount image 3591 generated as follows. That is to say, the intra-pixel gradient is obtained for each pixel of the SD image 3542 on the left side in the drawing. Then, the image on the right side in the drawing is generated with the value corresponding to the intra-pixel gradient as the pixel value. Note that the feature-amount image 3591 has the nature as follows. That is to say, in a case of the intra-pixel gradient of zero (the linear approximate function is parallel with the X-direction), the image is generated with a density corresponding to black. On the other hand, in a case of the intra-pixel gradient of 90° (the linear approximate function is parallel with the Y-direction), the image is generated with a density corresponding to white.

The region 3542-1 in the SD image 3542 corresponds to the region 3544-1 (which has been used in the above description with reference to FIG. 187, as an example of the region in which change in the signal in the actual world 1 is small over a single pixel) in the subtraction image 3544 shown in FIG. 186 described above. The region 3591-1 in the feature-amount image 3591 corresponds to the region 3542-1 in the SD image 3542.

On the other hand, the region 3542-2 in the SD image 3542 corresponds to the region 3544-2 (which has been used in the above description with reference to FIG. 189, as an example of the region in which change in the signal in the actual world 1 is large over a single pixel) in the subtraction image 3544 shown in FIG. 188 described above. The region 3591-2 in the feature-amount image 3591 corresponds to the region 3542-2 in the SD image 3542.

Making a comparison between the region 3542-1 of the SD image 3542 and the region 3591-1 of the feature-amount image 3591, it can be understood that the region in which change in the signal in the actual world 1 is small corresponds to the region of the feature-amount image 3591 having a density close to black (corresponding to the region having a gradual intra-pixel gradient).

On the other hand, making a comparison between the region 3542-2 of the SD image 3542 and the region 3591-2 of the feature-amount image 3591, it can be understood that the region in which change in the signal in the actual world 1 is large corresponds to the region of the feature-amount image 3591 having a density close to white (corresponding to the region having a rapid intra-pixel gradient).

As described above, the feature-amount image generated with the value corresponding to the intra-pixel gradient as the pixel value suitably reflects the degree of change in the signal in the actual world 1 for each pixel.

Next, description will be made regarding a specific computing method for the intra-pixel gradient.

That is to say, with the intra-pixel gradient around the pixel of interest as "grad", the intra-pixel gradient grad is represented by the following Expression (168).

$$grad = \frac{P_n - P_c}{x_n'} \quad (168)$$

In Expression (168), $P_n$ represents the pixel value of the pixel of interest. Also, $P_c$ represents the pixel value of the center pixel.

Specifically, as shown in FIG. 195, let us consider a region 3601 (which will be referred to as "continuity region 3601" hereafter) of 5×5 pixels (square region of 5×5=25 pixels in the drawing) in the input image from the sensor 2, having a certain data continuity. In a case of the continuity region 3601, the center pixel is the pixel 3602 positioned at the center of the continuity region 3601. Accordingly, $P_c$ is the pixel value of the center pixel 3602. Also, in a case that the pixel 3603 is the pixel of interest, $P_n$ is the pixel value of the pixel of interest 3603.

Also, in Expression (168), $x_n'$ represents the cross-sectional direction distance at the center of the pixel of interest. Note that with the center of the center pixel (pixel 3602 in a case shown in FIG. 195) as the origin (0, 0) in the spatial directions, "the cross-sectional direction distance" is defined as the relative distance along the X-direction between the center pixel of interest and the line (the line 3604 in a case shown in FIG. 195) which is parallel with the data-continuity direction, and which passes through the origin.

FIG. 196 is a diagram which shows the cross-sectional direction distance for each pixel within the continuity region 3601 in FIG. 195. That is to say, in FIG. 196, the value marked within each pixel in the continuity region 3601 (square region of 5×5=25 pixels in the drawing) represents the cross-sectional direction distance at the corresponding pixel. For example, the cross-sectional direction distance $X_n'$ at the pixel of interest 3603 is $-2\beta$.

Note that the X-axis and the Y-axis are defined with the pixel width of 1 in both the X-direction and the Y-direction. Furthermore, the X-direction is defined with the positive direction matching the right direction in the drawing. Also, in this case, β represents the cross-sectional direction distance at the pixel 3605 adjacent to the center pixel 3602 in the Y-direction (adjacent thereto downward in the drawing). With the present embodiment, the data continuity detecting unit 101 supplies the angle θ (the angle θ between the direction of the line 3604 and the X-direction) as shown in FIG. 196 as the data continuity information, and accordingly, the value β can be obtained with ease using the following Expression (169).

$$\beta = \frac{1}{\tan\theta} \qquad (169)$$

As described above, the intra-pixel gradient can be obtained with simple computation based upon the two input pixel values of the center pixel (e.g., pixel 3602 in FIG. 196) and the pixel of interest (e.g., pixel 3603 in FIG. 196) and the angle θ. With the present embodiment, the actual world estimating unit 102 generates a feature-amount image with the value corresponding to the intra-pixel gradient as the pixel value, thereby greatly reducing the processing amount.

Note that with an arrangement which requires higher-precision intra-pixel gradient, the actual-world estimating unit 102 should compute the intra-pixel gradient using the pixels around and including the pixel of interest with the least square method. Specifically, let us say that m (m represents an integer of 2 or more) pixels around and including the pixel of interest are represented by index number i (i represents an integer of 1 through m). The actual world estimating unit 102 substitutes the input pixel values $P_i$ and the corresponding cross-sectional direction distance $x_i'$ into the right side of the following Expression (170), thereby computing the intra-pixel gradient grad at the pixel of interest. That is to say, with Expression (170), the intra-pixel gradient is calculated using the least square method with a single variable in the same way as described above.

$$grad = \frac{\sum_{i=1}^{m} x_i'^2 \times P_i}{\sum_{i=1}^{m} (x_i')^2} \qquad (170)$$

Next, description will be made with reference to FIG. 197 regarding processing (processing in Step S103 shown in FIG. 40) for generating an image performed by the image generating unit 103 (FIG. 181) using the class classification adaptation processing correction method.

In FIG. 181, upon reception of the signal in the actual world 1 which is an image, the sensor 2 outputs the input image. The input image is input to the class classification adaptation processing unit 3501 of the image generating unit 103 as well as being input to the data continuity detecting unit 101.

Then, in Step S3501 shown in FIG. 197, the class classification adaptation processing unit 3501 performs class classification adaptation processing for the input image (SD image) so as to generate the predicted image (HD image), and outputs the generated predicted image to the addition unit 3503.

Note that such processing in Step S3501 performed by the class classification adaptation processing unit 3501 will be referred to as "input image class classification adaptation processing" hereafter. Detailed description will be made later with reference to the flowchart shown in FIG. 198 regarding the "input image class classification adaptation processing" in this case.

The data continuity detecting unit 101 detects the data continuity contained in the input image at almost the same time as with the processing in Step S3501, and outputs the detection results (angle in this case) to the actual world estimating unit 102 as data continuity information (processing in Step S101 shown in FIG. 40).

The actual world estimating unit 102 generates the actual world estimation information (the feature-amount image which is an SD image in this case) based upon the input angle (data continuity information), and supplies the actual world estimation information to the class classification adaptation processing correction unit 3502 (processing in Step S102 shown in FIG. 40).

Then, in Step S3502, the class classification adaptation processing correction unit 3502 performs class classification adaptation processing for the feature-amount image (SD image) thus supplied, so as to generate the subtraction predicted image (HD image) (i.e., so as to predict and compute the subtraction image (HD image) between the actual image (signal in the actual world 1) and the predicted image output from the class classification adaptation processing unit 3501), and outputs the subtraction predicted image to the addition unit 3503 as a correction image.

Note that such processing in Step S3502 performed by the class classification adaptation processing correction unit 3502 will be referred to as "class classification adaptation processing correction processing" hereafter. Detailed description will be made later with reference to the flowchart shown in FIG. 199 regarding the "class classification adaptation processing correction processing" in this case.

Then, in Step S3503, the addition unit 3503 makes the sum of: the pixel of interest (HD pixel) of the predicted image (HD image) generated with the processing shown in Step S3501 by the class classification adaptation processing unit 3501; and the corresponding pixel (HD pixel) of the correction image (HD image) generated with the processing shown in Step S3502 by the class classification adaptation processing correction unit 3502, thereby generating the pixel (HD pixel) of the output image (HD pixel).

In Step S3504, the addition unit 3503 determines whether or not the processing has been performed for all the pixels.

In the event that determination has been made that the processing has not been performed for all the pixels in Step S3504, the flow returns to Step S3501, and the subsequent processing is repeated. That is to say, the processing in Steps S3501 through S3503 is performed for each of the remaining pixels which have not been subjected to the processing in order.

Upon completion of the processing for all the pixels (in the event that determination has been made that processing has been performed for all the pixels in Step S3504), the addition unit 3504 outputs the output image (HD image) to external circuits in Step S3505, whereby processing for generating an image ends.

Next, detailed description will be made with reference to the drawings regarding the "input image class classification adaptation processing (the processing in Step S3501)", and the "class classification adaptation correction processing (the processing in Step S3502)", step by step in that order.

First, detailed description will be made with reference to the flowchart shown in FIG. 198 regarding the "input image class classification adaptation processing" executed by the class classification adaptation processing unit 3501 (FIG. 182).

Upon input of the input image (SD image) to the class classification adaptation processing unit 3501, the region extracting units 3511 and 3515 each receive the input image in Step S3521.

In Step S3522, the region extracting unit 3511 extracts the pixel of interest (SD pixel) from the input image and (one or more) pixels (SD pixels) at predetermined relative positions away from the pixel of interest as a class tap, and supplies the extracted class tap to the pattern detecting unit 3512.

In Step S3523, the pattern detecting unit 3512 detects the pattern of the class tap thus supplied, and supplies the detected pattern to the class code determining unit 3513.

In Step S3524, the class code determining unit 3513 determines the class code suited to the pattern of the class tap thus supplied, from the multiple class codes prepared beforehand, and supplies the determined class code to the coefficient memory 3514 and the region extracting unit 3515.

In Step S3525, the coefficient memory 3514 selects the prediction coefficients (set) corresponding to the supplied class code, which are to be used in the subsequent processing, from the multiple prediction coefficients (set) determined beforehand with learning processing, and supplies the selected prediction coefficients to the prediction computing unit 3516.

Note that description will be made later regarding the learning processing with reference to the flowchart shown in FIG. 203.

In Step S3526, the region extracting unit 3515 extracts the pixel of interest (SD pixel) from the input image and (one or more) pixels (SD pixels) at predetermined relative positions (which may be set to the same positions as with the class tap) away from the pixel of interest as a prediction tap, and supplies the extracted prediction tap to the prediction computing unit 3516.

In Step S3527, the prediction computing unit 3516 performs computation processing for the prediction tap supplied from the region extracting unit 3515 using the prediction coefficients supplied from the coefficient memory 3514 so as to generate the predicted image (HD image), and outputs the generated predicted image to the addition unit 3503.

Specifically, the prediction computing unit 3516 performs computation processing as follows. That is to say, with each pixel of the prediction tap supplied from the region extracting unit 3515 as $c_i$ (i represents an integer of 1 through n), and with each of the prediction coefficients supplied from the coefficient memory 3514 as $d_i$, the prediction computing unit 3516 performs computation represented by the right side of the above Expression (149), thereby calculating the HD pixel q' corresponding to the pixel of interest (SD pixel). Then, the prediction computing unit 3516 outputs the calculated HD pixel q' to the addition unit 3503 as a pixel forming the predicted image (HD image), whereby the input image class classification adaptation processing ends.

Next, detailed description will be made with reference to the flowchart shown in FIG. 199 regarding the "class classification adaptation processing correction processing" executed by the class classification adaptation processing correction unit 3502 (FIG. 191).

Upon input of the feature-amount image (SD image) to the class classification adaptation processing correction unit 3502 as the actual world estimation information from the actual world estimating unit 102, the region extracting units 3551 and 3555 each receive the feature-amount image in Step S3541.

In Step S3542, the region extracting unit 3551 extracts the pixel of interest (SD pixel) and (one or more) pixels (SD pixels) at predetermined relative positions away from the pixel of interest from the feature amount image as a class tap, and supplies the extracted class tap to the pattern detecting unit 3552.

Specifically, in this case, let us say that the region extracting unit 3551 extracts a class tap (a set of pixels) 3621 shown in FIG. 200, for example. That is to say, FIG. 200 shows an example of the layout of the class tap.

In FIG. 200, the horizontal axis in the drawing represents the X-direction which is one spatial direction, and the vertical direction in the drawing represents the Y-direction which is another spatial direction. Note that the pixel of interest is represented by the pixel 3621-2.

In this case, in the example shown in FIG. 200, the pixels extracted as the class tap are a total of five pixels of: the pixel of interest 3621-1; the pixels 3621-0 and 3621-4 which are adjacent to the pixel of interest 3621-2 along the Y-direction; and the pixels 3621-1 and 3621-3 which are adjacent to the pixel of interest 3621-2 along the X-direction, which make up a pixel set 3621.

It is needless to say that the layout of the class tap employed in the present embodiment is not restricted to the example shown in FIG. 200, rather, various kinds of layouts may be employed as long as it includes the pixel of interest 3621-2.

Returning to FIG. 199, in Step S3543, the pattern detecting unit 3552 detects the pattern of the class tap thus supplied, and supplies the detected pattern to the class code determining unit 3553.

Specifically, in this case, the pattern detecting unit 3552 detects the class which belongs the pixel value, i.e., the value of features (e.g., intra-pixel gradient), for each of the five pixels 3621-0 through 3621-4 forming the class tap shown in FIG. 200, and outputs the detection results in the form of a single data set as a pattern, for example.

Now, let us say that a pattern shown in FIG. 201 is detected, for example. That is to say, FIG. 201 shows an example of the pattern of the class tap.

In FIG. 201, the horizontal axis in the drawing represents the class taps, and the vertical axis in the drawing represents the intra-pixel gradient. On the other hand, let us say that the classes prepared beforehand are a total of three classes of class 3631, class 3632, and class 3633.

In this case, FIG. 201 shows a pattern in which the class tap 3621-0 belongs the class 3631, the class tap 3621-1 belongs the class 3631, the class tap 3621-2 belongs the class 3633, the class tap 3621-3 belongs the class 3631, and the class tap 3621-4 belongs the class 3632.

As described above, each of the five class taps 3621-0 through 3621-4 belongs to one of the three classes 3631 through 3633. Accordingly, in this case, there are a total of 273 (=3^5) patterns including the pattern shown in FIG. 201.

Returning to FIG. 199, in Step S3544, the class code determining unit 3553 determines the class code corresponding to the pattern of the class tap thus supplied, from multiple class code prepared beforehand, and supplies the determined class code to the correction coefficient memory 3554 and the region extracting unit 3555. In this case, there are 273 patterns, and accordingly, there are 273 (or more) class codes prepared beforehand.

In step S3545, the correction coefficient memory 3554 selects the correction coefficients (set), which are to be used in the subsequent processing, corresponding to the class code thus supplied, from the multiple sets of the correction coefficient set determined beforehand with the learning processing, and supplies the selected correction coefficients to the correction computing unit 3556. Note that each of the correction-coefficient sets prepared beforehand is stored in the correction coefficient memory 3554 in association with one of the class codes prepared beforehand. Accordingly, in this case, the number of the correction-coefficient sets matches the number of the class codes prepared beforehand (i.e., 273 or more).

Note that description will be made later regarding the learning processing with reference to the flowchart shown in FIG. 203.

In Step S3546, the region extracting unit 3555 extracts the pixel of interest (SD pixel) from the input image and the pixels (SD pixels) at predetermined relative positions (One or more positions determined independent of those of the class taps. However, the positions of the prediction tap may match those of the class tap) away from the pixel of interest, which are used as class taps, and supplies the extracted prediction taps to the correction computing unit 3556.

Specifically, in this case, let us say that the prediction tap (set) 3641 shown in FIG. 202 is extracted. That is to say, FIG. 202 shows an example of the layout of the prediction tap.

In FIG. 202, the horizontal axis in the drawing represents the X-direction which is one spatial direction, and the vertical direction in the drawing represents the Y-direction which is another spatial direction. Note that the pixel of interest is represented by the pixel 3641-1. That is, the pixel 3641-1 is a pixel corresponding to the class tap 3621-2 (FIG. 200).

In this case, in the example shown in FIG. 200, the pixels extracted as the prediction tap (group) are 5×5 pixels 3041 (a set of pixels formed of a total of 25 pixels) with the pixel of interest 3641-1 as the center.

It is needless to say that the layout of the prediction tap employed in the present embodiment is not restricted to the example shown in FIG. 202, rather, various kinds of layouts including the pixel of interest 3641-1 may be employed.

Returning to FIG. 199, in Step S3547, the correction computing unit 3556 performs computation for the prediction taps supplied from the region extracting unit 3555 using the prediction coefficients supplied from the correction coefficient memory 3554, thereby generating subtraction predicted image (HD image). Then, the correction computing unit 3556 outputs the subtraction predicted image to the addition unit 3503 as a correction image.

More specifically, with each of the class taps supplied from the region extracting unit 3555 as $a_i$ (i represents an integer of 1 through n), and with each of the correction coefficients supplied from the correction coefficient memory 3554 as $g_i$, the correction computing unit 3556 performs computation represented by the right side of the above Expression (157), thereby calculating the HD pixel u' corresponding to the pixel of interest (SD pixel). Then, the correction computing unit 3556 outputs the calculated HD pixel to the addition unit 3503 as a pixel of the correction image (HD image), whereby the class classification adaptation correction processing ends.

Next, description will be made with reference to the flowchart shown in FIG. 203 regarding the learning processing performed by the learning device (FIG. 183), i.e., the learning processing for generating the prediction coefficients used in the class classification adaptation processing unit 3501 (FIG. 182), and the learning processing for generating the correction coefficients used in the class classification adaptation processing correction unit 3502 (FIG. 191).

In Step S3561, the class classification adaptation processing learning unit 3521 generates the prediction coefficients used in the class classification adaptation processing unit 3501.

That is to say, the class classification adaptation processing learning unit 3521 receives a certain image as a first tutor image (HD image), and generates a student image (SD image) with a reduced resolution based upon the first tutor image.

Then, the class classification adaptation processing learning unit 3521 generates the prediction coefficients which allows suitable prediction of the first tutor image (HD image) based upon the first student image (SD image) using the class classification adaptation processing, and stores the generated prediction coefficients in the coefficient memory 3514 (FIG. 182) of the class classification adaptation processing unit 3501.

Note that such processing shown in Step S3561 executed by the class classification adaptation processing learning unit 3521 will be referred to as "class classification processing learning processing" hereafter. Detailed description will be made later regarding the "class classification adaptation processing learning unit" in this case, with reference to the flowchart shown in FIG. 204.

Upon generation of the prediction coefficients used in the class classification adaptation processing unit 3501, the class classification adaptation processing correction learning unit 3561 generates the correction coefficients used in the class classification adaptation processing correction unit 3502 in Step S3562.

That is to say, the class classification adaptation processing correction learning unit 3561 receives the first tutor image, the first student image, and the learning predicted image (the image obtained by predicting the first tutor image using the prediction coefficients generated by the class classification adaptation processing learning unit 3521), from the class classification adaptation processing learning unit 3521.

Next, the class classification adaptation processing correction learning unit 3561 generates the subtraction image between the first tutor image and the learning predicted image, which is used as the second tutor image, as well as generating the feature-amount image based upon the first student image, which is used as the second student image.

Then, the class classification adaptation processing correction learning unit 3561 generates prediction coefficients which allow suitable prediction of the second tutor image (HD image) based upon the second student image (SD image) using the class classification adaptation processing, and stores the generated prediction coefficients in the correction coefficient memory 3554 of the class classification adaptation processing correction unit 3502 as the correction coefficients, whereby the learning processing ends.

Note that such processing shown in Step S3562 executed by the class classification adaptation processing correction learning unit 3561 will be referred to as "class classification adaptation processing correction learning processing" hereafter. Detailed description will be made later regarding the "class classification adaptation processing correction learning processing" in this case, with reference to the flowchart shown in FIG. 205.

Next, description will be made regarding "class classification adaptation processing learning processing (processing in Step S3561)" and "class classification adaptation processing correction learning processing (processing in Step S3562)" in this case, step by step in that order, with reference to the drawings.

First, detailed description will be made with reference to the flowchart shown in FIG. 204 regarding the "class classification adaptation processing learning processing" executed by the class classification adaptation processing learning unit 3521 (FIG. 184).

In Step S3581, the down-converter unit 3531 and the normal equation generating unit 3536 each receive a certain image as the first tutor image (HD image). Note that the first tutor image is also input to the class classification adaptation processing correction learning unit 3561, as described above.

In Step S3582, the down-converter unit 3531 performs "down-converting" processing (image conversion into a reduced-resolution image) for the input first tutor image, thereby generating the first student image (SD image). Then, the down-converter unit 3531 supplies the generated first student image to the class classification adaptation processing correction learning unit 3561, as well as to the region extracting units 3532 and 3535.

In Step S3583, the region extracting unit 3532 extracts the class taps from the first student image thus supplied, and outputs the extracted class taps to the pattern detecting unit 3533. While strictly, there is the difference (such difference will be referred to simply as "difference in input/output" hereafter) in the input/output of information to/from a block between the processing shown in Step S3583 and the aforementioned processing shown in Step S3522 (FIG. 198), the processing shown in Step S3583 is generally the same as that shown in Step S3522 described above.

In Step S3584, the pattern detecting unit 3533 detects the pattern from the supplied class taps for determining the class code, and supplies the detected pattern to the class code determining unit 3534. Note that the processing shown in Step S3584 is generally the same as that shown in Step S3523 (FIG. 198) described above, except for input/output.

In Step S3585, the class code determining unit 3534 determines the class code based upon the pattern of the class taps thus supplied, and supplies the determined class code to the region extracting unit 3535 and the normal equation generating unit 3536. Note that the processing shown in Step S3585 is generally the same as that shown in Step S3524 (FIG. 198) described above, except for input/output.

In Step S3586, the region extracting unit 3535 extracts the prediction taps from the first student image corresponding to the supplied class code, and supplies the extracted prediction taps to the normal equation generating unit 3536 and the prediction computing unit 3538. Note that the processing shown in Step S3586 is generally the same as that shown in Step S3526 (FIG. 198) described above, except for input/output.

In Step S3587, the normal equation generating unit 3536 generates a normal equation represented by the above Expression (151) (i.e., Expression (155)) based upon the prediction taps (SD pixels) supplied from the region extracting unit 3535 and the corresponding HD pixels of the HD pixels of the first tutor image (HD image), and supplies the generated normal equation to the coefficient determining unit 3537 along with the class code supplied from the class code determining unit 3534.

In Step S3588, the coefficient determining unit 3537 solves the normal equation thus supplied, thereby determining the prediction coefficients. That is to say, the coefficient determining unit 3537 computes the right side of the above Expression (156), thereby calculating the prediction coefficients. Then, the coefficient determining unit 3537 supplies the determined prediction coefficients to the prediction computing unit 3538, as well as storing the prediction coefficients in the coefficient memory 3514 in association with the class code thus supplied.

In Step S3589, the prediction computing unit 3538 performs computation for the prediction taps supplied from the region extracting unit 3535 using the prediction coefficient supplied from the coefficient determining unit 3537, thereby generating the learning predicted image (HD pixels).

Specifically, with each of the prediction taps supplied from the region extracting unit 3535 as $c_i$ (i represents an integer of 1 through n), and with each of the prediction coefficients supplied from the coefficient determining unit 3537 as $d_i$, the prediction computing unit 3538 computes the right side of the above Expression (149), thereby calculating an HD pixel q' which is employed as a pixel of the learning predicted image, and which predicts the corresponding HD pixel q of the first tutor image.

In Step S3590, determination has been made whether or not such processing has been performed for all the pixels. In the event that determination has been made that the processing has not been performed for all the pixels, the flow returns to Step S3583. That is to say, the processing in Step S3533 through 3590 is repeated until completion of the processing for all the pixels.

Then, in Step S3590, in the event that determination has been made that the processing is performed for all the pixels, the prediction computing unit 3538 outputs the learning predicted image (HD image formed of the HD pixels q' each of which has been generated for each processing in Step S3589) to the class classification adaptation processing correction learning unit 3561, whereby the class classification adaptation processing learning processing ends.

As described above, in this example, following completion of the processing for all the pixels, the learning predicted image which is an HD image that predicts the first tutor image is input to the class classification adaptation processing correction learning unit 3561. That is to say, all the HD pixels (predicted pixels) forming an image is output at the same time.

However, the present invention is not restricted to the aforementioned arrangement in which all the pixels forming an image are output at the same. Rather, an arrangement may be made in which the generated HD pixel is output to the class classification adaptation processing correction learning unit 3561 each time that the HD pixel (predicted pixel) is generated by the processing in Step S3589. With such an arrangement, the processing in Step S3591 is omitted.

Next, detailed description will be made with reference to the flowchart shown in FIG. 205 regarding "class classification adaptation processing correction learning processing" executed by the class classification adaptation processing correction learning unit 3561 (FIG. 192).

Upon reception of the first tutor image (HD image) and the learning predicted image (HD image) from the class classification adaptation processing learning unit 3521, in Step S3601, the addition unit 3571 subtracts the learning predicted image from the first tutor image, thereby generating the subtraction image (HD image). Then, the addition unit 3571 supplies the generated subtraction image to the normal equation generating unit 3578 as the second tutor image.

Upon reception of the first student image (SD image) from the class classification adaptation processing learning unit 3521, in Step S3602, the data continuity detecting unit 3572 and the actual world estimating unit 3573 generate the feature-amount image based upon the input first student image (SD image), and supply the generated feature-amount image to the region extracting units 3574 and 3577 as the second student image.

That is to say, the data continuity detecting unit 3572 detects the data continuity contained in the first student image, and outputs the detection results (angle, in this case) to the actual world estimating unit 3573 as data continuity information. Note that the processing shown in Step S3602 performed by the data continuity detecting unit 3572 is generally the same as that shown in Step S101 shown in FIG. 40 described above, except for input/output.

The actual world estimating unit 3573 generates the actual world estimation information (feature-amount image which is an SD image, in this case) based upon the angle (data continuity information) thus input, and supplies the generated actual world estimation information to the region extracting unit 3574 and 3577 as the second student image. Note that the processing shown in Step S3602 performed by the actual world estimating unit 3573 is generally the same as that shown in Step S102 shown in FIG. 40 described above, except for input/output.

Note that the present invention is not restricted to an arrangement in which the processing in Step S3601 and the processing in Step S3602 are performed in that order shown in FIG. 205. That is to say, an arrangement may be made in which the processing in Step S3602 is performed upstream the processing in Step S3601. Furthermore, the processing in Step S3601 and the processing in Step S3602 may be performed at the same time.

In Step S3603, the region extracting unit 3574 extracts the class taps from the second student image (feature-amount image) thus supplied, and outputs the extracted class taps to the pattern detecting unit 3575. Note that the processing shown in Step S3603 is generally the same as that shown in Step S3542 (FIG. 199) described above, except for input/output. That is to say, in this case, a set of pixels 3621 having a layout shown in FIG. 200 is extracted as class taps.

In Step S3604, the pattern detecting unit 3575 detects the pattern from the class taps thus supplied for determining the class code, and supplies the detected pattern to the class code determining unit 3576. Note that the processing shown in Step S3604 is generally the same as that shown in Step S3543 (FIG. 199) described above, except for input/output. That is to say, in this case, the pattern detecting unit 3575 detects at least 273 patterns at the time of completion of the learning processing.

In Step S3605, the class code determining unit 3576 determines the class code based upon the pattern of the class taps thus supplied, and supplies the class code to the region extracting unit 3577 and the normal equation generating unit 3578. Note that the processing shown in Step S3605 is generally the same as that shown in Step S3544 (FIG. 199) described above, except for input/output. That is to say, in this case, the class code determining unit 3576 determines at least 273 class codes at the time of completion of the learning processing.

In Step S3606, the region extracting unit 3577 extracts the prediction taps corresponding to the class code thus supplied, from the second student image (feature-amount image), and supplies the extracted prediction taps to the normal equation generating unit 3578. Note that the processing shown in Step S3606 is generally the same as that shown in Step S3546 (FIG. 199) described above, except for input/output. That is to say, in this case, a set of pixels 354 having a layout shown in FIG. 202 is extracted as prediction taps.

In step S3607, the normal equation generating unit 3578 generates a normal equation represented by the above Expression (160) (i.e., Expression (164)) based upon the prediction taps (SD pixels) supplied from the region extracting unit 3577 and the second tutor image (subtraction image between the first tutor image and the learning predicted image, which is an HD image), and supplies the generated normal equation to the correction coefficient determining unit 3579 along with the class code supplied from the class code determining unit 3576.

In Step S3608, the correction coefficient determining unit 3579 determines the correction coefficients by solving the normal equation thus supplied, i.e., calculates the correction coefficients by computing the right side of the above Expression (165), and stores the calculated correction coefficients associated with the supplied class code in the correction coefficient memory 3554.

In Step S3609, determination is made whether or not such processing has been performed for all the pixels. In the event that determination has been made that the processing has not been performed for all the pixels, the flow returns to Step S3603. That is to say, the processing in Step S3603 through 3609 is repeated until completion of the processing for all the pixels.

On the other hand, in Step S3609, in the event that determination has been made that the processing has been performed for all the pixels, the class classification adaptation processing correction learning processing ends.

As described above, with the class classification adaptation correction processing method, the summed image is generated by making the sum of the predicted image output from the class classification adaptation processing unit 3501 and the correction image (subtraction predicted image) output from the class classification adaptation processing correction unit 3502, and the summed image thus generated is output.

For example, let us say that the HD image 3541 shown in FIG. 185 described above is converted to a reduced-resolution image, i.e., the SD image 3542 with a reduced resolution is obtained, and the SD image 3542 thus obtained is employed as an input image. In this case, the class classification adaptation processing unit 3501 outputs the predicted image 3543 shown in FIG. 206. Then, the summed image is generated by making the sum of the predicted image 3543 and the correction image (not shown) output from the class classification adaptation processing correction unit 3502 (e.g., the predicted image 3543 is corrected using the correction image), thereby generating the output image 3651 shown in FIG. 186.

Making a comparison between the output image 3651, the predicted image 3543, and the HD image 3541 (FIG. 185) which is an original image, it has been confirmed that the output image 3651 is more similar to the HD image 3541 than the predicted image 3543.

As described above, the class classification adaptation processing correction method enables output of an image more similar to the original image (the signal in the actual world 1 which is to be input to the sensor 2), in comparison with other techniques including class classification adaptation processing.

In other words, with the class classification adaptation processing correction method, for example, the data continuity detecting unit 101 in FIG. 181 detects the data continuity contained in the input image (FIG. 181) formed of multiple pixels having the pixel values obtained by projecting the light signals in the actual world 1 shown in FIG. 181 by actions of multiple detecting elements of a sensor (e.g., the sensor 2 shown in FIG. 181), in which a part of the continuity as the light signals in the actual world has been lost due to the projection of the light signals in the actual world 1 to the pixel values by actions of the multiple detecting elements each of which has the nature of time-spatial integration effects.

For example, the actual world estimating unit 102 shown in FIG. 181 detects the actual world feature contained in the light-signal function F(x) (FIG. 190) which represents the light signals of the actual world 1 (e.g., the features corresponding to the pixel of the feature-amount image shown in FIG. 181), corresponding to the detected data continuity, thereby estimating the light signals in the actual world 1.

Specifically, for example, making an assumption that the pixel value which represents the distance (e.g., the cross-sectional direction distance Xn' shown in FIG. 195) from the line (e.g., the line 3604 in FIG. 195), which represents the data continuity thus supplied, along at least one dimensional direction represents the at least one-dimensional integration effects which have affected the corresponding pixel, the actual world estimating unit 102 approximates the light-signal function F(x) with the approximate function $f_5(x)$ shown in FIG. 193, for example, and detects the intra-pixel gradient (e.g., grad in the above Expression (168), and the coefficient w1' of x in Expression (167)) which is the gradient of the approximate function $f_5(x)$ around the corresponding pixel (e.g., the pixel 3603 in FIG. 195) as the actual-world features, thereby estimating the light signals in the actual world 1.

Then, for example, the image generating unit 103 shown in FIG. 181 predicts and generates an output image (FIG. 181) with higher quality than the input image based upon the actual world features detected by the actual world estimating means.

Specifically, at the image generating unit 103, for example, the class classification adaptation processing unit 3501 in FIG. 181 predicts the pixel value of the pixel of interest (e.g., the pixel of the predicted image shown in FIG. 181, and q' in the above Expression (158)) based upon the pixel values of multiple pixels around the pixel of interest in the input image in which a part of continuity as the light signal in the actual world has been lost.

On the other hand, for example, the class classification adaptation processing correction unit 3502 shown in FIG. 181 predicts the correction term (e.g., the pixel of the correction image (subtraction predicted image) shown in FIG. 181, and u' in Expression (158)) based upon the feature-amount image (actual world estimation information) supplied from the actual world estimating unit 102 shown in FIG. 181 for correcting the pixel value of the pixel of interest of the predicted image predicted by the class classification adaptation processing unit 3501.

Then, for example, the addition unit 3503 shown in FIG. 181 corrects the pixel value of the pixel of interest of the predicted image predicted by the class classification adaptation processing unit 3501 using the correction term predicted by the class classification adaptation processing unit 3501 (e.g., computation represented by Expression (158)).

Also, examples of components provided for the class classification adaptation processing correction method include: the class classification adaptation processing learning unit 3521 shown in FIG. 183 for determining the prediction coefficients by learning, stored in the coefficient memory 3514 shown in FIG. 182; and the learning device 3504 shown in FIG. 183 including the class classification adaptation processing correction learning unit 3561 shown in FIG. 183 for determining the correction coefficients by learning, stored in the correction coefficient memory 3554 shown in FIG. 191.

Specifically, for example, the class classification adaptation processing learning unit 3521 shown in FIG. 184 includes: the down-converter unit 3531 for performing down-converting processing for the learning image data; the coefficient determining unit 3537 for generating the prediction coefficients by learning the relation between the first tutor image and the first student image with the learning image data as the first tutor image and with the learning image data subjected to down-converting processing by the down-converter unit 3531 as the first student image; and the region extracting unit 3532 through the normal equation generating unit 3536.

The class classification adaptation processing learning unit 3521 further comprises a prediction computing unit 5358 for generating a learning prediction image as image date for predicting the first tutor image from the first student image, using the prediction coefficient generated (determined) by the coefficient determining unit 5357, for example.

On the other hand, for example, the class classification adaptation processing correction learning unit 3561 shown in FIG. 192 includes: the data continuity detecting unit 3572 and the actual world estimating unit 3573 for detecting the data continuity in the first student image, detecting the actual-world features corresponding to each pixel of the first student image based upon the data continuity thus detected, and generating the feature-amount image (specifically, the feature-amount image 3591 shown in FIG. 194, for example) with the value corresponding to the detected actual-world feature as the pixel value, which is employed as the second student image (e.g., the second student image in FIG. 192); the addition unit 3571 for generating the image data (subtraction image) between the first student image and the learning predicted image, which is used as the second tutor image; the correction coefficient determining unit 3579 for generating the correction coefficients by learning the relation between the second tutor image and the second student image; and the region extracting unit 3574 through the normal equation generating unit 3578.

Thus, the class classification adaptation processing correction method enables output of an image more similar to the original image (the signal in the actual world 1 which is to be input to the sensor 2) as compared with other conventional methods including the class classification adaptation processing.

Note that the difference between the class classification adaptation processing and the simple interpolation processing is as follows. That is to say, the class classification adaptation processing enables reproduction of the components contained in the HD image, which have been lost in the SD image, unlike the simple interpolation. That is to say, as long as referring to only the above Expressions (149) and (157), the class classification adaptation processing looks like the same as the interpolation processing using a so-called interpolation filter. However, with the class classification adaptation processing, the prediction coefficients $d_i$ and the correction coefficients $g_i$ corresponding to the coefficients of the interpolation filter are obtained by learning based upon the tutor data and the student data (the first tutor image and the first student image, or the second tutor image and the second student image), thereby reproducing the components contained in the HD image. Accordingly, the class classification adaptation processing described above can be said as the processing having a function of improving the image quality (improving the resolution).

While description has been made regarding an arrangement having a function for improving the spatial resolution, the class classification adaptation processing employs various kinds of coefficients obtained by performing learning with suitable kinds of the tutor data and the student data, thereby enabling various kinds of processing for improving S/N (Signal to Noise Ratio), improving blurring, and so forth.

That is to say, with the class classification adaptation processing, the coefficients can be obtained with an image having a high S/N as the tutor data and with the image having a reduced S/N (or reduced resolution) generated based upon the tutor data as the student data, for example, thereby improving S/N (or improving blurring).

While description has been made regarding the image processing device having a configuration shown in FIG. 3 s an arrangement according to the present invention, an arrangement according to the present invention is not restricted to the arrangement shown in FIG. 3, rather, various modification may be made. That is to say, an arrangement of the signal processing device 4 shown in FIG. 1 is not restricted to the arrangement shown in FIG. 3, rather, various modification may be made.

For example, the signal processing device having such a configuration shown in FIG. 3 performs signal processing based upon the data continuity contained in the signal in the actual world 1 serving as an image. Thus, the signal processing device having such a configuration shown in FIG. 3 can perform signal processing with high precision for the region where continuity is available for the signal in the actual world 1, as compared with the signal processing performed by other signal processing devices, thereby outputting image data more similar to the signal in the actual world 1, as a result.

However, the signal processing device having such a configuration shown in FIG. 3 executes signal processing based upon continuity, and accordingly, cannot execute signal processing with the same precision for the region where clear continuity of the signal in the actual world 1 is unavailable as processing for the region where continuity is present, leading to output image data containing an error as to the signal in the actual world 1.

Accordingly, an arrangement may be made further including another device (or program) for performing signal processing which does not employ continuity, in addition to the configuration of the signal processing device shown in FIG. 3. With such an arrangement, the signal processing device having the configuration shown in FIG. 3 executes signal processing for the region where continuity is available for the signal in the actual world 1. On the other hand, the additional device (or program or the like) executes the signal processing for the region where clear continuity is unavailable for the signal in the actual world 1. Note that such an arrangement will be referred to as "hybrid method" hereafter.

Description will be made below with reference to FIG. 207 through FIG. 220 regarding five specific hybrid method (which will be referred to as "first hybrid method" through "fifth hybrid method" hereafter).

Note that each function of the signal processing device employing such a hybrid method may be realized by either of hardware and software. That is to say, the block diagrams shown in FIG. 207 through FIG. 209, FIG. 213, FIG. 215, FIG. 217, and FIG. 219, may be regarded to be either of hardware block diagrams or as software block diagrams.

FIG. 207 shows a configuration example of a signal processing device to which the first hybrid method is applied.

With the signal processing device shown in FIG. 207, upon reception of the image data which an example of the data 3 (FIG. 1), image processing as described later is performed based upon the input image data (input image) so as to generate an image, and the generated image (output image) is output. That is to say, FIG. 207 is a diagram which shows a configuration of the image processing device 4 (FIG. 1) which is an image processing device.

The input image (image data which is an example of the data 3) input to the image processing device 4 is supplied to a data continuity detecting unit 4101, an actual world estimating unit 4102, and an image generating unit 4104.

The data continuity detecting unit 4101 detects the data continuity from the input image, and supplies data continuity information which indicates the detected continuity to the actual world estimating unit 4102 and the image generating unit 4103.

As described above, the data continuity detecting unit 4101 has basically the same configuration and functions as with the data continuity detecting unit 101 shown in FIG. 3. Accordingly, the data continuity detecting unit 4101 may have various kinds of configurations described above.

Note that the data continuity detecting unit 4101 further has a function for generating information for specifying the region of a pixel of interest (which will be referred to as "region specifying information" hereafter), and supplies the generated information to a region detecting unit 4111.

The region specifying information used here is not restricted in particular, rather, an arrangement may be made in which new information is generated after the time that the data continuity information has been generated, or an arrangement may be made in which such information is generated as accompanying information of the data continuity information at the same time.

Specifically, an estimation error may be employed as the region specifying information, for example. That is to say, for example, the estimation error is obtained as accompanying information at the time of the data continuity detecting unit 4101 computing the angle employed as the data continuity information using the least square method. The estimation error may be employed as the region specifying information.

The actual world estimating unit 4102 estimates the signal in the actual world 1 (FIG. 1) based upon the input image and the data continuity information supplied from the data continuity detecting unit 4101. That is to say, the actual world estimating unit 4102 estimates the image which is the signal in the actual world 1, and which is to be input to the sensor 2 (FIG. 1) in the stage where the input image has been acquired. The actual world estimating unit 4102 supplies the actual world estimating information to the image generating unit 4103 for indicating the estimation results of the signal in the actual world 1.

As described above, the actual world estimating unit 4102 has basically the same configuration and functions as with the actual world estimating unit 102 shown in FIG. 3. Accordingly, the actual world estimating unit 4102 may have various kinds of configurations as described above.

The image generating unit 4103 generates a signal similar to the signal in the actual world 1 based upon the actual world estimation information indicating the estimated signal in the actual world 1 supplied from the actual world estimating unit 4102, and supplies the generated signal to a selector 4112. Alternatively, the image generating unit 4103 generates a signal closer to the signal of the actual world 1 based upon: the data continuity information for indicating the estimated signal in the actual world 1 supplied from the data continuity detecting unit 4101; and the actual world estimation information supplied from the actual world estimating unit 4102, and supplies the generated signal to the selector 4112.

That is to say, the image generating unit 4103 generates an image similar to the image of the actual world 1 based upon the actual world estimation information, and supplies the generated image to the selector 4112. Alternatively, the image generating unit 4103 generates an image more similar to the image of the actual world 1 based upon the data continuity information and the actual world estimation information, and supplies the generated image to the selector 4112.

As described above, the image generating unit 4103 has basically the same configuration and functions as with the image generating unit 103 shown in FIG. 3. Accordingly, the image generating unit 4103 may have various kinds of configurations as described above.

The image generating unit 4104 performs predetermined image processing for the input image so as to generate an image, and supplies the generated image to the selector 4112.

Note that the image processing executed by the image generating unit 4104 is not restricted in particular as long as employing the image processing other than those employed in the data continuity detecting unit 4101, the actual world estimating unit 4102, and the image generating unit 4103.

For example, the image generating unit 4104 can perform conventional class classification adaptation processing. FIG. 208 shows an configuration example of the image generating unit 4104 for executing the class classification adaptation processing. Note that detailed description with reference to FIG. 208 will be made later, i.e., detailed description will be made later regarding the image generating unit 4104 for executing the class classification processing. Also, description will be made later regarding the class classification adaptation processing at the same time as with description with reference to FIG. 208.

A continuity region detecting unit 4105 includes a region detecting unit 4111 and a selector 4112.

The region detecting unit 4111 detects whether the image (pixel of interest) supplied to the selector 4112 belongs to the continuity region or non-continuity region based upon the region specifying information supplied from the data continuity detecting unit 4101, and supplies the detection results to the selector 4112.

Note that the region detection processing executed by the region detecting unit 4111 is not restricted in particular. For example, the aforementioned estimation error may be supplied as the region specifying information. In this case, an arrangement may be made in which in a case that the estimation error thus supplied is smaller than a predetermined threshold, the region detecting unit 4111 determines that the pixel of interest of the input image belongs to the continuity region, and in a case that the estimation error thus supplied is greater than the predetermined threshold, determination is made that the pixel of interest of the input image belongs to the non-continuity region.

The selector 4112 selects one of the image supplied from the image generating unit 4103 and the image supplied from the image generating unit 4104 based upon the detection results supplied from the region detecting unit 4111, and externally outputs the selected image as an output image.

That is to say, in a case that the region detecting unit 4111 has determined that the pixel of interest belongs to the continuity region, the selector 4112 selects the image supplied from the image generating unit 4103 (pixel corresponding to the pixel of interest of the input image, generated by the image generating unit 4103) as an output image.

On the other hand, in a case that the region detecting unit 4111 has determined that the pixel of interest belongs to the non-continuity region, the selector 4112 selects the image supplied from the image generating unit 4104 (pixel corresponding to the pixel of interest of the input image, generated by the image generating unit 4104) as an output image.

Note that the selector 4112 may output an output image in increments of a pixel (i.e., may output an output image for each selected pixel), or an arrangement may be made in which the pixels subjected to the processing are stored until completion of the processing for all the pixels, and all the pixels are output at the same time (with the entire output image at once) when the processing of all the pixels is completed.

Next, detailed description will be made regarding the image generating unit 4104 for executing the class classification adaptation processing which is an example of image processing with reference to FIG. 208.

In FIG. 208, let us say that the class classification adaptation processing executed by the image generating unit 4104 is processing for improving the spatial resolution of an input image, for example. That is to say, let us say that the class classification adaptation processing is processing for converting an input image with a standard resolution into a predicted image which is an image with a high resolution.

Note that the image having a standard resolution will be referred to as "SD (Standard Definition) image" hereafter as appropriate, and the pixel making up the SD image will be referred to as "SD pixel" as appropriate.

On the other hand, the image having a high resolution will be referred to as "HD (High Definition) image" hereafter as appropriate, and the pixel making up the HD image will be referred to as "HD pixel" as appropriate.

Specifically, the class classification adaptation processing executed by the image generating unit 4104 is as follows.

That is to say, in order to obtain the HD pixel of the predicted image (HD image) corresponding to the pixel of interest (SD pixel) of the input image (SD image), first, the features is obtained for the SD pixels formed of the pixel of interest and the pixels therearound (Such SD pixels will be also referred to as "class taps" hereafter), and the class is identified for each class tap based upon the features thereof by selecting one from the classes prepared beforehand in association with the features (i.e., the class code of the class-tap set is identified).

Then, product-sum is computed using: the coefficients of the one selected from the multiple coefficient sets prepared beforehand (each coefficient set corresponds to a certain class code) based upon the identified class code; and the SD pixels formed of the pixel of interest and the SD pixels therearound (Such SD pixels of the input image will be also referred to as "prediction taps" hereafter. Note that the prediction taps may match the class taps), thereby obtaining the HD pixel of the predicted image (HD image) corresponding to the pixel of interest (SD pixel) of the input image (SD image).

More specifically, in FIG. 1, upon input of the signal in the actual world 1 (light-intensity distribution) to the sensor 2, the sensor 2 outputs an input image.

In FIG. 208, the input image (SD image) is supplied to region extracting units 4121 and 4125 of the image generating unit 4104. The region extracting unit 4125 extracts class taps (SD pixels positioned at a predetermined region including the pixel of interest (SD pixel)) necessary for class classification, from the input image thus supplied, and outputs the extracted class taps to a pattern detecting unit 4122. The pattern detecting unit 4122 detects the pattern of the input image based upon the class taps thus input.

The class code determining unit 4123 determines the class code based upon the pattern detected by the pattern detecting unit 4122, and outputs the determined class code to coefficient memory 4124 and the region extracting unit 4125. The coefficient memory 4124 stores the coefficients for each class code obtained by learning. The coefficient memory 4124 reads out the coefficients corresponding to the class code input from the class code determining unit 4123, and outputs the coefficients thus read, to a prediction computing unit 4126.

Note that description will be made later regarding the learning processing for obtaining the coefficients stored in the coefficient memory 4124 with reference to the block diagram of the learning device shown in FIG. 209.

Note that the coefficients stored in the coefficient memory 4124 are used for generating the predicted image (HD image) as described later. Accordingly, the coefficients stored in the coefficient memory 4124 will be referred to as "prediction coefficients" hereafter.

The region extracting unit 4125 extracts the prediction taps (SD pixels positioned at a predetermined region including the pixel of interest) necessary for predicting and generating the predicted image (HD image), from the input image (SD image) input from the sensor 2 based upon the class code input from the class code determining unit 4123 in response to the class code, and outputs the extracted prediction taps to the prediction computing unit 4126.

The prediction computing unit 4126 executes product-sum computation using the prediction taps input from the region extracting unit 4125 and the prediction coefficients input from the coefficient memory 4124, thereby generating the HD pixel of the predicted image (HD image) corresponding to the pixel of interest (SD pixel) of the input image (SD image). Then, the prediction computing unit 4126 outputs the generated HD pixel to the selector 4112.

More specifically, the coefficient memory 4124 outputs the prediction coefficients corresponding to the class code supplied from the class code determining unit 4123 to the prediction computing unit 4126. The prediction computing unit 4126 executes product-sum computation represented by the following Expression (171) using: the prediction taps extracted from the pixel value in a predetermined pixel region of the input image supplied from the region extracting unit 4125; and the prediction coefficients supplied from the coefficient memory 4124, thereby obtaining (i.e., predicting and estimating) the HD pixel corresponding to the predicted image (HD image).

$$q' = \sum_{i=0}^{n} d_i \times c_i \tag{171}$$

In Expression (171), q' represents the HD pixel of the predicted image (HD image). Each of $c_i$ (i represents an integer of 1 through n) represents the corresponding prediction tap (SD pixel). On the other hand, each of $d_i$ represents the corresponding prediction coefficient.

As described above, the image generating unit 4104 predicts and estimates the corresponding HD image based upon the SD image (input image), and accordingly, in this case, the HD image output from the image generating unit 4104 is referred to as a "predicted image".

FIG. 209 shows a learning device (device for calculating the prediction coefficients) for determining such prediction coefficients ($d_i$ in Expression (171)) stored in the coefficient memory 4124 of the image generating unit 4104.

In FIG. 209, a certain image is input to a down-converter unit 4141 and a normal equation generating unit 4146 as a tutor image (HD image).

The down-converter unit 4146 generates a student image (SD image) with a lower resolution than the input tutor image (HD image) based upon the tutor image thus input (i.e., performs down-converting processing for the tutor image, thereby obtaining a student image), and outputs the generated student image to region extracting units 4142 and 4145.

As described above, a learning device 4131 includes the down-converter unit 4141, and accordingly, there is no need to prepare a higher-resolution image as the tutor image (HD image), corresponding to the input image from the sensor 2 (FIG. 1). The reason is that the student image (with a reduced resolution) obtained by performing the down-converting processing for the tutor image may be employed as an SD image. In this case, the tutor image corresponding to the student image may be employed as an HD image. Accordingly, the input image from the sensor 2 may be employed as the tutor image without any conversion.

The region extracting unit 4142 extracts the class taps (SD pixels) necessary for class classification, from the student image (SD image) supplied from the down-converter unit 4141, and outputs the extracted class taps to a pattern detecting unit 4143. The pattern detecting unit 4143 detects the pattern of the class taps thus input, and outputs the detection results to a class code determining unit 4144. The class code determining unit 4144 determines the class code corresponding to the input pattern, and outputs the determined class code to the region extracting unit 4145 and the normal equation generating unit 4146, respectively.

The region extracting unit 4145 extracts the prediction taps (SD pixels) from the student image (SD image) input from the down-converter unit 4141, based upon the class code input from the class code determining unit 4144, and outputs the extracted prediction taps to the normal equation generating unit 4146.

Note that the aforementioned region extracting unit 4142, the pattern detecting unit 4143, the class code determining unit 4144, and the region extracting unit 4145, have basically the same configurations and functions as with the region extracting unit 4121, the pattern detecting unit 4122, the class code determining unit 4123, and the region extracting unit 4125, of the image generating unit 4104 shown in FIG. 208, respectively.

The normal equation generating unit 4146 generates a normal equation for each of all the class codes input from the class code determining unit 4144 based upon the prediction taps (SD pixels) of the student image (SD image) input from the region extracting unit 4145 and the HD pixels of the tutor image (HD image) for each class code, and supplies the generated normal equation to a coefficient determining unit 4147.

Upon reception of the normal equation corresponding to a certain class code from the normal equation generating unit 4146, the coefficient determining unit 4147 computes the prediction coefficients using the normal equation, and stores the computed prediction coefficients in the coefficient memory 4142 in association with the class code.

Now, detailed description will be made regarding the normal equation generating unit 4146 and the coefficient determining unit 4147.

In the above Expression (171), each of the prediction coefficients $d_i$ is undetermined before learning. The learning processing is performed by inputting the multiple HD pixels of the tutor image (HD image) for each class code. Let us say that there are m HD pixels corresponding to a certain class code. In this case, with the m HD pixels as $q_k$ (k represents an integer of 1 through m), the following Expression (172) is introduced from the Expression (171).

$$q_k = \sum_{i=0}^{n} d_i \times c_{ik} + e_k \tag{172}$$

That is to say, the Expression (172) indicates that a certain HD pixel $q_k$ can be predicted and estimated by executing computation represented by the right side thereof. Note that in Expression (172), $e_k$ represents an error. That is to say, the HD pixel $q_k'$ of the predicted image (HD image) obtained as computation results by computing the right side does not exactly match the actual HD pixel $q_k$, but contains a certain error $e_k$.

With the present embodiment, the prediction coefficients $d_i$ are obtained by learning processing such that the sum of squares of the errors $e_k$ shown in Expression (172) exhibits the minimum, thereby obtaining the optimum prediction coefficients $d_i$ for predicting the actual HD pixel $q_k$.

Specifically, with the present embodiment, the optimum prediction coefficients $d_i$ are determined as a unique solution by learning processing using the least square method based upon the m HD pixels $q_k$ (wherein m is an integer greater than n) collected by learning, for example.

That is to say, the normal equation for obtaining the prediction coefficients $d_i$ in the right side of Expression (172) using the least square method is represented by the following Expression (173).

$$\begin{bmatrix} \sum_{k=1}^{m} c_{1k} \times c_{1k} & \sum_{k=1}^{m} c_{1k} \times c_{2k} & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \sum_{k=1}^{m} c_{2k} \times c_{nk} \\ \vdots & \vdots & \ddots & \vdots \\ \sum_{k=1}^{m} c_{nk} \times c_{1k} & \sum_{k=1}^{m} c_{nk} \times c_{2k} & \cdots & \sum_{k=1}^{m} c_{nk} \times c_{nk} \end{bmatrix} \begin{bmatrix} d_1 \\ d_2 \\ \vdots \\ d_n \end{bmatrix} = \begin{bmatrix} \sum_{k=1}^{m} c_{1k} \times q_k \\ \sum_{k=1}^{m} c_{2k} \times q_k \\ \vdots \\ \sum_{k=1}^{m} c_{nk} \times q_k \end{bmatrix} \quad (173)$$

That is to say, with the present embodiment, the normal equation represented by Expression (173) is generated and solved, thereby determining the prediction coefficients $d_i$ as a unique solution.

Specifically, with the component matrices forming the normal equation represented by Expression (173) defined as the matrices represented by Expressions (174) through (176), the normal equation is represented by the following Expression (177).

$$C_{MAT} = \begin{bmatrix} \sum_{k=1}^{m} c_{1k} \times c_{1k} & \sum_{k=1}^{m} c_{1k} \times c_{2k} & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \sum_{k=1}^{m} c_{2k} \times c_{nk} \\ \vdots & \vdots & \ddots & \vdots \\ \sum_{k=1}^{m} c_{nk} \times c_{1k} & \sum_{k=1}^{m} c_{nk} \times c_{2k} & \cdots & \sum_{k=1}^{m} c_{nk} \times c_{nk} \end{bmatrix} \quad (174)$$

$$D_{MAT} = \begin{bmatrix} d_1 \\ d_2 \\ \vdots \\ d_n \end{bmatrix} \quad (175)$$

$$Q_{MAT} = \begin{bmatrix} \sum_{k=1}^{m} c_{1k} \times q_k \\ \sum_{k=1}^{m} c_{2k} \times q_k \\ \vdots \\ \sum_{k=1}^{m} c_{nk} \times q_k \end{bmatrix} \quad (176)$$

$$C_{MAT} D_{MAT} = Q_{MAT} \quad (177)$$

As can be understood from Expression (175), each component of the matrix $D_{MAT}$ is the prediction coefficient $d_i$ which is to be obtained. With the present embodiment, in the event that the matrix $C_{MAT}$, which is the left side of Expression (177), and the matrix $Q_{MAT}$, which is the right side thereof, are determined, the matrix $D_{MAT}$ (i.e., prediction coefficient $d_i$) with the matrix solution method.

More specifically, as can be understood from Expression (174), each component of the matrix $C_{MAT}$ can be calculated as long as the prediction taps $c_{ik}$ are known. The prediction taps $c_{ik}$ are extracted by the region extracting unit 4145. With the present embodiment, the normal equation generating unit 4146 can compute each component of the matrix $C_{MAT}$ using the prediction tap $c_{ik}$ supplied from the region extracting unit 4145.

On the other hand, as can be understood from Expression (176), each component of the matrix $Q_{MAT}$ can be calculated as long as the prediction taps $c_{ik}$ and the HD pixels $q_k$ are known. Note that the prediction taps $C_{ik}$ are the same as those used in the matrix $C_{MAT}$, and the HD pixel $q_k$ is the HD pixel of the tutor image corresponding to the pixel of interest (SD pixel of the student image) included in the prediction taps $c_{ik}$. With the present embodiment, the normal equation generating unit 4146 can compute each component of the matrix $Q_{MAT}$ using the prediction taps $c_{ik}$ supplied from the region extracting unit 4145 and the tutor image.

As described above, the normal equation generating unit 4146 computes each component of the matrix $C_{MAT}$ and each component of the matrix $Q_{MAT}$ for each class code, and supplies the computation results to the coefficient determining unit 4147 in association with the class code.

The coefficient determining unit 4147 computes the prediction coefficients $d_i$ each of which is the component of the matrix $D_{MAT}$ represented by the above Expression (177) based upon the normal equation corresponding to a certain class code supplied.

Specifically, the normal equation represented by the above Expression (177) is transformed as represented by the following Expression (178).

$$D_{MAT} = C_{MAT}^{-1} Q_{MAT} \quad (178)$$

In Expression (178), each component of the matrix $D_{MAT}$ on the left side thereof is the prediction coefficient $d_i$ which is to be obtained. Note that each component of the matrix $C_{MAT}$ and each component of the matrix $Q_{MAT}$ are supplied from the normal equation generating unit 4146. With the present embodiment, upon reception of each component of the matrix $C_{MAT}$ and each component of the matrix $Q_{MAT}$ corresponding to a certain class code from the normal equation generating unit 4146, the coefficient determining unit 4147 computes matrix computation represented by the right side of Expression (178) so as to calculate the Matrix DAT, and stores the computation results (prediction coefficients $d_i$) in the coefficient memory 4124 in association with the class code.

Note that as described above, the difference between the class classification adaptation processing and the simple interpolation processing is as follows. That is to say, the class classification adaptation processing enables reproduction of the component signals contained in the HD image, which have been lost in the SD image, unlike the simple interpolation, for example. That is to say, as long as referring to only the above Expression (171), the class classification adaptation processing looks like the same as the interpolation processing using a so-called interpolation filter. However, with the class classification adaptation processing, the prediction coefficients $d_i$ corresponding to the coefficients of the interpolation filter are obtained by learning based upon the tutor data and the student data, thereby reproducing the components contained in the HD image. Accordingly, the class classification adaptation processing described above can be said as the processing having a function of improving the image quality (improving the resolution).

While description has been made regarding an arrangement having a function for improving the spatial resolution, the class classification adaptation processing employs various kinds of coefficients obtained by performing learning with suitable kinds of the tutor data and the student data, thereby enabling various kinds of processing for improving S/N (Signal to Noise Ratio), improving blurring, and so forth.

That is to say, with the class classification adaptation processing, the coefficients can obtained with image data having a high S/N as the tutor data and with the image having a reduced S/N (or reduced resolution) generated based upon the tutor image as the student image, for example, thereby improving S/N (or improving blurring).

The above is description regarding the configurations of the image generating unit 4104 and the learning device 4131 thereof for executing the class classification adaptation processing.

Note that while the image generating unit 4104 may have a configuration for executing image processing other than the class classification adaptation processing as described above, description will be made regarding the image generating unit 4104 having the same configuration as shown in FIG. 208 described above for convenience of description. That is to say, let us say that the image generating unit 4104 executes the class classification adaptation processing so as to generate an image with higher spatial resolution than the input image, and supplies the generated image to the selector 4112.

Next, description will be made regarding signal processing performed by the signal processing device (FIG. 207) employing the first hybrid method with reference to FIG. 210.

Let us say that with the present embodiment, the data continuity detecting unit 4101 computes angle (angle between: the continuity direction (which is one spatial direction) around the pixel of interest of the image, which represents the signal in the actual world 1 (FIG. 1); and X-direction which is another spatial direction (the direction parallel with a certain side of the detecting element of the sensor 2), using the least square method, and outputs the computed angle as data continuity information.

Also, the data continuity detecting unit 4101 outputs the estimation error (error of the computation using the least square method) calculated as accompanying computation results at the time of computation of the angle, which is used as the region specifying information.

In FIG. 1, upon input of the signal, which is an image, in the actual world 1 to the sensor 2, the input image is output from the sensor 2.

As shown in FIG. 207, the input image is input to the image generating unit 4104, as well as to the data continuity detecting unit 4101, and the actual world estimating unit 4102.

Then, in Step S4101 shown in FIG. 210, the image generating unit 4104 executes the aforementioned class classification adaptation processing with a certain SD pixel of the input image (SD image) as the pixel of interest, thereby generating the HD pixel (HD pixel corresponding to the pixel of interest) of the predicted image (HD image). Then, the image generating unit 4104 supplies the generated HD pixel to the selector 4112.

Note that in order to distinguish between the pixel output from the image generating unit 4104 and the pixel output from the image generating unit 4103, the pixel output from the image generating unit 4104 will be referred to as a "first pixel", and the pixel output from the image generating unit 4103 will be referred to as a "second pixel", hereafter.

Also, such processing executed by the image generating unit 4104 (the processing in Step S4101, in this case) will be referred to as "execution of the class classification adaptation processing" hereafter. Detailed description will be made later regarding an example of the "execution of class classification adaptation processing" with reference to the flowchart shown in FIG. 211.

On the other hand, in Step S4102, the data continuity detecting unit 4101 detects the angle corresponding to the continuity direction, and computes the estimation error thereof. The detected angle is supplied to the actual world estimating unit 4102 and the image generating unit 4103 as the data continuity information respectively. On the other hand, the computed estimation error is supplied to the region detecting unit 4111 as the region specifying information.

In Step S4103, the actual world estimating unit 4102 estimates the signal in the actual world 1 based upon the angle detected by the data continuity detecting unit 4101 and the input image.

Note that the estimation processing executed by the actual world estimating unit 4102 is not restricted in particular as described above, rather, various kinds of techniques may be employed as described above. Let us say that the actual world estimating unit 4102 approximates the function F (which will be referred to as "light-signal function F" hereafter) which represents the signal in the actual world 1, using a predetermined function f (which will be referred to as "approximate function f" hereafter), thereby estimating the signal (light-signal function F) in the actual world 1.

Also, let us say that the actual world estimating unit 4102 supplies the features (coefficients) of the approximate function f to the image generating unit 4103 as the actual world estimation information, for example.

In Step S4104, the image generating unit 4103 generates the second pixel (HD pixel) based upon the signal in the actual world 1 estimated by the actual world estimating unit 4102, corresponding to the first pixel (HD pixel) generated with the class classification adaptation processing performed by the image generating unit 4104, and supplies the generated second pixel to the selector 4112.

With such a configuration, the features (coefficients) of the approximate function f is supplied from the actual world estimating unit 4102. Then, the image generating unit 4103 calculates the integration of the approximate function f over a predetermined integration range based upon the features of the approximate function f thus supplied, thereby generating the second pixel (HD pixel), for example.

Note that the integration range is determined so as to generate the second pixel with the same size (same resolution) as with the first pixel (HD pixel) output from the image generating unit 4104. That is to say, the integration range is determined to be a range along the spatial direction with the same width as that of the second pixel which is to be generated.

Note that the order of steps according to the present invention is not restricted to an arrangement shown in FIG. 210 in which the "execution of class classification adaptation processing" in Step S4101 and a series of processing in Step S4102 through Step S4104 are executed in that order, rather, an arrangement may be made in which the series of processing in Step S4102 through Step S4104 is executed prior to the "execution of class classification adaptation processing" in Step S4101. Also, an arrangement may be made in which the "execution of class classification adaptation processing" in Step S4101 and a series of processing in Step S4102 through Step S4104 are executed at the same time.

In Step S4105, the region detecting unit 4111 detects the region of the second pixel (HD pixel) generated with the processing in Step S4104 performed by the image generating unit 4103 based upon the estimation error (region specifying information) computed with the processing in Step S4102 performed by the data continuity detecting unit 4101.

Here, the second pixel is an HD pixel corresponding to the SD pixel of the input image, which has been used as the pixel of interest by the data continuity detecting unit 4101. Accordingly, the type (continuity region or non-continuity region) of the region is the same between the pixel of interest (SD pixel of the input image) and the second pixel (HD pixel).

Note that the region specifying information output from the data continuity detecting unit 4101 is the estimation error calculated at the time of calculation of the angle around the pixel of interest using the least square method.

With such a configuration, the region detecting unit 4111 makes comparison between the estimation error with regard to the pixel of interest (SD pixel of the input image) supplied from the data continuity detecting unit 4101 and a predetermined threshold. As a result of comparison, in the event that the estimation error is less than the threshold, the region detecting unit 4111 detects that the second pixel belongs to the continuity region. On the other hand, in the event that the estimation error is equal to or greater than the threshold, the region detecting unit 4111 detects that the second pixel belongs to the non-continuity region. Then, the detection results are supplied to the selector 4112.

Upon reception of the detection results from the region detecting unit 4111, the selector 4112 determines whether or not the detected region belongs to the continuity region in Step S4106.

In Step S4106, in the event that determination has been made that the detected region belongs to the continuity region, the selector 4112 externally outputs the second pixel supplied from the image generating unit 4103 as an output image in Step S4107.

On the other hand, in Step S4106, in the event that determination has been made that the detected region does not belong to the continuity region (i.e., belongs to the non-continuity region), the selector 4112 externally outputs the first pixel supplied from the image generating unit 4104 as an output image in Step S4108.

Subsequently, in Step S4109, determination is made whether or not the processing has been performed for all the pixels. In the event that determination has been made that the processing has not been performed for all the pixels, the processing returns to Step S4101. That is to say, the processing in Step S4101 through S4109 is repeated until completion of the processing for all the pixels.

On the other hand, in Step S4109, in the event that determination has been made that the processing has been performed for all the pixels, the processing ends.

As described above, with an arrangement shown in the flowchart in FIG. 210, the output image selected from the first pixel and the second pixel is output in increments as an output image of a pixel each time that the first pixel (HD pixel) and the second pixel (HD pixel) are generated.

However, as described above, the present invention is not restricted to such an arrangement in which the output data is output in increments of a pixel, rather, an arrangement may be made in which the output data is output in the form of an image, i.e., the pixels forming the image are output at the same time as an output image, each time that the processing has been made for all the pixels. Note that with such an arrangement, each of Step S4107 and Step S4108 further includes additional processing for temporarily storing the pixels (first pixels or second pixels) in the selector 4112 instead of outputting the pixel each time that the pixel is generated, and outputting all the pixels at the same time after the processing in Step S4109.

Next, the details of the "processing for executing class classification processing" which the image generating unit 4104 of which the configuration is shown in FIG. 208 executes will be described with reference to the flowchart in FIG. 211 (e.g., processing in step S4101 in FIG. 210 described above).

Upon an input image (SD image) being input to the image generating unit 4104 from the sensor 2, in step S4121 the region extracting unit 4121 and region extracting unit 4125 each input the input image.

In step S4122, the region extracting unit 4121 extracts from the input image a pixel of interest (SD pixel) and pixels (SD pixels) at positions each at relative positions as to the pixel of interest set beforehand (one or more positions), as a class tap, and supplies this to the pattern detecting unit 4122.

In step S4123, the pattern detecting unit 4122 detects the pattern of the supplied class tap, and supplies this to the class code determining unit 4123.

In step S4124, the class code determining unit 4123 determines a class code from multiple class codes set beforehand, which matches the pattern of the class tap that has been supplied, and supplies this to each of the coefficient memory 4124 and region extracting unit 4125.

In step S4125, the coefficient memory 4124 reads out a prediction coefficient (group) to be used, from multiple prediction coefficients (groups) determined by learning processing beforehand, based on the class code that has been supplied, and supplies this to the prediction computing unit 4126.

Note that learning processing will be described later with reference to the flowchart in FIG. 212.

In step S4126, the region extracting unit 4125 extracts, as a prediction tap, from the input image corresponding to the class code supplied thereto a pixel of interest (SD pixel) and pixels (SD pixels) at positions each at relative positions as to the pixel of interest set beforehand (One or more positions, being positions set independently from the position of the class tap. However, may be the same position as the class tap), and supplies this to the prediction computing unit 4126.

In step S4127, the prediction computing unit 4126 computes the prediction tap supplied from the region extracting unit 4125, using the prediction coefficient supplied from the coefficient memory 4124, and generates a prediction image (first pixel) which is externally (in the example in FIG. 207, the selector 4112) output.

Specifically, the prediction computing unit 4126 takes each prediction tap supplied from the region extracting unit 4125 as $c_i$ (wherein i is an integer from 1 to n) and also each prediction coefficient supplied from the coefficient memory 4124 as $d_i$, and computes the right side of the above-described Expression (171) so as to calculate an HD pixel q' at the pixel of interest (SD pixel), and externally outputs this as a predetermined pixel (a first pixel) of the prediction image (HD image). After this, the processing ends.

Next, the learning processing (processing for generating prediction coefficients to be used by the image generating unit 4104 by learning) which the learning device 4131 (FIG. 209) performs with regard to the image generating unit 4104, will be described with reference to the flowchart in FIG. 212.

In step S4141, each of the down converter unit 4141 and normal equation generating unit 4146 inputs a predetermined image supplied thereto as a tutor image (HD image).

In step S4142, the down converter unit 4141 performs down conversion (reduction in resolution) of the input tutor image and generates a student image (SD image), which is supplied to each of the region extracting unit 4142 and region extracting unit 4145.

In step S4143, the region extracting unit 4142 extracts class taps from the student image supplied thereto, and outputs to the patter detecting unit 4143. Note that the processing in step S4143 is basically the same processing as step S4122 (FIG. 211) described above.

In step S4144, the pattern detecting unit 4143 detects patterns for determining the class code form the class tap supplied thereto, and supplies this to the class code determining unit 4144. Note that the processing in step S4144 is basically the same processing as step S4123 (FIG. 211) described above.

In step S4145, the class code determining unit 4144 determines the class code based on the pattern of the class tap supplied thereto, and supplies this to each of the region extracting unit 4145 and the normal equation generating unit 4146. Note that the processing in step S4145 is basically the same processing as step S4124 (FIG. 211) described above.

In step S4146, the region extracting unit 4145 extracts a prediction tap from the student image corresponding to the class code supplied thereto, and supplies this to the normal equation generating unit 4146. Note that the processing in step S4146 is basically the same processing as step S4126 (FIG. 211) described above.

In step S4147, the normal equation generating unit 4146 generates a normal equation expressed as the above-described Expression (173) (i.e., Expression (177)) from the prediction tap (SD pixels) supplied from the region extracting unit 4145 and a predetermined HD pixel from the tutor image (HD image), and correlates the generated normal equation with the class code supplied from the class code determining unit 4144, and supplies this to the coefficient determining unit 4147.

In step S4148, the coefficient determining unit 4147 solves the supplied normal equation and determines the prediction coefficient, i.e., calculates the prediction coefficient by computing the right side of the above-described Expression (178), and stores this in the coefficient memory 4124 in a manner correlated with the class code supplied thereto.

Subsequently, in step S4149, determination is made regarding whether or not processing has been performed for all pixels, and in the event that determination is made that processing has not been performed for all pixels, the processing returns to step S4143. That is to say, the processing of steps S4143 through S4149 is repeated until processing of all pixels ends.

Then, upon determination being made in step S4149 that processing has been performed for all pixels, the processing ends.

Next, second third hybrid method will be described with reference to FIG. 213 and FIG. 214.

FIG. 213 illustrates a configuration example of a signal processing device to which the second hybrid method has been applied.

In FIG. 213, the portions which corresponding to the signal processing device to which the first hybrid method has been applied (FIG. 207) are denoted with corresponding symbols.

In the configuration example in FIG. 207 (the first hybrid method), region identifying information is output from the data continuity detecting unit 4101 and input to the region detecting unit 4111, but with the configuration example shown in FIG. 213 (second hybrid method), the region identifying information is output from the actual world estimating unit 4102 and input to the region detecting unit 4111.

This region identifying information is not restricted in particular, and may be information newly generated following the actual world estimating unit 4102 estimating signals of the actual world 1 (FIG. 1), or may be information generated accessory to a case of signals of the actual world 1 being estimated.

Specifically, for example, estimation error may be used as region identifying information.

Now, description will be made regarding estimation error.

As described above, the estimated error output from the data continuity detecting unit 4101 (region identifying information in FIG. 207) is the estimation error calculated in an accessorial manner while carrying out least-square computation in the event that the continuity detecting information output from the data continuity detecting unit 4101 is the angle, and the angle is computed by the least-square method, for example.

Conversely, the estimation error (region identifying information in FIG. 213) output from the actual world estimating unit 4102 is, for example, mapping error.

That is to say, the actual world 1 signals are estimated by the actual world estimating unit 4102, so pixels of an arbitrary magnitude can be generated (pixel values can be calculated) from the estimated actual world 1 signals. Here, in this way, generating a new pixel is called mapping.

Accordingly, following estimating the actual world 1 signals, the actual world estimating unit 4102 generates (maps) a new pixel from the estimated actual world 1 signals, at the position where the pixel of interest of the input image (the pixel used as the pixel of interest in the case of the actual world 1 being estimated) was situated. That is to say, the actual world estimating unit 4102 performs prediction computation of the pixel value of the pixel of interest in the input image, from the estimated actual world 1 signals.

The actual world estimating unit 4102 then computes the difference between the pixel value of the newly-mapped pixel (the pixel value of the pixel of interest of the input image that has been predicted) and the pixel value of the pixel of interest of the actual input image. This difference is called mapping error.

By computing the mapping error (estimation error), the actual world estimating unit 4102 can thus supply the computed mapping error (estimation error) to the region detecting unit 4111 as region identifying information.

While the processing for region detection which the region detecting unit 4111 performs is not particularly restricted, as described above, in the event of the actual world estimating unit 4102 supplying the above-described mapping error (estimation error) to the region detecting unit 4111 as region identifying information for example, the pixel of interest of the input image is detected as being a continuity region in the event that the supplied mapping error (estimation error) is smaller than a predetermined threshold value, and on the other hand, the pixel of interest of the input image is detected as being a non-continuity region in the event that the supplied mapping error (estimation error) is equal to or greater than a predetermined threshold value.

Other configurations are basically the same as shown in FIG. 207. That is to say, the signal processing device to which the second hybrid method is applied (FIG. 207) is also provided with the data continuity detecting unit 4101, actual world estimating unit 4102, image generating unit 4103, image generating unit 4104, and continuity region detecting unit 4105 (region detecting unit 4111 and selector 4112), which have basically the same configurations and functions as those of the signal processing device (FIG. 213) to which the first hybrid method is applied.

FIG. 214 is a flowchart describing the processing of the signal processing device of the configuration shown in FIG. 213 (signal processing of the second hybrid method).

The signal processing of the second hybrid method is similar to the signal processing of the first hybrid method (the processing shown in the flowchart in FIG. 210). Accordingly, here, explanation of processing described with regard to the first hybrid method will be omitted as suitable, and description will proceed around the processing according to the second hybrid method which differs from the processing according to the first hybrid method with reference to the flowchart in FIG. 214.

Note that here, as with the case of the first hybrid method, let us say that the data continuity detecting unit 4101 uses the least-square method to compute an angle (an angle between the direction of continuity (spatial direction) at the pixel of interest of the actual world 1 (FIG. 1) signals and the X direction which is one direction in the spatial direction (a direction parallel to a predetermined one side of the detecting elements of the sensor 2 (FIG. 1)), and outputs the computed angle as data continuity information.

However, while the data continuity detecting unit 4101 supplies the region identifying information (e.g., estimated error) to the region detecting unit 4111 in the first hybrid method as described above, with the second hybrid method, the actual world estimating unit 4102 supplies the region identifying information (e.g., estimation error (mapping error)) to the region detecting unit 4111.

Accordingly, with the second hybrid method, the processing of step S4162 is executed as the processing of the data continuity detecting unit 4101. This processing is equivalent to the processing in step S4102 in FIG. 210, in the first hybrid method. That is to say, the data continuity detecting unit 4101 detects an angle corresponding to the direction of continuity, based on the input image, and supplies the detected angle as data continuity information to each of the actual world estimating unit 4102 and image generating unit 4103.

Also, in the second hybrid method, the processing of step S4163 is executed as the processing of the actual world estimating unit 4102. This processing is equivalent to the processing in step S4103 in FIG. 210, in the first hybrid method. That is to say, the actual world estimating unit 4102 estimates the actual world 1 (FIG. 1) signals based on the angle detected by the data continuity detecting unit 4101 at the processing in step S4162, and computes the estimated error of the estimated actual world 1 signals, i.e., mapping error, and supplies this as region identifying information to the region detecting unit 4111.

Other processing is basically the same as the processing of the first hybrid method (the corresponding processing of the processing shown in the flowchart in FIG. 210), so description thereof will be omitted.

Next, a third hybrid method will be described with reference to FIG. 215 and FIG. 216.

FIG. 215 illustrates a configuration example of a signal processing device to which the third hybrid method has been applied.

In FIG. 215, the portions which corresponding to the signal processing device to which the first hybrid method has been applied (FIG. 207) are denoted with corresponding symbols.

In the configuration example in FIG. 207 (the first hybrid method), the continuity region detecting unit 4105 is disposed downstream from the image generating unit 4103 and the image generating unit 4104, but with the configuration example shown in FIG. 215 (third hybrid method), the continuity region detecting unit 4161 corresponding thereto is disposed downstream from a data continuity detecting unit 4101 and upstream from an actual world estimating unit 4102 and image generating unit 4104.

Due to such difference in the layout positions, there is somewhat of a difference between the continuity region detecting unit 4105 in the first hybrid method and the continuity region detecting unit 4161 in the third hybrid method. The continuity detecting unit 4161 will be described mainly around this difference.

The continuity region detecting unit 4161 comprises a region detecting unit 4171 and execution command generating unit 4172. Of these, the region detecting unit 4171 has basically the same configuration and functions as the region detecting unit 4111 (FIG. 207) of the continuity region detecting unit 4105. On the other hand, the functions of the execution command generating unit 4172 are somewhat different to those of the selector 4112 (FIG. 207) of the continuity region detecting unit 4105.

That is to say, as described above, the selector 4112 according to the fist hybrid technique selects one of an image from the image generating unit 4103 and an image from the image generating unit 4104, based on the detection results form the region detecting unit 4111, and outputs the selected image as the output image. In this way, the selector 4112 inputs an image from the image generating unit 4103 and an image from the image generating unit 4104, in addition to the detection results form the region detecting unit 4111, and outputs an output image.

On the other hand, the execution command generating unit 4172 according to the third hybrid method selects whether the image generating unit 4103 or the image generating unit 4104 is to execute processing for generating a new pixel at the pixel of interest of the input image (the pixel which the data continuity detecting unit 4101 has taken as the pixel of interest), based on the detection results of the region detecting unit 4171.

That is to say, in the event that the region detecting unit 4171 supplies detection results to the execution command generating unit 4172 to the effects that the pixel of interest of the input image is a continuity region, the execution command generating unit 4172 selects the image generating unit 4103, and supplies the actual world estimating unit 4102 with a command to start the processing (hereafter, such a command will be referred to as an execution command). The actual world estimating unit 4102 then starts the processing thereof, generates actual world estimation information, and supplies this to the image generating unit 4103. The image generating unit 4103 generates a new image based on the supplied actual world estimation information (data continuity information additionally supplied from the data continuity detecting unit 4101 as necessary), and externally outputs this as an output image.

Conversely, in the event that the region detecting unit 4171 supplies detection results to the execution command generating unit 4172 to the effects that the pixel of interest of the input image is a non-continuity region, the execution command generating unit 4172 selects the image generating unit 4104, and supplies the image generating unit 4104 with an execution command. The image generating unit 4104 then starts the processing, subjects the input image to predetermined image processing (class classification adaptation processing in this case), generates a new image, and externally outputs this as an output image.

Thus, the execution command generating unit 4172 according to the third hybrid method inputs the detection results to the region detecting unit 4171 and outputs execution commands. That is to say, the execution command generating unit 4172 does not input or output images.

Note that the configuration other than the continuity region detecting unit 4161 is basically the same as that in FIG. 207. That is to say, the signal processing device to which the second hybrid method is applied (the signal processing device in FIG. 215) also is provided with the data continuity detecting unit 4101, actual world estimating unit 4102, image generating unit 4103, and image generating unit 4104, having basically the same configurations and functions as the signal processing device to which the first hybrid method is applied (FIG. 207).

However, with the third hybrid method, the actual world estimating unit 4102 and the image generating unit 4104 do not each execute the processing thereof unless an execution command is input from the execution command generating unit 4172.

Now, with the example shown in FIG. 215, the output unit of the image is in units of pixels. Accordingly, though not shown, an image synthesizing unit may be further provided downstream of the image generating unit 4103 and image generating unit 4104 for example, in order to make the output unit to be the entire image of one frame (in order to output all pixels at once).

This image synthesizing unit adds (synthesizes) the pixel values output from the image generating unit 4103 and the image generating unit 4104, and takes the added value as the pixel value of the corresponding pixel. In this case, the one of the image generating unit 4103 and the image generating unit 4104 which has not been supplied with an execution command does not execute the processing thereof, and constantly supplies a predetermined constant value (e.g., 0) to the image synthesizing unit.

The image synthesizing unit repeatedly executes such processing for all pixels, and upon ending processing for all pixels, externally outputs all pixels at once (as one frame of image data).

Next, the signal processing of the signal processing device to which the third hybrid method has been applied (FIG. 215) will be described with reference to the flowchart in FIG. 216.

Note that here, as with the case of the first hybrid method, let us say that the data continuity detecting unit 4101 uses the least-square method to compute an angle (an angle between the direction of continuity (spatial direction) at the position of interest of the actual world 1 (FIG. 1) signals and the X direction which is one direction in the spatial direction (a direction parallel to a predetermined one side of the detecting elements of the sensor 2 (FIG. 1)), and outputs the computed angle as data continuity information.

Let us also say that the data continuity detecting unit 4101 outputs the estimated error calculated (error of least-square) along with calculation of the angle as the region identifying information.

In FIG. 1, upon the signals of the actual world 1 being cast into the sensor 2, the sensor 2 outputs an input image.

In FIG. 215, this input image is input to the image generating unit 4104, and is also input to the data continuity detecting unit 4101 and the actual world estimating unit 4102.

Now, in step S4181 in FIG. 216, the data continuity detecting unit 4101 detects the angle corresponding to the direction of the continuity based on the input image, and also computes the estimated error thereof. The detected angle is supplied to is supplied to each of the actual world estimating unit 4102 and the image generating unit 4103, as data continuity information. Also, the computed estimated error is supplied to the region detecting unit 4171 as region identifying information.

Note that the processing of step S4181 is basically the same as the processing of step S4102 (FIG. 210) described above.

Also, as described above, at this point (unless an execution command is supplied from the execution command generating unit 4172), neither the actual world estimating unit 4102 nor the image generating unit 4103 execute the processing thereof.

In step S4182, the region detecting unit 4171 detects the region of the pixel of interest (the pixel to be taken as the pixel of interest in the case of the data continuity detecting unit 4101 detecting the angle) in the input image, based on the estimated error computed by the data continuity detecting unit 4101 (the supplied region identifying information), and supplies the detection results thereof to the execution command generating unit 4172. Note that the processing in step S4182 is basically the same as the processing of step S4105 (FIG. 210) described above.

Upon the detection results of the region detecting unit 4171 being supplied to the execution command generating unit 4172, in step S4183 the execution command generating unit 4172 determines whether or not the detected region is a continuity region. Note that the processing of step S4183 is basically the same as the processing of step S4106 (FIG. 210) described above.

In step S4183, in the event that determination is made that the detected region is not a continuity region, the execution command generating unit 4172 supplies an execution command to the image generating unit 4104. the image generating unit 4104 then executes "processing for executing class classification adaptation processing" in step S4184, generates a first pixel (HD pixel at the pixel of interest (SD pixel of the input image)), and in step S4185 externally outputs the first pixel generated by the class classification adaptation processing, as an output image.

Note that the processing of step S4184 is basically the same as the processing of step S4101 (FIG. 210) described above. That is to say, the flowchart in FIG. 211 is a flowchart for describing the details of processing in step S4184.

Conversely, in step S4183, in the event that determination is made that the detected region is a continuity region, the execution command generating unit 4172 supplies an execution command to the actual world estimating unit 4102. In step S4186, the actual world estimating unit 4102 then estimates the actual world 1 signals based on the angle detected by the data continuity detecting unit 4101 and the input image. Note that the processing of step S4186 is basically the same as the processing of step S4103 (FIG. 210) described above.

In step S4187, the image generating unit 4103 generates a second pixel (HD pixel) in the detected region (i.e., the pixel of interest (SD pixel) in the input image), based on the actual world 1 signals estimated by the actual world estimating unit 4102, and outputs the second pixel as an output image in step S4188. Note that the processing of step S4187 is basically the same as the processing of step S4104 (FIG. 210) described above.

Upon a first pixel or a second pixel being output as an output image (following processing of step S4185 or step S4188), in step S4189 determination is made regarding whether or not processing has ended for all pixels, and in the event that processing of all pixels has not ended yet, the processing returns to step S4181. That is to say, the processing of steps S4181 through S4189 is repeated until the processing of all pixels is ended.

Then, in step S4189, in the event that determination is made that processing of all pixels has ended, the processing ends.

In this way, in the example of the flowchart in FIG. 216, each time a first pixel (HD pixel) and second pixel (HD pixel) are generated, the first pixel or second pixel are output in pixel increment as an output image.

However, as described above, an arrangement wherein an image synthesizing unit (not shown) is further provided at the furthest downstream portion of the signal processing device having the configuration shown in FIG. 215 (downstream of the image generating unit 4103 and the image generating unit 4104) enables all pixels to be output at once as an output image following processing of all pixels having ended. In this case, the pixel (first pixel or second pixel) is output not externally but to the image synthesizing unit in the processing of step S4185 and step S4188. Then, before the processing in step S4189, processing is added wherein the image synthesizing unit synthesizes the pixel values of the pixels supplied from the image generating unit 4103 and the pixel values of the pixels supplied from the image generating unit 4104, and following the processing of step S4189 for generating pixels of the output image, processing is added wherein the image synthesizing unit outputs all pixels.

Next, a fourth hybrid method will be described with reference to FIG. 217 and FIG. 218.

FIG. 217 illustrates a configuration example of a signal processing device to which the fourth hybrid method has been applied.

In FIG. 217, the portions which corresponding to the signal processing device to which the third hybrid method has been applied (FIG. 215) are denoted with corresponding symbols.

In the configuration example in FIG. 215 (the third hybrid method), the region identifying information is input from the data continuity detecting unit 4101 to the region detecting unit 4171, but with the configuration example shown in FIG. 217 (fourth hybrid method), region identifying information is output from the actual world estimating unit 4102 and input to the region detecting unit 4171.

Other configurations are basically the same as that in FIG. 215. That is to say, the signal processing device to which the fourth hybrid method is applied (the signal processing device in FIG. 217) also is provided with the data continuity detecting unit 4101, actual world estimating unit 4102, image generating unit 4103, image generating unit 4104, and continuity region detecting unit 4161 (region detecting unit 4171 and execution command generating unit 4172) having basically the same configurations and functions as the signal processing device to which the third hybrid method is applied (FIG. 215).

Also, as with the third hybrid method, an arrangement may be made wherein an image synthesizing unit is disposed downstream from the image generating unit 4103 and image generating unit 4104, for example, to output all pixels at once, though not shown in the drawings.

FIG. 218 is a flowchart for describing the signal processing of the signal processing device of the configuration shown in FIG. 217 (signal processing according to the fourth hybrid method).

The signal processing according to the fourth hybrid method is similar to the signal processing according to the third hybrid method (the processing shown in the flowchart in FIG. 216). Accordingly, here, explanation of processing described with regard to the third hybrid method will be omitted as suitable, and description will proceed around the processing according to the fourth hybrid method which differs from the processing according to the third hybrid method, with reference to the flowchart in FIG. 218.

Note that here, as with the case of the third hybrid method, let us say that the data continuity detecting unit 4101 uses the least-square method to compute an angle (an angle between the direction of continuity (spatial direction) at the pixel of interest of the actual world 1 (FIG. 1) signals and the X direction which is one direction in the spatial direction (a direction parallel to a predetermined one side of the detecting elements of the sensor 2 (FIG. 1)), and outputs the computed angle as data continuity information.

However, while the data continuity detecting unit 4101 supplies the region identifying information (e.g., estimated error) to the region detecting unit 4171 in the third hybrid method as described above, with the fourth hybrid method, the actual world estimating unit 4102 supplies the region identifying information (e.g., estimation error (mapping error)) to the region detecting unit 4171.

Accordingly, with the fourth hybrid method, the processing of step S4201 is executed as the processing of the data continuity detecting unit 4101. This processing is equivalent to the processing in step S4181 in FIG. 216, in the third hybrid method. That is to say, the data continuity detecting unit 4101 detects an angle corresponding to the direction of continuity, based on the input image, and supplies the detected angle as data continuity information to each of the actual world estimating unit 4102 and image generating unit 4103.

Also, in the fourth hybrid method, the processing of step S4202 is executed as the processing of the actual world estimating unit 4102 in step S4202. This processing is equivalent to the processing in step S4182 in FIG. 210, in the third hybrid method. That is to say, the actual world estimating unit 4102 estimates the actual world 1 (FIG. 1) signals based on the angle detected by the data continuity detecting unit 4101, and computes the estimated error of the estimated actual world 1 signals, i.e., mapping error, and supplies this as region identifying information to the region detecting unit 4171.

Other processing is basically the same as the processing of the third hybrid method (the corresponding processing of the processing shown in FIG. 216), so description thereof will be omitted.

Next, a fifth hybrid method will be described with reference to FIG. 219 and FIG. 220.

FIG. 219 illustrates a configuration example of a signal processing device to which the fifth hybrid method has been applied.

In FIG. 219, the portions which corresponding to the signal processing devices to which the third and fourth hybrid methods have been applied (FIG. 215 and FIG. 217) are denoted with corresponding symbols.

In the configuration example shown in FIG. 215 (third hybrid method), one continuity region detecting unit 4161 is disposed downstream of the data continuity detecting unit 4101 and upstream of the actual world estimating unit 4102 and image generating unit 4104.

Also, in the configuration example shown in FIG. 217 (fourth hybrid method), one continuity region detecting unit 4161 is disposed downstream of the actual world estimating unit 4102 and upstream of the image generating unit 4103 and image generating unit 4104.

Conversely, with the configuration example shown in FIG. 219 (fifth hybrid method), the continuity region detecting until 4181 is disposed downstream form the data continuity detecting unit 4101 but upstream from the actual world estimating unit 4102 and the image generating unit 4101, as with the third hybrid method. Further, as with the fourth hybrid method, a continuity region detecting unit 4182 is disposed downstream from the actual world estimating unit 4102 but upstream from the image generating unit 4103 and the image generating unit 4104.

The continuity region detecting unit 4181 and continuity region detecting unit 4182 both basically have basically the same configurations and functions as the continuity region detecting unit 4161 (FIG. 215 or FIG. 217). That is to say, both the region detecting unit 4191 and region detecting unit 4201 have basically the same configuration and functions as the region detecting unit 4171.

Restated, the fifth hybrid method is a combination of the third hybrid method and the fourth hybrid method.

That is to say, with the third hybrid method and the fourth hybrid method, whether the pixel of interest of an input image is a continuity region or a non-continuity region is determined based on one region identifying information (in the case of the third hybrid method, the region identifying information from the data continuity detecting unit 4101, and in the case of the fourth hybrid method, the region identifying information from the actual world estimating unit 4102). Accordingly, the third hybrid method and the fourth hybrid method could detect a region to be a continuity region even though it should be a non-continuity region.

Accordingly, with the fifth hybrid method, following detection of whether the pixel of interest of an input image is a continuity region or a non-continuity region, based on region identifying information from the data continuity detecting unit 4101 (this will be called first region identifying information in the description of the fifth hybrid method), further detection is made regarding whether the pixel of interest of an input image is a continuity region or a non-continuity region, based on region identifying information from the actual world estimating unit 4102 (this will be called second region identifying information in the description of the fifth hybrid method).

In this way, with the fifth hybrid method, processing for region detection is performed twice, so precision of detection of the continuity region improves over that of the third hybrid method and the fourth hybrid method. Further, with the first hybrid method and the second hybrid method as well, only one continuity region detecting unit 4105 (FIG. 207 or FIG. 213) is provided, as with the case of the third hybrid method and the fourth hybrid method. Accordingly, the detection precision of the continuity region improves in comparison with the first hybrid method and the second hybrid method as well. Consequently, output of image data closer to signals of the actual world 1 (FIG. 1) than any of the first through fourth hybrid methods can be realized.

However, it remains unchanged that even the first through fourth hybrid methods use both the image generating unit 4104 which performs conventional image processing, and devices or programs and the like for generating image using data continuity, to which the present invention is applied (i.e., the data continuity detecting unit 4101, actual world estimating unit 4102, and image generating unit 4103).

Accordingly, the first through fourth hybrid methods are capable of outputting image data closer to signals of the actual world 1 (FIG. 1) than any of conventional signal processing devices or the signal processing according to the present invention with the configuration shown in FIG. 3.

On the other hand, from the perspective of processing speed, region detection processing is required only once with the first through fourth hybrid methods, and accordingly these are superior to the fifth hybrid methods which performs region detection processing twice.

Accordingly, the user (or manufacture) or the like can selectively use a hybrid method which meets the quality of the output image required, and the required processing time (the time until the output image is output).

Note that other configurations in FIG. 219 are basically the same as those in FIG. 215 or FIG. 217. That is to say, the signal processing device to which the fifth hybrid method has been applied (FIG. 219) is provided with the data continuity detecting unit 4101, actual world estimating unit 4102, image generating unit 4103, and image generating unit 4104, having basically the same configurations and functions as with the signal processing devices to which the third or fourth hybrid methods have been applied (FIG. 215 or FIG. 217).

However, with the fifth hybrid method, the actual world estimating unit 4102 does not execute the processing thereof unless an execution command is input from the execution command generating unit 4192, the image generating unit 4103 does not unless an execution command is input from the execution command generating unit 4202, and the image generating unit 4104 does not unless an execution command is input from the execution command generating unit 4192 or the execution command generating unit 4202.

Also, in the fifth hybrid method as well, as with the third or fourth hybrid methods, an arrangement may be made wherein an image synthesizing unit is disposed downstream from the image generating unit 4103 and image generating unit 4104 to output all pixels at once, for example, though not shown in the drawings.

Next, the signal processing of the signal processing device to which the fifth hybrid method has been applied (FIG. 219) will be described with reference to the flowchart in FIG. 220.

Note that here, as with the case of the third and fourth hybrid methods, let us say that the data continuity detecting unit 4101 uses the least-square method to compute an angle (an angle between the direction of continuity (spatial direction) at the position of interest of the actual world 1 (FIG. 1) signals and the X direction which is one direction in the spatial direction (a direction parallel to a predetermined one side of the detecting elements of the sensor 2 (FIG. 1)), and outputs the computed angle as data continuity information.

Let us also say here that the data continuity detecting unit 4101 outputs the estimated error calculated (error of least-square) along with calculation of the angle as first region identifying information, as with the case of the third hybrid method.

Let us further say that the actual world estimating unit 4102 outputs mapping error (estimation error) as second region identifying information, as with the case of the fourth hybrid method.

In FIG. 1, upon the signals of the actual world 1 being cast into the sensor 2, the sensor 2 outputs an input image.

In FIG. 219, this input image is input to the image generating unit 4104, and is also input to the data continuity detecting unit 4101, actual world estimating unit 4102, image generating unit 4103, and image generating unit 4104.

Now, in step S4221 in FIG. 220, the data continuity detecting unit 4101 detects the angle corresponding to the direction of the continuity based on the input image, and also computes the estimated error thereof. The detected angle is supplied to is supplied to each of the actual world estimating unit 4102 and the image generating unit 4103, as data continuity information. Also, the computed estimated error is supplied to the region detecting unit 4191 as first region identifying information.

Note that the processing of step S4221 is basically the same as the processing of step S4181 (FIG. 216) described above.

Also, as described above, at the current point, unless an execution command is supplied from the execution command generating unit 4192), neither the actual world estimating unit 4102 nor the image generating unit 4104 perform the processing thereof.

In step S4222, the region detecting unit 4191 detects the region of the pixel of interest (the pixel to be taken as the pixel of interest in the case of the data continuity detecting unit 4101 detecting the angle) in the input image, based on the estimated error computed by the data continuity detecting unit 4101 (the supplied first region identifying information), and supplies the detection results thereof to the execution command generating unit 4192. Note that the processing in step S4222 is basically the same as the processing of step S4182 (FIG. 216) described above.

Upon the detection results of the region detecting unit 4181 being supplied to the execution command generating unit 4192, in step S4223 the execution command generating unit 4192 determines whether or not the detected region is a continuity region. Note that the processing of step S4223 is basically the same as the processing of step S4183 (FIG. 216) described above.

In step S4223, in the event that determination is made that the detected region is not a continuity region (is a non-continuity region), the execution command generating unit 4192 supplies an execution command to the image generating unit 4104. The image generating unit 4104 then executes "processing for executing class classification adaptation processing" in step S4224, generates a first pixel (HD pixel at the pixel of interest (SD pixel of the input image)), and in step S4225 externally outputs the first pixel generated by the class classification adaptation processing, as an output image.

Note that the processing of step S4224 is basically the same as the processing of step S4184 (FIG. 216) described above. That is to say, the flowchart in FIG. 211 is also a flowchart for describing the details of processing in step S4186. Also, the processing of step S4225 is basically the same as the processing of step S4185 (FIG. 216) described above.

Conversely, in step S4223, in the event that determination is made that the detected region is a continuity region, the execution command generating unit 4192 supplies an execution command to the actual world estimating unit 4102. In step S4226, the actual world estimating unit 4102 then estimates the actual world 1 signals based on the angle detected by the data continuity detecting unit 4101 and the input image in the processing of step S4221, and also computes the estimation error (mapping error) thereof. The estimated actual world 1 signals are supplied to the image generating unit 4103 as actual world estimation information. Also, the computed estimation error is supplied to the region detecting unit 4201 as second region identifying information.

Note that the processing of step S4226 is basically the same as the processing of step S4202 (FIG. 218) described above.

Also, as described above, at this point (unless an execution command is supplied from the execution command generating unit 4192 or the execution command generating unit 4202), neither the image generating unit 4103 nor the image generating unit 4104 execute the processing thereof.

In step S4227, the region detecting unit 4201 detects the region of the pixel of interest (the pixel to be taken as the pixel of interest in the case of the data continuity detecting unit 4101 detecting the angle) in the input image, based on the estimated error computed by the data continuity detecting unit 4101 (the supplied second region identifying information), and supplies the detection results thereof to the execution command generating unit 4202. Note that the processing in step S4227 is basically the same as the processing of step S4203 (FIG. 218) described above.

Upon the detection results of the region detecting unit 4201 being supplied to the execution command generating unit 4202, in step S4228 the execution command generating unit 4202 determines whether or not the detected region is a continuity region. Note that the processing of step S4228 is basically the same as the processing of step S4204 (FIG. 218) described above.

In step S4228, in the event that determination is made that the detected region is not a continuity region (is a non-continuity region), the execution command generating unit 4202 supplies an execution command to the image generating unit 4104. The image generating unit 4104 then executes "processing for executing class classification adaptation processing" in step S4224, generates a first pixel (HD pixel at the pixel of interest (SD pixel of the input image)), and in step S4225 externally outputs the first pixel generated by the class classification adaptation processing, as an output image.

Note that the processing of step S4224 here is basically the same as the processing of step S4205 (FIG. 218) described above. Also, the processing of step S4225 here is basically the same as the processing of step S4206 (FIG. 218) described above.

Conversely, in step S4228, in the event that determination is made that the detected region is a continuity region, the execution command generating unit 4202 supplies an execution command to the image generating unit 4103. In step S4229, the image generating unit 4103 then generates a second pixel (HD pixel) in the region detected by the region detecting unit 4201 (i.e., the pixel of interest (SD pixel) in the input image), based on the actual world 1 signals estimated by the actual world estimating unit 4102 (and data continuity signals from the data continuity detecting unit 4101 as necessary). Then, in step S4230, the image generating unit 4103 externally outputs the generated second pixel as an output image.

Note that the processing of steps S4229 and S4230 is each basically the same as the processing of each of steps S4207 and S4208 (FIG. 218) described above.

Upon a first pixel or a second pixel being output as an output image (following processing of step S4225 or step S4230), in step S4231 determination is made regarding whether or not processing has ended for all pixels, and in the event that processing of all pixels has not ended yet, the processing returns to step S4221. That is to say, the processing of steps S4221 through S4231 is repeated until the processing of all pixels is ended.

Then, in step S4231, in the event that determination is made that processing of all pixels has ended, the processing ends.

The hybrid method has been described so far as an example of an embodiment of the signal processing device 4 (FIG. 1) according to the present invention, with reference to FIG. 207 through FIG. 220.

As described above, with the hybrid method, another device (or program or the like) which performs signal processing without using continuity is further added to the signal processing device according to the present invention having the configuration shown in FIG. 3.

In other words, with the hybrid method, the signal processing device (or program or the like) according to the present invention having the configuration shown in FIG. 3 is added to a conventional signal processing device (or program or the like).

That is to say, with the hybrid method, the continuity region detecting unit 4105 shown in FIG. 207 or FIG. 213 for example, detects data regions having data continuity of image data (e.g., the continuity region described in step S4106 in FIG. 210 or step S4166 in FIG. 214) within image data wherein light signals of the actual world 1 have been projected and a part of the continuity of the light signals of the actual world 1 has been lost (e.g., the input image in FIG. 207 or FIG. 213).

Also, the actual world estimating unit 4102 shown in FIG. 207 and FIG. 213 estimates the light signals by estimating the lost continuity of the light signals of the actual world 1, based on the data continuity of the image data of which a part of the continuity of the light signals of the actual world 1 has been lost.

Further, the data continuity detecting unit 4101 shown in FIG. 207 and FIG. 213 detects the angle of the data continuity of the image data as to a reference axis (for example, the angle described in step S4102 in FIG. 210 and step S4162 in FIG. 214), within image data wherein light signals of the actual world 1 have been projected and a part of the continuity of the light signals of the actual world 1 has been lost. In this case, for example, the continuity region detecting unit 4105 shown in FIG. 207 and FIG. 213 detects regions in the image data having data continuity based on the angle, and the actual world estimating unit 4102 estimates the light signals by estimating the continuity of the light signals of the actual world 1 that has been lost, with regard to that region.

However, in FIG. 207, the continuity region detecting unit 4105 detects regions of the input image having data continuity based on the error between a model having continuity following the angle, and the input image (that is, estimation error which is the region identifying information in the drawing, computed by the processing in step S4102 of FIG. 210).

Conversely, in FIG. 213, the continuity region detecting unit 4105 is disposed downstream from the actual world estimating unit 4102, and selectively outputs (e.g., the selector 4112 in FIG. 213 executes the processing of steps S4166 through S4168 in FIG. 214) an actual world model estimated by the actual world estimating unit 4102, based on error between an actual world model representing light signals of the actual world 1 corresponding to the input image computed by the actual world estimating unit 4102 and the input image (i.e., estimation error (mapping error) of actual world signals computed by the processing in step S4163 in FIG. 210, which is region identifying information in the drawing, for example), i.e., outputs an image output from the image generating unit 4103.

While the above description has been made with the example of FIG. 207 and FIG. 213, the same is true for FIG. 215, FIG. 217, and FIG. 219.

Accordingly, with the hybrid method, a device (or program or the like) corresponding to the signal processing device of the configuration shown in FIG. 3 executes signal processing for portions of the actual world 1 signals where continuity exists (regions of the image data having data continuity), and a conventional signal processing device (or program or the like) can execute signal processing for portions of the actual world 1 signals where there is no clear continuity. As a result, output of image data closer to signals of the actual world (FIG. 1) than either of conventional signal processing devices and the signal processing according to the present invention of the configuration shown in FIG. 3 can be realized.

Next, an example of directly generating an image from the data continuity detecting unit 101 will be described with reference to FIG. 221 and FIG. 222.

The data continuity detecting unit 101 shown in FIG. 221 is the data continuity detecting unit 101 shown in FIG. 165 with an image generating unit 4501 added thereto. The image generating unit 4501 acquires as actual world estimation information a coefficient of the actual world approximation function f(x) output from the actual world estimating unit 802, and generates and outputs an image by reintegration of each pixel based on this coefficient.

Next, the data continuity detection processing in FIG. 221 will be described with reference to the flowchart shown in FIG. 222. Note that the processing in steps S4501 through S4504 and steps S4506 through S4511 of the flowchart in FIG. 222 is the same as the processing in steps S801 through S810 in FIG. 166, so description thereof will be omitted.

In step S4504, the image generating unit 4501 reintegrates each of the pixels based on the coefficient input form the actual world estimating unit 802, and generates and outputs an image.

Due to the above processing, the data continuity detecting unit 101 can output not only region information built also an image used for the region determination (made up of pixels generated based on the actual world estimation information).

Thus, with the data continuity detecting unit 101 shown in FIG. 221, the image generating unit 4501 is provided. That is to say, the data continuity detecting unit 101 in FIG. 221 can generate output images based on the data continuity of the input image. Accordingly, a device having the configuration shown in FIG. 221 can be interpreted to be another embodiment of the signal processing device (image processing device) 4 shown in FIG. 1, rather than being interpreted as an embodiment of the data continuity detecting unit 101.

Further, with the signal processing device to which the above-described hybrid method is applied, a device having the configuration shown in FIG. 221 (i.e., a signal processing device having the same functions and configuration as the data continuity detecting unit 101 in FIG. 221) can be applied as the signal processing unit for subjecting the portions of the signals of the actual world 1 where continuity exists, to signal processing.

Specifically, for example, with the signal processing device shown in FIG. 207 to which the first hybrid method is applied, the signal processing unit for subjecting the portions of the signals of the actual world 1 where continuity exists, to signal processing, is the data continuity detecting unit 4101, actual world estimating unit 4102, and image generating unit 4103. While not shown in the drawings, the signal processing device (image processing device) of the configuration shown in FIG. 221 may be applied instead of these data continuity detecting unit 4101, actual world estimating unit 4102, and image generating unit 4103. In this case, the comparing unit 804 in FIG. 221 supplies the output thereof as region identifying information to the region detecting unit 4111, and the image generating unit 4501 supplies the output image (second pixels) to the selector 4112.

Note that the sensor 2 may be a sensor such as a solid-state imaging device, for example, a BBD (Bucket Brigade Device), CID (Charge Injection Device), or CPD (Charge Priming Device) or the like.

The storage medium storing the program for carrying out the signal processing according to the present invention is not restricted to packaged media which is distributed separately from the computer so as to provide the user with the program, such as a magnetic disk 51 (including flexible disks, optical disk 52 (including CD-ROM (Compact Disk-Read Only Memory), DVD Digital Versatile Disk), magneto-optical disk 53 (including MD (Mini-Disk) (Registered Trademark)), semiconductor memory 54, and so forth, as shown in FIG. 2, in which the program has been recorded; but also is configured of ROM 22 in which the program has been recorded, or a hard disk or the like included in the storage unit 28, these being provided to the user in a state of having been built into the computer beforehand.

Note that the program for executing the series of processing described above may be installed to the computer via cable or wireless communication media, such as a Local Area Network, the Internet, digital satellite broadcasting, and so forth, via interfaces such as routers, modems, and so forth, as necessary.

It should be noted that in the present specification, the steps describing the program recorded in the recording medium include processing of being carried out in time-sequence following the described order, as a matter of course, but this is not restricted to time-sequence processing, and processing of being executed in parallel or individually is included as well.

INDUSTRIAL APPLICABILITY

As described above, according to the present invention, processing results which are accurate and highly precise can be obtained.

Also, according to the present invention, processing results which are more accurate and which have higher precision as to events of the real world can be obtained.

The invention claimed is:

1. An image processing device comprising:
a discontinuous portion detecting unit configured to detect discontinuous portions in pixel values of a plurality of pixels in image data in which light signals of the real world having continuity of the light signals of the real world in that, at any arbitrary position in a length-wise direction of an object in distribution of intensity of light from the object, the cross-sectional shape as the change in level corresponding to the change in position in the direction orthogonal to the length-wise direction are projected so that a part of the continuity of the light signals of the real world is lost;
a peak detector configured to detect the peak of change of the pixel values from the discontinuous portions;
a monotonous increase or decrease region detector configured to detect monotonous increase or decrease regions wherein the pixel values are increasing or decreasing monotonously from the peak;
a continuousness detector configured to detect, from the monotonous increase or decrease regions detected by the monotonous increase or decrease region detector, a monotonous increase or decrease region regarding which another monotonous increase or decrease region exists at an adjacent position on a screen, as a continuity region which is a pixel region having continuity of the image data in that a constant characteristic is obtained in a predetermined dimensional direction which is changed from the continuity of the light signals of the real world;
a direction detector configured to detect the direction of continuousness of the continuity region; and
an actual world estimating unit configured to estimate light signals of the real world by estimating the continuity of the light signals of the real world, based on the continuity region detected by the continuousness detector and the direction of the continuousness of the continuity region detected by the direction detector.

2. The image processing device according to claim 1, wherein the direction detector detects the direction of the continuousness of the continuity region, based on the change in pixel values of a plurality of first pixels disposed within a first monotonous increase or decrease region of the monotonous increase or decrease regions detected by the continuousness detector, and the change in pixel values of a plurality of second pixels adjacent to the plurality of first pixels, disposed within a second monotonous increase or decrease region adjacent to the first monotonous increase or decrease region.

3. The image processing device according to claim 2, wherein the direction detector detects a direction determined by the first monotonous increase or decrease region and the second monotonous increase or decrease region as the direction of the continuousness of the continuity region, in the event that the increase in the pixel values of the plurality of first pixels disposed within the first monotonous increase or decrease region and the decrease in the pixel values of the plurality of second pixels disposed within the second monotonous increase or decrease region match.

4. The image processing device according to claim 1, wherein the discontinuous portion detector determines a regression plane corresponding to the pixel values of the plurality of pixels in the image data, detects as the discontinuous portion a region made up of the pixels having the pixel values wherein the distance from the regression plane is equal to or greater than a threshold value, and computes difference values wherein values approximated by the regression plane are subtracted from the pixel values of the pixels in the discontinuous portion;
wherein the peak detector detects the peak based on the difference values;
wherein the monotonous increase or decrease detector detects the monotonous increase or decrease region based on the difference values; and
wherein the direction detector detects the direction of the continuousness of the continuity region based on the difference values.

5. An image processing method comprising:
detecting discontinuous portions in pixel values of a plurality of pixels in image data collected by a sensor in which light signals of the real world having continuity of the light signals of the real world in that, at any arbitrary position in a length-wise direction of an object in distribution of intensity of light from the object, the cross-sectional shape as the change in level corresponding to the change in position in the direction orthogonal to the length-wise direction are projected so that a part of the continuity of the light signals of the real world is lost;
detecting the peak of change of the pixel values from the discontinuous portions with a processor;
detecting monotonous increase or decrease regions wherein the pixel values are increasing or decreasing monotonously from the peak;
detecting, from the monotonous increase or decrease regions detected in the detecting monotonous increase or decrease regions, a monotonous increase or decrease region regarding which another monotonous increase or decrease region exists at an adjacent position on a screen, as a continuity region which is a pixel region having continuity of the image data in that a constant characteristic is obtained in a predetermined dimensional direction which is changed from the continuity of the light signals of the real world;
detecting the direction of continuousness of the continuity region;
estimating light signals of the real world by estimating the continuity of the light signals of the real world, based on the continuity region detected in the detecting a monotonous increase or decrease region and the direction of the continuousness of the continuity region detected by the detecting the direction; and displaying the estimated light signals of the real world on a display.

6. A computer readable medium recording a computer-readable program, wherein the program, when executed by a processor, cause the processor to perform a method comprising:

detecting discontinuous portions in pixel values of a plurality of pixels in image data collected by a sensor in which light signals of the real world having continuity of the light signals of the real world in that, at any arbitrary position in a length-wise direction of an object in distribution of intensity of light from the object, the cross-sectional shape as the change in level corresponding to the change in position in the direction orthogonal to the length-wise direction are projected so that a part of the continuity of the light signals of the real world is lost;

detecting the peak of change of the pixel values from the discontinuous portions with a processor;

detecting monotonous increase or decrease regions wherein the pixel values are increasing or decreasing monotonously from the peak;

detecting, from the monotonous increase or decrease regions detected in the detecting monotonous increase or decrease regions, a monotonous increase or decrease region regarding which another monotonous increase or decrease region exists at an adjacent position on a screen, as a continuity region which is a pixel region having continuity of the image data in that a constant characteristic is obtained in a predetermined dimensional direction which is changed from the continuity of the light signals of the real world;

detecting the direction of continuousness of the continuity region; and estimating light signals of the real world by estimating the continuity of the light signals of the real world, based on the continuity region detected in the detecting a monotonous increase or decrease region and the direction of the continuousness of the continuity region detected by the detecting the direction; and displaying the estimated light signals of the real world on a display.

* * * * *